US012698244B2

(12) United States Patent
Wolf et al.

(10) Patent No.: US 12,698,244 B2
(45) Date of Patent: Aug. 4, 2026

(54) MICROBIAL CONSORTIA FOR SOIL IMPROVEMENT

(71) Applicant: Pluton Biosciences, Inc, St. Louis, MO (US)

(72) Inventors: Benjamin M. Wolf, St. Louis, MO (US); Boahemaa Adu-Oppong, St. Louis, MO (US); Steven C. Slater, Bainbridge Island, WA (US); Barry S. Goldman, St. Louis, MO (US); Alexa Jewell Wagner, St. Louis, MO (US); Nicholas Thomas Norman, St. Charles, MO (US)

(73) Assignee: Pluton Biosciences, Inc., St. Louis, MO (US)

(*) Notice: Subject to any disclaimer, the term of this patent is extended or adjusted under 35 U.S.C. 154(b) by 664 days.

(21) Appl. No.: 18/186,931

(22) Filed: Mar. 20, 2023

(65) Prior Publication Data

US 2024/0018064 A1 Jan. 18, 2024

Related U.S. Application Data

(60) Provisional application No. 63/322,206, filed on Mar. 21, 2022.

(51) Int. Cl.

*C05F 11/08* (2006.01)
*C05F 11/02* (2006.01)
*C05F 17/20* (2020.01)
*C05F 17/30* (2020.01)

(52) U.S. Cl.

CPC .............. *C05F 11/08* (2013.01); *C05F 11/02* (2013.01); *C05F 17/20* (2020.01); *C05F 17/30* (2020.01)

(58) Field of Classification Search

CPC C05F 11/08; C05F 17/30; C05F 17/20; C05F 11/02

See application file for complete search history.

(56) References Cited

U.S. PATENT DOCUMENTS 4,551,164 A * 11/1985 Tenzer .................... C05F 11/08 71/7
4,774,186 A 9/1988 Schaefer, Jr. et al.
5,578,486 A 11/1996 Zhang (Continued)

FOREIGN PATENT DOCUMENTS

WO WO-1995004814 A1 2/1995
WO WO 00/018957 4/2000

(Continued)

OTHER PUBLICATIONS

Nogrady. Farming techniques that protect the planet. Nature. Jun. 20, 2024, 630, S23-S25.

(Continued)

*Primary Examiner* — Wayne A Langel
(74) *Attorney, Agent, or Firm* — Casimir Jones, SC; Thomas A. Isenbarger

(57) ABSTRACT

Provided herein is technology relating to functional microbial consortia and particularly, but not exclusively, to methods and systems for producing a microbial consortium possessing a desired function and microbial consortia produced according to such methods. The microbial consortia may be used to improve soil, e.g., for agricultural uses.

25 Claims, 44 Drawing Sheets
(34 of 44 Drawing Sheet(s) Filed in Color)
Specification includes a Sequence Listing.

(56) References Cited

U.S. PATENT DOCUMENTS

| | | | |
|---|---|---|---|
| 5,695,934 A | 12/1997 | Brenner | |
| 5,714,330 A | 2/1998 | Brenner et al. | |
| 5,750,341 A | 5/1998 | Macevicz | |
| 6,306,597 B1 | 10/2001 | Macevicz | |
| 6,432,360 B1 | 8/2002 | Church | |
| 6,485,944 B1 | 11/2002 | Church et al. | |
| 6,511,803 B1 | 1/2003 | Church et al. | |
| 6,787,308 B2 | 9/2004 | Balasubramanian et al. | |
| 6,833,246 B2 | 12/2004 | Balasubramanian | |
| H2271 H | 7/2012 | Sears | |
| 8,999,698 B2 * | 4/2015 | Kang | C12N 1/205 504/117 |
| 2005/0044911 A1 * | 3/2005 | Shimose | C05F 17/15 435/243 |
| 2005/0130173 A1 | 6/2005 | Leamon et al. | |
| 2008/0236227 A1 | 10/2008 | Flynn | |
| 2014/0345341 A1 * | 11/2014 | Fiato | C10B 19/00 71/7 |
| 2015/0096069 A1 | 4/2015 | Castiglioni et al. | |
| 2015/0329868 A1 | 11/2015 | Hickman et al. | |
| 2019/0090411 A1 | 3/2019 | Ott et al. | |
| 2020/0102254 A1 | 4/2020 | Sakimoto et al. | |
| 2020/0165733 A1 | 5/2020 | Reed et al. | |
| 2021/0298310 A1 * | 9/2021 | Singh | A01N 63/20 |
| 2022/0177831 A1 | 6/2022 | Slater et al. | |
| 2023/0217933 A1 | 7/2023 | Cloud et al. | |
| 2023/0219863 A1 | 7/2023 | Fiato | |
| 2026/0109905 A1 * | 4/2026 | Fiato | C10G 1/06 |

FOREIGN PATENT DOCUMENTS

| | | | |
|---|---|---|---|
| WO | WO-2006005100 A1 * | 1/2006 | C05F 11/08 |
| WO | WO 2006/084132 | 8/2006 | |
| WO | WO-2015089183 A2 * | 6/2015 | C12M 45/22 |
| WO | WO-2016164813 A2 | 10/2016 | |
| WO | WO-2018144965 A1 * | 8/2018 | C12P 13/00 |
| WO | WO 2022/174313 | 8/2022 | |

OTHER PUBLICATIONS

International Search Report and Written Opinion for PCT/US2023/064735. Mailed Sep. 13, 2023. 18 pages.

Adessi et al., Solid phase DNA amplification: characterisation of primer attachment and amplification mechanisms. Nucleic Acids Res. Oct. 15, 2000;28(20):E87.

Altschul et al., Basic local alignment search tool. J Mol Biol. Oct. 5, 1990;215(3):403-10.

Ausubel et al., Current Protocols in Molecular Biology, Greene Publishing Associates, 1994, TOC only. 14 pages.

Ausubel et al., Short Protocols in Molecular Biology: A Compendium of Methods from Current Protocols in Molecular Biology, 4th ed., Wiley & Sons. 1999. TOC only. 20 pages.

Babraham Bioinformatics. www.bioinformatics.babraham.ac.uk/projects/fastqc/. Retrieved from the internet Feb. 22, 2024. 6 pages.

Bankevich et al., SPAdes: a new genome assembly algorithm and its applications to single-cell sequencing. J Comput Biol. May 2012;19(5):455-77.

Bennett et al., Toward the 1,000 dollars human genome. Pharmacogenomics. Jun. 2005;6(4):373-82.

Bertilsson et al., Release of dissolved organic matter by Prochlorococcus. Vie et Milieu, 2005; 55: 225-31.

Birren et al., Genome Analysis: Analyzing DNA, 1, Cold Spring Harbor, N.Y, 1997, TOC only. 13 pages.

Brady et al., Phymm and PhymmBL: metagenomic phylogenetic classification with interpolated Markov models. Nat Methods. Sep. 2009;6(9):673-6.

Brady et al., PhymmBL expanded: confidence scores, custom databases, parallelization and more. Nat Methods. May 2011;8(5):367. 1 page.

Bray et al., An Ordination of the Upland Forest Communities of Southern Wisconsin. Ecol. Monogr. 1957, 27, 325-349.

Brenner et al., Gene expression analysis by massively parallel signature sequencing (MPSS) on microbead arrays. Nat Biotechnol. Jun. 2000;18(6):630-4.

Chao et al., A new statistical approach for assessing similarity of species composition with incidence and abundance data. Ecol. Lett. 2005; 8:148-159.

Chao et al., Estimating the number of classes via sample coverage. J. Am. Stat. Assoc. 1992; 87:210-217.

Chao et al., Estimating the number of shared species in two communities. Stat. Sinica 2000; 10:227-246.

Chao et al., The applications of Laplace's boundary-mode approximations to estimate species richness and shared species richness. Aust. N. Z. J. Stat. 2006; 48:117-128.

Chao. Non-parametric estimation of the number of classes in a population. Scand. J. Stat. 1984; 11:265-270.

Chaumeil et al., GTDB-Tk: A toolkit to classify genomes with the Genome Taxonomy Database. Bioinformatics, Mar. 2020, vol. 36, Iss 6, 1925-1927.

Chen et al., fastp: an ultra-fast all-in-one FASTQ preprocessor. Bioinformatics. Sep. 1, 2018;34(17):1884-i890.

Coleman et al., A rooted phylogeny resolves early bacterial evolution. Science. May 7, 2021;372(6542):eabe0511. 1-10.

Desantis et al., High-density universal 16S rRNA microarray analysis reveals broader diversity than typical clone library when sampling the environment. Microb Ecol. Apr. 2007;53(3):371-83.

Djemiel et al., µgreen-db: a reference database for the 23S rRNA gene of eukaryotic plastids and cyanobacteria. Sci Rep. Apr. 3, 2020;10(1):5915. 11 pages.

Doolittle et al., Metagenomics and the Units of Biological Organization. BioScience, 2010; 60(2): 102-112.

Excoffier et al., Analysis of molecular variance inferred from metric distances among DNA haplotypes: application to human mitochondrial DNA restriction data. Genetics. Jun. 1992;131(2):479-91.

Fava et al., Characterization of a Pigment Produced by Pseudomonas Fluorescens during 3-Chlorobenzoate Co-Metabolism. Chemosphere, 1993; 27(5): 825-35.

Gao et al., Microarray-based analysis of microbial community RNAs by whole-community RNA amplification. Appl Environ Microbiol. Jan. 2007;73(2):563-71.

Garrity et al., The Taxonomic Outline of Bacteria and Archaea. TOBA Release 7.7, Mar. 2007. Michigan State University Board of Trustees. 141 pages.

Ghavam et al., Sustainable Ammonia Production Processes. Front. Energy Res., 2021; 9: 580808, 19 pages.

Goslee et al., The ecodist package for dissimilarity-based analysis of ecological data. J Stat Softw. 2007; 22: 1-19.

Gruber-Vodicka et al., phyloFlash: Rapid Small-Subunit rRNA Profiling and Targeted Assembly from Metagenomes. mSystems. Oct. 27, 2020;5(5):e00920-20.

Guo et al., Preparation of water-soluble melanin from squid ink using ultrasound-assisted degradation and its anti-oxidant activity. J Food Sci Technol. Dec. 2014;51(12):3680-90.

Gurevich et al., QUAST: quality assessment tool for genome assemblies. Bioinformatics. Apr. 15, 2013;29(8):1072-5.

Handelsman et al., Molecular biological access to the chemistry of unknown soil microbes: a new frontier for natural products. Chem Biol. Oct. 1998;5(10):R245-9.

Harlow et al., Antibodies: A Laboratory Manual, Cold Spring Harbor Laboratory Press, Cold Spring Harbor, N.Y. 1988, TOC only. 9 pages.

Harlow et al., Using Antibodies: A Laboratory Manual, Cold Spring Harbor Laboratory Press, Cold Spring Harbor, N.Y. 2012, TOC only. 10 pages.

Hogfors-Ronnholm et al., Indirect DNA extraction method suitable for acidic soil with high clay content. MethodsX, 2018,5, 136-140.

Hughes et al., Counting the uncountable: statistical approaches to estimating microbial diversity. Appl Environ Microbiol. Oct. 2001;67(10):4399-406.

Hurt et al., Simultaneous recovery of RNA and DNA from soils and sediments. Appl Environ Microbiol. Oct. 2001;67(10):4495-503.

Huson et al., MEGAN analysis of metagenomic data. Genome Res. Mar. 2007;17(3):377-86.

(56) References Cited

OTHER PUBLICATIONS

Ju et al., 16S rRNA gene high-throughput sequencing data mining of microbial diversity and interactions. Appl Microbiol Biotechnol. May 2015;99(10):4119-29.
Kang et al., MetaBAT 2: an adaptive binning algorithm for robust and efficient genome reconstruction from metagenome assemblies. PeerJ. Jul. 26, 2019:7:e7359. 13 pages.
Kornberg et al., Inorganic polyphosphate: a molecule of many functions. Annu Rev Biochem. 1999:68:89-125.
Kumar et al., Cyanobacterial heterocysts. Cold Spring Harb Perspect Biol. Apr. 2010;2(4):a000315. 20 pages.
Kumar et al., Production of melanin pigment from Pseudomonas stutzeri isolated from red seaweed Hypnea musciformis. Lett Appl Microbiol. Oct. 2013;57(4):295-302.
Langmead et al., Fast gapped-read alignment with Bowtie 2. Nat Methods. Mar. 4, 2012;9(4):357-9.
Lee et al., Melanin Biopolymer Synthesis Using a New Melanogenic Strain of Flavobacterium Kingsejongi and a Recombinant Strain of Escherichia Coli Expressing 4-Hydroxyphenylpyruvate Dioxygenase from F. Kingsejongi Microb. Cell Factories. May 2, 2022; 21(1): 75. 15 pages.
Legendre et al., Numerical Ecology. 3rd English Edition. Elsevier. 2012. TOC only. 10 pages.
Ley et al., Obesity alters gut microbial ecology. Proc Natl Acad Sci U S A. Aug. 2, 2005;102(31):11070-5.
Li et al., MEGAHIT: an ultra-fast single-node solution for large and complex metagenomics assembly via succinct de Bruijn graph. Bioinformatics. May 15, 2015;31(10):1674-6.
Lorquin et al., New insights and advances on pyomelanin production: from microbial synthesis to applications. J Ind Microbiol Biotechnol. Jul. 30, 2022;49(4):kuac013. 20 pages.
Lorquin et al., Production and properties of non-cytotoxic pyomelanin by laccase and comparison to bacterial and synthetic pigments. Sci Rep. Apr. 20, 2021;11(1):8538. 16 pages.
Lozupone et al., UniFrac: a new phylogenetic method for comparing microbial communities. Appl Environ Microbiol. Dec. 2005;71(12):8228-35.
Maclean et al., Application of 'next-generation' sequencing technologies to microbial genetics. Nat Rev Microbiol. Apr. 2009;7(4):287-96.
Margulies et al., Genome sequencing in microfabricated high-density picolitre reactors. Nature. Sep. 15, 2005;437(7057):376-80.
Martin. Phylogenetic approaches for describing and comparing the diversity of microbial communities. Appl Environ Microbiol. Aug. 2002;68(8):3673-82.
Martinez-Alonso et al., Diversity of anoxygenic phototrophic sulfur bacteria in the microbial mats of the Ebro Delta: a combined morphological and molecular approach. FEMS Microbiol Ecol. May 1, 2005;52(3):339-50.
Maziarz et al., Using standard microbiome reference groups to simplify beta-diversity analyses and facilitate independent validation. Bioinformatics. Oct. 1, 2018;34(19):3249-3257.
Mcewan et al., Photosynthetic electron transport and anaerobic metabolism in purple non-sulfur phototrophic bacteria. Antonie Van Leeuwenhoek. 1994;66(1-3):151-64.
Mcgrath et al., Isolation and analysis of mRNA from environmental microbial communities. J Microbiol Methods. Oct. 2008;75(2):172-6.
Mitra et al., Fluorescent in situ sequencing on polymerase colonies. Anal Biochem. Sep. 1, 2003;320(1):55-65.
Moreno et al., Chemical and rheological properties of an extracellular polysaccharide produced by the cyanobacterium Anabaena sp. ATCC 33047. Biotechnol Bioeng. Feb. 5, 2000;67(3):283-90.
Morozova et al., Applications of next-generation sequencing technologies in functional genomics. Genomics. Nov. 2008;92(5):255-64.
Nurk et al., metaSPAdes: a new versatile metagenomic assembler. Genome Res. May 2017;27(5):824-834.
Oksanen et al., Vegan: Community Ecology Package. Jan. 2015. Retrieved from ResearchGate.net on Feb. 23, 2024. 298 pages.
Parks et al., A complete domain-to-species taxonomy for Bacteria and Archaea. Nat Biotechnol. Sep. 2020;38(9):1079-1086.
Parks et al., A standardized bacterial taxonomy based on genome phylogeny substantially revises the tree of life. Nature Biotechnology. 2018, 36, 996-1004.
Peng et al., Development of a nitroge-fixing cyanobacterial consortium for surface stabilization of agricultural soils. Journal of Applied Phycology, Aug. 20, 2018, vol. 31, iss. 2, pp. 1047-1056.
Roeselers et al., Phototrophic biofilms and their potential applications. J Appl Phycol. Jun. 2008;20(3):227-235.
Rosen et al., Metagenome fragment classification using N-mer frequency profiles. Adv Bioinformatics. 2008:205969. 13 pages.
Royal Society Policy Briefing "Ammonia: zero-carbon fertiliser, fuel and energy store" Feb. 2020, available at royalsociety.org/green- ammonia. Retrieved Feb. 23, 2024. 40 pages.
Sakarika et al., Purple non-sulphur bacteria and plant production: benefits for fertilization, stress resistance and the environment. Microb Biotechnol. Sep. 2020;13(5):1336-1365.
Sambrook et al., Molecular Cloning: A Laboratory Manual, 2d ed., Cold Spring Harbor Laboratory Press, Cold Spring Harbor, N.Y. 1989. TOC only. 30 pages.
Sambrook et al., Molecular Cloning: A Laboratory Manual, 3d ed., Cold Spring Harbor Laboratory Press, Cold Spring Harbor, N.Y. 2001. TOC only. 23 pages.
Schloss et al., Integration of microbial ecology and statistics: a test to compare gene libraries. Appl Environ Microbiol. Sep. 2004;70(9):5485-92.
Schloss et al., Introducing DOTUR, a computer program for defining operational taxonomic units and estimating species richness. Appl Environ Microbiol. Mar. 2005;71(3):1501-6.
Schloss et al., Introducing SONS, a tool for operational taxonomic unit-based comparisons of microbial community memberships and structures. Appl Environ Microbiol. Oct. 2006;72(10):6773-9.
Schloss et al., Introducing TreeClimber, a test to compare microbial community structures. Appl Environ Microbiol. Apr. 2006;72(4):2379-84.
Shendure et al., Accurate multiplex polony sequencing of an evolved bacterial genome. Science. Sep. 9, 2005;309(5741):1728-32.
Singleton et al., Quantitative comparisons of 16S rRNA gene sequence libraries from environmental samples. Appl Environ Microbiol. Sep. 2001;67(9):4374-6.
Sprouffske et al., Growthcurver: an R package for obtaining interpretable metrics from microbial growth curves. BMC Bioinformatics. Apr. 19, 2016:17:172. 4 pages.
Stuart et al., Cyanobacterial reuse of extracellular organic carbon in microbial mats. ISME J. May 2016;10(5):1240-51.
Tringe et al., A renaissance for the pioneering 16S rRNA gene. Curr Opin Microbiol. Oct. 2008;11(5):442-6.
Vieites et al., Metagenomics approaches in systems microbiology. FEMS Microbiol Rev. 2009, 33, 236-255.
Voelkerding et al., Next-generation sequencing: from basic research to diagnostics. Clin Chem. Apr. 2009;55(4):641-58.
Wickham et al., gplot2: Elegant Graphics for Data Analysis. Springer Nature, 2016. TOC only. 17 pages.
Woese et al., Towards a natural system of organisms: proposal for the domains Archaea, Bacteria, and Eucarya. Proc Natl Acad Sci U S A. Jun. 1990;87(12):4576-9.
Wood et al., Improved metagenomic analysis with Kraken 2. Genome Biol. Nov. 28, 2019;20(1):257. 13 pages.
Wood et al., Kraken: ultrafast metagenomic sequence classification using exact alignments. Genome Biol. Mar. 3, 2014;15(3):R46. 12 pages.
Wu et al., Microarray-based analysis of subnanogram quantities of microbial community DNAs by using whole-community genome amplification. Appl Environ Microbiol. Jul. 2006;72(7):4931-41.
Yue et al., A nonparametric estimator of species overlap. Biometrics. Sep. 2001;57(3):743-9.
Zhou et al., DNA recovery from soils of diverse composition. Appl Environ Microbiol. Feb. 1996;62(2):316-22.
Extended European Search Report for European Application No. 23775829.7, mailed Feb. 13, 2026, 8 pages.
Alvarez A.L., et al., "Soil Inoculations with Anabaena cylindrica Improve Aggregate Stability and Nutrient Dynamics in an Arable

(56) References Cited

OTHER PUBLICATIONS

Soil and Exhibit Potential for Erosion Control," Journal of Applied Phycology, 2021, vol. 33 (5), 17 pages.
Bharti A., et al., "Development of Nutrient-Rich Media Through Cyanobacterial Amendment and Their Characterization," Waste and Biomass Valorization, Oct. 3, 2019, vol. 11 (11), pp. 6003-6016, 14 pages.
Chamizo S., et al., "Cyanobacteria Inoculation Improves Soil Stability and Fertility on Different Textured Soils: Gaining Insights for Applicability in Soil Restoration," Frontiers in Environmental Science, Jun. 11, 2018, vol. 6, Article 49, 14 pages.
Chittora D., et al., "Cyanobacteria as a Source of Biofertilizers for Sustainable Agriculture," Biochemistry and Biophysics Reports, Feb. 13, 2020, vol. 22, 10 pages.
El-Zawawy H.A.H., "Effect of Nitrogen-Fixing Cyanobacteria on the Growth of Wheat Crop," Journal of Agricultural Chemistry and Biotechnology, Nov. 2019, vol. 10 (11), pp. 221-225.
Esch C.M., "A Native Cyanobacteria, Nostoc, as a Biofertilizer," Honors College Capstone Experience/Thesis Projects, May 16, 2014, Paper 460, 34 pages.
Haraguchi Y., et al., "Crop Cultivation Without Nitrogen Fertiliser Using Nitrogen- Fixing Cyanobacterial Extracts for Low Environmental Impact," Scientific Reports, May 26, 2025, vol. 15, 20 pages.
Jiménez-Ríos L., et al., "Emerging Nitrogen-Fixing Cyanobacteria for Sustainable Cotton Cultivation," Science of the Total Environment, 2024, vol. 924, Article 171533, 13 pages.
Kollmen J., et al., "The Beneficial Effects of Cyanobacterial Co-Culture on Plant Growth," Life, Jan. 31, 2022, vol. 12 (2), 21 pages.
Lee S.M., et al., "Algae as New Kids in the Beneficial Plant Microbiome," Frontiers in Plant Science, Feb. 4, 2021, vol. 12, Article 599742, 18 pages.
Nawaz T., et al., "Harnessing the Potential of Nitrogen-Fixing Cyanobacteria: A Rich Bio-Resource for Sustainable Soil Fertility and Enhanced Crop Productivity," Environmental Technology & Innovation, 2024, vol. 36, Article 103886, 17 pages.
Nevins C., et al., "Contrasting Effects of Agroecosystem Biocrusts on Seedling Growth and Nitrogen Accumulation in a Greenhouse Environment," Agrosystems, Geosciences & Environment, 2022, vol. 5 (3), Article e20295, 13 pages.
Nevins C.J., et al., "Biological Soil Crusts Enhance Moisture and Nutrients in the Upper Rooting Zone of Sandy Soil Agroecosystems," Journal of Plant Nutrition and Soil Science, 2020, vol. 183 (5), pp. 615-626.
Pagli C., et al., "Unlocking the Potential of Biocrust Microorganisms in Agriculture: Cyanobacteria and Heterotrophic Bacteria with Plant Growth-Promoting Properties," Frontiers in Plant Science, Sep. 24, 2025, vol. 16, Article 1659217, 17 pages.
Peng X., et al., "Cyanobacterial Soil Surface Consortia Mediate N Cycle Processes in Agroecosystems," Frontiers in Environmental Science, Jan. 4, 2019, vol. 6, 12 pages.
Solomon Kabato W., et al., "Microalgae-Based Strategies for Soil Health and Crop Productivity: Mechanisms, Challenges, and Pathways to Climate-Resilient Agriculture," Agronomy, Nov. 20, 2025, vol. 15, No. 2669, 32 pages.
Solomon W., et al., "Harnessing the Synergy of the Cyanobacteria-Plant Growth Promoting Bacteria for Improved Maize (Zea mays) Growth and Soil Health," Sustainability, Dec. 8, 2023, vol. 15 (24), Article 16660, 14 pages.
Song X., et al., "Replacing Nitrogen Fertilizer with Nitrogen-Fixing Cyanobacteria Reduced Nitrogen Leaching in Red Soil Paddy Fields," Agriculture, Ecosystems & Environment, 2021, vol. 312, Article 107320, 11 pages.
Zegeye E.K., et al., "Selection, Succession, and Stabilization of Soil Microbial Consortia," mSystems, Jul./Aug. 2019, vol. 4 (4), Article e00055-19, 13 pages.

* cited by examiner

| P# | Description | K value |
|---|---|---|
| P1903 | BW05 - Control | 0.003782 |
| P1905 | BW02 - Light colony | 0.006259 |
| P1907 | BW02 - Dark Colony | 0.002368 |
| P1909 | BW02 - Light Colony | 0.00721 |
| P1911 | BW01 - Filaments | 0.012386 |
| P1913 | BW01 - Filaments | 0.009245 |
| P1915 | BW01 - Single Colony | 0.011622 |
| P1917 | BW05 - Colony | 0.005018 |
| P1919 | BW05 - Colony | 0.00428 |
| P1921 | BW02 - Dark Colony | 0.00289 |
| P1923 | BW01 - Single Colony | 0.010228 |
| P1925 | BW01 - Control | 0.008159 |
| P1926 | BW02 - Control | 0.006744 |

FIG. 9B

| Minimal consortium | PHYLUM | CLASS | ORDER | FAMILY | GENUS |
|---|---|---|---|---|---|
| M2209 | Proteobacteria | Gammaproteobacteria | Pseudomonadales | Pseudomonadaceae | *Pseudomonas* |
| | Cyanobacteria | Cyanobacteriia | Cyanobacteriales | Nostocaceae | *Nostoc PCC-73102* |
| M2210 | Proteobacteria | Gammaproteobacteria | Burkholderiales | Comamonadaceae | *Xylophilus* |
| | Proteobacteria | Gammaproteobacteria | Burkholderiales | Oxalobacteraceae | *Undibacterium* |
| | Cyanobacteria | Cyanobacteriia | Cyanobacteriales | Nostocaceae | *Nostoc PCC-73102* |
| M2211 | Proteobacteria | Gammaproteobacteria | Burkholderiales | Comamonadaceae | *Xylophilus* |
| | Proteobacteria | Alphaproteobacteria | Sphingomonadales | Sphingomonadaceae | *Novosphingobium* |
| | Proteobacteria | Gammaproteobacteria | Pseudomonadales | Pseudomonadaceae | *Pseudomonas* |
| | Bacteroidota | Bacteroidia | Cytophagales | Hymenobacteraceae | *Hymenobacter* |
| | Planctomycetota | Phycisphaerae | Phycisphaerales | Phycisphaeraceae | *SM1A02* |
| | Cyanobacteria | Cyanobacteriia | Cyanobacteriales | Nostocaceae | *Nostoc PCC-73102* |
| | Proteobacteria | Alphaproteobacteria | Rhizobiales | Beijerinckiaceae | *Bosea* |
| | Proteobacteria | Gammaproteobacteria | Burkholderiales | Oxalobacteraceae | *Undibacterium* |
| M2215 | Proteobacteria | Gammaproteobacteria | Burkholderiales | Comamonadaceae | *Xylophilus* |
| | Cyanobacteria | Cyanobacteriia | Cyanobacteriales | Nostocaceae | *Nostoc PCC-73102* |
| M2245 | Cyanobacteria | Cyanobacteriia | Cyanobacteriales | Nostocaceae | *Nostoc PCC-73102* |
| | Proteobacteria | Gammaproteobacteria | Burkholderiales | Comamonadaceae | *Xylophilus* |
| M2246 | Proteobacteria | Gammaproteobacteria | Burkholderiales | Comamonadaceae | *Xylophilus* |
| | Cyanobacteria | Cyanobacteriia | Cyanobacteriales | Nostocaceae | *Nostoc PCC-73102* |
| M2247 | Proteobacteria | Alphaproteobacteria | Sphingomonadales | Sphingomonadaceae | *Novosphingobium* |
| | Proteobacteria | Gammaproteobacteria | Burkholderiales | Comamonadaceae | *Xylophilus* |
| | Proteobacteria | Alphaproteobacteria | Rhizobiales | Rhizobiaceae | *Shinella* |
| | Bacteroidota | Bacteroidia | Cytophagales | Hymenobacteraceae | *Hymenobacter* |
| | Proteobacteria | Gammaproteobacteria | Burkholderiales | Oxalobacteraceae | *Undibacterium* |
| | Cyanobacteria | Cyanobacteriia | Cyanobacteriales | Nostocaceae | *Nostoc PCC-73102* |
| M2251 | Proteobacteria | Gammaproteobacteria | Burkholderiales | Comamonadaceae | *Xylophilus* |
| | Cyanobacteria | Cyanobacteriia | Cyanobacteriales | Nostocaceae | *Nostoc PCC-73102* |

FIG. 25

| Minimal consortium | PHYLUM | CLASS | ORDER | FAMILY | GENUS |
|---|---|---|---|---|---|
| M2206 | Cyanobacteria | Cyanobacteriia | Cyanobacteriales | Nostocaceae | *Tolypothrix* |
| | Proteobacteria | Gammaproteobacteria | Pseudomonadales | Pseudomonadaceae | *Pseudomonas* |
| M2207 | Cyanobacteria | Cyanobacteriia | Cyanobacteriales | Nostocaceae | *Desmonostoc PCC-6302* |
| | Proteobacteria | Gammaproteobacteria | Pseudomonadales | Pseudomonadaceae | *Pseudomonas* |
| M2208 | Proteobacteria | Alphaproteobacteria | Rhizobiales | Rhizobiaceae | *Allorhizobium-Neorhizobium-Pararhizobium-Rhizobium* |
| | Proteobacteria | Alphaproteobacteria | Rhizobiales | Xanthobacteraceae | *Ancylobacter* |
| | Cyanobacteria | Cyanobacteriia | Cyanobacteriales | Nostocaceae | *Tolypothrix* |
| | Proteobacteria | Gammaproteobacteria | Burkholderiales | Burkholderiaceae | *Cupriavidus* |
| M2214 | Cyanobacteria | Cyanobacteriia | Cyanobacteriales | Nostocaceae | *Desmonostoc PCC-6302* |
| M2242 | Proteobacteria | Gammaproteobacteria | Pseudomonadales | Pseudomonadaceae | *Pseudomonas* |
| | Cyanobacteria | Cyanobacteriia | Cyanobacteriales | Nostocaceae | *Tolypothrix* |
| M2243 | Cyanobacteria | Cyanobacteriia | Cyanobacteriales | Nostocaceae | *Desmonostoc PCC-6302* |
| | Proteobacteria | Gammaproteobacteria | Pseudomonadales | Pseudomonadaceae | *Pseudomonas* |
| M2244 | Proteobacteria | Gammaproteobacteria | Burkholderiales | Burkholderiaceae | *Cupriavidus* |
| | Proteobacteria | Alphaproteobacteria | Rhizobiales | Rhizobiaceae | *Allorhizobium-Neorhizobium-Pararhizobium-Rhizobium* |
| | Cyanobacteria | Cyanobacteriia | Cyanobacteriales | Nostocaceae | *Tolypothrix* |
| | Proteobacteria | Alphaproteobacteria | Rhizobiales | Xanthobacteraceae | *Ancylobacter* |
| | Proteobacteria | Alphaproteobacteria | Rhizobiales | Xanthobacteraceae | *Bradyrhizobium* |
| M2250 | Cyanobacteria | Cyanobacteriia | Cyanobacteriales | Nostocaceae | *Desmonostoc PCC-6302* |

FIG. 26

| Minimal consortium | PHYLUM | CLASS | ORDER | FAMILY | GENUS |
|---|---|---|---|---|---|
| M2212 | Cyanobacteria | Cyanobacteriia | Cyanobacteriales | Nostocaceae | *Desmonostoc PCC-7422* |
| | Proteobacteria | Alphaproteobacteria | Rhizobiales | Beijerinckiaceae | *Bosea* |
| | Proteobacteria | Alphaproteobacteria | Caulobacterales | Caulobacteraceae | *Caulobacter* |
| M2213 | Proteobacteria | Alphaproteobacteria | Rhizobiales | Beijerinckiaceae | *Bosea* |
| | Cyanobacteria | Cyanobacteriia | Cyanobacteriales | Nostocaceae | *Desmonostoc PCC-7422* |
| | Proteobacteria | Alphaproteobacteria | Caulobacterales | Caulobacteraceae | *Caulobacter* |
| | Proteobacteria | Alphaproteobacteria | Sphingomonadales | Sphingomonadaceae | *Sphingopyxis* |
| | Proteobacteria | Gammaproteobacteria | Pseudomonadales | Pseudomonadaceae | *Pseudomonas* |
| M2248 | Proteobacteria | Alphaproteobacteria | Rhizobiales | Beijerinckiaceae | *Bosea* |
| | Proteobacteria | Alphaproteobacteria | Caulobacterales | Caulobacteraceae | *Caulobacter* |
| | Cyanobacteria | Cyanobacteriia | Cyanobacteriales | Nostocaceae | *Desmonostoc PCC-7422* |
| M2249 | Proteobacteria | Alphaproteobacteria | Rhizobiales | Beijerinckiaceae | *Bosea* |
| | Proteobacteria | Alphaproteobacteria | Caulobacterales | Caulobacteraceae | *Caulobacter* |
| | Cyanobacteria | Cyanobacteriia | Cyanobacteriales | Nostocaceae | *Desmonostoc PCC-7422* |
| | Proteobacteria | Alphaproteobacteria | Rhizobiales | Beijerinckiaceae | *Methylobacterium-Methylorubrum* |
| | Proteobacteria | Alphaproteobacteria | Sphingomonadales | Sphingomonadaceae | *Sphingopyxis* |
| | Proteobacteria | Gammaproteobacteria | Pseudomonadales | Pseudomonadaceae | *Pseudomonas* |

FIG. 27

| Minimal consortium | PHYLUM | CLASS | ORDER | FAMILY | GENUS |
|---|---|---|---|---|---|
| M2527 | Cyanobacteria | Cyanophyceae | Nostocales | Nostocaceae | *Nostoc* |
| | Pseudomonadota | Alphaproteobacteria | | | |
| | Pseudomonadota | Gammaproteobacteria | Xanthomonadales | Rhodanobacteraceae | *Tahibacter* |
| | Pseudomonadota | Alphaproteobacteria | Hyphomicrobiales | Hyphomicrobiales incertae sedis | |
| | Cyanobacteriota | Cyanophyceae | Nostocales | Nostocaceae | *Nostoc* |
| M2529 | Cyanobacteriota | Melainabacteria group | Cyanobacteriota | Cyanophyceae | *Nostocales* |
| | Pseudomonadota | Alphaproteobacteria | Caulobacterales | Caulobacteraceae | |
| | Bacillota | Bacilli | Bacillales | Bacillaceae | |
| | Bacillota | Bacilli | Bacillales | Paenibacillaceae | |
| | Cyanobacteriota | Melainabacteria group | Cyanobacteriota | Cyanophyceae | *Nostocales* |
| | Pseudomonadota | Alphaproteobacteria | Caulobacterales | Caulobacteraceae | *Brevundim* |
| M2530 | Pseudomonadota | Alphaproteobacteria | Hyphomicrobiales | Rhizobiaceae | |
| | Cyanobacteriota | Cyanophyceae | Nostocales | Nostocaceae | *Nostoc* |
| | Verrucomicrobiota | Opitutae | Opitutales | Opitutaceae | *Opitutus* |
| | Bacteroidota | Cytophagia | Cytophagales | Spirosomaceae | *Runella* |
| | Pseudomonadota | Alphaproteobacteria | Hyphomicrobiales | Rhizobiaceae | |
| | Pseudomonadota | Alphaproteobacteria | Rhodobacterales | Paracoccaceae | *Polymorphum* |
| | Bacteroidota | Cytophagia | Cytophagales | Spirosomaceae | *Runella* |
| | Pseudomonadota | Betaproteobacteria | | | |
| | Pseudomonadota | Betaproteobacteria | Burkholderiales | Alcaligenaceae | *Taylorella* |
| M2531 | Cyanobacteria | Cyanophyceae | Nostocales | Nostocaceae | *Nostoc* |
| | Pseudomonadota | Gammaproteobacteria | | | |
| | Pseudomonadota | Gammaproteobacteria | Xanthomonadales | Rhodanobacteraceae | *Tahibacter* |
| | Pseudomonadota | Alphaproteobacteria | Hyphomicrobiales | Nitrobacteraceae | *Afipia* |
| | Cyanobacteriota | Cyanophyceae | Nostocales | Nostocaceae | *Nostoc* |

FIG. 28A

| | | | | | |
|---|---|---|---|---|---|
| M2533 | Pseudomonadota | Alphaproteobacteria | | | |
| | Pseudomonadota | Betaproteobacteria | Burkholderiales | Comamonadaceae | *Polaromonas* |
| | Cyanobacteria | Cyanophyceae | Nostocales | Nostocaceae | *Nostoc* |
| | Bacteroidota | Chitinophagia | Chitinophagales | Chitinophagaceae | *Chitinophaga* |
| | Pseudomonadota | Alphaproteobacteria | Sphingomonadales | Erythrobacteraceae | *Erythrobacter* |
| | Pseudomonadota | Alphaproteobacteria | Sphingomonadales | Erythrobacteraceae | *Erythrobacter* |
| | Pseudomonadota | Alphaproteobacteria | Hyphomicrobiales | Enhydrobacter | |
| | Pseudomonadota | Alphaproteobacteria | Rhodobacterales | Paracoccaceae | *Polymorphum* |
| | Pseudomonadota | Alphaproteobacteria | Sphingomonadales | Erythrobacteraceae | *Erythrobacter* |
| | Cyanobacteria | Cyanophyceae | Nostocales | Nostocaceae | *Nostoc* |
| | Bacteroidota | Chitinophagia | Chitinophagales | Chitinophagaceae | *Ferruginibacter* |
| M2535 | Cyanobacteria | Cyanophyceae | Nostocales | Nostocaceae | *Nostoc* |
| | Pseudomonadota | Betaproteobacteria | Burkholderiales | Comamonadaceae | *Ramlibacter* |
| | Cyanobacteriota | Cyanophyceae | Nostocales | Nostocaceae | *Nostoc* |

FIG. 28B

MICROBIAL CONSORTIA FOR SOIL IMPROVEMENT

STATEMENT REGARDING FEDERALLY SPONSORED RESEARCH OR DEVELOPMENT

This invention was made with government support under P30 CA91842 and UL1TR002345 awarded by the National Institutes of Health. The government has certain rights in the invention.

SEQUENCE LISTING

The text of the computer readable sequence listing filed herewith, titled "PLUTON_40093_202_SequenceListing", created Sep. 22, 2023, having a file size of 319,907 bytes, is hereby incorporated by reference in its entirety.

FIELD

Provided herein is technology relating to functional microbial consortia and particularly, but not exclusively, to methods and systems for producing a microbial consortium possessing a desired function and microbial consortia produced according to such methods.

BACKGROUND

Agricultural practices often include methods for improving soil to maintain or to increase crop yields. In particular, plant nutrients (e.g., carbon (C), nitrogen (N), phosphorus (P), and other nutrients) are often provided to soil in the form of chemical or biological soil amendments. Chemical amendments include fertilizers comprising ammonia to provide fixed nitrogen and mined phosphate to provide phosphorous. In addition, farmers often plant cover crops to return nitrogen, carbon, and other nutrients to soil. While growing, microbial symbionts of cover crops fix nitrogen that is released to the soil, and termination and tillage of the cover crop returns organic carbon and other nutrients to the soil. Higher soil carbon is associated with better nutrient and water retention, generally leading to healthier soil and increased crop production. Increasingly since the dawn of agriculture, much of the soil carbon worldwide has been released to the atmosphere as a result of tillage disrupting the soil and promoting breakdown of carbonaceous materials by microbes. Returning carbon to the soil would both benefit soil health and remove greenhouse gases from the atmosphere.

With respect to nitrogen, approximately ⅓ of the nitrogen fixed for agricultural use is produced by biological nitrogen fixation (BNF) using cover crops or crop rotation with legumes and the remaining ⅔ is applied in chemical forms as ammonia produced by the Haber-Bosch process. In the Haber-Bosch process, $N_2$ from the air is reacted with $H_2$ that is primarily derived from methane in natural gas to generate $NH_3$ (ammonia). While the Haber-Bosch process has been successful in fixing nitrogen for agricultural use, the process consumes up to 5% of the natural gas produced worldwide each year as both a source of hydrogen and of energy. As a consequence, the Haber-Bosch process is a primary source of the greenhouse gas $CO_2$. Further, the inorganic N applied to soil as ammonia or ammonium nitrate is easily converted to nitrogen oxides (NOx) in a process called denitrification. Nitrogen oxides, specifically $N_{20}$, are hundreds of times more potent as greenhouse gases than $CO_2$. Consequently, chemical fertilizers result in substantial waste of nitrogen and their production is associated with the production of massive amounts of greenhouse gases and climate impacts. Plants provide nitrogen to soil by biological nitrogen fixation that is performed by specific microbes associated with specific plants. However, growing some types of plants is not possible or feasible for all fields, soil types, and locations. For example, while soybean plants fix significant nitrogen using microbe-colonized root nodules, maize has far more limited interactions with rhizosphere diazotrophs (nitrogen-fixing microbes) and requires significant fertilizer applications to grow economically.

SUMMARY

Accordingly, in some embodiments, the technology provided herein relates to using microbial consortia to fix carbon and nitrogen and to deliver the carbon and nitrogen, along with phosphorus and other essential nutrients, to the soil (or other plant growth media). In some embodiments, the technology provides nutrients to soil with a much lower greenhouse gas impact than other current agricultural practices.

In some embodiments, the technology provides a microbial soil amendment (e.g., comprising a microbial consortium) that delivers carbon (C) and nitrogen (N) to a growth medium for plants (e.g., soil or synthetic growth medium). In some embodiments, the microbial soil amendment further delivers other nutrients (e.g., phosphorus) to the growth medium for plants (e.g., soil or synthetic growth medium).

In particular, the technology described herein provides a biological fertilizer comprising microbial consortia, and methods of producing the biological fertilizer and/or the microbial consortia, that is optimized for efficiently delivering one or more of N, C, P, and/or other necessary nutrients to soil. In some embodiments, the technology provides a microbial consortium that is grown in a bioreactor and applied to a field. In some embodiments, the microbial consortium provides a source of, e.g., one or more of fixed nitrogen, organic carbon, phosphorus, and other nutrients. In some embodiments, the microbial consortium continues to grow after application to the soil and provides carbon and nitrogen for the soil after application to the soil. Thus, in some embodiments, the microbial consortia remove carbon and/or nitrogen from the air through fixation driven by photosynthesis. Accordingly, embodiments of the technology provide an efficient source of biological nitrogen fixation that can replace the $CO_2$-producing Haber-Bosch process. Further, embodiments of the technology remove carbon from the air and deposit it in soils, thereby improving soil quality while reducing atmospheric greenhouse gases. In some embodiments, the technology provides a biologically available source of phosphorus and other nutrients in the soil for plant growth.

In some embodiments, the technology provides a microbial consortium providing particular functions. In some embodiments, the technology described herein comprises providing a sample comprising a number of microbes (e.g., from one or more environmental samples) and/or microbial consortia (e.g., comprising one or more microbes from a natural consortium and/or one or more microbes from different environments, ecosystems, habitats, and/or ecological niches) and produces a new consortium comprising new combinations of microbes acting in concert. By testing for functional variables, microbes and microbial consortia providing the desired functions are sequenced and sub-cultured until the desired microbes and microbial consortia are identified and/or isolated. In some embodiments, machine learning models are developed using a statistically significant amount of data to assist with the selection of microbes and microbial consortia. In some embodiments, the machine learning model is supplemented with phenotype data for the constituent microbes.

As described herein, embodiments of the technology (e.g., methods of producing a microbial consortium) comprise evaluating or confirming the functions of the cultures and/or consortia (e.g., by evaluating variables under test) rather than focusing on the phenotypes of the microbes. In some embodiments, functions may include measures of carbon sequestration, nitrogen fixation, survival time, and/or persistence of microbes.

Accordingly, the technology provides a method of accumulating carbon and nitrogen in an agricultural medium. For example, in some embodiments, methods comprise applying to an agricultural medium a composition comprising a photosynthetic and nitrogen-fixing microbe; and incubating the agricultural medium in the presence nitrogen gas ($N_2$) and carbon dioxide ($CO_2$) and with illumination by a light source. In some embodiments, the agricultural medium comprises a soil, a greenhouse growth medium, or a hydroponic growth medium. In some embodiments, the photosynthetic and nitrogen-fixing microbe is a bacterium. In some embodiments, the photosynthetic and nitrogen-fixing microbe is a member of the cyanobacteria. In some embodiments, the photosynthetic and nitrogen-fixing microbe is a member of the order Cyanobacteriales, Cyanobacteriota, Nostocales, Pseudoanabaenales, Spirulinales, or Oscillatoriales. In some embodiments, the photosynthetic and nitrogen-fixing microbe is a member a genus that is *Acaryochloris, Aliinostoc, Aliterella, Amazonocrinis, Anabaena, Anabaenopsis, Aphanizomenon, Atlanticothrix, Aulosira, Calenema, Calothrix, Camptylonemopsis, Chlorogloeopsis, Chroococcidiopsis, Chrysosporum, Compactonostoc, Constrictifilum, Crocosphaera, Cyanobacterium, Cyanocohniella, Cylindrospermopsis, Cylindrospermum, Dendronalium, Desikacharya, Desmonostoc, Dolichospermum, Erythrobacter, Fischerella, Fortiea, Fremyella, Geitlerinema, Gloeocapsa, Gloeocapsopsis, Gloeothece, Gloeotrichia, Goleter, Hapalosiphon, Hydrocoryne, Jaaginema, Johanseniella, Kamptonema, Komarekiella, Leptolyngbya, Lyngbya, Macrochaete, Mastigocoleus, Microchaete, Nodosilinea, Nodularia, Nostoc, Nostocaceae, Nostochopsis, Oligotropha, Oscillatoria, Pantanalinema, Pelatocladus, Planktothrichoides, Planktothrix, Polymorphum, Porphyrobacter, Prochlorococcus, Prochlorothrix, Pseudanabaena, Pseudoalinostoc, Raphidiopsis, Richelia, Rivularia, Roholtiella, Rubidibacter, Scytonema, Spirulina, Synechococcus, Synechocystis, Thermosynechococcus, Tolypothrix, Trichormus, Violetonostoc, Wollea*, or *Xenococcus*. In some embodiments, the photosynthetic and nitrogen-fixing microbe is a *Nostoc* species. In some embodiments, the photosynthetic and nitrogen-fixing microbe has a ribosomal RNA gene nucleotide sequence that is at least 90%, 95%, 97%, or 99% identical to at least one of SEQ ID NO: 1, 3, 7, 10, 13, 19, 22, 26, 30, 32, 34, 35, 39, 42, 45, 51, 54, 57, 61, 63, 66, 70, 74, 84, 89, 99, 103, 108, 116, 122, 123, 125, or 127.

In some embodiments, the agricultural medium and said composition together comprise a first microbial mass; and said incubating is performed until a second microbial mass is produced that is at least two times greater than the first microbial mass. In some embodiments, the agricultural medium comprises a first microbial mass; and said incubating is performed until a second microbial mass is produced that is at least two times greater than the first microbial mass.

In some embodiments, the composition further comprises a microbe capable of metabolizing carbon-containing and nitrogen-containing compounds produced by the photosynthetic and nitrogen-fixing microbe. In some embodiments, the composition comprises a consortium comprising said photosynthetic and nitrogen-fixing microbe. In some embodiments, the composition comprises a consortium comprising said photosynthetic and nitrogen-fixing microbe; and a first microbe capable of metabolizing carbon-containing compounds produced by the photosynthetic and nitrogen-fixing microbe and/or capable of metabolizing nitrogen-containing compounds produced by the photosynthetic and nitrogen-fixing microbe. In some embodiments, the consortium comprises a second microbe capable of metabolizing carbon-containing compounds produced by the photosynthetic and nitrogen-fixing microbe and/or capable of metabolizing nitrogen-containing compounds produced by the photosynthetic and nitrogen-fixing microbe. In some embodiments, the consortium comprises a second microbe capable of metabolizing carbon-containing compounds produced by the first microbe and/or capable of metabolizing nitrogen-containing compounds produced by the first microbe. In some embodiments, the consortium comprises a second microbe and said first microbe is capable of metabolizing carbon-containing compounds produced by the second microbe and/or capable of metabolizing nitrogen-containing compounds produced by the second microbe. In some embodiments, the consortium produces a durable carbon compound that provides a carbon sink in soil. In some embodiments, the consortium produces melanin. In some embodiments, the consortium produces pheomelanin, eumelanin, and/or pyomelanin.

In some embodiments, the consortium comprises a second photosynthetic microbe. In some embodiments, the second photosynthetic microbe is a bacterium. In some embodiments, the second photosynthetic microbe is an alga. In some embodiments, the second photosynthetic microbe is a bacterium that is a member of a genus that is *Nodularia, Chrysosporum, Gloeocapsopsis, Richelia, Mastigocoleus, Hapalosiphon, Gloeothece, Acaryochloris, Kamptonema, Raphidiopsis, Crocosphaera, Macrochaete, Thermosynechococcus, Pseudanabaena, Chroococcidiopsis, Prochlorothrix, Anabaena, Leptolyngbya, Calothrix, Cylindrospermopsis, Dolichospermum, Scytonema, Lyngbya, Tolypothrix, Fischerella, Fortiea, Aliterella, Hydrocoryne, Prochlorococcus, Planktothrichoides, Geitlerinema, Xenococcus, Jaaginema, Nostochopsis, Pantanalinema, Oscillatoria, Spirulina, Pelatocladus, Nodosilinea, Aphanizomenon, Chlorogloeopsis, Gloeocapsa, Calenema, Rivularia, Trichormus, Synechococcus, Synechocystis, Cylindrospermum, Planktothrix, Bosea, Shinella, Novosphingobium*, or *Rubidibacter*.

In some embodiments, the alga is a member of a genus that is *Tetraselmis, Chlorella, Coleochaete, Gonium, Paradoxia, Cymbomonas, Palmaria, Characiochloris, Marvania, Chlamydomonas, Parachlorella, Coccomyxa, Trebouxia, Cyanidium, Treubaria, Dangeardinia, Galdieria, Nyholmiella, Porphyra, Chara, Ankistrodesmus, Picochlorum, Cyanophora, Chondrus, Pseudochloris, Interfilum, Gelhdium, Symphyogyna, Chlorosarcina*, or *Cyanothece*. In some embodiments, the consortium comprises a second nitrogen-fixing microbe.

In some embodiments, the consortium further comprises an organism from genus *Variovorax*, an organism of phylum Proteobacteria, an organism from the genus *Bosea*, an organism from the genus *Caulobacter*, and/or an organism of genus *Pseudomonas*.

In some embodiments, the light source provides light having wavelengths from approximately 380 nm to 750 nm. In some embodiments, the light source is an artificial light source.

In some embodiments, the technology further provides a method of accumulating carbon and nitrogen in an agricultural medium, said method comprising applying to an agricultural medium a composition comprising a photosynthetic microbe and a nitrogen-fixing microbe; and incubating the agricultural medium in the presence nitrogen gas ($N_2$) and carbon dioxide ($CO_2$) and with illumination by a light source. In some embodiments, the agricultural medium comprises a soil, a greenhouse growth medium, or a hydroponic growth medium. In some embodiments, the photosynthetic microbe is an alga. In some embodiments, the photosynthetic microbe is a bacterium. In some embodiments, the nitrogen-fixing microbe is a bacterium.

In some embodiments, the agricultural medium and said composition together comprise a first microbial mass; and said incubating is performed until a second microbial mass is produced that is at least two times greater than the first microbial mass. In some embodiments, the agricultural medium comprises a first microbial mass; and said incubating is performed until a second microbial mass is produced that is at least two times greater than the first microbial mass. In some embodiments, the alga is a member of a genus that is *Tetraselmis, Chlorella, Coleochaete, Gonium, Paradoxia, Cymbomonas, Palmaria, Characiochloris, Marvania, Chlamydomonas, Parachlorella, Coccomyxa, Trebouxia, Cyanidium, Treubaria, Dangeardinia, Galdieria, Nyholmiella, Porphyra, Chara, Ankistrodesmus, Picochlorum, Cyanophora, Chondrus, Pseudochloris, Interfilum, Gelidium, Symphyogyna, Chlorosarcina*, or *Cyanothece*.

In some embodiments, the bacterium is a member of a genus that is *Nodularia, Chrysosporum, Gloeocapsopsis, Richelia, Mastigocoleus, Hapalosiphon, Gloeothece, Acaryochloris, Kamptonema, Raphidiopsis, Crocosphaera, Macrochaete, Thermosynechococcus, Pseudanabaena, Chroococcidiopsis, Prochlorothrix, Anabaena, Leptolyngbya, Calothrix, Cylindrospermopsis, Dolichospermum, Scytonema, Lyngbya, Tolypothrix, Fischerella, Fortiea, Aliterella, Hydrocoryne, Prochlorococcus, Planktothrichoides, Geitlerinema, Xenococcus, Jaaginema, Nostochopsis, Pantanalinema, Oscillatoria, Spirulina, Pelatocladus, Nodosilinea, Aphanizomenon, Chlorogloeopsis, Gloeocapsa, Calenema, Rivularia, Trichormus, Synechococcus, Synechocystis, Cylindrospermum, Planktothrix, Bosea, Shinella, Novosphingobium*, or *Rubidibacter*.

In some embodiments, the bacterium is a member of a genus *Aliinostoc, Amazonocrinis, Anabaena, Anabaenopsis, Atlanticothrix, Aulosira, Calothrix, Camptylonemopsis, Chrysosporum, Compactonostoc, Constrictifilum, Cyanobacterium, Cyanocohniella, Cylindrospermum, Dendronalium, Desikacharya, Desmonostoc, Dolichospermum, Erythrobacter, Fortiea, Fremyella, Geitlerinema, Gloeotrichia, Goleter, Johanseniella, Komarekiella, Microchaete, Nodularia, Nostoc, Nostocaceae, Oligotropha Polymorphum, Porphyrobacter, Pseudoaliinostoc, Roholtiella, Scytonema, Tolypothrix, Trichormus, Violetonostoc*, or *Wollea*.

In some embodiments, the bacterium is a member of a genus that is *Acaryochloris, Aliinostoc, Aliterella, Amazonocrinis, Anabaena, Anabaenopsis, Aphanizomenon, Atlanticothrix, Aulosira, Calenema, Calothrix, Camptylonemopsis, Chlorogloeopsis, Chroococcidiopsis, Chrysosporum, Compactonostoc, Constrictifilum, Crocosphaera, Cyanobacterium, Cyanocohniella, Cylindrospermopsis, Cylindrospermum, Dendronalium, Desikacharya, Desmonostoc, Dolichospermum, Fischerella, Fortiea, Fremyella, Geitlerinema, Gloeocapsa, Gloeocapsopsis, Gloeothece, Gloeotrichia, Goleter, Hapalosiphon, Hydrocoryne, Jaaginema, Johanseniella, Kamptonema, Komarekiella, Leptolyngbya, Lyngbya, Macrochaete, Mastigocoleus, Microchaete, Nodosilinea, Nodularia, Nostoc, Nostocaceae, Nostochopsis, Oscillatoria, Pantanalinema, Pelatocladus, Planktothrichoides, Planktothrix, Prochlorococcus, Prochlorothrix, Pseudanabaena, Pseudoaliinostoc, Raphidiopsis, Richelia, Rivularia, Roholtiella, Rubidibacter, Scytonema, Spirulina, Synechococcus, Synechocystis, Thermosynechococcus, Tolypothrix, Trichormus, Voletonostoc, Wollea*, or *Xenococcus*. In some embodiments, the bacterium has a ribosomal RNA gene nucleotide sequence that is at least 90%, 95%, 97%, or 99% identical to at least one of SEQ ID NO: 1, 3, 7, 10, 13, 19, 22, 26, 30, 32, 34, 35, 39, 42, 45, 51, 54, 57, 61, 63, 66, 70, 74, 84, 89, 99, 103, 108, 116, 122, 123, 125, or 127.

In some embodiments, the composition further comprises a microbe capable of metabolizing carbon-containing and nitrogen-containing compounds produced by the photosynthetic microbe and by the nitrogen-fixing microbe. In some embodiments, the composition comprises a consortium comprising said photosynthetic microbe and said nitrogen-fixing microbe. In some embodiments, the composition comprises a consortium comprising said photosynthetic microbe and said nitrogen-fixing microbe; and a first microbe capable of metabolizing carbon-containing compounds produced by the photosynthetic microbe and by the nitrogen-fixing microbe and/or capable of metabolizing nitrogen-containing compounds produced by the photosynthetic microbe and by the nitrogen-fixing microbe. In some embodiments, the consortium comprises a second microbe capable of metabolizing carbon-containing compounds produced by the photosynthetic microbe and by the nitrogen-fixing microbe and/or capable of metabolizing nitrogen-containing compounds produced by the photosynthetic microbe and by the nitrogen-fixing microbe. In some embodiments, the consortium comprises a second microbe capable of metabolizing carbon-containing compounds produced by the first microbe and/or capable of metabolizing nitrogen-containing compounds produced by the first microbe. In some embodiments, the consortium comprises a second microbe and said first microbe is capable of metabolizing carbon-containing compounds produced by the second microbe and/or capable of metabolizing nitrogen-containing compounds produced by the second microbe. In some embodiments, the consortium produces a durable carbon compound that provides a carbon sink in soil. In some embodiments, the consortium produces melanin. In some embodiments, the consortium produces pheomelanin, eumelanin, and/or pyomelanin.

In some embodiments, the consortium further comprises an organism from genus *Variovorax*, an organism of phylum Proteobacteria, an organism from the genus *Bosea*, an organism from the genus *Caulobacter*, and/or an organism of genus *Pseudomonas*.

In some embodiments, the light source provides light having wavelengths from approximately 380 nm to 750 nm. In some embodiments, the light source is an artificial light source. In some embodiments, the light source is the sun.

Further, in some embodiments, the technology provides a method of producing a microbial consortium, said method comprising providing a water-based, fixed carbon-free, and fixed nitrogen-free medium; inoculating said medium with a sample comprising microbes to produce an inoculated medium; and exposing said inoculated medium to gas comprising $N_2$ and $CO_2$ and to light. In some embodiments, the light comprises wavelengths from approximately 380 nm to 750 nm. In some embodiments, the gas comprising $N_2$ and $CO_2$ is air. In some embodiments, the gas comprising $N_2$ and $CO_2$ is provided by purified $N_2$ and $CO_2$. In some embodiments, the inoculated medium comprises a first microbial mass; and said exposing is performed until a second microbial mass is produced that is at least two times greater than the first microbial mass. In some embodiments, the consortium produces a durable carbon compound that provides a carbon sink in soil. In some embodiments, the consortium produces melanin. In some embodiments, the consortium produces pheomelanin, eumelanin, and/or pyomelanin. In some embodiments, the consortium comprises a microbe having a ribosomal RNA gene nucleotide sequence that is at least 90%, 95%, 97%, or 99% identical to one or more of SEQ ID NO: 1, 3, 7, 10, 13, 19, 22, 26, 30, 32, 34, 35, 39, 42, 45, 51, 54, 57, 61, 63, 66, 70, 74, 84, 89, 99, 103, 108, 116, 122, 123, 125, or 127.

In some embodiments, the technology provides a composition comprising a microbial consortium, said microbial consortium comprising a photosynthetic and nitrogen-fixing microbe or comprising a photosynthetic microbe and a nitrogen-fixing microbe; and a microbe capable of metabolizing carbon-containing and nitrogen-containing compounds produced by the photosynthetic and nitrogen-fixing microbe. In some embodiments, the photosynthetic and nitrogen-fixing microbe is a bacterium. In some embodiments, the photosynthetic and nitrogen-fixing microbe is a member of the cyanobacteria. In some embodiments, the photosynthetic and nitrogen-fixing microbe is a member of the order Cyanobacteriales, Cyanobacteriota, Nostocales, Pseudoanabaenales, Spirulinales, or Oscillatoriales. In some embodiments, the photosynthetic and nitrogen-fixing microbe is a member of the order Nostocales. In some embodiments, the photosynthetic and nitrogen-fixing microbe is a member of the genus *Acaryochloris, Aliinostoc, Aliterella, Amazonocrinis, Anabaena, Anabaenopsis, Aphanizomenon, Atlanticothrix, Aulosira, Calenema, Calothrix, Camptylonemopsis, Chlorogloeopsis, Chroococcidiopsis, Chrysosporum, Compactonostoc, Constrictifilum, Crocosphaera, Cyanobacterium, Cyanocohniella, Cylindrospermopsis, Cylindrospermum, Dendronalium, Desikacharya, Desmonostoc, Dolichospermum, Erythrobacter, Fischerella, Fortiea, Fremyella, Geitlerinema, Gloeocapsa, Gloeocapsopsis, Gloeothece, Gloeotrichia, Goleter, Hapalosiphon, Hydrocoryne, Jaaginema, Johanseniella, Kamptonema, Komarekiella, Leptolyngbya, Lyngbya, Macrochaete, Mastigocoleus, Microchaete, Nodosiinea, Nodularia, Nostoc, Nostocaceae, Nostochopsis, Oligotropha, Oscillatoria, Pantanalinema, Pelatocladus, Planktothrichoides, Planktothrix, Polymorphum, Porphyrobacter, Prochlorococcus, Prochlorothrix, Pseudanabaena, Pseudoalinostoc, Raphidiopsis, Richelia, Rivularia, Roholtiella, Rubidibacter, Scytonema, Spirulina, Synechococcus, Synechocystis, Thermosynechococcus, Tolypothrix, Trichormus, Violetonostoc, Wollea*, or *Xenococcus*. In some embodiments, the photosynthetic and nitrogen-fixing microbe is a *Nostoc* species. In some embodiments, the photosynthetic and nitrogen-fixing microbe has a ribosomal RNA gene nucleotide sequence that is at least 90%, 95%, 97%, or 99% identical to one or more of SEQ ID NO: 1, 3, 7, 10, 13, 19, 22, 26, 30, 32, 34, 35, 39, 42, 45, 51, 54, 57, 61, 63, 66, 70, 74, 84, 89, 99, 103, 108, 116, 122, 123, 125, or 127.

In some embodiments, the species that performs nitrogen fixation is a microbe from a genus that is *Variovorax, Pseudomonas, Cupriavidus, Brevundimonas, Opitutus, Runella, Taylorella, Tahibacter, Polaromonas, Chitinophaga, Ferruginibacter, Enhydrobacter, Hymenobacter*, or *Ramlibacter*. In some embodiments, the species that performs photosynthesis is a microbe from a genus that is *Bosea, Shinella*, or *Novosphingobium.*

In some embodiments, the consortium produces a durable carbon compound that provides a carbon sink in soil. In some embodiments, the consortium produces melanin. In some embodiments, the consortium produces pheomelanin, eumelanin, and/or pyomelanin.

In some embodiments, the composition comprises a second microbe capable of metabolizing carbon-containing compounds produced by the photosynthetic and nitrogen-fixing microbe and/or capable of metabolizing nitrogen-containing compounds produced by the photosynthetic and nitrogen-fixing microbe. In some embodiments, the consortium comprises a second microbe capable of metabolizing carbon-containing compounds produced by the first microbe and/or capable of metabolizing nitrogen-containing compounds produced by the first microbe. In some embodiments, the consortium comprises a second microbe and said first microbe is capable of metabolizing carbon-containing compounds produced by the second microbe and/or capable of metabolizing nitrogen-containing compounds produced by the second microbe.

In some embodiments, the consortium comprises a second photosynthetic microbe.

In some embodiments, the second photosynthetic microbe is a bacterium. In some embodiments, the second photosynthetic microbe is an alga. In some embodiments, the photosynthetic bacterium is a member of a genus that is *Acaryochloris, Aliinostoc, Aliterella, Amazonocrinis, Anabaena, Anabaenopsis, Aphanizomenon, Atlanticothrix, Aulosira, Calenema, Calothrix, Camptylonemopsis, Chlorogloeopsis, Chroococcidiopsis, Chrysosporum, Compactonostoc, Constrictifilum, Crocosphaera, Cyanobacterium, Cyanocohniella, Cylindrospermopsis, Cylindrospermum, Dendronalium, Desikacharya, Desmonostoc, Dolichospermum, Fischerella, Fortiea, Fremyella, Geitlerinema, Gloeocapsa, Gloeocapsopsis, Gloeothece, Gloeotrichia, Goleter, Hapalosiphon, Hydrocoryne, Jaaginema, Johanseniella, Kamptonema, Komarekiella, Leptolyngbya, Lyngbya, Macrochaete, Mastigocoleus, Microchaete, Nodosilinea, Nodularia, Nostoc, Nostocaceae, Nostochopsis, Oscillatoria, Pantanalinema, Pelatocladus, Planktothrichoides, Planktothrix, Prochlorococcus, Prochlorothrix, Pseudanabaena, Pseudoalinostoc, Raphidiopsis, Richelia, Rivularia, Roholtiella, Rubidibacter, Scytonema, Spirulina, Synechococcus, Synechocystis, Thermosynechococcus, Tolypothrix, Trichormus, Violetonostoc, Wollea, Bosea, Shinella, Novosphingobium*, or *Xenococcus*. In some embodiments, the alga is a member of a genus that is *Tetraselmis, Chlorella, Coleochaete, Gonium, Paradoxia, Cymbomonas, Palmaria, Characiochloris, Marvania, Chlamydomonas, Parachlorella, Coccomyxa, Trebouxia, Cyanidium, Treubaria, Dangeardinia, Galdieria, Nyholmiella, Porphyra, Chara, Ankistrodesmus, Picochlorum, Cyanophora, Chondrus, Pseudochloris, Interfilum, Gelidium, Symphyogyna, Chlorosarcina*, or *Cyanothece*. In some embodiments, the consortium comprises a second nitrogen-fixing microbe that is from a genus that is *Variovorax, Pseudomonas, Cupriavidus, Brevundimonas, Opitutus, Runella, Taylorella, Tahibacter, Polaromonas, Chitinophaga, Ferruginibacter, Enhydrobacter, Hymenobacter, Ramlibacter, Acaryochloris, Aliinostoc, Aliterella, Amazonocrinis, Anabaena, Anabaenopsis, Aphanizomenon, Atlanticothrix, Aulosira, Calenema, Calothrix, Camptylonemopsis, Chloro-*

*gloeopsis*, *Chroococcidiopsis*, *Chrysosporum*, *Compactonostoc*, *Constrictifilum*, *Crocosphaera*, *Cyanobacterium*, *Cyanocohniella*, *Cylindrospermopsis*, *Cylindrospermum*, *Dendronalium*, *Desikacharya*, *Desmonostoc*, *Dolichospermum*, *Erythrobacter*, *Fischerella*, *Fortiea*, *Fremyella*, *Geitlerinema*, *Gloeocapsa*, *Gloeocapsopsis*, *Gloeothece*, *Gloeotrichia*, *Goleter*, *Hapalosiphon*, *Hydrocoryne*, *Jaaginema*, *Johanseniella*, *Kamptonema*, *Komarekiella*, *Leptolyngbya*, *Lyngbya*, *Macrochaete*, *Mastigocoleus*, *Microchaete*, *Nodosiinea*, *Nodularia*, *Nostoc*, *Nostocaceae*, *Nostochopsis*, *Oligotropha*, *Oscillatoria*, *Pantanalinema*, *Pelatocladus*, *Planktothrichoides*, *Planktothrix*, *Polymorphum*, *Porphyrobacter*, *Prochlorococcus*, *Prochlorothrix*, *Pseudanabaena*, *Pseudoaliinostoc*, *Raphidiopsis*, *Richelia*, *Rivularia*, *Roholtiella*, *Rubidibacter*, *Scytonema*, *Spirulina*, *Synechococcus*, *Synechocystis*, *Thermosynechococcus*, *Tolypothrix*, *Trichormus*, *Violetonostoc*, *Wollea*, or *Xenococcus*.

In some embodiments, the consortium further comprises an organism from genus *Variovorax*, an organism of phylum Proteobacteria, an organism from the genus *Bosea*, an organism from the genus *Caulobacter*, and/or an organism of genus *Pseudomonas*.

Further embodiments provide a system comprising a water-based, fixed carbon-free, and fixed nitrogen-free medium; a source of gas comprising $N_2$ and $CO_2$; a light source; and a sample comprising microbes.

Additional embodiments of systems provide a system comprising a water-based, fixed carbon-free, and fixed nitrogen-free medium; a source of gas comprising $N_2$ and $CO_2$; a light source; and a microbial consortium comprising a photosynthetic and nitrogen-fixing microbe or comprising a photosynthetic microbe and a nitrogen-fixing microbe; and a microbe capable of metabolizing carbon-containing and nitrogen-containing compounds produced by the photosynthetic and nitrogen-fixing microbe. In some embodiments, the photosynthetic and nitrogen-fixing microbe is a bacterium. In some embodiments, the photosynthetic and nitrogen-fixing microbe is a member of the cyanobacteria. In some embodiments, the photosynthetic and nitrogen-fixing microbe is a member of the order Cyanobacteriales, Cyanobacteriota, Nostocales, Pseudoanabaenales, Spirulinales, or Oscillatoriales. In some embodiments, the photosynthetic and nitrogen-fixing microbe is a member of the order Nostocales. In some embodiments, the photosynthetic and nitrogen-fixing microbe is a member of the genus *Acaryochloris*, *Aliinostoc*, *Aliterella*, *Amazonocrinis*, *Anabaena*, *Anabaenopsis*, *Aphanizomenon*, *Atlanticothrix*, *Aulosira*, *Calenema*, *Calothrix*, *Camptylonemopsis*, *Chlorogloeopsis*, *Chroococcidiopsis*, *Chrysosporum*, *Compactonostoc*, *Constrictifilum*, *Crocosphaera*, *Cyanobacterium*, *Cyanocohniella*, *Cylindrospermopsis*, *Cylindrospermum*, *Dendronalium*, *Desikacharya*, *Desmonostoc*, *Dolichospermum*, *Erythrobacter*, *Fischerella*, *Fortiea*, *Fremyella*, *Geitlerinema*, *Gloeocapsa*, *Gloeocapsopsis*, *Gloeothece*, *Gloeotrichia*, *Goleter*, *Hapalosiphon*, *Hydrocoryne*, *Jaaginema*, *Johanseniella*, *Kamptonema*, *Komarekiella*, *Leptolyngbya*, *Lyngbya*, *Macrochaete*, *Mastigocoleus*, *Microchaete*, *Nodosiinea*, *Nodularia*, *Nostoc*, *Nostocaceae*, *Nostochopsis*, *Oligotropha*, *Oscillatoria*, *Pantanalinema*, *Pelatocladus*, *Planktothrichoides*, *Planktothrix*, *Polymorphum*, *Porphyrobacter*, *Prochlorococcus*, *Prochlorothrix*, *Pseudanabaena*, *Pseudoaliinostoc*, *Raphidiopsis*, *Richelia*, *Rivularia*, *Roholtiella*, *Rubidibacter*, *Scytonema*, *Spirulina*, *Synechococcus*, *Synechocystis*, *Thermosynechococcus*, *Tolypothrix*, *Trichormus*, *Voletonostoc*, *Wollea*, or *Xenococcus*. In some embodiments, the photosynthetic and nitrogen-fixing microbe is a *Nostoc* species. In some embodiments, the photosynthetic and nitrogen-fixing microbe has a ribosomal RNA gene nucleotide sequence that is at least 90%, 95%, 97%, or 99% identical to one or more of SEQ ID NO: 1, 3, 7, 10, 13, 19, 22, 26, 30, 32, 34, 35, 39, 42, 45, 51, 54, 57, 61, 63, 66, 70, 74, 84, 89, 99, 103, 108, 116, 122, 123, 125, or 127.

In some embodiments, the species that performs nitrogen fixation is a microbe from a genus that is *Variovorax*, *Pseudomonas*, *Cupriavidus*, *Brevundimonas*, *Opitutus*, *Runella*, *Taylorella*, *Tahibacter*, *Polaromonas*, *Chitinophaga*, *Ferruginibacter*, *Enhydrobacter*, *Hymenobacter*, or *Ramlibacter*. In some embodiments, the species that performs photosynthesis is a microbe from a genus that is *Bosea*, *Shinella*, or *Novosphingobium*.

In some embodiments, the consortium produces a durable carbon compound that provides a carbon sink in soil. In some embodiments, the consortium produces melanin. In some embodiments, the consortium produces pheomelanin, eumelanin, and/or pyomelanin.

In some embodiments, composition comprises a second microbe capable of metabolizing carbon-containing compounds produced by the photosynthetic and nitrogen-fixing microbe and/or capable of metabolizing nitrogen-containing compounds produced by the photosynthetic and nitrogen-fixing microbe. In some embodiments, the consortium comprises a second microbe capable of metabolizing carbon-containing compounds produced by the first microbe and/or capable of metabolizing nitrogen-containing compounds produced by the first microbe. In some embodiments, the consortium comprises a second microbe and said first microbe is capable of metabolizing carbon-containing compounds produced by the second microbe and/or capable of metabolizing nitrogen-containing compounds produced by the second microbe.

In some embodiments, the consortium comprises a second photosynthetic microbe. In some embodiments, the second photosynthetic microbe is a bacterium. In some embodiments, the second photosynthetic microbe is an alga. In some embodiments, the photosynthetic bacterium is a member of a genus that is *Acaryochloris*, *Aliinostoc*, *Aliterella*, *Amazonocrinis*, *Anabaena*, *Anabaenopsis*, *Aphanizomenon*, *Atlanticothrix*, *Aulosira*, *Calenema*, *Calothrix*, *Camptylonemopsis*, *Chlorogloeopsis*, *Chroococcidiopsis*, *Chrysosporum*, *Compactonostoc*, *Constrictifilum*, *Crocosphaera*, *Cyanobacterium*, *Cyanocohniella*, *Cylindrospermopsis*, *Cylindrospermum*, *Dendronalium*, *Desikacharya*, *Desmonostoc*, *Dolichospermum*, *Erythrobacter*, *Fischerella*, *Fortiea*, *Fremyella*, *Geitlerinema*, *Gloeocapsa*, *Gloeocapsopsis*, *Gloeothece*, *Gloeotrichia*, *Goleter*, *Hapalosiphon*, *Hydrocoryne*, *Jaaginema*, *Johanseniella*, *Kamptonema*, *Komarekiella*, *Leptolyngbya*, *Lyngbya*, *Macrochaete*, *Mastigocoleus*, *Microchaete*, *Nodosilinea*, *Nodularia*, *Nostoc*, *Nostocaceae*, *Nostochopsis*, *Oligotropha*, *Oscillatoria*, *Pantanalinema*, *Pelatocladus*, *Planktothrichoides*, *Planktothrix*, *Polymorphum*, *Porphyrobacter*, *Prochlorococcus*, *Prochlorothrix*, *Pseudanabaena*, *Pseudoaliinostoc*, *Raphidiopsis*, *Richelia*, *Rivularia*, *Roholtiella*, *Rubidibacter*, *Scytonema*, *Spirulina*, *Synechococcus*, *Synechocystis*, *Thermosynechococcus*, *Tolypothrix*, *Trichormus*, *Violetonostoc*, *Wollea*, *Bosea*, *Shinella*, *Novosphingobium*, or *Xenococcus*. In some embodiments, the alga is a member of a genus that is *Tetraselmis*, *Chlorella*, *Coleochaete*, *Gonium*, *Paradoxia*, *Cymbomonas*, *Palmaria*, *Characiochloris*, *Marvania*, *Chlamydomonas*, *Parachlorella*, *Coccomyxa*, *Trebouxia*, *Cyanidium*, *Treubaria*, *Dangeardinia*, *Galdieria*, *Nyholmiella*, *Porphyra*, *Chara*, *Ankistrodesmus*, *Picochlorum*, *Cyano-*

*phora, Chondrus, Pseudochloris, Interfilum, Gelhdium, Symphyogyna, Chlorosarcina*, or *Cyanothece*. In some embodiments, the consortium comprises a second nitrogen-fixing microbe from a genus that is *Variovorax, Pseudomonas, Cupriavidus, Brevundimonas, Opitutus, Runella, Taylorella, Tahibacter, Polaromonas, Chitinophaga, Ferruginibacter, Enhydrobacter, Hymenobacter*, or *Ramlibacter.*

In some embodiments, the consortium further comprises an organism from genus *Variovorax*, an organism of phylum Proteobacteria, an organism from the genus *Bosea*, an organism from the genus *Caulobacter*, and/or an organism of genus *Pseudomonas.*

In some embodiments, the technology provides a composition comprising a synthetic growth medium; and microbial organisms that collectively perform photosynthesis and nitrogen fixation. In some embodiments, a first microbe species performs photosynthesis. In some embodiments, the first microbe species that performs photosynthesis is a microbe from a genus that is *Bosea, Shinella*, or *Novosphingobium*. In some embodiments, a second microbe species performs nitrogen fixation. In some embodiments, the second microbe species that performs nitrogen fixation is a microbe from a genus that is *Variovorax, Pseudomonas, Cupriavidus, Brevundimonas, Opitutus, Runella, Taylorella, Tahibacter, Polaromonas, Chitinophaga, Ferruginibacter, Enhydrobacter, Hymenobacter*, or *Ramlibacter.*

In some embodiments, a first microbe species performs photosynthesis and nitrogen fixation. In some embodiments, the first microbe species that performs photosynthesis and nitrogen fixation is a bacterium. In some embodiments, the first microbe species that performs photosynthesis and nitrogen fixation is a member of the cyanobacteria. In some embodiments, the first microbe species that performs photosynthesis and nitrogen fixation is a member of the order Cyanobacteriales, Cyanobacteriota, Nostocales, Pseudoanabaenales, Spirulinales, or Oscillatoriales. In some embodiments, the first microbe species that performs photosynthesis and nitrogen fixation is a member of the order Nostocales. In some embodiments, the first microbe species that performs photosynthesis and nitrogen fixation is a member of the genus *Acaryochloris, Aliinostoc, Aliterella, Amazonocrinis, Anabaena, Anabaenopsis, Aphanizomenon, Atlanticothrix, Aulosira, Calenema, Calothrix, Camptylonemopsis, Chlorogloeopsis, Chroococcidiopsis, Chrysosporum, Compactonostoc, Constrictifilum, Crocosphaera, Cyanobacterium, Cyanocohniella, Cylindrospermopsis, Cylindrospermum, Dendronalium, Desikacharya, Desmonostoc, Dolichospermum, Erythrobacter, Fischerella, Fortiea, Fremyella, Geitlerinema, Gloeocapsa, Gloeocapsopsis, Gloeothece, Gloeotrichia, Goleter, Hapalosiphon, Hydrocoryne, Jaaginema, Johanseniella, Kamptonema, Komarekiella, Leptolyngbya, Lyngbya, Macrochaete, Mastigocoleus, Microchaete, Nodosilinea, Nodularia, Nostoc, Nostocaceae, Nostochopsis, Oligotropha, Oscillatoria, Pantanalinema, Pelatocladus, Planktothrichoides, Planktothrix, Polymorphum, Porphyrobacter, Prochlorococcus, Prochlorothrix, Pseudanabaena, Pseudoalinostoc, Raphidiopsis, Richelia, Rivularia, Roholtiella, Rubidibacter, Scytonema, Spirulina, Synechococcus, Synechocystis, Thermosynechococcus, Tolypothrix, Trichormus, Violetonostoc, Wollea*, or *Xenococcus*. In some embodiments, the first microbe species that performs photosynthesis and nitrogen fixation is a *Nostoc* species. In some embodiments, the first microbe species that performs photosynthesis and nitrogen fixation is a microbe having a ribosomal RNA gene nucleotide sequence that is at least 90%, 95%, 97%, or 99% identical to SEQ ID NO: 1, 3, 7, 10, 13, 19, 22, 26, 30, 32, 34, 35, 39, 42, 45, 51, 54, 57, 61, 63, 66, 70, 74, 84, 89, 99, 103, 108, 116, 122, 123, 125, or 127. In some embodiments, the composition further comprises a second microbe species that performs supplemental nitrogen fixation. In some embodiments, the second microbe species that performs supplemental nitrogen fixation is a microbe from a genus that is *Variovorax, Pseudomonas, Cupriavidus, Brevundimonas, Opitutus, Runella, Taylorella, Tahibacter, Polaromonas, Chitinophaga, Ferruginibacter, Enhydrobacter, Hymenobacter*, or *Ramlibacter.*

In some embodiments, the composition further comprises a durable carbon compound that provides a carbon sink in soil. In some embodiments, the microbial organisms produce a durable carbon compound that provides a carbon sink in soil. In some embodiments, the microbial organisms produce melanin. In some embodiments, the microbial organisms produce pheomelanin, eumelanin, and/or pyomelanin. In some embodiments, the composition further comprises melanin. In some embodiments, the composition further comprises pheomelanin, eumelanin, and/or pyomelanin.

In some embodiments, the microbial organisms comprise, consist, or consist essentially of fewer than 10, fewer than 9, fewer than 8, fewer than 7, fewer than 6, fewer than 5, fewer than 4, or fewer than 3 species. In some embodiments, 30%, 40%, 50%, 60%, 70%, 80%, or 90% or more of the organisms of the microbial consortium are provided by the photosynthetic and nitrogen-fixing microbe; and the second microbe. In some embodiments, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or more of the biomass of the composition is provided by the microbial organisms that collectively perform photosynthesis and nitrogen fixation.

In some embodiments, the synthetic growth medium is a fixed carbon-free medium. In some embodiments, the synthetic growth medium is a fixed nitrogen-free medium. In some embodiments, the synthetic growth medium is a fixed carbon-free and fixed nitrogen-free medium. In some embodiments, the synthetic growth medium is a carbon-free medium. In some embodiments, the synthetic growth medium is a nitrogen-free medium. In some embodiments, the synthetic growth medium is a carbon-free and nitrogen-free medium. In some embodiments, methods for accumulating carbon and nitrogen in an agricultural medium are provided in which the method comprises applying to an agricultural medium the composition comprising a synthetic growth medium; and microbial organisms that collectively perform photosynthesis and nitrogen fixation. In some embodiments, methods further comprise exposing the composition to nitrogen gas ($N_2$), carbon dioxide ($CO_2$), and light. In some embodiments, the light is sunlight. In some embodiments, the agricultural medium is a crop field. In some embodiments, the agricultural medium comprises a soil, a greenhouse growth medium, or a hydroponic growth medium. In some embodiments, the methods comprise measuring fixed nitrogen and/or fixed carbon in the soil. In some embodiments, a melanin provides fixed carbon in the soil. In some embodiments, a pheomelanin, eumelanin, and/or pyomelanin provides fixed carbon in the soil.

Some portions of this description describe the embodiments of the technology in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times to refer to these arrangements of operations as modules, without loss of generality. The described operations and their associated modules may be embodied in software, firmware, hardware, or any combinations thereof.

Certain steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all steps, operations, or processes described.

In some embodiments, systems comprise a computer and/or data storage provided virtually (e.g., as a cloud computing resource). In particular embodiments, the technology comprises use of cloud computing to provide a virtual computer system that comprises the components and/or performs the functions of a computer as described herein. Thus, in some embodiments, cloud computing provides infrastructure, applications, and software as described herein through a network and/or over the internet. In some embodiments, computing resources (e.g., data analysis, calculation, data storage, application programs, file storage, etc.) are remotely provided over a network (e.g., the internet; and/or a cellular network).

Embodiments of the technology may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory, tangible computer readable storage medium or any type of media suitable for storing electronic instructions, which may be coupled to a computer system bus. Furthermore, any computing systems referred to in the specification may include a single processor or may be architectures employing multiple processor designs for increased computing capability.

Additional embodiments will be apparent to persons skilled in the relevant art based on the teachings contained herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and other features, aspects, and advantages of the present technology will become better understood with regard to the following drawings.

FIG. 7B: nitrogenase subunit h (nifh); FIG. 7C and FIG. 7D: photosystem II subunits (psba and psbb); FIG. 7E: ribulose-1,5-bisphosphate carboxylase/oxygenase (rubiscoL and rubiscoS); and FIG. 7F: polysaccharide biosynthesis and export protein involved in EPS biosynthesis (wza)). The EggNOG orthologous group that represented the functional annotations are listed in Table 4.

FIG. 9B shows descriptions for the populations identified by P numbers in FIG. 9A and the values plotted on the plot.

FIG. 25, FIG. 26, and FIG. 27 show the phylum, class, order, family, and genus identified for the organisms of the minimal consortia produced from the BW01, BW02, and BW05, respectively.

FIG. 28A and FIG. 28B show the phylum, class, order, family, and genus identified for the organisms of the minimal consortia produced from the FL consortium.

Figure 1A:
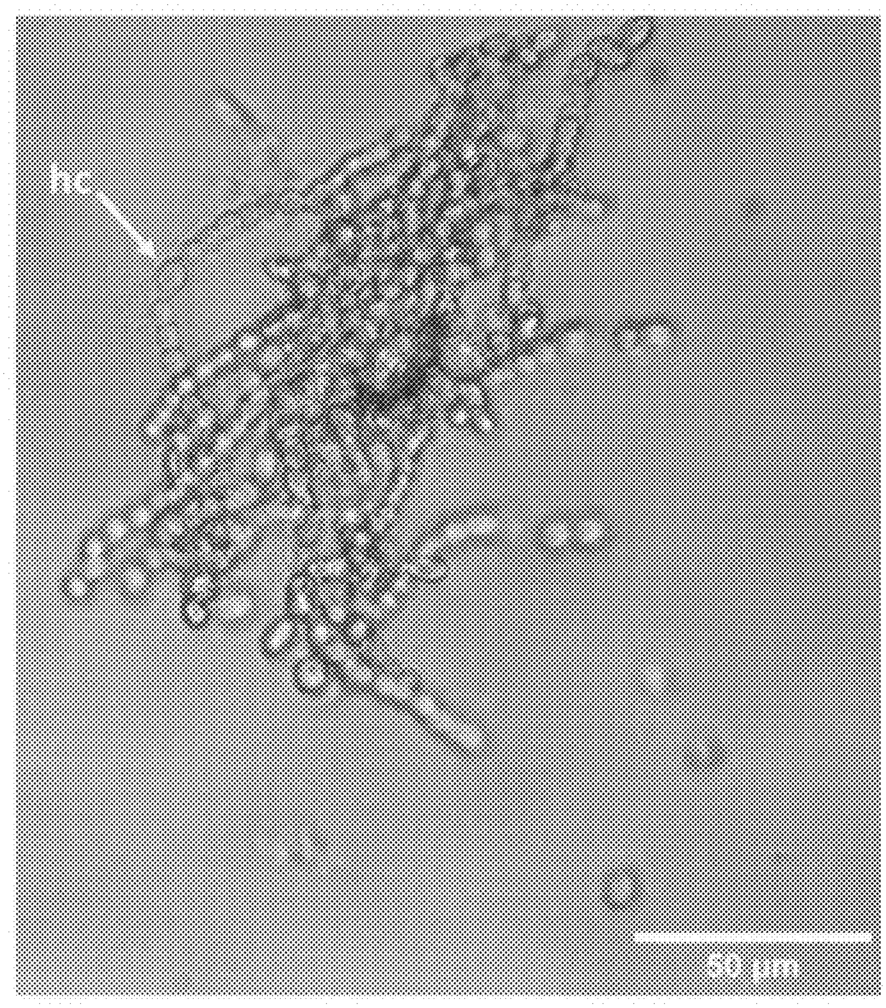
FIG. 1A shows a light microscope image of BW01 cells. The scale bar shows a distance of 50 μm. Structures that are believed to be heterocysts are marked with "hc".

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION

Provided herein is technology relating to functional microbial consortia and particularly, but not exclusively, to methods and systems for producing a microbial consortium possessing a desired function and microbial consortia produced according to such methods.

In this detailed description of the various embodiments, for purposes of explanation, numerous specific details are set forth to provide a thorough understanding of the embodiments disclosed. One skilled in the art will appreciate, however, that these various embodiments may be practiced with or without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the various embodiments disclosed herein.

All literature and similar materials cited in this application, including but not limited to, patents, patent applications, articles, books, treatises, and internet web pages are expressly incorporated by reference in their entirety for any purpose. Unless defined otherwise, all technical and scientific terms used herein have the same meaning as is commonly understood by one of ordinary skill in the art to which the various embodiments described herein belongs. When definitions of terms in incorporated references appear to differ from the definitions provided in the present teachings, the definition provided in the present teachings shall control. The section headings used herein are for organizational purposes only and are not to be construed as limiting the described subject matter in any way.

DEFINITIONS

To facilitate an understanding of the present technology, a number of terms and phrases are defined below. Additional definitions are set forth throughout the detailed description.

Unless otherwise defined herein, scientific and technical terms used in connection with the present technology shall have the meanings that are commonly understood by those of ordinary skill in the art. Further, unless otherwise required by context, singular terms shall include pluralities and plural terms shall include the singular. Generally, nomenclatures used in connection with, and techniques of, cell and tissue culture, molecular biology, immunology, microbiology, genetics, and protein and nucleic acid chemistry and hybridization described herein are those well-known and commonly used in the art. The methods and techniques of the present technology are generally performed according to conventional methods well known in the art and as described in various general and more specific references that are cited and discussed throughout the present specification unless otherwise indicated. See, e.g., Sambrook et al., Molecular Cloning: A Laboratory Manual, 2d ed., Cold Spring Harbor Laboratory Press, Cold Spring Harbor, N.Y. (1989); Sambrook et al., Molecular Cloning: A Laboratory Manual, 3d ed., Cold Spring Harbor Laboratory Press, Cold Spring Harbor, N.Y. (2000); Ausubel et al., Current Protocols in Molecular Biology, Greene Publishing Associates (1992 and Supplements to 2000); Ausubel et al., Short Protocols in Molecular Biology: A Compendium of Methods from Current Protocols in Molecular Biology, 4th ed., Wiley & Sons (1999); Harlow and Lane, Antibodies: A Laboratory Manual, Cold Spring Harbor Laboratory Press, Cold Spring Harbor, N.Y. (1990); Harlow and Lane, Using Antibodies: A Laboratory Manual, Cold Spring Harbor Laboratory Press, Cold Spring Harbor, N.Y. (1998), each of which is incorporated herein by reference in its entirety.

The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator and is equivalent to the term "and/or" unless the context clearly dictates otherwise. The term "based on" is not exclusive and allows for being based on additional factors not described, unless the context clearly dictates otherwise. In addition, throughout the specification, the meaning of "a", "an", and "the" include plural references. The meaning of "in" includes "in" and "on."

As used herein, the terms "about", "approximately", "substantially", and "significantly" are understood by persons of ordinary skill in the art and will vary to some extent on the context in which they are used. If there are uses of these terms that are not clear to persons of ordinary skill in the art given the context in which they are used, "about" and "approximately" mean plus or minus less than or equal to 10% of the particular term and "substantially" and "significantly" mean plus or minus greater than 10% of the particular term.

As used herein, disclosure of ranges includes disclosure of all values and further divided ranges within the entire range, including endpoints and sub-ranges given for the ranges. As used herein, the disclosure of numeric ranges includes the endpoints and each intervening number therebetween with the same degree of precision. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are explicitly contemplated.

As used herein, the suffix "-free" refers to an embodiment of the technology that omits the feature of the base root of the word to which "-free" is appended. That is, the term "X-free" as used herein means "without X", where X is a feature of the technology omitted in the "X-free" technology. For example, a "calcium-free" composition does not comprise calcium, a "mixing-free" method does not comprise a mixing step, etc.

Although the terms "first", "second", "third", etc. may be used herein to describe various steps, elements, compositions, components, regions, layers, and/or sections, these steps, elements, compositions, components, regions, layers, and/or sections should not be limited by these terms, unless otherwise indicated. These terms are used to distinguish one step, element, composition, component, region, layer, and/or section from another step, element, composition, component, region, layer, and/or section. Terms such as "first", "second", and other numerical terms when used herein do not imply a sequence or order unless clearly indicated by the context. Thus, a first step, element, composition, component, region, layer, or section discussed herein could be termed a second step, element, composition, component, region, layer, or section without departing from technology.

As used herein, the word "presence" or "absence" (or, alternatively, "present" or "absent") is used in a relative sense to describe the amount or level of a particular entity (e.g., component, action, element). For example, when an entity is said to be "present", it means the level or amount of this entity is above a pre-determined threshold; conversely, when an entity is said to be "absent", it means the level or amount of this entity is below a pre-determined threshold. The pre-determined threshold may be the threshold for detectability associated with the particular test used to detect the entity or any other threshold. When an entity is "detected" it is "present"; when an entity is "not detected" it is "absent".

As used herein, an "increase" or a "decrease" refers to a detectable (e.g., measured) positive or negative change, respectively, in the value of a variable relative to a previously measured value of the variable, relative to a pre-established value, and/or relative to a value of a standard control. An increase is a positive change preferably at least 10%, more preferably 50%, still more preferably 2-fold, even more preferably at least 5-fold, and most preferably at least 10-fold relative to the previously measured value of the variable, the pre-established value, and/or the value of a standard control. Similarly, a decrease is a negative change preferably at least 10%, more preferably 50%, still more preferably at least 80%, and most preferably at least 90% of the previously measured value of the variable, the pre-established value, and/or the value of a standard control. Other terms indicating quantitative changes or differences, such as "more" or "less," are used herein in the same fashion as described above.

As used herein, the term "improved" refers to improving a characteristic of an environment as compared to a control environment or as compared to a known average quantity associated with the characteristic in question. For example, "improved" soil may refer to a soil that increases the production of plant biomass after application of a beneficial microorganism or microbial consortium to the soil relative to the plant biomass produced by soil not treated with the beneficial microorganism or microbial consortium and for which other soil characteristics are substantially and/or essentially the same with respect to effects on production of plant biomass. Alternatively, one could compare the production of plant biomass after application of a beneficial microorganism or microbial consortium to the soil relative to the average biomass normally produced by the soil, as represented in scientific or agricultural publications known to those of skill in the art. As used herein, "improved" does not necessarily demand that the data be statistically significant (e.g., $p<0.05$); rather, any quantifiable difference demonstrating that one value (e.g. the average treatment value) is different from another (e.g. the average control value) can rise to the level of "improved."

As used herein, a "system" refers to a plurality of real and/or abstract components operating together for a common purpose. In some embodiments, a "system" is an integrated assemblage of hardware and/or software components. In some embodiments, each component of the system interacts with one or more other components and/or is related to one or more other components. In some embodiments, a system refers to a combination of components and software for controlling and directing methods. For example, a "system" or "subsystem" may comprise one or more of, or any combination of, the following: mechanical devices, hardware, components of hardware, circuits, circuitry, logic design, logical components, software, software modules, components of software or software modules, software procedures, software instructions, software routines, software objects, software functions, software classes, software programs, files containing software, etc., to perform a function of the system or subsystem. Thus, the methods and apparatus of the embodiments, or certain aspects or portions thereof, may take the form of program code (e.g., instructions) embodied in tangible media, such as floppy diskettes, CD-ROMs, hard drives, flash memory, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (e.g., volatile and non-volatile memory and/or storage elements), at least one input device, and at least one output device. One or more programs may implement or utilize the processes described in connection with the embodiments, e.g., through the use of an application programming interface (API), reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and combined with hardware implementations.

As used herein, the term "biological system" refers to a collection of genes, enzymes, activities, or functions that operate together to provide a metabolic pathway or metabolic network. A biological system may comprise genes, enzymes, activities, or functions provided by a number of individual organisms. That is, a biological system may be distributed across individual organisms of a microbial community or microbial consortium. Accordingly, a biological system may be described by a collection of genes, enzymes, activities, or functions without identifying individual organisms that provide the genes, enzymes, activities, or functions. A biological system may also be described in terms of nutrient flux, energy flux, electrochemical gradients, metabolic inputs (biological reactants), and metabolic outputs (biological products), e.g., that provide for conversion of energy inputs into energy for biological processes, anabolic synthesis of biomolecules, and elimination of wastes.

As used herein, the term "metabolic pathway" refers to a set of connected metabolic, biochemical, and physical processes that transform a metabolic input to a metabolic output in a series of steps and intermediates.

As used herein, the term "metabolic network" refers to a set of connected metabolic pathways. A metabolic network may transform a metabolic input to a metabolic output in a series of steps and intermediates.

As used herein, the terms "microbial", "microbial organism", and "microorganism" refer to an organism that exists as a microscopic cell that is included within the domains of Archaea, Bacteria, or Eukarya in the three-domain system (see Woese (1990) Proc Natl Acad Sci USA 87: 4576-79, incorporated herein by reference), the latter including yeast and filamentous fungi, protozoa, algae, or higher Protista. Therefore, the term is intended to encompass prokaryotic or eukaryotic cells or organisms having a microscopic size and includes bacteria, archaea, and eubacteria of all species as well as eukaryotic microorganisms such as yeast and fungi. Also included are cell cultures of any species that can be cultured for the production of a chemical. The terms "microbial cells" and "microbes" are used interchangeably with the term "microorganism". The terms "bacteria" and "bacterium" and "archaea" and "archaeon" refer to prokaryotic organisms of the domain Bacteria and Archaea in the three-domain system.

The term "Archaea" refers to a taxonomic domain of organisms typically found in unusual environments and distinguished from the rest of the prokaryotes by several criteria, including the number of ribosomal proteins and the lack of muramic acid in cell walls. On the basis of small subunit rRNA analysis, the Archaea consist of two phylogenetically-distinct groups: Crenarchaeota and Euryarchaeota. On the basis of their physiology, the Archaea can be organized into three types: methanogens (prokaryotes that produce methane); extreme halophiles (prokaryotes that live at very high concentrations of salt (NaCl); and extreme (hyper) thermophiles (prokaryotes that live at very high temperatures). Besides the unifying archaeal features that distinguish them from Bacteria (e.g., no murein in cell wall, ester-linked membrane lipids, etc.), these prokaryotes exhibit unique structural or biochemical attributes which adapt them to their particular habitats. The Crenarchaeota consist mainly of hyperthermophilic sulfur-dependent prokaryotes and the Euryarchaeota contain the methanogens and extreme halophiles.

The term "Bacteria" or "eubacteria" refers to a domain of prokaryotic organisms. Bacteria include at least 11 distinct groups as follows: (1) Gram-positive (gram+) bacteria, of which there are two major subdivisions: (1) high G+C group (Actinomycetes, Mycobacteria, *Micrococcus*, others) (2) low G+C group (*Bacillus, Clostridia, Lactobacillus*, Staphylococci, Streptococci, Mycoplasmas); (2) Proteobacteria, e.g., Purple photosynthetic+non-photosynthetic Gram-negative bacteria (includes most "common" Gram-negative bacteria); (3) Cyanobacteria, e.g., oxygenic phototrophs; (4) Spirochetes and related species; (5) *Planctomyces*; (6) *Bacteroides*, Flavobacteria; (7) *Chlamydia*; (8) Green sulfur bacteria; (9) Green non-sulfur bacteria (also anaerobic phototrophs); (10) Radioresistant micrococci and relatives; (11) *Thermotoga* and Thermosipho thermophiles.

"Gram-negative bacteria" include cocci, nonenteric rods, and enteric rods. The genera of Gram-negative bacteria include, for example, *Neisseria, Spirillum, Pasteurella, Brucella, Yersinia, Francisella, Haemophilus, Bordetella, Escherichia, Salmonella, Shigella, Klebsiella, Proteus, Vibrio, Pseudomonas, Bacteroides, Acetobacter, Aerobacter, Agrobacterium, Azotobacter, Spirilla, Serratia, Rhizobium, Chlamydia, Rickettsia, Treponema*, and *Fusobacterium*.

"Gram positive bacteria" include cocci, nonsporulating rods, and sporulating rods. The genera of gram positive bacteria include, for example, *Actinomyces, Bacillus, Clostridium, Corynebacterium, Erysipelothrix, Lactobacillus, Listeria, Mycobacterium, Myxococcus, Nocardia, Staphylococcus, Streptococcus*, and *Streptomyces*.

As used herein, the term "genus" is defined as a taxonomic group of related species according to the Taxonomic Outline of Bacteria and Archaea (Garrity et al. (2007) The Taxonomic Outline of Bacteria and Archaea. TOBA Release 7.7, March 2007. Michigan State University Board of Trustees).

As used herein, the term "species" is defined as a collection of closely related organisms with greater than 97% 16S ribosomal RNA sequence homology and greater than 70% genomic hybridization and sufficiently different from all other organisms so as to be recognized as a distinct unit.

As used herein, the term "strain" as used herein in reference to a microorganism describes an isolate of a microorganism considered to be of the same species but with a unique genome and, if nucleotide changes are non-synonymous, a unique proteome differing from other strains of the same organism. Strains may differ in their non-chromosomal genetic complement. Typically, strains are the result of isolation from a different host or at a different location and time, but multiple strains of the same organism may be isolated from the same host.

As used herein, the term "naturally occurring" as applied to a nucleic acid, an enzyme, a cell, or an organism, refers to a nucleic acid, enzyme, cell, or organism that is found in nature. For example, a polypeptide or polynucleotide sequence that is present in an organism that can be isolated from a source in nature and that has not been intentionally modified by a human in the laboratory is naturally occurring.

As used herein, the term "non-naturally occurring" as applied to a nucleic acid, an enzyme, a cell, or an organism refers to a nucleic acid, an enzyme, a cell, or an organism that has at least one genetic alteration not normally found in the naturally occurring nucleic acid, enzyme, cell, or organism. Genetic alterations include, for example, modifications introducing expressible nucleic acids encoding metabolic polypeptides, other nucleic acid additions, nucleic acid deletions, and/or other functional disruption of the microbial genetic material. Such modifications include, for example, coding regions and functional fragments thereof, for heterologous, homologous, or both heterologous and homologous polypeptides for the referenced species. Additional modifications include, for example, non-coding regulatory regions in which the modifications alter expression of a gene or operon.

As used herein, the term "in vitro" refers to an artificial environment and to processes or reactions that occur within an artificial environment. In vitro environments include, but are not limited to, test tubes and cell cultures. The term "in vivo" refers to the natural environment (e.g., an animal or a cell) and to processes or reactions that occur within a natural environment.

As used herein, the term "cell culture" refers to any in vitro culture of cells, including, e.g., prokaryotic cells and eukaryotic cells. Included within this term are continuous cell lines, primary cell cultures, transformed cell lines, finite cell lines (e.g., non-transformed cells), bacterial or archaeal cultures in or on solid or liquid media, and any other cell population maintained in vitro.

As used herein, the term "culturable organism" refers to a living organism that can be maintained and grown in a laboratory. In some embodiments, a culturable organism may not be maintained and grown in a laboratory in a pure culture free of other organisms and so may be referred to as an "unculturable organism" with respect to growing as a pure culture. However, in some embodiments, such an organism may be grown in a laboratory in a microbial consortium comprising at least one other organism and so may be a "culturable organism" with respect to the consortium and be also an "unculturable organism" with respect to being grown in a pure culture without the other member(s) of the consortium.

As used herein, "isolate", "isolated", "isolated microbe", and like terms are intended to mean that the one or more microorganisms has been separated from at least one of the materials with which it is associated in a particular environment (for example, soil, water, or a higher multicellular organism). Thus, an "isolated microbe" does not exist in its naturally occurring environment; rather, through the various techniques described herein, the microbe has been removed from its natural setting and placed into a non-naturally occurring state of existence. Thus, the isolated strain may exist as, for example, a biologically pure culture, or as spores (or other forms of the strain) in association with a carrier composition. In certain aspects of the disclosure, the isolated microbes exist as isolated and biologically pure cultures. It will be appreciated by one of skill in the art that an isolated and biologically pure culture of a particular microbe denotes that said culture is substantially free (within scientific reason) of other living organisms and contains only the individual microbe in question. The culture can contain varying concentrations of said microbe, and isolated and biologically pure microbes often necessarily differ from less pure or impure materials. Furthermore, in some aspects, the disclosure provides for certain quantitative measures of the concentration, or purity limitations, that are found within an isolated and biologically pure microbial culture. The presence of these purity values, in certain embodiments, is a further attribute that distinguishes the presently disclosed microbes from those microbes existing in a natural state.

As used herein, the terms "selected environment", "condition", or "conditions" refer to any external property in which a particular organism or a microbial consortium of a microbial community grows more efficiently (e.g., faster, to a higher amount or concentration, with greater survival, etc.) than one or more other organisms or consortia of the microbial community. Exemplary "conditions" or "environments" include, but are not limited to, a particular medium, volume, vessel, temperature, mixing, aeration, gravity, electromagnetic field, cell density, pH, nutrients, phosphate source, nitrogen source, symbiosis with one or more organisms, and/or interaction with a single species of organism or multiple species of organisms (e.g., a mixed population). Also included as "conditions" or "environments" are substances that may be toxic to one or more organisms or consortia of a microbial community, such as heavy metals, antibiotics, and chlorinated compounds. It should be understood that time may also be considered a "condition" since organisms are not static entities. Thus, a culture grown over an extended period of time (e.g., days, weeks, months, years) may produce a culture comprising a particular organism or a consortium at a relatively higher proportion in the culture than the relative amount of the particular organism or the consortium in the culture prior to the growth for the time period.

As used herein, the term "selection" refers to an increase in the frequencies of different "types" of individuals within a population by removal or enrichment of some types more so than others, either intentionally or spontaneously. The nature of a "type" can be defined by genetic characterization (e.g., genes or nucleotide sequences); functional characterization (e.g., enzymatic, metabolic ability); taxonomic characterization (e.g., strain, subspecies, species, genus, family, or an operational taxonomic unit (OTU) based on nucleotide sequence similarity or difference); or by physical characterization. Furthermore, a type may comprise one or many individuals. An archetypal example of selection includes, but is not limited to growth rate selection, in which individuals that grow and reproduce more quickly become more prevalent in a population. An important consideration in conducting selection is to determine what the "selection is for" or what is "being selected," that is to say, the genetic, functional, and/or physical difference that is favorable or unfavorable in a particular environment. Growth rate selection is applied to select organisms having a growth rate that is faster than other individuals in the population and that can be passed from a parent cell to its offspring.

As used herein, the term "enrichment" refers to a process wherein the abundance (e.g., expressed in absolute and/or relative terms) of one or more organism(s), one or more functional ability(ies), one or more gene(s) or gene product (s), or one or more nucleotide sequence(s) of interest is/are increased relative to the abundance of one or more other organism(s), one or more other functional ability(ies), one or more other gene(s) or gene product(s), or one or more other nucleotide sequence(s). For example, in some embodiments, the term "enrichment" refers to a process of increasing the number (e.g., the absolute and/or relative number) of one or more microorganisms present in a culture, e.g., by culturing in a suitable medium under selective conditions.

As used herein, the term "medium" or "media" refers to the chemical environment to which an organism is subjected or is provided access. The organism may either be immersed within the media or be within physical proximity (e.g., physical contact) thereto. Media typically comprise water with other additional nutrients and/or chemicals that may contribute to the growth or maintenance of an organism. The ingredients may be purified chemicals (e.g., a "defined" media) or complex, uncharacterized mixtures of chemicals such as extracts made from milk or blood. Standardized media are widely used in laboratories. Examples of media for the growth of bacteria include, but are not limited to, LB and M9 minimal medium. The term "minimal" when used in reference to media refers to media that support the growth of an organism but are composed of only the simplest possible chemical compounds. For example, an M9 minimal medium may be composed of the following ingredients dissolved in water and sterilized: 48 mM $Na_2HPO_4$, 22 mM $KH_2PO_4$, 9 mM NaCl, 19 mM $NH_4Cl$, 2 mM $MgSO_4$, 0.1 mM $CaCl_2$), 0.2% carbon and energy source (e.g., glucose).

Growth media are also provided for the growth of plants. As used herein, the term "agricultural growth medium" refers to a medium that is suitable to support growth of a plant. The agricultural growth medium may be natural or artificial, e.g., soil, potting mixes, bark, vermiculite, hydroponic solutions, hydroponic solutions applied to solid plant support systems, and tissue culture gels. Agricultural growth media may be used alone or in combination with one or more other media. It may also be used with or without the addition of exogenous nutrients and physical support systems for roots and foliage.

In some embodiments, the agricultural growth medium is a naturally occurring medium such as soil, sand, mud, clay, humus, regolith, rock, or water. In some embodiments, the agricultural growth medium is artificial. Such an artificial agricultural growth medium may be constructed to mimic the conditions of a naturally occurring medium; however, this is not necessary. Artificial agricultural growth media can be made from one or more of any number and combination of materials including sand, minerals, glass, rock, water, metals, salts, nutrients, water. In some embodiments, the agricultural growth medium is sterile. In some embodiments, the agricultural growth medium is not sterile.

As used herein, the term "soil" refers to a solid particulate growth medium comprising organic matter and minerals, and that further typically comprises water and gases.

As used herein, the term "greenhouse growth medium" refers to a soil-free growth medium that is commonly used in greenhouse, raised bed, and container crop growth of plants. An exemplary greenhouse growth medium comprises peat moss and may also comprise perlite, vermiculite, bark, and/or sand.

As used herein, the term "hydroponic medium" refers to a soil-free liquid growth medium comprising nutrients and/or minerals for plant growth. Use of a hydroponic medium may be used in combination with use of an inert medium such as perlite, gravel, or other substrate to provide physical support for the plants.

As used herein, the term "culture" refers to medium in a container or enclosure with at least one cell or individual of a viable organism, usually a medium in which that organism can grow. As used herein, the term "continuous culture" is intended to mean a liquid culture into which new medium is added at some rate equal to the rate at which medium is removed. Conversely, a "batch culture," as used herein, is intended to mean a culture of a fixed size or volume to which new media is not added or removed.

As used herein, the term "microbial consortium" (plural "microbial consortia") refers to a set of microbial species, or strains of a species, that can be described as carrying out a common function, or can be described as participating in, or leading to, or correlating with, a recognizable parameter or phenotypic trait. A consortium may comprise two or more taxonomic units (e.g., families, genera, species, or strains of a species) of microbes. In some instances, the microbes coexist within the community symbiotically. A microbial consortium may be described by describing taxonomic units present in the consortium (e.g., a number of strains, subspecies, species, genera, families, or operational taxonomic units (OTUs) based on nucleotide sequence similarity or difference); by describing genes present in the consortium; by describing nucleotide sequences present in the consortium; or by describing functions present in and/or provided by the consortium. A microbial consortium may be a subset of organisms found in a microbial community. A microbial consortium may be described as a set of genes, enzymes, activities, or functions provided by a number of individual organisms. Further, a microbial consortium may be described by a collection of genes, enzymes, activities, or functions without identifying individual organisms that provide the genes, enzymes, activities, or functions. A microbial consortium may also be described in terms of nutrient flux, energy flux, electrochemical gradients, metabolic inputs (biological reactants), and metabolic outputs (biological products), e.g., that provide for conversion of energy inputs into energy for biological processes, anabolic synthesis of biomolecules, and elimination of wastes.

As used herein, the term "microbial community" refers to a group of microbes comprising two or more taxonomic units (e.g., families, genera, species, or strains of a species) of microbes. Unlike a microbial consortium, a microbial community does not necessarily act in concert to carry out a common function, or does not have to be participating in, or leading to, or correlating with, a recognizable parameter or phenotypic trait. See, e.g., Doolittle (2010) "Metagenomics and the Units of Biological Organization" BioScience 60: 102-112, incorporated herein by reference.

As used herein, the term "minimal consortium" (plural "minimal consortia") refers to a microbial consortium that comprises the minimum set of members to be viable under the given growth conditions. A minimal consortium may be produced from another, more complex microbial consortium or microbial community, e.g., by streaking a culture of a microbial consortium or microbial community on a solid minimal selective growth medium to isolate individual colonies comprising the minimal consortium that grows on the solid minimal selective growth medium and, when appropriate to isolate colonies having a stable morphology, picking and re-streaking colonies on the solid minimal selective growth medium to isolate individual colonies comprising the minimal consortium that grows on the solid minimal selective growth medium. Accordingly, in this example, a minimal consortium comprises the minimum set of members that is viable on the minimal selective medium.

As used herein, the term "relative abundance" refers to the abundance of microorganisms of a particular taxonomic unit (e.g., an OTU) in a first biological sample compared to the abundance of microorganisms of the corresponding taxonomic unit in one or other (e.g., second) samples. The "relative abundance" may be reflected in, e.g., the number of isolated species corresponding to a taxonomic unit or the degree to which a biomarker (e.g., a nucleotide sequence) specific for the taxonomic unit is present or expressed in a given sample. The relative abundance of a particular taxonomic unit in a sample can be determined using culture-based methods or non-culture-based methods well known in the art. Non-culture based methods include sequence analysis of amplified polynucleotides specific for a taxonomic unit or a comparison of proteomics-based profiles in a sample reflecting the number and degree of polypeptide-based, lipid-based, polysaccharide-based or carbohydrate-based biomarkers characteristic of one or more taxonomic units present in the samples. Relative abundance or abundance of taxonomic units or OTU can be calculated with reference to all taxonomic units/OTU detected, or with reference to some set of invariant taxonomic units/OTUs. In some embodiments, taxonomic units are identified using sequence based methods as described in, e.g., Wood (2014) "Kraken: ultrafast metagenomic sequence classification using exact alignments" Genome Biology 15: R46 and Wood (2019) "Improved metagenomic analysis with Kraken 2" Genome Biology 20:257, each of which is incorporated herein by reference.

As used herein, the term "significantly altered relative abundance" refers to a statistically significant increase or reduction in the relative abundance of the number of microorganisms of a particular taxonomic unit compared to the total microorganisms in the sample or to the number of microorganisms of the corresponding taxonomic unit present in another sample. In some embodiments, a "significant increase" or "significant reduction" in relative abundance is defined as a statistically significant increase or statistically significant reduction over a reference value. In some embodiments, a statistically significant increase or statistically significant reduction is an increase or a reduction that is twice, three-times, or four-times of the standard deviation of the relative abundance. In some embodiments, a statistically significant increase or statistically significant reduction is an increase or a reduction with a P-value equal to, or smaller than, 0.1, 0.05, 0.01, or 0.005.

In some embodiments, "significant reduction" or "significant increase" in relative abundance means a statistically significant difference in one or more indicator species or taxonomic unit compared with each other or with reference species or taxonomic units using a non-parametric statistical test, such as a signed-rank test. In some embodiments, a "significant reduction" or "significant increase" in relative abundance is determined using models that employ Bayesian inference and related approaches.

In certain embodiment, an increase in relative abundance reflects an increase of 10%, 20%, 30%, 40%, 50%, 60%, 70%, 80%, 90%, 100% or more over a reference value. In some embodiments, an increase in relative abundance reflects a 2-fold, 3-fold, 5-fold, 10-fold, 20-fold, 50-fold, or 100-fold increases over a reference value.

As used herein, "expression" refers to the process by which the information of a particular nucleic acid (e.g., a gene) is used to synthesize a product (e.g., a biomolecule (e.g., a nucleic acid, a polypeptide, a carbohydrate, a lipid, and combinations, derivatives, and/or metabolites of the foregoing); a metabolite (e.g., a primary metabolite, a secondary metabolite); a fatty acid; a polyketide; a nucleotide; an amino acid; a cofactor; and combinations, derivatives, and/or metabolites of the foregoing). The term "expression" includes but is not limited to one or more of the following: transcription of a gene into a precursor mRNA; processing of a precursor mRNA to produce a mature mRNA; mRNA stability; translation of a mature mRNA into a protein (including codon usage and tRNA availability); and/or glycosylation and/or other modifications of the translation product. The term "expression" also includes transcription of a non-coding RNA, e.g., a transfer RNA, a ribosomal RNA, a microRNAs, a siRNA, a piRNA, a snoRNA, a snRNA, an exRNA, a scaRNA, or a long ncRNA. The term "expression" includes production of a functional product and production of non-functional products that find use in producing functional products by subsequent chemical or biochemical manipulation or synthesis.

As used herein, the term "phenotype" refers to the observable characteristics of an individual cell, cell culture, organism, or group of organisms (e.g., microbial consortium) that results from the interaction between the genetic makeup (e.g., genotype) of the individual cell, cell culture, organism, or group of organisms and the environment.

As used herein, the term "metagenome" is defined as "the collective genomes of all microorganisms present in a given habitat" (Handelsman et al., (1998) Chem. Biol. 5: R245-R249). However, this term is also intended to include clones, including the genomes or genes extracted from environmental samples.

As used herein, "metagenomic DNA" refers to the whole microbial-associated genomic DNA isolated from complex samples like open natural environments (e.g. soil, water) or from microbiomes of multicellular organisms (e.g. humans).

As used herein, "metagenomic library" refers to a clone collection of whole microbial-associated genomic DNA isolated from complex samples like open natural environments (e.g. soil, water) or from microbiomes of multicellular organisms (e.g. humans) in a recombinant vector.

As used herein, "genome" refers to the genetic material (e.g., chromosome) of an organism.

As used herein, the term "gene" refers to a nucleic acid molecule that comprises a nucleic acid sequence that encodes a polypeptide or non-coding RNA and the expression control sequences that are operably linked to the nucleic acid sequence that encodes the polypeptide or non-coding RNA. For instance, a gene may comprise a promoter, one or more enhancers, a nucleic acid sequence that encodes a polypeptide or a non-coding RNA, downstream regulatory sequences and, possibly, other nucleic acid sequences involved in regulating the transcription of an RNA from the gene.

As used herein, the term "genetic basis" refers to the underlying genetic or genomic cause of a particular observation.

As used herein, the term "genetic" refers to the heritable information encoded in the sequence of DNA nucleotides. As such, the term "genetic characterization" is intended to mean the sequencing, genotyping, comparison, mapping, or other assay of information encoded in DNA.

As used herein, the term "genetic material" refers to the DNA within an organism that is passed along from one generation to the next. Normally, genetic material refers to the genome of an organism. Extra-chromosomal elements, such as organelle or plasmid DNA, can also be a part of the genetic material that determines organism properties.

As used herein, the term "genetic change" or "genetic adaptation" refers to one or more mutations within the genome of an organism. As used herein, the term "mutation" refers to a difference in the sequence of DNA nucleotides of two related organisms, including substitutions, deletions, insertions and rearrangements, or motion of mobile genetic elements, for example.

As used herein, the term "taxonomic unit" is a group of organisms that are considered similar enough to be treated as a separate unit. A taxonomic unit may comprise a family, genus, species, or population within a species (e.g., strain), but is not limited as such.

As used herein, the term "operational taxonomic unit" (OTU) refers to a group of microorganisms considered similar enough to be treated as a separate unit. An OTU may comprise a taxonomic family, genus, or species but is not limited as such. OTUs are frequently defined by comparing nucleotide sequences between organisms. In certain cases, the OTU may include a group of microorganisms treated as a unit based on, e.g., a sequence identity of ≥97%, ≥95%, ≥90%, ≥80%, or ≥70% among at least a portion of a differentiating biomarker, such as the 16S rRNA gene.

As used herein, the term "evaluation" is intended to mean observations or measurements of an observable phenotype of an organism. Evaluation typically includes analysis, interpretation, and/or comparison with the phenotype of another organism. It should be understood that a phenotype may be evaluated at both the genetic level (e.g., with respect to nucleotide sequence) and at the level of gene products. Further, a phenotype may be evaluated in terms of the behavior of the organism within the environment and/or the behavior of individual molecules or groups of molecules within the organism. Such comparisons are useful in determining the detailed function of mutated products resulting from genetic adaptation. Evaluation may be performed on a consortium or a community by observing or measuring an observable phenotype of the consortium or of the community.

As used herein, the term "step-wise" is intended to mean in the fashion of a series of events, one following the other in time. As used herein, the term "simultaneous" is intended to mean happening at the same time.

As used herein, "kilobase" (kb) or "kilobase pairs" (kbp) refers to 1000 nucleotides or 1000 base pairs of a nucleic acid (e.g., DNA or RNA).

As used herein, the term "stable", when used in reference to a microbial community (e.g., a microbial community, a microbial consortium, a microbial culture, or other group, set, or collection of microorganisms), refers to a microbial community that does not significantly change (e.g., as measured by a measurement of similarity discussed above) from a first culture to a second culture when a portion of the first culture is used to inoculate a culture medium to produce the second culture when culture conditions, including external factors (light, nutrients, temperature, aeration, etc.), are the same for the first and second cultures. Accordingly, as used herein, the term "stability", when used in reference to a microbial community (e.g., "microbial community stability"), refers to a qualitative or quantitative indicator or measurement of the change in a microbial community (e.g., a microbial community, a microbial consortium, a microbial culture, or other group, set, or collection of microorganisms) (e.g., as measured by a measurement of similarity discussed above) from a first culture to a second culture when a portion of the first culture is used to inoculate a culture medium to produce the second culture when culture conditions, including external factors (light, nutrients, temperature, aeration, etc.), are the same for the first and second cultures.

Additionally, as used herein, the term "stable", when used in reference to one or more functions provided and/or performed by a microbial community (e.g., a microbial community, a microbial consortium, a microbial culture, or other group, set, or collection of microorganisms), refers to one or more functions that do not significantly change (e.g., as measured by examination of metagenomic sequence and/or by inferring functions therefrom) from a first culture to a second culture when a portion of the first culture is used to inoculate a culture medium to produce the second culture when culture conditions, including external factors (light, nutrients, temperature, aeration, etc.), are the same for the first and second cultures. Accordingly, as used herein, the term "stability", when used in reference to one or more functions provided by a microbial community (e.g., "functional stability"), refers to a qualitative or quantitative indicator or measurement of the change in one or more functions provided by a microbial community (e.g., a microbial community, a microbial consortium, a microbial culture, or other group, set, or collection of microorganisms) (e.g., as measured by a measurement of similarity discussed above) from a first culture to a second culture when a portion of the first culture is used to inoculate a culture medium to produce the second culture when culture conditions, including external factors (light, nutrients, temperature, aeration, etc.), are the same for the first and second cultures. Accordingly, functional stability and microbial stability may be independent such that a microbial community may be functionally stable but have changing membership and/or abundance of members such that the microbial community does not have microbial community stability. Thus, a microbial community may have both functional stability and microbial community stability; a microbial community may have neither functional stability nor microbial community stability; a microbial community may have functional stability (e.g., regardless of the state of microbial community stability); a microbial community may have microbial community stability (e.g., regardless of the state of functional stability).

In some embodiments, a microbe can be "endogenous" to an environment. As used herein, a microbe is considered "endogenous" to an environment if the microbe is derived from the environment from which it is sourced. That is, if the microbe is naturally found associated with said environment, then the microbe is endogenous to the environment. In embodiments in which an endogenous microbe is applied to an environment, then the endogenous microbe is applied in an amount that differs from the levels found in the specified environment in nature. Thus, a microbe that is endogenous to a given environment can still improve the environment if the microbe is present in the environment at a level that does not occur naturally and/or if the microbe is applied to the environment with other organisms that are exogenous to the environment and/or endogenous to the environment and present at a level that does not occur naturally.

In some embodiments, a microbe can be "exogenous" (also termed "heterologous") to an environment. As used herein, a microbe is considered "exogenous" to an environment if the microbe is not derived from the environment from which it is sourced. That is, if the microbe is not naturally found associated with the environment, then the microbe is exogenous to the environment. For example, a microbe that is normally associated with a first environment may be considered exogenous to a second environment that naturally lacks said microbe.

As used herein, "environmental sample" means a sample taken or acquired from any part of the environment (e.g., ecosystem, ecological niche, habitat, etc.) An environmental sample may include liquid samples from a river, lake, pond, ocean, glaciers, icebergs, rain, snow, sewage, reservoirs, tap water, drinking water, etc.; solid samples from soil, compost, sand, rocks, concrete, wood, brick, sewage, etc.; and gaseous samples from the air, underwater heat vents, industrial exhaust, vehicular exhaust, etc.

As used herein, the term "photosynthetic and nitrogen-fixing microbe" refers to a microbe that is capable of both performing photosynthesis and fixing nitrogen.

DESCRIPTION

Provided herein is a technology related to a microbial consortium comprising microbes that can produce and/or deliver nutrients to soil, e.g., for agricultural use. In some embodiments, the microbial consortium comprises a number of microbes. In some embodiments, the microbial consortium comprises a number of biological systems comprising components (e.g., enzymes, multi-enzyme complexes, metabolic pathways) provided by the microbes of the microbial consortium. In some embodiments, the biological systems provide a number of biological functions, e.g., photosynthesis (e.g., oxygenic photosynthesis and/or anoxygenic photosynthesis), nitrogen fixation, carbon fixation, and conversion (e.g., solubilization) of soil nutrients (e.g., phosphorus) into bioavailable forms that plants use. In some embodiments, microbial consortia comprise microbes and/or biological systems that use photosynthetic energy to fix N and/or C from the air and produce microbial biomass. In some embodiments, a biological system comprises a plurality of enzymes provided by a plurality of microbes. In some embodiments, a biological system comprises enzymes provided by one microbe. In some embodiments, the mass (e.g., the dry cell weight) of the microbial consortium is approximately 50% carbon and approximately 5% nitrogen.

In some embodiments, the technology comprises methods for producing and/or optimizing a microbial consortium to be applied (e.g., by spraying) directly on a crop field and growing the microbial consortium either with, or in place of, traditional plant-based cover crops. In some embodiments, methods comprise growing a microbial consortium in a bioreactor. In some embodiments, a bioreactor comprises a growth pond and the microbial consortium is grown in the growth pond under controlled conditions (e.g., controlled composition of the growth pond growth medium, controlled temperature, controlled light conditions (e.g., incident wavelength(s) and flux of light)). In some embodiments, a microbial consortium is grown without providing fixed nitrogen in the growth medium. In some embodiments, a microbial consortium is grown without providing fixed carbon in the growth medium. In some embodiments, a microbial consortium is grown without providing fixed nitrogen in the growth medium and without providing fixed carbon in the growth medium. In some embodiments, nitrogen and/or carbon is provided by atmospheric nitrogen (e.g., $N_2$ gas in the atmosphere) and/or by atmospheric carbon (e.g., $CO_2$ gas in the atmosphere). That is, in some embodiments, the technology comprises growing a microbial consortium under conditions where nitrogen and/or carbon is provided by atmospheric nitrogen (e.g., $N_2$ gas in the atmosphere) and/or by atmospheric carbon (e.g., $CO_2$ gas in the atmosphere).

In some embodiments, the controlled conditions comprise providing a controlled wavelength of light, a controlled spectrum of light, and/or a controlled photon flux of light. In some embodiments, wide-spectrum (e.g., "white") light is provided, e.g., light having a spectrum of wavelengths from approximately 380 to approximately 750 nm. In some embodiments, a "far-red" light is provided, e.g., light having a peak wavelength of approximately 740 nm (e.g., light having a spectrum from approximately 730 to 750 nm).

In some embodiments, the technology provides methods for formulating a composition comprising a microbial consortium and applying the composition (e.g., by spraying) directly on a crop field. In some embodiments, the microbial consortium continues to grow after application to the crop field. In some embodiments, the technology provides methods for formulating a composition comprising a microbial consortium, applying the composition (e.g., by spraying) directly on a crop field, and growing the microbial consortium either with, or in place of, traditional plant-based cover crops. Accordingly, applying the composition comprising the microbial consortium to fields supplies N to crops growing in the fields, while also removing $CO_2$ from the air and depositing fixed carbon in the soil. Higher soil carbon is associated with higher soil performance, including nutrient-holding capacity and stability against runoff. Accordingly, in some embodiments, the technology finds use in providing a technology for carbon and nitrogen fixation, e.g., during the shoulder season, at a low cost to growers.

As described herein, embodiments of the technology deliver fixed N and C to agricultural fields and reduces greenhouse gases. However, crops require additional nutrients in addition to N and C, e.g., phosphorus (P), potassium (K), manganese, magnesium, calcium, iron, boron, sodium, and others.

With respect to phosphorus, phosphorus cannot be captured from the air in the way that N can be. Thus, phosphorus is provided by mining phosphate minerals from the earth and adding it in this form in fertilizers. The availability of free P in soil can be problematic because P tends to bind tightly to soil components and may thus be difficult for plants to acquire and use. Availability of soil P to plants is pH dependent, and P is most available for plants to use at a pH of approximately 6 to 7. At soil pH lower than 6, phosphate tends to bind to metal ions such as iron or aluminum; at a pH higher than 7, P tends to complex with calcium. Furthermore, the over-application of phosphorus to fields has caused deterioration of water supplies and fisheries through anoxic eutrophication. Accordingly, there is a need for technologies for delivering phosphorus more efficiently so that it is accessible to crops and does not enter waterways.

Thus, particular embodiments of the technology provide P in biomass (e.g., in a biologically useful form present in the biomass of a microbial consortium). In some embodiments, microbial consortia comprise microbes that readily accumulate phosphorus and incorporate phosphorus into biomass. In some embodiments, microbial consortia comprise microbes that accumulate polyphosphate (see, e.g., Kornberg (1999) "Inorganic polyphosphate: a molecule of many functions" Annu Rev Biochem 68: 89-125, incorporated herein by reference). In some embodiments, microbial consortia comprise microbes that accumulate P to meet the nutritional needs of the microbial consortia applied to fields and the associated crops. In some embodiments, microbial consortia comprise microbes that mobilize bound phosphate from soil and provide it in biologically usable forms to crops or other microbes.

As described herein, the technology provides a biological approach to producing nitrogen fertilizers that may partially or wholly replace chemical production of fertilizers. In addition, the technology described herein removes carbon from the atmosphere and, in some embodiments, supplies nutrients (e.g., P) to soil in bioavailable forms. The technology is advantageous, for example, because it reduces greenhouse gases, reduces use of fossil fuels (e.g., by decreasing or minimizing use of the Haber-Bosch process), increases the efficiency of phosphorus use, and decreases denitrification in agricultural fields.

During the development of embodiments of the technology, experiments were conducted that indicated that methods of producing a microbial consortium using selective conditions reduced the complexity of microbial communities while selecting for carbon and nitrogen fixation functions. Although most environmental samples comprised phototrophs capable of surviving without supplementation of media with nitrogen or carbon compounds, three cultures (BW01, BW02, and BW05) were particularly strong performers in early passaging. The data also indicated that these cultures are capable of high productivity levels in liter scale liquid cultures and are capable of colonizing sterilized soils. Further, experiments indicated that reduced complexity versions of these consortia grew well in liquid culture.

Microbial Consortia Functions

As described herein, the technology relates to producing, providing, and/or using a microbial consortium comprising a number of microbes and providing a number of functions. In some embodiments, the microbial consortium comprises 2, 3, 4, 5, 6, 7, 8, 9, or 10 or more microbes. In some embodiments, the microbial consortium comprises approximately 10, 20, 30, 40, 50, 60, 70, 80, 90, or 100 or more microbes.

In some embodiments, the microbial consortium comprises a number of enzymes, multi-enzyme complexes, biological systems, biological pathways, or biological functions. In some embodiments, the enzymes, multi-enzyme complexes, biological systems, biological pathways, or biological functions provide photosynthesis (e.g., oxygenic photosynthesis and/or anoxygenic photosynthesis), nitrogen fixation, carbon fixation, and conversion of nutrients into bioavailable forms for plants to use.

Figure 17:
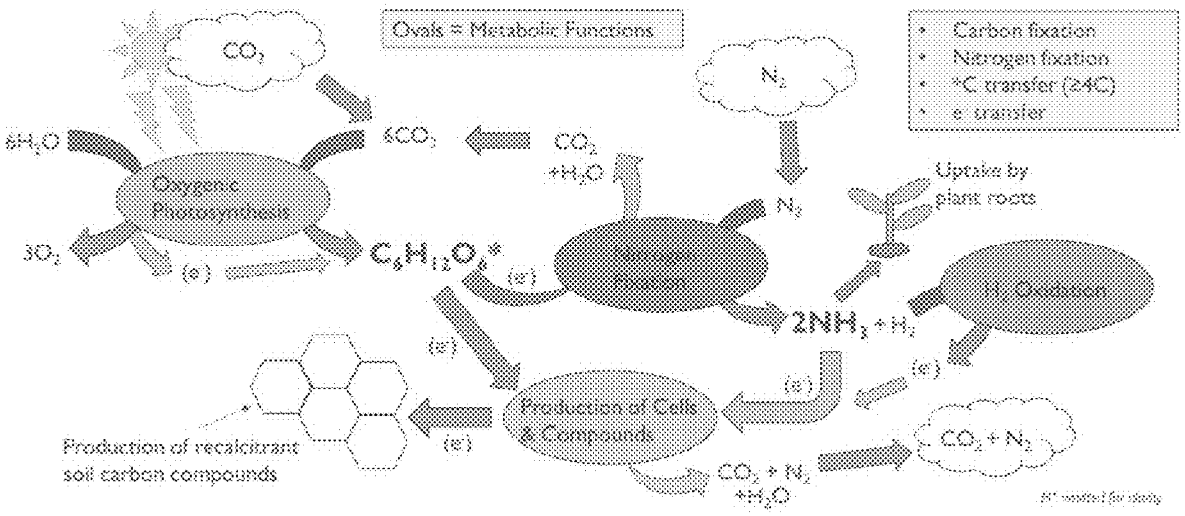
FIG. 17 is a schematic showing the metabolic functions in the consortia described herein. Red indicates electron sources, carriers, and sinks.

For example, embodiments of the technology provide a microbial consortium that performs photosynthesis (e.g., oxygenic photosynthesis and/or anoxygenic photosynthesis) and nitrogen fixation, and that transfers carbon and electrons between metabolic functions and/or microbial cells of the consortium (FIG. 17). In particular, in some embodiments, the microbial consortium performs photosynthesis (e.g., oxygenic photosynthesis), e.g., by capturing light energy (e.g., from the sun when grown in a field or from illumination when grown in a photobioreactor) and using the energy to remove electrons from water, drive the Calvin-Benson Cycle, and fix carbon from atmospheric carbon dioxide. The fixed carbon is shuttled to produce molecules including simple and complex carbohydrates. The microbial consortium performs nitrogen fixation (e.g., biological nitrogen fixation) using energy, electrons, and protons produced from photosynthesis. The nitrogen fixation may be performed within the phototroph (as is the case with *Nostoc* spp.) or in a separate organism that consumes sugars or other carbon compounds secreted from phototrophs. The microbial consortium comprises fluxes and/or movement of nitrogen (e.g., in the form of fixed nitrogen compounds between metabolic functions and/or cells in the consortium. The microbial consortium comprises fluxes and/or movement of carbon (e.g., in the form of fixed carbon compounds (e.g., carbon compounds comprising four or more carbons)) between metabolic functions and/or cells in the consortium. The microbial consortium comprises fluxes and/or movement of electrons (e.g., as carried by electron shuttle molecules) between metabolic functions and/or cells in the consortium. Oxygenic phototrophs form the primary electron source for the consortium, e.g., by removing electrons from water at the reaction center of photosystem II using sunlight energy. These electrons are transferred by the various carbon-containing compounds (e.g., sugars and polysaccharides) secreted by the phototrophs. Nitrogen fixation requires both reducing equivalents (electrons) and energy carried by ATP, both of which can be sourced through the oxidation of these carbon-containing compounds. In addition, electrons can be recovered from the hydrogen gas released during nitrogen fixation. This hydrogen can also serve as an electron source for anoxygenic photosynthesis in the anaerobic regions of a biofilm.

Thus, without being bound by theory, it is contemplated that a microbe of the microbial consortium captures light energy (e.g., in a field or in a photobioreactor) by photosynthesis (e.g., oxygenic photosynthesis) and the energy is used to transfer electrons from water to atmospheric carbon dioxide (e.g., through the Calvin-Benson Cycle) to fix carbon, e.g., in the form of simple and complex carbohydrates. Further, it is contemplated that energy, electrons, and protons produced from photosynthesis are used for biological nitrogen fixation (BNF), either by a photosynthetic organism of the consortium (e.g., *Nostoc* spp.) or by another organism that consumes fixed carbon compounds (e.g., simple carbohydrates, complex carbohydrates, other carbon compounds) secreted from phototrophs. Fixed carbon compounds that are secreted by the consortium but not consumed by members of the consortium provide soil organic carbon (SOC) or humus, which improve the soil and sequester carbon from the atmosphere. Thus, in some embodiments, the technology relates to a consortium that produces carbon compounds that sequester carbon from the atmosphere. In some embodiments, the technology provides a consortium comprising a member of the consortium that produces carbon compounds that sequester carbon from the atmosphere. In some embodiments, embodiments provide a consortium that produces melanin (e.g., pheomelanin, eumelanin, and/or pyomelanin). That is, embodiments provide a consortium that produces a durable carbon compound that provides a stable carbon sink to remove atmospheric carbon (e.g., $CO_2$) and store carbon in the durable carbon compound (e.g., melanin) in soil. Embodiments provide a microbial organism that produces a durable carbon compound that provides a stable carbon sink to remove atmospheric carbon (e.g., $CO_2$) and store carbon in the durable carbon compound (e.g., melanin) in soil.

In some embodiments, it is contemplated that the consortium comprises a microbe that solubilizes and/or mobilizes phosphate; or that the consortium comprises enzymes, multi-enzyme complexes, biological systems, biological pathways, or biological functions for solubilizing and/or mobilizing phosphate. It is contemplated that phosphate solubilizing and/or mobilizing microbes consume fixed carbon compounds (e.g., simple carbohydrates, complex carbohydrates, other carbon compounds) secreted from phototrophs.

In some embodiments, the technology provided herein relates to providing, producing, and/or using a microbial consortium comprising photosynthetic organisms, nitrogen-fixing organisms, and/or carbon-fixing microbes. In some embodiments, a photosynthetic organism of the consortium also fixes nitrogen and/or also fixes carbon. For instance, in some embodiments, the microbial consortium comprises a cyanobacterium (e.g., *Nostoc* spp.) Further, during the development of embodiments of the technology, data were collected that indicated that certain organisms (e.g., *Nostoc* spp.) grew more rapidly in a microbial consortium (in association with other organisms) than these organisms (e.g., *Nostoc* spp.) grew alone (when not associated with other organisms in a microbial consortium). It is contemplated that some organisms (non-photosynthetic heterotrophs) in the consortium process organic molecules and hydrogen, which increases the growth rate of other organisms (e.g., photosynthetic organisms such as *Nostoc* spp.) In addition, in some embodiments, microbial consortia comprise nitrogen-fixing microbes from genera such as *Rhizobium, Bradyrhizobium*, or Azospirillum. While *Rhizobium* and *Bradyrhizobium* are known to fix nitrogen when associated with a leguminous plant, Azospirillum is a free-living nitrogen fixing microbe.

During the development of embodiments of the technology described herein, experiments were conducted to apply controlled selective conditions to environmental samples to reduce the complexity of a microbial community while selecting for strong carbon and nitrogen fixation activities. Although most environmental samples appeared to have contained phototrophs capable of surviving without combined nitrogen or carbon, three cultures (referred to herein as "BW01", "BW02", and "BW05") were particularly strong performers. See below and the Examples, e.g. Example 20. Further, during the development of embodiments of the technology described herein, experiments were conducted to produce minimal consortia from additional environmental samples using the processes for production of minimal consortia as described herein. See, e.g., Example 21.

Methods

In some embodiments, a microbial consortium is produced using a method of selection. In some embodiments, the methods comprise a method of producing a functional microbial consortium as described in U.S. patent application Ser. No. 17/544,879, which is expressly incorporated herein by reference in its entirety. For example, in some embodiments, a microbial consortium is produced using a method comprising growing a culture under particular conditions (e.g., selective conditions) and screening the culture after growth by evaluating the nucleotide sequences (e.g., metagenomic sequences) present in the culture and/or by testing the functional characteristics of the culture. In some embodiments, one or more environmental samples (e.g., environmental samples that are high in organic matter) may be collected. If a single environmental sample is collected, methods comprise homogenizing the environmental sample to provide an input sample. If a plurality of environmental samples is collected, methods comprise mixing the plurality of environmental samples to provide a mixed environmental sample and homogenizing the mixed environmental sample to provide an input sample.

In embodiments comprising use of a plurality of environmental samples to produce an input sample, collecting and mixing multiple environmental samples may serve to maximize not only the statistical sample space of microbes to screen from but also the combinations of microbes present in microbial consortia identified and/or produced using the technologies described herein that are applied to the input sample. Further, collecting and mixing multiple environmental samples to produce an input sample upon which the technologies described herein are applied may produce novel microbial consortia that do not exist in nature by combining microbes that normally do not live in the same environment in nature. In some embodiments, various environmental samples from geographically disparate areas may be mixed to further increase the statistical sample space of combinations of microbial consortia. For instance, embodiments provide that a plurality of environmental samples may be obtained wherein each environmental sample is taken from a different ecosystem, habitat, and/or ecological niche. Embodiments further provide that a plurality of environmental samples may be obtained from sites that are separated from each other by 1 m, 10 m, 100 m, 1000 m, 10,000 m, or by more than 10,000 m. In some embodiments, the samples are obtained from two or more points anywhere on the Earth, including above and below the surface of land and water areas of the Earth.

In some instances, multiple input samples may be created during the collection. Each input sample of the multiple input samples may comprise a different combination of individual environmental samples that are mixed together. For example, environmental samples A, B, and C (from one or more different ecosystems, habitats, and/or ecological niches) may be mixed to provide an input sample comprising A and B, B and C, or A and C. As a further example, environmental samples A, B, C, and D (from one or more different ecosystems, habitats, and/or ecological niches) may be mixed to provide an input sample comprising A, B, and C; A, B, and D; A, C, and D; or B, C, and D. As another example, environmental samples A, B, C, D, and E (from one or more different ecosystems, habitats, and/or ecological niches) may be mixed to provide an input sample comprising A and B; A and C; A and D; A and E; B and C; B and D; B and E; C and D; C and E; D and E; A, B, and C; A, B, and D; A, B, and E; A, C, and D; A, C, and E; A, D, and E; B, C, and D; B, C, and E; B, D, and E; C, D, and E; A, B, C, and D; A, B, C, and E; A, B, D, and E; A, C, D, and E; B, C, D, and E; or A, B, C, D, and E. Each input sample of the multiple input samples may comprise a range of fractional compositions of any two individual environmental samples of a plurality of individual samples that are mixed together to provide the input sample. For example, any two individual environmental samples may be mixed together to provide an input sample comprising a fractional composition of a first environmental sample ranging from 0.01 to 0.99 (e.g., comprising 0.01, 0.05, 0.10, 0.20, 0.30, 0.40, 0.50, 0.60, 0.70, 0.80, 0.90, 0.95, or 0.99 of the first environmental sample) and comprising a fractional composition of a second environmental sample ranging from 0.99 to 0.01 (e.g., comprising 0.99, 0.95, 0.90, 0.80, 0.70, 0.60, 0.50, 0.40, 0.30, 0.20, 0.10, 0.05, or 0.01 of the second environmental sample).

The input sample may be isolated and developed using variations of quantity and type environmental samples mixed. This is because it is recognized that a combination of microbes may not only be beneficial but may also cause individual microbes to become less effective or be dominated by microbes from foreign environmental samples. Further, embodiments of the technology comprise use of a single environmental sample that is homogenized to provide the input sample. One of ordinary skill in the art understands that a single environmental sample may comprise multiple individual ecosystems or ecological niches that are unmixed in nature but that become mixed when the single sample is homogenized. For example, an environmental sample may comprise a plurality of separate subsamples than are present as separate strata, layers, or subcommunities e.g., strata of a cylindrical soil core sample, strata of a microbial mat sample, strata of a water column sample, subcommunities of a microbial community comprising a biofilm, etc.

Thus, embodiments of the methods provided herein comprise use of a single environmental sample that is homogenized to provide an input sample and/or comprise use of a plurality of environmental samples that are mixed and homogenized to provide an input sample.

In some embodiments, a selection of an input sample (e.g., an environmental sample or a mixed environmental sample of a plurality of mixed environmental samples) based on one or more criteria may be performed. A culture of the input sample may be grown under one or more environmental conditions. In some embodiments, the culture media are provided without nitrogen compounds (e.g., without a source of fixed nitrogen) or carbon compounds (e.g., without a source of fixed carbon). Thus, in some embodiments, the culture medium is described as a nitrogen-free and carbon-free media or "C/N-free media". The input sample may be subject to nitrogen for fixation either by supplying nitrogen from the ambient air concentration or by bubbling in anoxic $N_2$ and supplying salts and other nutrients known to be needed by the microbes to perform nitrogen fixation. The input samples may also be subjected to $CO_2$, e.g., either by ambient air concentrations or via bubbling in $CO_2$.

In some embodiments, the culture medium is a freshwater-replacement medium (e.g., BG-11; see examples). In some embodiments, methods comprise use of a saltwater or seawater medium (or a saltwater-replacement medium or seawater-replacement medium) in which nitrogen-fixing and carbon sequestering microbes adapted to ocean water or other saline water sources are selected according to the methods described herein. In some embodiments, a saltwater or seawater medium (or a saltwater-replacement medium or seawater-replacement medium) provides trace nutrients; in some embodiments, a saltwater or seawater medium (or a saltwater-replacement medium or seawater-replacement medium) is supplemented with trace nutrients. In some embodiments, a culture medium is produced from evaporated sea water by adding water and other nutrients (e.g., iron). In some embodiments, trace elements (e.g., including compounds comprising one or more of boron, manganese, zinc, molybdenum, copper, cobalt, and/or iron) are added to a culture medium.

After culturing and time, a testing of the culture may be performed based on one or more variables, e.g., for increased carbon and nitrogen or an increased activity to fix $CO_2$ and or nitrogen. Measurement may be by mass. In some embodiments, metagenomic and/or genomic DNA of microbes that comprise candidate microbial consortia are isolated and sequenced for identification. In some embodiments, a biomarker is used to identify one or more microbes. In some embodiments, cultures are tested on nitrogen and carbon-free media (liquid media or on solid media) to measure survival time and/or persistence. In some embodiments, selection of one or more microbial cultures and/or specific portions of one or more microbial cultures is performed to provide cultures for testing. In some embodiments, testing comprises evaluating cultures for carbon capture, nitrogen fixation, and/or persistence. In some cases, additives are provided to a culture to encourage uptake of a microbial consortium by an environment (e.g., a soil) or culture medium. For example, microbial consortia may require carbon, energy, nitrogen, micronutrients, and reducing equivalents. The above process may be iterated several times through multiple iterations, with each iteration further isolating and generating identification information for microbes and the specific microbial consortia that achieved the desired results on the selected variables, e.g., climate variables, carbon sequestration, nitrogen fixation, and survival time/persistence. In some embodiments, the selection of microbes and microbial consortia to further test is aided with statistical models and computational methods including machine learning. See, e.g., U.S. patent application Ser. No. 17/544,879, which is expressly incorporated herein by reference in its entirety. For example, embodiments provide that data are developed into a machine learning model that correlates microbes and biomarkers, and microbe combinations to variables under test. Selection of microbial consortia for testing and/or selection of environmental sample characteristics is suggested by a machine learning model as results based on the variables under test. In some embodiments, desired phenotypes are input along with desired results on variables under test, and related microbes may be suggested by the machine learning model for further test.

In some embodiments, the technology provides machine learning techniques to identify microbial species and other information related to one or more variables. In some embodiments, the process comprises a sequence of operations that can be implemented in hardware, software, or a combination thereof. In the context of software, the methods comprise computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process.

In some embodiments, the technology provides additional methods for selecting a microbial consortium that provides a specified function. In some embodiments, the technology provides a method for screening a microbial community, a microbial consortium and/or a plurality of microbes to produce and/or to identify a microbial consortium that provides a specified function. In some embodiments, the technology produces a microbial consortium not found in nature by combining microbes from different environments, ecological niches, and/or habitats (e.g., microbes that are not found together in nature).

In some embodiments, methods comprise providing a sample comprising a plurality of microorganisms; inoculating an Nth volume of a growth medium with a portion of the sample to provide an Nth culture; growing the Nth culture under a set of selective conditions; producing an Nth taxonomic classification of microorganisms in the Nth culture; inoculating an N+1th volume of the growth medium with a portion of the Nth culture; growing the N+1 culture under the set of selective conditions; producing an N+1th taxonomic classification of microorganisms in the N+1th culture; and deriving a measure of microbial community stability of the N+1th culture with respect to the Nth culture using the N+1th taxonomic classification and the Nth taxonomic classification. The measure of microbial community stability is monitored to identify that the measure of microbial community stability has reached a plateau value. If the measure of microbial community stability has not reached a plateau value, then the inoculating, growing, producing a taxonomic classification, and deriving a measure of microbial community stability steps of the method are repeated by providing the N+1th sample as the Nth sample. If the measure of microbial community stability has reached a plateau value, the method comprising providing the stable N+1th culture as a culture comprising a microbial consortium that performs a specified function. In some embodiments, the inoculating, growing, producing a taxonomic classification, and deriving a measure of microbial community stability steps are repeated 2, 3, 4, 5, 6, 7, 8, 9, or 10 or more times.

In some embodiments, methods further comprise isolating each of the microorganisms of the stable microbial consortium in a pure culture. In some embodiments, methods further comprise obtaining a genome sequence of each of the microorganisms of the stable microbial consortium in a pure culture. In some embodiments, methods further comprise storing the stable microbial consortium and/or each of the microorganisms of the stable microbial consortium (e.g., by freezing (e.g., at −80 C)). In some embodiments, methods further comprise measuring the specified function of the stable microbial consortium using test substrates and methods of measuring the output of the function.

In some embodiments, the technology provides an iterative method in which a portion of a first culture is used to inoculate a second volume of fresh medium. Accordingly, in some embodiments, a portion of a first culture (e.g., a culture produced by inoculating a selective growth medium with an environmental sample) is used to inoculate a second culture (e.g., comprising the same or different growth medium as in the first sample). In some embodiments, a portion of a second culture is used to inoculate a third culture. In some embodiments, a portion of a third culture is used to inoculate a fourth culture. In some embodiments, a portion of a fourth culture is used to inoculate a fifth culture. In some embodiments, a portion of a fifth culture is used to inoculate a sixth culture. In some embodiments, a portion of a sixth culture is used to inoculate a seventh culture. In some embodiments, a portion of a seventh culture is used to inoculate an eighth culture. In some embodiments, a portion of an Nth culture is used to inoculate an N+1th culture. In some embodiments, the Nth culture is a first culture inoculated using at least a portion of an environmental sample. In some embodiments, the Nth culture is a second, third, fourth, fifth, sixth, seventh, eighth, etc. culture inoculated using at least a portion of a culture inoculated using a predecessor culture (e.g., a first, second, third, fourth, fifth, sixth, or seventh culture, respectively). As used herein, the process of iterative culturing by using a portion of an Nth culture to inoculate an N+1th culture is called "passaging" of the culture.

Further, a culture inoculated directly from an environmental sample may be referenced herein as a P0 (zero) culture; the first passage comprises using a portion of the P0 culture to inoculate fresh culture medium to produce a P1 culture; the second passage comprises using a portion of the P1 culture to inoculate fresh culture medium to produce a P2 culture; the third passage comprises using a portion of the P2 culture to inoculate fresh culture medium to produce a P3 culture; the fourth passage comprises using a portion of the P3 culture to inoculate fresh culture medium to produce a P4 culture; the fifth passage comprises using a portion of the P4 culture to inoculate fresh culture medium to produce a P5 culture; the sixth passage comprises using a portion of the P5 culture to inoculate fresh culture medium to produce a P6 culture; the seventh passage comprises using a portion of the P6 culture to inoculate fresh culture medium to produce a P7 culture; the eighth passage comprises using a portion of the P7 culture to inoculate fresh culture medium to produce a P8 culture; and the Nth passage comprises using a portion of the P(N−1) culture to produce a PN culture. As used herein, the term "passage number" refers a specific passaging as indicated by the number, e.g., passage number 1 refers to the first passage, passage number 2 refers to the second passage, etc.

In some embodiments, the volume of a portion of an Nth (e.g., first) culture used to inoculate an N+1th (e.g., second) culture) is from 100 μl to 100 L or more, depending on the scale of the culturing process (e.g., from research scale to a pilot scale to a commercial production scale). Accordingly, embodiments provide removing a volume of 100 μl to 100 L (e.g., 100, 150, 200, 250, 300, 350, 400, 450, 500, 550, 600, 650, 700, 750, 800, 850, 900, 950, or 1000 μl; 1, 2, 5, 10, 20, 50, 100, 150, 200, 250, 300, 350, 400, 450, 500, 550, 600, 650, 700, 750, 800, 850, 900, 950, or 1000 mL; or 1, 2, 5, 10, 20, 50, or 100 L) from one culture and adding the volume to fresh culture medium. In some embodiments, the ratio of the inoculating volume to the volume of fresh culture medium is from approximately 1:10 to 1:1000. Accordingly, in some embodiments, the volume of the fresh culture medium is from 1 ml to 100,000 L (e.g., 1; 2; 5; 10; 20; 50; 100; 200; 500; or 1000 mL; 1; 2; 5; 10; 20; 50; 100; 200; 500; 1000; 2000; 5000; 10,000; 20,000; 50,000; or 100,000 L).

Growth of Cultures

In some embodiments, the technology provides methods for reducing the complexity of a community of microbes (e.g., present in an environmental sample) while selecting for a microbial consortium that performs a specified function and/or identifying a microbial consortium that performs a specified function. Exemplary functions for which microbial consortia may be selected and/or identified include, e.g., photosynthesis (e.g., oxygenic photosynthesis and/or anoxygenic photosynthesis), phosphorus solubilization or mobilization, biodegradation, fermentation, production of chemical precursors, biosensing, nitrogen fixation, carbon fixation, and/or production of a durable carbon compound to provide a carbon sink to remove atmospheric carbon (e.g., production of melanin).

In some embodiments, environmental samples are used to inoculate a culture medium and the inoculated culture medium is grown under selective conditions provided by the culture medium (e.g., presence, absence, or type of carbon source; presence, absence, or type of nitrogen source; presence, absence, or type of cofactors, minerals, vitamins, or other nutrients; presence, absence, or type of cations and/or anions; presence, absence, or type of trace minerals, cations, and/or anions; presence, absence, or type of a solid growth substrate such as sand or other solid substrate) or by selective conditions provided external to the growth medium (e.g., temperature; humidity; presence, absence, wavelength, and/or intensity of light; light/dark cycle; pressure; culture volume; culture volume material, size, or geometry; presence, absence, type, or strength of culture agitation; presence, absence, and/or type of gases provided).

In some embodiments, a culture is inoculated and grown for a length of time, e.g., 30 to 60 minutes (e.g., 30.0, 30.5, 31.0, 31.5, 32.0, 32.5, 33.0, 33.5, 34.0, 34.5, 35.0, 35.5, 36.0, 36.5, 37.0, 37.5, 38.0, 38.5, 39.0, 39.5, 40.0, 40.5, 41.0, 41.5, 42.0, 42.5, 43.0, 43.5, 44.0, 44.5, 45.0, 45.5, 46.0, 46.5, 47.0, 47.5, 48.0, 48.5, 49.0, 49.5, 50.0, 50.5, 51.0, 51.5, 52.0, 52.5, 53.0, 53.5, 54.0, 54.5, 55.0, 55.5, 56.0, 56.5, 57.0, 57.5, 58.0, 58.5, 59.0, 59.5, or 60.0 minutes); 1 to 24 hours (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, or 24.0 hours); 1 to 30 days (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, 20.0, 20.5, 21.0, 21.5, 22.0, 22.5, 23.0, 23.5, 24.0, 24.5, 25.0, 25.5, 26.0, 26.5, 27.0, 27.5, 28.0, 28.5, 29.0, 29.5, or 30.0 days); and/or 1 to 10 weeks (e.g., 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10.0 weeks).

In some embodiments, empirical measurements of growth rate, time to exponential growth phase, time to culture saturation, or other culture growth characteristics are measured to identify a length of time for culture growth. In some embodiments, a growth time is selected that provides a culture at or near the end of exponential growth phase to provide a culture with a robust type and number of microorganisms for further characterization and/or selection. In some embodiments, growth is measured quantitatively and/or qualitatively using a measurement of the absolute or relative number of microorganisms in a defined volume of culture. In some embodiments, the absolute or relative number of microorganisms in a defined volume of culture is measured using light scattering, measuring dry or wet mass of solids (e.g., cells) isolated from the culture, counting colonies grown on solid medium using a portion of the culture, or measuring some other characteristic of the culture or a portion thereof that has a correlative or causal connection with the number of microorganisms in the culture. In some embodiments, growth is characterized by determining a growth curve; in some embodiments, growth is characterized by determining a doubling time and/or time to half saturation. In some embodiments, growth rates are modeled using empirical data (e.g., using a logarithmic model of growth).

Genetic Characterization

In some embodiments, the microorganisms in a culture are characterized by shotgun metagenomic sequencing. Techniques and systems to obtain genetic sequences from multiple organisms in a sample, such as an environmental or clinical sample, are well known by persons skilled in the art. For example, Zhou et al. (Appl. Environ. Microbiol. (1996) 62:316-322) provides a robust nucleic acid extraction and purification. This protocol may also be modified depending on the experimental goals and environmental sample type, such as soils, sediments, and groundwater. Many commercially available DNA extraction and purification kits can also be used. Samples with lower than 2 pg purified DNA may require amplification, which can be performed using conventional techniques known in the art, such as a whole community genome amplification (WCGA) method (Wu et al., Appl. Environ. Microbiol. (2006) 72, 4931-4941). Techniques and systems for obtaining purified RNA from environmental samples are also well known by persons skilled in the art. For example, the approach described by Hurt et al. (Appl. Environ. Microbiol. (2001) 67:4495-4503) can be used. This method can isolate DNA and RNA simultaneously within the same sample. A gel electrophoresis method can also be used to isolate community RNA (McGrath et al., J. Microbiol. Methods (2008) 75:172-176). Samples with lower than 5 pg purified RNA may require amplification, which can be performed using conventional techniques known in the art, such as a whole community RNA amplification approach (WCRA) (Gao et al., Appl. Environ. Microbiol. (2007) 73:563-571) to obtain cDNA. In some embodiments, environmental sampling and DNA extraction are conducted as previously described (DeSantis et al., Microbial Ecology, 53(3):371-383, 2007).

Isolated nucleic acids (e.g., metagenomic DNA) can be subject to a sequencing method to obtain metagenomic sequencing data. Sequencing methods can be broadly divided into those that typically use template amplification and those that do not. Amplification-requiring methods include pyrosequencing commercialized by Roche as the 454 technology platforms (e.g., GS 20 and GS FLX), Life Technologies/Ion Torrent, the Solexa platform commercialized by Illumina, GnuBio, and the Supported Oligonucleotide Ligation and Detection (SOLiD) platform commercialized by Applied Biosystems. Non-amplification approaches, also known as single-molecule sequencing, are exemplified by the HeliScope platform commercialized by Helicos BioSciences, and emerging platforms commercialized by VisiGen, Oxford Nanopore Technologies Ltd., and Pacific Biosciences, respectively. Accordingly, metagenomic shotgun sequencing comprises, in some embodiments, pyrosequencing, sequencing-by-ligation, single molecule sequencing, sequence-by-synthesis (SBS), semiconductor sequencing, nanopore sequencing, massive parallel clonal, massive parallel single molecule SBS, massive parallel single molecule real-time, massive parallel single molecule real-time nanopore technology, etc. Morozova and Marra provide a review of some such technologies in Genomics, 92: 255 (2008), herein incorporated by reference in its entirety. Those of ordinary skill in the art will recognize that because RNA is less stable in the cell and more prone to nuclease attack experimentally RNA is usually reverse transcribed to DNA before sequencing.

Specific descriptions of some DNA sequencing techniques include fluorescence-based sequencing methodologies (See, e.g., Birren et al., Genome Analysis: Analyzing DNA, 1, Cold Spring Harbor, N.Y.; herein incorporated by reference in its entirety); automated sequencing techniques; parallel sequencing of partitioned amplicons (PCT Publication No: WO2006084132 to Kevin McKernan et al., herein incorporated by reference in its entirety); and sequencing by parallel oligonucleotide extension (See, e.g., U.S. Pat. No. 5,750,341 to Macevicz et al., and U.S. Pat. No. 6,306,597 to Macevicz et al., both of which are herein incorporated by reference in their entireties). Additional descriptions of sequencing techniques include the Church polony technology (Mitra et al., 2003, Analytical Biochemistry 320, 55-65; Shendure et al., 2005 Science 309, 1728-1732; U.S. Pat. Nos. 6,432,360, 6,485,944, 6,511,803; herein incorporated by reference in their entireties), the 454 picotiter pyrosequencing technology (Margulies et al., 2005 Nature 437, 376-380; US 20050130173; herein incorporated by reference in their entireties), the Solexa single base addition technology (Bennett et al., 2005, Pharmacogenomics, 6, 373-382; U.S. Pat. Nos. 6,787,308; 6,833,246; herein incorporated by reference in their entireties), the Lynx massively parallel signature sequencing technology (Brenner et al. (2000). Nat. Biotechnol. 18:630-634; U.S. Pat. Nos. 5,695,934; 5,714,330; herein incorporated by reference in their entireties), and the Adessi PCR colony technology (Adessi et al. (2000). Nucleic Acid Res. 28, E87; WO 00018957; herein incorporated by reference in its entirety). See also, e.g., Voelkerding et al., Clinical Chem., 55: 641-658, 2009; MacLean et al., Nature Rev. Microbiol., 7: 287-296; each herein incorporated by reference in its entirety).

Sequence Analysis

In some embodiments, metagenomic nucleotide sequence data are analyzed to characterize the microbial community (e.g., microbial consortium) from which the metagenomic nucleic acids were obtained. For example, in some embodiments, taxonomic units in a microbial community are taxonomically classified and/or identified by obtaining metagenomic nucleotide sequence data from the microbial community and using an algorithm that associates short genomic substrings (k-mers) in the metagenomic nucleotide sequence data with lowest common ancestor (LCA) taxa (e.g., using a curated database). See, e.g., Wood (2014) "Kraken: ultrafast metagenomic sequence classification using exact alignments" Genome Biology 15: R46 and Wood (2019) "Improved metagenomic analysis with Kraken 2" Genome Biology 20:257, each of which is incorporated herein by reference. In some embodiments, BLAST is used to identify the microbial taxonomic units present in a microbial community (e.g., microbial consortium). See, e.g., Altschul (1990) "Basic local alignment search tool" J Mol Biol 215:403-410, incorporated herein by reference. Other tools for identifying taxonomic units in a microbial community using metagenomic sequence data from the microbial community include, e.g., MEGAN (see, e.g., Huson (2007) "MEGAN analysis of metagenomic data" Genome Res 17:377-386, incorporated herein by reference); PhymmBL (see, e.g., Brady (2009) "Phymm and PhymmBL: metagenomic phylogenetic classification with interpolated Markov models" Nat Methods 6:673-676; and Brady (2011) "PhymmBL expanded: confidence scores, custom databases, parallelization and more" Nat Methods 8:367, each of which is incorporated herein by reference); and the Naïve Bayes Classifier (NBC) (see, e.g., Rosen (2008) "Metagenome fragment classification using N-mer frequency profiles" Adv Bioinformatics 2008:1-12, incorporated herein by reference). In some embodiments, ribosomal RNA sequences are taxonomically identified using average nucleotide identity (ANI) as provided by the GTDB-tk package. See, e.g., Chaumeil (2019) "GTDB-Tk: A toolkit to classify genomes with the Genome Taxonomy Database" Bioinformatics, btz848; Parks (2019) "A complete domain-to-species taxonomy for Bacteria and Archaea" Nat Biotechnol. 38: 1079-86; and Parks (2018) "A standardized bacterial taxonomy based on genome phylogeny substantially revises the tree of life" Nat. Biotechnol 36: 996-1004, each of which is incorporated herein by reference.

In some embodiments, characterizing a microbial community comprises identifying the taxonomic units (e.g., strains, sub-species, species, genera, families) of organisms present in the microbial community in absolute and/or relative terms. In some embodiments, characterizing a microbial community comprises identifying the taxonomic units (e.g., strains, sub-species, species, genera, families) of organisms that have been enriched in a particular passage with respect to a previous passage or initial environmental sample, e.g., in relative terms.

In some embodiments, organisms are identified by comparing nucleotide sequences to a database of ribosomal RNA gene sequences, e.g., nucleotides of the 5S, 16S, and/or 23S ribosomal RNA genes. See, e.g., Tringe and Hugenholtz (2008) "A renaissance for the pioneering 16S rRNA gene" Curr Opin Microbiol 11: 442-46; and Ju and Zhang (2015) "16S rRNA gene high-throughput sequencing data mining of microbial diversity and interactions" Appl Microbiol Biotechnol 99: 4119-29, each of which is incorporated herein by reference. See also the Examples herein. In some embodiments, photosynthetic organisms are identified by comparing nucleotide sequences to a database of plastid 23S ribosomal DNA sequences (see, e.g., Djemiel (2020) "pgreen-db: a reference database for the 23S rRNA gene of eukaryotic plastids and cyanobacteria" Sci Rep. 10: 5915, incorporated herein by reference).

One of ordinary skill in the art understands that there is no clear consensus on bacterial taxonomy. Hundreds of thousands of bacterial genomes are sequenced each year, including genomes that can only be found as members of consortia. As a consequence, new taxonomic classification of these organisms continues to evolve. See, e.g., Coleman (2021) "A rooted phylogeny resolves early bacterial evolution" Science 372:(6542):eabe0511, incorporated herein by reference. Multiple analytical tools (e.g., ANI and BLAST) are used herein to determine the species designation for rRNA nucleotide sequences and to identify associated taxonomies. The bacterial taxonomy provided by sequence database hits using BLAST and the NCBI nucleotide sequence database is sometimes at odds with the taxonomy provided by others. For example, the *Burkholderia* genus is in the Betaproteobacteria at NCBI, but in the Gammaproteobacteria in other databases. In all cases, the indicated species is correct and the assignment to broader taxonomic levels has incorporated the information from the multiple analytical methods used.

Additional software packages for producing and analyzing nucleotide sequences are fastp, bowtie2, and FATQC for quality trimming and evaluation; metaSPADES and MEGAHIT2 for assembly; QUAST for evaluation of assemblies; METABAT2 for binning; GTDB-tk for taxonomic classification; and Barrnap for ribosomal RNA prediction. See Example 20.

Community and Consortium Analysis

In some embodiments, the stability of a microbial community and/or microbial consortium is measured, e.g., by deriving a measure of similarity (or dissimilarity) between a first culture and a second culture inoculated using a portion of the first culture and, optionally, following the measure of similarity as a function of subsequent inoculations. In some embodiments, taxonomic classification and/or identification of the organisms in the microbial community (e.g., as provided by the taxonomic classifiers described above (e.g., Kraken 2)) can provide input into such measures of stability. In some embodiments, functional capabilities or functions provided by and/or present in the microbial community (e.g., genes, gene products, functional capabilities and/or activities) provide input into a measure of stability.

Various measures can be used to compare the similarities (or dissimilarities) of microbial communities, including estimates of the richness and diversity of a microbial community (see, e.g., Hughes (2001) "Counting the uncountable: statistical approaches to estimating microbial diversity" Appl. Environ. Microbiol. 67:4399-4406; and Ley (2005) "Obesity alters gut microbial ecology" Proc. Natl. Acad. Sci. USA 102:11070-11075, each of which is incorporated herein by reference) and estimates of alpha or beta diversity, e.g., the Bray-Curtis Dissimilarity Index (Bray and Curtis (1957) "An Ordination of the Upland Forest Communities of Southern Wisconsin" Ecol. Monogr. 27: 325-349, incorporated herein by reference). Bray-Curtis distances may be calculated using the bcdist function in the ecodist package (Goslee (2007) "The ecodist package for dissimilarity-based analysis of ecological data" J Stat Softw 22: 1-19, incorporated herein by reference). Correlation between Bray-Curtis distance matrices of community data, geographical distance, and environmental variables may be calculated using the mantel function in the vegan package (Oksanen, vegan: Community Ecology Package for R); see, e.g., Legendre, P. and Legendre, L. (2012) Numerical Ecology. 3rd English Edition. Elsevier, incorporated herein by reference).

During the development of embodiments of the technology described herein, the Bray-Curtis Dissimilarity index was used to evaluate the stability of microbial consortia (see Examples). The Bray-Curtis Dissimilarity Index is bounded between 0 and 1, where a score of 0 indicates no difference between two cultures, communities, consortia, sites, passages, or other sets of microbes under comparison; and a score of 1 indicates that two cultures, communities, consortia, sites, passages, or other sets of microbes under comparison have no species in common. Accordingly, the Bray-Curtis Dissimilarity index provides a useful metric to measure the amount of change occurring between each individual passage. When the Bray-Curtis dissimilarity score begins to stabilize between passages (e.g., a plot of the Bray-Curtis dissimilarity score as a function of passage and/or time nears a horizontal asymptote), a consortium is approaching maximum stability and thus will have a minimum of variation or no variation from one passage to the next and/or between an inoculum and a subsequent culture produced from the inoculum.

Some context for interpreting the values of Bray-Curtis dissimilarity scores can be gained by comparing well-studied microbiomes, such as those associated with the human body. In one comparative study using a reference set of human microbiome data, the Bray-Curtis dissimilarity between distinct microbiomes (stool and nasal samples) was 0.79±0.08 (SD) and individual stool microbiomes had a mean Bray-Curtis dissimilarity of 0.24±0.17 (SD) when compared to the reference dataset (see, e.g., Maziarz (2018) "Using standard microbiome reference groups to simplify beta-diversity analyses and facilitate independent validation" Bioinformatics 34: 3249-57, incorporated herein by reference). Thus, the lower measure number represents the variability of microbiomes within stool samples and the higher measure indicates the variation between the gut and the respiratory system. These values are intended to be illustrative, and it is to be understood that the measure of Bray-Curtis dissimilarity between other samples may be different and may vary more widely between 0.00 and 1.00.

Several tools are available that provide these and other estimates of microbial community structures (e.g., describing the abundance of community members). See, e.g., LIBSHUFF (Schloss (2004) "Integration of microbial ecology and statistics: a test to compare gene libraries" Appl. Environ. Microbiol. 70:5485-5492; and Singleton (2001) "Quantitative comparisons of 16S rRNA gene sequence libraries from environmental samples" Appl. Environ. Microbiol. 67:4374-4376, each of which is incorporated herein by reference), TreeClimber (Martin (2002) "Phylogenetic approaches for describing and comparing the diversity of microbial communities" Appl. Environ. Microbiol. 68:3673-3682; and Schloss (2006) "Introducing TreeClimber, a test to compare microbial community structures" Appl. Environ. Microbiol. 72:2379-2384, each of which is incorporated herein by reference), UniFrac (Lozupone (2005) "UniFrac: a new phylogenetic method for comparing microbial communities" Appl. Environ. Microbiol. 71:8228-8235, incorporated herein by reference), and analysis of molecular variance (AMOVA) (Excoffier (1992) "Analysis of molecular variance inferred from metric distances among DNA haplotypes: application to human mitochondrial DNA restriction data" Genetics 131:479-491; and Martin (2002) "Phylogenetic approaches for describing and comparing the diversity of microbial communities" Appl. Environ. Microbiol. 68:3673-3682, each of which is incorporated herein by reference); DOTUR (Schloss (2005) "Introducing DOTUR, a computer program for defining operational taxonomic units and estimating species richness" Appl. Environ. Microbiol. 71:1501-1506, incorporated herein by reference); and SONS (Schloss (2006) "Introducing SONS, a Tool for Operational Taxonomic Unit-Based Comparisons of Microbial Community Memberships and Structures" Appl Environ Microbiol. 72:6773-6779, incorporated herein by reference), which provides several measures including measures of membership (e.g., incidence-based Sorenson similarity index), community structure using abundance (e.g., Clayton 0 (see, e.g., Yue (2001) "A nonparametric estimator of species overlap" Biometrics 57:743-9, incorporated herein by reference), and community richness (see, e.g., Chao (1984) "Non-parametric estimation of the number of classes in a population" Scand. J. Stat. 11:265-270; Chao (2005) "A new statistical approach for assessing similarity of species composition with incidence and abundance data" Ecol. Lett. 8:148-159; Chao (2000) "Estimating the number of shared species in two communities" Stat. Sinica 10:227-246; Chao (1992) "Estimating the number of classes via sample coverage" J. Am. Stat. Assoc. 87:210-217; and Chao (2006) "The applications of Laplace's boundary-mode approximations to estimate species richness and shared species richness" Aust. N. Z. J. Stat. 48:117-128, each of which is incorporated herein by reference).

Samples

The technology is not limited in the types of samples comprising microorganisms (e.g., environmental samples) that are used as starting material (e.g., an input sample) upon which the methods (e.g., methods for selecting a microbial consortium and/or methods for screening to identify a microbial consortium) as described herein are performed. In some embodiments, the input sample used can be an environmental sample from any source, for example, naturally occurring or artificial atmosphere, water systems and sources, soil or any other sample of interest. In some embodiments, the environmental sample may be obtained from, for example, indoor or outdoor air or atmospheric particle collection systems; indoor surfaces and surfaces of machines, devices, or instruments. In some embodiments, ecosystems are sampled (e.g., in some embodiments, a sample is an environmental sample taken from an ecosystem). Ecosystems can be terrestrial and include all known terrestrial environments including, but not limited to soil, surface, and above surface environments. Ecosystems include those classified in the Land Cover Classification System (LCCS) of the Food and Agriculture Organization and the Forest-Range Environmental Study Ecosystems (FRES) developed by the United States Forest Service. Exemplary ecosystems include forests such as tropical rainforests, temperate rainforest, temperate hardwood forests, boreal forests, taiga, and montane coniferous forests; grasslands including savannas and steppes; deserts; wetlands including marshes, swamps, bogs, estuaries, and sloughs; riparian ecosystems, alpine, and tundra ecosystems. Ecosystems further include those associated with aquatic environments such as lakes, streams, springs, coral reefs, beaches, estuaries, sea mounts, trenches, and intertidal zones. Ecosystems also comprise soils, humus, mineral soils, and aquifers. Ecosystems further encompass underground environments, such as mines, oil fields, caves, faults and fracture zones, geothermal zones, and aquifers. Ecosystems additionally include the microbiomes associated with plants, animals, and humans. Exemplary plant associated microbiomes include those found in or near roots, bark, trunks, leaves, and flowers. Animal and human associated microbiomes include those found in the gastrointestinal tract, respiratory system, nares, urogenital tract, mammary glands, oral cavity, auditory canal, feces, urine, and skin. In some embodiments, the sample can be any kind of clinical or medical sample. For example, samples may be from blood, urine, feces, nares, the lungs, or the gut of mammals.

In some embodiments, one or more environmental samples are collected. If a single environmental sample is collected, methods comprise homogenizing the environmental sample to provide an input sample. If a plurality of environmental samples is collected, methods comprise mixing the plurality of environmental samples to provide a mixed environmental sample and homogenizing the mixed environmental sample to provide an input sample.

In embodiments comprising use of a plurality of environmental samples to produce an input sample, collecting and mixing multiple environmental samples may serve to maximize not only the statistical sample space of microbes to screen from but also the combinations of microbes present in microbial consortia identified and/or produced using the technologies described herein that are applied to the input sample. Further, collecting and mixing multiple environmental samples to produce an input sample upon which the technologies described herein are applied may produce novel microbial consortia that do not exist in nature by combining microbes that normally do not live in the same environment in nature. In some embodiments, various environmental samples from geographically disparate areas may be mixed to further increase the statistical sample space of combinations of microbial consortia. For instance, embodiments provide that a plurality of environmental samples may be obtained wherein each environmental sample is taken from a different ecosystem, habitat, and/or ecological niche. Embodiments further provide that a plurality of environmental samples may be obtained from sites that are separated from each other by 1 m, 10 m, 100 m, 1000 m, 10,000 m, or by more than 10,000 m. In some embodiments, the samples are obtained from two or more points anywhere on the Earth, including above and below the surface of land and water areas of the Earth.

In some instances, multiple input samples may be created during the collection. Each input sample of the multiple input samples may comprise a different combination of individual environmental samples that are mixed together. For example, environmental samples A, B, and C (from one or more different ecosystems, habitats, and/or ecological niches) may be mixed to provide an input sample comprising A and B, B and C, or A and C. As a further example, environmental samples A, B, C, and D (from one or more different ecosystems, habitats, and/or ecological niches) may be mixed to provide an input sample comprising A, B, and C; A, B, and D; A, C, and D; or B, C, and D. As another example, environmental samples A, B, C, D, and E (from one or more different ecosystems, habitats, and/or ecological niches) may be mixed to provide an input sample comprising A and B; A and C; A and D; A and E; B and C; B and D; B and E; C and D; C and E; D and E; A, B, and C; A, B, and D; A, B, and E; A, C, and D; A, C, and E; A, D, and E; B, C, and D; B, C, and E; B, D, and E; C, D, and E; A, B, C, and D; A, B, C, and E; A, B, D, and E; A, C, D, and E; B, C, D, and E; or A, B, C, D, and E. Each input sample of the multiple input samples may comprise a range of fractional compositions of any two individual environmental samples of a plurality of individual samples that are mixed together to provide the input sample. For example, any two individual environmental samples may be mixed together to provide an input sample comprising a fractional composition of a first environmental sample ranging from 0.01 to 0.99 (e.g., comprising 0.01, 0.05, 0.10, 0.20, 0.30, 0.40, 0.50, 0.60, 0.70, 0.80, 0.90, 0.95, or 0.99 of the first environmental sample) and comprising a fractional composition of a second environmental sample ranging from 0.99 to 0.01 (e.g., comprising 0.99, 0.95, 0.90, 0.80, 0.70, 0.60, 0.50, 0.40, 0.30, 0.20, 0.10, 0.05, or 0.01 of the second environmental sample).

The input sample may be isolated and developed using variations of quantity and type environmental samples mixed. This is because it is recognized that a combination of microbes may not only be beneficial but may also cause individual microbes to become less effective or be dominated by microbes from foreign environmental samples. Further, embodiments of the technology comprise use of a single environmental sample that is homogenized to provide the input sample. One of ordinary skill in the art understands that a single environmental sample may comprise multiple individual ecosystems or ecological niches that are unmixed in nature but that become mixed when the single sample is homogenized. For example, an environmental sample may comprise a plurality of separate subsamples than are present as separate strata, layers, or subcommunities e.g., strata of a cylindrical soil core sample, strata of a microbial mat sample, strata of a water column sample, subcommunities of a microbial community comprising a biofilm, etc.

Thus, embodiments of the methods provided herein comprise use of a single environmental sample that is homogenized to provide an input sample and/or comprise use of a plurality of environmental samples that are mixed and homogenized to provide an input sample.

Microbial Consortia

As described herein, the technology provides a microbial consortium having a specified function. In some embodiments, a microbial consortium is produced according to selection methods described herein. In some embodiments, the technology applies selective conditions to a sample (e.g., comprising a homogenized environmental sample or a plurality of environmental samples that are homogenized) and the selective conditions reduce the complexity of the community of microbes and improves a function of the microbial community.

During the development of embodiments of the technology described herein, embodiments of the selection methods produced three microbial consortia named BW01, BW02, and BW05. Each of the BW01 and BW02 consortia comprised an organism that was taxonomically identified using 16S rRNA gene sequences as being a *Nostoc* species or as being similar to unclassified *Nostoc* species that may form a separate clade from other known *Nostoc* species. Furthermore, all minimal consortia produced from BW01, BW02, and BW05 comprised a member of the family Nostocaceae. These organisms were identified as *Nostoc punctiforme* PCC 73102, *Nostoc* sp. NIES-4103, *Nostoc* sp. UAM 307 and *Dolichospermum flos-aquae*. These members represent three *Nostoc* genera: *Nostoc* PCC-73102*, Desmonostoc* PCC-6302, and *Desmonostoc* PCC-7422. (Example 20). In independent experiments that produced microbial consortia and six minimal consortia (Example 21), all six of the minimal consortia included a Nostocor photosynthetic *Nostoc*-like organism, e.g., an *Anabaena* species.

The *Nostoc* or *Nostoc*-like organism of the microbial consortia was present at an abundance of approximately 30% of the consortium population. The original input soil samples comprised *Nostoc* spp. at less than 0.1% of the microbial population. Thus, while the *Nostoc* spp. or *Nostoc*-like spp. was present in the input samples, it was present at a very low level in the environment. The growth conditions applied during the development of embodiments of the technology were chosen to select for species that grow photoautotrophically and fix nitrogen from the atmosphere. Under these conditions, the *Nostoc* spp. or *Nostoc*-like spp. were highly competitive and significantly increased in relative abundance in the cultures to provide the major component of both the BW01 and BW02 consortia. Without being bound by theory, it is contemplated that *Nostoc* spp. or *Nostoc*-like spp. are the key energy provider at the top of the energy web of the BW01, BW02, and BW05 consortia. In particular, it is contemplated that *Nostoc* spp. (or *Nostoc*-like spp.) in BW01, BW02, and BW05 function to: 1) fix carbon (e.g., as a photosynthetic output (e.g., in the form of exocellular polymeric substances (EPS))); and 2) fix nitrogen. Accordingly, embodiments of the technology provide a microbial consortium comprising at least 30% *Nostoc* spp. (e.g., at least 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, or more).

Further, during the development of embodiments of the technology described herein, experiments indicated that the BW01 and BW02 microbial consortia (e.g., comprising at least 30% *Nostoc* spp.) produced by the selection methods also comprised a number of heterotrophic organisms. Without being bound by theory, it is contemplated that the heterotrophs import and metabolize organic compounds, such as polysaccharides associated with the EPS produced by the *Nostoc* spp or *Nostoc*-like spp. Cyanobacteria have been shown to release significant quantities of available carbon into their environment, which the cyanobacteria or others in the environment may use. See, e.g., Stuart (2016) "Cyanobacterial reuse of extracellular organic carbon in microbial mats" ISME J. 10: 1240-51 (2016); Bertilsson (2005) "Release of dissolved organic matter by Prochlorococcus" Vie et Milieu 55: 225-31, each of which is incorporated herein by reference.

Some genera decreased during the passaging process. For example, data collected from characterizing the BW01 and BW02 consortia indicated that the consortia comprised low levels of genera such as *Bacillus* spp., *Bradyrhizobium* spp., *Streptomyces* spp., and *Pseudomonas* spp. While these genera were all present in input samples, the amount of each of these genera decreased through the passaging process to a lower amount in the BW01 and BW02 consortia. Accordingly, these data indicated that the metabolic functions of these genera are inadequate to support growth of these organisms in the light-driven consortia BW01 and BW02.

Some genera, such as *Methylobacterium* spp., were present at a relatively low level in input samples and remained at a similarly low level throughout the selection process. Accordingly, these data indicate that these microbes are not adversely affected by the selection conditions and thus may interact with major genera (e.g., *Nostoc* spp.) of the consortia or consume metabolic products produced by other organisms of the consortia.

Several genera increased during P1 before decreasing in P2 and continuing to decrease in P3 and P4. These genera may be important for the selection process. Without being bound by theory, it is contemplated that these genera may be necessary for succession of the population as it moves towards stability and/or that these genera may also be transiently competitive with the other species. Genera that increased during passaging included *Brevundimonas* spp. and *Aminobacter* spp. in both BW01 and BW02. Both are Alphaproteobacteria, and their exact roles as bottleneck resolvers are not presently known.

Data collected during experiments described herein indicated that the phototropic purple bacteria of the genus *Rhodobacter* spp. was found within the genera represented.

Purple photosynthetic bacteria have been shown to provide a myriad of benefits for agriculture, including phosphate solubilization, nitrogen fixation, and plant growth promotion (see, e.g., Sakarika (2020) "Purple non-sulphur bacteria and plant production: benefits for fertilization, stress resistance and the environment" Microb. Biotechnol. 13: 1336-65, incorporated herein by reference). Purple bacteria perform the functions of anoxygenic photosynthesis and carbon fixation and do not perform the functions of aerobic photosynthesis or nitrogen fixation; and these processes are exquisitely regulated in these organisms as a response to oxygen availability (see, e.g., McEwan (1994) "Photosynthetic electron transport and anaerobic metabolism in purple non-sulfur phototrophic bacteria" Antonie Van Leeuwenhoek 66: 151-164, incorporated herein by reference). Accordingly, it is contemplated that these metabolically diverse purple bacteria consume secretions of *Nostoc* spp. in the consortium when oxygen is present. In natural, complex biofilms (e.g., in an agricultural environment), anoxygenic phototrophs are exposed to both light and anoxygenic conditions. Anoxygenic phototrophs have been shown to compose the lower layers of biofilms where the oxygen tension is reduced (see, e.g., Roeselers (2008) "Phototrophic biofilms and their potential applications" J. Appl. Phycol. 20: 227-35; and Martinez-Alonso (2005) "Diversity of anoxygenic phototrophic sulfur bacteria in the microbial mats of the Ebro Delta: a combined morphological and molecular approach" FEMS Microbiol. Ecol. 52: 339-50, each of which is incorporated herein by reference). Without being bound by theory, it is contemplated that purple photosynthetic bacteria contribute to the carbon fixation of a mature biofilm by absorbing infrared light that passes through the upper layers comprising chlorophyll a-containing *Nostoc* spp. and fixing carbon and nitrogen in the anaerobic lower layers of the biofilm.

Some consortia comprise one or more additional photosynthetic members from a bacterial genus that is *Nodularia, Chrysosporum, Gloeocapsopsis, Richelia, Mastigocoleus, Hapalosiphon, Gloeothece, Acaryochloris, Kamptonema, Raphidiopsis, Crocosphaera, Macrochaete, Thermosynechococcus, Pseudanabaena, Chroococcidiopsis, Prochlorothrix, Anabaena, Leptolyngbya, Calothrix, Cylindrospermopsis, Dolichospermum, Scytonema, Lyngbya, Tolypothrix, Fischerella, Fortiea, Aliterella, Hydrocoryne, Prochlorococcus, Planktothrichoides, Geitlerinema, Xenococcus, Jaaginema, Nostochopsis, Pantanalinema, Oscillatoria, Spirulina, Pelatocladus, Nodosilinea, Aphanizomenon, Chlorogloeopsis, Gloeocapsa, Calenema, Rivularia, Trichormus, Synechococcus, Synechocystis, Cylindrospermum, Planktothrix, Bosea, Shinella, Novosphingobium, or Rubidibacter; or from an algal genus that is Tetraselmis, Chlorella, Coleochaete, Gonium, Paradoxia, Cymbomonas, Palmaria, Characiochloris, Marvania, Chlamydomonas, Parachlorella, Coccomyxa, Trebouxia, Cyanidium, Treubaria, Dangeardinia, Galdieria, Nyholmiella, Porphyra, Chara, Ankistrodesmus, Picochlorum, Cyanophora, Chondrus, Pseudochloris, Interfilum, Gelidium, Symphyogyna, Chlorosarcina*, or *Cyanothece*.

In some embodiments, the technology provides a microbial consortium comprising an organism that has a ribosomal RNA gene sequence provided by one of SEQ ID NO: 1, 3, 7, 10, 13, 19, 22, 26, 30, 32, 34, 35, 39, 42, 45, 51, 54, 57, 61, 63, 66, 70, 74, 84, 89, 99, 103, 108, 116, 122, 123, or 125. In some embodiments, the technology provides a microbial consortium comprising on organism that has a ribosomal RNA gene sequence that has ≥97%, ≥95%, ≥90%, ≥80%, or ≥70% nucleotide sequence identity to a nucleotide sequence provided by one of SEQ ID NO: 1, 3, 7, 10, 13, 19, 22, 26, 30, 32, 34, 35, 39, 42, 45, 51, 54, 57, 61, 63, 66, 70, 74, 84, 89, 99, 103, 108, 116, 122, 123, or 125.

In some embodiments, the technology provides a microbial consortium comprising an organism that has a ribosomal RNA gene sequence provided by the consensus sequence of SEQ ID NO: 127:

```
ACGGAGAGTTTGATCCTGGCTCAGGATGAACGCTGGCGGTATGCTTAACA
CATGCAAGTCGAACGGTGTCTTCGGACATAGTGGCGGACGGGTGAGTAAC
GCGTGAGAATCTnGCTTCAGGTCTGGGACAACCACTGGAAACGGTGGCTA
ATACCGGATGTGCCGnAAGGTGAAAGGnTTnCTGCCTnAAGATGAGCTCG
CGTCTGATTAGCTAGTnGGTGGGGTAAnAGnCTACCnAGGCGACGATCAG
TAGCTGGTCTGAGAGGAnGATCAGCCACACTGGGACTGAGACACGGCCCA
GACTCCTACGGGAGGCAGCAGTGGGGAATTTTCCGCAATGGGCGAAAGCC
TGACGGAGCAATACCGCGTGAGGGAGGAAGGCTCTTGGGTTGTAAACCTC
TTTTCTCAGGGAAGAACACAATGACGGTACCTGAGGAATAAGCATCGGCT
AACTCCGTGCCAGCAGCCGCGGTAATACGGAGGATGCAAGCGTTATCCGG
AATGATTGGGCGTAAAGCGTCCGCAGGTGGCnnTGTAAGTCTGCTGTTAA
AGAGTnTAGCTCAACTnnATAAAGGCAGTGGAAACTACAnAGCTAGAGTn
CGTTCGGGGCAGAGGGAATTCCTGGTGTAGCGGTGAAATGCGTAGAGATC
AGGAAGAACACCGGTGGCGAAGGCGCTCTGCTAGGCCGnAACTGACACTG
AGGGACGAAAGCTAGGGGAGCGAATGGGATTAGATACCCCAGTAGTCCTA
GCCGTAAACGATGGATACTAGGCGTGGCTTGTATCGACCCGAGCCGTGCC
GTAGCTAACGCGTTAAGTATCCCGCCTGGGGAGTACGCnCGCAAnnGTGA
AACTCAAAGGAATTGACGGGGGCCCGCACAAGCGGTGGAGTATGTGGTTT
AATTCGATGCAACGCGAAGAACCTTACCAAGGCTTGACATGTCGCGAATC
CTnCTGAAAGGnGGGAGTGCCTTCGGGAGCGCGAACACAGGTGGTGCATG
GCTGTCGTCAGCTCGTGTCGTGAGATGTTGGGTTAAGTCCCGCAACGAGC
GCAACCCTCGTTTTTAGTTGCCAGCATTAAGTTGGGCACTCTAGAGAGAC
TGCCGGTGACAAACCGGAGGAAGGTGGGGATGACGTCAAGTCAGCATGCC
CCTTACGCCTTGGGCTACACACGTACTACAATGCTnCGGACAGAGGGCAG
CAAGCnAGCGAnnGCAAGCnAATCCCnTAAACCGnnGCTCAGTTCAGATC
GCAGGCTGCAACTCGCCTnCGTGAAGGAGGAATCGCTAGTAATTGCAGGT
CAGCATACTGCAGTGAATTCGTTCCCGGGCCTTGTACACACCGCCCGTCA
CACCATGGAAGCTGGnAACGCCCGAAGTCATTACTCCAACCTTTCGGGGA
GGAGGATGCCTAAGGCAGGnCTGGTGACTGGGGTGAAGTCGTAACAAGGT
AGCCGTACCGGAAGGTGTGGCTGGATCACCTCCTTTn
```

In some embodiments, the technology provides a microbial consortium comprising an organism that has a ribosomal RNA gene sequence that is 95, 96, 97, 98, or 99% identical to the consensus sequence of SEQ ID NO: 127.

In some embodiments, the technology provides a microbial consortium comprising an organism that is *Aliinostoc* sp. SA22, *Amazonocrinis nigriterrae, Amazonocrinis nigriterrae* CENA18, *Amazonocrinis nigriterrae* CENA66, *Amazonocrinis nigriterrae* CENA67, *Amazonocrinis nigriterrae* CENA69, *Amazonocrinis thailandica, Amazonocrinis thai-*

*landica* NUACC02, *Amazonocrinis thailandica* NUACC03, *Anabaena catenula* SAG 1403-1, *Anabaena oryzae* Ind3, *Anabaena oryzae* WY07, *Anabaena oscillarioides* str. BO HINDAK 1984/43, *Anabaena* sp. 0830-A, *Anabaena* sp. CCAP 1403/4A, *Anabaena* sp. HBU1, *Anabaena* sp. HBU10, *Anabaena* sp. Ind5, *Anabaena* sp. KVSF7, *Anabaena* sp. PCC 7108, *Anabaena* sp. SN430, *Anabaena* sp. YBS01, *Anabaenopsis circularis* NIES-21, *Atlanticothrix silvestris, Atlanticothrix silvestris* CENA368, *Atlanticothrix silvestris* CENA564, *Atlanticothrix silvestris* CENA576, *Atlanticothrix silvestris* CENA579, *Atlanticothrix silvestris* CENA585, *Atlanticothrix silvestris* CENA590, *Aulosira laxa* NIES-50, *Aulosira* sp. CENA272, *Aulosira* sp. CENA288, *Aulosira* sp. CENA291, *Aulosira* sp. CENA295, *Calothrix brevissima* IAM M-249, *Calothrix brevissima* NIES-22, *Calothrix membranacea* SAG 1410-1, *Calothrix* sp. CCAP 1410/13, *Calothrix* sp. CENA283, *Calothrix* sp. CHAB TP201506, *Calothrix* sp. CHAB TP201518, *Calothrix* sp. CHAB TP201519, *Calothrix* sp. CHAB TP201521, *Calothrix* sp. CHAB TP201524, *Calothrix* sp. CHAB TP201528, *Calothrix* sp. CHAB2384, *Calothrix* sp. NIES-2098, *Calothrix* sp. NIES-2099, *Calothrix* sp. NIES-2100, *Calothrix* sp. PCC 7507, *Calothrix* sp. SA4, *Calothrix* sp. SA47, *Camptylonemopsis* sp. HA4241-MV5, *Chrysosporum bergii* 09-02, *Chrysosporum bergii* ANA360D, *Compactonostoc shennongjiaense, Constrictifilum karadense, Constrictifilum karadense* MKW3, *Constrictifilum* sp. Assy 17, *Cyanocohniella rudolphia, Cyanocohniella rudolphia* SY-1-2-Y, *Cyanocohniella* sp. SY-1-2-EE, *Cylindrospermum catenatum* CCALA 999, *Cylindrospermum muscicola* ACSSI 140, *Cylindrospermum muscicola* Ind12, *Cylindrospermum muscicola* SAG 44.79, *Cylindrospermum skujae* ACSSI 112, *Cylindrospermum* sp. ACSSI 010, *Cylindrospermum* sp. ACSSI 028, *Cylindrospermum* sp. ACSSI 040, *Cylindrospermum* sp. ACSSI 041, *Cylindrospermum* sp. ACSSI 043, *Cylindrospermum* sp. CHAB2115, *Cylindrospermum* sp. NIES-4074, *Cylindrospermum* sp. YK2-01, *Dendronalium phyllosphericum, Dendronalium phyllosphericum* CENA358, *Dendronalium phyllosphericum* CENA389, *Dendronalium phyllosphericum* CENA73, *Desikacharya* sp. PS2C, *Desmonostoc caucasicum, Desmonostoc caucasicum* MZ-C154, *Desmonostoc danxiaense, Desmonostoc danxiaense* CHAB5868, *Desmonostoc danxiaense* CHAB5869, *Desmonostoc lechangense, Desmonostoc lechangense* CFO1, *Desmonostoc magnisporum, Desmonostoc magnisporum* AR6_PS, *Desmonostoc muscorum, Desmonostoc* muscorum 9a, *Desmonostoc muscorum* ACSSI 091, *Desmonostoc muscorum* ACSSI 149, *Desmonostoc muscorum* CCAP 1453/22, *Desmonostoc muscorum* CCAP 1453/32, *Desmonostoc muscorum* CCAP 1453/8, *Desmonostoc muscorum* DRSCY01, *Desmonostoc muscorum* I, *Desmonostoc muscorum* Ind33, *Desmonostoc muscorum* SAG 57.79, *Desmonostoc muscorum* SERB 54, *Desmonostoc muscorum* UTAD_N213, *Desmonostoc persicum, Desmonostoc punense, Desmonostoc punense* MCC 2741, *Desmonostoc salinum, Desmonostoc salinum* CCM-UFV059, *Desmonostoc* sp., *Desmonostoc* sp. CCIBT 3489, *Desmonostoc* sp. CCIBt3489, *Desmonostoc* sp. CCM-UFV020, *Desmonostoc* sp. CCM-UFV069, *Desmonostoc* sp. CCM-UFV070, *Desmonostoc* sp. CENA362, *Desmonostoc* sp. CENA363, *Desmonostoc* sp. CENA365, *Desmonostoc* sp. CENA371, *Desmonostoc* sp. CENA380, *Desmonostoc* sp. CENA383, *Desmonostoc* sp. CENA386, *Desmonostoc* sp. Dsl, *Desmonostoc* sp. PCC 6302, *Desmonostoc* sp. PCC 7422, *Desmonostoc* sp. PCC 7906, *Desmonostoc* sp. PCC 8107, *Desmonostoc* sp. PCC 8306, *Desmonostoc* sp. SA25, *Desmonostoc* sp. UHCC0398, *Dolichospermum flos-aquae, Dolichospermum flos-aquae* FACHB-245, *Dolichospermum flos-aquae* UTCC 64, *Fortiea laiensis* HA4221-MV2, *Fortiea* sp. PS4G, *Fremyella diplosiphon* NIES-3275, *Geitlerinema* sp. CHAB TP201828.1, *Geitlerinema* sp. CHAB TP201828.2, *Gloeotrichia echinulata* PYH14, *Goleter apudmare* HA4356-MV2, *Goleter* sp. CHAB TP201702.1, *Goleter* sp. CHAB TP201821.1, *Goleter* sp. CHAB TP201823.11, *Goleter* sp. CHAB TP201823.2, *Goleter* sp. CHAB TP201823.8, *Johanseniella* A1345, *Johanseniella* sp. CENA33, *Komarekiella atlantica, Komarekiella atlantica* CCIBt 3307, *Komarekiella atlantica* CCIBt 3481, *Komarekiella atlantica* CCIBt 3483, *Komarekiella atlantica* CCIBt 3486, *Komarekiella atlantica* CCIBt 3487, *Komarekiella atlantica* CCIBt 3552, *Komarekiella atlantica* CENA107, *Komarekiella globosa, Komarekiella globosa* PJ104, *Microchaete diplosiphon* CCALA 811, *Microchaete* sp. CENA541, *Microchaete* sp. SAG 47.93, *Nodularia* sp. Su-A, *Nodularia sphaerocarpa* HKVV, *Nodularia sphaerocarpa* UHCC 0038, *Nodularia spumigena, Nostoc caeruleum* SAG 52.79, *Nostoc calcicola, Nostoc calcicola* 99, *Nostoc calcicola* AM50C, *Nostoc calcicola* BDU 180601, *Nostoc calcicola* BDU 40302, *Nostoc calcicola* III, *Nostoc calcicola* SAG 1453-1, *Nostoc calcicola* VI, *Nostoc carneum, Nostoc carneum* Cy_nb3, *Nostoc carneum* IAM M-35, *Nostoc carneum* NIES-2107, *Nostoc carneum* SERB 44, *Nostoc carneum* SN437, *Nostoc carneum* SU_cyano_N, *Nostoc* cf. *commune* 257-16, *Nostoc* cf. *commune* 257-20, *Nostoc* cf. *commune* KG-54, *Nostoc* cf. *commune* SO-36, *Nostoc* cf. *edaphicum* Us-2-2, *Nostoc* cf. *indistinguendum* F15-VF12, *Nostoc* cf. *indistinguendum* F15-VF4, *Nostoc* cf. *lichenoides* JT1-VF3, *Nostoc* cf. *verrucosum, Nostoc commune, Nostoc commune* OBrien 02011101, *Nostoc commune* 15CT-1.2, *Nostoc commune* 15CT-3.1, *Nostoc commune* ACSSI 030, *Nostoc commune* ACSSI 035, *Nostoc commune* ACT709, *Nostoc commune* AHNG0605, *Nostoc commune* BEA 0028, *Nostoc commune* CANT2, *Nostoc commune* CANT4, *Nostoc commune* CCAP 1453/24, *Nostoc commune* CCIBt 3485, *Nostoc commune* EV1-KK1, *Nostoc commune* FACHB 261, *Nostoc commune* HK-02, *Nostoc commune* KU002, *Nostoc commune* LSB51, *Nostoc commune* LSB511, *Nostoc commune* LSB84, *Nostoc commune* Mon62, *Nostoc commune* PS27-2.2, *Nostoc commune* SAG 1453-3, *Nostoc commune* SIK85, *Nostoc commune* SIK94, *Nostoc commune* SN444, *Nostoc commune* SN450, *Nostoc commune* UTEX 584, *Nostoc commune* WY1KK1, *Nostoc commune* YK-04, *Nostoc commune* var. *flagelliforme* CCAP 1453/33, *Nostoc desertorum, Nostoc desertorum* CM1-VF14, *Nostoc edaphicum* ACCS 059, *Nostoc edaphicum* ACSSI 156, *Nostoc edaphicum* CCNP1411, *Nostoc edaphicum* KZ-5-4-7, *Nostoc edaphicum* TAU-MAC 2615, *Nostoc edaphicum* X, *Nostoc elgonense* QUCCCM128, *Nostoc elgonense* TH3S05, *Nostoc ellipsosporum* CCAP 1453/15, *Nostoc ellipsosporum* CCAP 1453/2, *Nostoc ellipsosporum* QUCCCM991490, *Nostoc ellipsosporum* V, *Nostoc ellipsosporum* str. Lukesova 52_91, *Nostoc entophytum* IAM M-267, *Nostoc entophytum* ISC 32, *Nostoc favosum, Nostoc favosum* CHAB5713, *Nostoc favosum* CHAB5714, *Nostoc flagelliforme* CCNUN1, *Nostoc flagelliforme* CHAB2816, *Nostoc flagelliforme* IMGA0408, *Nostoc flagelliforme* str. Sunitezuoqi, *Nostoc indistinguendum, Nostoc indistinguendum* CM1-VF10, *Nostoc insulare* SAG 54.79, *Nostoc lichenoides, Nostoc lichenoides* CNP-AK1, *Nostoc linckia, Nostoc linckia* ACSSI 271, *Nostoc linckia* BEA 0870B, *Nostoc linckia* NIES-25, *Nostoc linckia* var. *arvense* IAM M-30, *Nostoc microscopicum* SAG 40.87, *Nostoc minutum* ACSSI 155, *Nostoc minutum* ACSSI 167, *Nostoc minutum*

ACSSI 168, *Nostoc minutum* NIES-26, *Nostoc mirabile, Nostoc mirabile* CHAB5756, *Nostoc* oromo, *Nostoc* oromo ETH. 2.4. M.5, *Nostoc oryzae, Nostoc paludosum* BA033, *Nostoc parmelioides* SAG 58.79, *Nostoc piscinale* BF3, *Nostoc piscinale* CENA21, *Nostoc pruniforme* SAG 62.79, *Nostoc punctiforme, Nostoc punctiforme* ACCS 074, *Nostoc punctiforme* ACSSI 037, *Nostoc punctiforme* ACSSI 160, *Nostoc punctiforme* BKP_NB59, *Nostoc punctiforme* BKP_NS61, *Nostoc punctiforme* BKP_NS62, *Nostoc punctiforme* BKP_NS63, *Nostoc punctiforme* BKP_NS64, *Nostoc punctiforme* BKP_NS65, *Nostoc punctiforme* BKP_NS66, *Nostoc punctiforme* BKP_NS67, *Nostoc punctiforme* BKP_NS68, *Nostoc punctiforme* BKP_NS69, *Nostoc punctiforme* BKP_NS70, *Nostoc punctiforme* BKP_SS64, *Nostoc punctiforme* BKP_SS66, *Nostoc punctiforme* BKP_SS67, *Nostoc punctiforme* BKP_SS68, *Nostoc punctiforme* CCAP 1453/9, *Nostoc punctiforme* Jbr02, *Nostoc punctiforme* KZ-2-2-2, *Nostoc punctiforme* PCC 73102, *Nostoc punctiforme* SAG 60.79, *Nostoc punctiforme* SAG 65.79, *Nostoc punctiforme* SAG 68.79, *Nostoc punctiforme* SAG 71.79, *Nostoc* sp., *Nostoc* sp. *Azolla* cyanobiont, *Nostoc* sp. *Collema crispum* cyanobiont, *Nostoc* sp. *Collema nigrescens* UK197 cyanobiont, *Nostoc* sp. *Collema* sp. AR75 cyanobiont, *Nostoc* sp. *Collema* sp. UK531 cyanobiont, *Nostoc* sp. *Fuscopannaria leucosticta* LG:R1123 cyanobiont, *Nostoc* sp. *Fuscopannaria leucosticta* LG:R1124 cyanobiont, *Nostoc* sp. *Fuscopannaria pacifica* UK179 cyanobiont, *Nostoc* sp. *Fuscopannaria praetermissa* LG:R1060 cyanobiont, *Nostoc* sp. Helianobakht, *Nostoc* sp. *Kroswia crystallyfera* LG:M788 cyanobiont, *Nostoc* sp. *Leptogium gelatinosum* cyanobiont, *Nostoc* sp. *Leptogium palmatum* UK176 cyanobiont, *Nostoc* sp. *Leptogium* sp. LG:R2848 cyanobiont, *Nostoc* sp. *Leptogium* sp. LG:R2850 cyanobiont, *Nostoc* sp. *Lobaria amplissima* cyanobiont, *Nostoc* sp. *Lobaria* cyanobiont 34, *Nostoc* sp. *Lobaria hallii* cyanobiont, *Nostoc* sp. *Lobaria pulmonaria* (5183) cyanobiont, *Nostoc* sp. *Massalongia carnosa* cyanobiont, *Nostoc* sp. Mollenhauer 1:1-064, *Nostoc* sp. Mollenhauer 1:1-065, *Nostoc* sp. Mollenhauer 1:1-066, *Nostoc* sp. Mollenhauer 1:1-067, *Nostoc* sp. Mollenhauer 1:1-088, *Nostoc* sp. Mollenhauer 1:1-106b2, *Nostoc* sp. Mollenhauer 1:1-108, *Nostoc* sp. Mollenhauer 1:1-115, *Nostoc* sp. Mollenhauer 1:1-125, *Nostoc* sp. Mollenhauer 1:1-150b, *Nostoc* sp. Mollenhauer 94.1, *Nostoc* sp. *Nephroma arcticum* UK103 cyanobiont, *Nostoc* sp. *Nephroma arcticum* UK48 cyanobiont, *Nostoc* sp. *Nephroma arcticum* UK564 cyanobiont, *Nostoc* sp. *Nephroma bellum* cyanobiont, *Nostoc* sp. *Nephroma helveticum* cyanobiont 33, *Nostoc* sp. *Nephroma helveticum* cyanobiont 37, *Nostoc* sp. *Nephroma helveticum* cyanobiont, *Nostoc* sp. *Nephroma laevigatum* cyanobiont 39, *Nostoc* sp. *Nephroma parile* cyanobiont 26, *Nostoc* sp. *Nephroma parile* cyanobiont 32, *Nostoc* sp. *Nephroma parile* cyanobiont, *Nostoc* sp. *Nephroma resupinatum* cyanobiont 38, *Nostoc* sp. *Nephroma resupinatum* cyanobiont 40, *Nostoc* sp. *Nephroma resupinatum* cyanobiont, *Nostoc* sp. *Pannaria* aff. athroophylla cyanobiont NZ, *Nostoc* sp. *Pannaria* aff. *leproloma* cyanobiont 1a Ch, *Nostoc* sp. *Pannaria* aff. *leproloma* cyanobiont 1a NZ, *Nostoc* sp. *Pannaria* aff. *leproloma* cyanobiont 1b NZ, *Nostoc* sp. *Pannaria* aff. *leproloma* cyanobiont 2 Ch, *Nostoc* sp. *Pannaria* aff. *leproloma* cyanobiont 3 Ch, *Nostoc* sp. *Pannaria* aff. *sphinctrina* cyanobiont 1a NC, *Nostoc* sp. *Pannaria* aff. *sphinctrina* cyanobiont 1bNC, *Nostoc* sp. *Pannaria andina* 1 cyanobiont Chile, *Nostoc* sp. *Pannaria andina* cyanobiont Peru, *Nostoc* sp. *Pannaria araneosa* cyanobiont NZ, *Nostoc* sp. *Pannaria conoplea* cyanobiont, *Nostoc* sp. *Pannaria durietzii* cyanobiont 1 NZ, *Nostoc* sp. *Pannaria elixii* cyanobiont 1 NZ, *Nostoc* sp. *Pannaria elixii* cyanobiont 2 NZ, *Nostoc* sp. *Pannaria euphylla* cyanobiont NZ, *Nostoc* sp. *Pannaria isabellina* cyanobiont 1 Ch, *Nostoc* sp. *Pannaria isabellina* cyanobiont 2 Ch, *Nostoc* sp. *Pannaria mosenii* cyanobiont Mex, *Nostoc* sp. *Pannaria obscura* cyanobiont Aus, *Nostoc* sp. *Pannaria pallida* cyanobiont 3 Ch, *Nostoc* sp. *Pannaria rubiginosa* LG:R1008 cyanobiont, *Nostoc* sp. *Pannaria rubiginosa* LG:R1011 cyanobiont, *Nostoc* sp. *Pannaria rubiginosa* cyanobiont No, *Nostoc* sp. *Pannaria* sp. (cephalodia) LG:R969 cyanobiont, *Nostoc* sp. *Pannaria sphinctrina* cyanobiont 1a Ch, *Nostoc* sp. *Pannaria sphinctrina* cyanobiont 1b Ch, *Nostoc* sp. *Pannaria sphinctrina* cyanobiont 1c Ch, *Nostoc* sp. *Pannaria tavaresii* cyanobiont Ch, *Nostoc* sp. *Parmeliella borbonica* LG:R1122 cyanobiont, *Nostoc* sp. *Parmeliella brisbanensis* LG:R1019 cyanobiont, *Nostoc* sp. *Parmeliella brisbanensis* LG:R1247 cyanobiont, *Nostoc* sp. *Parmeliella brisbanensis* LG:T3 cyanobiont, *Nostoc* sp. *Parmeliella brisbanensis* LG:T7 cyanobiont, *Nostoc* sp. *Parmeliella mariana* LG:R974 cyanobiont, *Nostoc* sp. *Parmeliella polyphyllina* LG:R1021 cyanobiont, *Nostoc* sp. *Parmeliella polyphyllina* LGR1058 cyanobiont, *Nostoc* sp. *Parmeliella* sp. LG:T6 cyanobiont, *Nostoc* sp. *Parmeliella stylophora* LG:R979 cyanobiont, *Nostoc* sp. *Parmeliella triptophylla* cyanobiont 30, *Nostoc* sp. *Parmeliella* triptophylloides LG:R965 cyanobiont, *Nostoc* sp. *Peltigera aphthosa* UK52 cyanobiont, *Nostoc* sp. *Peltigera aphthosa* UK53 cyanobiont, *Nostoc* sp. *Peltigera canina* 1 cyanobiont, *Nostoc* sp. *Peltigera canina* 2 cyanobiont, *Nostoc* sp. *Peltigera canina* 3 cyanobiont, *Nostoc* sp. *Peltigera canina* 4 cyanobiont, *Nostoc* sp. *Peltigera canina* UK106 cyanobiont, *Nostoc* sp. *Peltigera canina* UK121 cyanobiont, *Nostoc* sp. *Peltigera collina* UK144 cyanobiont, *Nostoc* sp. *Peltigera collina* UK148 cyanobiont, *Nostoc* sp. *Peltigera degeni* cyanobiont, *Nostoc* sp. *Peltigera didactyla* 2 cyanobiont, *Nostoc* sp. *Peltigera didactyla* 3 cyanobiont, *Nostoc* sp. *Peltigera evansiana* UK159 cyanobiont, *Nostoc* sp. *Peltigera extenuata* AR4b cyanobiont, *Nostoc* sp. *Peltigera extenuata* UK4 cyanobiont, *Nostoc* sp. *Peltigera frigida* AR49 cyanobiont, *Nostoc* sp. *Peltigera horizontalis* cyanobiont, *Nostoc* sp. *Peltigera lepidophora* cyanobiont, *Nostoc* sp. *Peltigera leucophlebia* UK57 cyanobiont, *Nostoc* sp. *Peltigera leucophlebia* UK79 cyanobiont, *Nostoc* sp. *Peltigera malacea* UK59 cyanobiont, *Nostoc* sp. *Peltigera malacea* cyanobiont DB3992, *Nostoc* sp. *Peltigera membranacea* 1 cyanobiont, *Nostoc* sp. *Peltigera membranacea* 2 cyanobiont, *Nostoc* sp. *Peltigera membranacea* 3 cyanobiont, *Nostoc* sp. *Peltigera membranacea* 4 cyanobiont, *Nostoc* sp. *Peltigera membranacea* 5 cyanobiont, *Nostoc* sp. *Peltigera membranacea* UK156 cyanobiont, *Nostoc* sp. *Peltigera membranacea* UK194 cyanobiont, *Nostoc* sp. *Peltigera membranacea* cyanobiont, *Nostoc* sp. *Peltigera membranacea* cyanobiont N6, *Nostoc* sp. *Peltigera neopolydactyla* UK60 cyanobiont, *Nostoc* sp. *Peltigera neopolydactyla* agg. UK150 cyanobiont, *Nostoc* sp. *Peltigera praetextata* cyanobiont 22, *Nostoc* sp. *Peltigera pruinosa* cyanobiont 14, *Nostoc* sp. *Peltigera rufescens* 1 cyanobiont, *Nostoc* sp. *Peltigera rufescens* 2 cyanobiont, *Nostoc* sp. *Peltigera rufescens* 3 cyanobiont, *Nostoc* sp. *Peltigera rufescens* 4 cyanobiont, *Nostoc* sp. *Peltigera rufescens* 5 cyanobiont, *Nostoc* sp. *Peltigera rufescens* UK46 cyanobiont, *Nostoc* sp. *Peltigera* sp. UK437 cyanobiont, *Nostoc* sp. *Peltigera* sp. UK521b cyanobiont, *Nostoc* sp. *Peltigera* sp. cyanobiont, *Nostoc* sp. *Peltigera venosa* cyanobiont 15, *Nostoc* sp. *Physma byrsaeum* LG:R1121 cyanobiont, *Nostoc* sp. *Physma byrsaeum* LG:R2 cyanobiont, *Nostoc* sp. *Physma byrsaeum* LG:R2847 cyanobiont, *Nostoc* sp. *Physma radians* LG:T5 cyanobiont, *Nostoc* sp. *Polychidium*

*muscicola* UK175 cyanobiont, *Nostoc* sp. *Protopannaria pezizoides* UK120 cyanobiont, *Nostoc* sp. *Protopannaria pezizoides* UK73 cyanobiont, *Nostoc* sp. *Pseudocyphellaria gilva* cyanobiont Chile, *Nostoc* sp. *Pseudocyphellaria* sp. LG:R2332 cyanobiont, *Nostoc* sp. *Sticta beauvoisii* cyanobiont, *Nostoc* sp. *Sticta* cf. *caulescens* AR124 cyanobiont, *Nostoc* sp. *Sticta fuliginosa* cyanobiont, *Nostoc* sp. *muscicolous* cyanobiont 21, *Nostoc* sp. 0GU36S01, *Nostoc* sp. 0GU36S02, *Nostoc* sp. 113.5, *Nostoc* sp. 117.8.2, *Nostoc* sp. 1189P, *Nostoc* sp. 1190P, *Nostoc* sp. 152, *Nostoc* sp. 159, *Nostoc* sp. 17, *Nostoc* sp. 195-A21, *Nostoc* sp. 195-A22, *Nostoc* sp. 1c, *Nostoc* sp. 1tu14s8, *Nostoc* sp. 2-07, *Nostoc* sp. 2LT05S03, *Nostoc* sp. 5N-02c, *Nostoc* sp. 8901:1, *Nostoc* sp. 8916, *Nostoc* sp. 8923, *Nostoc* sp. 8926, *Nostoc* sp. 8929, *Nostoc* sp. 8938, *Nostoc* sp. 8941, *Nostoc* sp. 8963, *Nostoc* sp. 8964:3, *Nostoc* sp. 9104, *Nostoc* sp. 9E-03, *Nostoc* sp. 9d, *Nostoc* sp. A15, *Nostoc* sp. A39, *Nostoc* sp. ACSSI 045, *Nostoc* sp. ACSSI 047, *Nostoc* sp. ACSSI 056, *Nostoc* sp. ACSSI 057, *Nostoc* sp. ACSSI 066, *Nostoc* sp. ACSSI 067, *Nostoc* sp. ACSSI 082, *Nostoc* sp. ACSSI 114, *Nostoc* sp. ACSSI 115, *Nostoc* sp. ACSSI 123, *Nostoc* sp. ACSSI 143, *Nostoc* sp. ACSSI 161, *Nostoc* sp. ACSSI 164, *Nostoc* sp. ACSSI 231, *Nostoc* sp. ACSSI 310, *Nostoc* sp. ACSSI 314, *Nostoc* sp. ACSSI 325, *Nostoc* sp. ACSSI 329, *Nostoc* sp. ACT703, *Nostoc* sp. ACT732, *Nostoc* sp. AH-12, *Nostoc* sp. ANT.L34.1, *Nostoc* sp. ANT.L52B.1, *Nostoc* sp. ANT.L52B.8, *Nostoc* sp. ANT.L61.1, *Nostoc* sp. ANT.LG2.6, *Nostoc* sp. AR12, *Nostoc* sp. ARC 64, *Nostoc* sp. ARC8, *Nostoc* sp. ATCC 53789, *Nostoc* sp. AWT 203, *Nostoc* sp. All, *Nostoc* sp. A13, *Nostoc* sp. BACA0081, *Nostoc* sp. BDU ARC 10101, *Nostoc* sp. BDU80591, *Nostoc* sp. BDU80701, *Nostoc* sp. BEA 1039B, *Nostoc* sp. BEA 1140B, *Nostoc* sp. BKP_CB62, *Nostoc* sp. BKP_CB63, *Nostoc* sp. BKP_CB64, *Nostoc* sp. BKP_CS63, *Nostoc* sp. BKP_CS64, *Nostoc* sp. BKP_CS65, *Nostoc* sp. BKP_CS66, *Nostoc* sp. BKP_CS67, *Nostoc* sp. BKP_CS68, *Nostoc* sp. BKP_CS69, *Nostoc* sp. BKP_CS70, *Nostoc* sp. BKP_CS71, *Nostoc* sp. BKP_CS72, *Nostoc* sp. BKP_CS73, *Nostoc* sp. BKP_CS74, *Nostoc* sp. BKP_NS59, *Nostoc* sp. BKP_NS60, *Nostoc* sp. BKP_SB57, *Nostoc* sp. BKP_SB58, *Nostoc* sp. BKP_SB59, *Nostoc* sp. BKP_SS65, *Nostoc* sp. BR36, *Nostoc* sp. BS363, *Nostoc* sp. Bahar_E, *Nostoc* sp. Bahar_M, *Nostoc* sp. C052, *Nostoc* sp. C057, *Nostoc* sp. CACIAM 19, *Nostoc* sp. CAVN2, *Nostoc* sp. CAWBG77, *Nostoc* sp. CCAP 1453/25, *Nostoc* sp. CCAP 1453/28, *Nostoc* sp. CCAP 1453/31, *Nostoc* sp. CCAP 1453/35, *Nostoc* sp. CENA105, *Nostoc* sp. CENA175, *Nostoc* sp. CENA216, *Nostoc* sp. CENA219, *Nostoc* sp. CENA239, *Nostoc* sp. CENA259, *Nostoc* sp. CENA261, *Nostoc* sp. CENA269, *Nostoc* sp. CENA271, *Nostoc* sp. CENA274, *Nostoc* sp. CENA278, *Nostoc* sp. CENA281, *Nostoc* sp. CENA294, *Nostoc* sp. CENA296, *Nostoc* sp. CENA356, *Nostoc* sp. CENA511, *Nostoc* sp. CENA535, *Nostoc* sp. CENA536, *Nostoc* sp. CENA543, *Nostoc* sp. CENA544, *Nostoc* sp. CENA547, *Nostoc* sp. CENA548, *Nostoc* sp. CENA551, *Nostoc* sp. CHAB TP201513, *Nostoc* sp. CHAB TP201514, *Nostoc* sp. CHAB TP201701.1, *Nostoc* sp. CHAB TP201726.1, *Nostoc* sp. CHAB TP201727.1, *Nostoc* sp. CHAB TP201728.1, *Nostoc* sp. CHAB TP201728.4, *Nostoc* sp. CHAB TP201736.2, *Nostoc* sp. CHAB TP201822.2, *Nostoc* sp. CNCH1, *Nostoc* sp. Cam2S01, *Nostoc* sp. Cc2, *Nostoc* sp. Cr4, *Nostoc* sp. DM103, *Nostoc* sp. Del, *Nostoc* sp. Den-12, *Nostoc* sp. Ev1, *Nostoc* sp. FACHB-252, *Nostoc* sp. FB1-KK1, *Nostoc* sp. FI5-VF5, *Nostoc* sp. GM244, *Nostoc* sp. GSV224, *Nostoc* sp. GT138, *Nostoc* sp. HAMTA.RF, *Nostoc* sp. HAN11/1, *Nostoc* sp. HK-01, *Nostoc* sp. I0-102-I, *Nostoc* sp. KK-01, *Nostoc* sp. KNUA003, *Nostoc* sp. KU001, *Nostoc* sp. KU028, *Nostoc* sp. KU281, *Nostoc* sp. KVJ10, *Nostoc* sp. KVJ18, *Nostoc* sp. KVJ20, *Nostoc* sp. KVJ3, *Nostoc* sp. KVJ4, *Nostoc* sp. KVJF4, *Nostoc* sp. KVJF8, *Nostoc* sp. KVS1, *Nostoc* sp. KVS11, *Nostoc* sp. KVSF4, *Nostoc* sp. Lukesova 1/86, *Nostoc* sp. Lukesova 40/93, *Nostoc* sp. Lukesova 5/96, *Nostoc* sp. MGL001, *Nostoc* sp. MS1, *Nostoc* sp. MV6, *Nostoc* sp. Mau15, *Nostoc* sp. N107.3, *Nostoc* sp. NIES-2094, *Nostoc* sp. NIES-2110, *Nostoc* sp. NIES-2111, *Nostoc* sp. NIES-3756, *Nostoc* sp. NIES-4103, *Nostoc* sp. Ni4-C1, *Nostoc* sp. Os-1, *Nostoc* sp. OsI-C1, *Nostoc* sp. PCC 6720, *Nostoc* sp. PCC 7107, *Nostoc* sp. PCC 7120=FACHB-418, *Nostoc* sp. PCC 7423, *Nostoc* sp. PCC 7524, *Nostoc* sp. PCC 8112, *Nostoc* sp. PCC 8976, *Nostoc* sp. PCC 9229, *Nostoc* sp. PCC 9231, *Nostoc* sp. PCC 9305, *Nostoc* sp. PCC 9426, *Nostoc* sp. PCC 9709, *Nostoc* sp. PS33-1, *Nostoc* sp. Prim-3-2, *Nostoc* sp. RE21, *Nostoc* sp. SAG 2306, *Nostoc* sp. SAG 2409, *Nostoc* sp. SAG 2414, *Nostoc* sp. SAG 29.90, *Nostoc* sp. SAG 34.92, *Nostoc* sp. SAG 35.92, *Nostoc* sp. SAG 36.92, *Nostoc* sp. SAG 39.87, *Nostoc* sp. SAG 41.87, *Nostoc* sp. SKJ1, *Nostoc* sp. SKJ2, *Nostoc* sp. SKJ4, *Nostoc* sp. SKJF1, *Nostoc* sp. SKS2, *Nostoc* sp. SKS5, *Nostoc* sp. SKS8, *Nostoc* sp. SKS9, *Nostoc* sp. SKSF3, *Nostoc* sp. SKSL1, *Nostoc* sp. SN418, *Nostoc* sp. SN419, *Nostoc* sp. SN426, *Nostoc* sp. SN432, *Nostoc* sp. SN440, *Nostoc* sp. SN449, *Nostoc* sp. SN64, *Nostoc* sp. TAU-MAC 0799, *Nostoc* sp. TCL240-02, *Nostoc* sp. TCL26-01, *Nostoc* sp. TDI#AR94, *Nostoc* sp. TH1S01, *Nostoc* sp. TO1S01, *Nostoc* sp. UAM 307, *Nostoc* sp. UAM 308, *Nostoc* sp. UHCC 0702, *Nostoc* sp. UHCC 0870, *Nostoc* sp. UHCC 0926, *Nostoc* sp. UK18, *Nostoc* sp. Us-7-5, *Nostoc* sp. VI.5, *Nostoc* sp. VP2-08, *Nostoc* sp. YK-01, *Nostoc* sp. roza1, *Nostoc* sp. roza4, *Nostoc* sp. sepahi, *Nostoc* sp. sf 6 Calc, *Nostoc sphaericum, Nostoc sphaeroides, Nostoc sphaeroides* ACSSI 150, *Nostoc sphaeroides* CCNUC1, *Nostoc sphaeroides* HBHF0604, *Nostoc spongiaeforme* Ind42, *Nostoc verrucosum*, Nostocaceae cyanobacterium, Nostocaceae cyanobacterium Baduki 3, Nostocaceae cyanobacterium CENA376, Nostocaceae cyanobacterium CENA388, Nostocaceae cyanobacterium DW3II-PS, *Pseudoaliinostoc jiangxiense, Roholtiella edaphica* AR2, *Roholtiella edaphica* AR4, *Roholtiella edaphica* AR6, *Roholtiella edaphica* KZ-5-4-5, *Roholtiella fluviatilis* SN435, *Roholtiella fluviatilis* UAM 332, *Roholtiella fluviatilis* UAM 334, *Scytonema bohneri* SAG 255.80, *Scytonema mirabile* SAG 83.79, *Scytonema* sp. HAN3/2, *Tolypothrix distorta* ACT712, *Tolypothrix* sp. 9k, *Tolypothrix* sp. CCM-UFV067, *Tolypothrix* sp. IAM M-259, *Tolypothrix* sp. PCC 7601, *Tolypothrix* sp. PCC 7712, *Tolypothrix* sp. PCC 7910, *Tolypothrix* sp. UAM 335, *Tolypothrix tenuis* PCC 7101, *Tolypothrix tenuis* SAG 94.79, *Tolypothrix tenuis* SN436, *Trichormus* sp. CCM-UFV035, *Trichormus* sp. PS4F, *Trichormus* sp. SBC125, *Trichormus variabilis, Trichormus* variabilis 0441, *Trichormus variabilis* ATCC 29413, *Trichormus variabilis* GITAM RGP, *Trichormus variabilis* NIES-23, *Trichormus variabilis* RPAN45, *Trichormus variabilis* SN416, *Trichormus variabilis* str. GREIFSWALD, *Trichormus variabilis* str. HINDAK 2001/4, *Violetonostoc minutum* CHAB 5840, *Violetonostoc minutum* CHAB 5841, *Wollea vaginicola* RPAN22, or cyanobacterium NIES-2102.

In some embodiments, the technology provides a microbial consortium comprising an organism from a taxonomic group (e.g., a genus) that is *Acaryochloris, Aliinostoc, Aliterella, Amazonocrinis, Anabaena, Anabaenopsis, Aphanizomenon, Atlanticothrix, Aulosira, Calenema, Calothrix, Camptylonemopsis, Chlorogloeopsis, Chroococcidiopsis, Chrysosporum, Compactonostoc, Constrictifilum,*

*Crocosphaera, Cyanobacterium, Cyanocohniella, Cylindrospermopsis, Cylindrospermum, Dendronalium, Desikacharya, Desmonostoc, Dolichospermum, Erythrobacter, Fischerella, Fortiea, Fremyella, Geitlerinema, Gloeocapsa, Gloeocapsopsis, Gloeothece, Gloeotrichia, Goleter, Hapalosiphon, Hydrocoryne, Jaaginema, Johanseniella, Kamptonema, Komarekiella, Leptolyngbya, Lyngbya, Macrochaete, Mastigocoleus, Microchaete, Nodosilinea, Nodularia, Nostoc, Nostocaceae, Nostochopsis, Oligotropha, Oscillatoria, Pantanalinema, Pelatocladus, Planktothrichoides, Planktothrix, Polymorphum, Porphyrobacter, Prochlorococcus, Prochlorothrix, Pseudanabaena, Pseudoaliinostoc, Raphidiopsis, Richelia, Rivularia, Roholtiella, Rubidibacter, Scytonema, Spirulina, Synechococcus, Synechocystis, Thermosynechococcus, Tolypothrix, Trichormus, Violetonostoc, Wollea*, or *Xenococcus*.

In some embodiments, the microbial consortium further comprises an organism from genus *Variovorax* (e.g., *Variovorax* sp. PMC12), an organism of phylum Proteobacteria (class Alphaproteobacteria, Betaproteobacteria, Gammaproteobacteria), an organism from the genus *Bosea* (e.g., *Bosea* sp. R-45681), an organism from the genus *Caulobacter* (e.g., *Caulobacter segnis* ATCC21756, *Caulobacter ginsengisoh*), and/or an organism of genus *Pseudomonas* (e.g., *Pseudomonas* sp. NFR16).

Consortium Stability

During the development of embodiments of the technology described herein, stability was used as a metric to identify consortia that exhibit repeatable behaviors as a predictor of consortia that could be produced at a larger production scale and that would find use in the field as a product. As used herein, stability of a microbial community or consortium refers to the amount of change in a microbial population as a function of serial passaging of a culture comprising the microbial population. Accordingly, the alpha diversity of a microbial community as defined by the number of species represented in a microbial population is of lesser importance. In particular, an increase in stability indicates a decrease in the change in a microbial population as a function of serial passaging of a culture comprising the microbial population. Thus, using a portion of a stable consortium (e.g., a portion of a culture comprising a stable consortium) to inoculate a new culture medium and growing the culture under defined conditions as appropriate for production of the consortium is expected to produce a culture comprising a consortium that is the same as the culture that was used for the inoculum. As the stability metric increases, the predictability increases of producing the same consortium in a new culture as was present in the inoculum. In other words, a stable culture produces a predictable resultant population of microbial organisms given a set of defined external factors (e.g., culture conditions such as light, nutrients, temperature, aeration, etc.) Thus, an increase in stability indicates an increase in the predictability or confidence that the resultant microbial culture will comprise a desired, defined microbial community or consortium.

Data collected during the development of embodiments of the technology described herein indicated that the Bray-Curtis Dissimilarity Scores for both BW01 and BW02 changed rapidly between the original soil input sample and P1, and between P1 and P2. See FIG. 13. However, the Bray-Curtis Dissimilarity Scores for both BW01 and BW02 between P2 and P3 and between P3 and P4 approached a limit of approximately 0.14 to 0.18. These data indicated that the BW01 and BW02 consortia began to reach an equilibrium state after two passagings where passage-to-passage differences were minimized and/or eliminated with subsequent passaging.

Figure 14:
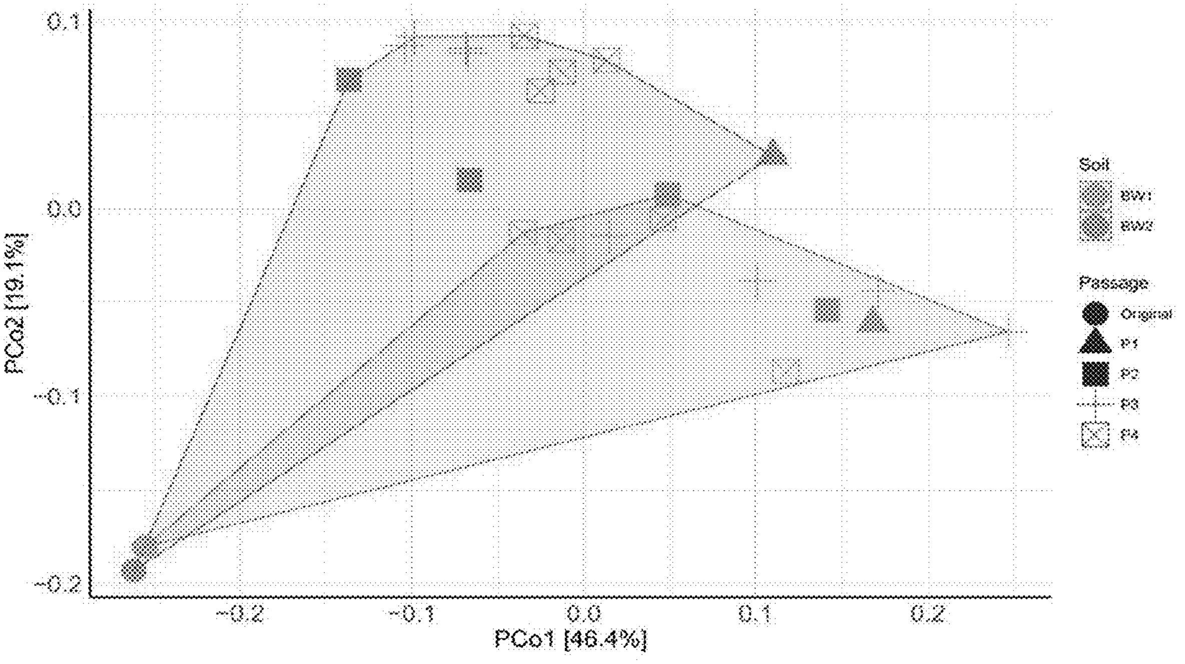
FIG. 14 is a plot of the first (PCo1) and second (PCo2) principal components resulting from a principal coordinates analysis of taxonomic composition determined from shotgun sequencing of the original soil microbiome and passages P1-P4 for both BW01 and BW02.

Further, experiments conducted during the development of the technology described herein indicated that the selection process was effective in producing microbial consortia having the desired functions. Principal Coordinates Analysis of shotgun sequencing data obtained from the original soil samples and for the P1 to P4 passaged samples indicated that the original soil samples that produced BW01 and BW02 clustered together rather tightly (FIG. 14). After passaging, the P4 BW02 cluster was more varied than the P4 BW01 cluster (FIG. 14). While the P4 BW01 and BW01 cultures produced two separate clusters, the separate clusters share common components (FIG. 14). Finally, no significant change was observed in the clustering between the initial and intermediate passages (e.g., between P1 and P2) within a given sample, indicating that the populations in the P1 cultures had begun to have increased stabilization. However, both the initial and intermediate passages are highly divergent from the initial soil sample.

Accordingly, provided herein is a technology that provides an effective method for selective culturing. Further, the selective culturing method was used to produce consortia that were capable of effective growth on a mineral medium without supplementation of combined nitrogen or any carbon source other than atmospheric $CO_2$. The technology described herein finds use, e.g., to provide a treatment for agricultural soil.

Estimates of Sequestration

During the development of embodiments of the technology described herein, carbon and nitrogen fixation data from photobioreactor experiments and measurements of biofilm density from vertically illuminated multi-well plate cultures were used to estimate carbon sequestration provided by the microbial consortia described herein. The microbial consortia offset carbon dioxide emissions in two ways.

First, the microbes absorb carbon dioxide from the air and sequester carbon in biological molecules that remain persistent in the soil. For example, the technology described herein provides embodiments of a microbial consortium that produces carbon compounds that sequester carbon from the atmosphere in a durable and stable biological molecule that persists in the soil, e.g., melanin (e.g., pheomelanin, eumelanin, and/or pyomelanin). That is, embodiments relate to a consortium that produces a durable carbon compound that provides a stable carbon sink to remove atmospheric carbon (e.g., $CO_2$) and store carbon in the durable carbon compound (e.g., melanin) in soil. For every ton of elemental carbon contained in a microbial mat, 3.67 tons of carbon dioxide gas are sequestered because 73% of the mass of a carbon dioxide molecule is provided by oxygen atoms.

The second way that the microbial consortia offset carbon dioxide emissions is by reducing agricultural needs for nitrogen-based fertilizers. The Haber-Bosch process consumes enormous quantities of natural gas to produce the hydrogen needed to fix nitrogen to ammonia—in particular, for each ton of ammonia produced, 2.16 tons of carbon dioxide are emitted (see, e.g., Ghavam (2021) "Sustainable Ammonia Production Processes" Front. Energy Res. 9: 580808, incorporated herein by reference). In addition, less than 20% of the nitrogen that is applied to a field makes it into the final crop. Much of the rest is leached or denitrified away, causing environmental damage without producing anything to the grower (see, e.g., Royal Society Policy Briefing "Ammonia: zero-carbon fertiliser, fuel and energy store" February 2020, available at royalsociety.org/green-ammonia and incorporated herein by reference). In some embodiments, the microbial consortia and/or compositions comprising the microbial consortia described herein double this efficiency by slowly releasing this nitrogen instead of a single application as in the use of nitrogen fertilizers.

Figure 15:
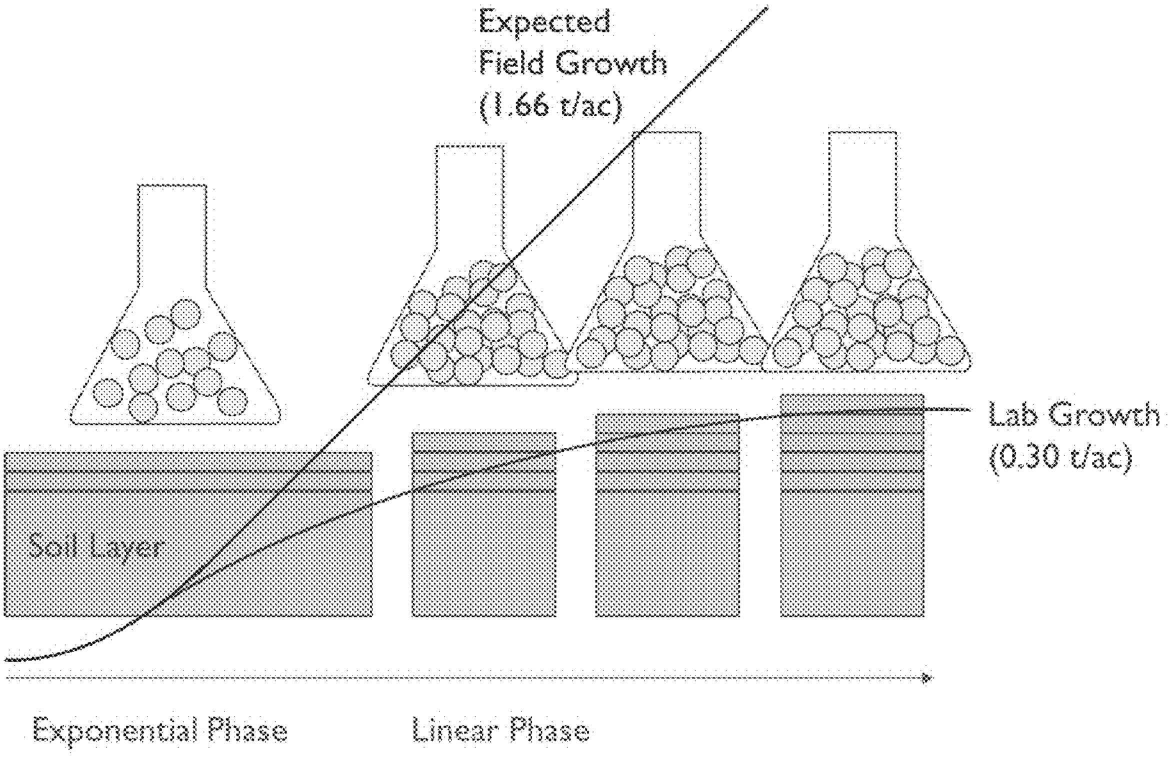
FIG. 15 is a schematic showing predicted growth in the field relative to laboratory conditions.

A culture grown from a consortium as described herein (e.g., BW01) on a field at the same rate per square centimeter as it grows in a multi-well plate with a shallow fill of nitrogen-free medium would reach saturation after approximately a month of growth. The saturation culture would produce 150 kg/acre of dry biomass comprising 6.2% nitrogen and 45.2% carbon. This biomass would correlate to an offset of 0.30 metric ton of carbon dioxide over that one-month growth period. This estimate assumes saturation and accompanied maximum accumulation (FIG. 15).

Figure 16:
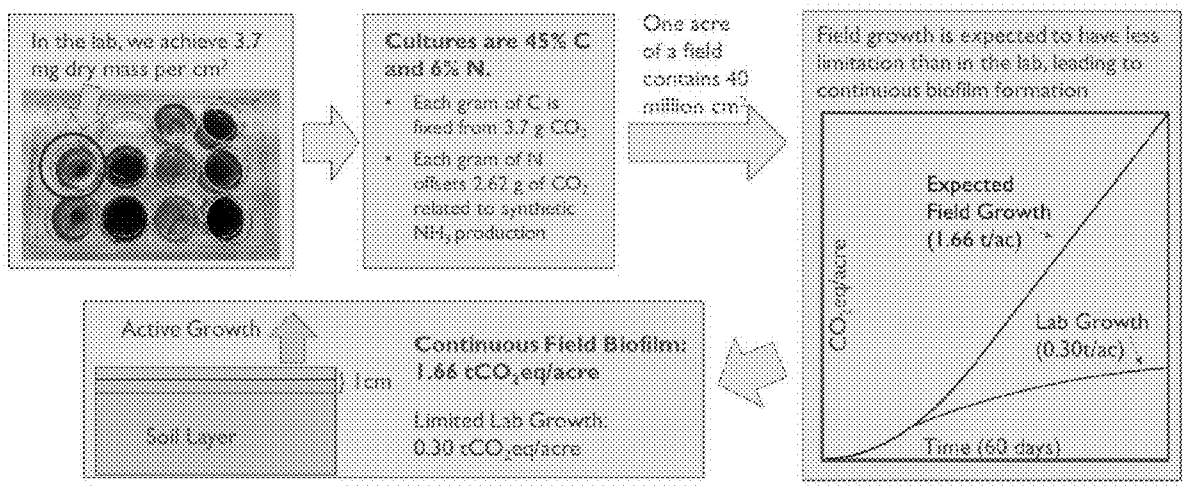
FIG. 16 is a schematic showing calculations for field growth capabilities assuming two different models. Calculations are based on thin-film liquid cultures grown in the 12-well plates and assume growth on a 2-dimensional space as cultures would grow on a field.

However, cultures are not predicted to grow to saturation in the field. Instead, once cultures reach 100% surface coverage, they will begin to grow in a Z-dimensional growth pattern as a biofilm or soil crust (FIG. 16). New microbial layers will form on top of previous layers, shading lower layers and reducing their further growth. This one-dimensional growth may proceed at the doubling time calculated for standard cultures, but for each new generation that forms, one old generation will cease to divide. In this way, it is predicted that growth will proceed linearly beyond the point of full coverage. Accordingly, a 60-day carbon dioxide offset of 1.66 metric ton per acre is predicted.

Furthermore, in some embodiments, growth of microbial consortia occurs in large open ponds located in locations where sunshine and space are abundant (e.g., a desert area). Annually, world production of Haber-Bosch ammonia for synthetic fertilizer is 120 Mt, which contains 99 Mt of elemental nitrogen. Growing microbial consortia as described herein in a space that is 17% the size of Arizona would offset total world production of nitrogen by the Haber-Bosch process.

Similarly, producing microbial fertilizer according to the technology described herein (e.g., as a slow nitrogen release green manure) on 1 million acres would replace 100 pounds of chemical fertilizer per acre per year for 100 million acres of cropland. Increasing growth of the microbial consortium in the field by 100-fold reduces the amount of land to 7221 acres to replace 100 pounds of chemical fertilizer per acre per year for 100 million acres of cropland. See Table 7.

TABLE 7

Predicted growth area to produce sufficient N to replace synthetic fertilizer

| Pond Growth | Field Growth | Application Model | Pond area* for 100M Acres |
|---|---|---|---|
| 100% | 0% | Green manure | 4276 $km^2$ (1M acres) |
| 50% | 50% | Hybrid | 2138 $km^2$ (0.5M acres) |
| <1% | >99% | Seed (2.5 kg/ac) | 29 $km^2$ (7221 acres) |

*Assumes 10 cm deep ponds, use of MCC #01, and 50 lb/ac organic actual N applied being equivalent to 100 lb/ac inorganic actual N due to a 2x increase in nitrogen use efficiency.

Compositions for Agricultural Use

In some embodiments, the technology provides a composition for agricultural use and related methods for using the composition to improve agricultural medium (e.g., soil, greenhouse growth medium, or a hydroponic medium). In some embodiments, the composition comprises a microbial consortium as described herein (e.g., comprising a microbe that performs photosynthesis and nitrogen fixation, a heterotrophic microbe that consumes nitrogen-containing compounds and/or carbon-containing compounds produced by the photosynthetic and nitrogen-fixing microbe, and, optionally, one or more additional photosynthetic organisms and/or one or more additional heterotrophic organisms). In some embodiments, the consortium is grown in vitro where it produces nitrogen-containing compounds and carbon-containing compounds using nitrogen and carbon from the atmosphere. In some embodiments, a composition comprising a consortium is applied to an agricultural medium as a "green manure", e.g., a composition comprising a consortium and nitrogen-containing compounds and carbon-containing compounds produced by the consortium. In some embodiments, the consortium of the green manure performs minimal or no nitrogen fixation and/or carbon sequestration after the composition comprising the consortium is applied to the agricultural medium.

In some embodiments, a composition comprising a consortium is applied to an agricultural medium to inoculate the agricultural medium with the composition comprising a consortium. In addition to nitrogen-containing compounds and carbon-containing compounds produced by the consortium prior to applying the composition to the agricultural medium, the consortium continues to perform nitrogen fixation and/or carbon sequestration after the composition comprising the consortium is applied to the agricultural medium, and the nitrogen-containing compounds and carbon-containing compounds produced by the consortium growing on the agricultural medium enter into the agricultural medium to improve the agricultural medium and/or to nourish plants (e.g., crops) growing on the agricultural medium. In some embodiments, the consortium produces carbon compounds that sequester carbon from the atmosphere. In some embodiments, a member of the consortium produces carbon compounds that sequester carbon from the atmosphere. In some embodiments, embodiments provide a consortium that produces melanin (e.g., pheomelanin, eumelanin, and/or pyomelanin). That is, embodiments provide a consortium that produces a durable carbon compound that provides a stable carbon sink to remove atmospheric carbon (e.g., $CO_2$) and store carbon in the durable carbon compound (e.g., melanin) in soil.

In some embodiments, a composition comprising a consortium is combined into an agricultural composition. In some embodiments, the agricultural composition comprises one or more of a wetter, compatibilizing agent (also referred to as a "compatibility agent"), antifoam agent, cleaning agent, sequestering agent, drift reduction agent, neutralizing agent, buffer, corrosion inhibitor, dye, odorant, spreading agent (also referred to as a "spreader"), penetration aid (also referred to as a "penetrant"), sticking agent (also referred to as a "sticker" or a "binder"), dispersing agent, thickening agent (also referred to as a "thickener"), stabilizer, emulsifier, freezing point depressant, or antimicrobial agent.

In some embodiments, the agricultural composition is solid. In some embodiments, the agricultural composition comprises a carrier material, e.g., mineral earths such as silicas, silica gels, silicates, talc, kaolin, attaclay, limestone, chalk, loess, clay, dolomite, diatomaceous earth, calcium sulfate, magnesium sulfate, magnesium oxide, ground synthetic materials, fertilizers such as ammonium sulfate, ammonium phosphate, ammonium nitrate, thiourea and urea, products of vegetable origin such as cereal meals, tree bark meal, wood meal and nutshell meal, cellulose powders, attapulgites, montmorillonites, mica, vermiculites, synthetic silicas and synthetic calcium silicates, or combinations of these.

In some embodiments, the agricultural composition is liquid. Thus, in some embodiments, the agricultural composition comprises compounds or salts such as monoethanolamine salt, sodium sulfate, potassium sulfate, sodium chloride, potassium chloride, sodium acetate, ammonium hydrogen sulfate, ammonium chloride, ammonium acetate, ammonium formate, ammonium oxalate, ammonium carbonate, ammonium hydrogen carbonate, ammonium thiosulfate, ammonium hydrogen diphosphate, ammonium dihydrogen monophosphate, ammonium sodium hydrogen phosphate, ammonium thiocyanate, ammonium sulfamate, or ammonium carbamate.

In some embodiments, the agricultural composition comprises a binder, e.g., polyvinylpyrrolidone, polyvinyl alcohol, partially hydrolyzed polyvinyl acetate, carboxymethylcellulose, starch, vinylpyrrolidone/vinyl acetate copolymers and polyvinyl acetate, or combinations of these; lubricants such as magnesium stearate, sodium stearate, tale or polyethylene glycol, or combinations of these; antifoams such as silicone emulsions, long-chain alcohols, phosphoric esters, acetylene diols, fatty acids or organofluorine compounds, and complexing agents such as salts of ethylenediaminetetraacetic acid (EDTA), salts of trinitrilotriacetic acid or salts of polyphosphoric acids, or combinations of these.

In some embodiments, the agricultural composition comprises a surface-active agent. In some embodiments, the surface-active agent is added to a liquid agricultural composition. In some embodiments, the surface-active agent is added to a solid formulation, especially those designed to be diluted with a carrier before application. Thus, in some embodiments, the agricultural composition comprises a surfactant. Surfactants are sometimes used, either alone or with other additives (e.g., mineral or vegetable oils) as adjuvants to spray-tank mixes to improve the biological performance of the consortia on the target. The surface-active agents can be anionic, cationic, or nonionic and can be employed as emulsifying agents, wetting agents, suspending agents, or for other purposes. In some embodiments, the surfactants are non-ionic, e.g., alky ethoxylates, linear aliphatic alcohol ethoxylates, and aliphatic amine ethoxylates. In some embodiments, the agricultural composition comprises salts of alkyl sulfates, such as diethanolammonium lauryl sulfate; alkylarylsulfonate salts, such as calcium dodecylbenzenesulfonate; alkylphenol-alkylene oxide addition products, such as nonylphenol-Cis ethoxylate; alcohol-alkylene oxide addition products, such as tridecyl alcohol-C16 ethoxylate; soaps, such as sodium stearate; alkylnaphthalene-sulfonate salts, such as sodium dibutyl-naphthalenesulfonate; dialkyl esters of sulfosuccinate salts, such as sodium di(2-ethylhexyl)sulfosuccinate; sorbitol esters, such as sorbitol oleate; quaternary amines, such as lauryl trimethylammonium chloride; polyethylene glycol esters of fatty acids, such as polyethylene glycol stearate; block copolymers of ethylene oxide and propylene oxide; salts of mono and dialkyl phosphate esters; vegetable oils such as soybean oil, rapeseed/canola oil, olive oil, castor oil, sunflower seed oil, coconut oil, corn oil, cottonseed oil, linseed oil, palm oil, peanut oil, safflower oil, sesame oil, tung oil and the like; and esters of the above vegetable oils, particularly methyl esters.

In some embodiments, the agricultural composition comprises a wetting agent, a dispersing agent, a polymeric surfactant, an emulsifying agent, a solubilizing agent, an organic solvent, a gelling agent, an anti-foam agent, and/or a preservative.

Further, in some embodiments, the agricultural composition comprises a pesticide, herbicide, bactericide, fungicide, insecticide, virucide, miticide, nemataicide, acaricide, plant growth regulator, rodenticide, anti-algae agent, biocontrol, beneficial agent, known fertilizer, inert ingredient, and/or a biologically active agent.

In some embodiments, the agricultural composition and/or consortia described herein are applied to an agricultural growth medium as a topical application to improve crop growth, yield, and/or quality. The topical application may be in the form of a dry mix or powder or dusting composition or may be a liquid based formulation. In some embodiments, the agricultural composition and/or consortia described herein can be formulated as: solutions; wettable powders; dusting powders; soluble powders; emulsions or suspension concentrates; tablets; water-dispersible granules; water soluble granules (slow or fast release); microencapsulated granules or suspensions; and as irrigation components. In some embodiments, the agricultural composition and/or consortia described herein are diluted in an aqueous medium prior to spray application. In some embodiments, the agricultural composition and/or consortia described herein are applied to the soil, plant, seed, rhizosphere, rhizosheath, or other area to which it would be beneficial to apply the compositions.

Although the disclosure herein refers to certain illustrated embodiments, it is to be understood that these embodiments are presented by way of example and not by way of limitation.

EXAMPLES

During the development of embodiments of the technology described herein, experiments were conducted to produce microbial consortia from environmental samples using selection technologies applied at the community level. Data collected during these experiments indicated the effectiveness of a novel selective culturing method to select for microbial consortia that are capable of effective growth on a mineral medium and atmospheric nitrogen and carbon dioxide without supplementation by nitrogen or carbon compounds.

The microbial consortia are stable when grown under the defined selective conditions. We are also applying these same methods to several large-scale batches of agricultural soils, which we expect to yield up to 80 additional cultures to select from. This will allow us to greatly scale our diversity and capabilities as we move into field trials on the first three consortia.

Materials and Methods

Environmental sampling. Liquid and soil samples were collected from eight separate locations on two privately owned residential yards in or near Saint Louis, Missouri. Half of the samples were collected mid-winter, and the other half were collected in spring. Liquid samples were collected in mid-winter from the bottom of a mostly empty rain barrel and comprised a green sludge. The green sludge material was stored in a glass jar at room temperature for several weeks under dim light prior to use. Soil samples were collected with sterile spoons or scoops and placed into clean plastic zip-top bags. First, loose material was brushed from the sampling site. Then, a hole roughly 100 $cm^3$ in volume was cut into the soil about 5 cm deep and soil was taken from the soil in the hole. Soil samples were stored at 4° C. in the dark until used.

Inoculation of growth media. The environmental samples were first homogenized mechanically from the outside of the bag. Next, approximately 10 $cm^3$ of the sample material was transferred to a 50-ml conical tube. Then, an appropriate growth medium was added to provide a total volume of 40 mL. The sample was vortexed until large clumps were dispersed and the sample was substantially homogenous. Next, a 0.5-1.0 mL volume of the vortexed sample was added using a wide-bore pipette tip to the growth container. The volume added depended on the volume of the growth container. Inoculations from suspended samples were either performed immediately or suspensions were kept at room temperature under dim light for several days and were re-vortexed before use.

Growth conditions. Three conditions were used for growth of samples in various media types: 1) shaken flasks; 2) stationary bottles with liquid; and 3) stationary bottles with sterile sand and liquid. Shaken flasks were 125-mL standard Erlenmeyer flasks capped with either metal culture caps or aluminum foil. The shaker was a New Brunswick G-25R incubated floor shaker fitted with: a) an ATS-CHILL600V (Advanced Technology Solutions, Inc.) water chiller to provide cooled water to the heat exchanger; b) a set of MRKD-40K22-40W-U 4000K 40-W dimmable LED lights (Super Bright LEDs, Inc.); and c) two 20-W halogen bulbs (Feit Electric). The lights were operated on an 18:6 photoperiod (18 hours on and 6 hours off) at full power. The light intensity at the level of the shaker deck was measured at approximately 120 μmol photons $m^{-2}$ $s^{-1}$ using an Apogee Instruments MQ-500 light meter. The temperature in the shaker was maintained at room temperature (e.g., approximately 23 to 25° C.). To remove heat produced by the 80 W of illumination, chilled water (e.g., approximately 5° C.) from the ATS water chiller was supplied to the integral heat exchanger in the shaker climate control box to maintain the shaker temperature. The shaker internal heater was set to make up the difference during the night period. Square 160-mL milk dilution or 250-mL media bottles were placed on two racks at room temperature in front of two 42-W 4000K LED shop lights (e.g., SLLP-40K4-42 from Super Bright LEDs, Inc. or an equivalent product) and four 20-W halogen bulbs (Feit Electric). The light intensity at the level of the shaker deck was measured at approximately 120 μmol photons $m^{-2}$ $s^{-1}$ using an Apogee Instruments MQ-500 light meter. The same 18:6 photoperiod (18 hours on and 6 hours off) was used as for the shaker. Bottles were either filled to capacity with media or filled three-fourths full with sterilized sand (Sigma-Aldrich) and then media was added to capacity. Lids were left loose to allow for gas exchange.

Growth media. Two custom media mixes were used, Medium A and Medium B. Medium A was used either with or without combined nitrogen added. Medium B contained 1% of full-strength combined nitrogen. Medium A is standard UTEX BG-11 (−N) or BG-11 with normal nitrate (+N), with two modifications: 1) a slightly lower level of phosphate; and 2) 10 mM TES buffer is added at pH 7.0 to maintain the pH of the medium for a longer period of time. Medium B is a modified version of complete M9 medium called BW-M9.

Medium A(+N) was made by adding 10 mL 100×BG11 (+N) concentrate (see below), 1 mL 1000× ferric ammonium citrate stock solution (0.6 g ferric ammonium citrate per 100 mL water; store at 4° C. shielded from light; check for growth before use), 1 mL 1000× $Na_2CO_3$ stock solution (2 g $Na_2CO_3$ in 100 mL water; stored at 4° C.), 1 mL 1000× $K_2HPO_4$ stock solution (3.05 g $K_2HPO_4$ in 100 mL water; stored at 4° C.), and 10 mL 1 M TES (pH 8.2) in double distilled water to 1 liter. After autoclaving and cooling, 1 mL of 1000× Wolfe's Vitamins (ATCC) was added. 100× BG11 (+N) was made by adding 149.6 g $NaNO_3$ (final media 17.6 mM), 7.5 g $MgSO_4 \cdot 7H_2O$ (final media 0.3 mM), 3.6 g $CaCl_2) \cdot 2H_2O$ (final media 0.24 mM), 0.60 g citric acid (or 0.89 g Na salt) (final Media 0.031 mM), 1.12 mL 0.25 M Na-EDTA (pH 8.0) (final media 0.0028 mM), and 100 mL 1000× Trace Minerals (see below) in one liter of water. To prevent precipitation, these additions were made from 100× stock solutions. For Medium A without nitrogen (Medium A (−N)), a 100× BG11(−N) stock was made as above except the $NaNO_3$ was not added and the 100× BG11(−N) stock was used to make the Medium A without nitrogen (Medium A (−N)). 1000× Trace Minerals was made by adding 2.68 g $H_3BO_3$, 1.81 g $MnCl_2 \cdot 4H_2O$, 0.22 g $ZnSO_4 \cdot 7H_2O$, 0.39 g $Na_2MoO_4 \cdot 2H_2O$, 0.079 g $CuSO_4 \cdot 5H_2O$, and 0.049 g $Co(NO_3)_2 \cdot 6H_2O$ to one liter of water. The medium was stored at 4° C.

Medium B (BW-M9) was made by mixing (per 1000 ml) 100 mL of 10× Low-N M9 Salts (see below) and 895 mL water. After autoclaving and cooling the Low-N M9 Salts solution, 0.2 mL filter sterilized 20% w/v sodium acetate, 0.3 mL filter sterilized 1M $CaCl_2$) (14.7 g/100 mL), 1 mL filter sterilized 1M $MgSO_4$ (24.65 g/100 mL), 1 mL filter sterilized 1000× BW-M9 Trace Elements (see below), and 100× filter sterilized Wolfe Vitamins (ATCC) were added. The mixture was autoclaved at 2500° F. (1210° C.) for 20 minutes using a slow exhaust for liquid media. The vitamin solution was used at ¼ strength and is optional. Solutions were mixed after each stock addition. Low-N M9 (10×) salts were made by mixing 11.33 g $Na_2HPO_4 \cdot 7H_2O$, 3 g $KH_2PO_4$, 0.5 g NaCl, and 0.01 g $NH_4Cl$ in distilled water to 100 mL, then adjusting the pH to 7.2 with NaOH. BW-M9 Trace Elements (1000×) were made by mixing 0.5 g EDTA, 0.83 g $FeCl_3 \cdot 6H_2$, 22 mg $ZnSO_4 \cdot 7H_2O$, 7.9 mg $CuSO_4 \cdot 5H_2O$, 10.00 mg $CoCl_2 \cdot 2H_2O$, 0.10 g $H_3BO_3$, 0.18 g $MnCl_2 \cdot 4H_2O$, and 39.00 mg $Na_2MoO_4 \cdot 2H_2O$ in distilled water to 100 mL. EDTA was added first and the pH was adjusted to 7.5 with NaOH. The solution was sterilized using a 0.22 μm filter.

Passaging cultures, cryopreservation, and sample collection. Cultures were passaged to enrich cultures by selection and to assess stability of the microbial communities. Growth in cultures was not measured using standard optical density measurements because nitrogen-fixing consortia grew in a clumpy form. Instead, a weight-based assay of growth rates was developed (see Growth Curves section below), and passaging was normalized between samples using growth time rather than direct measurement of cell quantity. Growth was observed visually to determine the length of time from inoculation to the late exponential phase of growth before cultures began to decline. These observations indicated that exponential growth was reached 17±1 days after inoculation and thus a passage time of 17±1 days was used in the experiments.

Passages were performed as follows: Culture vessels were removed from the incubator and any biofilm formed was resuspended by swirling and/or scraping. Immediately following swirling, 5 mL of culture was drawn into a serological pipette and transferred to a 250-mL Erlenmeyer flask filled with approximately 100 mL of the same growth medium as was used to grow the culture from which the 5-ml inoculum was taken. Each passage was duplicated by inoculating two new cultures with a 5-mL inoculum taken from the same preceding culture. Samples of the cultures were saved for DNA extraction by pelleting approximately 1-1.5 mL of the culture and storing at −20° C. until use. Further, one or two stocks of cells in growth medium were saved in 20% glycerol at −80° C. The passage of cells in which the inoculum was taken from the initial culture inoculated by the environmental sample was designated P1. Subsequent passages were designated P2, P3, and P4. That is, P2 was inoculated using P1; P3 was inoculated using P2; and P4 was inoculated using P3.

Growth curves. As noted above, cultures were clumpy due to biofilm formation and probable production of EPS in the cultures. Accordingly, optical density measurements did not provide an accurate measure of growth and growth curves were instead produced using the dry weight of cell pellets. To provide accurate measurements, each timepoint was grown in a single well of a multiwell plate, and the experiment was designed as an endpoint weight assay for each timepoint. For every P4 culture (eight populations×each lineage BW01, BW02, or BW05), three biological replicates were used at each timepoint. For 6-well plates, each well was filled with 7.5 mL of BG-11 (−N) medium and inoculated with 50 μL of a mature (stationary phase) culture as follows: a 1-mL aliquot was taken from each flask and vortexed continuously for 5 minutes until the cell clumps were dispersed into an even suspension to provide a culture from which a small volume (e.g., 50 μL) could be pipetted accurately for inoculation. An additional aliquot of 200 μL was removed from the remaining vortexed culture and saved as a timepoint (see below). Each plate was placed on an orbital shaker at 150 rpm under two 40-W 4000K LED shop lights.

Each timepoint was collected using a disposable transfer pipette. All material, including biofilms adhering to the bottom and sides of the untreated wells, were disrupted and pipetted. Ultra-pure water was used as a rinse, and all rinsate was collected. All material from each well was collected into a 15-mL conical centrifuge tube and centrifuged in a swinging bucket rotor at 5000 rpm for 10 minutes. The supernatant was discarded, and ultra-pure water was added in a volume sufficient to provide a total volume of 1.5 mL. Using a disposable transfer pipette, the sample was transferred into a pre-weighed 1.5-mL microcentrifuge tube. The sample was centrifuged at 10,000 rpm for 10 minutes and the supernatant was discarded. A wet weight was measured before the tubes were opened and placed into a 55° C. oven for 1 to 2 days, or until the viscous pellet was reduced to a dry and flaky membrane that separated from the tube wall. For each timepoint, three control tubes were also included in the oven, and the small decrease in weight of these tubes was used to compute the drying tare weight change factor. The tare weight multiplied by the drying tare weight change factor was used to provide an adjusted tare weight. The sample tubes holding the samples were weighed and the adjusted tare weight was subtracted to yield the final dry weight of the sample. Dry weights were plotted using the ggplot2 package in R studio (see, e.g., Wickham, (2016) "gplot2: Elegant Graphics for Data Analysis" (Springer-Verlag New York)). Growth curves were modeled using the R package Growthcurver (see, e.g., Sprouffske (2016) "Growthcurver: An R package for obtaining interpretable metrics from microbial growth curves" BMC Bioinformatics 17: 172). Growth curve data for all replicates were inputted into the algorithm for modeling both the BW01 or BW02 lineages. The resultant curves were used to determine maximum doubling times and other metrics. Default inputs were used unless specified. Because the $T_0$ dry weight was below the limit of detection (<0.0001 g), the default minimum correction was used to prevent fitting errors.

DNA extraction. DNA extractions were performed using the Lucigen MasterPure Gram Positive DNA Extraction kit MGP04100. This kit is suitable for both gram-negative and gram-positive bacteria, reducing concerns about extraction biases.

Library preparation. Illumina sequencing libraries were prepared using the Illumina DNA Prep library preparation kit (Illumina 20018705) according to manufacturer instructions. Libraries were prepared with primers containing 10-bp unique dual indexes to provide multiplexing. Library yield was measured using a Qubit Fluorometer, and average library fragment size was determined using an Agilent Bioanalyzer with the High Sensitivity DNA kit. The target average fragment size for libraries was approximately 600 bp.

Illumina sequencing. Libraries were pooled and sequenced on an Illumina NovaSeq 6000 sequencer at the Genome Technology Access Center (GTAC) at the McDonnell Genome Institute (Washington University in Saint Louis) to obtain 150-bp paired-end reads. Read data were demultiplexed by GTAC.

16S amplicon sequencing. 16S rRNA amplicon sequencing was performed by Genewiz. Taxonomic calls were also performed by Genewiz.

Metagenomic data analysis. Taxonomy was determined using Kraken 2 v2.1.2 and the standard Kraken 2 database created on Dec. 2, 2020. Functional annotations were determined using Phylomagnet v0.0.1. Paired-end reads were first joined using Fastq-Join v1.3.1. Reads that are not joined were interleaved using Interleafq v1.1.0. Interleaved and joined reads were processed using Phylomagnet against a curated database of functional and phylogenetically annotated orthologs (EggNOG v5.0). Contigs produced by Phylomagnet were assigned to a taxonomy and functional annotation. The EggNOG orthologous group which represented the functional annotations are listed in Table 4.

Assessment of consortium stability. After each passage, cultures were evaluated to assess the stability of the microbial consortium present in the culture. Stability was evaluated using a measurement of beta-diversity calculated using the Bray-Curtis Dissimilarity Index (see, e.g., Bray & Curtis, An Ordination of the Upland Forest Communities of Southern Wisconsin. Ecol. Monogr. 27, 325-349 (1957), incorporated herein by reference). The Bray-Curtis Dissimilarity index was computed as shown in Equation 1, where $S_i$ is the total specimens in site i, $S_j$ is the total specimens in site j, and $C_{ij}$ is the sum of lesser values of each species per site.

$$BC_{ij} = 1 - \frac{2 \times C_{ij}}{S_i + S_j} \quad (1)$$

The Bray-Curtis Dissimilarity Index is bounded between 0 and 1, where a score of 0 indicates no difference between two passages and a score of 1 indicates that two passages have no species in common. For example, human microbiome samples are highly variable between body sites and display mean Bray-Curtis values ranging from 0.24±0.17 (SD) when comparing individuals stool samples to 0.79±0.08 (SD) when comparing stools to nasal samples in one reference dataset (see, e.g., Maziarz, Using standard microbiome reference groups to simplify beta-diversity analyses and facilitate independent validation. Bioinformatics 34, 3249-3257 (2018), incorporated herein by reference). Soil sampling replicates (e.g., from the same area of 1 to 2 square meters) subjected to the same DNA extraction method produce in Bray-Curtis scores as low as 0.1523.

However, Bray-Curtis values for soil samples extracted using different DNA extraction methods have been observed to be >0.5.

Isolating minimal consortia. Minimal consortia were generated using 20 μL of an undiluted, vortexed culture pipetted onto a BG-11 (−N) plate containing ¼ Wolfe Vitamins (ATCC), 1 mM sodium thiosulfate, and 1% agarose. The plates were streaked with one long streak. After 2 to 4 weeks of growth under white light (by LED) at an intensity of approximately 100 μmol $m^{-2}$ $s^{-1}$ at room temperature (e.g., approximately 24° C.), large colonies appeared. Colonies were picked, placed into 1 mL of sterile ultrapure water, and vortexed until clumps were dispersed. A volume of 20 μL was pipetted onto several of the same type of plates with 4 overlapping streaks. Colonies were again picked and re-streaked in the same manner until isolated colonies were observed of roughly uniform characteristics (typically after 2 or 3 re-streaks). Finally, isolated colonies were used to inoculate 30 mL of BG-11 (−N) with ¼ Wolfe Vitamins in disposable vented tissue culture flasks standing on end and shaken at 150 rpm at roughly under white light (by LED) at an intensity of approximately 100 μmol $m^{-2}$ $s^{-1}$ at room temperature (e.g., approximately 24° C. DNA was extracted and shotgun sequencing was performed in the same manner as was used for the full consortia.

Phylogenetic analysis of minimal consortia. Taxonomy was determined using Phyloflash v3.4 and SILVA database v138.1. Taxonomy was updated using the NCBI taxa API. Results were confirmed using a binning algorithm MetaBat v2.15 and after read assembly using MegaHit v1.2.9. Contigs in each bin were assessed using CheckM v1.1.3.

Taxonomic analysis of photosynthetic microbes. Forward raw sequence reads were compared by the blast algorithm to a reference database of plastid 23S ribosomal DNA sequences (see, e.g., Djemiel (2020) "pgreen-db: a reference database for the 23S rRNA gene of eukaryotic plastids and cyanobacteria" Sci Rep. 10: 5915, incorporated herein by reference). The results were filtered to identify matches that had less than 10 base pair mismatches, greater than 130 base pair alignment length, and greater than 95% identity.

Photobioreactor growth. Photobioreactors were constructed using a series of one-liter glass flasks. Each of the flasks was placed on a stir plate and closed with a stopper containing a glass bubbling line and an outlet line. The growth medium was BG-11 without TES buffer. The TES buffer was omitted from the growth medium to simulate large-scale production conditions, where use of TES would be cost-prohibitive. Accordingly, the TES buffer is an optional component that may be used for long-term shaker cultures and passaging. Growth medium and a stir bar were added to flasks, the opening covered with aluminum foil, and autoclaved. Stopper assemblies comprising inlet filters (Whatman HEPA-vent) were autoclaved separately in dry packs. After cooling, the liquid medium was inoculated with 2 mL of stationary-phase culture. The inoculum concentration was established using the dry weight measurement technique described for growth curves. The inlet side of each filter was connected to the outlet line on a humidifier bottle. The bubbler line inlet of each humidifier bottle was connected to a 10-gallon-rated Whisper air pump protected by a check valve.

Time points were taken from photobioreactor cultures to produce growth curves. Before each timepoint, biofilms that formed were disrupted, either by shaking or scraping the culture flask walls. For each time point, a 1-mL serological pipette was used to withdraw 1 mL of culture, and the 1 ml of culture was added to a pre-weighed 1.7 mL plastic microcentrifuge tube. Centrifugation, drying, and weighing are as described herein for producing growth curves. Despite the use of humidification bottles, some evaporation was observed during the growth period. To counteract the effects of evaporation on growth curve data, the bioreactor volume (to the nearest 50 mL) was recorded for each sample. Curves were fit to points plotted on a grams per bioreactor basis, which scaled the 1 mL culture dry weight to the present culture volume at the time of sampling.

Carbon and Nitrogen determination. Total elemental carbon and nitrogen were determined for dry cell pellets following the harvest of photobioreactor cultures. Cells were separated from liquid media at very late log or stationary phase (32 or 45 days for high and low light experiments, respectively). Whole cell pellets were harvested in a swinging bucket rotor containing four 500 mL bottles at 5000 rpm in Beckman-Coulter Allegra 25R Centrifuge. The pellets were transferred to pre-weighed disposable 50 mL conical tubes and dried at 55° C. in an oven until hard and crumbly. Pellets were analyzed by combustion in a LECO analyzer by Midwest Laboratories (Omaha, NE, USA) per Protocol MWL WC PROC 55.

Soil Growth. A commercial potting mix was sterilized in a glass petri plates by autoclaving before being inoculated with Red fluorescence images of three consortia grown on sterilized potting soil with Day 0 blank subtracted and images aligned by proprietary image analysis software. Excitation light is 450 nm blue light. A deep red filter is used to block blue wavelengths to the camera detector.

Example 1

During the development of embodiments of the technology provided herein, experiments were conducted to select organisms that grow without added reduced nitrogen and carbon using only light, basic mineral salts, and atmospheric gases. Eight environmental samples, collected in mid-winter or early spring, were subjected to multiple selective growth conditions, providing 56 different starting samples (Table 1). Many conditions showed growth. However, the data collected indicated that three cultures (populations) inoculated from winter soil had exceptional growth in a short period of time (28 days). Further experiments focused on these three cultures (BW01, BW02, and BW05). Condition 7 was a positive control for microbial growth. Growth in Table 1 was measured visually by comparing growth of each condition 1 to 6 with the growth of positive control condition 7 and assigning a number from 1 (low growth) to 8 (high growth). BW01, BW02, and BW05 were produced in BG-11 medium ("Medium A") without nitrogen (−N) and with illumination. BW01 and BW02 were produced with shaking in flasks. BW05 was produced in sand.

TABLE 1

Growth conditions for starting samples

| Condition | Medium | Vessel | Substrate | Agitation | Samples | Growth |
|---|---|---|---|---|---|---|
| 1 | A (−N) | Flask | Liquid | Y | 8 | 4 |
| 2 | A (−N) | Bottle | Liquid | N | 8 | 7 |
| 3 | A (−N) | Sand | Sand | N | 8 | 4 |
| 4 | B (−N) | Flask | Liquid | Y | 8 | 6 |
| 5 | B (−N) | Bottle | Liquid | N | 8 | 8 |
| 6 | B (−N) | Sand | Sand | N | 8 | 7 |
| 7 | B (+N) | Flask | Liquid | Y | 8 | 8 |

Example 2

The initial cultures of BW01, BW02, and BW05 were used to inoculate two new flasks each containing the same medium as the medium used to grow and enrich the BW01, BW02, and BW05 cultures during the initial selection. The growth of cultures was monitored by visual inspection, and an inoculum taken at the late exponential phase of growth (e.g., 2.5 weeks after inoculation) was used to inoculate a new flask containing fresh selective growth medium.

Each inoculation step, growth under selection, and the associated characterization of the resulting culture is termed a "passage". Each passage was assigned a unique identifier (e.g., "Passage 1" or "P1"). Each population was followed in duplicate flasks grown under the same selective pressure. Four passages were performed to assess the stability of the cultures (see below) from passage to passage and to produce a consortium comprising the key components of the initial populations. Passaging was performed for both the (−N) and (+N) conditions simultaneously, with the (+N) cultures used as a positive control to verify that conditions were conducive to growth. Positive controls with nitrogen supplementation grew much more rapidly, suggesting that growth of the population can be accelerated through nutrient supplementation. For each passage, samples of exponential phase cultures were collected and retained for storage and for shotgun metagenomic sequencing.

Different culture morphologies were observed in the final passage (P4). BW01 lineages had two morphological classes—four P4 flasks had a light green color with smaller clumps and four flasks had much darker and larger clumps. BW02 contained extremely clumpy cells and had a rapid growth phenotype. When dewatered, BW02 cultures had a jelly-like morphology consistent with the exocellular polymeric substances (EPS) secreted by cyanobacteria in the family Nostocaceae, such as *Anabaena* spp. (See, e.g., Moreno, Chemical and rheological properties of an extracellular polysaccharide produced by the cyanobacterium *Anabaena* sp. ATCC 33047. Biotechnol. Bioeng. 67, 8 (2000), incorporated herein by reference).

Figure 1B:
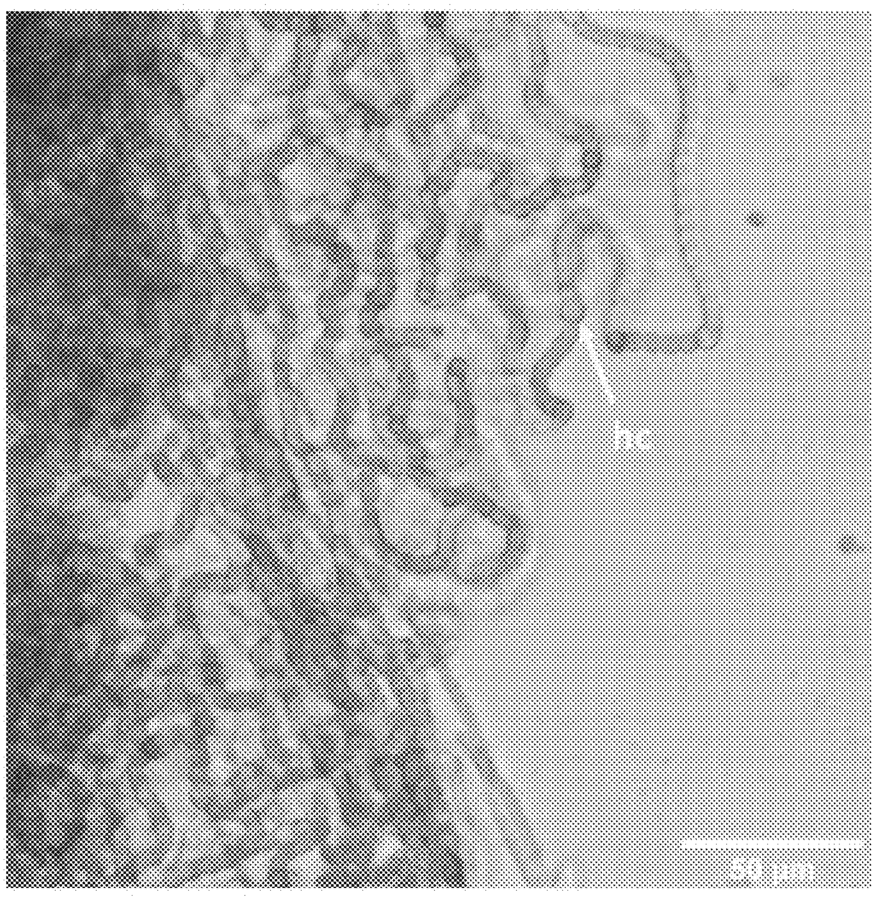
FIG. 1B shows a light microscope image of BW02 cells. The scale bar shows a distance of 50 μm. Structures that are believed to be heterocysts are marked with "hc".

Both BW01 and BW02 cultures contained filaments with apparent heterocysts when observed through a light microscope (FIG. 1A and FIG. 1). Heterocysts are an adaptation of Nostocaceae used to fix nitrogen concurrently with oxygen-generating photosynthesis. (See, e.g., Kumar, Cyanobacterial Heterocysts. Cold Spring Harb. Perspect. Biol. 2, a000315-a000315 (2010), incorporated herein by reference). Since nitrogenase is highly sensitive to oxygen poisoning, heterocysts serve to provide an anaerobic environment for nitrogen fixation while vegetative cells perform photosynthesis (e.g., oxygenic photosynthesis). Sugars and fixed nitrogen are exchanged between heterocysts and vegetative cells through microplasmodesmata. Nostocaceae also have a second differentiated cell type, called an akinete, that is highly durable to environmental insults and therefore serves as a long-term survival mechanism for the organism.

Example 3

During the development of embodiments of the technology described herein, BW01, BW02, and BW05 cultures were evaluated using shotgun metagenomic sequencing of the population to assess changes in population diversity and to ascertain community compositions. DNA extraction and shotgun metagenomic sequencing were performed on each culture from each of the four passages. Illumina sequencing was performed. To identify the microbial genera that comprise the communities, sequence data were analyzed using Kraken2. (See, e.g., Wood, Improved metagenomic analysis with Kraken 2. Genome Biol. 20, 257 (2019), incorporated herein by reference). Replicates from the same passage were averaged in this analysis for an overall community composition readout. In addition, the initial soil samples used were also subject to shotgun metagenomic sequencing to provide a description of the starting samples. Sequence data derived from cultures grown under selective conditions demonstrated that several lineages with different physical characteristics evolved slightly differently in each duplicated flask.

Figure 2:
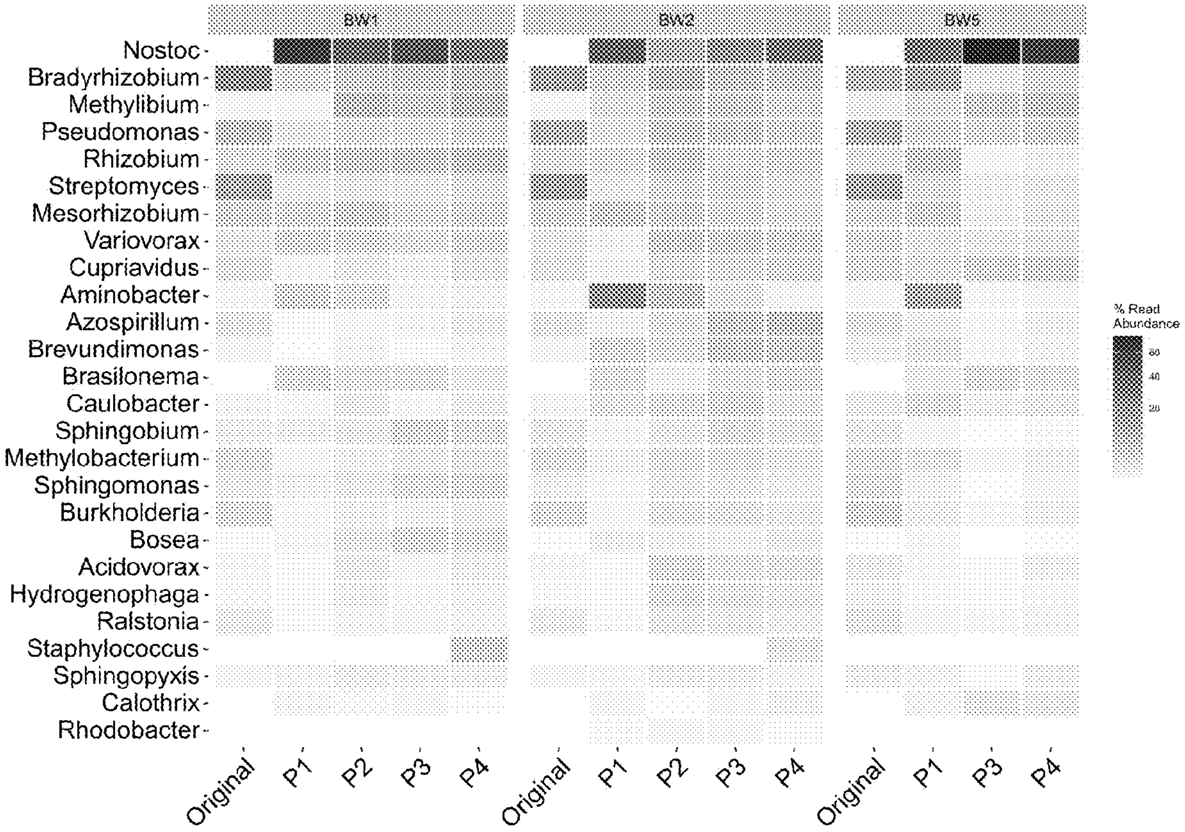
FIG. 2 is a heat map showing the relative abundances of genera in the initial soil samples and in the P1-P4 passages that produced the BW01, BW02, and BW05 consortia. A darker color indicates a higher read abundance as determined using Kraken2.
Figure 3A:
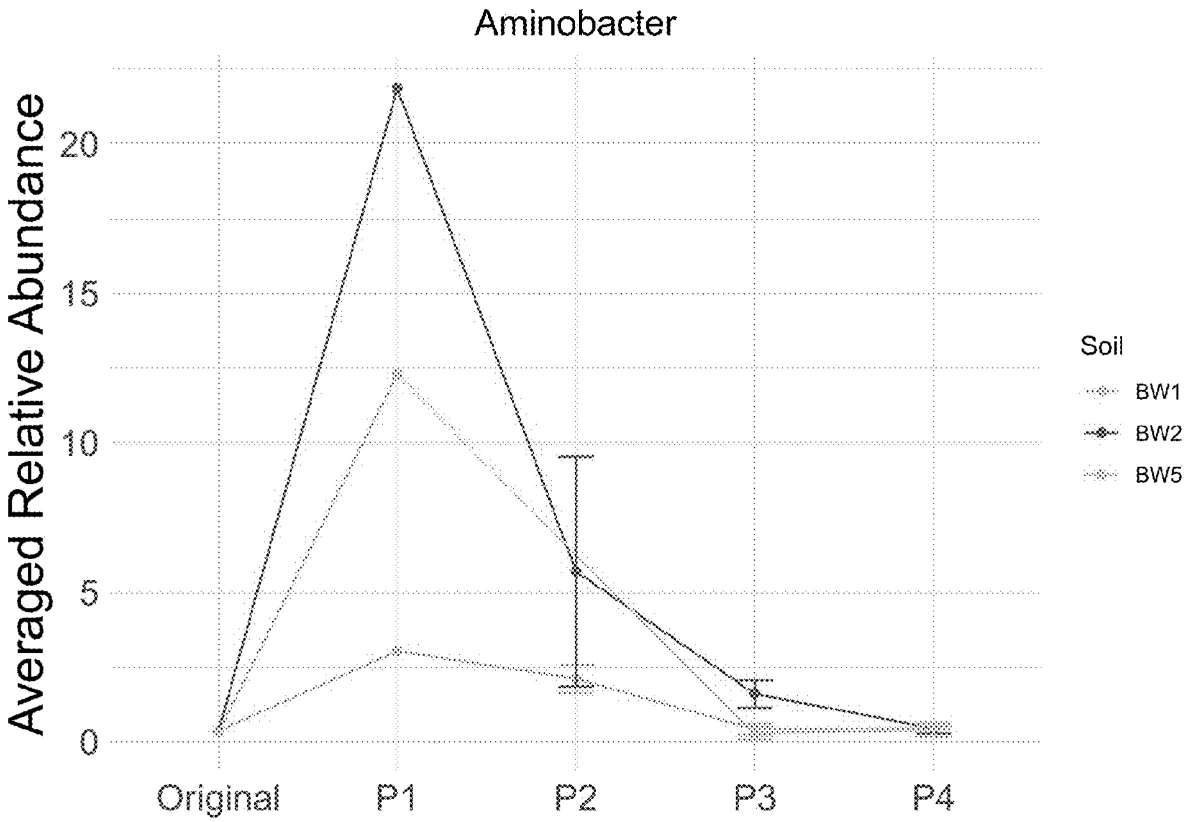
FIG. 3A is a plot showing the relative abundance of *Aminobacter* in BW01, BW02, and BW05 as a function of passage from the original soil sample and through P1 to P4. Error bars indicate the standard deviation (original soil sample n=1; P1 n=1; P2 n=2; P3 n=4; and P4 n=4).
Figure 3B:
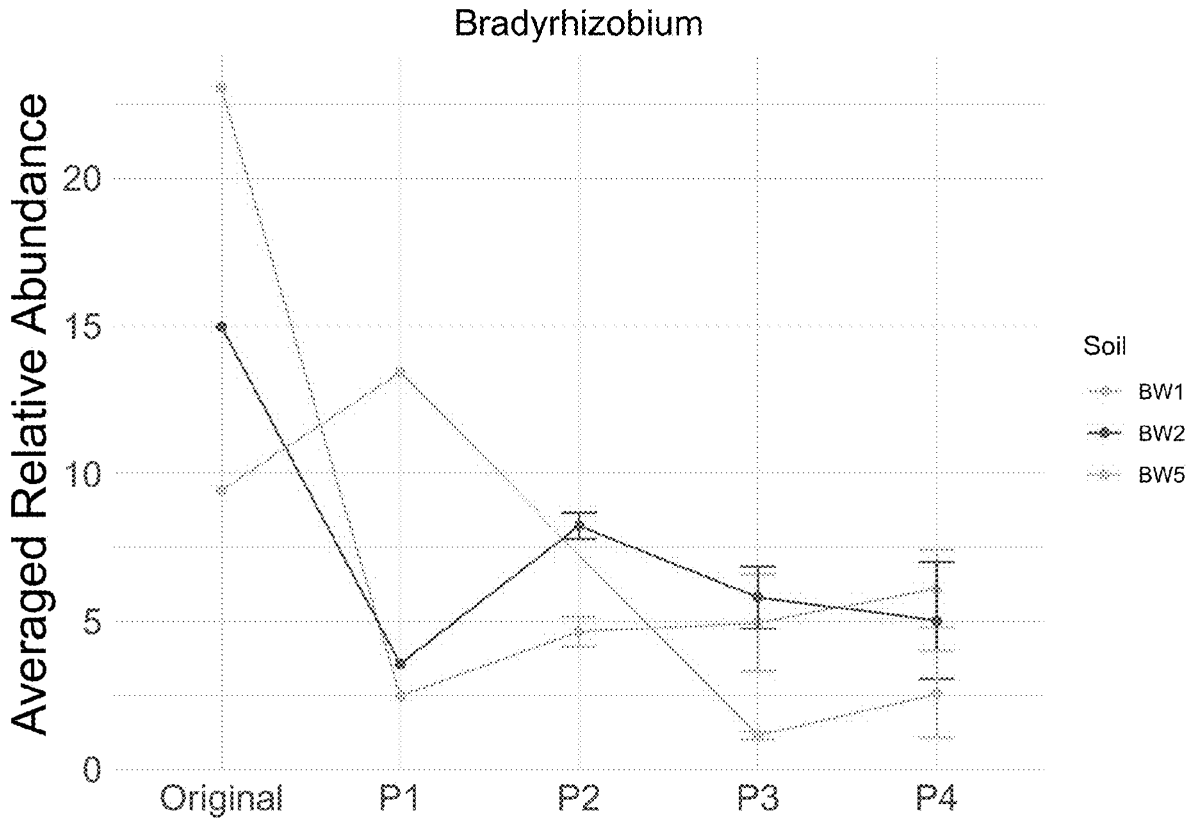
FIG. 3B is a plot showing the relative abundance of *Bradyrhizobium* in BW01, BW02, and BW05 as a function of passage from the original soil sample and through P1 to P4. Error bars indicate the standard deviation (original soil sample n=1; P1 n=1; P2 n=2; P3 n=4; and P4 n=4).
Figure 3C:
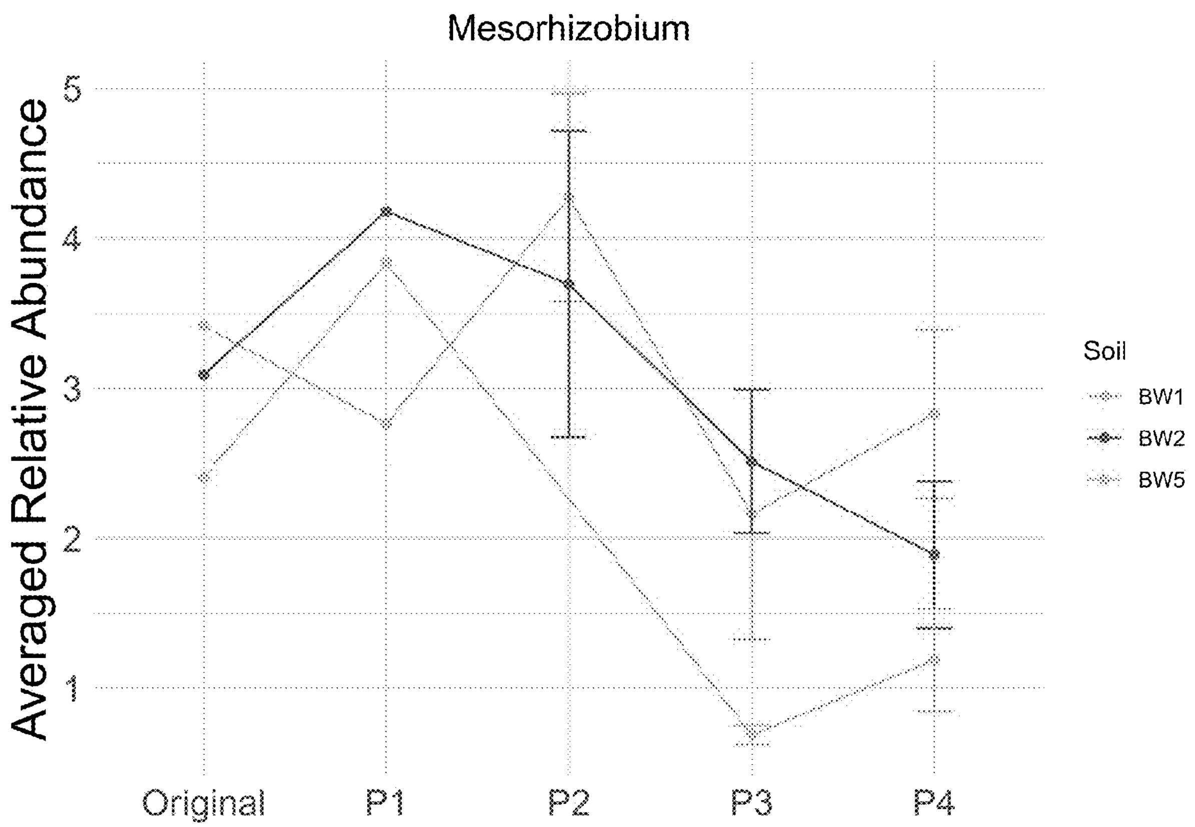
FIG. 3C is a plot showing the relative abundance of *Mesorhizobium* in BW01, BW02, and BW05 as a function of passage from the original soil sample and through P1 to P4. Error bars indicate the standard deviation (original soil sample n=1; P1 n=1; P2 n=2; P3 n=4; and P4 n=4).
Figure 3D:
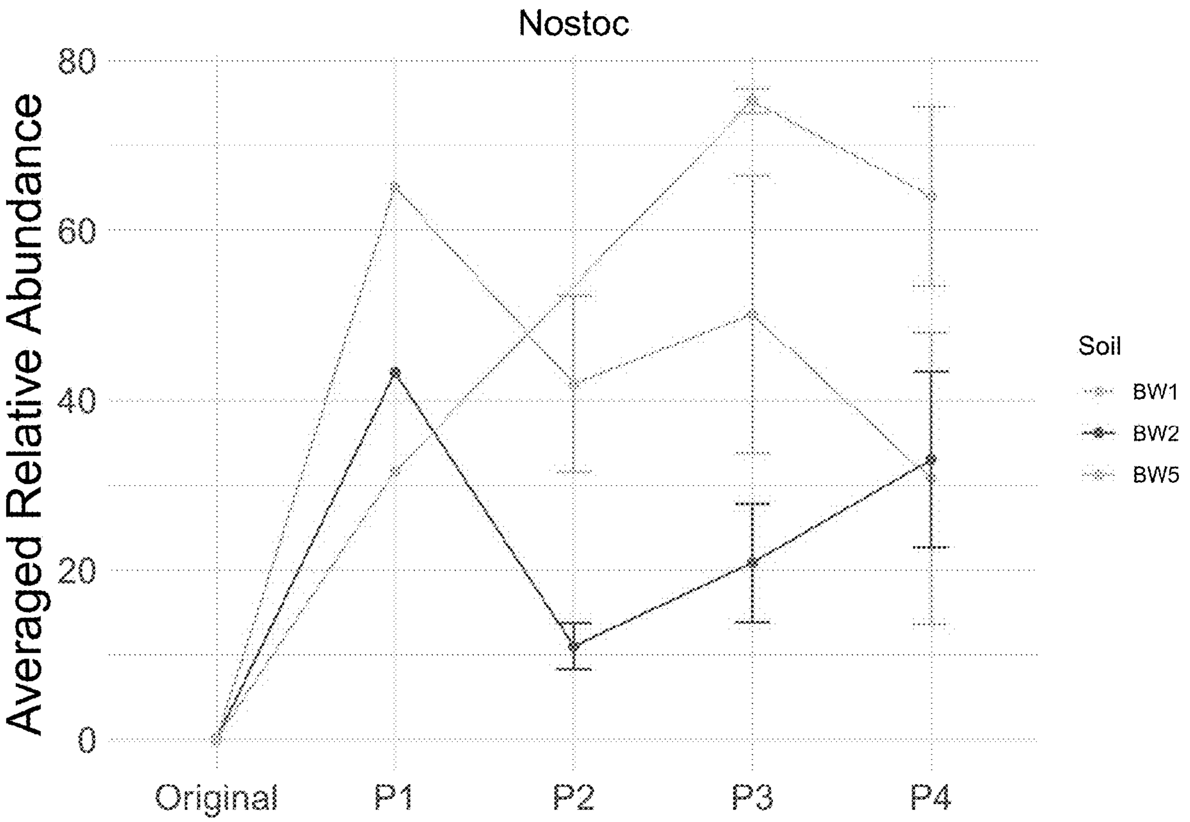
FIG. 3D is a plot showing the relative abundance of *Nostoc* in BW01, BW02 and, BW05 as a function of passage from the original soil sample and through P1 to P4. Error bars indicate the standard deviation (original soil sample n=1; P1 n=1; P2 n=2; P3 n=4; and P4 n=4).
Figure 3E:
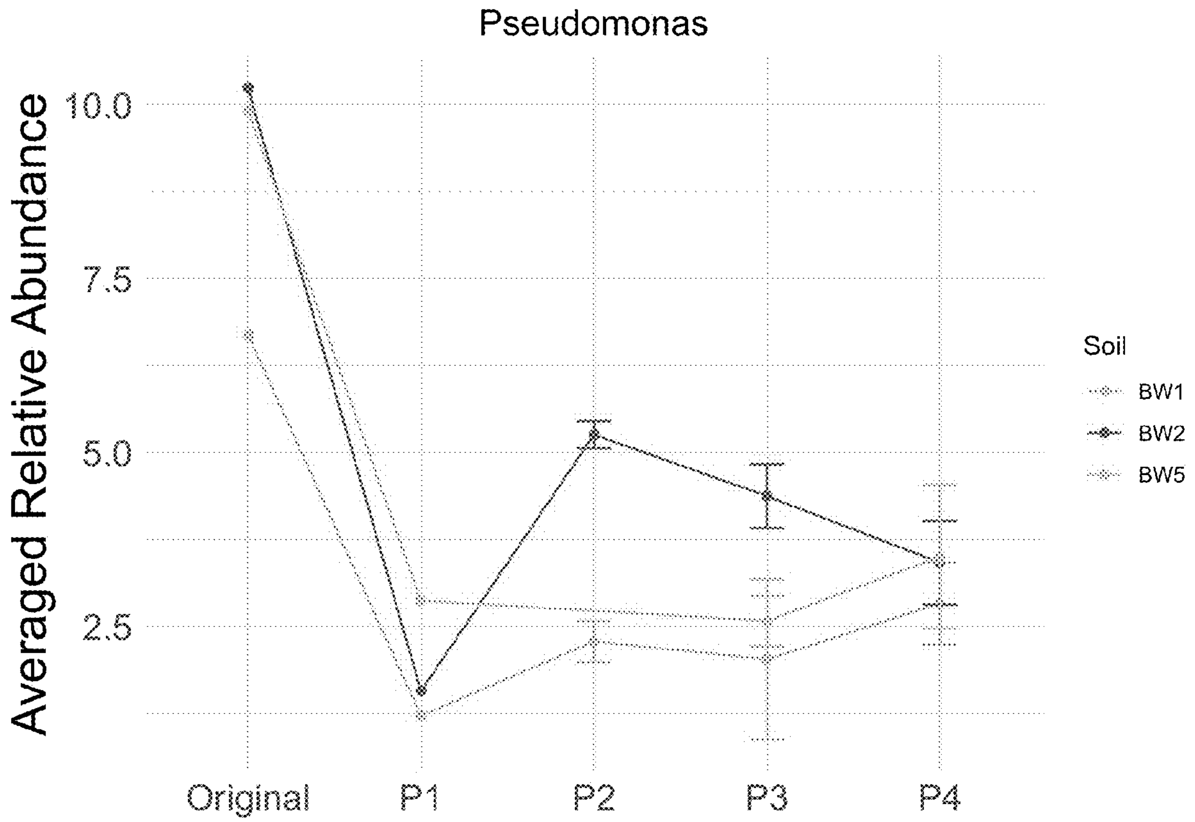
FIG. 3E is a plot showing the relative abundance of *Pseudomonas* in BW01, BW02, and BW05 as a function of passage from the original soil sample and through P1 to P4. Error bars indicate the standard deviation (original soil sample n=1; P1 n=1; P2 n=2; P3 n=4; and P4 n=4).
Figure 3F:
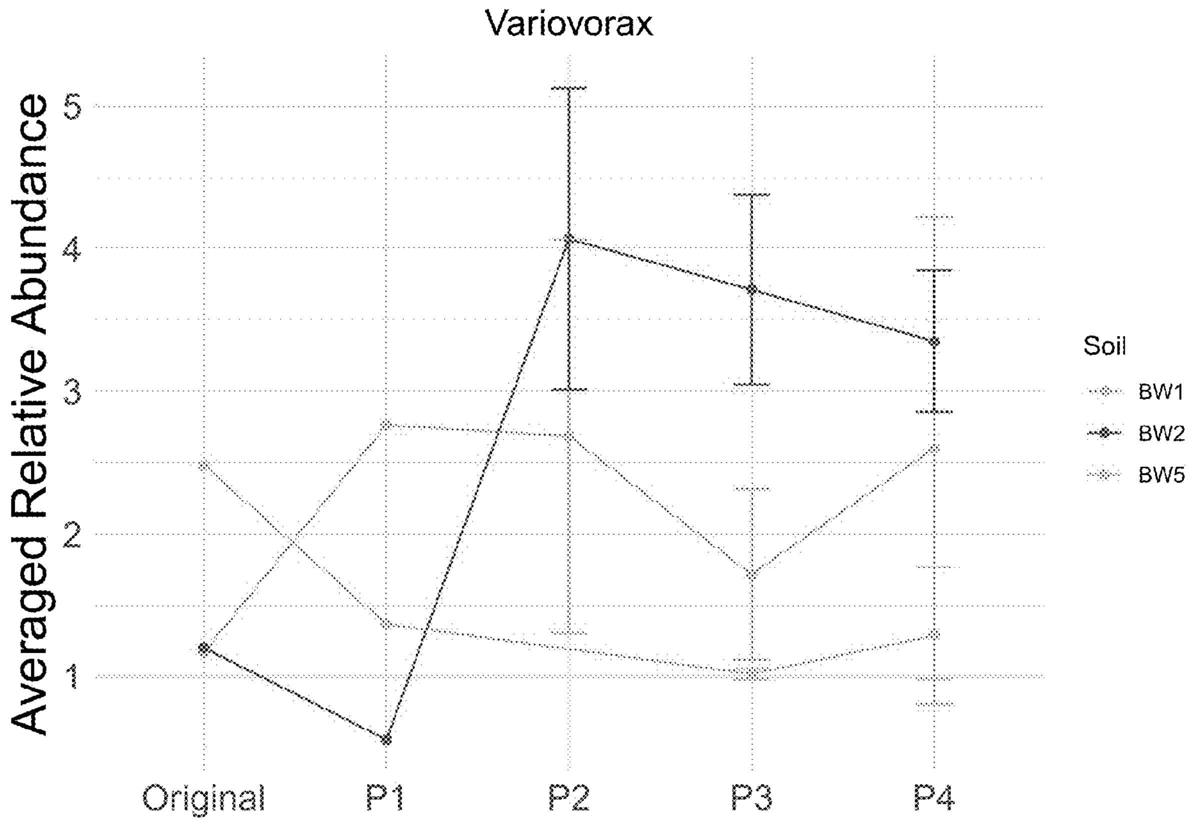
FIG. 3F is a plot showing the relative abundance of *Variovorax* in BW01, BW02, and BW05 as a function of passage from the original soil sample and through P1 to P4. Error bars indicate the standard deviation (original soil sample n=1; P1 n=1; P2 n=2; P3 n=4; and P4 n=4).
Figure 3G:
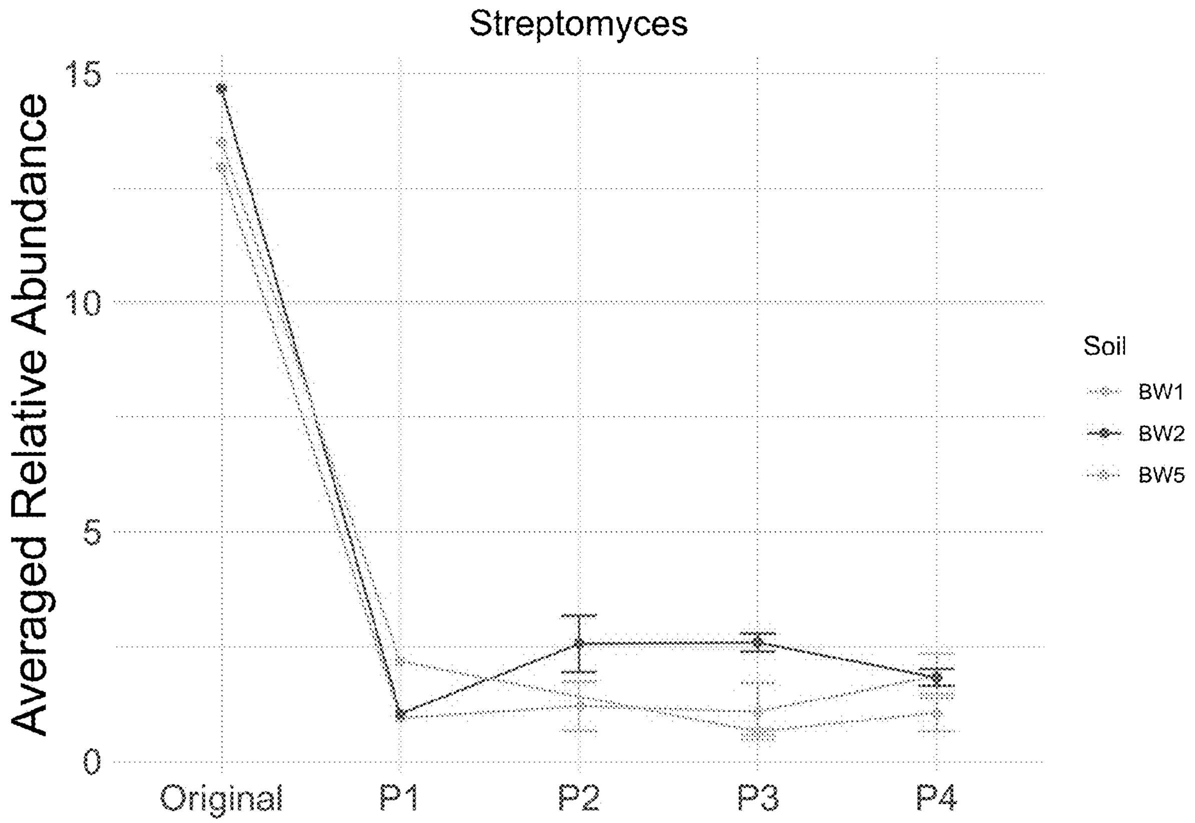
FIG. 3G is a plot showing the relative abundance of *Streptomyces* in BW01, BW02, and BW05 as a function of passage from the original soil sample and through P1 to P4. Error bars indicate the standard deviation (original soil sample n=1; P1 n=1; P2 n=2; P3 n=4; and P4 n=4).
Figure 3H:
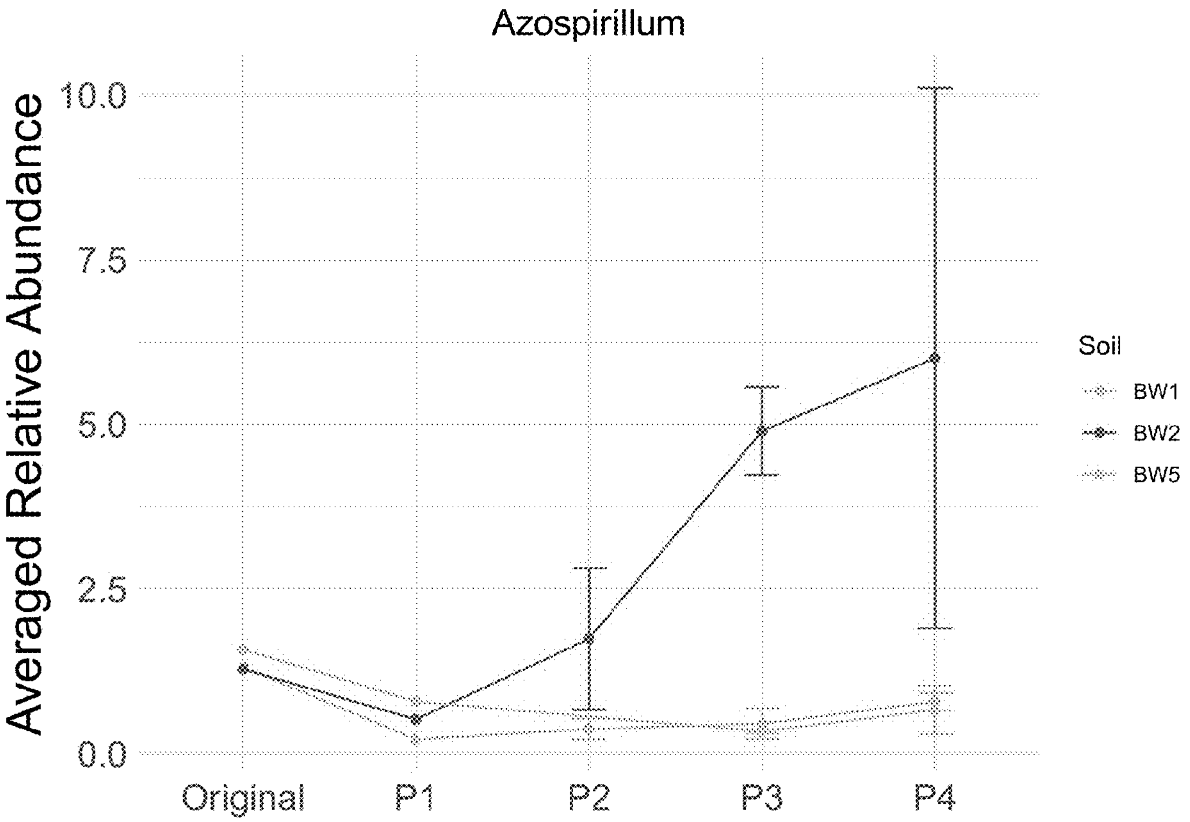
FIG. 3H is a plot showing the relative abundance of Azospirillum in BW01, BW02, and BW05 as a function of passage from the original soil sample and through P1 to P4. Error bars indicate the standard deviation (original soil sample n=1; P1 n=1; P2 n=2; P3 n=4; and P4 n=4).
Figure 3I:
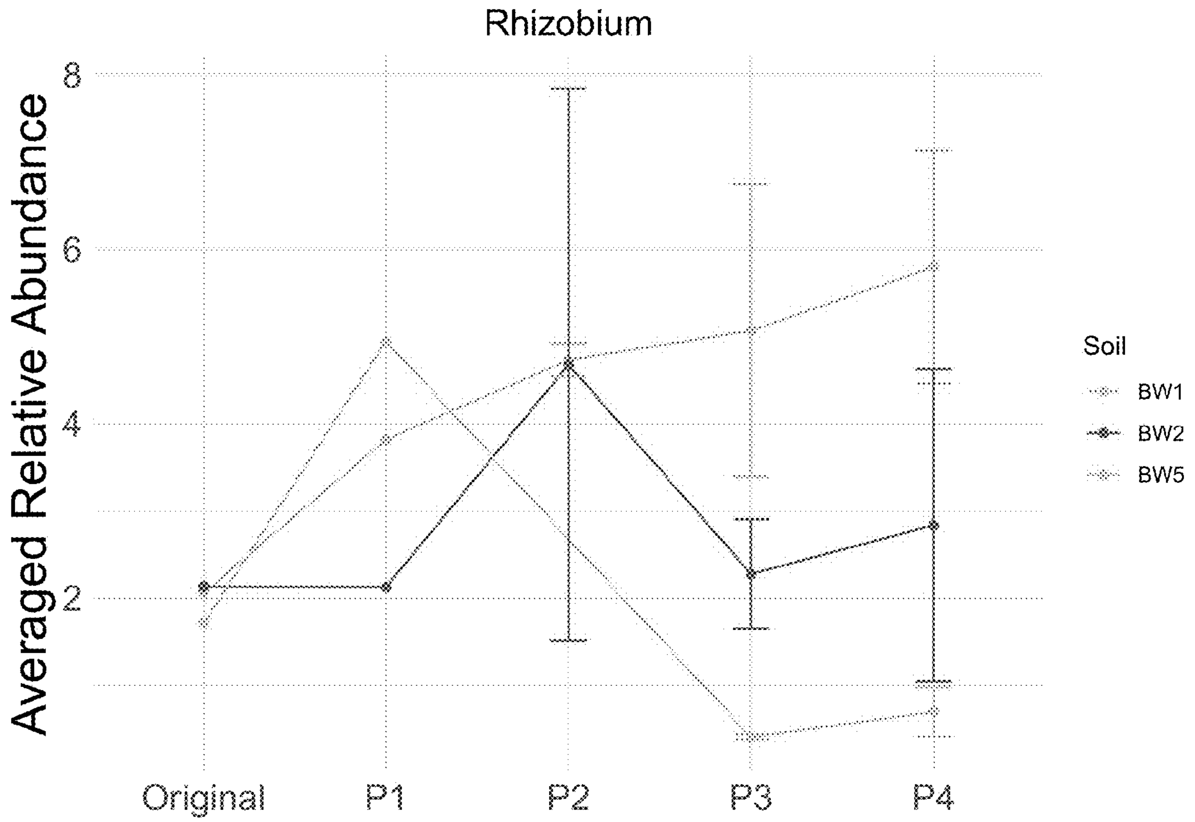
FIG. 3I is a plot showing the relative abundance of *Rhizobium* in BW01, BW02, and BW05 as a function of passage from the original soil sample and through P1 to P4. Error bars indicate the standard deviation (original soil sample n=1; P1 n=1; P2 n=2; P3 n=4; and P4 n=4).

Taxonomic classification of metagenomic sequence data collected during these experiments indicated that the selective growth conditions significantly changed the community composition compared to the original soil samples. Interestingly, while communities passaged from different starting samples differed with respect to many characteristics, the communities were observed to have several similar characteristics The selection process modified the population by changing the proportion of each genus. The data indicated that the selection produced four general changes (FIG. 2; FIG. 3A-FIG. 3H):

1. The relative abundance of some genera steadily increased throughout passaging. For example, *Nostoc* spp. was present at 31±17% (SD) and 33±10% (SD) of Passage 4 (P4) samples for BW01 and BW02, respectively, which was an increase of from less than 0.1% in the original soils; a similar trend was observed for BW05. The prevalence of this genus increases rapidly and remains stable throughout passaging in all three of BW01, BW02, and BW05. *Methylibium* spp. also increased steadily throughout passaging, though to a lower abundance than *Nostoc* spp.
2. The relative abundances of other genera steadily decreased as passaging progressed. For example, *Streptomyces* spp. and *Mesorhizobium* spp. both appeared to be less fit under the selective conditions than in the original soil, and overall these populations decreased in all cultures throughout passaging.
3. Some genera initially increased in prevalence before being outcompeted by other genera later in passaging, e.g., *Aminobacter* spp. and *Rhizobium* spp.
4. Other genera initially decreased in prevalence during P1 compared to the original soil and increased during later passaging, e.g., *Pseudomonas* spp. and Azospirillum spp.

Example 4

Figure 4:
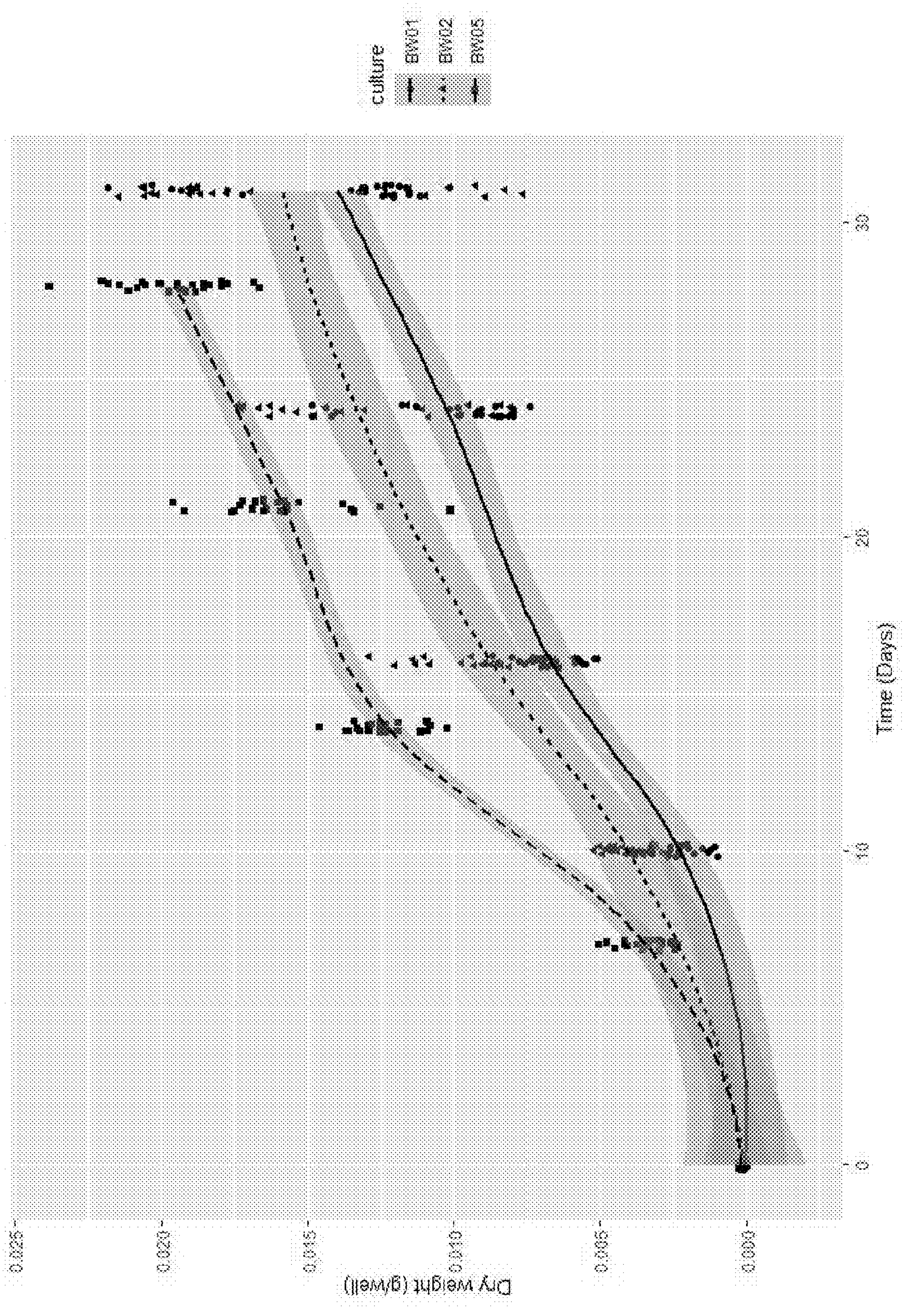
FIG. 4 is a plot showing growth curves of all P4 samples for BW01, BW02, and BW05. Growth curves were determined by measuring the dry weight of cells in culture (grams) as a function of time (days). Dry weight is per 7.5 mL well in a standard 6-well plate.

During the development of embodiments of the technology described herein, growth phenotypes of the populations were measured using replicated growth curves (FIG. 4). Growth curves were plotted using the dry weight of the cultures in grams per 7.5 mL well of a standard 6 well plate, which also provided a measure of carbon sequestration. Growth curves incorporating all replicates from BW01 (n=24), BW02 (n=24), and BW05 (n=24) were modeled using a logarithmic function. The resulting metrics, including uncertainties associated with each curve fit, are shown in Table 2. The values for ½ K, where half of maximum growth is reached, were 19.1 days and 15.8 days and the maximum doubling times were 4.2 days and 3.6 days for BW01 and BW02, respectively. Parameters for Table 2 are as follows. Unless specifically noted, all weight units are (dry weight) grams per 7.5 ml well in a standard 6-well plate with time in days: k=carrying capacity, no=weight at beginning of growth phase, r=growth rate, sigma=goodness of fit, df=degrees of freedom, t_mid=time at inflection point, when population is ½ k, t_gen=fastest generation time, or doubling time. SE is standard error and p is P-value.

TABLE 2

Growth curve fitting parameters for BW01 and BW02

| Values | k | n0 | r | sigma | df | t_mid | t_gen |
|---|---|---|---|---|---|---|---|
| BW01 | 0.016 | 0.001 | 0.165 | 0.002 | 101 | 19.108 | 4.194 |
| BW02 | 0.016 | 0.001 | 0.191 | 0.003 | 101 | 15.79 | 3.623 |

| Error | k_se | k_p | n0_se | n0_p | r_se | r_p |
|---|---|---|---|---|---|---|
| BW01 | 0.001 | 9.00E−22 | 0 | 5.00E−03 | 0.024 | 8.00E−10 |
| BW02 | 0.001 | 2.00E−29 | 0 | 3.00E−02 | 0.034 | 2.00E−07 |

The individual P4 populations were evaluated in more detail by fitting curves for individual populations (n=3 for each population). Eight P4 populations were produced from each soil lineage BW01 and BW02. The output parameters for each of these 16 populations are shown in Table 3. When fitted curve doubling times within each soil lineage are averaged, the resulting doubling times are found to be 4.0±0.5 and 3.5±0.7 days for BW01 and BW02, respectively, where error is reported as one standard deviation from the mean. Parameters for Table 3 are as follows. Unless specifically noted, all weight units are grams per 7.5 ml well in a standard 6-well plate with time in days: k=carrying capacity, no=weight at beginning of growth phase, r=growth rate, sigma=goodness of fit, df=degrees of freedom, t_mid=time at inflection point, when population is ½ k, t_gen=fastest generation time, or doubling time, auc=area under curve by 1, the logistic equation, and e the empirical data points.

TABLE 3

Growth curve fitting parameters for all 16 populations tested

| sample | k | n0 | R | t_mid | t_gen | auc_l | auc_e | sigma |
|---|---|---|---|---|---|---|---|---|
| S1169 | 0.013111 | 0.000398 | 0.198452 | 17.45688 | 3.492762 | 0.179875 | 0.176712 | 0.001353 |
| S1170 | 0.013817 | 0.000438 | 0.16766 | 20.39721 | 4.134248 | 0.156721 | 0.158171 | 0.001028 |
| S1171 | 0.012538 | 0.00058 | 0.184145 | 16.43289 | 3.764133 | 0.183916 | 0.19448 | 0.001275 |
| S1172 | 0.012129 | 0.000516 | 0.203053 | 15.33978 | 3.41363 | 0.18979 | 0.195122 | 0.000782 |
| S1173 | 0.012589 | 0.000941 | 0.146202 | 17.20563 | 4.741012 | 0.177724 | 0.177564 | 0.000987 |
| S1174 | 0.014772 | 0.000671 | 0.148479 | 20.51127 | 4.668322 | 0.169333 | 0.166762 | 0.000537 |
| S1175 | 0.021331 | 0.000438 | 0.186829 | 20.68711 | 3.710052 | 0.233134 | 0.245167 | 0.001146 |
| S1176 | 0.023363 | 0.000668 | 0.169818 | 20.76049 | 4.081707 | 0.257508 | 0.262957 | 0.001136 |
| BW01 Av | 0.015456 | 0.000581 | 0.17558 | 18.59891 | 4.000733 | 0.1935 | 0.197117 | 0.00103 |
| BW01 SD | 0.004085 | 0.000167 | 0.01991 | 2.076146 | 0.469211 | 0.031907 | 0.035163 | 0.000249 |
| S1177 | 0.019272 | 0.000651 | 0.228732 | 14.65934 | 3.030388 | 0.314002 | 0.308193 | 0.000739 |
| S1178 | 0.021249 | 0.001224 | 0.160444 | 17.41844 | 4.32018 | 0.294925 | 0.301311 | 0.0018 |
| S1179 | 0.025293 | 0.000954 | 0.14461 | 22.39921 | 4.793211 | 0.25512 | 0.265205 | 0.001407 |
| S1180 | 0.021675 | 0.000723 | 0.183654 | 18.33075 | 3.774191 | 0.281595 | 0.287525 | 0.000664 |
| S1181 | 0.018551 | 0.000549 | 0.228745 | 15.2556 | 3.030221 | 0.291827 | 0.302273 | 0.001085 |
| S1182 | 0.010419 | 0.000525 | 0.206853 | 14.19218 | 3.350921 | 0.174049 | 0.173449 | 0.000726 |
| S1183 | 0.011768 | 0.000652 | 0.225067 | 12.59874 | 3.079735 | 0.214387 | 0.222493 | 0.000843 |
| S1184 | 0.008637 | 0.000351 | 0.281145 | 11.24111 | 2.46544 | 0.169501 | 0.175678 | 0.000943 |
| BW02 Av | 0.017108 | 0.000704 | 0.207406 | 15.76192 | 3.480536 | 0.249426 | 0.254516 | 0.001026 |
| BW02 SD | 0.005665 | 0.000255 | 0.040885 | 3.312404 | 0.718299 | 0.052918 | 0.052878 | 0.00037 |

Example 5

Figure 5:
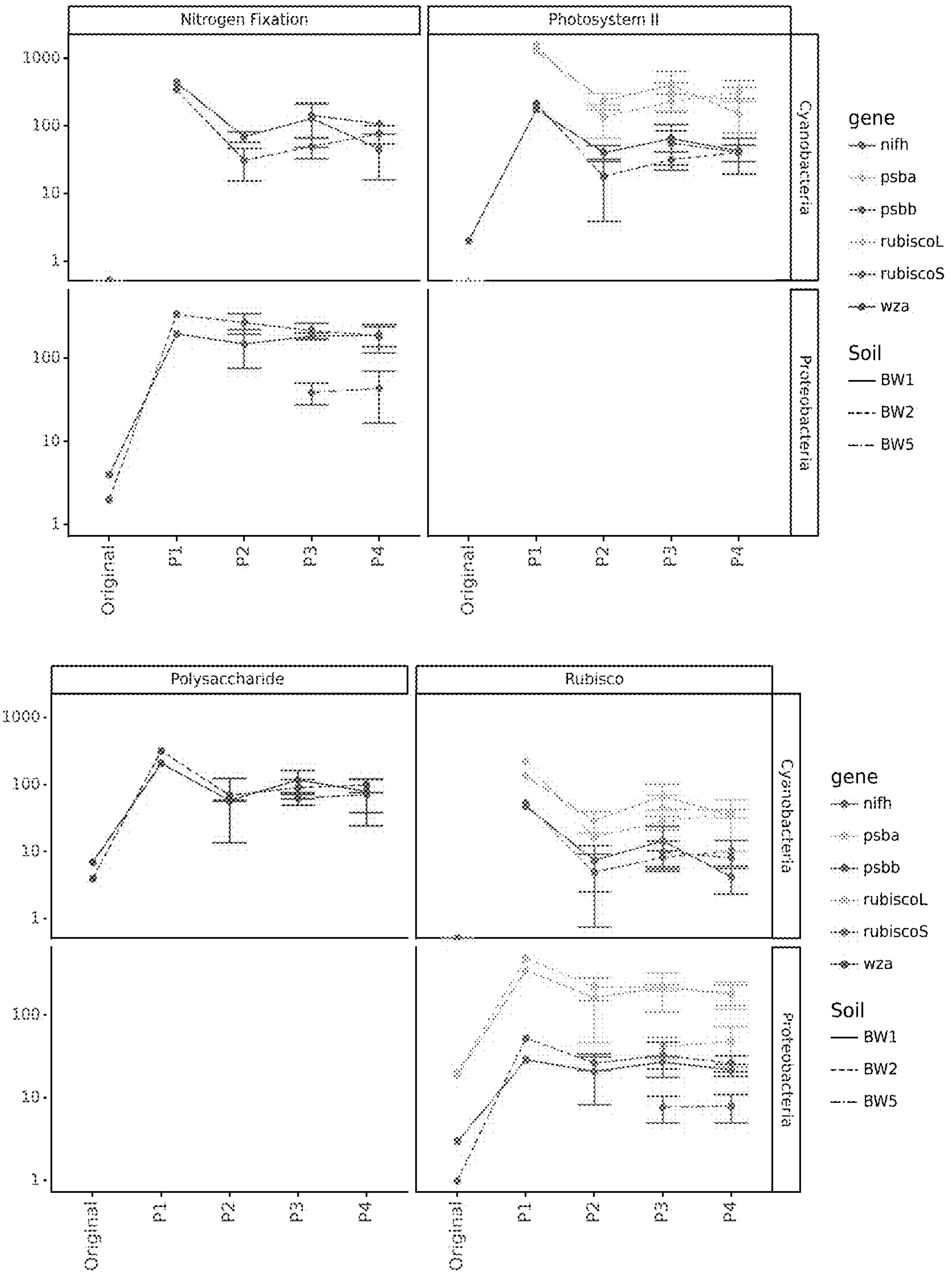
FIG. 5 is a series of plots showing changes in the relative abundance of particular genes (nitrogenase subunit h (nifh), photosystem II subunits (psba and psbb), ribulose-1,5-bisphosphate carboxylase/oxygenase (rubiscoL and rubiscoS), and polysaccharide biosynthesis and export protein involved in EPS biosynthesis (wza)) identified in nucleotide sequence obtained from the BW01, BW02, and BW05 consortia as a function of passaging. The plots show the gene presence by log 10 gene count from the original soil sample through P4. The EggNOG orthologous group that represented the functional annotations are listed in Table 4.

During the development of embodiments of the technology described herein, the four passages were evaluated for particular gene and/or enzymatic activities (Table 4 and FIG. 5). Gene functions were assessed in two phyla represented in the taxonomic characterizations Cyanobacteria and Proteobacteria. Gene functions from the photosynthetic, nitrogen fixation, and EPS production pathways were chosen for this analysis.

TABLE 4

Orthologous groups representing functional annotations

| Taxonomy | Gene | EggNOG |
|---|---|---|
| Phylum: Proteobacteria | nifH | ENOG501MVTE |
| Phylum: Cyanobacteria | nifH | ENOG501G2KZ |
| Phylum: Proteobacteria | Dinitrogenase iron-molybdenum cofactor | ENOG501RF34 |
| Phylum: Cyanobacteria | PsbA | ENOG501G08A |
| Phylum: Cyanobacteria | PsbB | ENOG501G260 |
| Phylum: Cyanobacteria | PsbT | ENOG501GAFM |
| Phylum: Cyanobacteria | PsbH | ENOG501G9GY |
| Phylum: Cyanobacteria | PetB | ENOG501G125 |
| Phylum: Cyanobacteria | PetD | ENOG501G0PR |
| Phylum: Proteobacteria | Component of the ubiquinol-cytochrome c reductase complex (complex III or cytochrome b-c1 complex), which is a | ENOG501MV97 |

TABLE 4-continued

| Orthologous groups representing functional annotations | | |
| --- | --- | --- |
| Taxonomy | Gene | EggNOG |
| | respiratory chain that generates an electrochemical potential coupled to ATP synthesis | |
| Phylum: Proteobacteria | PFAM PRC-barrel domain protein | ENOG501QTWZ |
| Genus: *Rhodobacter* | The reaction center is a membrane-bound complex that mediates the initial photochemical event in the electron transfer process of photosynthesis | ENOG501FAVU |
| Phylum: Proteobacteria | ribulose-1,5-bisphosphate carboxylase/oxygenase large subunit | COG1850 |
| Phylum: Proteobacteria | ribulose bisphosphate carboxylase, small | ENOG501R9ZE |
| Kingdom: Bacteria | ribulose-bisphosphate carboxylase activity | COG1850 |
| Phylum: Cyanobacteria | ribulose bisphosphate carboxylase, small | ENOG501G6JS |
| Phylum: Proteobacteria | introduces a magnesium ion into protoporphyrin IX to yield Mg-protoporphyrin IX | ENOG501MVD4 |
| Phylum: Cyanobacteria | Involved in chlorophyll biosynthesis. Catalyzes the insertion of magnesium ion into protoporphyrin IX to yield Mg-protoporphyrin IX | ENOG501G13M |
| Phylum: Cyanobacteria | COG4576 Carbon dioxide concentrating mechanism carboxysome shell protein | ENOG501GER0 |
| Phylum: Proteobacteria | PFAM Ethanolamine utilization protein EutN carboxysome structural protein Ccml | ENOG501N7B1 |
| Phylum: Cyanobacteria | Oxidoreductase NAD-binding domain | ENOG501FZZF |
| Phylum: Cyanobacteria | Belongs to the phycobilisome linker protein family | ENOG501G0CU |
| Phylum: Cyanobacteria | Wza: Periplasmic protein involved in polysaccharide export | ENOG501G0AJ |
| Order: Nostocales | HetZ: response regulator | ENOG501HIW5 |
| Order: Nostocales | HetR: Controls heterocyst differentiation. Has both a protease and a DNA-binding activity | ENOG501HJMX |
| Order: Nostocales | HetP: Heterocyst differentiation protein | ENOG501HNIN |
| Order: Nostocales | HetN: Belongs to the short-chain dehydrogenases reductases (SDR) family | ENOG501HMRU |

Example 6

During the development of embodiments of the technology described herein, experiments were conducted to produce a minimal consortium having a reduced complexity while also providing the phototrophic and nutrient fixing functions of the more complex consortia identified in other experiments. In these experiments, cultures were streaked on plates multiple times with dilution to isolate individual colonies of stable morphologies. Cyanobacteria produce a complex extracellular matrix and often closely associate with other microbes. As a result, cyanobacteria often carry other microbes with them through streaking and the association remains in apparently isolated colonies. In these experiments, this association was to identify colonies that grew robustly on a solid form of minimal medium used for selection despite the colonies being separated from the full consortia. Without being bound by theory, it was contemplated that successful colonies would comprise consortium members that provide functions for survival on the minimal culture medium and that microbes that could not survive the minimal medium without other consortium members would not produce colonies. Accordingly, the experiment was conducted to identify colonies containing a minimum population that was viable on the minimal selective medium.

Figure 6:
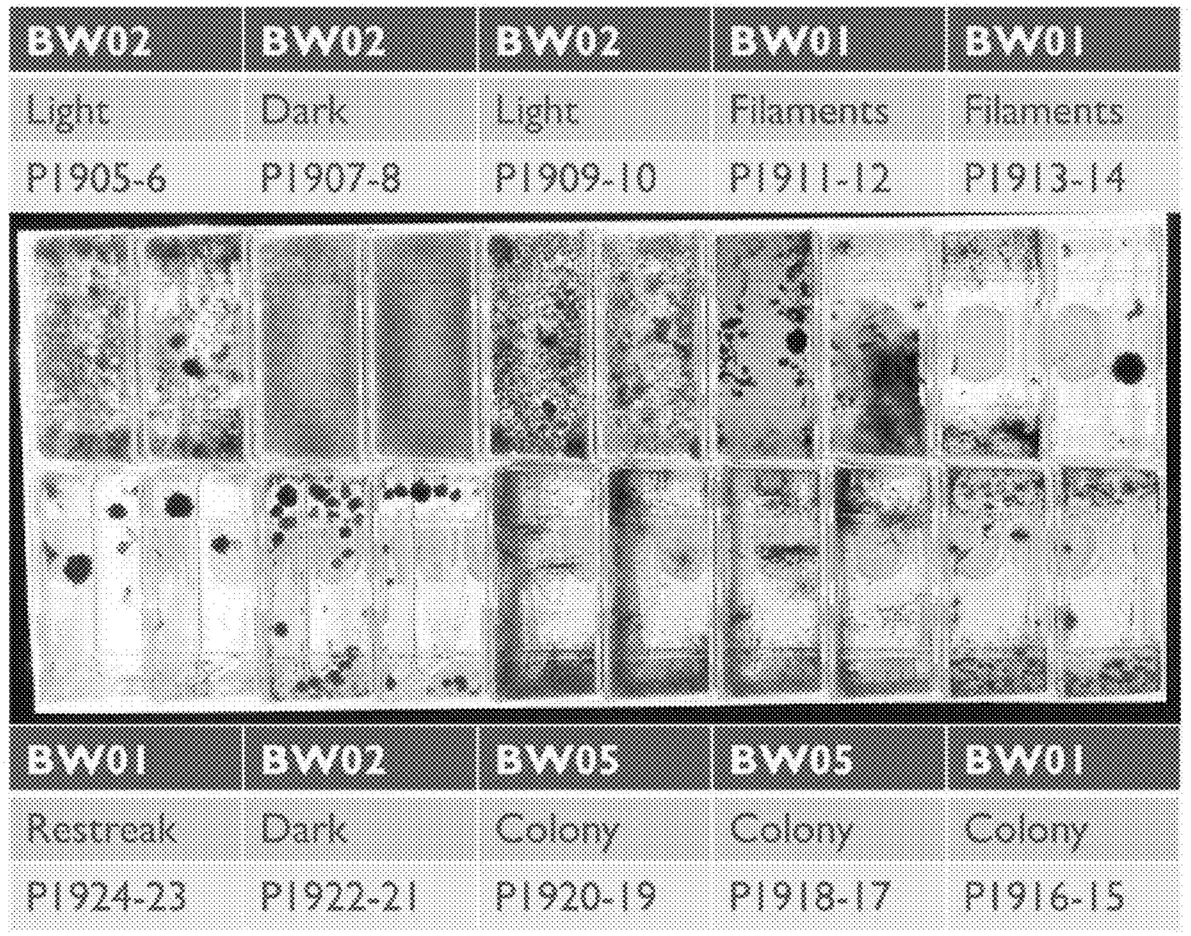
FIG. 6 is a series of photographs showing the morphology of colony picks ("minimal consortia") when grown in liquid media with illumination. Images were acquired from beneath culture flasks with top lighting. Morphology of cultures is shown as "light", "dark", "filaments", "restreak", or "colony". Colonies picked are identified by "P" numbers. See FIG. 9B.
Figure 7A:
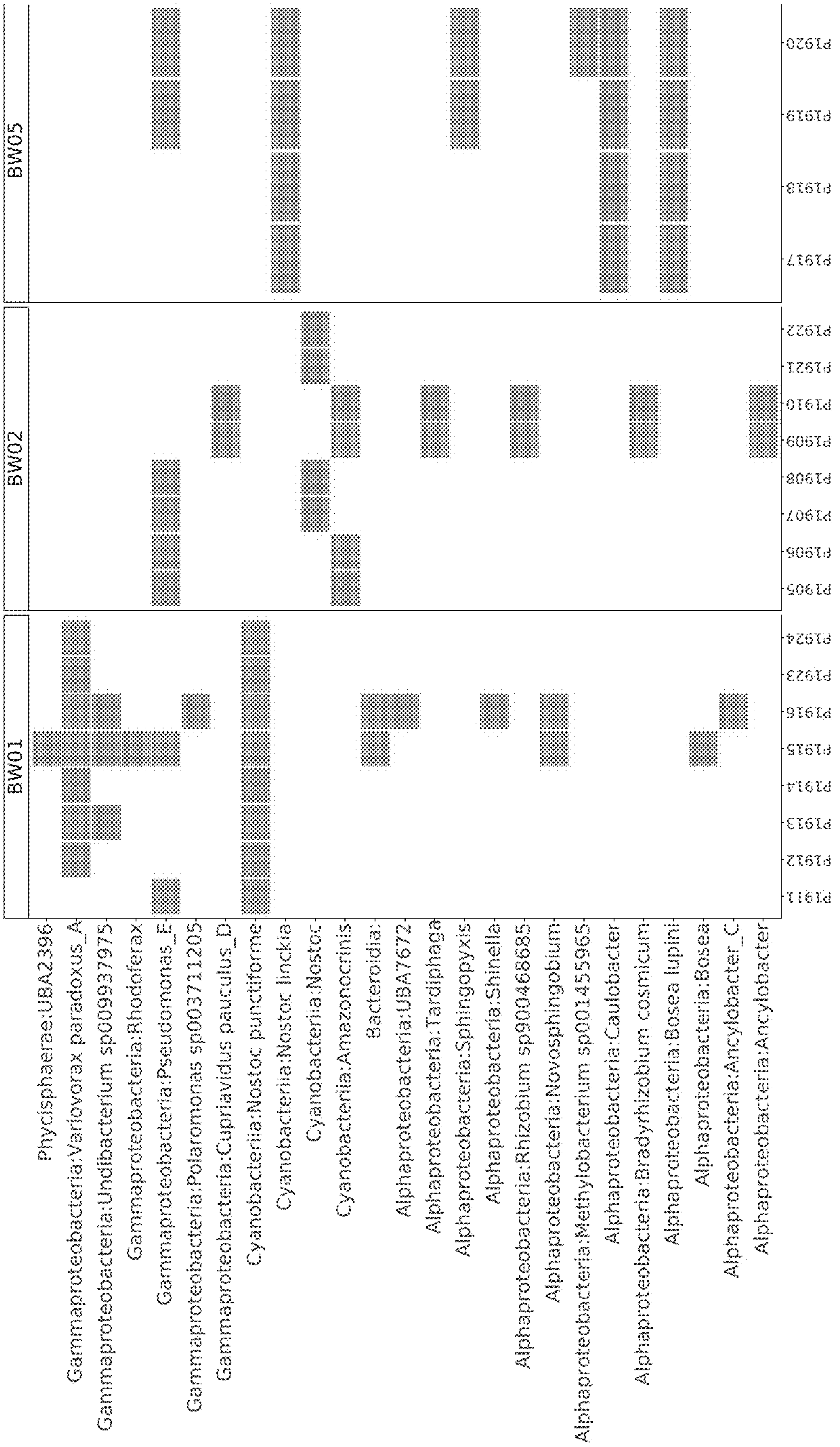
FIG. 7A shows the taxonomy of minimal consortia evaluated by Phyloflash. Taxa identified are on the y-axis and the sample ID and morphology are shown on the x-axis.
Figure 7B:
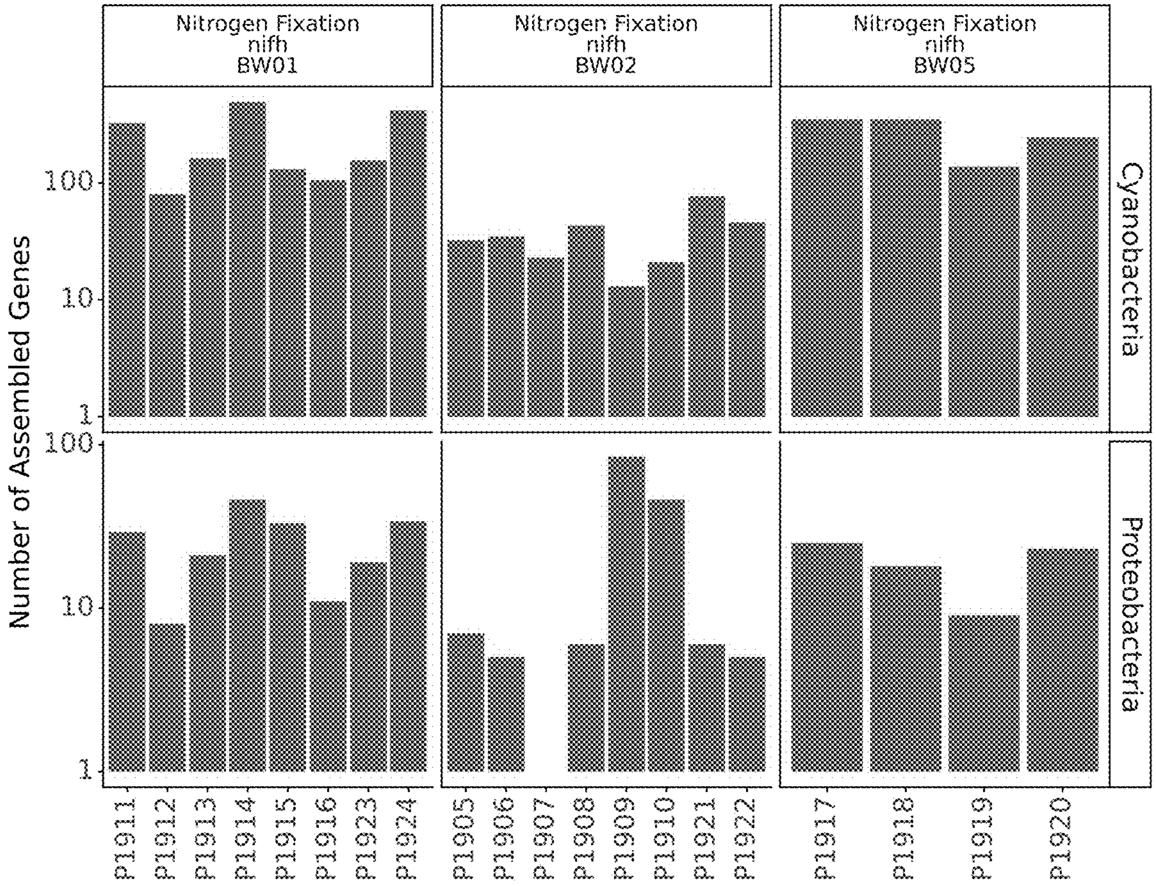
FIG. 7B-FIG. 7F is a series of plots showing changes in the relative abundance of particular genes identified in nucleotide sequence obtained from the colony picks ("minimal consortia").
Figure 7C:
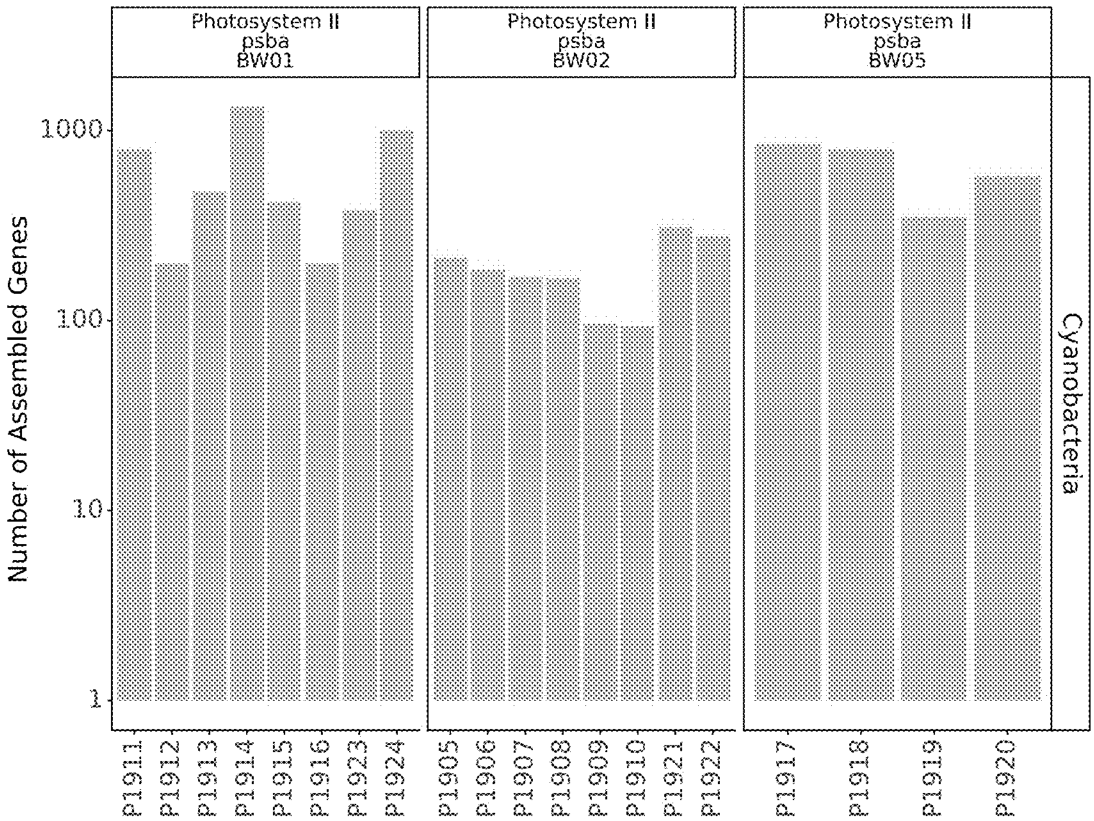
Figure 7D:
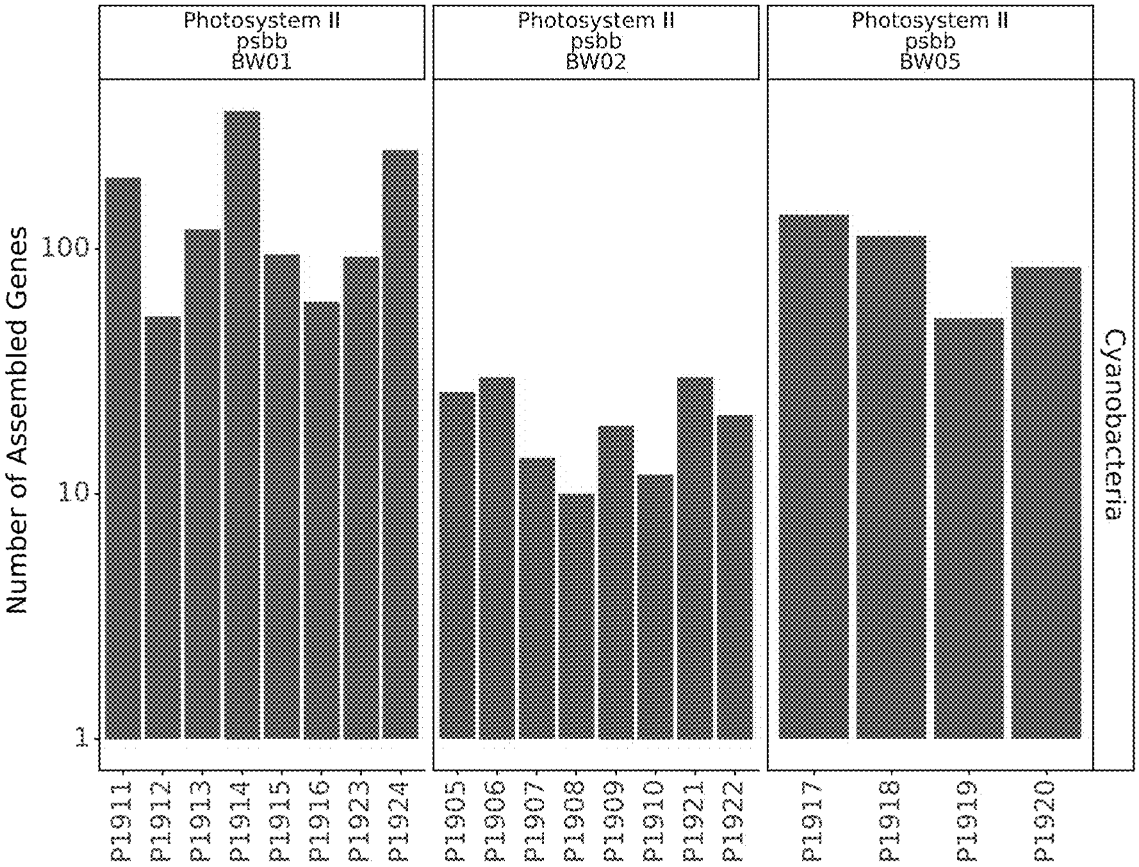
Figure 7E:
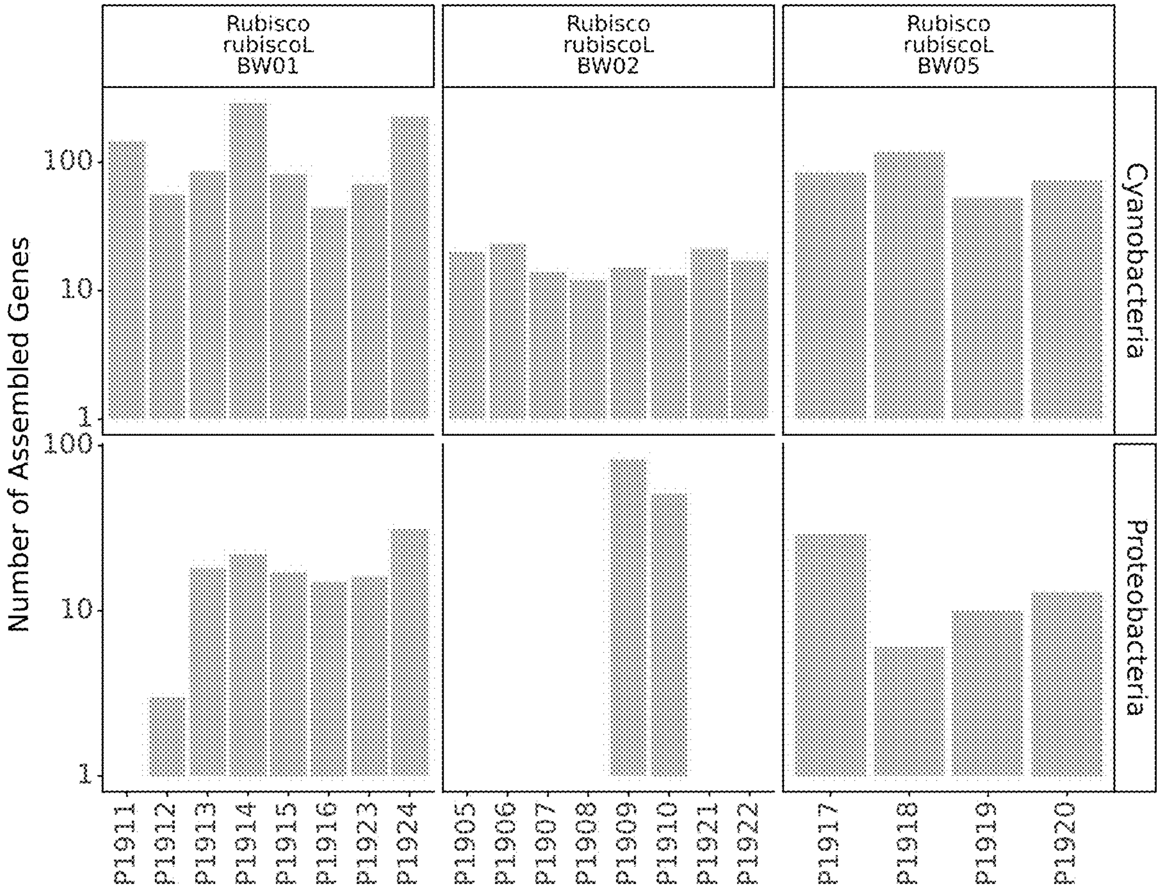
Figure 7F:
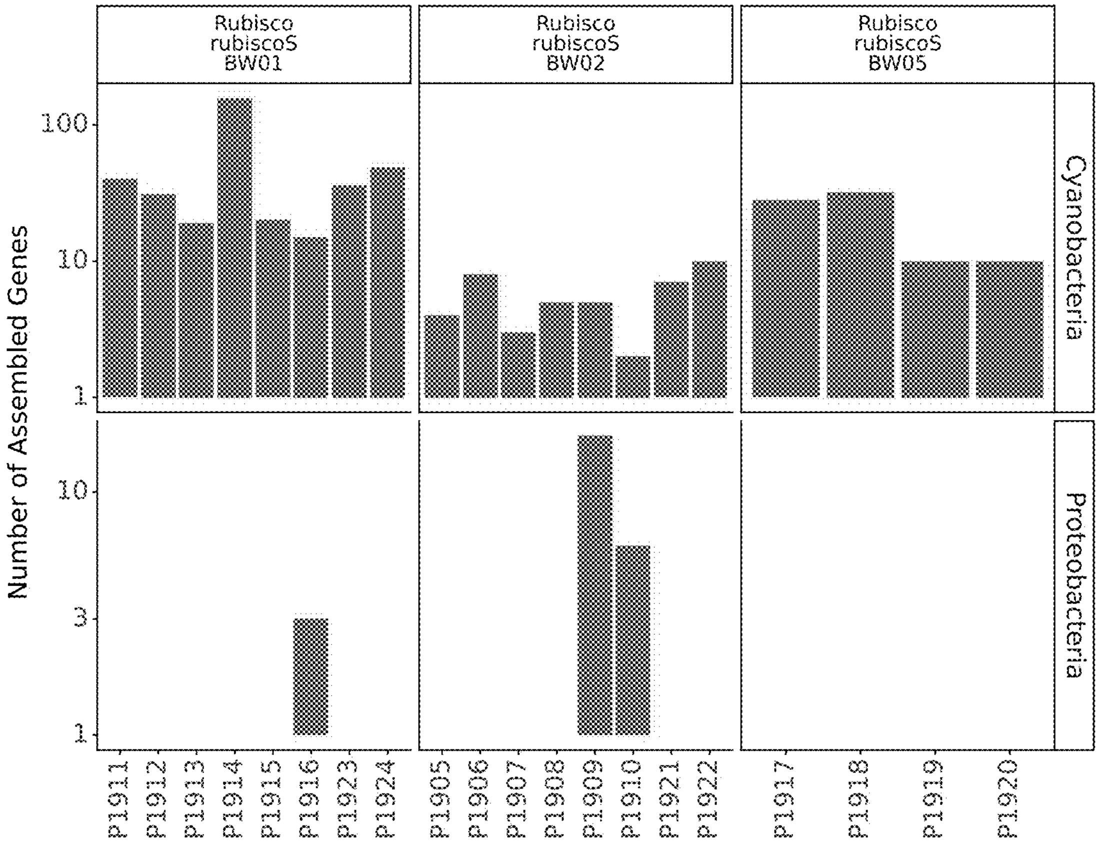

Two colonies having different morphologies were picked from each plate; two plates were grown from each colony. The colonies were then grown in the same liquid selection medium as described above for growth of the consortia (e.g., BW01, BW02, and BW05). Morphologies were predictable based on lineage and all inoculated cultures stably and reliably grew to saturation in liquid (FIG. 6). These cultures were grown to saturation (30 days) and DNA was extracted for shotgun sequencing. The sequencing data indicated that the resulting cultures were not pure isolates but rather comprised microbial communities that were less complex than the BW01, BW02, and BW05 consortia (FIG. 7A). The most complex consortium identified in this way comprised up to nine taxa and the least complex consortium comprised two taxa. All samples sequenced comprised the cyanobacterial genus *Nostoc* or the closely related genus *Dollchospermum*. The relative abundances of particular genes (nifh, psba, psbb, rubiscoL, rubiscoS, and wza) were identified in the nucleotide sequences obtained from the consortia (FIG. 7B-FIG. 7F). EggNOG orthologous groups that represented the functional annotations are listed in Table 4.

Example 7

The taxonomies of members of the minimal consortia were determined using two computational approaches. The first approach used Kraken2 to the analyze the full consortia. The second approach used Phyloflash3.4, which uses a small-subunit rRNA gene assembly-based approach and is more appropriate for low complexity communities than Kraken2 (see, e.g., Gruber-Vodicka (2020) "phyloFlash: Rapid SSU rRNA profiling and targeted assembly from metagenomes" mSystems 5: e00920-20, incorporated herein by reference). Several taxa, including proteobacteria, cyanobacteria, and tremellomycete fungi were identified in the samples (Table 5). Each taxon contributes a different metabolic function that is important for the consortium. Notably, cyanobacteria are always present, indicating their critical function in surviving the specific selection applied.

TABLE 5

| Genera identified in minimal consortia | | | |
|---|---|---|---|
| Taxon | Phylum/Class | Metabolic Function | Features |
| Naganishia | Tremellomycetes | Versatile | Fungus |
| Variovorax | Betaproteobacteria | Lithotrophs, chemoorganotrophs | Symbioses with plants and other bacteria |
| Pseudomonas | Gammaproteobacteria | Produce EPS. Very versatile. Aerobes usually. | Pathogens and plant growth promoters |
| Oxalobacteraceae | Betaproteobacteria | Varied | Undibacterium in this family |
| Nostoc | Cyanobacteria | Photosynthesis, N fixation | Filamentous cyanos with heterocysts |
| Undibacterium | Betaproteobacteria | Varied | Often found in drinking water |
| Bosea | Alphaproteobacteria | Chemolithoautotrophy, nitrogen cycling, phototrophy | Bradyrhizobiaceae family, diverse, some human pathogens, in soils |

Figure 8:
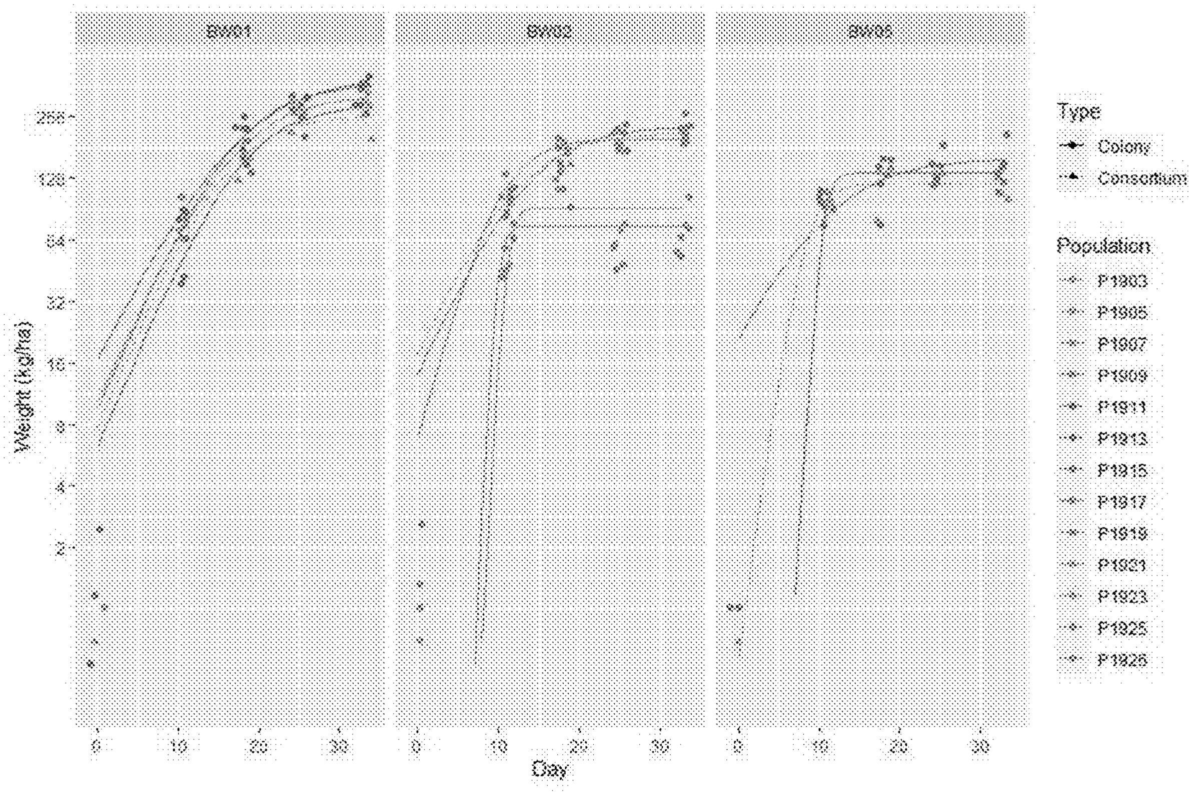
FIG. 8 is a series of semilog plots of growth curves for each of the minimal consortia grown in 12-well plates with minimal medium (no supplement with nitrogen compounds). Dry biomass (y-axis, log 2 scale) is scaled to kilograms per hectare. Wells have an area of 3.14 $cm^2$. Three replicates were collected per time point per culture. Entire wells are collected at each timepoint and endpoint data were recorded.

Growth curves were produced by growing the minimal consortia in 12-well plates. The growth curves indicated similar performance of most minimal consortia compared to the full consortia controls (FIG. 8). A notable exception was population is ½ k, t_gen=fastest generation time, or doubling time, auc=area under curve by 1, the logistic equation, and e the empirical data points. Fits were performed using Growthcurver18 in R.

TABLE 6

Curve fit parameters for reduced consortia growth curves

| condition | k | k_se | k_p | n0 | n0_se | n0_p | r | r_se |
|---|---|---|---|---|---|---|---|---|
| P1905_BW02_Colony | 0.006259 | 0.000252 | 2.61E−10 | 0.000215 | 0.00031 | 0.504522 | 0.333395 | 0.13463 |
| P1907_BW02_Colony | 0.002368 | 0.000369 | 7.64E−05 | 9.27E−11 | 4.72E−05 | 0.999998 | 1.726609 | 46260.64 |
| P1909_BW02_Colony | 0.00721 | 0.000448 | 1.76E−08 | 0.000436 | 0.000289 | 0.162979 | 0.209048 | 0.053762 |
| P1911_BW01_Colony | 0.012386 | 0.000856 | 4.92E−08 | 0.000528 | 0.000247 | 0.057996 | 0.176686 | 0.031393 |
| P1913_BW01_Colony | 0.009245 | 0.000527 | 7.66E−09 | 0.000196 | 0.000116 | 0.120515 | 0.215956 | 0.036799 |
| P1915_BW01_Colony | 0.011622 | 0.000626 | 4.42E−09 | 0.000297 | 0.000163 | 0.099207 | 0.213323 | 0.03562 |
| P1917_BW05_Colony | 0.005018 | 0.000673 | 2.18E−05 | 0.000659 | 0.000732 | 0.389039 | 0.179707 | 0.10861 |
| P1919_BW05_Colony | 0.00428 | 0.000211 | 1.89E−09 | 2.04E−09 | 1.17E−05 | 0.999864 | 1.401074 | 521.2951 |
| P1921_BW02_Colony | 0.00289 | 0.000363 | 1.22E−05 | 5.06E−11 | 1.38E−06 | 0.999972 | 1.619599 | 2484.435 |
| P1923_BW01_Colony | 0.010228 | 0.000484 | 1.26E−09 | 0.000326 | 0.000144 | 0.04688 | 0.20335 | 0.029376 |
| P1925_BW01_Consortium | 0.008159 | 0.000619 | 1.21E−07 | 0.000241 | 0.00021 | 0.277544 | 0.223922 | 0.060156 |
| P1926_BW02_Consortium | 0.006744 | 0.000299 | 6.55E−10 | 0.00055 | 0.000262 | 0.061586 | 0.204948 | 0.041716 |
| P1903_BW05_Consortium | 0.003782 | 0.000208 | 5.34E−09 | 1.83E−05 | 0.000551 | 0.974211 | 0.635562 | 2.763282 |

| condition | r_p | sigma | df | t_mid | t gen | auc_l | auc_e |
|---|---|---|---|---|---|---|---|
| P1905_BW02_Colony | 0.032746 | 0.000576 | 10 | 10.01337 | 2.079057 | 0.143219 | 0.140888 |
| P1907_BW02_Colony | 0.999971 | 0.000904 | 10 | 9.878095 | 0.40145 | 0.054747 | 0.065991 |
| P1909_BW02_Colony | 0.003017 | 0.000693 | 10 | 13.1272 | 3.315727 | 0.141668 | 0.141929 |
| P1911_BW01_Colony | 0.000219 | 0.000819 | 10 | 17.61056 | 3.923055 | 0.192029 | 0.195983 |
| P1913_BW01_Colony | 0.000158 | 0.000646 | 10 | 17.73871 | 3.209674 | 0.141733 | 0.138796 |
| P1915_BW01_Colony | 0.000134 | 0.000795 | 10 | 17.06911 | 3.249278 | 0.185532 | 0.177359 |
| P1917_BW05_Colony | 0.129006 | 0.00103 | 10 | 10.51217 | 3.857105 | 0.109401 | 0.114308 |
| P1919_BW05_Colony | 0.997908 | 0.000518 | 10 | 10.39079 | 0.494725 | 0.096764 | 0.105518 |
| P1921_BW02_Colony | 0.999493 | 0.000888 | 10 | 11.02825 | 0.427975 | 0.0635 | 0.06528 |
| P1923_BW01_Colony | 4.08E−05 | 0.000593 | 10 | 16.78349 | 3.408636 | 0.166054 | 0.168126 |
| P1925_BW01_Consortium | 0.00396 | 0.000912 | 10 | 15.6029 | 3.09548 | 0.141586 | 0.132731 |
| P1926_BW02_Consortium | 0.000611 | 0.000483 | 10 | 11.81036 | 3.382063 | 0.140519 | 0.13823 |
| P1903_BW05_Consortium | 0.822726 | 0.000596 | 10 | 8.382037 | 1.090605 | 0.093064 | 0.106104 |

the dark green colonies picked from BW02 plates. BW02 yielded both light brown, slimy colonies and punctate dark green colonies. The dark green colonies universally bleached about midway through the experiment. Curve fit parameters are shown in Table 6. Parameters for Table 6 are as follows: unless specifically noted, all weight units are grams per 2 ml well in a standard transparent 12-well plate with time in days: k=carrying capacity, no=weight at beginning of growth phase, r=growth rate, sigma=goodness of fit, df=degrees of freedom, t_mid=time at inflection point, when In Table 6, the order of the rows for each condition in the bottom portion of the table is the same as the order of the rows for each condition in the top portion of the table.

Example 8

Figure 9A:
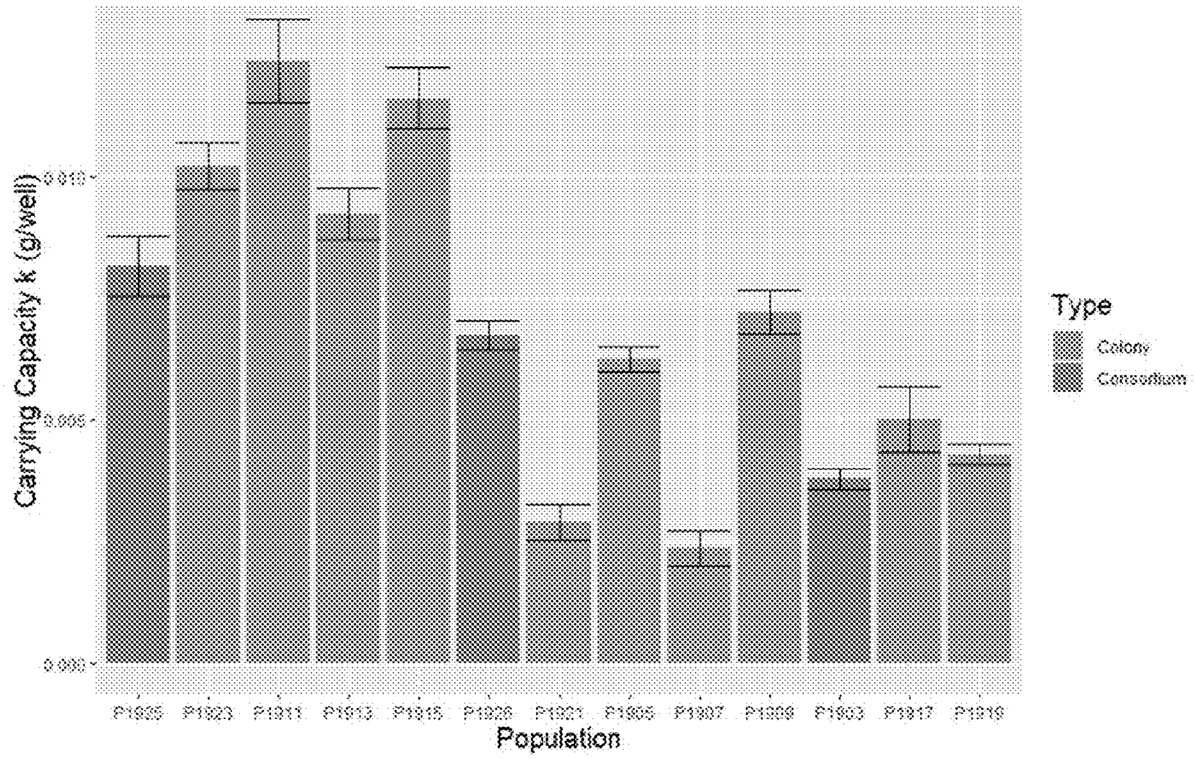
FIG. 9A is a bar plot showing the saturation density for full consortia (blue bars) and minimal consortia (red bars) grown in 12-well plates under lights in minimal media. Error bars are standard error.

In the field, saturation is not expected to be as important as in liquid culture. Microbial cultures saturate when they deplete resources (e.g., mineral nutrients), produce wastes and metabolites, self-shade, or quorum sense. But in liquid cultures (e.g., at a production scale), saturation helps to define upper bounds of culture density. Accordingly, experiments were conducted during the development of embodiments of the technology described herein to determine a computed carrying capacity to represent the maximum saturation culture density (FIG. 9A and FIG. 9B). The curve fit data indicated that reducing consortium complexity does not necessarily reduce the carrying capacity of cultures.

Example 9

Figure 10:
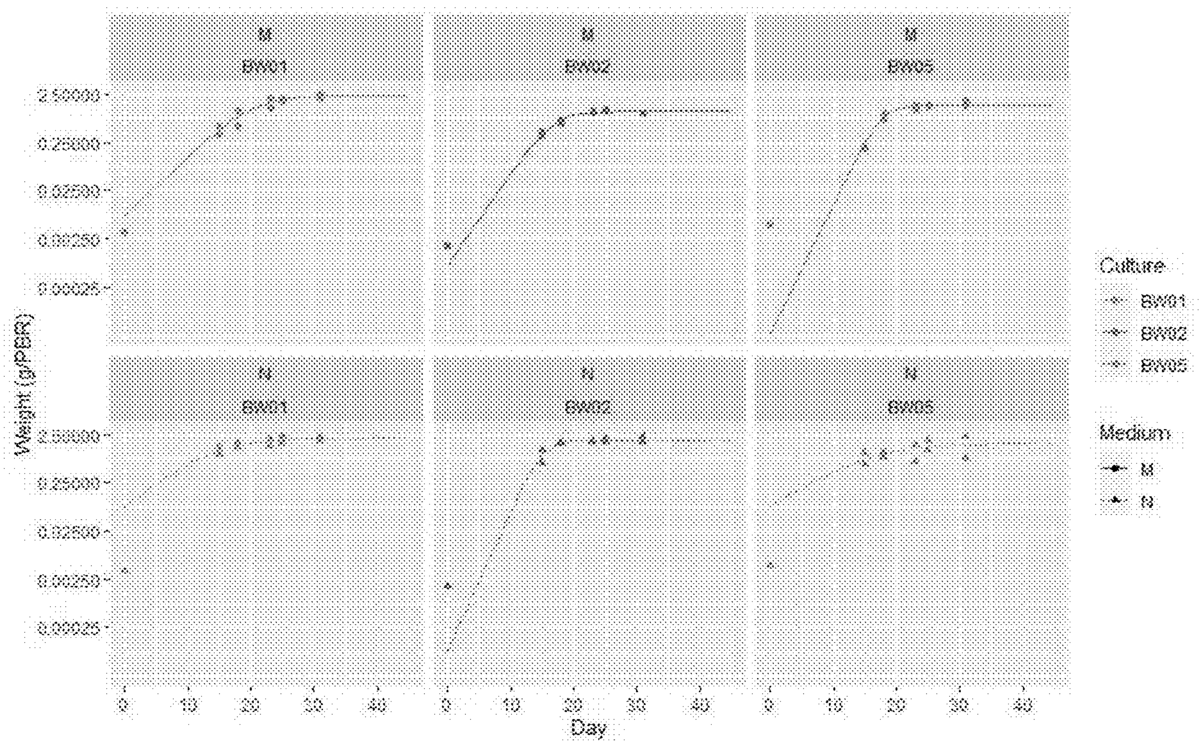
FIG. 10 is a series of plots showing growth of three consortia in one-liter photobioreactors. Dry weight, on the log 2 y-axis, is shown on a grams per photobioreactor basis. Datapoints are shown in addition to curve fits generated by the R package Growthcurver. Three cultures, with a sample size of n=2 photobioreactors, were grown under illuminated conditions with either a nitrogen-free medium (M) or one containing nitrogen in the form of nitrate (N).

In some embodiments of the technology, growing large-scale cultures may be important for producing and using microbial consortia in the field. Accordingly, experiments were conducted during the development of embodiments of the technology to test the scaling potential of the BW01, BW02, and BW05 consortia. In these experiments, BW01, BW02, and BW05 cultures were grown in one-liter photobioreactors (PBRs). PBRs are bioreactors, often referred to as fermenters, that are designed to deliver light to the microbes that are growing inside the PBR. The BW01, BW02, and BW05 cultures in the PBRs were mixed and/or agitated using a combination of magnetic stirring and bubbling of filter-sterilized air to grow photosynthetic microbial consortia to a high density at high growth rates in the absence of supplementation of the media by nitrogen and carbon compounds. Growth curves for the BW01, BW02, and BW05 consortia under these conditions are shown in FIG. 10. These data indicated that the PBRs are highly productive whether or not nitrogen compounds are added to supplement nitrogen provided by air.

Figure 11:
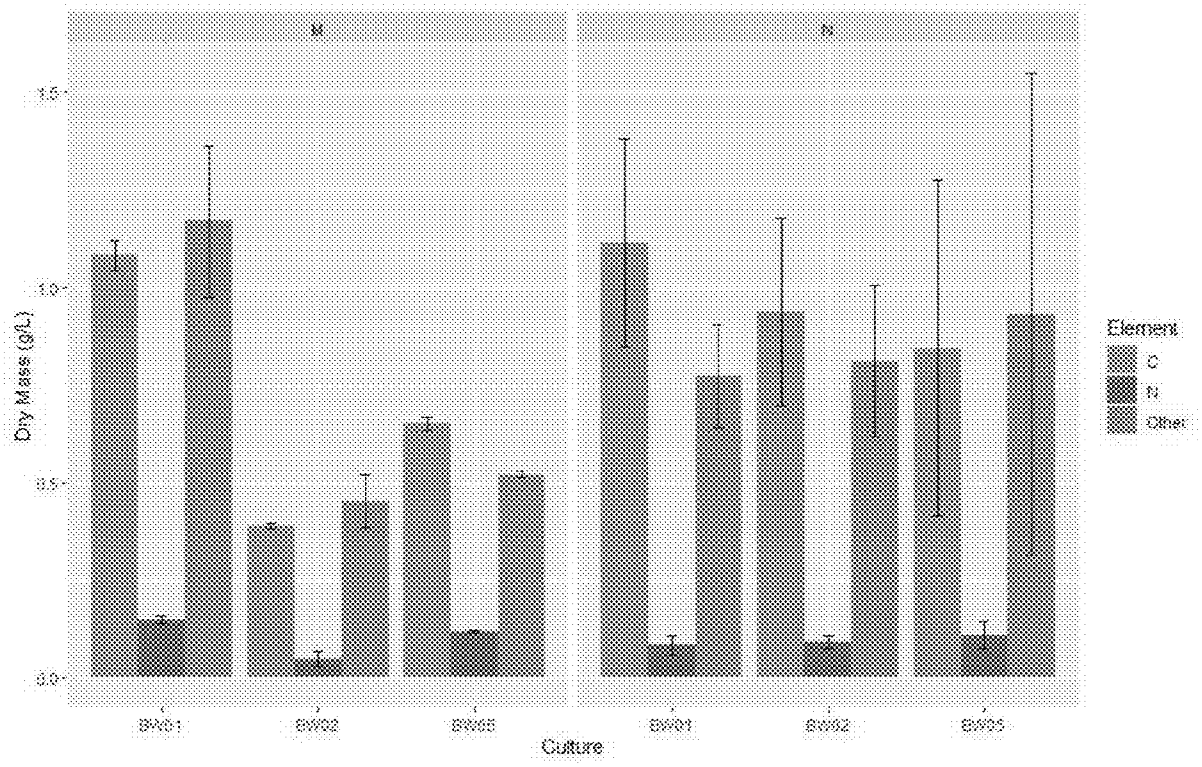
FIG. 11 is a series of bar plots showing the carbon and nitrogen contents of cultures grown in photobioreactors. Carbon and Nitrogen fixed are shown on a grams per 1-liter photobioreactor basis. Error bars are standard deviation. Each set of bars represents the mean of two biological replicates. M indicates cultures grown in minimal medium containing no combined nitrogen. N indicates cultures grown in medium with nitrate added. C is carbon (red bars), N is nitrogen (green bars), and Other (blue bars) is all other compounds in the dry cell pellet weight.

PBRs were used to produce sufficient dry mass for elemental nitrogen and carbon analysis (FIG. 11). The nitrogen and carbon analysis data were used to calculate predicted carbon sequestration and nitrogen fixation of cultures in production ponds or on fields.

Example 10

Figure 12A:
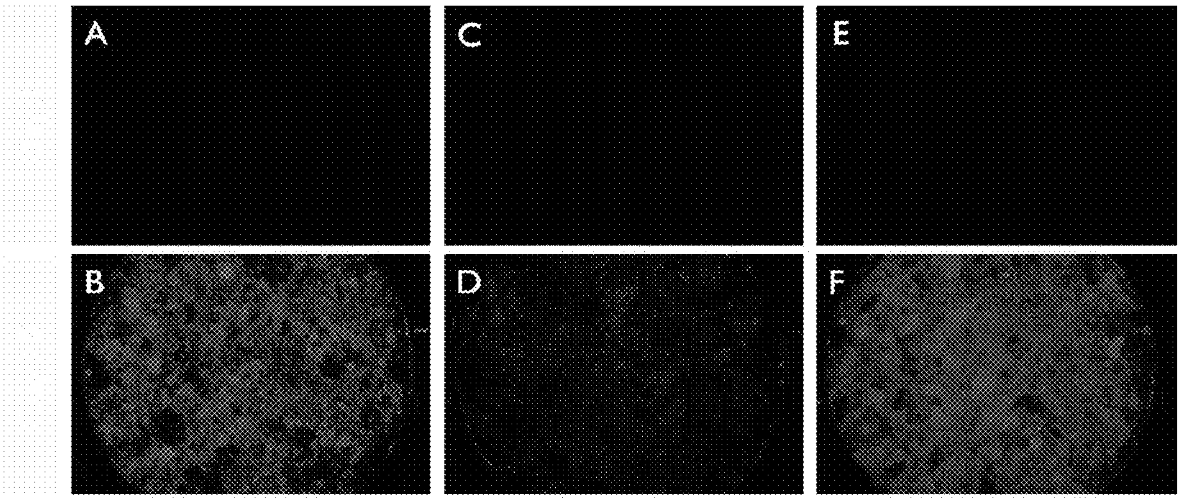
FIG. 12A is a series of red fluorescence images of three consortia grown on sterilized potting soil with a Day 0 blank subtracted and images aligned by image analysis software. Excitation light is 450-nm blue light. A deep red filter is used to block blue wavelengths to the camera detector. A) BW01 at Day 1. B) BW01 at Day 10. C) BW02 at Day 1. D) BW02 at Day 10. E) BW05 at Day 1. F) BW05 at Day 10.
Figure 12B:
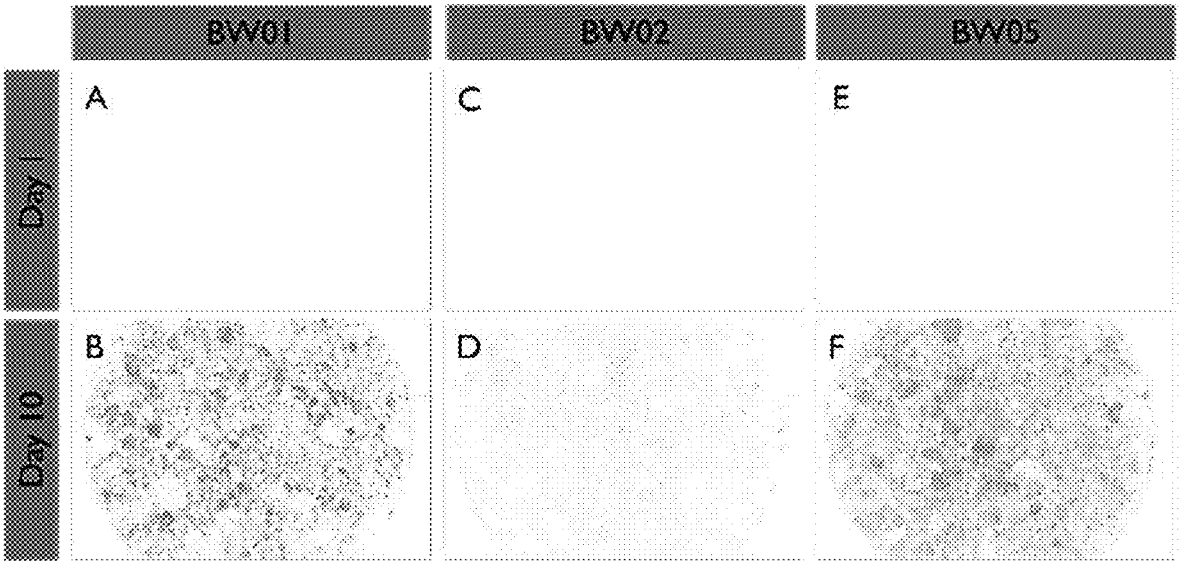
FIG. 12B shows the same series of fluorescence images from FIG. 12B with inverted coloration and conversion to grayscale to improve contrast and visibility of regions comprising chlorophyll and their abundance.

During the development of embodiments of the technology described herein, experiments were conducted to test the growth of the BW01, BW02, and BW05 microbial consortia on soil. Growth of consortia on soil was monitored using chlorophyll fluorescence and machine vision. The data indicated that the BW01, BW02, and BW05 consortia colonize the soil over a growth period of 10 days (FIG. 12A and FIG. 12B). Data collected during this experiment indicated that BW01, BW02, and BW05 comprise photosynthetic members that produce chlorophyll.

Example 11

During the development of embodiments of the technology provided herein, data were analyzed to determine the stability of the microbial consortia produced using passaging as described herein. In particular, beta-diversity was calculated for each passage of the process and monitored as a measured of stability. The beta-diversity index compares two sites or passages and thus provides a useful metric to measure the change occurring from one passage to the next. Consequently, a plateauing of the Bray-Curtis dissimilarity between successive passage comparisons indicates that a culture has reached a maximum level of stability during the passaging process.

Figure 13:
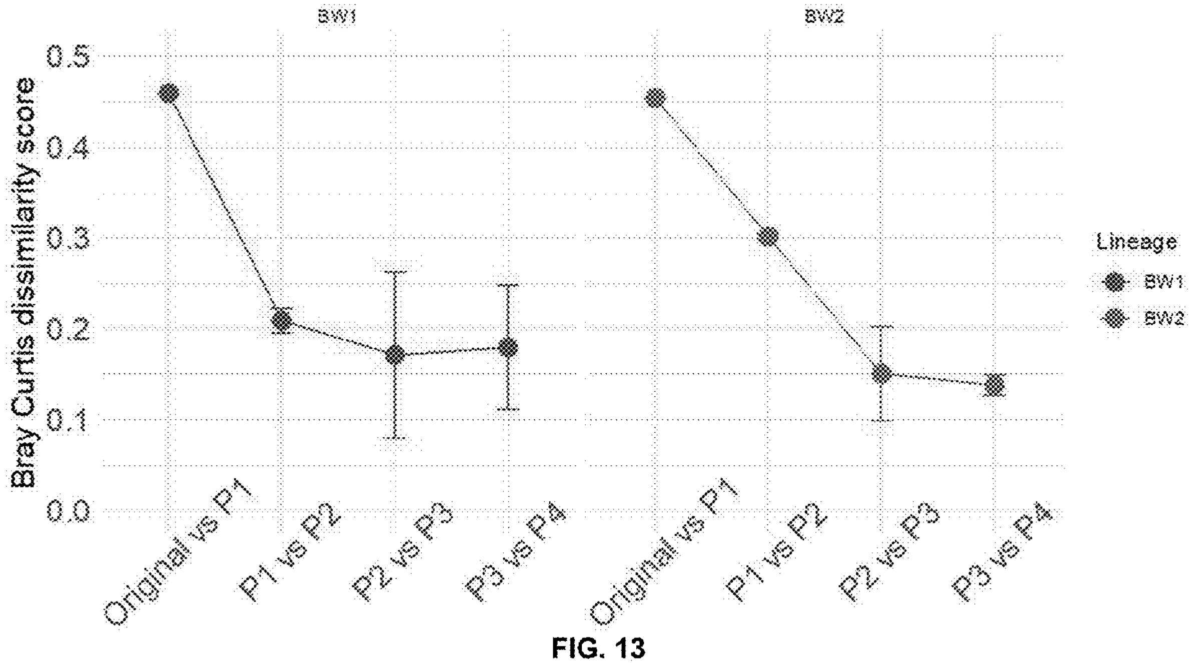
FIG. 13 is a series of plots showing the averaged Bray-Curtis Dissimilarity Index as a measure of passaging for both BW01 and BW02. Error bars represent standard deviation (n=4).

Data collected indicated that Bray-Curtis Dissimilarity Scores changed rapidly as selective pressure was applied (FIG. 13). The decreasing Bray-Curtis scores between each successive passage indicated that less dissimilarity was observed between successive later passages as opposed to the earlier ones. Comparing the last passage, P4, to its parent, P3, gave Bray-Curtis scores of 0.17±0.065 (SD) and 0.14±0.011 (SD) for BW01 and BW02, respectively. This indicates that, as passaging continued, these populations began to reach an equilibrium state where subsequent passaging minimally affected the cultures and/or minimally reduced passage-to-passage differences.

Throughout passaging, both cultures followed similar trends but were not identical. However, by the fourth passage, the Bray-Curtis dissimilarity scores for both BW01 and BW02 plateaued, indicating that both cultures reached maximum stability. Given that these cultures remain stable in small-scale laboratory experiments, it is contemplated that the cultures will be stable at production scale.

The data indicate that the selections were targeted and effective. Principal Coordinates Analysis (PCoA) of the shotgun sequencing data from the original soil samples and cultures P1 through P4 indicate that the BW01 and BW02 original soil samples cluster together rather tightly, but the final passages begin developing into two separate clusters (FIG. 14). By P4, a strong clustering trend is observed. However, in BW01 there does appear to be one divergent set of samples. Given the complexity of these populations, it would be surprising if we did not observe any divergence through passaging. The relative tightness of clustering indicates that the selection had predictable and consistent effects on most lineages.

Example 12

Nitrogen and carbon-fixing consortia have the capacity to improve soils and sequester $CO_2$. However, some consortia are adapted to shoulder season conditions that include a high flux of broad spectrum light (e.g., approximately 380 to 750 nm). Further, plants transmit or reflect wavelengths of light that they do not absorb. Accordingly, crop plants typically utilize light within the classically defined photosynthetically active radiation of wavelengths from approximately 400 nm to approximately 700 nm. However, oxygenic photosynthetic microbes have adapted to use light outside of this range, particularly the far-red light (FRL), usually defined as wavelengths from approximately 700 nm to approximately 750 nm.

During the development of embodiments of the technology described herein, experiments were conducted using filtered light (e.g., in the far-red portion of the visible spectrum) to produce consortia that maximize on-season carbon capture and soil stabilization during the growing season. As such, selection conditions were used to produce consortia that utilize far-red light (e.g., approximately 700 to 750 nm).

These selections are designed to enrich for organisms that fix carbon using energy from far-red light, e.g., by using far-red-absorbing pigments and antenna pigment-proteins. During the development of some embodiments of the technology described herein, experiments did not use conditions that selected for organisms that fix nitrogen. Accordingly, experiments comprised use of a culture medium comprising fixed nitrogen compounds (e.g., BG-11+N). This is the same medium as described herein for the nitrogen addition experiments.

Far-red light (e.g., approximately 700 to 750 nm) can be used to select for organisms that utilize far-red wavelengths, which is a portion of the spectrum that is largely unused by plants. Accordingly, experiments were conducted in which light of 740 nm (e.g., as produced by LED) was the only light source provided for the consortia and for organisms in the consortia. In particular, a number of one-watt LED chips were attached to an aluminum heat sink and driven (e.g., using a Meanwell LED driver) at a current to provide approximately 100 μmol/$m^2$/s photon flux.

Other than using far-red light and growth media comprising nitrogen compounds, the experiments comprised using an enrichment process that was the same as described hereinabove (e.g., to produce a consortium comprising a photosynthetic and nitrogen-fixing microbe). The initial cultures were inoculated using samples obtained from sludges and from water samples taken from small ponds and streams within a 100-mile radius of St. Louis, Missouri. Sludges and soil samples were homogenized using 3.2-mm steel beads and a vortexer at a 10× dilution in sterile water. A small volume was used to inoculate vented culture flasks, which were stood on end and shaken at 100 rpm at 25° C. under the far-red LEDs.

Passaging was performed at approximate saturation of the cultures (e.g., approximately 6 weeks), and four passages were performed. Each initial culture (P1) was used to inoculate four flasks to produce the P2 cultures. Then, each of the four flasks was used to inoculate one flask for P3 and each P3 culture was used to inoculate one flask for P4. DNA was extracted and sequencing were performed as described.

In particular, experiments were conducted using input samples taken from soil and water obtained in sites in Arkansas (150 soil samples and 30 water samples), Wisconsin (100 soil samples and 25 water samples), and Washington (250 soil samples and 15 water samples). Water samples were generally processed immediately; however, some soil samples were found to remain viable and stable after storage at 4° C. Samples were processed using sterile implements.

First, sample contents were homogenized (e.g., manually from the outside of the bag in the case of soil samples). Next, 7.5 ml of sterile water was added to tubes 15-ml conical labeled to match the sample identifiers on the bags. After adding 0.5 ml of sterile 3.2-mm chrome steel beads to each tube, approximately 2 cm2 of soil was scooped into each tube using a sterile scoop. Samples were mixed to homogenization using a vortexer. A sonicator may optionally be used to homogenize the samples, though sonicating may increase the chance of contamination or reduction in population diversity. To sonicate, the sonicator was fitted with a 4420 microtip, which can process 5-50 ml. The probe was cleaned with 70% ethanol to reduce contamination. Approximately ¾ of the probe was inserted into the liquid; the probe was not allowed to touch the tube walls. The samples were sonicated for 1 minute using pulses of 5 seconds at 10% amplitude with 5 seconds in between each 5-second sonification pulse. The sonification was performed again if homogenization was incomplete. Samples were monitored to prevent overheating.

After entering identifying information into a database, flasks for the selection process were prepared. Each sample-condition combination was assigned a unique identifier (a "P#"). Flasks were labeled with P#, parent sample number, media type, and date. Flasks were filled with 30 mL of media and flasks were kept in an upright, vertical position.

Homogenized samples were shaken and vortexed briefly to suspend particulate matter and provide a thoroughly mixed sample. A volume of 0.3 ml was removed from the homogenized sample within 30 seconds of vortexing and used to inoculate the appropriate flask prepared above. If multiple flasks were inoculated from the same homogenized sample, the sample was stirred and/or shaken to maintain the mixing of the sample and prevent settling of particulate matter. Flasks were capped and maintained in an upright, vertical orientation throughout the inoculation and subsequent growth.

For passages P2 and P3, 25-cm plastic filtered culture flasks were filled with 30 ml of medium and labeled with new P numbers. Flasks were kept in an upright, vertical orientation. Three tubes were labeled for saving samples (e.g., as cell pellets) and 2 tubes comprising 0.5 ml of 40% glycerol were labeled for glycerol stocks using the parent P number. For each parent flask (e.g., P1 or P2), a plastic loop was used to dislodge biofilms and to homogenize the culture. A volume of 5 ml was immediately removed (e.g., prior to settling of the culture)—1 ml was used to inoculate the P2 (or, subsequently, P3) flask; 1 ml was used for saving cell pellet samples; and 0.5 ml was used for each of two glycerol stocks. Glycerol stocks comprising culture were vortexed and saved at −80° C. Cell pellet tubes were centrifuged at full speed for 5 minutes. After discarding the supernatant, the cell pellets were stored at −20° C. for later DNA extraction and additional analysis. The culture flasks were placed on a shaker illuminated by far-red light.

P4 passages were produced from P3 cultures according to the same inoculation method described above, and additional validation steps were performed. Live cultures of BW01, BW02, and BW05 were inoculated in the same way as the P4 cultures and used as growth controls.

Growth curves were produced from the P3 culture used as inoculum and for the P4 and control (BW01, BW02, and BW05) cultures during growth. To measure the initial g/ml of cell material (TO time point), two 1.7-mL snap-cap tubes were pre-weighed and empty weights recorded for each culture and for each control culture (BW01, BW02, and BW05). Next, 3 additional tubes were weighed to control for plastic volatilization in the dryer. The same type and brand of tubes was used for the entire experiment. A volume of 1 ml of homogenized P3 culture was aliquoted into each tube and the culture was pelleted by centrifugation (e.g., full speed for 5 min). The pellets were placed in a 55° C. oven overnight to dry, the dried pellets were weighed in the tubes, and the cell pellet weights were recorded.

Each week, 1-ml aliquots of the P4 culture were used to obtain cell pellet weights (in g/ml of culture) according to the same process described above. Cell pellet weight (g/ml) is monitored as a function of time, and it is noted when the growth curve begins to plateau. When the cell pellet weights plateau, a volume of 5 ml was removed—1 ml was used for saving cell pellet samples; and 0.5 ml was used for each of two glycerol stocks. Glycerol stocks comprising culture were vortexed and saved at −80° C. Cell pellet tubes were centrifuged at full speed for 5 minutes. After discarding the supernatant, the cell pellets were stored at −20° C. for later DNA extraction and additional analysis. The R package Growthcurver was used to fit curves and determine growth parameters.

DNA was extracted from the P4 pellets. Libraries were prepared for Illumina sequencing and sequencing was performed with a target depth of 50 million reads. Based on the sequence data obtained, unique populations and/or populations are identified. Cultures and/or frozen samples of a number of (e.g., 1 to 50) diverse populations are identified and retained for further study.

Example 13

During the development of embodiments of the technology described herein, experiments were conducted to identify photosynthetic members of the full consortia. DNA were extracted from the full consortium samples S1170, S1172, S1174, S1176, S1178, S1180, S1181, and S1184. After obtaining nucleotide sequences by Illumina sequencing as described herein, forward raw reads were compared using the blast algorithm to a reference database of plastid 23S ribosomal DNA sequences (see, e.g., Djemiel (2020) "pgreen-db: a reference database for the 23S rRNA gene of eukaryotic plastids and cyanobacteria" Sci Rep. 10: 5915, incorporated herein by reference). After filtering the matches to the plastid database as described in the methods, the sequences were identified to be from a bacterial genus that is *Nodularia, Chrysosporum, Gloeocapsopsis, Richelia, Mastigocoleus, Hapalosiphon, Gloeothece, Acaryochloris, Kamptonema, Raphidiopsis, Crocosphaera, Macrochaete, Thermosynechococcus, Pseudanabaena, Chroococcidiopsis, Prochlorothrix, Anabaena, Leptolyngbya, Calothrix, Cylindrospermopsis, Dolichospermum, Scytonema, Lyngbya, Tolypothrix, Fischerella, Fortiea, Aliterella, Hydrocoryne, Prochlorococcus, Planktothrichoides, Geitlerinema, Xenococcus, Jaaginema, Nostochopsis, Pantanalinema, Oscillatoria, Spirulina, Pelatocladus, Nodosiinea, Aphanizomenon, Chlorogloeopsis, Gloeocapsa, Calenema, Rivularia, Trichormus, Synechococcus, Synechocystis, Cylindrospermum, Planktothrix*, or *Rubidibacter*; or to be from an algal genus that is *Tetraselmis, Chlorella, Coleochaete, Gonium, Paradoxia, Cymbomonas, Palmaria, Characiochloris, Marvania, Chlamydomonas, Parachlorella, Coccomyxa, Trebouxia, Cyanidium, Treubaria, Dangeardinia, Galdieria, Nyholmiella, Porphyra, Chara, Ankistrodesmus, Picochlorum, Cyanophora, Chondrus, Pseudochloris, Interfilum, Gelidium, Symphyogyna, Chlorosarcina*, or *Cyanothece*. Accordingly, these data indicate that the microbial consortia comprise a photosynthetic organism characterized by being a member of a bacterial genus that is *Nodularia, Chrysosporum, Gloeocapsopsis, Richelia, Mastigocoleus, Hapalosiphon, Gloeothece, Acaryochloris, Kamptonema, Raphidiopsis, Crocosphaera, Macrochaete, Thermosynechococcus, Pseudanabaena, Chroococcidiopsis, Prochlorothrix, Anabaena, Leptolyngbya, Calothrix, Cylindrospermopsis, Dolichospermum, Scytonema, Lyngbya, Tolypothrix, Fischerella, Fortiea, Aliterella, Hydrocoryne, Prochlorococcus, Planktothrichoides, Geitlerinema, Xenococcus, Jaaginema, Nostochopsis, Pantanalinema, Oscillatoria, Spirulina, Pelatocladus, Nodosilinea, Aphanizomenon, Chlorogloeopsis, Gloeocapsa, Calenema, Rivularia, Trichormus, Synechococcus, Synechocystis, Cylindrospermum, Planktothrix*, or *Rubidibacter*; or to be from an algal genus that is *Tetraselmis, Chlorella, Coleochaete, Gonium, Paradoxia, Cymbomonas, Palmaria, Characiochloris, Marvania, Chlamydomonas, Parachlorella, Coccomyxa, Trebouxia, Cyanidium, Treubaria, Dangeardinia, Galdieria, Nyholmiella, Porphyra, Chara, Ankistrodesmus, Picochlorum, Cyanophora, Chondrus, Pseudochloris, Interfilum, Gelidium, Symphyogyna, Chlorosarcina*, or *Cyanothece*.

Example 14

Figure 18A:
FIG. 18A shows photographs of cultures upon inoculation (top) and after growth (bottom).

During the development of embodiments of the technology described herein, observations of BW01, BW02, and BW05 cultures indicated the presence of a flocculant containing a dark-colored pigment in the cultures (FIG. 18A). Photobioreactors were constructed by pumping filtered air into stoppered Erlenmeyer flasks through tubing. The photobioreactors were inoculated with consortia and grown for two weeks under constant light, stirring (e.g., using a stir bar), and constant aeration. Flocculant was evident after several days in all cultures; and after continued growth, the cultures became darker in all cases. Inoculated cultures on day 1 are shown in the top photograph of FIG. 18A; inoculated cultures after incubation for two weeks under constant light, stirring, and aeration are shown in the bottom photograph of FIG. 18A.

After growth, experiments were conducted to characterize the dark colored pigment. In particular, during the development of embodiments of the technology described herein, it was contemplated that the dark colored pigment was a molecule comprising fixed carbon, e.g., carbon in a fixed and durable form.

Figure 18B:
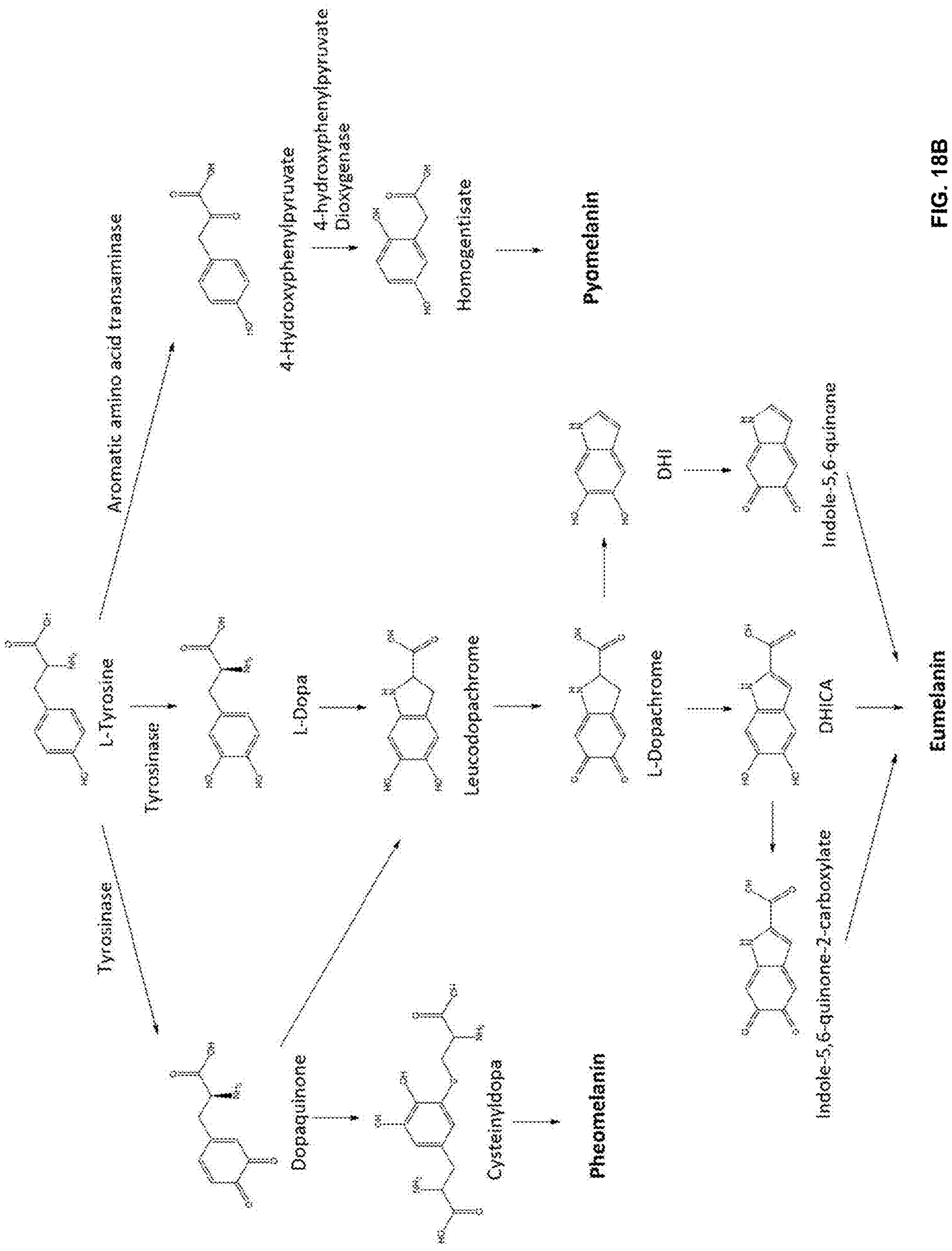
FIG. 18B is a schematic showing biosynthetic pathways for production of melanins.

One class of durable carbon compounds is melanin. Melanin biosynthesis uses the amino acid tyrosine to synthesize each of the three major types of melanin: pyomelanin, pheomelanin, and eumelanin (FIG. 18B). As shown in FIG. 18B, the biosynthetic pathways for biosynthesis of pyomelanin, pheomelanin, and eumelanin are different. In particular, biosynthesis of pyomelanin from tyrosine produces homogentisic acid as an intermediate (FIG. 18B); homogentisic acid is not produced in the biosynthesis of pheomelanin or eumelanin. Furthermore, tyrosinase converts tyrosine to dopaquinone or L-dopa as an early (or first) step in the biosynthesis of pheomelanin or eumelanin, respectively, whereas an aromatic amino acid transaminase converts tyrosine to 4-hydroxyphenylpyruvate as an early (or first) step in the biosynthesis of pyomelanin. See, e.g., Lee (2022) "Melanin Biopolymer Synthesis Using a New Melanogenic Strain of *Flavobacterium kingsejongi* and a Recombinant Strain of *Escherichia Coli* Expressing 4-Hydroxyphenylpyruvate Dioxygenase from *F. kingsejongi*" Microb. Cell Factories 21(1): 75, incorporated herein by reference.

Accordingly, experiments were conducted during the development of embodiments of the technology described herein to determine if adding melanin biosynthesis precursors to growth media would affect (e.g., increase) the production of pigmented compounds by BW02 and/or BW05 in cultures. In addition, experiments were conducted to characterize pigments produced by BW02 and BW05 cultures.

Example 15

During the development of embodiments of the technology provided herein, experiments were conducted to characterize the physicochemical properties of a pigment extracted from a minimal microbial consortium observed to have a brown morphology (Sample MEL0152). After growth in liquid culture of a minimal microbial consortium observed to have a brown morphology, a melanin extraction method described in Kumar (2013) "Production of melanin pigment from *Pseudomonas stutzeri* isolated from red seaweed Hypnea musciformis" Letters in Applied Microbiology 57: 295-302, incorporated herein by reference, was used to process a portion of the culture. Briefly, culture samples were collected and centrifuged. After separating the supernatant and biomass pellet, the biomass pellet was resuspended in a solution containing proteinase K (to degrade proteins) and NaOH. Cells were lysed by vortexing samples in the presence of stainless-steel beads. Samples were centrifuged again and the supernatants were reserved. Supernatants were autoclaved to prevent and/or minimize the formation of melanoidins during acid precipitation. Acid precipitation was performed by adding HCl to a final pH of 1.5 and an incubating the samples at room temperature for several hours to one week. Samples were again centrifuged and the pellet was reserved. The pellet was washed first with water, then with EtOH, prior to drying. The properties of the extracted material were determined as described in Guo (2014) "Preparation of Water-Soluble Melanin from Squid Ink Using Ultrasound-Assisted Degradation and Its Anti-Oxidant Activity" J. Food Sci. Technol. 51(12): 3680-90; and Fava (1993) "Characterization of a Pigment Produced by *Pseudomonas Fluorescens* during 3-Chlorobenzoate Co-Metabolism" Chemosphere 27(5): 825-35, each of which is incorporated herein by reference. Table 7 below indicates that the methods of Guo or Fava were used for each analysis. These references also described results expected for eumelanin characterization.

Extracted samples were aliquoted to a number of individual tubes, and then analysis reagents were added each tube to test for a certain characteristic (e.g., solubility, reactivity) as noted in Table 7. Solubility was determined to be: imparting no color at all to the solvent and all sample settling out ("insoluble"), some color being imparted to the solvent and some sample settling out ("partly dissoluble"), or color being imparted to the solvent and no sample settling out, even post-high-speed centrifugation ("soluble"). Further confirmation on the insoluble results was performed by confirming little or no change in dry weight of the sample after recovery from the solvent. Stability was determined by subjecting the sample to different temperatures (50° C. for 12 hours, 80° C. for 12 hours, 100° C. for 1 hour) and testing for changes in characteristics measured by the physicochemical tests. No change or minimal change between testing the heated sample and the original sample indicated that the sample was stable.

During the experiments, physicochemical data were collected for a pigment extracted from Sample MEL0152. MEL0152 had a black color and was grown from a sample (S4387) originating from BW02. Physicochemical characterization of synthetic eumelanin (Sigma Aldrich) was used as a reference control for comparison. Data are provided in Table 7 (extracted pigment) and Table 8 (melanin reference). Data collected during the experiments indicated that the extracted pigment was melanin.

TABLE 7

Physicochemical data of extracted pigment

| Property | Treatment | Expected results | Assay Source | Results | Pass/Fail |
|---|---|---|---|---|---|
| Color | | | | Black | |
| Solubility | Sodium hydroxide (1N NaOH) | soluble | Guo | soluble | Pass |
| Solubility | Water ($H_2O$) | insoluble | Guo | insoluble | Pass |
| Solubility | Ethanol (100% $C_2H_6O$) | insoluble | Guo | insoluble | Pass |
| Solubility | Acetone ($C_3H_6O$) | insoluble | Guo | insoluble | Pass |
| Solubility | Methanol ($CH_3OH$) | partly dissoluble | Guo | partly dissoluble | Pass |
| Solubility | Dimethylsulfoxide ($C_2H_6OS$) | partly dissoluble | Fava | partly dissoluble | Pass |
| Solubility | Chloroform ($CHCl_3$) | insoluble | Guo | | Untested |
| Solubility | Isopropyl Ether ($C_6H_{14}O$) | insoluble | Guo | | Untested |
| Solubility | Ethyl Acetate ($C_4H_8O_2$) | insoluble | Guo | | Untested |
| Solubility | 1-butanol ($C_4H_{10}O$) | soluble | Fava | | Untested |
| Solubility | Phenol ($C_6H_6O$) | soluble | Fava | | Untested |
| Precipitation | hydrochloric acid (1N HCl) | precipitated | Guo | precipitated | Pass |
| Precipitation | iron (III) chloride (1 mM $FeCl_3$) | precipitated | Guo | | Untested |
| Precipitation | copper sulfate (1 mM $CuSO_4$) | precipitated | Guo | | Untested |
| Stability | Heat (55° C.) | stable | Guo | stable | Pass |
| Stability | Heat (80° C.) | stable | Guo | stable | Pass |
| Stability | Heat (100° C.) | stable | Guo | stable | Pass |
| Stability | Light (UV) | stable | Guo | | Untested |
| Stability | Light (sunlight) | stable | Guo | | Untested |
| Oxidation | hydrogen peroxide (34% $H_2O_2$) | partly oxidized | Guo | partly oxidized | Pass |
| Reduction | sodium thiosulfate (1 mM $Na_2S_2O_3$) | partly reduced | Guo | partly reduced | Pass |

TABLE 8

Physicochemical data of melanin reference material

| Property | Treatment | expected results | Source | Results | Pass/Fail |
|---|---|---|---|---|---|
| Color | | | | Black | |
| Solubility | Sodium hydroxide (1N NaOH) | soluble | Guo | partly dissoluble | Fail |
| Solubility | Water ($H_2O$) | insoluble | Guo | partly dissoluble | Fail |
| Solubility | Ethanol (100% $C_2H_6O$) | insoluble | Guo | partly dissoluble | Fail |
| Solubility | Acetone ($C_3H_6O$) | insoluble | Guo | partly dissoluble | Fail |
| Solubility | Methanol ($CH_3OH$) | partly dissoluble | Guo | partly dissoluble | Pass |
| Solubility | Dimethylsulfoxide ($C_2H_6OS$) | partly dissoluble | Fava | soluble | Fail |
| Solubility | Chloroform ($CHCl_3$) | insoluble | Guo | | Untested |
| Solubility | Isopropyl Ether ($C_6H_{14}O$) | insoluble | Guo | | Untested |
| Solubility | Ethyl Acetate ($C_4H_8O_2$) | insoluble | Guo | | Untested |
| Solubility | 1-butanol ($C_4H_{10}O$) | soluble | Fava | | Untested |
| Solubility | Phenol ($C_6H_6O$) | soluble | Fava | | Untested |
| Precipitation | hydrochloric acid (1N HCl) | precipitated | Guo | precipitated | Pass |
| Precipitation | iron (III) chloride (1 mM $FeCl_3$) | precipitated | Guo | | Untested |
| Precipitation | copper sulfate (1 mM $CuSO_4$) | precipitated | Guo | | Untested |
| Stability | Heat (55° C.) | stable | Guo | | Untested |
| Stability | Heat (80° C.) | stable | Guo | | Untested |
| Stability | Heat (100° C.) | stable | Guo | | Untested |
| Stability | Light (UV) | stable | Guo | | Untested |
| Stability | Light (sunlight) | stable | Guo | | Untested |
| Oxidation | hydrogen peroxide (34% $H_2O_2$) | partly oxidized | Guo | fully oxidized | Fail |
| Reduction | sodium thiosulfate (1 mM $Na_2S_2O_3$) | partly reduced | Guo | unreactive | Fail |

As shown by the data presented in Table 7 and Table 8, Sample MEL0152 from consortium S4387, which originated from BW02, produces a compound that has the expected physicochemical characteristics of melanin compounds as reported in the literature. Notably, solubility, precipitation, heat stability, and redox behavior for the extracted compound accord with previously reported data describing melanins in Guo and Fava, supra.

Previous publications have described the physicochemical properties of eumelanins. While some publications (Fava and Guo) disagree with one another slightly on certain characteristics of melanins, (e.g., partly dissoluble vs. fully soluble), a synthetic eumelanin sourced from Sigma Aldrich (St. Louis, MO) was also tested (Table 8) and the results did not fully match the properties of natural melanins as previously reported. The synthetic eumelanins have been found to have a lower molecular weight than those isolated from bacteria and, without being bound by theory, this difference is contemplated to be a reason for some of the differing qualities (e.g., increased solubility in DMSO and reactivity with $H_2O_2$) (See, e.g., Lorquin (2022) "New insights and advances on pyomelanin production: from microbial synthesis to applications" Journal of Industrial Microbiology and Biotechnology 49(4): kuac013, Lorquin (2021) "Production and properties of non-cytotoxic pyomelanin by laccase and comparison to bacterial and synthetic pigments" Scientific Reports 11(1): 8538, each of which is incorporated herein by reference.

Example 16

Figure 19:
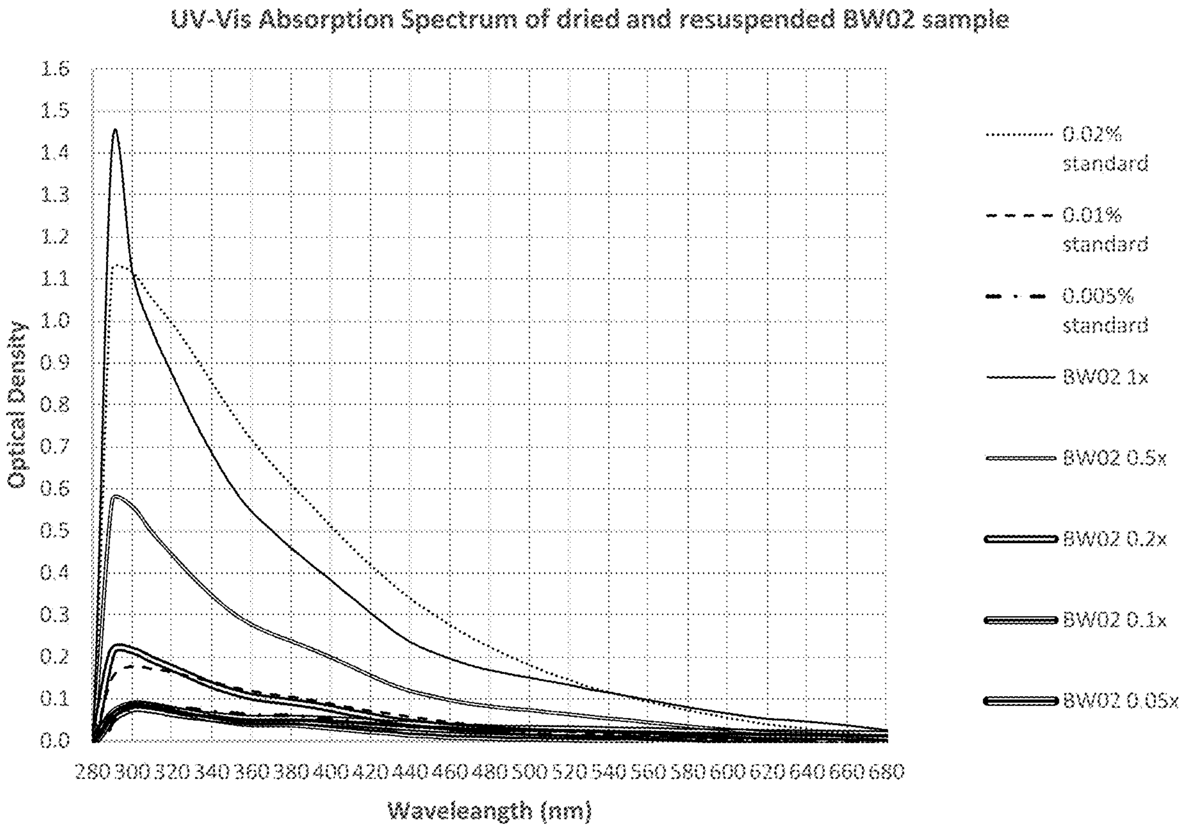
FIG. 19 shows UV-visible absorption spectra for melanin reference materials (0.02%, 0.01%, and 0.005% w/v) and a flocculant isolated from a BW02 culture (1×, 0.5×, 0.2×, 0.1×, and 0.05× dilutions).

During the development of embodiments of the technology described herein, experiments were conducted to characterize the composition of consortia grown in culture. BW02 culture was grown as described above. Flocculant from culture was air dried and resuspended in NaOH (1 N). Resuspended flocculant was used to prepare dilutions in NaOH (1 N) at ratios of 1:1, 1:4, 1:9, and 1:19 of resuspended flocculant to NaOH to prepare 1×, 2×, 5×, 10×, and 20× dilutions. The samples were pipetted into a 96-well plate (200 μL per sample in each well and 3 replicates were tested per sample) and absorbance spectra from 280-680 nm were acquired on a SpetraMax i3 plate reader. Absorbance spectra from 280-680 nm were also acquired for eumelanin standards at approximately 0.02%, 0.01%, and 0.005% w/v. The absorption spectrum of the flocculant prepared from the BW02 culture paralleled the absorption spectrum of the melanin standard (FIG. 19).

Example 17

During the development of embodiments of the technology described herein, experiments were conducted to evaluate the growth morphology of minimal consortia following supplementation of growth medium with tyrosine.

A BW02 culture (S1906) was grown to stationary phase (four weeks of growth in 30 mL of medium in a tissue culture flask), and a 1:9 dilution of the stationary phase culture was used to inoculate fresh minimal growth medium. Three 1-mL samples were taken of the inoculated fresh minimal growth medium and the 1-mL samples were centrifuged to pellet cells. After decanting the supernatant, the cell pellets were dried, and the dry cell biomass was weighed. Using the weight of the dry biomass, an inoculum density was calculated to be 0.0012 g (dry biomass)/0.5 mL culture.

Figure 20:
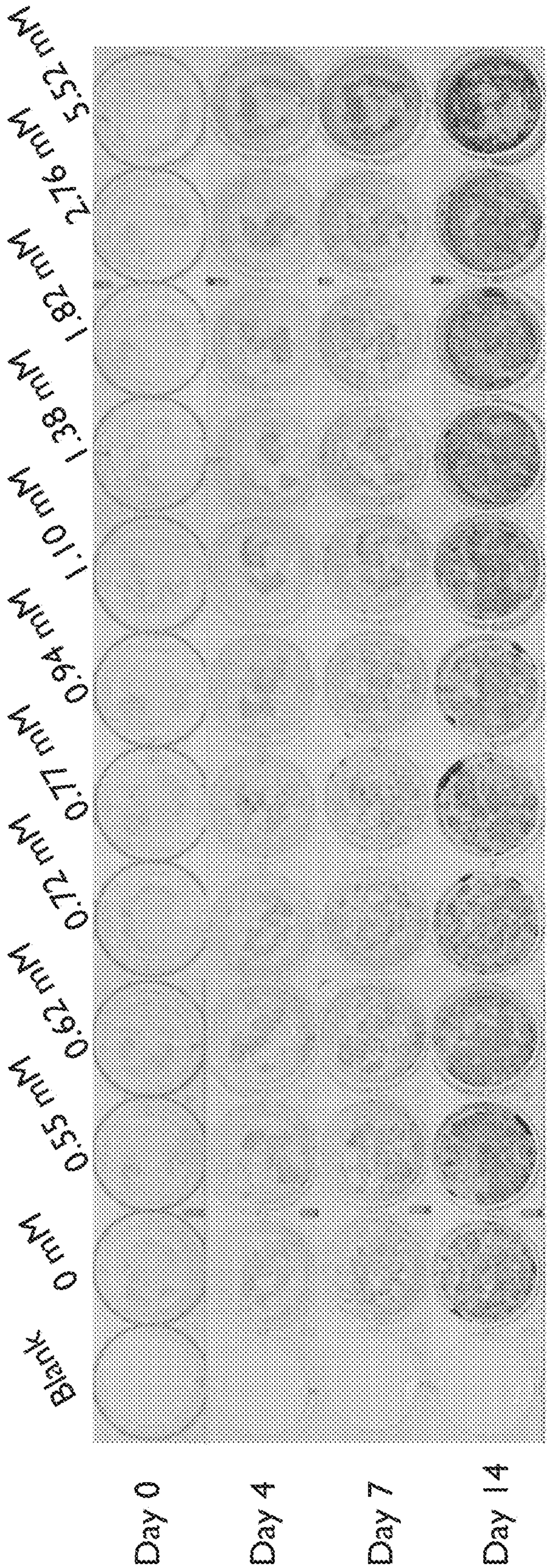
FIG. 20 shows an array of photographs of solid medium culture plates comprising minimal solid media supplemented with L-tyrosine at 0.55 mM, 0.62 mM, 0.72 mM, 0.77 mM, 0.94 mM, 1.10 mM, 1.38 mM, 1.82 mM, 2.76 mM, and 5.52 mM, and on which BW02 cultures were grown under lights for 14 days.

Minimal solid media were prepared and 2.5 mL were added to each well of a 12-well tissue culture plate. The wells were supplemented with L-tyrosine at 0.55 mM, 0.62 mM, 0.72 mM, 0.77 mM, 0.94 mM, 1.10 mM, 1.38 mM, 1.82 mM, 2.76 mM, and 5.52 mM. A tyrosine-free well was also prepared as a control (0 mM). See FIG. 20. A volume of 0.5 mL of the inoculated fresh minimal growth medium was added to each well of the 12-well tissue culture plate. Culture plates were grown under continuous light for 14 days and imaged daily. As shown in FIG. 20, increasing concentrations of tyrosine supplementation produced increased pigmentation of both the culture and the surrounding solid media for BW02 (S1906).

Example 18

Figure 21:
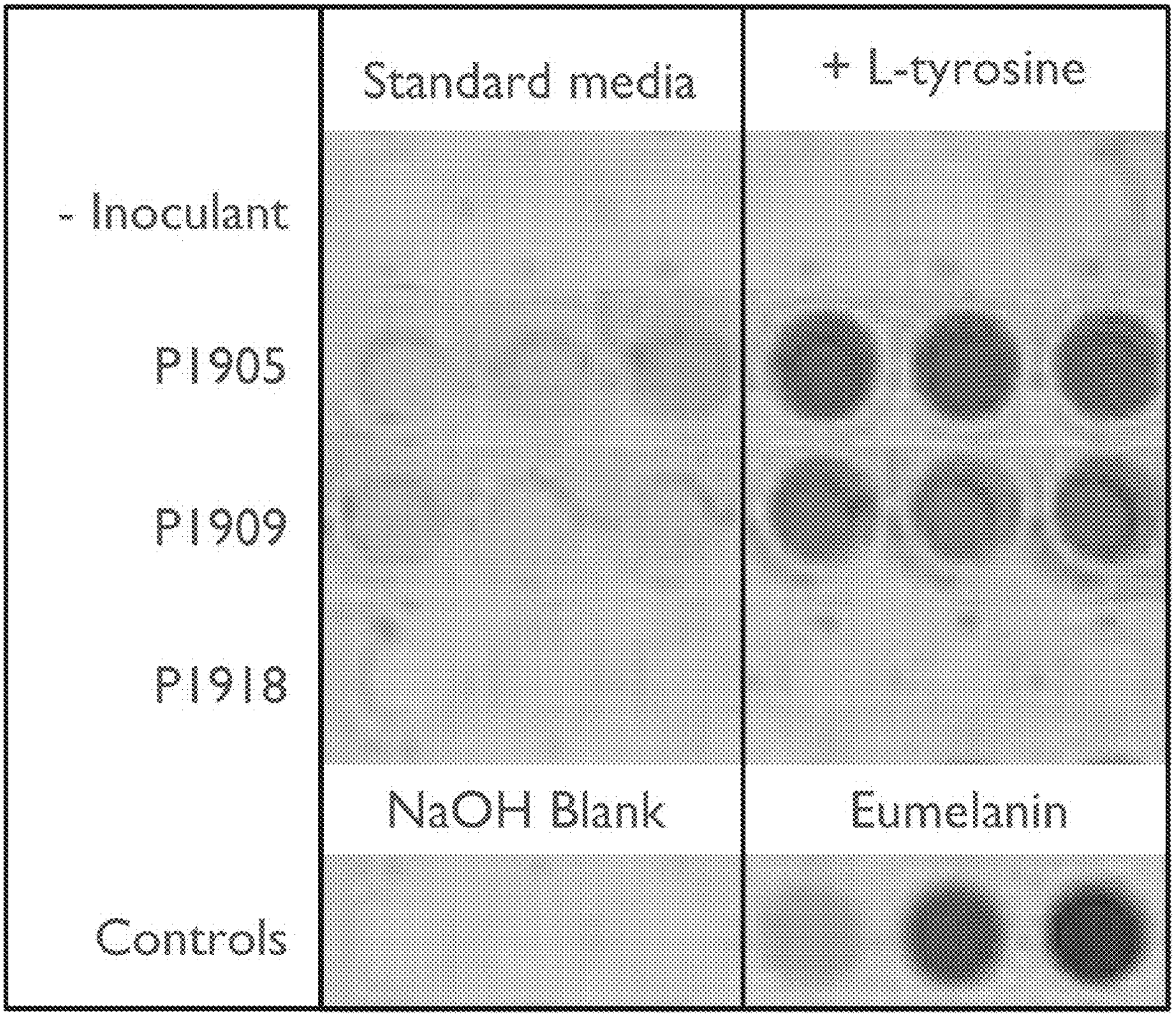
FIG. 21 shows images of culture supernatants from three independent cultures in a multi-well plate. Supernatants were obtained from cultures grown in minimal medium without tyrosine supplementation ("Standard media") or in minimal medium with tyrosine supplementation ("+L-tyrosine"). NaOH ("NaOH Blank") and a synthetic eumelanin ("Eumelanin") from Sigma Aldrich were used as a negative and positive control, respectively. Non-inoculated minimal media ("-Inoculant") was also used as a negative control.

During the development of embodiments of the technology provided herein, experiments were conducted to evaluate pigment production by BW02 and BW05 cultures grown in minimal media supplemented with tyrosine. BW02 and BW05 cultures were grown in 250-ml cell culture flasks containing 30 ml of media and inoculated with 1 ml of a culture grown for 4 weeks to saturation. Cultures were either supplemented with 2.5 mM tyrosine or left untreated. FIG. 21. S1905 and S1909 have a brown morphology and are derived from BW02. S1918 has a green morphology and was derived from BW05.

Figure 22:
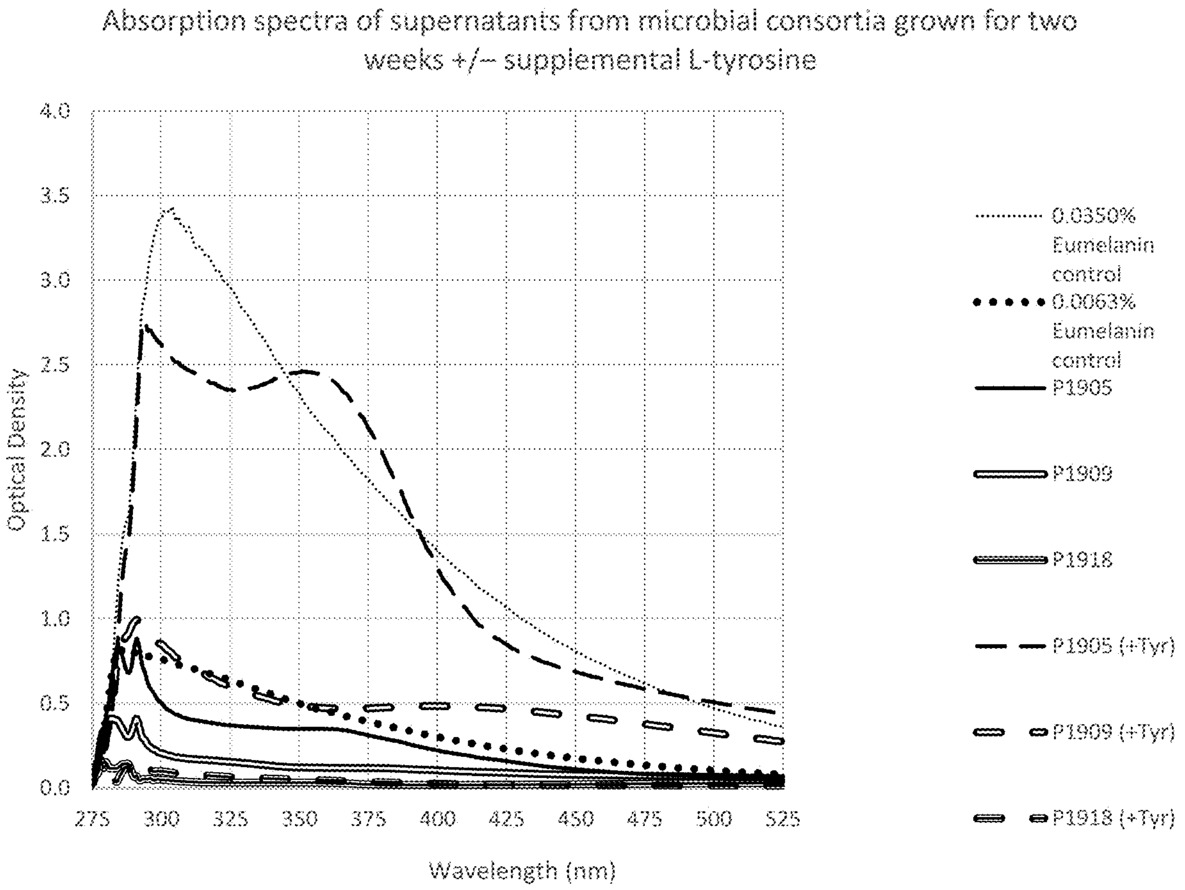
FIG. 22 shows absorbance spectra of supernatants inoculated with microbial consortia and grown for two weeks with tyrosine supplementation. Supernatants from cultures grown without tyrosine supplementation, supernatants from cultures grown with tyrosine supplementation ("+Tyr"), and melanin controls (0.0350% w/v and 0.0063% w/v) are shown.

Following two weeks of growth of S1905 and S1909 (BW02) and S1918 (BW05) in liquid medium, cultures were centrifuged, and 200 μL of each supernatant were added to wells of a 96-well plate and read on a microplate reader for absorbance from 275-525 nm. Absorbance spectra of supernatants from BW02 (S1905, S1909) cultures grown without tyrosine supplementation, supernatants from BW02 cultures grown with tyrosine supplementation, supernatants from BW05 (S1918) cultures grown without tyrosine supplementation, supernatants from BW05 cultures grown with tyrosine supplementation, and melanin controls (0.0350% w/v and 0.0063% w/v) are shown in FIG. 22. Data collected during these experiments (FIG. 21, FIG. 22) indicated that adding L-tyrosine to culture medium increases absorption of culture supernatants produced by BW02 grown in the supplemented medium compared to supernatants produced by BW02 cultures grown in medium without tyrosine supplementation and to BW05 cultures grown with or without tyrosine supplementation. Absorbance spectra are consistent with melanin reference standard controls. Accordingly, these data indicated that adding tyrosine to culture medium in which BW02 (e.g., S1905 or S1909) is grown increases the passage of material through the melanin biosynthesis pathway, which increases the production of at least one of the three downstream melanin products.

Example 19

During the development of embodiments of the technology provided herein, experiments were conducted to evaluate pigment production by BW02 (S1905, S1909) and BW05 (S1918) cultures grown in minimal media supplemented with homogentisic acid. Specifically, minimal consortia produced from S1905 and S1909 (having a brown morphology) and minimal consortium produced from S1918 (having a green morphology) were grown for 4 weeks in 30 mL of media in cell culture flasks to stationary phase. A volume of 1 mL of each stationary phase culture was used to inoculate three replicates of a minimal mineral media (control) or three replicates of the same media supplemented with 2.77 mM homogentisic acid (HGA). After 15 hours of growth, strong pigmentation was clearly present in the samples comprising media supplemented with HGA.

Figure 23:
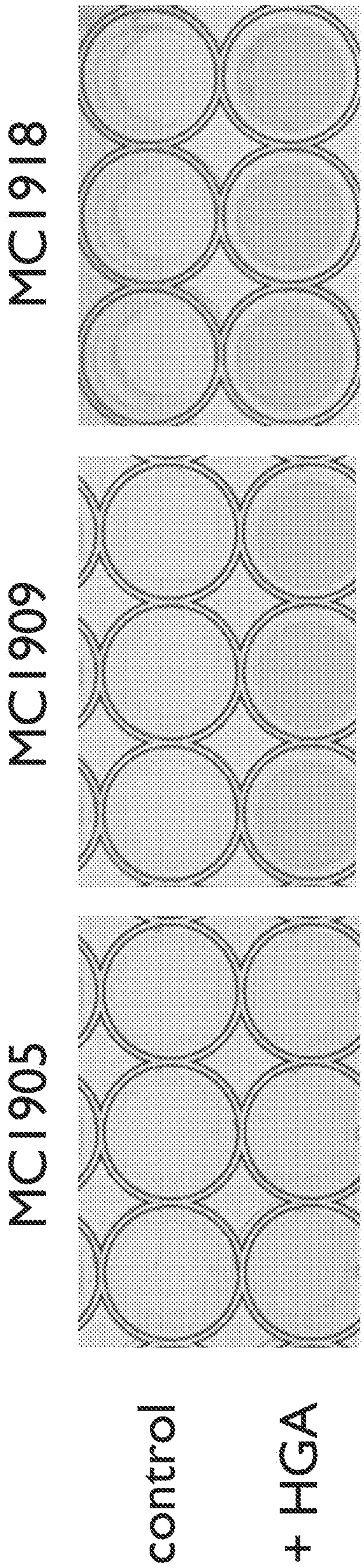
FIG. 23 shows photographs of minimal consortia MC1905, MC1909, and MC1918 produced from samples S1905, S1909, and S1918, respectively, in wells of a 96-well plate. Three replicates of each consortium were grown in a minimal mineral media (control, top row) and three replicates each consortium were grown in the same media supplemented with 2.77 mM homogentisic acid (HGA) (bottom row).
Figure 24:
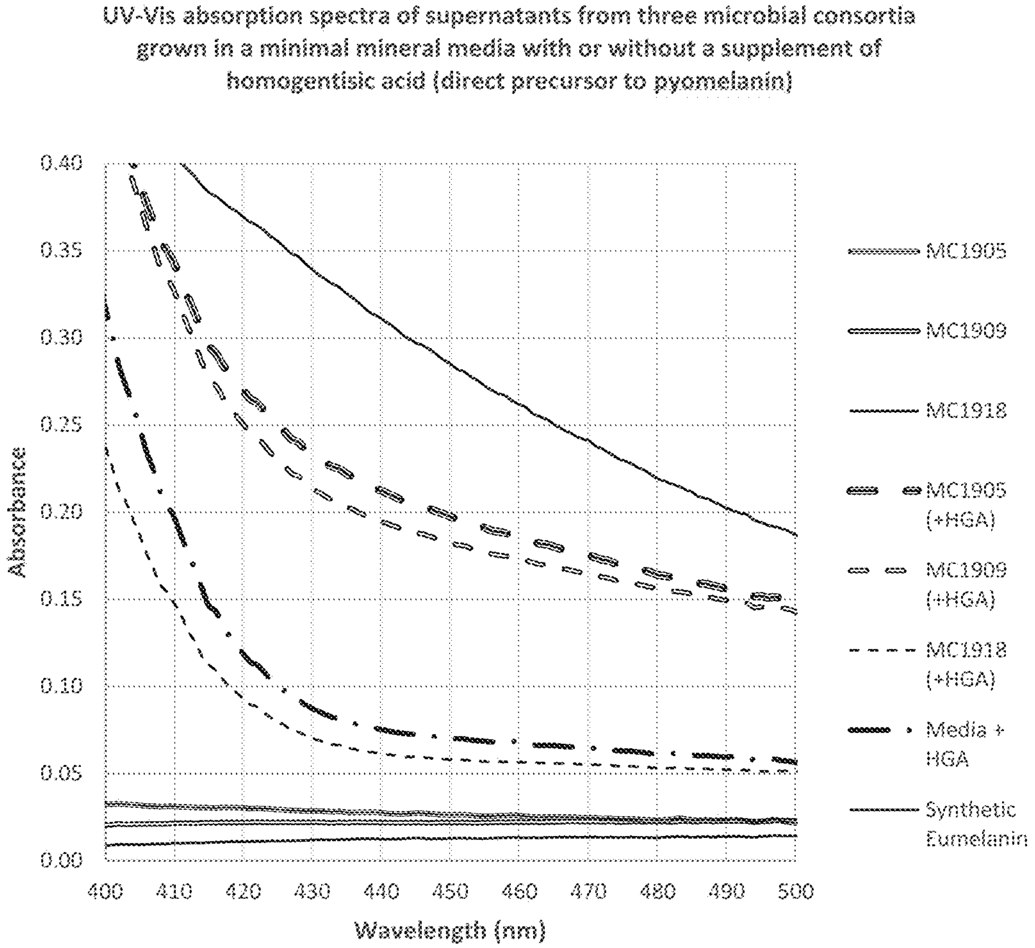
FIG. 24 shows absorbance spectra of the samples shown in the photograph of FIG. 23. Synthetic eumelanin is shown as a control.

A 200-μL volume of each of the samples (three replicates as described above) were collected and each volume was added to a well of a 96-well plate (FIG. 23). After photographing the plate, the supernatants were assayed is a SpectraMax i3 microplate reader for absorbance between 230-730 nm (FIG. 24). The data collected indicated that consortia 1905 and 1909 show pronounced pigmentation following HGA supplementation, while consortium 1918 does not show enhanced pigmentation in the media following the addition of HGA. The measured absorbance of each supernatant prepared from the MC1905 and MC1909 cultures (brown morphologies) treated with HGA is above the baseline absorbance observed in the respective controls. FIG. 24. The absorbance of the supernatant prepared from the MC1918 (green morphology) culture is below the baseline absorbance observed in the respective controls. FIG. 24. Without being limit by theory, it is contemplated that this is due to uptake of HGA by the cells, but the inability of the cells to transform it to pyomelanin; and the pigmentation of the media blank supplemented with HGA is likely due to the known ability of HGA to self-polymerize in the presence of $MnCl_2 \cdot 4H_2O$ (present in the media). In sum, these data indicate that the BW02 consortia produce melanin.

HGA is an upstream intermediate for pyomelanin synthesis from L-tyrosine, but not for production of the other melanins eumelanin and pheomelanin. See FIG. 18B. Visual interpretation of the well color strongly suggested that the pigmented material observed in both the tyrosine and HGA supplementation experiments and in normal (unsupplemented) culture conditions is pyomelanin. Absorbance spectra indicated that the addition of HGA to media produced an increase in absorbance between 400-500 nm, which is in the absorbance range of melanins (e.g., eumelanin).

Example 20

During the development of embodiments of the technology described herein, sequencing and analysis of 16S, 23S, and 5S ribosomal RNA gene sequences were performed to identify members of consortia. Multiple minimal consortia (e.g., comprising approximately 2-10 different types of organisms) were isolated from each of the BW01, BW02, and BW05 consortia (e.g., comprising approximately hundreds of different types of organisms). Minimal consortia were created by streaking each full consortium on agar media to isolate colonies. Each colony is a minimal consortium, which is assumed to require a plurality of members that each contributes a critical function to the consortium, e.g., nitrogen fixation, carbon fixation, or shuttling metabolites between the consortium organisms performing nitrogen fixation and/or carbon fixation.

A sequencing library was produced from each minimal consortium, and nucleotide sequences were produced from the library using shotgun metagenome sequencing. For quality trimming and evaluation fastp, bowtie2, and FASTQC were used. See, e.g., Chen (2018) "fastp: an ultra-fast all-in-one FASTQ preprocessor" Bioinformatics 34: 1884-1890; Langmead (2012) "Fast gapped-read alignment with Bowtie 2" Nature Methods 9: 357-59; and www.bioinformatics.babraham.ac.uk/projects/fastqc/. For assembly, metaSPADES (default options) and MEGAHIT2 (default options) were used, and QUAST was used for evaluation of the assembly. See, e.g., Bankevich (2012) "SPAdes: A New Genome Assembly Algorithm and Its Applications to Single-Cell Sequencing" J Comput Biol 19: 455-77; Nurk (2017) "metaSPAdes: a new versatile metagenomic assembler" Genome Res 27: 824-34; Li (2015) "MEGAHIT: an ultra-fast single-node solution for large and complex metagenomics assembly via succinct de Bruijn graph" Bioinformatics 31: 1674-1676; and Gurevich (2013) "QUAST: quality assessment tool for genome assemblies" Bioinformatics 29: 1072-75, each of which is incorporated herein by reference. For binning, METABAT2 was used (default options). See, e.g., Kang (2019) "MetaBAT 2: an adaptive binning algorithm for robust and efficient genome reconstruction from metagenome assemblies" PeerJ 2019; 7: e7359, incorporated herein by reference. 16S ribosomal RNA gene sequences were identified in the shotgun sequences using Barrnap (default options), and the 16S ribosomal RNA sequences were taxonomically identified using average nucleotide identity (ANI) as provided by the GTDB-tk package (Gtdbtk classify_wf, and ani rep using default options). See, e.g., Chaumeil (2019) "GTDB-Tk: A toolkit to classify genomes with the Genome Taxonomy Database" Bioinformatics, btz848; Parks (2019) "A complete domain-to-species taxonomy for Bacteria and Archaea" Nat Biotechnol. 38: 1079-86; and Parks (2018) "A standardized bacterial taxonomy based on genome phylogeny substantially revises the tree of life" Nat. Biotechnol 36: 996-1004, each of which is incorporated herein by reference. The results of the 16S rRNA gene ANI analysis are provided in Tables 12-14 in the column labeled "Organisms-ANI".

Organisms were also identified using the 16S rRNA gene sequence to query the full NCBI nucleotide sequence database using BLAST. Annotation data in the NCBI full nucleotide sequence database associated with matched sequences were used for further taxonomic identification of the 16S ribosomal RNA sequences produced from the minimal consortia. Tables 12-14 provide the top BLAST hit having >97% identity and >97% query coverage for each 16S rRNA gene nucleotide sequence in the column labeled "Organisms-BLAST". All BLAST hits having >97% identity and >97% query coverage for each 16S rRNA gene sequence are provided in a supplemental table named "TABLES 12-14 SUPPLEMENT.txt" filed with this patent application. The sequences and BLAST results in the supplemental table are labeled as follows ">nnnn BW## S##### L#### pppp" in which nnnn is the SEQ ID NO: of the 16S rRNA gene nucleotide sequence used as a query against the NCBI database, BW## and S#### refer to the full consortia from which the minimal consortium was produced, L#### indicates the sequencing library and minimal consortium number, and pppp is an item id.

Samples, minimal consortia, and sequencing libraries were produced and are named as follows. A sample S1057 was prepared from BW01. Eight BW01-derived minimal consortia replicates were produced from sample S1057: M2209, M2210, M2211, M2215, M2245, M2246, M2247, and M2251. A sequencing library was produced from each BW01-derived minimal consortium: L2209, L2210, L2211, L2215, L2245, L2246, L2247, and L2251.

Similarly, a sample S1058 was prepared from BW02. Eight BW02-derived minimal consortia replicates were produced from sample S1058: M2206, M2207, M2208, M2214, M2242, M2243, M2244, and M2250. A sequencing library was produced from each BW02-derived minimal consortium: L2206, L2207, L2208, L2214, L2242, L2243, L2244, and L2250.

Finally, a sample S1061 was prepared from BW05. Four BW05-derived minimal consortia replicates were produced from sample S1061: M2212, M2213, M2248, and M2249. A sequencing library was produced from each BW05-derived minimal consortium: L2212, L2213, L2248, L2249.

Ribosomal RNA sequences for the minimal consortia are provided in Tables 9, 10, and 11, referencing the sequence listing provided with this application.

TABLE 9

BW01 MINIMAL CONSORTIA SEQUENCES

| Minimal consortium | rRNA gene sequences (SEQ ID NOs) |
|---|---|
| M2209 | 9, 10 |
| M2210 | 11, 12, 13 |
| M2211 | 14, 15, 16, 17, 18, 19, 20, 21 |
| M2215 | 31, 32 |
| M2245 | 42, 43 |
| M2246 | 44, 45 |
| M2247 | 46, 47, 48, 49, 50, 51 |
| M2251 | 62, 63 |

TABLE 10

BW02 MINIMAL CONSORTIA SEQUENCES

| Minimal consortium | rRNA gene sequences (SEQ ID NOs) |
|---|---|
| M2206 | 1, 2 |
| M2207 | 3, 4 |
| M2208 | 5, 6, 7, 8, 64, 65 |
| M2214 | 30 |
| M2242 | 33, 34 |
| M2243 | 35, 36 |
| M2244 | 37, 38, 39, 40, 41 |
| M2250 | 61 |

TABLE 11

BW05 MINIMAL CONSORTIA SEQUENCES

| Minimal consortium | rRNA gene sequences (SEQ ID NOs) |
|---|---|
| M2212 | 22, 23, 24 |
| M2213 | 25, 26, 27, 28, 29 |
| M2248 | 52, 53, 54 |
| M2249 | 55, 56, 57, 58, 59, 60 |

The ribosomal RNA sequences were analyzed to identify the organisms from which they were derived. Identification of the organisms in the minimal consortia is provided below at a number of levels of taxonomic resolution.

TABLE 12

BW01 MINIMAL CONSORTIA ORGANISMS

| Minimal consortium | Organisms-ANI | Organisms-BLAST |
|---|---|---|
| M2209 | *Pseudomonas* sp. NFR16 | *Pseudomonas fluorescens* |
| | *Nostoc punctiforme* PCC 73102 | *Nostoc punctiforme* PCC 73102 |
| M2210 | *Variovorax* sp. PMC12 | *Variovorax paradoxus* |
| | uncultured bacterium | *Undibacterium* sp. DW6-3 |
| | *Nostoc punctiforme* PCC 73102 | *Nostoc punctiforme* PCC 73102 |
| M2211 | *Variovorax* sp. PMC12 | *Variovorax paradoxus* |
| | *Novosphingobium* sp. F2 | *Novosphingobium* sp. |
| | *Pseudomonas* sp. NFR16 | *Pseudomonas fluorescens* |
| | uncultured bacterium | uncultured bacterium |
| | metagenome | none |
| | *Nostoc punctiforme* PCC 73102 | *Nostoc punctiforme* PCC 73102 |
| | *Bosea* sp. RAC05 | *Bosea* sp. PAMC 26642 |
| | uncultured bacterium | *Undibacterium* sp. |
| M2215 | *Variovorax* sp. PMC12 | *Variovorax paradoxus* |
| | *Nostoc punctiforme* PCC 73102 | *Nostoc punctiforme* PCC 73102 |
| M2245 | *Nostoc punctiforme* PCC 73102 | *Nostoc punctiforme* PCC 73102 |
| | *Variovorax* sp. PMC12 | *Variovorax paradoxus* |
| M2246 | *Variovorax* sp. PMC12 | *Variovorax paradoxus* |
| | *Nostoc punctiforme* PCC 73102 | *Nostoc punctiforme* PCC 73102 |
| M2247 | *Novosphingobium* sp. F2 | *Novosphingobium* sp. F2 |
| | *Variovorax* sp. PMC12 | *Variovorax paradoxus* |
| | *Zoogloea ramigera* | *Shinella zoogloeoides* |
| | uncultured bacterium | uncultured bacterium |
| | uncultured bacterium | *Undibacterium hunanense* |
| | *Nostoc punctiforme* PCC 73102 | *Nostoc punctiforme* PCC 73102 |
| M2251 | *Variovorax* sp. PMC12 | *Variovorax paradoxus* |
| | *Nostoc punctiforme* PCC 73102 | *Nostoc punctiforme* PCC 73102 |

TABLE 13

BW02 MINIMAL CONSORTIA ORGANISMS

| Minimal consortium | Organisms-ANI | Organisms-BLAST |
|---|---|---|
| M2206 | *Nostoc* sp. NIES-4103 | *Amazonocrinis nigriterrae* CENA18 |
| | *Pseudomonas* sp. NFR16 | *Pseudomonas fluorescens* |
| M2207 | *Nostoc* sp. UAM 307 | *Nostoc* sp. UAM 307 |
| | *Pseudomonas* sp. NFR16 | *Pseudomonas fluorescens* |
| M2208 | *Rhizobium* sp. SEMIA 6411 | *Rhizobium* sp. BG4 |
| | *Ancylobacter rudongensis* | *Ancylobacter polymorphus* |
| | *Nostoc* sp. NIES-4103 | *Amazonocrinis nigriterrae* CENA18 |
| | *Cupriavidus plantarum* | *Cupriavidus pauculus* |
| M2214 | *Nostoc* sp. UAM 307 | *Nostoc* sp. UAM 307 |
| M2242 | *Pseudomonas* sp. NFR16 | *Pseudomonas fluorescens* |
| | *Nostoc* sp. NIES-4103 | *Amazonocrinis nigriterrae* CENA18 |
| M2243 | *Nostoc* sp. UAM 307 | *Nostoc* sp. UAM 307 |
| | *Pseudomonas* sp. NFR16 | *Pseudomonas fluorescens* |
| M2244 | *Cupriavidus plantarum* | *Cupriavidus pauculus* |
| | *Rhizobium* sp. SEMIA 6411 | *Rhizobium* sp. BG4 |
| | *Nostoc* sp. NIES-4103 | *Amazonocrinis nigriterrae* CENA18 |
| | *Ancylobacter rudongensis* | *Ancylobacter polymorphus* |
| | *Bradyrhizobium* sp. S23321 | *Bradyrhizobium cosmicum* |
| M2250 | *Nostoc* sp. UAM 307 | *Nostoc* sp. UAM 307 |

TABLE 14

BW05 MINIMAL CONSORTIA ORGANISMS

| Minimal consortium | Organisms-ANI | Organisms-BLAST |
|---|---|---|
| M2212 | *Dolichospermum flosaquae* | *Nostoc* sp. 8964:3 |
| | *Bosea* sp. R-45681 | *Bosea* sp. Tri-49 |
| | *Caulobacter segnis* ATCC 21756 | *Caulobacter* sp. BBCT11 |

TABLE 14-continued

| BW05 MINIMAL CONSORTIA ORGANISMS | | |
|---|---|---|
| Minimal consortium | Organisms-ANI | Organisms-BLAST |
| M2213 | *Bosea* sp. R-45681 | *Bosea vestrisii* |
| | *Dolichospermum flosaquae* | *Nostoc* sp. 8964:3 |
| | *Caulobacter ginsengisoli* | *Caulobacter* sp. NIBR1757 |
| | *Sphingopyxis macrogoltabida* | *Sphingopyxis panaciterrae* |
| | *Pseudomonas* sp. NFR16 | *Pseudomonas fluorescens* |
| M2248 | *Bosea* sp. R-45681 | *Bosea* sp. Tri-49 |
| | *Caulobacter segnis* ATCC 21756 | *Caulobacter segnis* |
| | *Dolichospermum flosaquae* | *Nostoc* sp. 8964:3 |
| M2249 | *Bosea* sp. R-45681 | *Bosea* sp. Tri-49 |
| | *Caulobacter ginsengisoli* | *Caulobacter* sp. NIBR1757 |
| | *Dolichospermum flosaquae* | *Nostoc* sp. 8964:3 |
| | *Methylobacterium brachiatum* | *Methylobacterium brachiatum* |
| | *Sphingopyxis macrogoltabida* | *Sphingopyxis panaciterrae* |
| | *Pseudomonas* sp. NFR16 | *Pseudomonas fluorescens* |

FIG. 25 provides data describing the membership of each of the BW01 minimal consortia organisms at the taxonomic levels of phylum, class, order, family, and genus. FIG. 26 provides data describing the membership of each of the BW02 minimal consortia organisms at the taxonomic levels of phylum, class, order, family, and genus. FIG. 27 provides data describing the membership of each of the BW05 minimal consortia organisms at the taxonomic levels of phylum, class, order, family, and genus.

These data indicate that the manipulation of environmental samples according to the technology described herein produced several isolated microbial consortia and isolated minimal microbial consortia. Eight minimal consortia were produced from BW01, and each of the eight BW01-derived minimal consortia comprised *Nostoc punctiforme* PCC 73102. Seven of the BW01-derived minimal consortia comprised *Variovorax* sp. PMC12. Accordingly, embodiments of the technology provide a consortium comprising a *Nostoc* organism (e.g., *Nostoc punctiforme* PCC 73102) and a *Variovorax* organism (e.g., *Variovorax* sp. PMC12). All BW01-derived minimal consortia comprised a member of phylum Cyanobacteria (class Cyanobaceriia) and a member of phylum Proteobacteria (class Gammaproteobacteria). FIG. 25.

Eight minimal consortia were produced from BW02. All BW02-derived minimal consortia comprised a member of phylum Cyanobacteria (class Cyanobaceriia) and seven BW02-derived minimal consortia comprised a member of phylum Proteobacteria (class Gammaproteobacteria). In all eight BW02-derived minimal consortia, the member of phylum Cyanobacteria was a *Nostoc* species—four minimal consortia comprised *Nostoc* sp. NIES-4103 and four minimal consortia comprised *Nostoc* sp. UAM307 Four of the BW02-derived minimal consortia comprised *Pseudomonas* sp. NFR16. Accordingly, embodiments of the technology provide a consortium comprising a *Nostoc* organism (e.g., *Nostoc* sp. NIES-4103 or *Nostoc* sp. UAM300 and an organism from the phylum Proteobacteria. FIG. 26.

Four minimal consortia were produced from BW05. All four of the BW05-derived minimal consortia comprised *Dolichospermum flos-aquae*, which is in family Nostocaceae. Further, each of the four BW05-derived minimal consortia comprised *Bosea* sp. R-45681 and a member of the genus *Caulobacter*—two BW05-derived minimal consortia comprised *Caulobacter segnis* ATCC21756 and two BW05-derived minimal consortia comprised *Caulobacter ginsengisoli*. Two of the four BW05-derived minimal consortia comprised *Pseudomonas* sp. NFR16, which is the same as the ratio of BW02-derived minimal consortia that comprised *Pseudomonas* sp. NFR16 (four out of eight). Two of eight BW01-derived minimal consortia comprised *Pseudomonas* sp. NFR16. All BW05-derived minimal consortia comprised a member of the phylum Cyanobacteria (class Cyanobacteriia) and a member of the phylum Proteobacteria (either class Alphaproteobacteria or Gammaproteobacteria). Accordingly, embodiments of the technology provide a consortium comprising an organism from the phylum Cyanobacteria and a member of the phylum Proteobacteria.

Each of the 20 minimal consortia comprised a member of the family Nostocaceae (e.g., *Nostoc punctiforme* PCC 73102, *Nostoc* sp. NIES-4103, *Nostoc* sp. UAM307 or *Dolichospermum flos-aquae*). These members represent three *Nostoc* genera: *Nostoc* PCC-73102*, Desmonostoc* PCC-6302, and *Desmonostoc* PCC-7422.

Each of the 20 minimal consortia comprised a member of phylum Proteobacteria—most members were from class Gammaproteobacteria and some were from class Alphaproteobacteria.

Example 21

During the development of embodiments of the technology described herein, experiments were conducted to produce minimal consortia from additional environmental samples using the processes for production of minimal consortia as described herein. In particular, the experiments used 189 soil and water samples ("FL" samples) that were collected from agricultural fields independently from the soil samples used to produce the minimal consortia described above. The FL collected samples represented 61 unique combinations of field location, crop planted, and sample type. Samples were stored at 4° C. after collection.

A volume of 1.5 mL of each FL sample was vortexed with 1 mL of stainless steel beads (3.2 mm) in sterile water (total volume approximately 11 mL) to disrupt clumps. Each vortexed sample was used to inoculate BG-11 (−N) media in vertical tissue culture flasks using 10 μL of homogenate per one mL of liquid culture medium (e.g., 300 μL inoculant in 30 mL medium). Cultures were grown at room temperature on a shaker under 150 $\mu mol/m^2/s$ of constant illumination for up to 35 days or until green coloration was observed to provide full consortium samples.

Serial dilutions in minimal growth medium were produced for each of the full consortia samples to produce a dilution series. Dilutions were passaged by streaking on BG-11(−N)+1.5% agarose solid growth medium 2 to 3 times until a stable morphology was observed for colonies on the selective plates. Stable colonies were used to produce liquid cultures, which were used to produce libraries for shotgun metagenomic sequencing on an Illumina sequencing apparatus. The rRNA gene nucleotide sequences produced for the six minimal consortia produced and sequenced are provided in Table 15. Organisms were identified using the 16S rRNA gene sequences to query the NCBI nucleotide sequence database using BLAST. Table 16 provides the top BLAST hit having >97% identity and >97% query coverage for each 16S rRNA gene nucleotide sequence.

TABLE 15

FL MINIMAL CONSORTIA SEQUENCES

| Minimal consortium | rRNA gene sequences (SEQ ID NOs) |
|---|---|
| M2527 | 66, 67, 68, 69, 70 |
| M2529 | 74, 75, 76, 77, 78, 79 |
| M2530 | 83, 84, 85, 86, 87, 88, 89, 90, 91, 92, 93 |
| M2531 | 98, 99, 100, 101, 102, 103 106, 107, 108, 109, 110, 111, |
| M2533 | 112, 113, 114, 115, 116, 117 |
| M2535 | 122, 123, 124, 125 |

TABLE 16

FL MINIMAL CONSORTIA ORGANISMS

| Minimal consortium | Organisms-BLAST |
|---|---|
| M2527 | *Nostoc* MS-1 |
| | Uncultured Alphaproteobacterium |
| | *Tahibacter* (*Xanthomonas*) |
| | *Enhydrobacter* (Gammaproteobactera) |
| | *Nostoc* NIES-3756 |
| M2529 | *Trichormus* sp. CCM-UFV035 |
| | *Brevundimonas* sp. PAMC22021 |
| | *Peribacillus simplex* NBRC 15720 = DSM 1321 |
| | *Brevibacillus* sp. JNUCC-41 |
| | *Anabaena cylindrica* |
| | *Brevundimonas* sp. PAMC22021 |
| M2530 | *Shinella zoogloeoides* |
| | *Nostoc* NIES-3756 |
| | *Opitutus* sp. GAS368 Verrucomicrobia |
| | *Runella* sp. NBRC 15147 (*Bacteroides*) |
| | *Shinella* sp. H4-D48 |
| | *Polymorphum gilvum* SL003B-26A1 (Alphaproteobacteria) |
| | *Runella slithyformis* DSM 19594 |
| | Betaproteobacteria bacterium UKL13-2 |
| | *Taylorella asinigenitalis* strain MCE3 (Betaproteobacteria) |
| M2531 | *Nostoc* sp. MS1 |
| | Uncultured bacterium clone mus-a55 (Gammaproteobacteria) |
| | *Tahibacter* sp. W38 |
| | *Oligotropha carboxidovorans* strain OM4 |
| | *Nostoc* sp. NIES-3756 |
| M2533 | Uncultured alpha proteobacterium clone B07-10D |
| | *Polaromonas* sp. HRRK103 |
| | *Nostoc* sp. MS1 |
| | Uncultured *Chitinophaga* sp. clone 4.6h39 (*Bacteroides*) |
| | *Erythrobacter* sp. BLCC-B19 (Alphaproteobacteria) |
| | *Porphyrobacter* sp. YT40 (Alphaproteobacteria) |
| | *Polaromonas* sp. Pch-P |
| | *Enhydrobacter* sp. isolate TGS_PRO10 (Alphaproteobacteria) |
| | *Polymorphum gilvum* SL003B-26A1 (Alphaproteobacteria) |
| | *Porphyrobacter* sp. LM 6 |
| | *Ferruginibacter lapsinanis* strain KACC 15035 *Bacteroides* |
| M2535 | Uncultured bacterium clone SH201206-6 (*Nostoc*) |
| | *Nostoc* sp. HK-01 |
| | *Ramlibacter tataouinensis* strain DMF-7 (Betaproteobacteria) |

All publications and patents mentioned in the above specification are herein incorporated by reference in their entirety for all purposes. Various modifications and variations of the described compositions, methods, and uses of the technology will be apparent to those skilled in the art without departing from the scope and spirit of the technology as described. Although the technology has been described in connection with specific exemplary embodiments, it should be understood that the invention as claimed should not be unduly limited to such specific embodiments. Indeed, various modifications of the described modes for carrying out the invention that are obvious to those skilled in the art are intended to be within the scope of the following claims.

We claim:

1. A method of producing a living microbial consortium that accumulates nitrogen in an agricultural medium, the method comprising:

(a) providing an input sample produced from an environmental sample comprising a plurality of microbes; and (b) proceeding, starting with the input sample, to produce a microbial consortium using an iterative process comprising:

(i) inoculating a fixed carbon-free and fixed nitrogen-free growth medium with the input sample to produce a culture;

(ii) incubating the agricultural medium culture in the presence of nitrogen gas ($N_2$) and carbon dioxide ($CO_2$) gas and with illumination by a light source to produce an incubated culture; and (iii) measuring a phenotype of the incubated culture, with a portion of the incubated culture acting as the input sample for a next iteration of the iterative process until the phenotype is stable, wherein the microbial consortium comprises a plurality of living organisms comprising a cyanobacterium and the cyanobacterium abundance in the microbial consortium is greater than an abundance of the cyanobacterium abundance in the environmental sample; and wherein the microbial consortium fixes nitrogen.

2. The method of claim 1, wherein said microbial consortium comprises one photosynthetic microbe.

3. The method of claim 2, wherein said microbial consortium comprises a photosynthetic bacterium or a photosynthetic alga.

4. The method of claim 3, wherein said photosynthetic alga is a member of a genus that is *Tetraselmis, Chlorella, Coleochaete, Gonium, Paradoxia, Cymbomonas, Palmaria, Characiochloris, Marvania, Chlamydomonas, Parachlorella, Coccomyxa, Trebouxia, Cyanidium, Treubaria, Dangeardinia, Galdieria, Nyholmiella, Porphyra, Chara, Ankistrodesmus, Picochlorum, Cyanophora, Chondrus, Pseudochloris, Interfilum, Gelidium, Symphyogyna, Chlorosarcina*, or *Cyanothece.*

5. The method of claim 2, wherein said microbial consortium comprises two or more photosynthetic microbes.

6. The method of claim 1, wherein the phenotype is a functional phenotype.

7. The method of claim 6, wherein the functional phenotype comprises nitrogen fixation.

8. The method of claim 7, wherein the functional phenotype further comprises carbon sequestration and/or phosphate mobilization.

9. The method of claim 1, wherein the microbial consortium comprises one microbe that sequesters carbon.

10. The method of claim 9, wherein the microbial consortium comprises two or more microbes that sequester carbon.

11. The method of claim 1, wherein said microbial consortium comprises one nitrogen-fixing microbe.

12. The method of claim 11, wherein said microbial consortium comprises two or more nitrogen-fixing microbes.

13. The method of claim 1, wherein said cyanobacterium abundance in the microbial consortium is at least 1%.

14. The method of claim 1, wherein the microbial consortium comprises a microbe of a phylum that is Proteobacteria.

15. The method of claim 1, wherein the microbial consortium comprises a microbe of an order that is Cyanobacteriales, Cyanobacteriota, Nostocales, Pseudoanabaenales, Spirulinales, or Oscillatoriales.

16. The method of claim 1, wherein the microbial consortium comprises a microbe from a genus that is *Variovorax, Caulobacter*, and/or *Pseudomonas.*

17. The method of claim 1, wherein the microbial consortium comprises a microbe from a genus that is *Acaryochloris, Aliinostoc, Aliterella, Amazonocrinis, Anabaena, Anabaenopsis, Aphanizomenon, Atlanticothrix, Aulosira, Calenema, Calothrix, Camptylonemopsis, Chlorogloeopsis, Chroococcidiopsis, Chrysosporum, Compactonostoc, Constrictifilum, Crocosphaera, Cyanobacterium, Cyanocohniella, Cylindrospermopsis, Cylindrospermum, Dendronalium, Desikacharya, Desmonostoc, Dolichospermum, Erythrobacter, Fischerella, Fortiea, Fremyella, Geitlerinema, Gloeocapsa, Gloeocapsopsis, Gloeothece, Gloeotrichia, Goleter, Hapalosiphon, Hydrocoryne, Jaaginema, Johanseniella, Kamptonema, Komarekiella, Leptolyngbya, Lyngbya, Macrochaete, Mastigocoleus, Microchaete, Nodosilinea, Nodularia, Nostoc, Nostocaceae, Nostochopsis, Oligotropha, Oscillatoria, Pantanalinema, Pelatocladus, Planktothrichoides, Planktothrix, Polymorphum, Porphyrobacter, Prochlorococcus, Prochlorothrix, Pseudanabaena, Pseudoaliinostoc, Raphidiopsis, Richelia, Rivularia, Roholtiella, Rubidibacter, Scytonema, Spirulina, Synechococcus, Synechocystis, Thermosynechococcus, Tolypothrix, Trichormus, Violetonostoc, Wollea*, or *Xenococcus.*

18. The method of claim 1, wherein a microbe of the microbial consortium has a ribosomal RNA gene nucleotide sequence that is at least 90% identical to SEQ ID NO: 1, 3, 7, 10, 13, 19, 22, 26, 30, 32, 34, 35, 39, 42, 45, 51, 54, 57, 61, 63, 66, 70,74, 84, 89, 99, 103, 108, 116, 122, 123, 125, or 127.

19. The method of claim 1, wherein the microbial consortium sequesters carbon.

20. The method of claim 1, wherein said microbial consortium comprises a microbe capable of metabolizing carbon-containing compounds produced by the cyanobacterium.

21. The method of claim 1, wherein the microbial consortium comprises a photosynthetic microbe that is a member of a genus that is *Nodularia, Chrysosporum, Gloeocapsopsis, Richelia, Mastigocoleus, Hapalosiphon, Gloeothece, Acaryochloris, Kamptonema, Raphidiopsis, Crocosphaera, Macrochaete, Thermosynechococcus, Pseudanabaena, Chroococcidiopsis, Prochlorothrix, Anabaena, Leptolyngbya, Calothrix, Cylindrospermopsis, Dolichospermum, Scytonema, Lyngbya, Tolypothrix, Fischerella, Fortiea, Aliterella, Hydrocoryne, Prochlorococcus, Planktothrichoides, Geitlerinema, Xenococcus, Jaaginema, Nostochopsis, Pantanalinema, Oscillatoria, Spirulina, Pelatocladus, Nodosilinea, Aphanizomenon, Chlorogloeopsis, Gloeocapsa, Calenema, Rivularia, Trichormus, Synechococcus, Synechocystis, Cylindrospermum, Planktothrix, Bosea, Shinella, Novosphingobium* or *Rubidibacter.*

22. The method of claim 1, wherein said light source provides light having wavelengths from approximately 380 nm to 750 nm.

23. The method of claim 1, wherein the cyanobacterium is a *Nostoc* species, a *Trichormus* species, or an *Amazonocrinis* species.

24. The method of claim 1, wherein the microbial consortium comprises an alpha-proteobacterium or a gamma-proteobacterium.

25. The method of claim 1, wherein the phenotype is microbial community membership and/or microbial community abundance.

* * * * *

SEQUENCE LISTING

```
Sequence total quantity: 127
SEQ ID NO: 1           moltype = DNA  length = 1487
FEATURE                Location/Qualifiers
source                 1..1487
                       mol_type = genomic DNA
                       note = Nostoc sp. NIES-4103
                       organism = Nostoc sp.
SEQUENCE: 1
aatggagagt ttgatcctgg ctcaggatga acgctggcgg tatgcttaac acatgcaagt  60
cgaacggtgt tttcggacac agtggcggac gggtgagtaa cgcgtgagaa tctggctcta  120
ggtcggggac aaccactgga aacggtggct aataccggat gtgccgagag gtgaaaggct  180
tgctgcctag agatgagctc gcgtctgatt agctagtagg tggggtaaga gcctacctag  240
gcgacgatca gtagctggtc tgagaggatg atcagccaca ctgggactga gacacggccc  300
agactcctac gggaggcagc agtggggaat tttccgcaat gggcgaaagc ctgacggagc  360
aataccgcgt gagggaggaa ggctcttggg ttgtaaacct cttttctcag ggaagaacac  420
aatgacggta cctgaggaat cagcatcggc taactccgtg ccagcagccg cggtaatacg  480
gaggatgcaa gcgttatccg gaatgattgg gcgtaaagcg tccgcaggtg gctatgtaag  540
tctgctgtta aagagtgagg ctcaacctca taagagcagt ggaaactaca tagctagagt  600
gcgttcgggg cagagggaat tcctggtgta gcggtgaaat gcgtagatat caggaagaac  660
```

```
accggtggcg aaagcgctct gctaggccgc aactgacact gagggacgaa agctagggga  720
gcgaatggga ttagataccc cagtagtcct agccgtaaac gatggatact aggcgtggct  780
tgtatcgacc cgagccgtgc cgtagctaac gcgttaagta tcccgcctgg ggagtacgca  840
cgcaagtgtg aaactcaaag gaattgacgg gggcccgcac aagcggtgga gtatgtggtt  900
taattcgatg caacgcgaag aaccttacca agacttgaca tgtcgcgaac tttcctgaaa  960
gggagaggtg ccttcgggag cgcgaacaca ggtggtgcat ggctgtcgtc agctcgtgtc  1020
gtgagatgtt gggttaagtc ccgcaacgag cgcaaccctc gtttttagtt gccagcatta  1080
agttgggcac tctagagaga ctgccggtga caaaccggag gaaggtgggg atgacgtcaa  1140
gtcagcatgc cccttacgtc ttgggctaca cacgtactac aatgctacgg acagagggca  1200
gcaagccggc aacggcaagc aaatcccgaa aaccgtagct cagttcagat cgcaggctgc  1260
aactcgcctg cgtgaaggag gaatcgctag taattgcagg tcagcatact gcagtgaatt  1320
cgttcccggg ccttgtacac accgcccgtc acaccatgga agctggcaac gcccgaagtc  1380
attactccaa cgattcgtcg gggaggatgc ctaaggcagt gctggtgact ggggtgaagt  1440
cgtaacaagg tagccgtacc ggaaggtgtg gctggatcac ctccttt                1487

SEQ ID NO: 2            moltype = DNA  length = 1533
FEATURE                 Location/Qualifiers
source                  1..1533
                        mol_type = genomic DNA
                        note = Pseudomonas sp. NFR16
                        organism = Pseudomonas sp.
SEQUENCE: 2
ctgaagagtt tgatcatggc tcagattgaa cgctggcggc aggcctaaca catgcaagtc  60
gagcggatga agggagcttg ctccctgatt cagcggcgga cgggtgagta atgcctagga  120
atctgcctgg tagtggggga caacgtctcg aaagggacgc taataccgca tacgtcctac  180
gggagaaagc aggggacctt cgggccttgc gctatcagat gagcctaggt cggattagct  240
agttggtgag gtaatggctc accaaggcga cgatccgtaa ctggtctgag aggatgatca  300
gtcacactgg aactgagaca cggtccagac tcctacggga ggcagcagtg gggaatattg  360
gacaatgggc gaaagcctga tccagccatg ccgcgtgtgt gaagaaggtc ttcggattgt  420
aaagcacttt aagttgggag gaagggttgt agattaatac tctgcaattt tgacgttacc  480
gacagaataa gcaccggcta actctgtgcc agcagccgcg gtaatacaga gggtgcaagc  540
gttaatcgga attactgggc gtaaagcgcg cgtaggtggt ttgttaagtt gaatgtgaaa  600
tccccgggct caacctggga actgcatcca aaactggcaa gctagagtag ggcagagggt  660
ggtggaattt cctgtgtagc ggtgaaatgc gtagatatag gaaggaacac cagtggcgaa  720
ggcgaccacc tgggctcata ctgacactga ggtgcgaaag cgtggggagc aaacaggatt  780
agataccctg gtagtccacg ccgtaaacga tgtcaactag ccgttgggag tcttgaactc  840
ttagtggcgc agctaacgca ttaagttgac cgcctgggga gtacggccgc aaggttaaaa  900
ctcaaatgaa ttgacggggg cccgcacaag cggtggagca tgtggtttaa ttcgaagcaa  960
cgcgaagaac cttaccaggc cttgacatcc agtgaactta ccagagatgg tttggtgcct  1020
tcgggaacac tgagacaggt gctgcatggc tgtcgtcagc tcgtgtcgtg agatgttggg  1080
ttaagtcccg taacgagcgc aacccttgtc cttagttacc agcacgttaa ggtgggcact  1140
ctaaggagac tgccggtgac aaaccggagg aaggtgggga tgacgtcaag tcatcatggc  1200
ccttacggcc tgggctacac acgtgctaca atggtcggta cagagggttg ccaagccgcg  1260
aggtggagct aatcccacaa aaccgatcgt agtccggatc gcagtctgca actcgactgc  1320
gtgaagtcgg aatcgctagt aatcgcgaat cagaatgtcg cggtgaatac gttcccgggc  1380
cttgtacaca ccgcccgtca caccatggga gtgggttgca ccagaagtag ctagtctaac  1440
cttcgggagg acggttacca cggtgtgatt catgactggg gtgaagtcgt aacaaggtag  1500
ccgtagggga acctgcggct ggatcacctc ctt                               1533

SEQ ID NO: 3            moltype = DNA  length = 1486
FEATURE                 Location/Qualifiers
source                  1..1486
                        mol_type = genomic DNA
                        note = Nostoc sp. UAM 307
                        organism = Nostoc sp.
SEQUENCE: 3
acggagagtt tgatcctggc tcaggatgaa cgctggcggt atgcttaaca catgcaagtc  60
gaacggtgtc ttcggacata gtggcggacg ggtgagtaac gcgtgagaat ctagcttcag  120
gtctaggaca accactggaa acggtggcta atactggatg tgccggaagg tgaaaggctt  180
gctgcctgaa gatgagctcg cgtctgatta gctagttggt ggggtaagag cctaccaagg  240
cgacgatcag tagctggtct gagaggatga tcagccacac tgggactgag acacggccca  300
gactcctacg ggaggcagca gtggggaatt ttccgcaatg ggcgaaagcc tgacggagca  360
ataccgcgtg agggaggaag gctcttgggt tgtaaacctc ttttctcagg gaagaacaca  420
atgacggtac ctgaggaatc agcatcggct aactccgtgc cagcagccgc ggtaatacgg  480
aggatgcaag cgttatccgg aatgattggg cgtaaagcgt ccgcaggtgg ctgtgtaagt  540
ctgctgttaa agagtctagc tcaactagat aaaggcagtg gaaactacac ggctagagtg  600
cgttcggggc agagggaatt cctggtgtag cggtgaaatg cgtagagatc aggaagaaca  660
ccggtggcga aggcgctctg ctaggccgca actgacactg agggacgaaa gctaggggag  720
cgaatgggat tagatacccc agtagtccta gctgtaaacg atggatacta ggcgtggctt  780
gtatcgaccc gagccgtgcc gtagctaacg cgttaagtat cccgcctggg gagtacgcac  840
gcaagtgtga aactcaaagg aattgacggg ggcccgcaca agcggtggag tatgtggttt  900
aattcgatgc aacgcgaaga accttaccaa ggcttgacat gtcgcgaatc ctgctgaaag  960
gtgggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctacgga cagagggcag  1200
caagctagtg atagcaagct aatcccataa accgtggctc agttcagatc gaaggctgca  1260
actcgccttc gtgaaggagg aatcgctagt aattgcaggt cagcatactg cagtgaattc  1320
gttcccgggc cttgtacaca ccgcccgtca caccatggaa gctggcaacg cccgaagtca  1380
```

```
ttactccaac ttttcggaga ggaggatgcc taaggcagtg ctggtgactg gggtgaagtc  1440
gtaacaaggt agccgtaccg gaaggtgtgg ctggatcacc tccttt                 1486

SEQ ID NO: 4           moltype = DNA  length = 1533
FEATURE                Location/Qualifiers
source                 1..1533
                       mol_type = genomic DNA
                       note = Pseudomonas sp. NFR16
                       organism = Pseudomonas sp.
SEQUENCE: 4
ctgaagagtt tgatcatggc tcagattgaa cgctggcggc aggcctaaca catgcaagtc  60
gagcggatga agggagcttg ctccctgatt cagcggcgga cgggtgagta atgcctagga  120
atctgcctgg tagtggggga caacgtctcg aaagggacgc taataccgca tacgtcctac  180
gggagaaagc aggggacctt cggccttgc gctatcagat gagcctaggt cggattagct  240
agttggtgag gtaatggctc accaaggcga cgatccgtaa ctggtctgag aggatgatca  300
gtcacactgg aactgagaca cggtccagac tcctacggga ggcagcagtg gggaatattg  360
gacaatgggc gaaagcctga tccagccatg ccgcgtgtgt gaagaaggtc ttcggattgt  420
aaagcacttt aagttgggag gaagggtgt agattaatac tctgcaattt tgacgttacc  480
gacagaataa gcaccggcta actctgtgcc agcagccgcg gtaatacaga gggtgcaagc  540
gttaatcgga attactgggc gtaaagcgcg cgtaggtggt ttgttaagtt gaatgtgaaa  600
tccccgggct caacctggga actgcatcca aaactggcaa gctagagtag ggcagagggt  660
ggtggaattt cctgtgtagc ggtgaaatgc gtagatatag gaaggaacac cagtggcgaa  720
ggcgaccacc tgggctcata ctgacactga ggtgcgaaag cgtggggagc aaacaggatt  780
agataccctg gtagtccacg ccgtaaacga tgtcaactag ccgttgggag tcttgaactc  840
ttagtggcgc agctaacgca ttaagttgac cgcctgggga gtacggccgc aaggttaaaa  900
ctcaaatgaa ttgacggggg cccgcacaag cggtggagca tgtggtttaa ttcgaagcaa  960
cgcgaagaac cttaccaggc cttgacatcc agtgaactta ccagagatgg tttggtgcct  1020
tcgggaacac tgagacaggt gctgcatggc tgtcgtcagc tcgtgtcgtg agatgttggg  1080
ttaagtcccg taacgagcgc aacccttgtc cttagttacc agcacgttaa ggtgggcact  1140
ctaaggagac tgccggtgac aaaccggagg aaggtgggga tgacgtcaag tcatcatggc  1200
ccttacggcc tgggctacac acgtgctaca atggtcggta cagagggttg ccaagccgcg  1260
aggtggagct aatcccacaa aaccgatcgt agtccggatc gcagtctgca actcgactgc  1320
gtgaagtcgg aatcgctagt aatcgcgaat cagaatgtcg cggtgaatac gttcccgggc  1380
cttgtacaca ccgcccgtca caccatggga gtgggttgca ccagaagtag ctagtctaac  1440
cttcgggagg acggttacca cggtgtgatt catgactggg gtgaagtcgt aacaaggtag  1500
ccgtagggga acctgcggct ggatcacctc ctt                               1533

SEQ ID NO: 5           moltype = DNA  length = 1477
FEATURE                Location/Qualifiers
source                 1..1477
                       mol_type = genomic DNA
                       note = Rhizobium sp. SEMIA 6411
                       organism = Rhizobium sp.
SEQUENCE: 5
atgagagttt gatcctggct cagaacgaac gctggcggca ggcttaacac atgcaagtcg  60
agcgccccgc aaggggagcg gcagacgggt gagtaacgcg tgggaatcta ccttttgcta  120
cggaataacg cagggaaact tgtgctaata ccgtatgtgc ccttcggggg aaagatttat  180
cggcaaagga tgagcccgcg ttggattagc tagttggtgg ggtaaaggcc taccaaggcg  240
acgatccata gctggtctga gaggatgatc agccacattg ggactgagac acggcccaaa  300
ctcctacggg aggcagcagt ggggaatatt ggacaatggg cgcaagcctg atccagccat  360
gccgcgtgag tgatgaaggc cttagggttg taaagctctt tcaccggtga agataatgac  420
ggtaaccgga gaagaagccc cggctaactt cgtgccagca gccgcggtaa tacgaagggg  480
gctagcgttg ttcggattta ctgggcgtaa agcgcacgta ggcggatcga tcagtcaggg  540
gtgaaatccc agggctcaac cctggaactg cctttgatac tgtcgatctg gagtatggaa  600
gaggtgagtg gaattccgag tgtagaggtg aaattcgtag atattcggag gaacaccagt  660
ggcgaaggcg gctcactggt ccattactga cgctgaggtg cgaaagcgtg gggagcaaac  720
aggattagat accctggtag tccacgccgt aaacgatgaa tgttagccgt cgggcagtat  780
actgttcggt ggcgcagcta acgcattaaa cattccgcct ggggagtacg gtcgcaagat  840
taaaactcaa aggaattgac gggggcccgc acaagcggtg gagcatgtgg tttaattcga  900
agcaacgcgc agaaccttac cagcccttga catcctacga ccgctgcaga gatgcagttt  960
ccacttcggt ggcgtagaga caggtgctgc atggctgtcg tcagctcgtg tcgtgagatg  1020
ttgggttaag tcccgcaacg agcgcaaccc tcgcccttag ttgccagcat ttagttgggc  1080
actctaaggg gactgccggt gataagccga gaggaaggtg gggatgacgt caagtcctca  1140
tggcccttac gggctgggct acacacgtgc tacaatggtg gtgacagtgg gcagcgaggc  1200
cgcgaggccg agctaatctc caaaagccat ctcagttcgg attgcactct gcaactcgag  1260
tgcatgaagt tggaatcgct agtaatcgcg gatcagcatg ccgcggtgaa tacgttcccg  1320
ggccttgtac acaccgcccg tcacaccatg ggagttggtt ttacccgaag gtagtgcgct  1380
aaccgcaagg aggcagctaa ccacggtagg gtcagcgact ggggtgaagt cgtaacaagg  1440
tagccgtagg ggaacctgcg gctggatcac ctccttt                           1477

SEQ ID NO: 6           moltype = DNA  length = 1484
FEATURE                Location/Qualifiers
source                 1..1484
                       mol_type = genomic DNA
                       organism = Ancylobacter rudongensis
SEQUENCE: 6
cttgagagtt tgatcctggc tcagaacgaa cgctggcggc aggcttaaca catgcaagtc  60
gaacgccccg caaggggagt ggcagacggg tgagtaacac gtggggatct gcccaatggt  120
acggaataat tccgggaaac tgggactaat accgtatgag cccgcaaggg gaaagattta  180
```

```
tcgccattgg atgaacccgc gtcggattag ctagttggtg tggtaaaggc gcaccaaggc  240
gacgatccgt agctggtctg agaggatgat cagccacact gggactgaga cacggcccag  300
actcctacgg gaggcagcag tggggaatat tggacaatgg gcgcaagcct gatccagcca  360
tgccgcgtga gtgatgaagg ccttagggtt gtaaagctct ttcgccgacg aagataatga  420
cggtagtcgg agaagaagcc ccggctaact tcgtgccagc agccgcggta atacgaaggg  480
ggctagcgtt gttcggaatc actgggcgta aagcgcacgt aggcggatat ttaagtcagg  540
ggtgaaagcc tggagctcaa ctccagaact gcccttgata ctgggtatct cgagtccgga  600
agaggtaagt ggaactgcga gtgtagaggt gaaattcgta gatattcgca agaacaccag  660
tggcgaaggc ggcttactgg tccggtactg acgctgaggt gcgaaagcgt ggggagcaaa  720
caggattaga taccctggta gtccacgccg taaacgatgg aggctagccg ttggtgagca  780
tgctcatcag tggcgcagct aacgcattaa gcctcccgcc tggggagtac ggtcgcaaga  840
ttaaaactca aaggaattga cgggggcccg cacaagcggt ggagcatgtg gtttaattcg  900
aagcaacgcg cagaacctta ccagcctttg acatgtcccg gacggttacc agagatggtt  960
tcttctcttc ggagccggga acacaggtgc tgcatggctg tcgtcagctc gtgtcgtgag  1020
atgttgggtt aagtcccgca acgagcgcaa ccctcgccct tagttgccat cattcagttg  1080
ggcactctag gggactgcc ggtgataagc cgagaggaag gtggggatga cgtcaagtcc  1140
tcatggccct tacgggctgg gctacacacg tgctacaatg gcggtgacag tgggaagcga  1200
actcgcgagg gtaagcaaat ctccaaaagc cgtctcagtt cggattgcac tctgcaactc  1260
gagtgcatga agttggaatc gctagtaatc gtggatcagc atgccacggt gaatacgttc  1320
ccgggccttg tacacaccgc ccgtcacacc atgggagttg gttttacccg aaggcgctgc  1380
gctaactcag caatgagagg caggcgacca cggtagggtc agcgactggg gtgaagtcgt  1440
aacaaggtag ccgtagggga acctgcggct ggatcacctc cttt                  1484

SEQ ID NO: 7           moltype = DNA  length = 1487
FEATURE                Location/Qualifiers
source                 1..1487
                       mol_type = genomic DNA
                       note = Nostoc sp. NIES-4103
                       organism = Nostoc sp.
SEQUENCE: 7
aatggagagt ttgatcctgg ctcaggatga acgctggcgg tatgcttaac acatgcaagt  60
cgaacggtgt tttcggacac agtggcggac gggtgagtaa cgcgtgagaa tctggctcta  120
ggtcggggac aaccactgga aacggtggct aataccggat gtgccgagag gtgaaaggct  180
tgctgcctag agatgagctc gcgtctgatt agctagtagg tggggtaaga gcctacctag  240
gcgacgatca gtagctggtc tgagaggatg atcagccaca ctgggactga gacacggccc  300
agactcctac gggaggcagc agtggggaat tttccgcaat gggcgaaagc ctgacggagc  360
aataccgcgt gagggaggaa ggctcttggg ttgtaaacct cttttctcag ggaagaacac  420
aatgacggta cctgaggaat cagcatcggc taactccgtg ccagcagccg cggtaatacg  480
gaggatgcaa gcgttatccg gaatgattgg gcgtaaagcg tccgcaggtg gctatgtaag  540
tctgctgtta aagagtgagg ctcaacctca taagagcagt ggaaactaca tagctagagt  600
gcgttcgggg cagagggaat tcctggtgta gcggtgaaat gcgtagatat caggaagaac  660
accggtggcg aaagcgctct gctaggccgc aactgacact gagggacgaa agctagggga  720
gcgaatggga ttagataccc cagtagtcct agccgtaaac gatggatact aggcgtggct  780
tgtatcgacc cgagccgtgc cgtagctaac gcgttaagta tcccgcctgg ggagtacgca  840
cgcaagtgtg aaactcaaag gaattgacgg gggcccgcac aagcggtgga gtatgtggtt  900
taattcgatg caacgcgaag aaccttacca agacttgaca tgtcgcgaac tttcctgaaa  960
gggagaggtg ccttcgggag cgcgaacaca ggtggtgcat ggctgtcgtc agctcgtgtc  1020
gtgagatgtt gggttaagtc ccgcaacgag cgcaaccctc gtttttagtt gccagcatta  1080
agttgggcac tctagagaga ctgccggtga caaaccggag gaaggtgggg atgacgtcaa  1140
gtcagcatgc cccttacgtc ttgggctaca cacgtactac aatgctacgg acagagggca  1200
gcaagccggc aacggcaagc aaatcccgaa aaccgtagct cagttcagat cgcaggctgc  1260
aactcgcctg cgtgaaggag gaatcgctag taattgcagg tcagcatact gcagtgaatt  1320
cgttcccggg ccttgtacac accgcccgtc acaccatgga agctggcaac gcccgaagtc  1380
attactccaa cgattcgtcg gggaggatgc ctaaggcagt gctggtgact ggggtgaagt  1440
cgtaacaagg tagccgtacc ggaaggtgtg gctggatcac ctccttt               1487

SEQ ID NO: 8           moltype = DNA  length = 1529
FEATURE                Location/Qualifiers
source                 1..1529
                       mol_type = genomic DNA
                       organism = Cupriavidus plantarum
SEQUENCE: 8
ctgaagagtt tgatcctggc tcagattgaa cgctggcggc atgccttaca catgcaagtc  60
gaacggcagc gcggacttcg gtctggcggc gagtggcgaa cgggtgagta atacatcgga  120
acgtgccctg ttgtggggga taactagtcg aaagattagc taataccgca tacgacctga  180
gggtgaaagc gggggaccgt aaggcctcgc gcaataggag cggccgatgt ctgattagct  240
agttggtggg gtaaaggccc accaaggcga cgatcagtag ctggtctgag aggacgatca  300
gccacactgg gactgagaca cggcccagac tcctacggga ggcagcagtg gggaattttg  360
gacaatgggg gcaaccctga tccagcaatg ccgcgtgtgt gaagaaggcc ttcgggttgt  420
aaagcacttt tgtccggaaa gaaatcgcgt tggataatac ctgacgtgga tgacggtacc  480
ggaagaataa gcaccggcta actacgtgcc agcagccgcg gtaatacgta gggtgcgagc  540
gttaatcgga attactgggc gtaaagcgtg cgcaggcggt tttgtaagac aggcgtgaaa  600
tccccgggct caacctggga attgcgcttg tgactgcaag gctagagtgc gtcagagggg  660
ggtagaattc cacgtgtagc agtgaaatgc gtagagatgt ggaggaatac cgatggcgaa  720
ggcagccccc tgggacgtga ctgacgctca tgcacgaaag cgtggggagc aaacaggatt  780
agataccctg gtagtccacg ccctaaacga tgtcaactag ttgttgggga ttcatttcct  840
cagtaacgta gctaacgcgt gaagttgacc gcctggggag tacggtcgca agattaaaac  900
tcaaaggaat tgacggggac ccgcacaagc ggtggatgat gtggattaat tcgatgcaac  960
gcgaaaaacc ttacctaccc ttgacatgcc actaacgaag cagagatgca ttaggtgccc  1020
```

```
gaaagggaaa gtggacacag gtgctgcatg gctgtcgtca gctcgtgtcg tgagatgttg  1080
ggttaagtcc cgcaacgagc gcaacccttg tctttagttg ctacgcaaga gcactctaga  1140
gagactgccg gtgacaaacc ggaggaaggt ggggatgacg tcaagtcctc atggccctta  1200
tgggtagggc ttcacacgtc atacaatggt gcatacagag ggttgccaac ccgcgagggg  1260
gagctaatcc cagaaaatgc atcgtagtcc ggatcgtagt ctgcaactcg actacgtgaa  1320
gctggaatcg ctagtaatcg cggatcagca tgccgcggtg aatacgttcc cgggtcttgt  1380
acacaccgcc cgtcacacca tgggagtggg ttttgccaga agtagttagc ctaaccgcaa  1440
ggagggcgat taccacggca gggttcatga ctggggtgaa gtcgtaacaa ggtagccgta  1500
tcggaaggtg cggctggatc acctcctt                                      1529

SEQ ID NO: 9          moltype = DNA  length = 1533
FEATURE               Location/Qualifiers
source                1..1533
                      mol_type = genomic DNA
                      note = Pseudomonas sp. NFR16
                      organism = Pseudomonas sp.
SEQUENCE: 9
ctgaagagtt tgatcatggc tcagattgaa cgctggcggc aggcctaaca catgcaagtc  60
gagcggatga agggagcttg ctccctgatt cagcggcgga cgggtgagta atgcctagga  120
atctgcctgg tagtggggga caacgtctcg aaagggacgc taataccgca tacgtcctac  180
gggagaaagc aggggacctt cggccttgc gctatcagat gagcctaggt cggattagct  240
agttggtgag gtaatggctc accaaggcga cgatccgtaa ctggtctgag aggatgatca  300
gtcacactgg aactgagaca cggtccagac tcctacggga ggcagcagtg gggaatattg  360
gacaatgggc gaaagcctga tccagccatg ccgcgtgtgt gaagaaggtc ttcggattgt  420
aaagcacttt aagttgggag gaagggttgt agattaatac tctgcaattt tgacgttacc  480
gacagaataa gcaccggcta actctgtgcc agcagccgcg gtaatacaga gggtgcaagc  540
gttaatcgga attactgggc gtaaagcgcg cgtaggtggt ttgttaagtt gaatgtgaaa  600
tccccgggct caacctggga actgcatcca aaactggcaa gctagagtag ggcagagggt  660
ggtggaattt cctgtgtagc ggtgaaatgc gtagatatag gaaggaacac cagtggcgaa  720
ggcgaccacc tgggctcata ctgacactga ggtgcgaaag cgtggggagc aaacaggatt  780
agataccctg gtagtccacg ccgtaaacga tgtcaactag ccgttgggag tcttgaactc  840
ttagtggcgc agctaacgca ttaagttgac cgcctgggga gtacggccgc aaggttaaaa  900
ctcaaatgaa ttgacggggg cccgcacaag cggtggagca tgtggtttaa ttcgaagcaa  960
cgcgaagaac cttaccaggc cttgacatcc agtgaactta ccagagatgg tttggtgcct  1020
tcgggaacac tgagacaggt gctgcatggc tgtcgtcagc tcgtgtcgtg agatgttggg  1080
ttaagtcccg taacgagcgc aacccttgtc cttagttacc agcacgttaa ggtgggcact  1140
ctaaggagac tgccggtgac aaaccggagg aaggtgggga tgacgtcaag tcatcatggc  1200
ccttacggcc tgggctacac acgtgctaca atggtcggta cagagggttg ccaagccgcg  1260
aggtggagct aatcccacaa aaccgatcgt agtccggatc gcagtctgca actcgactgc  1320
gtgaagtcgg aatcgctagt aatcgcgaat cagaatgtcg cggtgaatac gttcccgggc  1380
cttgtacaca ccgcccgtca caccatggga gtgggttgca ccagaagtag ctagtctaac  1440
cttcgggagg acggttacca cggtgtgatt catgactggg gtgaagtcgt aacaaggtag  1500
ccgtagggga acctgcggct ggatcacctc ctt                                1533

SEQ ID NO: 10         moltype = DNA  length = 1486
FEATURE               Location/Qualifiers
source                1..1486
                      mol_type = genomic DNA
                      note = Nostoc sp. strain PCC 73102
                      organism = Nostoc sp.
SEQUENCE: 10
acggagagtt tgatcctggc tcaggatgaa cgctggcggt atgcttaaca catgcaagtc  60
gaacggtgtc ttcggacaca gtggcggacg ggtgagtaac gcgtgagaat ctggctctag  120
gtctgggaca accactggaa acggtggcta ataccggatg tgccgagagg tgaaaggtta  180
actgcctaga gatgagctcg cgtctgatta gctagtaggt agtgtaatgg actacctagg  240
cgacgatcag tagctggtct gagaggacga tcagccacac tgggactgag acacggccca  300
gactcctacg ggaggcagca gtggggaatt ttccgcaatg ggcgaaagcc tgacggagca  360
ataccgcgtg agggaggaag gctcttgggt cgtaaacctc ttttctcagg gaagaacaca  420
atgacggtac ctgaggaata agcatcggct aactccgtgc cagcagccgc ggtaatacgg  480
aggatgcaag cgttatccgg aatgattggg cgtaaagcgt ccgcaggtgg caatgtaagt  540
ctgctgttaa agagtctagc tcaactagat acaagcagtg gaaactacat agctagagta  600
cgttcggggc agagggaatt cctggtgtag cggtgaaatg cgtagagatc aggaagaaca  660
ccggtggcga aggcgctctg ctaggccgta actgacactg agggacgaaa gctaggggag  720
cgaatgggat tagataccc agtagtccta gccgtaaacg atggatacta ggcgtggctt  780
gtatcgaccc gagccgtgcc gtagctaacg cgttaagtat cccgcctggg gagtacgccg  840
gcaacggtga aactcaaagg aattgacggg ggcccgcaca agcggtggag tatgtggttt  900
aattcgatgc aacgcgaaga accttaccaa ggcttgacat gtcgcgaatc ctggtgaaag  960
ccgggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctccgga cagagggcag  1200
caagcatgcg aatgcaagca aatcccgtaa accggagctc agttcagatc gcaggctgca  1260
actcgcctgc gtgaaggagg aatcgctagt aattgcaggt cagcatactg cagtgaattc  1320
gttcccgggc cttgtacaca ccgcccgtca caccatggaa gctggtagtg cccgaagtca  1380
ttactccaac ctttcgggga ggaggatgcc taaggcagga ctggtgactg gggtgaagtc  1440
gtaacaaggt agccgtaccg gaaggtgtgg ctggatcacc tccttt                  1486

SEQ ID NO: 11         moltype = DNA  length = 1531
FEATURE               Location/Qualifiers
```

```
source                1..1531
                      mol_type = genomic DNA
                      note = Variovorax sp. PMC12
                      organism = Variovorax sp.
SEQUENCE: 11
tatagagttt gatcctggct cagattgaac gctggcggca tgccttacac atgcaagtcg  60
aacggcagcg cgggagcaat cctggcggcg agtggcgaac gggtgagtaa tacatcggaa  120
cgtgcccaat cgtgggggat aacgcagcga aagctgtgct aataccgcat acgatctacg  180
gatgaaagca ggggatcgca agaccttgcg cgaatggagc ggccgatggc agattaggta  240
gttggtgagg taaaggctca ccaagccttc gatctgtagc tggtctgaga ggacgaccag  300
ccacactggg actgagacac ggcccagact cctacgggag gcagcagtgg ggaattttgg  360
acaatgggcg caagcctgat ccagccatgc cgcgtgcagg atgaaggcct tcgggttgta  420
aactgctttt gtacggaacg aaacggctct ttctaataaa gagggctaat gacggtaccg  480
taagaataag caccggctaa ctacgtgcca gcagccgcgg taatacgtag ggtgcaagcg  540
ttaatcggaa ttactgggcg taaagcgtgc gcaggcggtg atgtaagaca gttgtgaaat  600
ccccgggctc aacctgggaa ctgcatctgt gactgcatcg ctggagtacg gcagaggggg  660
atggaattcc gcgtgtagca gtgaaatgcg tagatatgcg gaggaacacc gatggcgaag  720
gcaatcccct gggcctgtac tgacgctcat gcacgaaagc gtggggagca aacaggatta  780
gataccctgg tagtccacgc cctaaacgat gtcaactggt tgttgggtct tcactgactc  840
agtaacgaag ctaacgcgtg aagttgaccg cctggggagt acggccgcaa ggttgaaact  900
caaaggaatt gacggggacc cgcacaagcg gtggatgatg tggtttaatt cgatgcaacg  960
cgaaaaacct tacccacctt tgacatgtac ggaatttgcc agagatggct tagtgctcga  1020
aagagaaccg taacacaggt gctgcatggc tgtcgtcagc tcgtgtcgtg agatgttggg  1080
ttaagtcccg caacgagcgc aacccttgtc attagttgct acattcagtt gggcactcta  1140
atgagactgc cggtgacaaa ccggaggaag gtggggatga cgtcaagtcc tcatggccct  1200
tataggtggg gctacacacg tcatacaatg gctggtacaa agggttgcca acccgcgagg  1260
gggagctaat cccataaaac cagtcgtagt ccggatcgca gtctgcaact cgactgcgtg  1320
aagtcggaat cgctagtaat cgtggatcag aatgtcacgg tgaatacgtt cccgggtctt  1380
gtacacaccg cccgtcacac catgggagcg ggttctgcca gaagtagtta gcttaaccgc  1440
aaggagggcg attaccacgg cagggttcgt gactggggtg aagtcgtaac aaggtagccg  1500
tatcggaagg tgcggctgga tcacctcctt t                                 1531

SEQ ID NO: 12         moltype = DNA  length = 1479
FEATURE               Location/Qualifiers
source                1..1479
                      mol_type = genomic DNA
                      note = uncultured bacterium
                      organism = unidentified
SEQUENCE: 12
ctgaagagtt tgatcctggc tcagattgaa cgctggcggc atgccttaca catgcaagtc  60
gaacggcagc gcggggcaac ctggcggcga gtggcgaacg ggtgagtaat atatcggaac  120
ataccctaga gtgggggata acgtagcgaa agttacgcta ataccgcata cgcactaagg  180
tggaaagcgg gggatcgcaa gacctcgtgc tcatggagtg gccgatatct gattagctag  240
ttggtagggt aaaagcctac caaggcgacg atcagtagct ggtttgagag aacgaccagc  300
cacactggaa ctgagacacg gtccagactc ctacgggagg cagcagtggg gaattttgga  360
caatgggggc aaccctgatc cagcaatgcc gcgtgagtga agaaggccct cgggttgtaa  420
agctcttttg tcagggaaga aacggtctac tctaatacag tgggctaatg acggtacctg  480
aagaataagc accggctaac tacgtgccag cagccgcggt aatacgtagg gtgcaagcgt  540
taatcggaat tactgggcgt aaagcgtgcg caggcggttt tataagtctg atgtgaaatc  600
cccgggctca acctgggaac tgcattggag actgtaaggc tagagtgtgt cagagggggg  660
tagaattcca cgtgtagcag tgaaatgcgt agatatgtgg aggaataccg atggcgaagg  720
cagcccccctg ggataacact gacgctcatg cacgaaagcg tggggagcaa acaggattag  780
ataccctggt agtccacgcc ctaaacgatg tctactagtt gtcgggtctt aattgacttg  840
gtaacgcagc taacgcgtga agtagaccgc ctggggagta cggtcgcaag attaaaactc  900
aaaggaattg acggggaccc gcacaagcgg tggatgatgt ggattaattc gatgcaacgc  960
gaaaaacctt acctaccctt gacatggaag gaatcccgaa gagatttggg agtgctcgaa  1020
agagaacctt tacacaggtg ctgcatggct gtcgtcagct cgtgtcgtga gatgttgggt  1080
taagtcccgc aacgagcgca acccttgtca ttagttgcta cgaaagggca ctctaatgag  1140
actgccggtg acaaaccgga ggaaggtggg gatgacgtca agtcctcatg gcccttatgg  1200
gtagggcttc acacgtcata caatggtaca tacagagggc cgccaacccg cgagggggag  1260
ctaatcccag aaagtgtatc gtagtccgga ttgtagtctg caactcgact acatgaagtt  1320
ggaatcgcta gtaatcgcgg atcagcatgt cgcggtgaat acgttcccgg gtcttgtaca  1380
caccgcccgt cacaccatgg gagcgggttc tgccagaagt agttagctta accgcaagga  1440
gggcgattac cacggcaggg ttcgtgactg ggtgaagt                          1479

SEQ ID NO: 13         moltype = DNA  length = 1486
FEATURE               Location/Qualifiers
source                1..1486
                      mol_type = genomic DNA
                      note = Nostoc sp. strain PCC 73102
                      organism = Nostoc sp.
SEQUENCE: 13
acggagagtt tgatcctggc tcaggatgaa cgctggcggt atgcttaaca catgcaagtc  60
gaacggtgtc ttcggacaca gtggcggacg ggtgagtaac gcgtgagaat ctggctctag  120
gtctgggaca accactggaa acggtggcta ataccggatg tgccgagagg tgaaaggtta  180
actgcctaga gatgagctcg cgtctgatta gctagtaggt agtgtaatgg actacctagg  240
cgacgatcag tagctggtct gagaggacga tcagccacac tgggactgag acacggccca  300
gactcctacg ggaggcagca gtggggaatt ttccgcaatg ggcgaaagcc tgacggagca  360
ataccgcgtg agggaggaag gctcttgggt cgtaaacctc ttttctcagg gaagaacaca  420
```

```
atgacggtac ctgaggaata agcatcggct aactccgtgc cagcagccgc ggtaatacgg  480
aggatgcaag cgttatccgg aatgattggg cgtaaagcgt ccgcaggtgg caatgtaagt  540
ctgctgttaa agagtctagc tcaactagat acaagcagtg gaaactacat agctagagta  600
cgttcggggc agagggaatt cctggtgtag cggtgaaatg cgtagagatc aggaagaaca  660
ccggtggcga aggcgctctg ctaggccgta actgacactg agggacgaaa gctaggggag  720
cgaatgggat tagataccc agtagtccta gccgtaaacg atggatacta ggcgtggctt  780
gtatcgaccc gagccgtgcc gtagctaacg cgttaagtat cccgcctggg gagtacgccg  840
gcaacggtga aactcaaagg aattgacggg ggcccgcaca agcggtggag tatgtggttt  900
aattcgatgc aacgcgaaga accttaccaa ggcttgacat gtcgcgaatc ctggtgaaag  960
ccgggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctccgga cagagggcag  1200
caagcatgcg aatgcaagca aatcccgtaa accggagctc agttcagatc gcaggctgca  1260
actcgcctgc gtgaaggagg aatcgctagt aattgcaggt cagcatactg cagtgaattc  1320
gttcccgggc cttgtacaca ccgcccgtca caccatggaa gctggtagtg cccgaagtca  1380
ttactccaac ctttcgggga ggaggatgcc taaggcagga ctggtgactg ggtgaagtc  1440
gtaacaaggt agccgtaccg gaaggtgtgg ctggatcacc tccttt                 1486

SEQ ID NO: 14          moltype = DNA  length = 1531
FEATURE                Location/Qualifiers
source                 1..1531
                       mol_type = genomic DNA
                       note = Variovorax sp. PMC12
                       organism = Variovorax sp.
SEQUENCE: 14
tatagagttt gatcctggct cagattgaac gctggcggca tgccttacac atgcaagtcg  60
aacggcagcg cgggagcaat cctggcggcg agtggcgaac gggtgagtaa tacatcggaa  120
cgtgcccaat cgtgggggat aacgcagcga aagctgtgct aataccgcat acgatctacg  180
gatgaaagca ggggatcgca agaccttgcg cgaatggagc ggccgatggc agattaggta  240
gttggtgagg taaaggctca ccaagccttc gatctgtagc tggtctgaga ggacgaccag  300
ccacactggg actgagacac ggcccagact cctacgggag gcagcagtgg ggaattttgg  360
acaatgggcg caagcctgat ccagccatgc cgcgtgcagg atgaaggcct tcgggttgta  420
aactgctttt gtacggaacg aaacggctct ttctaataaa gagggctaat gacggtaccg  480
taagaataag caccggctaa ctacgtgcca gcagccgcgg taatacgtag ggtgcaagcg  540
ttaatcggaa ttactgggcg taaagcgtgc gcaggcggtg atgtaagaca gttgtgaaat  600
ccccgggctc aacctgggaa ctgcatctgt gactgcatcg ctggagtacg gcagaggggg  660
atggaattcc gcgtgtagca gtgaaatgcg tagatatgcg gaggaacacc gatggcgaag  720
gcaatcccct gggcctgtac tgacgctcat gcacgaaagc gtggggagca aacaggatta  780
gataccctgg tagtccacgc cctaaacgat gtcaactggt tgttgggtct tcactgactc  840
agtaacgaag ctaacgcgtg aagttgaccg cctggggagt acggccgcaa ggttgaaact  900
caaaggaatt gacggggacc cgcacaagcg gtggatgatg tggtttaatt cgatgcaacg  960
cgaaaaacct tacccacctt tgacatgtac ggaatttgcc agagatggct tagtgctcga  1020
aagagaaccg taacacaggt gctgcatggc tgtcgtcagc tcgtgtcgtg agatgttggg  1080
ttaagtcccg caacgagcgc aacccttgtc attagttgct acattcagtt gggcactcta  1140
atgagactgc cggtgacaaa ccggaggaag gtggggatga cgtcaagtcc tcatggccct  1200
tataggtggg gctacacacg tcatacaatg gctggtacaa agggttgcca acccgcgagg  1260
gggagctaat cccataaaac cagtcgtagt ccggatcgca gtctgcaact cgactgcgtg  1320
aagtcggaat cgctagtaat cgtggatcag aatgtcacgg tgaatacgtt cccgggtctt  1380
gtacacaccg cccgtcacac catgggagcg ggttctgcca gaagtagtta gcttaaccgc  1440
aaggagggcg attaccacgg cagggttcgt gactggggtg aagtcgtaac aaggtagccg  1500
tatcggaagg tgcggctgga tcacctcctt t                                1531

SEQ ID NO: 15          moltype = DNA  length = 1486
FEATURE                Location/Qualifiers
source                 1..1486
                       mol_type = genomic DNA
                       note = Novosphingobium sp. F2
                       organism = Novosphingobium sp.
SEQUENCE: 15
cttgagagtt tgatcctggc tcagaacgaa cgctggcggc atgcctaaca catgcaagtc  60
gaacgagatc ttcggatcta gtggcgcacg ggtgcgtaac gcgtgggaat ctgcccttgg  120
gttcggaata acagtgagaa attactgcta ataccggatg atgtcttcgg accaaagatt  180
tattgcccag ggatgagccc gcgtaggatt agctagttgg tggggtaatg gcctaccaag  240
gcgacgatcc ttagctggtc tgagaggatg atcagccaca ctgggactga gacacggccc  300
agactcctac gggaggcagc agtggggaat attggacaat gggcgaaagc ctgatccagc  360
aatgccgcgt gagtgatgaa ggccttaggg ttgtaaagct cttttaccag ggatgataat  420
gacagtacct ggagaataag ctccggctaa ctccgtgcca gcagccgcgg taatacggag  480
ggagctagcg ttgttcggaa ttactgggcg taaagcgcgc gtaggcggtt actcaagtca  540
gaggtgaaag cccggggctc aaccccggaa ctgcctttga aactaggtga ctagaatctt  600
ggagaggtca gtggaattcc gagtgtagag gtgaaattcg tagatattcg gaagaacacc  660
agtggcgaag gcgactgact ggacaagtat tgacgctgag gtgcgaaagc gtggggagca  720
aacaggatta gataccctgg tagtccacgc cgtaaacgat gataactagc tgtccgggta  780
cttggtactt gggtggcgca gctaacgcat taagttatcc gcctggggag tacggtcgca  840
agattaaaac tcaaaggaat tgacgggggc ctgcacaagc ggtggagcat gtggtttaat  900
tcgaagcaac gcgcagaacc ttaccagcgt ttgacatcct catcgcggat ttgagagatc  960
atttccttca gttcggctgg atgagtgaca ggtgctgcat ggctgtcgtc agctcgtgtc  1020
gtgagatgtt gggttaagtc ccgcaacgag cgcaaccctc gtccttagtt gccatcattt  1080
ggttgggcac tctaaggaaa ctgccggtga taagccggag gaaggtgggg atgacgtcaa  1140
```

```
gtcctcatgg cccttacacg ctgggctaca cacgtgctac aatggcggtg acagtgggca  1200
gcaagcacgc gagtgtgagc taatctccaa aagccgtctc agttcggatt gttctctgca  1260
actcgagagc atgaaggcgg aatcgctagt aatcgcggat cagcatgccg cggtgaatac  1320
gttcccaggc cttgtacaca ccgcccgtca caccatggga gttggattca cccgaaggcg  1380
ctgcgttaac ccgcaaggga gacaggcgac cacggtgggt ttagcgactg ggtgaagtc   1440
gtaacaaggt agccgtaggg gaacctgcgg ctggatcacc tccttt                  1486

SEQ ID NO: 16           moltype = DNA  length = 1533
FEATURE                 Location/Qualifiers
source                  1..1533
                        mol_type = genomic DNA
                        note = Pseudomonas sp. NFR16
                        organism = Pseudomonas sp.
SEQUENCE: 16
ctgaagagtt tgatcatggc tcagattgaa cgctggcggc aggcctaaca catgcaagtc  60
gagcggatga agggagcttg ctccctgatt cagcggcgga cgggtgagta atgcctagga  120
atctgcctgg tagtggggga caacgtctcg aaagggacgc taataccgca tacgtcctac  180
gggagaaagc aggggacctt cgggccttgc gctatcagat gagcctaggt cggattagct  240
agttggtgag gtaatggctc accaaggcga cgatccgtaa ctggtctgag aggatgatca  300
gtcacactgg aactgagaca cggtccagac tcctacggga ggcagcagtg gggaatattg  360
gacaatgggc gaaagcctga tccagccatg ccgcgtgtgt gaagaaggtc ttcggattgt  420
aaagcacttt aagttgggag gaagggttgt agattaatac tctgcaattt tgacgttacc  480
gacagaataa gcaccggcta actctgtgcc agcagccgcg gtaatacaga gggtgcaagc  540
gttaatcgga attactgggc gtaaagcgcg cgtaggtggt ttgttaagtt gaatgtgaaa  600
tccccgggct caacctggga actgcatcca aaactggcaa gctagagtag ggcagagggt  660
ggtggaattt cctgtgtagc ggtgaaatgc gtagatatag gaaggaacac cagtggcgaa  720
ggcgaccacc tgggctcata ctgacactga ggtgcgaaag cgtggggagc aaacaggatt  780
agataccctg gtagtccacg ccgtaaacga tgtcaactag ccgttgggag tcttgaactc  840
ttagtggcgc agctaacgca ttaagttgac cgcctgggga gtacggccgc aaggttaaaa  900
ctcaaatgaa ttgacggggg cccgcacaag cggtggagca tgtggtttaa ttcgaagcaa  960
cgcgaagaac cttaccaggc cttgacatcc agtgaactta ccagagatgg tttggtgcct  1020
tcgggaacac tgagacaggt gctgcatggc tgtcgtcagc tcgtgtcgtg agatgttggg  1080
ttaagtcccg taacgagcgc aacccttgtc cttagttacc agcacgttaa ggtgggcact  1140
ctaaggagac tgccggtgac aaaccggagg aaggtgggga tgacgtcaag tcatcatggc  1200
ccttacggcc tgggctacac acgtgctaca atggtcggta cagagggttg ccaagccgcg  1260
aggtggagct aatcccacaa aaccgatcgt agtccggatc gcagtctgca actcgactgc  1320
gtgaagtcgg aatcgctagt aatcgcgaat cagaatgtcg cggtgaatac gttcccgggc  1380
cttgtacaca ccgcccgtca caccatggga gtgggttgca ccagaagtag ctagtctaac  1440
cttcgggagg acggttacca cggtgtgatt catgactggg gtgaagtcgt aacaaggtag  1500
ccgtagggga acctgcggct ggatcacctc ctt                                1533

SEQ ID NO: 17           moltype = DNA  length = 1511
FEATURE                 Location/Qualifiers
source                  1..1511
                        mol_type = genomic DNA
                        note = uncultured bacterium
                        organism = unidentified
SEQUENCE: 17
atggagagtt tgatcctggc tcaggatgaa cgctagcggc aggcctaata catgcaagtc  60
gaaggggcag caatgtcact ggcgcacggg tgcgtaacac gtttggaatc tgcctcatat  120
tgggggatag cccgccgaaa ggcggattaa taccgcatat gccgatggtc tggcatcaga  180
cagtcgggaa aggtcgcaag gccgatatga gatgaccatg cgtctgatta gctagttggc  240
ggggtaaagg cccaccaagg cgacgatcag taggggacct gagagggcga tcccccacac  300
ggacactgag atacgggtcc gactcctacg ggaggcagca gtagggaata ttgggcaatg  360
ggcgcaagcc tgacccagcc atgccgcgtg caggaagaag gccctctggg ttgtaaactg  420
cttttgacgg ggaagaaacg actcttgcga gaggcattga cggtacccgc agaataagca  480
ccggctaact ccgtgccagc agccgcggta atacggaggg tgcaagcgtt gtccggattt  540
attgggttta aagggtgcgt aggcggtctg gtaagtcggc gatgaaagcc cggggctcaa  600
ccccggaact gtcgtcgata ctgttggact tgagtacggt tgaggctggc ggaatgggcg  660
gtgtagcggt gaaatgcata gataccgtcc agaaccccga ttgcgaaggc agctggctaa  720
gccgtaactg acgctgaggc acgaaagcgt ggggagcgaa caggattaga taccctggta  780
gtccacgccg taaacgatgg atactcgccg tgggcaatag atcgtccgcg gctcagcgaa  840
agcggtaagt atcccacctg gggagtacgc cggcaacggt gaaactcaaa ggaattgacg  900
ggggcccgca caagtggtgg agcatgtggt ttaattcgat gatacgcgag gaaccttacc  960
tgggctagaa tgtgcgtgaa ggcatcagaa atggtgctgt ccttcgggac acaaaacaag  1020
gtgctgcatg gccgtcgtca gctcgtgccg tgaggtgttg ggttaagtcc cgcaacgagc  1080
gcaaccccta catttagttg ccagcgcgtc aaggcgggga ctctagatgg actgcctccg  1140
caaggagtga ggaaggcggg gacgacgtca ggtcatcatg gcccttacgc ccagggctac  1200
acacgtgcta caatggccgg tacagcgggt tgcgacacag cgatgtgaag ccaatctctc  1260
taaagccggt ctcagttcgg atcggagtct gcaactcgac tccgtgaagc tggaatcact  1320
agtaatcgcg tatcagcaat gacgcggtga atacgttccc gggccttgta cacaccgccc  1380
gtcaagccat ggaagttcgg tggacctgaa gacggtgcgc gtcacagcag ccgtttaggg  1440
taaaacgagt aactagggct aagtcgtaac aaggtagccg taccggaagg tgcggctgga  1500
tcacctcctt t                                                        1511

SEQ ID NO: 18           moltype = DNA  length = 1478
FEATURE                 Location/Qualifiers
source                  1..1478
                        mol_type = genomic DNA
```

```
                         note = metagenome
                         organism = unidentified
SEQUENCE: 18
ttgaagagtt tgatcatggc tcagactgaa cgctggcggc atggctaaag catgcaagtc  60
gaacgagccc gcaagggcaa gtggcggacg ggttagtaat acgatcgaac gtaccccgaa  120
gtgggggata gcggtgggaa actgccggta ataccccatg tgctcttcgg aggaaagatt  180
tatcgctttg ggatcggcga tcgtcctatc aggtagttgg cggggtaaaa gcccaccaag  240
ccgaagacgg gtagcaggtg tgagagcacg acctgcaaca tcggaactga gatactgtcc  300
ggactcctac gggaggctgc agcaacgaat cttccgcaat gggcgcaagc ctgacggagc  360
aatgccgcgt gtgggatgaa gtgcctccgg catgtaaacc actgtcagag agcagaaaca  420
ctgattgctc tcaaaggaag tggcgactaa ctctgtgcca gcagtcgcgg taatacagag  480
gccacgagcg ttagtcggaa ttactgggct taaagggtgc gtaggctgtc cttcaagcgt  540
cctgtgaaag cctcccgctc aacgggagaa cagcagggcg aactggatga ctcgaggttg  600
gtaggggctc acagaacagt cggtggaccg gtgaaatggg tagagatcga ctggaatgcc  660
gatggcgaag gcggtgagct gggccaattc tgacgctgag gcacgaaagc gtggggagca  720
aacaggatta gataccctgg tagtccacgc cgtaaacgat gtacgctaga tcggtgcggt  780
tttgacgccg tatcggtcga cgtgaaaacg ataagcgtac cgcctgggga gtacggtcgc  840
aaggctaaaa ctcaaatgaa ttgacggggg ctcacacaag cggtggagca tgttgcttaa  900
ttcgaggcaa cgcgaagaac cttacctggg cttgacatgg ccggattaag tctatgaaag  960
tagatgtagg cccgcaaggg tacaacggtc acaggtgctg catggctgtc gtcagctcgt  1020
gctgtgaagc gtcgggttaa gtcctctaac gagcgcaacc cctatcgtta gttgctcagc  1080
gcaagctagt actctagcga gactgccggt gtcaaaccgg aggaaggtgg ggatgacgtc  1140
aagtcctcat ggcccttacg cccagggttg caaacgtgct acaatggtgc gcacaaagcg  1200
atgcaagaac gcaagttgga gcaaatcgca aaaaacgcac cccagttcgg attgcaggct  1260
gcaacccgcc tgcatgaagt cggaatcgct agtaatcgga gatcagctac gctccggtga  1320
atgtgttcct gagccttgta cacaccgccc gtcacgtcat gggagcccgg ggtgcccgaa  1380
gccgccattc ttcagtggtg tctacggcaa aacgggtgac tgggacgaag tcgtaacaag  1440
gtagccgtag gagaacctgc ggctggatca cctccttt                          1478

SEQ ID NO: 19            moltype = DNA  length = 1486
FEATURE                  Location/Qualifiers
source                   1..1486
                         mol_type = genomic DNA
                         note = Nostoc sp. strain PCC 73102
                         organism = Nostoc sp.
SEQUENCE: 19
acggagagtt tgatcctggc tcaggatgaa cgctggcggt atgcttaaca catgcaagtc  60
gaacggtgtc ttcggacaca gtggcggacg ggtgagtaac gcgtgagaat ctggctctag  120
gtctgggaca accactggaa acggtggcta ataccggatg tgccgagagg tgaaaggtta  180
actgcctaga gatgagctcg cgtctgatta gctagtaggt agtgtaatgg actacctagg  240
cgacgatcag tagctggtct gagaggacga tcagccacac tgggactgag acacggccca  300
gactcctacg ggaggcagca gtggggaatt ttccgcaatg ggcgaaagcc tgacggagca  360
ataccgcgtg agggaggaag gctcttgggt cgtaaacctc ttttctcagg gaagaacaca  420
atgacggtac ctgaggaata agcatcggct aactccgtgc cagcagccgc ggtaatacgg  480
aggatgcaag cgttatccgg aatgattggg cgtaaagcgt ccgcaggtgg caatgtaagt  540
ctgctgttaa agagtctagc tcaactagat acaagcagtg gaaactacat agctagagta  600
cgttcggggc agagggaatt cctggtgtag cggtgaaatg cgtagagatc aggaagaaca  660
ccggtggcga aggcgctctg ctaggccgta actgacactg agggacgaaa gctaggggag  720
cgaatgggat tagatacccc agtagtccta gccgtaaacg atggatacta ggcgtggctt  780
gtatcgaccc gagccgtgcc gtagctaacg cgttaagtat cccgcctggg gagtacgccg  840
gcaacggtga aactcaaagg aattgacggg ggcccgcaca agcggtggag tatgtggttt  900
aattcgatgc aacgcgaaga accttaccaa ggcttgacat gtcgcgaatc ctggtgaaag  960
ccgggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tggctacac acgtactaca atgctccgga cagagggcag  1200
caagcatgcg aatgcaagca aatcccgtaa accggagctc agttcagatc gcaggctgca  1260
actcgcctgc gtgaaggagg aatcgctagt aattgcaggt cagcatactg cagtgaattc  1320
gttcccgggc cttgtacaca ccgcccgtca caccatggaa gctggtagtg cccgaagtca  1380
ttactccaac ctttcgggga ggaggatgcc taaggcagga ctggtgactg gggtgaagtc  1440
gtaacaaggt agccgtaccg gaaggtgtgg ctggatcacc tccttt                1486

SEQ ID NO: 20            moltype = DNA  length = 1486
FEATURE                  Location/Qualifiers
source                   1..1486
                         mol_type = genomic DNA
                         note = Bosea sp. RAC05
                         organism = Bosea sp.
SEQUENCE: 20
tctgagagtt tgatcctggc tcagagcgaa cgctggcggc aggcttaaca catgcaagtc  60
gaacgggtac cttcgggtgc tagtggcaga cgggtgagta acacgtggga acgtaccttt  120
cggttcggaa taatacaggg aaacttgtac taataccgga tacgcccttc gggggaaaga  180
tttatcgccg atagatcggc ccgcgtctga ttagctagtt ggtgaggtaa tggctcacca  240
aggcgacgat cagtagctgg tctgagagga tgatcagcca cactgggact gagacacggc  300
ccagactcct acgggaggca gcagtgggga atattggaca atgggcgaaa gcctgatcca  360
gccatgccgc gtgtgtgatg aaggccttag ggttgtaaag cacttttgtc cgggaagata  420
atgactgtac cggaagaata agccccggct aacttcgtgc cagcagccgc ggtaatacga  480
agggggctag cgttgctcgg aatcactggg cgtaaagggc gcgtaggcgg actcttaagt  540
cgggggtgaa agcccagggc tcaaccctgg aattgccttc gatactgaga gtcttgagtt  600
```

```
cggaagaggt tggtggaact gcgagtgtag aggtgaaatt cgtagatatt cgcaagaaca  660
ccagtggcga aggcggccaa ctggtccgat actgacgctg aggcgcgaaa gcgtggggag  720
caaacaggat tagataccct ggtagtccac gccgtaaacg atgaatgcca gccgttgggg  780
tgcatgcacc tcagtggcgc agctaacgct ttaagcattc cgcctgggga gtacggtcgc  840
aagattaaaa ctcaaaggaa ttgacggggg cccgcacaag cggtggagca tgtggtttaa  900
ttcgaagcaa cgcgcagaac cttaccagct tttgacatgt ccggtttgag gaacagagat  960
gtacctcttc agttcggctg gccggaacac aggtgctgca tggctgtcgt cagctcgtgt  1020
cgtgagatgt tgggttaagt cccgcaacga gcgcaaccct cgcccctagt tgccatcatt  1080
cagttgggaa ctctaggggg actgccggtg ataagccgcg aggaaggtgg ggatgacgtc  1140
aagtcctcat ggcccttaca ggctgggcta cacacgtgct acaatggcgg tgacaatggg  1200
cagcgatgga gcgatccggt gctaatccca aaaagccgtc tcagttcaga ttgcactctg  1260
caactcgagt gcatgaaggt ggaatcgcta gtaatcgtgg atcagcatgc cacggtgaat  1320
acgttcccgg gccttgtaca caccgcccgt cacaccatgg gagttgggtt tacccgaagg  1380
cgtcgcgcta accgcaagga ggcaggcgac cacggtaggc tcagcgactg gggtgaagtc  1440
gtaacaaggt agccgtaggg gaacctgcgg ctggatcacc tccttt                1486

SEQ ID NO: 21          moltype = DNA  length = 1479
FEATURE                Location/Qualifiers
source                 1..1479
                       mol_type = genomic DNA
                       note = uncultured bacterium
                       organism = unidentified
SEQUENCE: 21
ctgaagagtt tgatcctggc tcagattgaa cgctggcggc atgccttaca catgcaagtc  60
gaacggcagc gcggggcaac ctggcggcga gtggcgaacg ggtgagtaat atatcggaac  120
ataccctaga gtgggggata acgtagcgaa agttacgcta ataccgcata cgcactaagg  180
tggaaagcgg gggatcgcaa gacctcgtgc tcatggagtg gccgatatct gattagctag  240
ttggtagggt aaaagcctac caaggcgacg atcagtagct ggtttgagag aacgaccagc  300
cacactggaa ctgagacacg gtccagactc ctacgggagg cagcagtggg gaattttgga  360
caatgggggc aaccctgatc cagcaatgcc gcgtgagtga agaaggccct cgggttgtaa  420
agctcttttg tcagggaaga aacggtctac tctaatacag tgggctaatg acggtacctg  480
aagaataagc accggctaac tacgtgccag cagccgcggt aatacgtagg gtgcaagcgt  540
taatcggaat tactgggcgt aaagcgtgcg caggcggttt tataagtctg atgtgaaatc  600
cccgggctca acctgggaac tgcattggag actgtaaggc tagagtgtgt cagagggggg  660
tagaattcca cgtgtagcag tgaaatgcgt agatatgtgg aggaataccg atggcgaagg  720
cagccccctg ggataacact gacgctcatg cacgaaagcg tggggagcaa acaggattag  780
ataccctggt agtccacgcc ctaaacgatg tctactagtt gtcgggtctt aattgacttg  840
gtaacgcagc taacgcgtga agtagaccgc ctggggagta cggtcgcaag attaaaactc  900
aaaggaattg acggggaccc gcacaagcgg tggatgatgt ggattaattc gatgcaacgc  960
gaaaaacctt acctaccctt gacatggaag gaatcccgaa gagatttggg agtgctcgaa  1020
agagaacctt tacacaggtg ctgcatggct gtcgtcagct cgtgtcgtga gatgttgggt  1080
taagtcccgc aacgagcgca acccttgtca ttagttgcta cgaaagggca ctctaatgag  1140
actgccggtg acaaaccgga ggaaggtggg gatgacgtca agtcctcatg gcccttatgg  1200
gtagggcttc acacgtcata caatggtaca tacagagggc cgccaacccg cgagggggag  1260
ctaatcccag aaagtgtatc gtagtccgga ttgtagtctg caactcgact acatgaagtt  1320
ggaatcgcta gtaatcgcgg atcagcatgt cgcggtgaat acgttcccgg gtcttgtaca  1380
caccgcccgt cacaccatgg gagcgggttc tgccagaagt agttagctta accgcaagga  1440
gggcgattac cacggcaggg ttcgtgactg gggtgaagt                         1479

SEQ ID NO: 22          moltype = DNA  length = 1486
FEATURE                Location/Qualifiers
source                 1..1486
                       mol_type = genomic DNA
                       organism = Anabaena flosaquae
SEQUENCE: 22
acggagagtt tgatcctggc tcaggatgaa cgctggcggt atgcttaaca catgcaagtc  60
gaacggtgtc ttcggacata gtggcggacg ggtgagtaac gcgtgagaat ctagcttcag  120
gtctgggaca accactggaa acggtggcta ataccggatg tgccggaagg tgaaaggctt  180
gctgcctgaa gatgagctcg cgtccgatta gctagtaggt ggggtaagag cctacctagg  240
cgacgatcgg tagctggtct gagaggatga ccagccacac tgggactgag acacggccca  300
gactcctacg ggaggcagca gtggggaatt ttccgcaatg ggcgaaagcc tgacggagca  360
ataccgcgtg agggaggaag gctcttgggt tgtaaacctc ttttctcagg gaagaacaca  420
atgacggtac ctgaggaatc agcatcggct aactccgtgc cagcagccgc ggtaatacgg  480
aggatgcaag cgttatccgg aatgattggg cgtaaagcgt ccgcaggtgg ctgtgtaagt  540
ctgctgtcaa agagcaaagc tcaactttgt aaaggcagtg gaaactacac ggctagagtg  600
cgttcggggc agagggaatt cctggtgtag cggtgaaatg cgtagagatc aggaagaaca  660
ccggtggcga aggcgctctg ctaggccgca actgacactg agggacgaaa gctaggggag  720
cgaatgggat tagataccc agtagtccta gctgtaaacg atggatacta ggcgtggctt  780
gtatcgaccc gagccgtgcc gtagctaacg cgttaagtat cccgcctggg gagtacgcac  840
gcaagtgtga aactcaaagg aattgacggg ggcccgcaca agcggtggag tatgtggttt  900
aattcgatgc aacgcgaaga accttaccaa ggcttgacat gtcgcgaact cttctgaaag  960
gaagaggtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctacgga cagagggcag  1200
caagctagcg atagcaagct aatcccataa accgtggctc agttcagatc gaaggctgca  1260
actcgccttc gtgaaggagg aatcgctagt aattgcaggt cagcatactg cagtgaattc  1320
gttcccgggc cttgtacaca ccgcccgtca caccatggaa gctggcaacg cccgaagtca  1380
ttactccaac ctttcgaggg ggaggatgcc taaggcagtg ctggtgactg gggtgaagtc  1440
```

```
gtaacaaggt agccgtaccg gaaggtgtgg ctggatcacc tccttt                1486

SEQ ID NO: 23          moltype = DNA  length = 1484
FEATURE                Location/Qualifiers
source                 1..1484
                       mol_type = genomic DNA
                       note = Bosea sp. R-45681
                       organism = Bosea sp.
SEQUENCE: 23
tctgagagtt tgatcctggc tcagagcgaa cgctggcggc aggcttaaca catgcaagtc  60
gaacgggcac ttcggtgcta gtggcagacg ggtgagtaac acgtgggaac gtacctttcg  120
gttcggaata attcagggaa acttggacta ataccggata cgcccttcgg gggaaagatt  180
tatcgccgat agatcggccc gcgtctgatt agctagttgg tgaggtaatg gctcaccaag  240
gcgacgatca gtagctggtc tgagaggatg atcagccaca ttgggactga gacacggccc  300
aaactcctac gggaggcagc agtggggaat attggacaat gggcgcaagc ctgatccagc  360
catgccgcgt gagtgatgaa ggccttaggg ttgtaaagct cttttgtccg ggaagataat  420
gactgtaccg gaagaataag ccccggctaa cttcgtgcca gcagccgcgg taatacgaag  480
ggggctagcg ttgctcggaa tcactgggcg taaagggcgc gtaggcggac tcttaagtcg  540
ggggtgaaag cccagggctc aaccctggaa ttgccttcga tactgagagt cttgagttcg  600
gaagaggttg gtggaactgc gagtgtagag gtgaaattcg tagatattcg caagaacacc  660
agtggcgaag gcggccaact ggtccgatac tgacgctgag gcgcgaaagc gtggggagca  720
aacaggatta gataccctgg tagtccacgc cgtaaacgat gaatgccagc cgttggggtg  780
catgcacttc agtggcgcag ctaacgcttt aagcattccg cctggggagt acggtcgcaa  840
gattaaaact caaaggaatt gacgggggcc cgcacaagcg gtggagcatg tggtttaatt  900
cgaagcaacg cgcagaacct taccagcttt tgacatgtcc ggtttgatcg gcagagatgc  960
ctttcttcag ttcggctggc cggaacacag gtgctgcatg gctgtcgtca gctcgtgtcg  1020
tgagatgttg ggttaagtcc cgcaacgagc gcaaccctcg cccctagttg ccatcattca  1080
gttgggaact ctagggggac tgccggtgat aagccgcgag gaaggtgggg atgacgtcaa  1140
gtcctcatgg cccttacagg ctgggctaca cacgtgctac aatggcggtg acaatgggca  1200
gcgaaagggc gacctcgagc taatcccaaa aagccgtctc agttcagatt gtactctgca  1260
actcgagtac atgaaggtgg aatcgctagt aatcgtggat cagcatgcca cggtgaatac  1320
gttcccgggc cttgtacaca ccgcccgtca caccatggga gttgggttta cccgaaggcg  1380
tcgcgctaac cgcaaggagg caggcgacca cggtaggctc agcgactggg gtgaagtcgt  1440
aacaaggtag ccgtagggga acctgcggct ggatcacctc cttt                  1484

SEQ ID NO: 24          moltype = DNA  length = 1483
FEATURE                Location/Qualifiers
source                 1..1483
                       mol_type = genomic DNA
                       note = Caulobacter segnis ATCC 21756
                       organism = Caulobacter segnis
SEQUENCE: 24
cctgagagtt tgatcctggc tcagagcgaa cgctggcggc aggcctaaca catgcaagtc  60
gaacggatcc ttcgggatta gtggcggacg ggtgagtaac acgtgggaac gtgccctttg  120
gttcggaaca actcagggaa acttgagcta ataccggatg tgcccttcgg gggaaagatt  180
tatcgccatt ggagcggccc gcgtctgatt agctagttgg tgaggtaaag gctcaccaag  240
gcgacgatca gtagctggtc tgagaggatg atcagccaca ttgggactga gacacggccc  300
aaactcctac gggaggcagc agtggggaat cttgcgcaat gggcgaaagc ctgacgcagc  360
catgccgcgt gaatgatgaa ggtcttagga ttgtaaaatt ctttcaccgg ggacgataat  420
gacggtaccc ggagaagaag ccccggctaa cttcgtgcca gcagccgcgg taatacgaag  480
ggggctagcg ttgctcggaa ttactgggcg taaagggagc gtaggcggac tgttaagtta  540
gaggtgaaag cccagggctc aaccttggaa ttgcctttga tactggcagt cttgagtacg  600
gaagaggtat gtggaactcc gagtgtagag gtgaaattcg tagatattcg gaagaacacc  660
agtggcgaag gcgacatact ggtccgttac tgacgctgag gctcgaaagc gtggggagca  720
aacaggatta gataccctgg tagtccacgc cgtaaacgat gagtgctagt tgtcggcatg  780
catgcatgtc ggtgacgcag ctaacgcatt aagcactccg cctggggagt acggtcgcaa  840
gattaaaact caaaggaatt gacgggggcc cgcacaagcg gtggagcatg tggtttaatt  900
cgaagcaacg cgcagaacct taccaccttt tgacatgccc ggaccaccag agagatctgg  960
ctttcccttc ggggactggg acacaggtgc tgcatggctg tcgtcagctc gtgtcgtgag  1020
atgttgggtt aagtcccgca acgagcgcaa ccctcgcgat tagttgccat caggtttggc  1080
tgggcactct aatcgtactg ccggagttaa tccggaggaa ggcggggatg acgtcaagtc  1140
ctcatggccc ttacaaggtg ggctacacac gtgctacaat ggcgactaca gagggttgca  1200
atcccgcgag gggggagccaa tccctaaaag tcgtctcagt tcggattgtt ctctgcaact  1260
cgagagcatg aagttggaat cgctagtaat cgcggatcag catgccgcgg tgaatacgtt  1320
cccgggcctt gtacacaccg cccgtcacac catgggagtt ggctttaccc gaaggcgctg  1380
cgctaactcg caagagaggc aggcgaccac ggtagggtca gcgactgggg tgaagtcgta  1440
acaaggtagc cgtaggggaa cctgcggctg gatcacctcc ttt                   1483

SEQ ID NO: 25          moltype = DNA  length = 1484
FEATURE                Location/Qualifiers
source                 1..1484
                       mol_type = genomic DNA
                       note = Bosea sp. R-45681
                       organism = Bosea sp.
SEQUENCE: 25
tctgagagtt tgatcctggc tcagagcgaa cgctggcggc aggcttaaca catgcaagtc  60
gaacgggcac ttcggtgcta gtggcagacg ggtgagtaac acgtgggaac gtacctttcg  120
gttcggaata attcagggaa acttggacta ataccggata cgcccttcgg gggaaagatt  180
tatcgccgat agatcggccc gcgtctgatt agctagttgg tgaggtaatg gctcaccaag  240
```

```
gcgacgatca gtagctggtc tgagaggatg atcagccaca ttgggactga gacacggccc  300
aaactcctac gggaggcagc agtggggaat attggacaat gggcgcaagc ctgatccagc  360
catgccgcgt gagtgatgaa ggccttaggg ttgtaaagct cttttgtccg ggaagataat  420
gactgtaccg gaagaataag ccccggctaa cttcgtgcca gcagccgcgg taatacgaag  480
ggggctagcg ttgctcggaa tcactgggcg taaagggcgc gtaggcggac tcttaagtcg  540
gggtgaaag cccagggctc aaccctggaa ttgccttcga tactgagagt cttgagttcg  600
gaagaggttg gtggaactgc gagtgtagag gtgaaattcg tagatattcg caagaacacc  660
agtggcgaag gcggccaact ggtccgatac tgacgctgag gcgcgaaagc gtggggagca  720
aacaggatta gataccctgg tagtccacgc cgtaaacgat gaatgccagc cgttggggtg  780
catgcacttc agtggcgcag ctaacgcttt aagcattccg cctggggagt acggtcgcaa  840
gattaaaact caaaggaatt gacgggggcc cgcacaagcg gtggagcatg tggtttaatt  900
cgaagcaacg cgcagaacct taccagcttt tgacatgtcc ggtttgatcg gcagagatgc  960
ctttcttcag ttcggctggc cggaacacag gtgctgcatg gctgtcgtca gctcgtgtcg  1020
tgagatgttg ggttaagtcc cgcaacgagc gcaaccctcg cccctagttg ccatcattca  1080
gttgggaact ctagggggac tgccggtgat aagccgcgag gaaggtgggg atgacgtcaa  1140
gtcctcatgg cccttacagg ctgggctaca cacgtgctac aatggcggtg acaatgggca  1200
gcgaaagggc gacctcgagc taatcccaaa aagccgtctc agttcagatt gtactctgca  1260
actcgagtac atgaaggtgg aatcgctagt aatcgtggat cagcatgcca cggtgaatac  1320
gttcccgggc cttgtacaca ccgcccgtca caccatggga gttgggttta cccgaaggcg  1380
tcgcgctaac cgcaaggagg caggcgacca cggtaggctc agcgactggg gtgaagtcgt  1440
aacaaggtag ccgtagggga acctgcggct ggatcacctc cttt                  1484
```

```
SEQ ID NO: 26          moltype = DNA  length = 1486
FEATURE                Location/Qualifiers
source                 1..1486
                       mol_type = genomic DNA
                       organism = Anabaena flosaquae
SEQUENCE: 26
acggagagtt tgatcctggc tcaggatgaa cgctggcggt atgcttaaca catgcaagtc  60
gaacggtgtc ttcggacata gtggcggacg ggtgagtaac gcgtgagaat ctagcttcag  120
gtctgggaca accactggaa acggtggcta ataccggatg tgccggaagg tgaaaggctt  180
gctgcctgaa gatgagctcg cgtccgatta gctagtaggt ggggtaagag cctacctagg  240
cgacgatcgg tagctggtct gagaggatga ccagccacac tgggactgag acacggccca  300
gactcctacg ggaggcagca gtggggaatt ttccgcaatg ggcgaaagcc tgacggagca  360
ataccgcgtg agggaggaag gctcttgggt tgtaaacctc ttttctcagg gaagaacaca  420
atgacggtac ctgaggaatc agcatcggct aactccgtgc cagcagccgc ggtaatacgg  480
aggatgcaag cgttatccgg aatgattggg cgtaaagcgt ccgcaggtgg ctgtgtaagt  540
ctgctgtcaa agagcaaagc tcaactttgt aaaggcagtg gaaactacac ggctagagtg  600
cgttcggggc agagggaatt cctggtgtag cggtgaaatg cgtagagatc aggaagaaca  660
ccggtggcga aggcgctctg ctaggccgca actgacactg agggacgaaa gctaggggag  720
cgaatgggat tagataccce agtagtccta gctgtaaacg atggatacta ggcgtggctt  780
gtatcgaccc gagccgtgcc gtagctaacg cgttaagtat cccgcctggg gagtacgcac  840
gcaagtgtga aactcaaagg aattgacggg ggcccgcaca agcggtggag tatgtggttt  900
aattcgatgc aacgcgaaga accttaccaa ggcttgacat gtcgcgaact cttctgaaag  960
gaagaggtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctacgga cagagggcag  1200
caagctagcg atagcaagct aatcccataa accgtggctc agttcagatc gaaggctgca  1260
actcgccttc gtgaaggagg aatcgctagt aattgcaggt cagcatactg cagtgaattc  1320
gttcccgggc cttgtacaca ccgcccgtca caccatggaa gctggcaacg cccgaagtca  1380
ttactccaac ctttcgaggg ggaggatgcc taaggcagtg ctggtgactg gggtgaagtc  1440
gtaacaaggt agccgtaccg gaaggtgtgg ctggatcacc tccttt                1486
```

```
SEQ ID NO: 27          moltype = DNA  length = 1482
FEATURE                Location/Qualifiers
source                 1..1482
                       mol_type = genomic DNA
                       organism = Caulobacter ginsengisoli
SEQUENCE: 27
ctgagagttt gatcctggct cagagcgaac gctggcggca ggcctaacac atgcaagtcg  60
aacggatcct tcgggattag tggcggacgg gtgagtaaca cgtgggaacg tgcctttagg  120
ttcggaacaa ctcagggaaa cttgagctaa taccgaatgt gcccttcggg ggaaagattt  180
atcgccttta gagcggcccg cgtctgatta gctagttggt gaggtaaagg ctcaccaagg  240
ctacgatcag tagctggtct gagaggatga tcagccacat tgggactgag acacggccca  300
aactcctacg ggaggcagca gtggggaatc ttgcgcaatg ggcgaaagcc tgacgcagcc  360
atgccgcgtg aatgatgaag gtcttaggat tgtaaaattc tttcaccggg gacgataatg  420
acggtacccg gagaagaagc cccggctaac ttcgtgccag cagccgcggt aatacgaagg  480
gggctagcgt tgctcggaat tactgggcgt aaagggagcg taggcggaca gtttagtcag  540
aggtgaaagc ccagggctca accttggaat tgcctttgat actgactgtc ttgagtttgg  600
gagaggtgtg tggaactccg agtgtagagg tgaaattcgt agatattcgg aagaacacca  660
gtggcgaagg cgacacactg gcccaatact gacgctgagg ctcgaaagcg tggggagcaa  720
acaggattag ataccctggt agtccacgcc gtaaacgatg agtgctagtt gtcggcatgc  780
atgcatgtcg gtgacgcagc taacgcatta agcactccgc ctggggagta cggtcgcaag  840
attaaaactc aaaggaattg acgggggccc gcacaagcgg tggagcatgt ggtttaattc  900
gaagcaacgc gcagaacctt accacctttt gacatgtccg gctaacctca gagatgaggc  960
gttcccttcg ggaccggaa cacaggtgct gcatggctgt cgtcagctcg tgtcgtgaga  1020
tgttgggtta agtcccgcaa cgagcgcaac cctcactgtt agttgccaac aggtttggct  1080
gggcactcta acaggactgc cggagttaat ccggaggaag gcggggatga cgtcaagtcc  1140
```

```
tcatggccct tacaaggtgg gctacacacg tgctacaatg gcgactacag agggctgcaa  1200
tcccgcgagg gtgagccaat ccccaaaagt cgtctcagtt cggattgttc tctgcaactc  1260
gagagcatga agtcggaatc gctagtaatc gcggatcagc atgccgcggt gaatacgttc  1320
ccgggccttg tacacaccgc ccgtcacacc atgggagttg gctttacccg aaggcggtgc  1380
gctaaccagc aatggaggca gccgaccacg gtagggtcag cgactggggt gaagtcgtaa  1440
caaggtagcc gtaggggaac ctgcggctgg atcacctcct tt                      1482

SEQ ID NO: 28           moltype = DNA  length = 1486
FEATURE                 Location/Qualifiers
source                  1..1486
                        mol_type = genomic DNA
                        organism = Sphingopyxis macrogoltabida
SEQUENCE: 28
cttgagagtt tgatcctggc tcagaacgaa cgctggcggc atgcctaaca catgcaagtc  60
gaacgaactc ttcggagtta gtggcgcacg ggtgcgtaac gcgtgggaat ctgcccttgg  120
gtacggaata actcagagaa atttgtgcta ataccgtata atgacttcgg tccaaagatt  180
tatcgcccaa ggatgagccc gcgtaagatt agctagttgg tggggtaaaa gcctaccaag  240
gcgacgatct ttagctggtc tgagaggatg atcagccaca ctgggactga gacacggccc  300
agactcctac gggaggcagc agtggggaat attggacaat gggcgaaagc ctgatccagc  360
aatgccgcgt gagtgatgaa ggccctaggg ttgtaaagct cttttacccg ggatgataat  420
gacagtaccg ggagaataag ctccggctaa ctccgtgcca gcagccgcgg taatacggag  480
ggagctagcg ttgttcggaa ttactgggcg taaagcgcgc gtaggcggtt ttttaagtca  540
gaggtgaaag cccagtgctc aacactggaa ctgcctttga aactggaaaa cttgaatctt  600
ggagaggtca gtggaattcc gagtgtagag gtgaaattcg tagatattcg gaagaacacc  660
agtggcgaag gcgactgact ggacaagtat tgacgctgag gtgcgaaagc gtggggagca  720
aacaggatta gataccctgg tagtccacgc cgtaaacgat gataactagc tgtccgggtt  780
catagaactt gggtggcgca gctaacgcat taagttatcc gcctggggag tacggtcgca  840
agattaaaac tcaaaggaat tgacgggggc ctgcacaagc ggtggagcat gtggtttaat  900
tcgaagcaac gcgcagaacc ttaccagcgt ttgacatcct gatcgcggat tagagagatc  960
ttttccttca gttcggctgg atcagtgaca ggtgctgcat ggctgtcgtc agctcgtgtc  1020
gtgagatgtt gggttaagtc ccgcaacgag cgcaaccctc atccctagtt gccatcattc  1080
agttgggcac tctaaggaaa ctgccggtga taagccggag gaaggtgggg atgacgtcaa  1140
gtcctcatgg cccttacgcg ctgggctaca cacgtgctac aatggcggtg acagtgggca  1200
gcaaccgggc gaccggtagc taatctccaa aaaccgtctc agttcggatt gttctctgca  1260
actcgagagc atgaaggcgg aatcgctagt aatcgcggat cagcatgccg cggtgaatac  1320
gttcccaggc cttgtacaca ccgcccgtca caccatggga gttggtttca cccgaaggca  1380
gtgctctaac ccgcaaggga ggaagctgac cacggtggga tcagcgactg gggtgaagtc  1440
gtaacaaggt agccgtaggg gaacctgcgg ctggatcacc tccttt                  1486

SEQ ID NO: 29           moltype = DNA  length = 1533
FEATURE                 Location/Qualifiers
source                  1..1533
                        mol_type = genomic DNA
                        note = Pseudomonas sp. NFR16
                        organism = Pseudomonas sp.
SEQUENCE: 29
ctgaagagtt tgatcatggc tcagattgaa cgctggcggc aggcctaaca catgcaagtc  60
gagcggatga agggagcttg ctccctgatt cagcggcgga cgggtgagta atgcctagga  120
atctgcctgg tagtggggga caacgtctcg aaagggacgc taataccgca tacgtcctac  180
gggagaaagc aggggacctt cgggccttgc gctatcagat gagcctaggt cggattagct  240
agttggtgag gtaatggctc accaaggcga cgatccgtaa ctggtctgag aggatgatca  300
gtcacactgg aactgagaca cggtccagac tcctacggga ggcagcagtg gggaatattg  360
gacaatgggc gaaagcctga tccagccatg ccgcgtgtgt gaagaaggtc ttcggattgt  420
aaagcacttt aagttgggag gaagggttgt agattaatac tctgcaattt tgacgttacc  480
gacagaataa gcaccggcta actctgtgcc agcagccgcg gtaatacaga gggtgcaagc  540
gttaatcgga attactgggc gtaaagcgcg cgtaggtggt ttgttaagtt gaatgtgaaa  600
tccccgggct caacctggga actgcatcca aaactggcaa gctagagtag ggcagagggt  660
ggtggaattt cctgtgtagc ggtgaaatgc gtagatatag gaaggaacac cagtggcgaa  720
ggcgaccacc tgggctcata ctgacactga ggtgcgaaag cgtggggagc aaacaggatt  780
agataccctg gtagtccacg ccgtaaacga tgtcaactag ccgttgggag tcttgaactc  840
ttagtggcgc agctaacgca ttaagttgac cgcctgggga gtacggccgc aaggttaaaa  900
ctcaaatgaa ttgacggggg cccgcacaag cggtggagca tgtggtttaa ttcgaagcaa  960
cgcgaagaac cttaccaggc cttgacatcc agtgaactta ccagagatgg tttggtgcct  1020
tcgggaacac tgagacaggt gctgcatggc tgtcgtcagc tcgtgtcgtg agatgttggg  1080
ttaagtcccg taacgagcgc aacccttgtc cttagttacc agcacgttaa ggtgggcact  1140
ctaaggagac tgccggtgac aaaccggagg aaggtgggga tgacgtcaag tcatcatggc  1200
ccttacggcc tgggctacac acgtgctaca atggtcggta cagagggttg ccaagccgcg  1260
aggtggagct aatcccacaa aaccgatcgt agtccggatc gcagtctgca actcgactgc  1320
gtgaagtcgg aatcgctagt aatcgcgaat cagaatgtcg cggtgaatac gttcccgggc  1380
cttgtacaca ccgcccgtca caccatggga gtgggttgca ccagaagtag ctagtctaac  1440
cttcgggagg acggttacca cggtgtgatt catgactggg gtgaagtcgt aacaaggtag  1500
ccgtagggga acctgcggct ggatcacctc ctt                                1533

SEQ ID NO: 30           moltype = DNA  length = 1486
FEATURE                 Location/Qualifiers
source                  1..1486
                        mol_type = genomic DNA
                        note = Nostoc sp. UAM 307
                        organism = Nostoc sp.
```

```
SEQUENCE: 30
acggagagtt tgatcctggc tcaggatgaa cgctggcggt atgcttaaca catgcaagtc  60
gaacggtgtc ttcggacata gtggcggacg ggtgagtaac gcgtgagaat ctagcttcag  120
gtctaggaca accactggaa acggtggcta atactggatg tgccggaagg tgaaaggctt  180
gctgcctgaa gatgagctcg cgtctgatta gctagttggt ggggtaagag cctaccaagg  240
cgacgatcag tagctggtct gagaggatga tcagccacac tgggactgag acacggccca  300
gactcctacg ggaggcagca gtggggaatt ttccgcaatg ggcgaaagcc tgacggagca  360
ataccgcgtg agggaggaag gctcttgggt tgtaaacctc ttttctcagg gaagaacaca  420
atgacggtac ctgaggaatc agcatcggct aactccgtgc cagcagccgc ggtaatacgg  480
aggatgcaag cgttatccgg aatgattggg cgtaaagcgt ccgcaggtgg ctgtgtaagt  540
ctgctgttaa agagtctagc tcaactagat aaaggcagtg gaaactacac ggctagagtg  600
cgttcggggc agagggaatt cctggtgtag cggtgaaatg cgtagagatc aggaagaaca  660
ccggtggcga aggcgctctg ctaggccgca actgacactg agggacgaaa gctaggggag  720
cgaatgggat tagataccc agtagtccta gctgtaaacg atggatacta ggcgtggctt  780
gtatcgaccc gagccgtgcc gtagctaacg cgttaagtat cccgcctggg gagtacgcac  840
gcaagtgtga aactcaaagg aattgacggg ggcccgcaca agcggtggag tatgtggttt  900
aattcgatgc aacgcgaaga accttaccaa ggcttgacat gtcgcgaatc ctgctgaaag  960
gtgggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctacgga cagagggcag  1200
caagctagtg atagcaagct aatcccataa accgtggctc agttcagatc gaaggctgca  1260
actcgccttc gtgaaggagg aatcgctagt aattgcaggt cagcatactg cagtgaattc  1320
gttcccgggc cttgtacaca ccgcccgtca caccatggaa gctggcaacg cccgaagtca  1380
ttactccaac ttttcggaga ggaggatgcc taaggcagtg ctggtgactg gggtgaagtc  1440
gtaacaaggt agccgtaccg gaaggtgtgg ctggatcacc tccttt                1486

SEQ ID NO: 31          moltype = DNA  length = 1531
FEATURE                Location/Qualifiers
source                 1..1531
                       mol_type = genomic DNA
                       note = Variovorax sp. PMC12
                       organism = Variovorax sp.
SEQUENCE: 31
tatagagttt gatcctggct cagattgaac gctggcggca tgccttacac atgcaagtcg  60
aacggcagcg cgggagcaat cctggcggcg agtggcgaac gggtgagtaa tacatcggaa  120
cgtgcccaat cgtgggggat aacgcagcga aagctgtgct aataccgcat acgatctacg  180
gatgaaagca ggggatcgca agaccttgcg cgaatggagc ggccgatggc agattaggta  240
gttggtgagg taaaggctca ccaagccttc gatctgtagc tggtctgaga ggacgaccag  300
ccacactggg actgagacac ggcccagact cctacgggag gcagcagtgg ggaattttgg  360
acaatgggcg caagcctgat ccagccatgc cgcgtgcagg atgaaggcct tcgggttgta  420
aactgctttt gtacggaacg aaacggctct ttctaataaa gagggctaat gacggtaccg  480
taagaataag caccggctaa ctacgtgcca gcagccgcgg taatacgtag ggtgcaagcg  540
ttaatcggaa ttactgggcg taaagcgtgc gcaggcggtg atgtaagaca gttgtgaaat  600
ccccgggctc aacctgggaa ctgcatctgt gactgcatcg ctggagtacg gcagaggggg  660
atggaattcc gcgtgtagca gtgaaatgcg tagatatgcg gaggaacacc gatggcgaag  720
gcaatcccct gggcctgtac tgacgctcat gcacgaaagc gtggggagca aacaggatta  780
gataccctgg tagtccacgc cctaaacgat gtcaactggt tgttgggtct tcactgactc  840
agtaacgaag ctaacgcgtg aagttgaccg cctggggagt acggccgcaa ggttgaaact  900
caaaggaatt gacggggacc cgcacaagcg gtggatgatg tggtttaatt cgatgcaacg  960
cgaaaaacct tacccacctt tgacatgtac ggaatttgcc agagatggct tagtgctcga  1020
aagagaaccg taacacaggt gctgcatggc tgtcgtcagc tcgtgtcgtg agatgttggg  1080
ttaagtcccg caacgagcgc aacccttgtc attagttgct acattcagtt gggcactcta  1140
atgagactgc cggtgacaaa ccggaggaag gtggggatga cgtcaagtcc tcatggccct  1200
tataggtggg gctacacacg tcatacaatg gctggtacaa agggttgcca acccgcgagg  1260
gggagctaat cccataaaac cagtcgtagt ccggatcgca gtctgcaact cgactgcgtg  1320
aagtcggaat cgctagtaat cgtggatcag aatgtcacgg tgaatacgtt cccgggtctt  1380
gtacacaccg cccgtcacac catgggagcg ggttctgcca gaagtagtta gcttaaccgc  1440
aaggagggcg attaccacgg cagggttcgt gactggggtg aagtcgtaac aaggtagccg  1500
tatcggaagg tgcggctgga tcacctcctt t                                1531

SEQ ID NO: 32          moltype = DNA  length = 1486
FEATURE                Location/Qualifiers
source                 1..1486
                       mol_type = genomic DNA
                       note = Nostoc sp. strain PCC 73102
                       organism = Nostoc sp.
SEQUENCE: 32
acggagagtt tgatcctggc tcaggatgaa cgctggcggt atgcttaaca catgcaagtc  60
gaacggtgtc ttcggacaca gtggcggacg ggtgagtaac gcgtgagaat ctggctctag  120
gtctgggaca accactggaa acggtggcta ataccggatg tgccgagagg tgaaaggtta  180
actgcctaga gatgagctcg cgtctgatta gctagtaggt agtgtaatgg actacctagg  240
cgacgatcag tagctggtct gagaggacga tcagccacac tgggactgag acacggccca  300
gactcctacg ggaggcagca gtggggaatt ttccgcaatg ggcgaaagcc tgacggagca  360
ataccgcgtg agggaggaag gctcttgggt cgtaaacctc ttttctcagg gaagaacaca  420
atgacggtac ctgaggaata agcatcggct aactccgtgc cagcagccgc ggtaatacgg  480
aggatgcaag cgttatccgg aatgattggg cgtaaagcgt ccgcaggtgg caatgtaagt  540
ctgctgttaa agagtctagc tcaactagat acaagcagtg gaaactacat agctagagta  600
cgttcggggc agagggaatt cctggtgtag cggtgaaatg cgtagagatc aggaagaaca  660
```

```
ccggtggcga aggcgctctg ctaggccgta actgacactg agggacgaaa gctaggggag  720
cgaatgggat tagataccc agtagtccta gccgtaaacg atggatacta ggcgtggctt  780
gtatcgaccc gagccgtgcc gtagctaacg cgttaagtat cccgcctggg gagtacgccg  840
gcaacggtga aactcaaagg aattgacggg ggcccgcaca agcggtggag tatgtggttt  900
aattcgatgc aacgcgaaga accttaccaa ggcttgacat gtcgcgaatc ctggtgaaag  960
ccgggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctccgga cagagggcag  1200
caagcatgcg aatgcaagca aatcccgtaa accggagctc agttcagatc gcaggctgca  1260
actcgcctgc gtgaaggagg aatcgctagt aattgcaggt cagcatactg cagtgaattc  1320
gttcccgggc cttgtacaca ccgcccgtca caccatggaa gctggtagtg cccgaagtca  1380
ttactccaac ctttcgggga ggaggatgcc taaggcagga ctggtgactg gggtgaagtc  1440
gtaacaaggt agccgtaccg gaaggtgtgg ctggatcacc tccttt                 1486

SEQ ID NO: 33          moltype = DNA  length = 1533
FEATURE                Location/Qualifiers
source                 1..1533
                       mol_type = genomic DNA
                       note = Pseudomonas sp. NFR16
                       organism = Pseudomonas sp.
SEQUENCE: 33
ctgaagagtt tgatcatggc tcagattgaa cgctggcggc aggcctaaca catgcaagtc  60
gagcggatga agggagcttg ctccctgatt cagcggcgga cgggtgagta atgcctagga  120
atctgcctgg tagtggggga caacgtctcg aaagggacgc taataccgca tacgtcctac  180
gggagaaagc aggggacctt cgggccttgc gctatcagat gagcctaggt cggattagct  240
agttggtgag gtaatggctc accaaggcga cgatccgtaa ctggtctgag aggatgatca  300
gtcacactgg aactgagaca cggtccagac tcctacggga ggcagcagtg gggaatattg  360
gacaatgggc gaaagcctga tccagccatg ccgcgtgtgt gaagaaggtc ttcggattgt  420
aaagcacttt aagttgggag gaagggttgt agattaatac tctgcaattt tgacgttacc  480
gacagaataa gcaccggcta actctgtgcc agcagccgcg gtaatacaga gggtgcaagc  540
gttaatcgga attactgggc gtaaagcgcg cgtaggtggt ttgttaagtt gaatgtgaaa  600
tccccgggct caacctggga actgcatcca aaactggcaa gctagagtag ggcagagggt  660
ggtggaattt cctgtgtagc ggtgaaatgc gtagatatag gaaggaacac cagtggcgaa  720
ggcgaccacc tgggctcata ctgacactga ggtgcgaaag cgtggggagc aaacaggatt  780
agataccctg gtagtccacg ccgtaaacga tgtcaactag ccgttgggag tcttgaactc  840
ttagtggcgc agctaacgca ttaagttgac cgcctgggga gtacggccgc aaggttaaaa  900
ctcaaatgaa ttgacggggg cccgcacaag cggtggagca tgtggtttaa ttcgaagcaa  960
cgcgaagaac cttaccaggc cttgacatcc agtgaactta ccagagatgg tttggtgcct  1020
tcgggaacac tgagacaggt gctgcatggc tgtcgtcagc tcgtgtcgtg agatgttggg  1080
ttaagtcccg taacgagcgc aacccttgtc cttagttacc agcacgttaa ggtgggcact  1140
ctaaggagac tgccggtgac aaaccggagg aaggtgggga tgacgtcaag tcatcatggc  1200
ccttacggcc tgggctacac acgtgctaca atggtcggta cagagggttg ccaagccgcg  1260
aggtggagct aatcccacaa aaccgatcgt agtccggatc gcagtctgca actcgactgc  1320
gtgaagtcgg aatcgctagt aatcgcgaat cagaatgtcg cggtgaatac gttcccgggc  1380
cttgtacaca ccgcccgtca caccatggga gtgggttgca ccagaagtag ctagtctaac  1440
cttcgggagg acggttacca cggtgtgatt catgactggg gtgaagtcgt aacaaggtag  1500
ccgtagggga acctgcggct ggatcacctc ctt                               1533

SEQ ID NO: 34          moltype = DNA  length = 1487
FEATURE                Location/Qualifiers
source                 1..1487
                       mol_type = genomic DNA
                       note = Nostoc sp. NIES-4103
                       organism = Nostoc sp.
SEQUENCE: 34
aatggagagt ttgatcctgg ctcaggatga acgctggcgg tatgcttaac acatgcaagt  60
cgaacggtgt tttcggacac agtggcggac gggtgagtaa cgcgtgagaa tctggctcta  120
ggtcggggac aaccactgga aacggtggct aataccggat gtgccgagag gtgaaaggct  180
tgctgcctag agatgagctc gcgtctgatt agctagtagg tggggtaaga gcctacctag  240
gcgacgatca gtagctggtc tgagaggatg atcagccaca ctgggactga gacacggccc  300
agactcctac gggaggcagc agtggggaat tttccgcaat gggcgaaagc ctgacggagc  360
aataccgcgt gagggaggaa ggctcttggg ttgtaaacct cttttctcag ggaagaacac  420
aatgacggta cctgaggaat cagcatcggc taactccgtg ccagcagccg cggtaatacg  480
gaggatgcaa gcgttatccg gaatgattgg gcgtaaagcg tccgcaggtg gctatgtaag  540
tctgctgtta aagagtgagg ctcaacctca taagagcagt ggaaactaca tagctagagt  600
gcgttcgggg cagagggaat tcctggtgta gcggtgaaat gcgtagatat caggaagaac  660
accggtggcg aaagcgctct gctaggccgc aactgacact gagggacgaa agctagggga  720
gcgaatggga ttagataccc cagtagtcct agccgtaaac gatggatact aggcgtggct  780
tgtatcgacc cgagccgtgc cgtagctaac gcgttaagta tcccgcctgg ggagtacgca  840
cgcaagtgtg aaactcaaag gaattgacgg gggcccgcac aagcggtgga gtatgtggtt  900
taattcgatg caacgcgaag aaccttacca agacttgaca tgtcgcgaac tttcctgaaa  960
gggagaggtg ccttcgggag cgcgaacaca ggtggtgcat ggctgtcgtc agctcgtgtc  1020
gtgagatgtt gggttaagtc ccgcaacgag cgcaaccctc gtttttagtt gccagcatta  1080
agttgggcac tctagagaga ctgccggtga caaaccggag gaaggtgggg atgacgtcaa  1140
gtcagcatgc cccttacgtc ttgggctaca cacgtactac aatgctacgg acagagggca  1200
gcaagccggc aacggcaagc aaatcccgaa aaccgtagct cagttcagat cgcaggctgc  1260
aactcgcctg cgtgaaggag gaatcgctag taattgcagg tcagcatact gcagtgaatt  1320
cgttcccggg ccttgtacac accgcccgtc acaccatgga agctggcaac gcccgaagtc  1380
```

```
attactccaa cgattcgtcg gggaggatgc ctaaggcagt gctggtgact ggggtgaagt  1440
cgtaacaagg tagccgtacc ggaaggtgtg gctggatcac ctccttt               1487

SEQ ID NO: 35          moltype = DNA  length = 1486
FEATURE                Location/Qualifiers
source                 1..1486
                       mol_type = genomic DNA
                       note = Nostoc sp. UAM 307
                       organism = Nostoc sp.
SEQUENCE: 35
acggagagtt tgatcctggc tcaggatgaa cgctggcggt atgcttaaca catgcaagtc  60
gaacggtgtc ttcggacata gtggcggacg ggtgagtaac gcgtgagaat ctagcttcag  120
gtctaggaca accactggaa acggtggcta atactggatg tgccggaagg tgaaaggctt  180
gctgcctgaa gatgagctcg cgtctgatta gctagttggt ggggtaagag cctaccaagg  240
cgacgatcag tagctggtct gagaggatga tcagccacac tgggactgag acacggccca  300
gactcctacg ggaggcagca gtggggaatt ttccgcaatg ggcgaaagcc tgacggagca  360
ataccgcgtg agggaggaag gctcttgggt tgtaaacctc ttttctcagg gaagaacaca  420
atgacggtac ctgaggaatc agcatcggct aactccgtgc cagcagccgc ggtaatacgg  480
aggatgcaag cgttatccgg aatgattggg cgtaaagcgt ccgcaggtgg ctgtgtaagt  540
ctgctgttaa agagtctagc tcaactagat aaaggcagtg gaaactacac ggctagagtg  600
cgttcggggc agagggaatt cctggtgtag cggtgaaatg cgtagagatc aggaagaaca  660
ccggtggcga aggcgctctg ctaggccgca actgacactg agggacgaaa gctaggggag  720
cgaatgggat tagataccc agtagtccta gctgtaaacg atggatacta ggcgtggctt  780
gtatcgaccc gagccgtgcc gtagctaacg cgttaagtat cccgcctggg gagtacgcac  840
gcaagtgtga aactcaaagg aattgacggg ggcccgcaca agcggtggag tatgtggttt  900
aattcgatgc aacgcgaaga accttaccaa ggcttgacat gtcgcgaatc ctgctgaaag  960
gtgggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctacgga cagagggcag  1200
caagctagtg atagcaagct aatcccataa accgtggctc agttcagatc gaaggctgca  1260
actcgccttc gtgaaggagg aatcgctagt aattgcaggt cagcatactg cagtgaattc  1320
gttcccgggc cttgtacaca ccgcccgtca caccatggaa gctggcaacg cccgaagtca  1380
ttactccaac ttttcggaga ggaggatgcc taaggcagtg ctggtgactg gggtgaagtc  1440
gtaacaaggt agccgtaccg gaaggtgtgg ctggatcacc tccttt                1486

SEQ ID NO: 36          moltype = DNA  length = 1533
FEATURE                Location/Qualifiers
source                 1..1533
                       mol_type = genomic DNA
                       note = Pseudomonas sp. NFR16
                       organism = Pseudomonas sp.
SEQUENCE: 36
ctgaagagtt tgatcatggc tcagattgaa cgctggcggc aggcctaaca catgcaagtc  60
gagcggatga agggagcttg ctccctgatt cagcggcgga cgggtgagta atgcctagga  120
atctgcctgg tagtggggga caacgtctcg aaagggacgc taataccgca tacgtcctac  180
gggagaaagc aggggacctt cggccttgc gctatcagat gagcctaggt cggattagct  240
agttggtgag gtaatggctc accaaggcga cgatccgtaa ctggtctgag aggatgatca  300
gtcacactgg aactgagaca cggtccagac tcctacggga ggcagcagtg gggaatattg  360
gacaatgggc gaaagcctga tccagccatg ccgcgtgtgt gaagaaggtc ttcggattgt  420
aaagcacttt aagttgggag gaagggttgt agattaatac tctgcaattt tgacgttacc  480
gacagaataa gcaccggcta actctgtgcc agcagccgcg gtaatacaga gggtgcaagc  540
gttaatcgga attactgggc gtaaagcgcg cgtaggtggt ttgttaagtt gaatgtgaaa  600
tccccgggct caacctggga actgcatcca aaactggcaa gctagagtag ggcagagggt  660
ggtggaattt cctgtgtagc ggtgaaatgc gtagatatag gaaggaacac cagtggcgaa  720
ggcgaccacc tgggctcata ctgacactga ggtgcgaaag cgtggggagc aaacaggatt  780
agataccctg gtagtccacg ccgtaaacga tgtcaactag ccgttgggag tcttgaactc  840
ttagtggcgc agctaacgca ttaagttgac cgcctgggga gtacggccgc aaggttaaaa  900
ctcaaatgaa ttgacggggg cccgcacaag cggtggagca tgtggtttaa ttcgaagcaa  960
cgcgaagaac cttaccaggc cttgacatcc agtgaactta ccagagatgg tttggtgcct  1020
tcgggaacac tgagacaggt gctgcatggc tgtcgtcagc tcgtgtcgtg agatgttggg  1080
ttaagtcccg taacgagcgc aacccttgtc cttagttacc agcacgttaa ggtgggcact  1140
ctaaggagac tgccggtgac aaaccggagg aaggtgggga tgacgtcaag tcatcatggc  1200
ccttacggcc tgggctacac acgtgctaca atggtcggta cagagggttg ccaagccgcg  1260
aggtggagct aatcccacaa aaccgatcgt agtccggatc gcagtctgca actcgactgc  1320
gtgaagtcgg aatcgctagt aatcgcgaat cagaatgtcg cggtgaatac gttcccgggc  1380
cttgtacaca ccgcccgtca caccatggga gtgggttgca ccagaagtag ctagtctaac  1440
cttcgggagg acggttacca cggtgtgatt catgactggg gtgaagtcgt aacaaggtag  1500
ccgtagggga acctgcggct ggatcacctc ctt                              1533

SEQ ID NO: 37          moltype = DNA  length = 1529
FEATURE                Location/Qualifiers
source                 1..1529
                       mol_type = genomic DNA
                       organism = Cupriavidus plantarum
SEQUENCE: 37
ctgaagagtt tgatcctggc tcagattgaa cgctggcggc atgccttaca catgcaagtc  60
gaacggcagc gcggacttcg gtctggcggc gagtggcgaa cgggtgagta atacatcgga  120
acgtgccctg ttgtggggga taactagtcg aaagattagc taataccgca tacgacctga  180
```

```
gggtgaaagc gggggaccgt aaggcctcgc gcaataggag cggccgatgt ctgattagct  240
agttggtggg gtaaaggccc accaaggcga cgatcagtag ctggtctgag aggacgatca  300
gccacactgg gactgagaca cggcccagac tcctacggga ggcagcagtg gggaattttg  360
gacaatgggg gcaaccctga tccagcaatg ccgcgtgtgt gaagaaggcc ttcgggttgt  420
aaagcacttt tgtccggaaa gaaatcgcgt tggataatac ctgacgtgga tgacggtacc  480
ggaagaataa gcaccggcta actacgtgcc agcagccgcg gtaatacgta gggtgcgagc  540
gttaatcgga attactgggc gtaaagcgtg cgcaggcggt tttgtaagac aggcgtgaaa  600
tccccgggct caacctggga attgcgcttg tgactgcaag gctagagtgc gtcagagggg  660
ggtagaattc cacgtgtagc agtgaaatgc gtagagatgt ggaggaatac cgatggcgaa  720
ggcagccccc tgggacgtga ctgacgctca tgcacgaaag cgtggggagc aaacaggatt  780
agataccctg gtagtccacg ccctaaacga tgtcaactag ttgttgggga ttcatttcct  840
cagtaacgta gctaacgcgt gaagttgacc gcctggggag tacggtcgca agattaaaac  900
tcaaaggaat tgacggggac ccgcacaagc ggtggatgat gtggattaat tcgatgcaac  960
gcgaaaaacc ttacctaccc ttgacatgcc actaacgaag cagagatgca ttaggtgccc  1020
gaaagggaaa gtggacacag gtgctgcatg gctgtcgtca gctcgtgtcg tgagatgttg  1080
ggttaagtcc cgcaacgagc gcaacccttg tctttagttg ctacgcaaga gcactctaga  1140
gagactgccg gtgacaaacc ggaggaaggt ggggatgacg tcaagtcctc atggccctta  1200
tgggtagggc ttcacacgtc atacaatggt gcatacagag ggttgccaac ccgcgagggg  1260
gagctaatcc cagaaaatgc atcgtagtcc ggatcgtagt ctgcaactcg actacgtgaa  1320
gctggaatcg ctagtaatcg cggatcagca tgccgcggtg aatacgttcc cgggtcttgt  1380
acacaccgcc cgtcacacca tgggagtggg ttttgccaga agtagttagc ctaaccgcaa  1440
ggagggcgat taccacggca gggttcatga ctggggtgaa gtcgtaacaa ggtagccgta  1500
tcggaaggtg cggctggatc acctcctt                                      1529
```

```
SEQ ID NO: 38           moltype = DNA  length = 1477
FEATURE                 Location/Qualifiers
source                  1..1477
                        mol_type = genomic DNA
                        note = Rhizobium sp. SEMIA 6411
                        organism = Rhizobium sp.
SEQUENCE: 38
atgagagttt gatcctggct cagaacgaac gctggcggca ggcttaacac atgcaagtcg  60
agcgccccgc aaggggagcg gcagacgggt gagtaacgcg tgggaatcta cctttttgcta 120
cggaataacg cagggaaact tgtgctaata ccgtatgtgc cctttggggg aaagatttat  180
cggcaaagga tgagcccgcg ttggattagc tagttggtgg ggtaaaggcc taccaaggcg  240
acgatccata gctggtctga gaggatgatc agccacattg ggactgagac acggcccaaa  300
ctcctacggg aggcagcagt ggggaatatt ggacaatggg cgcaagcctg atccagccat  360
gccgcgtgag tgatgaaggc cttagggttg taaagctctt tcaccggtga agataatgac  420
ggtaaccgga gaagaagccc cggctaactt cgtgccagca gccgcggtaa tacgaagggg  480
gctagcgttg ttcggattta ctgggcgtaa agcgcacgta ggcggatcga tcagtcaggg  540
gtgaaatccc agggctcaac cctggaactg cctttgatac tgtcgatctg gagtatggaa  600
gaggtgagtg gaattccgag tgtagaggtg aaattcgtag atattcggag gaacaccagt  660
ggcgaaggcg gctcactggt ccattactga cgctgaggtg cgaaagcgtg gggagcaaac  720
aggattagat accctggtag tccacgccgt aaacgatgaa tgttagccgt cgggcagtat  780
actgttcggt ggcgcagcta acgcattaaa cattccgcct ggggagtacg gtcgcaagat  840
taaaactcaa aggaattgac gggggcccgc acaagcggtg gagcatgtgg tttaattcga  900
agcaacgcgc agaaccttac cagcccttga catcctacga ccgctgcaga gatgcagttt  960
ccacttcggt ggcgtagaga caggtgctgc atggctgtcg tcagctcgtg tcgtgagatg  1020
ttgggttaag tcccgcaacg agcgcaaccc tcgcccttag ttgccagcat ttagttgggc  1080
actctaaggg gactgccggt gataagccga gaggaaggtg gggatgacgt caagtcctca  1140
tggcccttac gggctgggct acacacgtgc tacaatggtg gtgacagtgg gcagcgaggc  1200
cgcgaggccg agctaatctc caaaagccat ctcagttcgg attgcactct gcaactcgag  1260
tgcatgaagt tggaatcgct agtaatcgcg gatcagcatg ccgcggtgaa tacgttcccg  1320
ggccttgtac acaccgcccg tcacaccatg ggagttggtt ttacccgaag gtagtgcgct  1380
aaccgcaagg aggcagctaa ccacggtagg gtcagcgact ggggtgaagt cgtaacaagg  1440
tagccgtagg ggaacctgcg gctggatcac ctccttt                             1477
```

```
SEQ ID NO: 39           moltype = DNA  length = 1487
FEATURE                 Location/Qualifiers
source                  1..1487
                        mol_type = genomic DNA
                        note = Nostoc sp. NIES-4103
                        organism = Nostoc sp.
SEQUENCE: 39
aatggagagt ttgatcctgg ctcaggatga acgctggcgg tatgcttaac acatgcaagt  60
cgaacggtgt tttcggacac agtggcggac gggtgagtaa cgcgtgagaa tctggctcta  120
ggtcggggac aaccactgga aacggtggct aataccggat gtgccgagag gtgaaaggct  180
tgctgcctag agatgagctc gcgtctgatt agctagtagg tggggtaaga gcctacctag  240
gcgacgatca gtagctggtc tgagaggatg atcagccaca ctgggactga gacacggccc  300
agactcctac gggaggcagc agtggggaat tttccgcaat gggcgaaagc ctgacggagc  360
aataccgcgt gagggaggaa ggctcttggg ttgtaaacct cttttctcag ggaagaacac  420
aatgacggta cctgaggaat cagcatcggc taactccgtg ccagcagccg cggtaatacg  480
gaggatgcaa gcgttatccg gaatgattgg gcgtaaagcg tccgcaggtg gctatgtaag  540
tctgctgtta aagagtgagg ctcaacctca taagagcagt ggaaactaca tagctagagt  600
gcgttcgggg cagagggaat tcctggtgta gcggtgaaat gcgtagatat caggaagaac  660
accggtggcg aaagcgctct gctaggccgc aactgacact gagggacgaa agctagggga  720
gcgaatggga ttagataccc cagtagtcct agccgtaaac gatggatact aggcgtggct  780
tgtatcgacc cgagccgtgc cgtagctaac gcgttaagta tcccgcctgg ggagtacgca  840
cgcaagtgtg aaactcaaag gaattgacgg gggcccgcac aagcggtgga gtatgtggtt  900
```

```
taattcgatg caacgcgaag aaccttacca agacttgaca tgtcgcgaac tttcctgaaa  960
gggagaggtg ccttcgggag cgcgaacaca ggtggtgcat ggctgtcgtc agctcgtgtc  1020
gtgagatgtt gggttaagtc ccgcaacgag cgcaaccctc gtttttagtt gccagcatta  1080
agttgggcac tctagagaga ctgccggtga caaaccggag gaaggtgggg atgacgtcaa  1140
gtcagcatgc cccttacgtc ttgggctaca cacgtactac aatgctacgg acagagggca  1200
gcaagccggc aacggcaagc aaatcccgaa aaccgtagct cagttcagat cgcaggctgc  1260
aactcgcctg cgtgaaggag gaatcgctag taattgcagg tcagcatact gcagtgaatt  1320
cgttcccggg ccttgtacac accgcccgtc acaccatgga agctggcaac gcccgaagtc  1380
attactccaa cgattcgtcg gggaggatgc ctaaggcagt gctggtgact ggggtgaagt  1440
cgtaacaagg tagccgtacc ggaaggtgtg gctggatcac ctcctt                 1487

SEQ ID NO: 40          moltype = DNA  length = 1484
FEATURE                Location/Qualifiers
source                 1..1484
                       mol_type = genomic DNA
                       organism = Ancylobacter rudongensis
SEQUENCE: 40
cttgagagtt tgatcctggc tcagaacgaa cgctggcggc aggcttaaca catgcaagtc  60
gaacgccccg caaggggagt ggcagacggg tgagtaacac gtggggatct gcccaatggt  120
acggaataat tccgggaaac tgggactaat accgtatgag cccgcaaggg gaaagattta  180
tcgccattgg atgaacccgc gtcggattag ctagttggtg tggtaaaggc gcaccaaggc  240
gacgatccgt agctggtctg agaggatgat cagccacact gggactgaga cacggcccag  300
actcctacgg gaggcagcag tggggaatat tggacaatgg gcgcaagcct gatccagcca  360
tgccgcgtga gtgatgaagg ccttagggtt gtaaagctct ttcgccgacg aagataatga  420
cggtagtcgg agaagaagcc ccggctaact tcgtgccagc agccgcggta atacgaaggg  480
ggctagcgtt gttcggaatc actgggcgta aagcgcacgt aggcggatat ttaagtcagg  540
ggtgaaagcc tggagctcaa ctccagaact gcccttgata ctgggtatct cgagtccgga  600
agaggtaagt ggaactgcga gtgtagaggt gaaattcgta gatattcgca agaacaccag  660
tggcgaaggc ggcttactgg tccggtactg acgctgaggt gcgaaagcgt ggggagcaaa  720
caggattaga taccctggta gtccacgccg taaacgatgg aggctagccg ttggtgagca  780
tgctcatcag tggcgcagct aacgcattaa gcctcccgcc tggggagtac ggtcgcaaga  840
ttaaaactca aaggaattga cgggggcccg cacaagcggt ggagcatgtg gtttaattcg  900
aagcaacgcg cagaacctta ccagcctttg acatgtcccg gacggttacc agagatggtt  960
tcttctcttc ggagccggga acacaggtgc tgcatggctg tcgtcagctc gtgtcgtgag  1020
atgttgggtt aagtcccgca acgagcgcaa ccctcgccct tagttgccat cattcagttg  1080
ggcactctag gggactgcc ggtgataagc cgagaggaag gtggggatga cgtcaagtcc  1140
tcatggccct tacgggctgg gctacacacg tgctacaatg gcggtgacag tgggaagcga  1200
actcgcgagg gtaagcaaat ctccaaaagc cgtctcagtt cggattgcac tctgcaactc  1260
gagtgcatga agttggaatc gctagtaatc gtggatcagc atgccacggt gaatacgttc  1320
ccgggccttg tacacaccgc ccgtcacacc atgggagttg gttttacccg aaggcgctgc  1380
gctaactcag caatgagagg caggcgacca cggtagggtc agcgactggg gtgaagtcgt  1440
aacaaggtag ccgtagggga acctgcggct ggatcacctc cttt                   1484

SEQ ID NO: 41          moltype = DNA  length = 1226
FEATURE                Location/Qualifiers
source                 1..1226
                       mol_type = genomic DNA
                       note = Bradyrhizobium sp. S23321
                       organism = Bradyrhizobium sp.
SEQUENCE: 41
tctgagagga tgatcagcca cattgggact gagacacggc ccaaactcct acgggaggca  60
gcagtgggga atattggaca atgggcgcaa gcctgatcca gccatgccgc gtgagtgatg  120
aaggccctag ggttgtaaag ctcttttgtg cgggaagata atgacggtac cgcaagaata  180
agccccggct aacttcgtgc cagcagccgc ggtaatacga agggggctag cgttgctcgg  240
aatcactggg cgtaaagggt gcgtaggcgg gtctttaagt caggggtgaa atcctggagc  300
tcaactccag aactgccttt gatactgaag atcttgagtt cgggagaggt gagtggaact  360
gcgagtgtag aggtgaaatt cgtagatatt cgcaagaaca ccagtggcga aggcggctca  420
ctggcccgat actgacgctg aggcacgaaa gcgtggggag caaacaggat tagataccct  480
ggtagtccac gccgtaaacg atgaatgcca gccgttagtg ggtttactca ctagtggcgc  540
agctaacgct ttaagcattc cgcctgggga gtacggtcgc aagattaaaa ctcaaaggaa  600
ttgacggggg cccgcacaag cggtggagca tgtggtttaa ttcgacgcaa cgcgcagaac  660
cttaccagcc cttgacatgt ccaggaccgg tcgcagagat gtgaccttct cttcggagcc  720
tggagcacag gtgctgcatg gctgtcgtca gctcgtgtcg tgagatgttg ggttaagtcc  780
cgcaacgagc gcaacccccg tccttagttg ctaccattta gttgagcact ctaaggagac  840
tgccggtgat aagccgcgag gaaggtgggg atgacgtcaa gtcctcatgg cccttacggg  900
ctgggctaca cacgtgctac aatggcggtg acaatgggac gctaaggggc aacccttcgc  960
aaatctcaaa aagccgtctc agttcggatt gggctctgca actcgagccc atgaagttgg  1020
aatcgctagt aatcgtggat cagcacgcca cggtgaatac gttcccgggc cttgtacaca  1080
ccgcccgtca caccatggga gttggtttta cctgaaggta gtgcgctaac ccgcaaggga  1140
ggcagctaac cacggtaggg tcagcgactg gggtgaagtc gtaacaaggt agccgtaggg  1200
gaacctgcgg ctggatcacc tccttt                                       1226

SEQ ID NO: 42          moltype = DNA  length = 1486
FEATURE                Location/Qualifiers
source                 1..1486
                       mol_type = genomic DNA
                       note = Nostoc sp. strain PCC 73102
                       organism = Nostoc sp.
SEQUENCE: 42
```

```
acggagagtt tgatcctggc tcaggatgaa cgctggcggt atgcttaaca catgcaagtc  60
gaacggtgtc ttcggacaca gtggcggacg ggtgagtaac gcgtgagaat ctggctctag  120
gtctgggaca accactggaa acggtggcta ataccggatg tgccgagagg tgaaaggtta  180
actgcctaga gatgagctcg cgtctgatta gctagtaggt agtgtaatgg actacctagg  240
cgacgatcag tagctggtct gagaggacga tcagccacac tgggactgag acacggccca  300
gactcctacg ggaggcagca gtggggaatt ttccgcaatg ggcgaaagcc tgacggagca  360
ataccgcgtg agggaggaag gctcttgggt cgtaaacctc ttttctcagg gaagaacaca  420
atgacggtac ctgaggaata agcatcggct aactccgtgc cagcagccgc ggtaatacgg  480
aggatgcaag cgttatccgg aatgattggg cgtaaagcgt ccgcaggtgg caatgtaagt  540
ctgctgttaa agagtctagc tcaactagat acaagcagtg gaaactacat agctagagta  600
cgttcggggc agagggaatt cctggtgtag cggtgaaatg cgtagagatc aggaagaaca  660
ccggtggcga aggcgctctg ctaggccgta actgacactg agggacgaaa gctaggggag  720
cgaatgggat tagataccc agtagtccta gccgtaaacg atggatacta ggcgtggctt  780
gtatcgaccc gagccgtgcc gtagctaacg cgttaagtat cccgcctggg gagtacgccg  840
gcaacggtga aactcaaagg aattgacggg ggcccgcaca agcggtggag tatgtggttt  900
aattcgatgc aacgcgaaga accttaccaa ggcttgacat gtcgcgaatc ctggtgaaag  960
ccgggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctccgga cagagggcag  1200
caagcatgcg aatgcaagca aatcccgtaa accggagctc agttcagatc gcaggctgca  1260
actcgcctgc gtgaaggagg aatcgctagt aattgcaggt cagcatactg cagtgaattc  1320
gttcccgggc cttgtacaca ccgcccgtca caccatggaa gctggtagtg cccgaagtca  1380
ttactccaac ctttcgggga ggaggatgcc taaggcagga ctggtgactg ggtgaagtc  1440
gtaacaaggt agccgtaccg gaaggtgtgg ctggatcacc tccttt  1486

SEQ ID NO: 43          moltype = DNA  length = 1531
FEATURE                Location/Qualifiers
source                 1..1531
                       mol_type = genomic DNA
                       note = Variovorax sp. PMC12
                       organism = Variovorax sp.
SEQUENCE: 43
tatagagttt gatcctggct cagattgaac gctggcggca tgccttacac atgcaagtcg  60
aacggcagcg cgggagcaat cctggcggcg agtggcgaac gggtgagtaa tacatcggaa  120
cgtgcccaat cgtgggggat aacgcagcga aagctgtgct aataccgcat acgatctacg  180
gatgaaagca ggggatcgca agaccttgcg cgaatggagc ggccgatggc agattaggta  240
gttggtgagg taaaggctca ccaagccttc gatctgtagc tggtctgaga ggacgaccag  300
ccacactggg actgagacac ggcccagact cctacgggag gcagcagtgg ggaattttgg  360
acaatgggcg caagcctgat ccagccatgc cgcgtgcagg atgaaggcct tcgggttgta  420
aactgctttt gtacggaacg aaacggctct ttctaataaa gagggctaat gacggtaccg  480
taagaataag caccggctaa ctacgtgcca gcagccgcgg taatacgtag ggtgcaagcg  540
ttaatcggaa ttactgggcg taaagcgtgc gcaggcggtg atgtaagaca gttgtgaaat  600
ccccgggctc aacctgggaa ctgcatctgt gactgcatcg ctggagtacg gcagaggggg  660
atggaattcc gcgtgtagca gtgaaatgcg tagatatgcg gaggaacacc gatggcgaag  720
gcaatcccct gggcctgtac tgacgctcat gcacgaaagc gtggggagca aacaggatta  780
gataccctgg tagtccacgc cctaaacgat gtcaactggt tgttgggtct tcactgactc  840
agtaacgaag ctaacgcgtg aagttgaccg cctggggagt acggccgcaa ggttgaaact  900
caaaggaatt gacggggacc cgcacaagcg gtggatgatg tggtttaatt cgatgcaacg  960
cgaaaaacct tacccacctt tgacatgtac ggaatttgcc agagatggct tagtgctcga  1020
aagagaaccg taacacaggt gctgcatggc tgtcgtcagc tcgtgtcgtg agatgttggg  1080
ttaagtcccg caacgagcgc aacccttgtc attagttgct acattcagtt gggcactcta  1140
atgagactgc cggtgacaaa ccggaggaag gtggggatga cgtcaagtcc tcatggccct  1200
tataggtggg gctacacacg tcatacaatg gctggtacaa agggttgcca acccgcgagg  1260
gggagctaat cccataaaac cagtcgtagt ccggatcgca gtctgcaact cgactgcgtg  1320
aagtcggaat cgctagtaat cgtggatcag aatgtcacgg tgaatacgtt cccgggtctt  1380
gtacacaccg cccgtcacac catgggagcg ggttctgcca gaagtagtta gcttaaccgc  1440
aaggagggcg attaccacgg cagggttcgt gactggggtg aagtcgtaac aaggtagccg  1500
tatcggaagg tgcggctgga tcacctcctt t  1531

SEQ ID NO: 44          moltype = DNA  length = 1531
FEATURE                Location/Qualifiers
source                 1..1531
                       mol_type = genomic DNA
                       note = Variovorax sp. PMC12
                       organism = Variovorax sp.
SEQUENCE: 44
tatagagttt gatcctggct cagattgaac gctggcggca tgccttacac atgcaagtcg  60
aacggcagcg cgggagcaat cctggcggcg agtggcgaac gggtgagtaa tacatcggaa  120
cgtgcccaat cgtgggggat aacgcagcga aagctgtgct aataccgcat acgatctacg  180
gatgaaagca ggggatcgca agaccttgcg cgaatggagc ggccgatggc agattaggta  240
gttggtgagg taaaggctca ccaagccttc gatctgtagc tggtctgaga ggacgaccag  300
ccacactggg actgagacac ggcccagact cctacgggag gcagcagtgg ggaattttgg  360
acaatgggcg caagcctgat ccagccatgc cgcgtgcagg atgaaggcct tcgggttgta  420
aactgctttt gtacggaacg aaacggctct ttctaataaa gagggctaat gacggtaccg  480
taagaataag caccggctaa ctacgtgcca gcagccgcgg taatacgtag ggtgcaagcg  540
ttaatcggaa ttactgggcg taaagcgtgc gcaggcggtg atgtaagaca gttgtgaaat  600
ccccgggctc aacctgggaa ctgcatctgt gactgcatcg ctggagtacg gcagaggggg  660
atggaattcc gcgtgtagca gtgaaatgcg tagatatgcg gaggaacacc gatggcgaag  720
```

```
gcaatcccct gggcctgtac tgacgctcat gcacgaaagc gtggggagca aacaggatta  780
gataccctgg tagtccacgc cctaaacgat gtcaactggt tgttgggtct tcactgactc  840
agtaacgaag ctaacgcgtg aagttgaccg cctggggagt acggccgcaa ggttgaaact  900
caaaggaatt gacggggacc cgcacaagcg gtggatgatg tggtttaatt cgatgcaacg  960
cgaaaaacct tacccacctt tgacatgtac ggaatttgcc agagatggct tagtgctcga  1020
aagagaaccg taacacaggt gctgcatggc tgtcgtcagc tcgtgtcgtg agatgttggg  1080
ttaagtcccg caacgagcgc aacccttgtc attagttgct acattcagtt gggcactcta  1140
atgagactgc cggtgacaaa ccggaggaag gtggggatga cgtcaagtcc tcatggccct  1200
tataggtggg gctacacacg tcatacaatg gctggtacaa agggttgcca acccgcgagg  1260
gggagctaat cccataaaac cagtcgtagt ccggatcgca gtctgcaact cgactgcgtg  1320
aagtcggaat cgctagtaat cgtggatcag aatgtcacgg tgaatacgtt cccgggtctt  1380
gtacacaccg cccgtcacac catgggagcg ggttctgcca gaagtagtta gcttaaccgc  1440
aaggagggcg attaccacgg cagggttcgt gactggggtg aagtcgtaac aaggtagccg  1500
tatcggaagg tgcggctgga tcacctcctt t                                 1531

SEQ ID NO: 45          moltype = DNA  length = 1486
FEATURE                Location/Qualifiers
source                 1..1486
                       mol_type = genomic DNA
                       note = Nostoc sp. strain PCC 73102
                       organism = Nostoc sp.
SEQUENCE: 45
acggagagtt tgatcctggc tcaggatgaa cgctggcggt atgcttaaca catgcaagtc  60
gaacggtgtc ttcggacaca gtggcggacg ggtgagtaac gcgtgagaat ctggctctag  120
gtctgggaca accactggaa acggtggcta ataccggatg tgccgagagg tgaaaggtta  180
actgcctaga gatgagctcg cgtctgatta gctagtaggt agtgtaatgg actacctagg  240
cgacgatcag tagctggtct gagaggacga tcagccacac tgggactgag acacggccca  300
gactcctacg ggaggcagca gtggggaatt ttccgcaatg ggcgaaagcc tgacggagca  360
ataccgcgtg agggaggaag gctcttgggt cgtaaacctc ttttctcagg gaagaacaca  420
atgacggtac ctgaggaata agcatcggct aactccgtgc cagcagccgc ggtaatacgg  480
aggatgcaag cgttatccgg aatgattggg cgtaaagcgt ccgcaggtgg caatgtaagt  540
ctgctgttaa agagtctagc tcaactagat acaagcagtg gaaactacat agctagagta  600
cgttcggggc agagggaatt cctggtgtag cggtgaaatg cgtagagatc aggaagaaca  660
ccggtggcga aggcgctctg ctaggccgta actgacactg agggacgaaa gctaggggag  720
cgaatgggat tagatacccc agtagtccta gccgtaaacg atggatacta ggcgtggctt  780
gtatcgaccc gagccgtgcc gtagctaacg cgttaagtat cccgcctggg gagtacgccg  840
gcaacggtga aactcaaagg aattgacggg ggcccgcaca agcggtggag tatgtggttt  900
aattcgatgc aacgcgaaga accttaccaa ggcttgacat gtcgcgaatc ctggtgaaag  960
ccgggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tggctacac acgtactaca atgctccgga cagagggcag  1200
caagcatgcg aatgcaagca aatcccgtaa accggagctc agttcagatc gcaggctgca  1260
actcgcctgc gtgaaggagg aatcgctagt aattgcaggt cagcatactg cagtgaattc  1320
gttcccgggc cttgtacaca ccgcccgtca caccatggaa gctggtagtg cccgaagtca  1380
ttactccaac ctttcgggga ggaggatgcc taaggcagga ctggtgactg gggtgaagtc  1440
gtaacaaggt agccgtaccg gaaggtgtgg ctggatcacc tccttt                 1486

SEQ ID NO: 46          moltype = DNA  length = 1486
FEATURE                Location/Qualifiers
source                 1..1486
                       mol_type = genomic DNA
                       note = Novosphingobium sp. F2
                       organism = Novosphingobium sp.
SEQUENCE: 46
cttgagagtt tgatcctggc tcagaacgaa cgctggcggc atgcctaaca catgcaagtc  60
gaacgagatc ttcggatcta gtggcgcacg ggtgcgtaac gcgtgggaat ctgcccttgg  120
gttcggaata acagtgagaa attactgcta ataccggatg atgtcttcgg accaaagatt  180
tattgcccag ggatgagccc gcgtaggatt agctagttgg tggggtaatg gcctaccaag  240
gcgacgatcc ttagctggtc tgagaggatg atcagccaca ctgggactga gacacggccc  300
agactcctac gggaggcagc agtggggaat attggacaat gggcgaaagc ctgatccagc  360
aatgccgcgt gagtgatgaa ggccttaggg ttgtaaagct cttttaccag ggatgataat  420
gacagtacct ggagaataag ctccggctaa ctccgtgcca gcagccgcgg taatacggag  480
ggagctagcg ttgttcggaa ttactgggcg taaagcgcgc gtaggcggtt actcaagtca  540
gaggtgaaag cccggggctc aaccccggaa ctgcctttga aactaggtga ctagaatctt  600
ggagaggtca gtggaattcc gagtgtagag gtgaaattcg tagatattcg gaagaacacc  660
agtggcgaag gcgactgact ggacaagtat tgacgctgag gtgcgaaagc gtggggagca  720
aacaggatta gataccctgg tagtccacgc cgtaaacgat gataactagc tgtccgggta  780
cttggtactt gggtggcgca gctaacgcat taagttatcc gcctggggag tacggtcgca  840
agattaaaac tcaaaggaat tgacgggggc ctgcacaagc ggtggagcat gtggtttaat  900
tcgaagcaac gcgcagaacc ttaccagcgt ttgacatcct catcgcggat ttgagagatc  960
atttccttca gttcggctgg atgagtgaca ggtgctgcat ggctgtcgtc agctcgtgtc  1020
gtgagatgtt gggttaagtc ccgcaacgag cgcaaccctc gtccttagtt gccatcattt  1080
ggttgggcac tctaaggaaa ctgccggtga taagccggag gaaggtgggg atgacgtcaa  1140
gtcctcatgg cccttacacg ctgggctaca cacgtgctac aatggcggtg acagtgggca  1200
gcaagcacgc gagtgtgagc taatctccaa aagccgtctc agttcggatt gttctctgca  1260
actcgagagc atgaaggcgg aatcgctagt aatcgcggat cagcatgccg cggtgaatac  1320
gttcccaggc cttgtacaca ccgcccgtca caccatggga gttggattca cccgaaggcg  1380
ctgcgttaac ccgcaaggga gacaggcgac cacggtgggt ttagcgactg ggtgaagtc  1440
```

```
gtaacaaggt agccgtaggg gaacctgcgg ctggatcacc tccttt                1486

SEQ ID NO: 47          moltype = DNA  length = 1531
FEATURE                Location/Qualifiers
source                 1..1531
                       mol_type = genomic DNA
                       note = Variovorax sp. PMC12
                       organism = Variovorax sp.
SEQUENCE: 47
tatagagttt gatcctggct cagattgaac gctggcggca tgccttacac atgcaagtcg  60
aacggcagcg cgggagcaat cctggcggcg agtggcgaac gggtgagtaa tacatcggaa  120
cgtgcccaat cgtgggggat aacgcagcga aagctgtgct aataccgcat acgatctacg  180
gatgaaagca ggggatcgca agaccttgcg cgaatggagc ggccgatggc agattaggta  240
gttggtgagg taaaggctca ccaagccttc gatctgtagc tggtctgaga ggacgaccag  300
ccacactggg actgagacac ggcccagact cctacgggag gcagcagtgg ggaattttgg  360
acaatgggcg caagcctgat ccagccatgc cgcgtgcagg atgaaggcct tcgggttgta  420
aactgctttt gtacggaacg aaacggctct ttctaataaa gagggctaat gacggtaccg  480
taagaataag caccggctaa ctacgtgcca gcagccgcgg taatacgtag ggtgcaagcg  540
ttaatcggaa ttactgggcg taaagcgtgc gcaggcggtg atgtaagaca gttgtgaaat  600
ccccgggctc aacctgggaa ctgcatctgt gactgcatcg ctggagtacg gcagaggggg  660
atggaattcc gcgtgtagca gtgaaatgcg tagatatgcg gaggaacacc gatggcgaag  720
gcaatcccct gggcctgtac tgacgctcat gcacgaaagc gtggggagca aacaggatta  780
gataccctgg tagtccacgc cctaaacgat gtcaactggt tgttgggtct tcactgactc  840
agtaacgaag ctaacgcgtg aagttgaccg cctggggagt acggccgcaa ggttgaaact  900
caaaggaatt gacggggacc cgcacaagcg gtggatgatg tggtttaatt cgatgcaacg  960
cgaaaaacct tacccacctt tgacatgtac ggaatttgcc agagatggct tagtgctcga  1020
aagagaaccg taacacaggt gctgcatggc tgtcgtcagc tcgtgtcgtg agatgttggg  1080
ttaagtcccg caacgagcgc aacccttgtc attagttgct acattcagtt gggcactcta  1140
atgagactgc cggtgacaaa ccggaggaag gtggggatga cgtcaagtcc tcatggccct  1200
tataggtggg gctacacacg tcatacaatg gctggtacaa agggttgcca acccgcgagg  1260
gggagctaat cccataaaac cagtcgtagt ccggatcgca gtctgcaact cgactgcgtg  1320
aagtcggaat cgctagtaat cgtggatcag aatgtcacgg tgaatacgtt cccgggtctt  1380
gtacacaccg cccgtcacac catgggagcg ggttctgcca gaagtagtta gcttaaccgc  1440
aaggagggcg attaccacgg cagggttcgt gactggggtg aagtcgtaac aaggtagccg  1500
tatcggaagg tgcggctgga tcacctcctt t                                1531

SEQ ID NO: 48          moltype = DNA  length = 1481
FEATURE                Location/Qualifiers
source                 1..1481
                       mol_type = genomic DNA
                       organism = Zoogloea ramigera
SEQUENCE: 48
atgagagttt gatcctggct cagaacgaac gctggcggca ggcttaacac atgcaagtcg  60
aacgccccgc aaggggagtg gcagacgggt gagtaacgcg tgggaatcta cccatctcta  120
cggaataact cagggaaact tgtgctaata ccgtatacgc ccttcggggg aaagatttat  180
cggagatgga tgagcccgcg ttggattagc tagttggtgg ggtaaaggcc taccaaggcg  240
acgatccata gctggtctga gaggatgatc agccacattg ggactgagac acggcccaaa  300
ctcctacggg aggcagcagt ggggaatatt ggacaatggg cgcaagcctg atccagccat  360
gccgcgtgag tgatgaaggc cctagggttg taaagctctt tcaccggtga agataatgac  420
ggtaaccgga gaagaagccc cggctaactt cgtgccagca gccgcggtaa tacgaagggg  480
gctagcgttg ttcggaatta ctgggcgtaa agcgcacgta ggcgggtatt taagtcaggg  540
gtgaaatccc agagctcaac tctggaactg cctttgatac tgggtaccta gagtatggaa  600
gaggtgagtg gaattccgag tgtagaggtg aaattcgtag atattcggag gaacaccagt  660
ggcgaaggcg gctcactggt ccattactga cgctgaggtg cgaaagcgtg gggagcaaac  720
aggattagat accctggtag tccacgccgt aaacgatgaa tgttagccgt cggcatgcat  780
gcatgtcggt ggcgcagcta acgcattaaa cattccgcct ggggagtacg gtcgcaagat  840
taaaactcaa aggaattgac gggggcccgc acaagcggtg gagcatgtgg tttaattcga  900
agcaacgcgc agaaccttac cagcccttga catgtcggtc gcggattaca gagatgtttt  960
ccttcagtta ggctggaccg aacacaggtg ctgcatggct gtcgtcagct cgtgtcgtga  1020
gatgttgggt taagtcccgc aacgagcgca accctcgccc ttagttgcca gcattcagtt  1080
gggcactcta aggggactgc cggtgataag ccgagaggaa ggtggggatg acgtcaagtc  1140
ctcatggccc ttacgggctg ggctacacac gtgctacaat ggtggtgaca gtgggcagcg  1200
agacagcgat gtcgagctaa tctccaaaag ccatctcagt tcggattgca ctctgcaact  1260
cgagtgcatg aagttggaat cgctagtaat cgcggatcag catgccgcgg tgaatacgtt  1320
cccgggcctt gtacacaccg cccgtcacac catgggagtt ggttttaccc gaaggcgatg  1380
cgctaaccgc aaggaggcag tcgaccacgg tagggtcagc gactggggtg aagtcgtaac  1440
aaggtagccg taggggaacc tgcggctgga tcacctcctt t                     1481

SEQ ID NO: 49          moltype = DNA  length = 1511
FEATURE                Location/Qualifiers
source                 1..1511
                       mol_type = genomic DNA
                       note = uncultured bacterium
                       organism = unidentified
SEQUENCE: 49
atggagagtt tgatcctggc tcaggatgaa cgctagcggc aggcctaata catgcaagtc  60
gaaggggcag caatgtcact ggcgcacggg tgcgtaacac gtttggaatc tgcctcatat  120
tgggggatag cccgccgaaa ggcggattaa taccgcatat gccgatggtc tggcatcaga  180
cagtcgggaa aggtcgcaag gccgatatga gatgaccatg cgtctgatta gctagttggc  240
```

```
ggggtaaagg cccaccaagg cgacgatcag taggggacct gagagggcga tcccccacac  300
ggacactgag atacgggtcc gactcctacg ggaggcagca gtagggaata ttgggcaatg  360
ggcgcaagcc tgacccagcc atgccgcgtg caggaagaag gccctctggg ttgtaaactg  420
cttttgacgg ggaagaaacg actcttgcga gaggcattga cggtacccgc agaataagca  480
ccggctaact ccgtgccagc agccgcggta atacggaggg tgcaagcgtt gtccggattt  540
attgggttta aagggtgcgt aggcggtctg gtaagtcggc gatgaaagcc cggggctcaa  600
ccccggaact gtcgtcgata ctgttggact tgagtacggt tgaggctggc ggaatgggcg  660
gtgtagcggt gaaatgcata gataccgtcc agaaccccga ttgcgaaggc agctggctaa  720
gccgtaactg acgctgaggc acgaaagcgt ggggagcgaa caggattaga taccctggta  780
gtccacgccg taaacgatgg atactcgccg tgggcaatag atcgtccgcg gctcagcgaa  840
agcggtaagt atcccacctg gggagtacgc cggcaacggt gaaactcaaa ggaattgacg  900
ggggcccgca caagtggtgg agcatgtggt ttaattcgat gatacgcgag gaaccttacc  960
tgggctagaa tgtgcgtgaa ggcatcagaa atggtgctgt ccttcgggac acaaaacaag  1020
gtgctgcatg gccgtcgtca gctcgtgccg tgaggtgttg ggttaagtcc cgcaacgagc  1080
gcaaccccta catttagttg ccagcgcgtc aaggcgggga ctctagatgg actgcctccg  1140
caaggagtga ggaaggcggg gacgacgtca ggtcatcatg gcccttacgc ccagggctac  1200
acacgtgcta caatggccgg tacagcgggt tgcgacacag cgatgtgaag ccaatctctc  1260
taaagccggt ctcagttcgg atcggagtct gcaactcgac tccgtgaagc tggaatcact  1320
agtaatcgcg tatcagcaat gacgcggtga atacgttccc gggccttgta cacaccgccc  1380
gtcaagccat ggaagttcgg tggacctgaa gacggtgcgc gtcacagcag ccgtttaggg  1440
taaaacgagt aactagggct aagtcgtaac aaggtagccg taccggaagg tgcggctgga  1500
tcacctcctt t                                                      1511

SEQ ID NO: 50          moltype = DNA  length = 1479
FEATURE                Location/Qualifiers
source                 1..1479
                       mol_type = genomic DNA
                       note = uncultured bacterium
                       organism = unidentified
SEQUENCE: 50
ctgaagagtt tgatcctggc tcagattgaa cgctggcggc atgccttaca catgcaagtc  60
gaacggcagc gcggggcaac ctggcggcga gtggcgaacg ggtgagtaat atatcggaac  120
ataccctaga gtgggggata acgtagcgaa agttacgcta ataccgcata cgcactaagg  180
tggaaagcgg gggatcgcaa gacctcgtgc tcatggagtg gccgatatct gattagctag  240
ttggtagggt aaaagcctac caaggcgacg atcagtagct ggtttgagag aacgaccagc  300
cacactggaa ctgagacacg gtccagactc ctacgggagg cagcagtggg gaattttgga  360
caatgggggc aaccctgatc cagcaatgcc gcgtgagtga agaaggccct cgggttgtaa  420
agctcttttg tcagggaaga aacggtctac tctaatacag tgggctaatg acggtacctg  480
aagaataagc accggctaac tacgtgccag cagccgcggt aatacgtagg gtgcaagcgt  540
taatcggaat tactgggcgt aaagcgtgcg caggcggttt tataagtctg atgtgaaatc  600
cccgggctca acctgggaac tgcattggag actgtaaggc tagagtgtgt cagagggggg  660
tagaattcca cgtgtagcag tgaaatgcgt agatatgtgg aggaataccg atggcgaagg  720
cagccccctg ggataacact gacgctcatg cacgaaagcg tggggagcaa acaggattag  780
ataccctggt agtccacgcc ctaaacgatg tctactagtt gtcgggtctt aattgacttg  840
gtaacgcagc taacgcgtga agtagaccgc ctggggagta cggtcgcaag attaaaactc  900
aaaggaattg acggggaccc gcacaagcgg tggatgatgt ggattaattc gatgcaacgc  960
gaaaaacctt acctaccctt gacatggaag gaatcccgaa gagatttggg agtgctcgaa  1020
agagaacctt tacacaggtg ctgcatggct gtcgtcagct cgtgtcgtga gatgttgggt  1080
taagtcccgc aacgagcgca acccttgtca ttagttgcta cgaaagggca ctctaatgag  1140
actgccggtg acaaaccgga ggaaggtggg gatgacgtca agtcctcatg gcccttatgg  1200
gtagggcttc acacgtcata caatggtaca tacagagggc cgccaacccg cgaggggggag  1260
ctaatcccag aaagtgtatc gtagtccgga ttgtagtctg caactcgact acatgaagtt  1320
ggaatcgcta gtaatcgcgg atcagcatgt cgcggtgaat acgttcccgg gtcttgtaca  1380
caccgcccgt cacaccatgg gagcgggttc tgccagaagt agttagctta accgcaagga  1440
gggcgattac cacggcaggg ttcgtgactg gggtgaagt                        1479

SEQ ID NO: 51          moltype = DNA  length = 1486
FEATURE                Location/Qualifiers
source                 1..1486
                       mol_type = genomic DNA
                       note = Nostoc sp. strain PCC 73102
                       organism = Nostoc sp.
SEQUENCE: 51
acggagagtt tgatcctggc tcaggatgaa cgctggcggt atgcttaaca catgcaagtc  60
gaacggtgtc ttcggacaca gtggcggacg ggtgagtaac gcgtgagaat ctggctctag  120
gtctgggaca accactggaa acggtggcta ataccggatg tgccgagagg tgaaaggtta  180
actgcctaga gatgagctcg cgtctgatta gctagtaggt agtgtaatgg actacctagg  240
cgacgatcag tagctggtct gagaggacga tcagccacac tgggactgag acacggccca  300
gactcctacg ggaggcagca gtggggaatt ttccgcaatg ggcgaaagcc tgacggagca  360
ataccgcgtg agggaggaag gctcttgggt cgtaaacctc ttttctcagg gaagaacaca  420
atgacggtac ctgaggaata agcatcggct aactccgtgc cagcagccgc ggtaatacgg  480
aggatgcaag cgttatccgg aatgattggg cgtaaagcgt ccgcaggtgg caatgtaagt  540
ctgctgttaa agagtctagc tcaactagat acaagcagtg gaaactacat agctagagta  600
cgttcggggc agagggaatt cctggtgtag cggtgaaatg cgtagagatc aggaagaaca  660
ccggtggcga aggcgctctg ctaggccgta actgacactg agggacgaaa gctaggggag  720
cgaatgggat tagataccc agtagtccta gccgtaaacg atggatacta ggcgtggctt  780
gtatcgaccc gagccgtgcc gtagctaacg cgttaagtat cccgcctggg gagtacgccg  840
gcaacggtga aactcaaagg aattgacggg ggcccgcaca agcggtggag tatgtggttt  900
aattcgatgc aacgcgaaga accttaccaa ggcttgacat gtcgcgaatc ctggtgaaag  960
```

-continued

```
ccgggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctccgga cagagggcag  1200
caagcatgcg aatgcaagca aatcccgtaa accggagctc agttcagatc gcaggctgca  1260
actcgcctgc gtgaaggagg aatcgctagt aattgcaggt cagcatactg cagtgaattc  1320
gttcccgggc cttgtacaca ccgcccgtca caccatggaa gctggtagtg cccgaagtca  1380
ttactccaac ctttcgggga ggaggatgcc taaggcagga ctggtgactg ggtgaagtc   1440
gtaacaaggt agccgtaccg gaaggtgtgg ctggatcacc tccttt                 1486

SEQ ID NO: 52           moltype = DNA  length = 1484
FEATURE                 Location/Qualifiers
source                  1..1484
                        mol_type = genomic DNA
                        note = Bosea sp. R-45681
                        organism = Bosea sp.
SEQUENCE: 52
tctgagagtt tgatcctggc tcagagcgaa cgctggcggc aggcttaaca catgcaagtc  60
gaacgggcac ttcggtgcta gtggcagacg ggtgagtaac acgtgggaac gtacctttcg  120
gttcggaata attcagggaa acttggacta ataccggata cgcccttcgg gggaaagatt  180
tatcgccgat agatcggccc gcgtctgatt agctagttgg tgaggtaatg gctcaccaag  240
gcgacgatca gtagctggtc tgagaggatg atcagccaca ttgggactga gacacggccc  300
aaactcctac gggaggcagc agtggggaat attggacaat gggcgcaagc ctgatccagc  360
catgccgcgt gagtgatgaa ggccttaggg ttgtaaagct cttttgtccg ggaagataat  420
gactgtaccg gaagaataag ccccggctaa cttcgtgcca gcagccgcgg taatacgaag  480
ggggctagcg ttgctcggaa tcactgggcg taaagggcgc gtaggcggac tcttaagtcg  540
gggtgaaag cccagggctc aaccctggaa ttgccttcga tactgagagt cttgagttcg  600
gaagaggttg gtggaactgc gagtgtagag gtgaaattcg tagatattcg caagaacacc  660
agtggcgaag gcggccaact ggtccgatac tgacgctgag gcgcgaaagc gtggggagca  720
aacaggatta gataccctgg tagtccacgc cgtaaacgat gaatgccagc cgttggggtg  780
catgcacttc agtggcgcag ctaacgcttt aagcattccg cctggggagt acggtcgcaa  840
gattaaaact caaaggaatt gacgggggcc cgcacaagcg gtggagcatg tggtttaatt  900
cgaagcaacg cgcagaacct taccagcttt tgacatgtcc ggtttgatcg gcagagatgc  960
ctttcttcag ttcggctggc cggaacacag gtgctgcatg gctgtcgtca gctcgtgtcg  1020
tgagatgttg ggttaagtcc cgcaacgagc gcaaccctcg cccctagttg ccatcattca  1080
gttgggaact ctagggggac tgccggtgat aagccgcgag gaaggtgggg atgacgtcaa  1140
gtcctcatgg cccttacagg ctgggctaca cacgtgctac aatggcggtg acaatgggca  1200
gcgaaagggc gacctcgagc taatcccaaa aagccgtctc agttcagatt gtactctgca  1260
actcgagtac atgaaggtgg aatcgctagt aatcgtggat cagcatgcca cggtgaatac  1320
gttcccgggc cttgtacaca ccgcccgtca caccatggga gttgggttta cccgaaggcg  1380
tcgcgctaac cgcaaggagg caggcgacca cggtaggctc agcgactggg gtgaagtcgt  1440
aacaaggtag ccgtagggga acctgcggct ggatcacctc cttt                   1484

SEQ ID NO: 53           moltype = DNA  length = 1483
FEATURE                 Location/Qualifiers
source                  1..1483
                        mol_type = genomic DNA
                        organism = Caulobacter segnis
SEQUENCE: 53
cctgagagtt tgatcctggc tcagagcgaa cgctggcggc aggcctaaca catgcaagtc  60
gaacggatcc ttcgggatta gtggcggacg ggtgagtaac acgtgggaac gtgccctttg  120
gttcggaaca actcagggaa acttgagcta ataccggatg tgcccttcgg gggaaagatt  180
tatcgccatt ggagcggccc gcgtctgatt agctagttgg tgaggtaaag gctcaccaag  240
gcgacgatca gtagctggtc tgagaggatg atcagccaca ttgggactga gacacggccc  300
aaactcctac gggaggcagc agtggggaat cttgcgcaat gggcgaaagc ctgacgcagc  360
catgccgcgt gaatgatgaa ggtcttagga ttgtaaaatt ctttcaccgg ggacgataat  420
gacggtaccc ggagaagaag ccccggctaa cttcgtgcca gcagccgcgg taatacgaag  480
ggggctagcg ttgctcggaa ttactgggcg taaagggagc gtaggcggac tgttaagtta  540
gaggtgaaag cccagggctc aaccttggaa ttgcctttga tactggcagt cttgagtacg  600
gaagaggtat gtggaactcc gagtgtagag gtgaaattcg tagatattcg gaagaacacc  660
agtggcgaag gcgacatact ggtccgttac tgacgctgag gctcgaaagc gtggggagca  720
aacaggatta gataccctgg tagtccacgc cgtaaacgat gagtgctagt tgtcggcatg  780
catgcatgtc ggtgacgcag ctaacgcatt aagcactccg cctggggagt acggtcgcaa  840
gattaaaact caaaggaatt gacgggggcc cgcacaagcg gtggagcatg tggtttaatt  900
cgaagcaacg cgcagaacct taccaccttt tgacatgccc ggaccaccag agagatctgg  960
ctttcccttc ggggactggg acacaggtgc tgcatggctg tcgtcagctc gtgtcgtgag  1020
atgttgggtt aagtcccgca acgagcgcaa ccctcgcgat tagttgccat caggtttggc  1080
tgggcactct aatcgtactg ccggagttaa tccggaggaa ggcggggatg acgtcaagtc  1140
ctcatggccc ttacaaggtg ggctacacac gtgctacaat ggcgactaca gagggttgca  1200
atcccgcgag gggggagccaa tccctaaaag tcgtctcagt tcggattgtt ctctgcaact  1260
cgagagcatg aagttggaat cgctagtaat cgcggatcag catgccgcgg tgaatacgtt  1320
cccgggcctt gtacacaccg cccgtcacac catgggagtt ggctttaccc gaaggcgctg  1380
cgctaactcg caagagaggc aggcgaccac ggtagggtca gcgactgggg tgaagtcgta  1440
acaaggtagc cgtaggggaa cctgcggctg gatcacctcc ttt                    1483

SEQ ID NO: 54           moltype = DNA  length = 1486
FEATURE                 Location/Qualifiers
source                  1..1486
                        mol_type = genomic DNA
```

```
                         organism = Anabaena flosaquae
SEQUENCE: 54
acggagagtt tgatcctggc tcaggatgaa cgctggcggt atgcttaaca catgcaagtc  60
gaacggtgtc ttcggacata gtggcggacg ggtgagtaac gcgtgagaat ctagcttcag  120
gtctgggaca accactggaa acggtggcta ataccggatg tgccggaagg tgaaaggctt  180
gctgcctgaa gatgagctcg cgtccgatta gctagtaggt ggggtaagag cctacctagg  240
cgacgatcgg tagctggtct gagaggatga ccagccacac tgggactgag acacggccca  300
gactcctacg ggaggcagca gtggggaatt ttccgcaatg ggcgaaagcc tgacggagca  360
ataccgcgtg agggaggaag gctcttgggt tgtaaacctc ttttctcagg gaagaacaca  420
atgacggtac ctgaggaatc agcatcggct aactccgtgc cagcagccgc ggtaatacgg  480
aggatgcaag cgttatccgg aatgattggg cgtaaagcgt ccgcaggtgg ctgtgtaagt  540
ctgctgtcaa agagcaaagc tcaactttgt aaaggcagtg gaaactacac ggctagagtg  600
cgttcggggc agagggaatt cctggtgtag cggtgaaatg cgtagagatc aggaagaaca  660
ccggtggcga aggcgctctg ctaggccgca actgacactg agggacgaaa gctaggggag  720
cgaatgggat tagatacccc agtagtccta gctgtaaacg atggatacta ggcgtggctt  780
gtatcgaccc gagccgtgcc gtagctaacg cgttaagtat cccgcctggg gagtacgcac  840
gcaagtgtga aactcaaagg aattgacggg ggcccgcaca agcggtggag tatgtggttt  900
aattcgatgc aacgcgaaga accttaccaa ggcttgacat gtcgcgaact cttctgaaag  960
gaagaggtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctacgga cagagggcag  1200
caagctagcg atagcaagct aatcccataa accgtggctc agttcagatc gaaggctgca  1260
actcgccttc gtgaaggagg aatcgctagt aattgcaggt cagcatactg cagtgaattc  1320
gttcccgggc cttgtacaca ccgcccgtca caccatggaa gctggcaacg cccgaagtca  1380
ttactccaac ctttcgaggg ggaggatgcc taaggcagtg ctggtgactg gggtgaagtc  1440
gtaacaaggt agccgtaccg gaaggtgtgg ctggatcacc tccttt                1486

SEQ ID NO: 55            moltype = DNA  length = 1484
FEATURE                  Location/Qualifiers
source                   1..1484
                         mol_type = genomic DNA
                         organism = Bosea sp.
SEQUENCE: 55
tctgagagtt tgatcctggc tcagagcgaa cgctggcggc aggcttaaca catgcaagtc  60
gaacgggcac ttcggtgcta gtggcagacg ggtgagtaac acgtgggaac gtacctttcg  120
gttcggaata attcagggaa acttggacta ataccggata cgcccttcgg gggaaagatt  180
tatcgccgat agatcggccc gcgtctgatt agctagttgg tgaggtaatg gctcaccaag  240
gcgacgatca gtagctggtc tgagaggatg atcagccaca ttgggactga gacacggccc  300
aaactcctac gggaggcagc agtggggaat attggacaat gggcgcaagc ctgatccagc  360
catgccgcgt gagtgatgaa ggccttaggg ttgtaaagct cttttgtccg ggaagataat  420
gactgtaccg gaagaataag ccccggctaa cttcgtgcca gcagccgcgg taatacgaag  480
ggggctagcg ttgctcggaa tcactgggcg taaagggcgc gtaggcggac tcttaagtcg  540
ggggtgaaag cccagggctc aaccctggaa ttgccttcga tactgagagt cttgagttcg  600
gaagaggttg gtggaactgc gagtgtagag gtgaaattcg tagatattcg caagaacacc  660
agtggcgaag gcggccaact ggtccgatac tgacgctgag gcgcgaaagc gtggggagca  720
aacaggatta gataccctgg tagtccacgc cgtaaacgat gaatgccagc cgttggggtg  780
catgcacttc agtggcgcag ctaacgcttt aagcattccg cctggggagt acggtcgcaa  840
gattaaaact caaaggaatt gacgggggcc cgcacaagcg gtggagcatg tggtttaatt  900
cgaagcaacg cgcagaacct taccagcttt tgacatgtcc ggtttgatcg gcagagatgc  960
ctttcttcag ttcggctggc cggaacacag gtgctgcatg gctgtcgtca gctcgtgtcg  1020
tgagatgttg ggttaagtcc cgcaacgagc gcaaccctcg cccctagttg ccatcattca  1080
gttgggaact ctagggggac tgccggtgat aagccgcgag gaaggtgggg atgacgtcaa  1140
gtcctcatgg cccttacagg ctgggctaca cacgtgctac aatggcggtg acaatgggca  1200
gcgaaagggc gacctcgagc taatcccaaa aagccgtctc agttcagatt gtactctgca  1260
actcgagtac atgaaggtgg aatcgctagt aatcgtggat cagcatgcca cggtgaatac  1320
gttcccgggc cttgtacaca ccgcccgtca caccatggga gttgggttta cccgaaggcg  1380
tcgcgctaac cgcaaggagg caggcgacca cggtaggctc agcgactggg gtgaagtcgt  1440
aacaaggtag ccgtagggga acctgcggct ggatcacctc cttt                  1484

SEQ ID NO: 56            moltype = DNA  length = 1482
FEATURE                  Location/Qualifiers
source                   1..1482
                         mol_type = genomic DNA
                         organism = Caulobacter ginsengisoli
SEQUENCE: 56
ctgagagttt gatcctggct cagagcgaac gctggcggca ggcctaacac atgcaagtcg  60
aacggatcct tcgggattag tggcggacgg gtgagtaaca cgtgggaacg tgcctttagg  120
ttcggaacaa ctcagggaaa cttgagctaa taccgaatgt gcccttcggg ggaaagattt  180
atcgccttta gagcggcccg cgtctgatta gctagttggt gaggtaaagg ctcaccaagg  240
ctacgatcag tagctggtct gagaggatga tcagccacat tgggactgag acacggccca  300
aactcctacg ggaggcagca gtggggaatc ttgcgcaatg ggcgaaagcc tgacgcagcc  360
atgccgcgtg aatgatgaag gtcttaggat tgtaaaattc tttcaccggg gacgataatg  420
acggtacccg gagaagaagc cccggctaac ttcgtgccag cagccgcggt aatacgaagg  480
gggctagcgt tgctcggaat tactgggcgt aaagggagcg taggcggaca gtttagtcag  540
aggtgaaagc ccagggctca accttggaat tgcctttgat actgactgtc ttgagtttgg  600
gagaggtgtg tggaactccg agtgtagagg tgaaattcgt agatattcgg aagaacacca  660
gtggcgaagg cgacacactg gcccaatact gacgctgagg ctcgaaagcg tggggagcaa  720
acaggattag ataccctggt agtccacgcc gtaaacgatg agtgctagtt gtcggcatgc  780
```

```
atgcatgtcg gtgacgcagc taacgcatta agcactccgc ctggggagta cggtcgcaag  840
attaaaactc aaaggaattg acgggggccc gcacaagcgg tggagcatgt ggtttaattc  900
gaagcaacgc gcagaacctt accacctttt gacatgtccg gctaacctca gagatgaggc  960
gttcccttcg ggaccggaa cacaggtgct gcatggctgt cgtcagctcg tgtcgtgaga  1020
tgttgggtta agtcccgcaa cgagcgcaac cctcactgtt agttgccaac aggtttggct  1080
gggcactcta acaggactgc cggagttaat ccggaggaag gcggggatga cgtcaagtcc  1140
tcatggccct tacaaggtgg gctacacacg tgctacaatg gcgactacag agggctgcaa  1200
tcccgcgagg gtgagccaat ccccaaaagt cgtctcagtt cggattgttc tctgcaactc  1260
gagagcatga agtcggaatc gctagtaatc gcggatcagc atgccgcggt gaatacgttc  1320
ccgggccttg tacacaccgc ccgtcacacc atgggagttg gctttacccg aaggcggtgc  1380
gctaaccagc aatggaggca gccgaccacg gtagggtcag cgactggggt gaagtcgtaa  1440
caaggtagcc gtaggggaac ctgcggctgg atcacctcct tt                    1482

SEQ ID NO: 57          moltype = DNA  length = 1486
FEATURE                Location/Qualifiers
source                 1..1486
                       mol_type = genomic DNA
                       organism = Anabaena flosaquae
SEQUENCE: 57
acggagagtt tgatcctggc tcaggatgaa cgctggcggt atgcttaaca catgcaagtc  60
gaacggtgtc ttcggacata gtggcggacg ggtgagtaac gcgtgagaat ctagcttcag  120
gtctgggaca accactggaa acggtggcta ataccggatg tgccggaagg tgaaaggctt  180
gctgcctgaa gatgagctcg cgtccgatta gctagtaggt ggggtaagag cctacctagg  240
cgacgatcgg tagctggtct gagaggatga ccagccacac tgggactgag acacggccca  300
gactcctacg ggaggcagca gtggggaatt ttccgcaatg ggcgaaagcc tgacggagca  360
ataccgcgtg agggaggaag gctcttgggt tgtaaacctc ttttctcagg gaagaacaca  420
atgacggtac ctgaggaatc agcatcggct aactccgtgc cagcagccgc ggtaatacgg  480
aggatgcaag cgttatccgg aatgattggg cgtaaagcgt ccgcaggtgg ctgtgtaagt  540
ctgctgtcaa agagcaaagc tcaactttgt aaaggcagtg gaaactacac ggctagagtg  600
cgttcggggc agagggaatt cctggtgtag cggtgaaatg cgtagagatc aggaagaaca  660
ccggtggcga aggcgctctg ctaggccgca actgacactg agggacgaaa gctaggggag  720
cgaatgggat tagataccc agtagtccta gctgtaaacg atggatacta ggcgtggctt  780
gtatcgaccc gagccgtgcc gtagctaacg cgttaagtat cccgcctggg gagtacgcac  840
gcaagtgtga aactcaaagg aattgacggg ggcccgcaca agcggtggag tatgtggttt  900
aattcgatgc aacgcgaaga accttaccaa ggcttgacat gtcgcgaact cttctgaaag  960
gaagaggtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctacgga cagagggcag  1200
caagctagcg atagcaagct aatcccataa accgtggctc agttcagatc gaaggctgca  1260
actcgccttc gtgaaggagg aatcgctagt aattgcaggt cagcatactg cagtgaattc  1320
gttcccgggc cttgtacaca ccgcccgtca caccatggaa gctggcaacg cccgaagtca  1380
ttactccaac ctttcgaggg ggaggatgcc taaggcagtg ctggtgactg gggtgaagtc  1440
gtaacaaggt agccgtaccg gaaggtgtgg ctggatcacc tccttt                1486

SEQ ID NO: 58          moltype = DNA  length = 1480
FEATURE                Location/Qualifiers
source                 1..1480
                       mol_type = genomic DNA
                       organism = Methylobacterium brachiatum
SEQUENCE: 58
tgagagtttg atcctggctc agagcgaacg ctggcggcag gcttaacaca tgcaagtcga  60
gcgggccctt tcgggggtca gcggcggacg ggtgagtaac gcgtgggaac gtgccctctg  120
gttcggaata actcagggaa acttgagcta ataccggata cgccctttg gggaaaggct  180
tgctgccgga ggatcggccc gcgtctgatt agctagttgg tgaggtaacg gctcaccaag  240
gcgacgatca gtagctggtc tgagaggatg atcagccaca ctgggactga gacacggccc  300
agactcctac gggaggcagc agtggggaat attggacaat gggcgcaagc ctgatccagc  360
catgccgcgt gagtgatgaa ggccttaggg ttgtaaagct cttttatccg ggacgataat  420
gacggtaccg gaggaataag ccccggctaa cttcgtgcca gcagccgcgg taatacgaag  480
ggggctagcg ttgctcggaa tcactgggcg taaagggcgc gtaggcggcg ttttaagtcg  540
gggtgaaag cctgtggctc aaccacagaa tggccttcga tactgggacg cttgagtatg  600
gtagaggttg gtggaactgc gagtgtagag gtgaaattcg tagatattcg caagaacacc  660
ggtggcgaag gcggccaact ggaccattac tgacgctgag gcgcgaaagc gtggggagca  720
aacaggatta gataccctgg tagtccacgc cgtaaacgat gaatgccagc tgttggggtg  780
cttgcacctc agtagcgcag ctaacgcttt gagcattccg cctggggagt acggtcgcaa  840
gattaaaact caaaggaatt gacgggggcc cgcacaagcg gtggagcatg tggtttaatt  900
cgaagcaacg cgcagaacct taccatcctt tgacatggcg tgttacgtgg agagattcac  960
ggtccacttc ggtggcgcgc acacaggtgc tgcatggctg tcgtcagctc gtgtcgtgag  1020
atgttgggtt aagtcccgca acgagcgcaa cccacgtcct tagttgccat cattcagttg  1080
ggcactctag ggagactgcc ggtgataagc cgcgaggaag gtgtggatga cgtcaagtcc  1140
tcatggccct tacgggatgg gctacacacg tgctacaatg gcggtgacag tgggacgcga  1200
aggggcgacc tggagcaaat ccccaaaagc cgtctcagtt cggattgcac tctgcaactc  1260
gggtgcatga aggcggaatc gctagtaatc gtggatcagc atgccacggt gaatacgttc  1320
ccgggccttg tacacaccgc ccgtcacacc atgggagttg gtcttacccg acggcgctgc  1380
gccaaccgca aggaggcagg cgaccacggt agggtcagcg actggggtga agtcgtaaca  1440
aggtagccgt aggggaacct gcggctggat cacctccttt                       1480

SEQ ID NO: 59          moltype = DNA  length = 1486
FEATURE                Location/Qualifiers
```

```
source                1..1486
                      mol_type = genomic DNA
                      organism = Sphingopyxis macrogoltabida
SEQUENCE: 59
cttgagagtt tgatcctggc tcagaacgaa cgctggcggc atgcctaaca catgcaagtc  60
gaacgaactc ttcggagtta gtggcgcacg ggtgcgtaac gcgtgggaat ctgcccttgg  120
gtacggaata actcagagaa atttgtgcta ataccgtata atgacttcgg tccaaagatt  180
tatcgcccaa ggatgagccc gcgtaagatt agctagttgg tggggtaaaa gcctaccaag  240
gcgacgatct ttagctggtc tgagaggatg atcagccaca ctgggactga gacacggccc  300
agactcctac gggaggcagc agtggggaat attggacaat gggcgaaagc ctgatccagc  360
aatgccgcgt gagtgatgaa ggccctaggg ttgtaaagct cttttacccg ggatgataat  420
gacagtaccg ggagaataag ctccggctaa ctccgtgcca gcagccgcgg taatacggag  480
ggagctagcg ttgttcggaa ttactgggcg taaagcgcgc gtaggcggtt ttttaagtca  540
gaggtgaaag cccagtgctc aacactggaa ctgcctttga aactggaaaa cttgaatctt  600
ggagaggtca gtggaattcc gagtgtagag gtgaaattcg tagatattcg gaagaacacc  660
agtggcgaag gcgactgact ggacaagtat tgacgctgag gtgcgaaagc gtggggagca  720
aacaggatta gataccctgg tagtccacgc cgtaaacgat gataactagc tgtccgggtt  780
catagaactt gggtggcgca gctaacgcat taagttatcc gcctggggag tacggtcgca  840
agattaaaac tcaaaggaat tgacgggggc ctgcacaagc ggtggagcat gtggtttaat  900
tcgaagcaac gcgcagaacc ttaccagcgt ttgacatcct gatcgcggat tagagagatc  960
ttttccttca gttcggctgg atcagtgaca ggtgctgcat ggctgtcgtc agctcgtgtc  1020
gtgagatgtt gggttaagtc ccgcaacgag cgcaaccctc atccctagtt gccatcattc  1080
agttgggcac tctaaggaaa ctgccggtga taagccggag gaaggtgggg atgacgtcaa  1140
gtcctcatgg cccttacgcg ctgggctaca cacgtgctac aatggcggtg acagtgggca  1200
gcaaccgggc gaccggtagc taatctccaa aaaccgtctc agttcggatt gttctctgca  1260
actcgagagc atgaaggcgg aatcgctagt aatcgcggat cagcatgccg cggtgaatac  1320
gttcccaggc cttgtacaca ccgcccgtca caccatggga gttggtttca cccgaaggca  1380
gtgctctaac ccgcaaggga ggaagctgac cacggtggga tcagcgactg ggtgaagtc   1440
gtaacaaggt agccgtaggg gaacctgcgg ctggatcacc tccttt                 1486

SEQ ID NO: 60         moltype = DNA  length = 1533
FEATURE               Location/Qualifiers
source                1..1533
                      mol_type = genomic DNA
                      note = Pseudomonas sp. NFR16
                      organism = Pseudomonas sp.
SEQUENCE: 60
ctgaagagtt tgatcatggc tcagattgaa cgctggcggc aggcctaaca catgcaagtc  60
gagcggatga agggagcttg ctccctgatt cagcggcgga cgggtgagta atgcctagga  120
atctgcctgg tagtggggga caacgtctcg aaagggacgc taataccgca tacgtcctac  180
gggagaaagc aggggacctt cgggccttgc gctatcagat gagcctaggt cggattagct  240
agttggtgag gtaatggctc accaaggcga cgatccgtaa ctggtctgag aggatgatca  300
gtcacactgg aactgagaca cggtccagac tcctacggga ggcagcagtg gggaatattg  360
gacaatgggc gaaagcctga tccagccatg ccgcgtgtgt gaagaaggtc ttcggattgt  420
aaagcacttt aagttgggag gaagggttgt agattaatac tctgcaattt tgacgttacc  480
gacagaataa gcaccggcta actctgtgcc agcagccgcg gtaatacaga gggtgcaagc  540
gttaatcgga attactgggc gtaaagcgcg cgtaggtggt ttgttaagtt gaatgtgaaa  600
tccccgggct caacctggga actgcatcca aaactggcaa gctagagtag ggcagagggt  660
ggtggaattt cctgtgtagc ggtgaaatgc gtagatatag gaaggaacac cagtggcgaa  720
ggcgaccacc tgggctcata ctgacactga ggtgcgaaag cgtggggagc aaacaggatt  780
agataccctg gtagtccacg ccgtaaacga tgtcaactag ccgttgggag tcttgaactc  840
ttagtggcgc agctaacgca ttaagttgac cgcctgggga gtacggccgc aaggttaaaa  900
ctcaaatgaa ttgacggggg cccgcacaag cggtggagca tgtggtttaa ttcgaagcaa  960
cgcgaagaac cttaccaggc cttgacatcc agtgaactta ccagagatgg tttggtgcct  1020
tcgggaacac tgagacaggt gctgcatggc tgtcgtcagc tcgtgtcgtg agatgttggg  1080
ttaagtcccg taacgagcgc aacccttgtc cttagttacc agcacgttaa ggtgggcact  1140
ctaaggagac tgccggtgac aaaccggagg aaggtgggga tgacgtcaag tcatcatggc  1200
ccttacggcc tgggctacac acgtgctaca atggtcggta cagagggttg ccaagccgcg  1260
aggtggagct aatcccacaa aaccgatcgt agtccggatc gcagtctgca actcgactgc  1320
gtgaagtcgg aatcgctagt aatcgcgaat cagaatgtcg cggtgaatac gttcccgggc  1380
cttgtacaca ccgcccgtca caccatggga gtgggttgca ccagaagtag ctagtctaac  1440
cttcgggagg acggttacca cggtgtgatt catgactggg gtgaagtcgt aacaaggtag  1500
ccgtagggga acctgcggct ggatcacctc ctt                               1533

SEQ ID NO: 61         moltype = DNA  length = 1486
FEATURE               Location/Qualifiers
source                1..1486
                      mol_type = genomic DNA
                      note = Nostoc sp. UAM 307
                      organism = Nostoc sp.
SEQUENCE: 61
acggagagtt tgatcctggc tcaggatgaa cgctggcggt atgcttaaca catgcaagtc  60
gaacggtgtc ttcggacata gtggcggacg ggtgagtaac gcgtgagaat ctagcttcag  120
gtctaggaca accactggaa acggtggcta atactggatg tgccggaagg tgaaaggctt  180
gctgcctgaa gatgagctcg cgtctgatta gctagttggt ggggtaagag cctaccaagg  240
cgacgatcag tagctggtct gagaggatga tcagccacac tgggactgag acacggccca  300
gactcctacg ggaggcagca gtggggaatt ttccgcaatg ggcgaaagcc tgacggagca  360
ataccgcgtg agggaggaag gctcttgggt tgtaaacctc ttttctcagg gaagaacaca  420
atgacggtac ctgaggaatc agcatcggct aactccgtgc cagcagccgc ggtaatacgg  480
```

```
aggatgcaag cgttatccgg aatgattggg cgtaaagcgt ccgcaggtgg ctgtgtaagt  540
ctgctgttaa agagtctagc tcaactagat aaaggcagtg gaaactacac ggctagagtg  600
cgttcggggc agagggaatt cctggtgtag cggtgaaatg cgtagagatc aggaagaaca  660
ccggtggcga aggcgctctg ctaggccgca actgacactg agggacgaaa gctaggggag  720
cgaatgggat tagataccc agtagtccta gctgtaaacg atggatacta ggcgtggctt  780
gtatcgaccc gagccgtgcc gtagctaacg cgttaagtat cccgcctggg gagtacgcac  840
gcaagtgtga aactcaaagg aattgacggg ggcccgcaca agcggtggag tatgtggttt  900
aattcgatgc aacgcgaaga accttaccaa ggcttgacat gtcgcgaatc ctgctgaaag  960
gtgggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctacgga cagagggcag  1200
caagctagtg atagcaagct aatcccataa accgtggctc agttcagatc gaaggctgca  1260
actcgccttc gtgaaggagg aatcgctagt aattgcaggt cagcatactg cagtgaattc  1320
gttcccgggc cttgtacaca ccgcccgtca caccatggaa gctggcaacg cccgaagtca  1380
ttactccaac ttttcggaga ggaggatgcc taaggcagtg ctggtgactg gggtgaagtc  1440
gtaacaaggt agccgtaccg gaaggtgtgg ctggatcacc tccttt                1486

SEQ ID NO: 62          moltype = DNA  length = 1531
FEATURE                Location/Qualifiers
source                 1..1531
                       mol_type = genomic DNA
                       note = Variovorax sp. PMC12
                       organism = Variovorax sp.
SEQUENCE: 62
tatagagttt gatcctggct cagattgaac gctggcggca tgccttacac atgcaagtcg  60
aacggcagcg cgggagcaat cctggcggcg agtggcgaac gggtgagtaa tacatcggaa  120
cgtgcccaat cgtgggggat aacgcagcga aagctgtgct aataccgcat acgatctacg  180
gatgaaagca ggggatcgca agaccttgcg cgaatggagc ggccgatggc agattaggta  240
gttggtgagg taaaggctca ccaagccttc gatctgtagc tggtctgaga ggacgaccag  300
ccacactggg actgagacac ggcccagact cctacgggag gcagcagtgg ggaattttgg  360
acaatgggcg caagcctgat ccagccatgc cgcgtgcagg atgaaggcct tcgggttgta  420
aactgctttt gtacggaacg aaacggctct ttctaataaa gagggctaat gacggtaccg  480
taagaataag caccggctaa ctacgtgcca gcagccgcgg taatacgtag ggtgcaagcg  540
ttaatcggaa ttactgggcg taaagcgtgc gcaggcggtg atgtaagaca gttgtgaaat  600
ccccgggctc aacctgggaa ctgcatctgt gactgcatcg ctggagtacg gcagaggggg  660
atggaattcc gcgtgtagca gtgaaatgcg tagatatgcg gaggaacacc gatggcgaag  720
gcaatcccct gggcctgtac tgacgctcat gcacgaaagc gtggggagca aacaggatta  780
gataccctgg tagtccacgc cctaaacgat gtcaactggt tgttgggtct tcactgactc  840
agtaacgaag ctaacgcgtg aagttgaccg cctggggagt acggccgcaa ggttgaaact  900
caaaggaatt gacggggacc cgcacaagcg gtggatgatg tggtttaatt cgatgcaacg  960
cgaaaaacct tacccacctt tgacatgtac ggaatttgcc agagatggct tagtgctcga  1020
aagagaaccg taacacaggt gctgcatggc tgtcgtcagc tcgtgtcgtg agatgttggg  1080
ttaagtcccg caacgagcgc aacccttgtc attagttgct acattcagtt gggcactcta  1140
atgagactgc cggtgacaaa ccggaggaag gtggggatga cgtcaagtcc tcatggccct  1200
tataggtggg gctacacacg tcatacaatg gctggtacaa agggttgcca acccgcgagg  1260
gggagctaat cccataaaac cagtcgtagt ccggatcgca gtctgcaact cgactgcgtg  1320
aagtcggaat cgctagtaat cgtggatcag aatgtcacgg tgaatacgtt cccgggtctt  1380
gtacacaccg cccgtcacac catgggagcg ggttctgcca gaagtagtta gcttaaccgc  1440
aaggagggcg attaccacgg cagggttcgt gactggggtg aagtcgtaac aaggtagccg  1500
tatcggaagg tgcggctgga tcacctcctt t                                1531

SEQ ID NO: 63          moltype = DNA  length = 1486
FEATURE                Location/Qualifiers
source                 1..1486
                       mol_type = genomic DNA
                       note = Nostoc sp. strain PCC 73102
                       organism = Nostoc sp.
SEQUENCE: 63
acggagagtt tgatcctggc tcaggatgaa cgctggcggt atgcttaaca catgcaagtc  60
gaacggtgtc ttcggacaca gtggcggacg ggtgagtaac gcgtgagaat ctggctctag  120
gtctgggaca accactggaa acggtggcta ataccggatg tgccgagagg tgaaaggtta  180
actgcctaga gatgagctcg cgtctgatta gctagtaggt agtgtaatgg actacctagg  240
cgacgatcag tagctggtct gagaggacga tcagccacac tgggactgag acacggccca  300
gactcctacg ggaggcagca gtggggaatt ttccgcaatg ggcgaaagcc tgacggagca  360
ataccgcgtg agggaggaag gctcttgggt cgtaaacctc ttttctcagg gaagaacaca  420
atgacggtac ctgaggaata agcatcggct aactccgtgc cagcagccgc ggtaatacgg  480
aggatgcaag cgttatccgg aatgattggg cgtaaagcgt ccgcaggtgg caatgtaagt  540
ctgctgttaa agagtctagc tcaactagat acaagcagtg gaaactacat agctagagta  600
cgttcggggc agagggaatt cctggtgtag cggtgaaatg cgtagagatc aggaagaaca  660
ccggtggcga aggcgctctg ctaggccgta actgacactg agggacgaaa gctaggggag  720
cgaatgggat tagataccc agtagtccta gccgtaaacg atggatacta ggcgtggctt  780
gtatcgaccc gagccgtgcc gtagctaacg cgttaagtat cccgcctggg gagtacgccg  840
gcaacggtga aactcaaagg aattgacggg ggcccgcaca agcggtggag tatgtggttt  900
aattcgatgc aacgcgaaga accttaccaa ggcttgacat gtcgcgaatc ctggtgaaag  960
ccgggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctccgga cagagggcag  1200
```

```
caagcatgcg aatgcaagca aatcccgtaa accggagctc agttcagatc gcaggctgca  1260
actcgcctgc gtgaaggagg aatcgctagt aattgcaggt cagcatactg cagtgaattc  1320
gttcccgggc cttgtacaca ccgcccgtca caccatggaa gctggtagtg cccgaagtca  1380
ttactccaac ctttcgggga ggaggatgcc taaggcagga ctggtgactg gggtgaagtc  1440
gtaacaaggt agccgtaccg gaaggtgtgg ctggatcacc tccttt                1486

SEQ ID NO: 64          moltype = DNA  length = 1154
FEATURE                Location/Qualifiers
source                 1..1154
                       mol_type = genomic DNA
                       note = Bradyrhizobium cosmicum
                       organism = Bradyrhizobium sp.
SEQUENCE: 64
cttgagagtt tgatcctggc tcagagcgaa cgctggcggc aggcttaaca catgcaagtc  60
gagcgggcgt agcaatacgt cagcggcaga cgggtgagta acgcgtggga acatacettt  120
tggttcggaa caacacaggg aaacttgtgc taataccgga taagccctta cggggaaaga  180
tttatcgccg aaagattggc ccgcgtctga ttagctagtt ggtagggtaa tggcctacca  240
aggcgacgat cagtagctgg tctgagagga tgatcagcca cattgggact gagacacggc  300
ccaaactcct acgggaggca gcagtgggga atattggaca atgggcgcaa gcctgatcca  360
gccatgccgc gtgagtgatg aaggccctag ggttgtaaag ctcttttgtg cgggaagata  420
atgacggtac cgcaagaata agccccggct aacttcgtgc cagcagccgc ggtaatacga  480
agggggctag cgttgctcgg aatcactggg cgtaaagggt gcgtaggcgg gtctttaagt  540
caggggtgaa atcctggagc tcaactccag aactgccttt gatactgaag atcttgagtt  600
cgggagaggt gagtggaact gcgagtgtag aggtgaaatt cgtagatatt cgcaagaaca  660
ccagtggcga aggcggctca ctggcccgat actgacgctg aggcacgaaa gcgtggggag  720
caaacaggat tagataccct ggtagtccac gccgtaaacg atgaatgcca gccgttagtg  780
ggtttactca ctagtggcgc agctaacgct ttaagcattc cgcctgggga gtacggtcgc  840
aagattaaaa ctcaaaggaa ttgacggggg cccgcacaag cggtggagca tgtggtttaa  900
ttcgacgcaa cgcgcagaac cttaccagcc cttgacatgt ccaggaccgg tcgcagagat  960
gtgaccttct cttcggagcc tggagcacag gtgctgcatg gctgtcgtca gctcgtgtcg  1020
tgagatgttg ggttaagtcc cgcaacgagc gcaacccccg tccttagttg ctaccattta  1080
gttgagcact ctaaggagac tgccggtgat aagccgcgag gaaggtgggg atgacgtcaa  1140
gtcctcatgg ccct                                                   1154

SEQ ID NO: 65          moltype = DNA  length = 1452
FEATURE                Location/Qualifiers
source                 1..1452
                       mol_type = genomic DNA
                       organism = Tardiphaga sp.
SEQUENCE: 65
ctgagagttt gattctggct cagaacgaac gctggcggca ggcttaacac atgcaagtcg  60
aacgccccgc aaggggagtg gcagacgggt gagtaacgcg tgggaacgta cctttcgctt  120
cggaatattc ccgggaaact gggagcaatg ccgaatacgc cgtattggga aagatttatc  180
ggcgaaagat cggcccgcgt tagattagct agttggcggt gtaatggacc accaaggcta  240
cgatctatag ctggtctgag aggatgatca gccacactgg gactgagaca cggcccagac  300
tcctacggga ggcagcagtg gggaatcttg gacaatgggc gcaagcctga tccagccatg  360
ccgcgtgagt gaagaaggcc ttagggttgt aaaactcttt cgccggagaa gataatgacg  420
gtatccggag aagaagcccc ggctaacttc gtgccagcag ccgcggtaat acgaaggggg  480
ctagcgttgt tcggaattac tgggcgtaaa gcgcacgtag gcgggtttgt aagtaggggg  540
tgaaatccca gggctcaacc ctggaactgc cttctagact gcaagcctgg aggtcaggag  600
aggcgagtgg aataccgagt gtagaggtga aattcgtaga tattcggtgg aacaccagtg  660
gcgaaggcga ctcgctggac tgatactgac gctgaggtgc gaaagcgtgg ggagcaaaca  720
ggattagata ccctggtagt ccacgcctta aacgatgaga gctagttgtc agtaagcatg  780
cttattggtg acgcagctaa cgcattaagc tctccgcctg gggagtacgg ccgcaaggtt  840
aaaactcaaa gaaattgacg gggcccgca caagcggtgg agcatgtggt ttaattcgaa  900
gcaacgcgca gaaccttacc cacctttgac atcccgtgct atctagagag atctagagtc  960
ccttcggggc gcggagacag gtgctgcatg gctgtcgtca gctcgtgtcg tgagatgttg  1020
ggttaagtcc cgcaacgagc gcaaccctcg cttctagttg ccagcattta gttgggcact  1080
ctagaggaac tgcctgcgcc aagcaggagg aaggcgggga tgacgtcaag tcctcatggc  1140
ccttacaggt ggggctacac acgtgctaca atggcggtga caaagggata atccctaaaa  1200
gccgtctcag ttcggattgt cctctgcaac tcgagggcat gaagttggaa tcgctagtaa  1260
tcgcggatca gcacgccgcg gtgaatacgt tcccgggcct tgtacacacc gcccgtcaca  1320
ccatgggagt tggttctacc tgaagacagt ttcccaaccg caaggagggg actggccacg  1380
gtagggtcag cgactggggt gaagtcgtaa caaggtagcc gtaggggaac ctgcggctgg  1440
atcacctcct tt                                                     1452

SEQ ID NO: 66          moltype = DNA  length = 1486
FEATURE                Location/Qualifiers
source                 1..1486
                       mol_type = genomic DNA
                       note = Nostoc MS-1
                       organism = Nostoc sp.
SEQUENCE: 66
acggagagtt tgatcctggc tcaggatgaa cgctggcggt atgcttaaca catgcaagtc  60
gaacggtctc ttcggagata gtggcggacg ggtgagtaac gcgtgagaat ctggctctag  120
gtcggggaca acagttggaa acgactgcta ataccggatg tgccgaaagg tgaaagatta  180
attgcctaga gatgagctcg cgtctgatta gctagttggt gtggtaagag cgcaccaagg  240
cgacgatcag tagctggtct gagaggatga tcagccacac tgggactgag acacggccca  300
gactcctacg ggaggcagca gtggggaatt ttccgcaatg ggcgaaagcc tgacggagca  360
```

```
ataccgcgtg agggaggaag gctcttgggt tgtaaacctc ttttctcagg gaataaaaaa  420
atgaaggtac ctgaggaata agcatcggct aactccgtgc cagcagccgc ggtaatacgg  480
aggatgcaag cgttatccgg aatgattggg cgtaaagggt ccgcaggtgg caatgtaagt  540
ctgctgtcaa agaatgaggc ttaacctcat caaggcagtg gaaactacgt agctagagta  600
cggtcggggt agaaggaatt cctggtgtag cggtgaaatg cgtagagatc aggaagaaca  660
ccggtggcga aagcgttctg ctagacctgt actgacactg agggacgaaa gctaggggag  720
cgaatgggat tagatacccc agtagtccta gccgtaaacg atggatacta ggcgtggctt  780
gtatcgaccc gagccgtgcc ggagccaacg cgttaagtat cccgcctggg gagtacgcac  840
gcaagtgtga aactcaaagg aattgacggg ggcccgcaca agcggtggag tatgtggttt  900
aattcgatgc aacgcgaaga accttaccaa gacttgacat gtcgcgaact tttctgaaag  960
gaagaggtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgtct tggctacac acgtactaca atgctacgga cagagggcag  1200
caagctagcg atagcaagca aatcccgtaa accgtagctc agttcagatc gcaggctgca  1260
actcgcctgc gtgaaggagg aatcgctagt aattgcaggt cagcatactg cagtgaattc  1320
gttcccgggc cttgtacaca ccgcccgtca caccatggaa gctggcaacg cccgaagtca  1380
ttactccaac ttttcggagg ggaggatgcc taaggcagtg ctggtgactg gggtgaagtc  1440
gtaacaaggt agccgtaccg gaaggtgtgg ctggatcacc tccttt                1486

SEQ ID NO: 67          moltype = DNA  length = 951
FEATURE                Location/Qualifiers
source                 1..951
                       mol_type = genomic DNA
                       note = Uncultured alpha
                       organism = unidentified
SEQUENCE: 67
ctgaagagtt tgatcctggc tcagagtgaa cgctggcggc aggcctaaca catgcaagtc  60
gagcggcagc gcggtagcaa tactggcggc gagcggcgga cgggtgagga atacatggga  120
atctaccttc ttgtgggga taacgtaggg aaacttacgc taataccgca tgagaccgga  180
aggtgaaagc ggcggaccgc aaggcgtcgc gcgagaagat gagcccatgt cggattagct  240
agttggtgag gtaaaggctc accaaggcga cgatccgtag ctggtctgag aggatgatca  300
gccacactgg aactgagaca cggtccagac tcctacggga ggcagcagtg gggaatattg  360
gacaatgggc gcaagcctga tccagccatg ccgcgtgggt gaagaaggcc ttcgggttgt  420
aaagcccttt tgtccggaac gaaaagctgc gggttaatac cccgtagtgc tgacggtacc  480
ggaagaataa gcaccggcta acttcgtgcc agcagccgcg gtaatacgaa gggtgcaagc  540
gttactcgga atcactgggc gtaaagcgtg cgtaggcggt ttcttaagtc tgtcgtgaaa  600
gccctgggct caacctggga atggcgatgg atactgggag gctagagtgt gatagaggat  660
ggtggaattc ccggtgtagc ggtgaaatgc gtagagatcg ggaggaacac cagtggcgaa  720
ggcggccatc tggatcaaca ctgacgctga ggcacgaaag cgtggggagc aaacaggatt  780
agataccctg gtagtccacg ccctaaacga tgcgaactgg acgttgggag caacttggct  840
ctcagtgtcg aagctaacgc gttaagttcg ccgcctgggg agtacggtcg caagactgaa  900
actcaaagga attgacgggg gcccgcacaa gcggtggagt atgtggttta a          951

SEQ ID NO: 68          moltype = DNA  length = 2870
FEATURE                Location/Qualifiers
source                 1..2870
                       mol_type = genomic DNA
                       note = Tahibacter (Xanthomonas)
                       organism = Tahibacter sp.
SEQUENCE: 68
tcaagcgact aagcgcatac ggtggatgcc ttggcggtca gaggcgatga aggacgtggc  60
agcctgcgaa aagcactggt gagtcggcag cagacattga cccagtgatg tccgaatggg  120
gaaacccacc cgcaagggta tcccgacctg aatctatagg gtcgggaagc gaaccgaggg  180
aactgaaata tctcattacc tcgaggaaaa gaaatcaacc gagattcccc aagtagtgac  240
gagcgaacgg ggaacagccc ataagcacgg tatgttctag cggaacggtc ctggaaaggc  300
cggccataga aggtgatagc ccggtacgtt aaagggcata ccgcgtgaaa ttgagtaagg  360
cggggcacgt gaaaccctgt ctgaacatgg ggggaccatc ctccaaggct aaatactcct  420
gaccgaccga tagcgaacca gtaccgtgag ggaaaggcga aaagaaccgc ggtgagcgga  480
gtgaaataga acctgaaacc gtatgcgtac aagcagtgga agcccgcaag ggtgactgcg  540
taccttttgt ataatgggtc agcgacttac agtttgtggc gagcttaacc gtctagggta  600
ggcgaaggga aaccgagtct gaatagggcg catagtcgca ggctgtagac ccgaaaccgg  660
gtgatctagc catgcccagg gtgaaggtcc ggtaacacgg actggaggcc cgaacccact  720
cctgttgcaa aagtagggga tgaggtgtgg ctaggagtga aaagctaatc gaacccggag  780
atagctggtt ctcctcgaaa gctatttagg tagcgcctcg cgtatcactg ttgggggtag  840
agcactgtta tggctagcgg gacatcgcgt cttagcaacc catggcaaac tccgaatacc  900
aacacgtgtc agcgcgggag acacacggcg ggtgctaacg tccgtcgtga aaagggaaac  960
aacccagacc cgcagctaag gtccccaaat catcgctcag tggaaaacga tgtgggaagg  1020
ctaaaacagc caggaggttg gcttagaagc agccaccctt taaagaaagc gtaatagctc  1080
actggtcgag tcggcctgcg cggaagattt aacggggcta agcgatgtac cgaagctcgg  1140
ggtttactcg caagagtaag cggtagagga gcgttccgta ggcctgtgaa ggtgagtcgt  1200
aaggcttgct ggaggtatcg gaagtgcgaa tgctgacatg agtaacgata agggggtga  1260
aaagcctccc cgccgaaagc ccaaggtttc ctcgcgcaac gttcatcggc gcagggtgag  1320
tcggtcccta aggcgaggct gaaaggcgta gtcgatggga agctggttaa tattccagca  1380
cctcgcataa ctgcgatggg gtgacggaga agggtaggtg taccgggcgt tggttgtccc  1440
ggggaaagga ggtaggcgtt gggagtaggc aaatccgctt ccatttacgc cgagcaccga  1500
gacgagctcc tagagcgaag tcactgatcc cacgcttcca ggaaaaacct ctaagcttca  1560
ggttatgcag accgtaccgt aatccgacac tggtaggcag ggtgagaatc ccaaggcgct  1620
tgagagaact cgggtgaagg aactaggcaa catagcaccg taacttcggg agaaggtgcg  1680
```

cccagaactg tggccacgtg cgtggctgag cagttttggg ccgcagtgac caggccgctg 1740
cgactgttta tcaaaaacac agcactctgc aaactcgtaa gaggacgtat agggtgtgac 1800
acctgcccgg tgctggaagg ttaattgatg gggtcagccg caaggcgaag ctcttgatcg 1860
aagccccagt aaacggcggc cgtaactata acggtcctaa ggtagcgaaa ttccttgtcg 1920
ggtaagttcc gacctgcacg aatggtgtaa cgacagcggc gctgtctcca cccgagactc 1980
agtgaaattg aaatcgctgt gaagatgcag cgttcccgcg gcaagacgga aagaccccgt 2040
gaacctttac tatagcttta cactgaacgt tgagttcgtc tgtgtaggat aggtgggagg 2100
ctttgaagtg tcggcgctag ccggcatgga gccaacgttg aaataccacc ctgatgtgct 2160
tgacgttcta acctaggccc gtaatccggg tcggggaccg tgtatggtgg gtagtttgac 2220
tggggcggtc tcctcccaaa gagtaacgga ggagctcgaa ggtacgctca gcgcggtcgg 2280
acatcgcgca ctgtgtgcaa aggcataagc gtgcttgact gcgagatcga cggatcaagc 2340
aggtacgaaa gtaggactta gtgatccggt ggttctgtat ggaagggcca tcgctcaacg 2400
gataaaaggt actccgggga taacaggctg ataccgccca agagttcata tcgacggcgg 2460
tgtttggcac ctcgatgtcg gctcatcaca tcctggggct gtagtcggtc ccaagggtat 2520
ggctgttcgc catttaaagt ggtacgcgag ctgggttcag aacgtcgtga gacagttcgg 2580
tccctatctg tcgtgggcgt tagagatttg agaggggctg ctcctagtac gagaggaccg 2640
gagtggacga acccctggtg ttccggttgt cacgccagtg gcactgccgg gtagctacgt 2700
tcggaagcga taaccgctga aagcatctaa gcgggaagcg cgcctcaaga tgagatctct 2760
cgggactcaa gtcccctaaa ggccccatgt agactacgtg gttgataggt cgggtgtgta 2820
tcgcagtaat gccgagctaa ccgatactaa tgagccgtgc ggcttgatca 2870

SEQ ID NO: 69 moltype = DNA length = 2719
FEATURE Location/Qualifiers
source 1..2719
mol_type = genomic DNA
note = Enhydrobacter (gamma)
organism = Enhydrobacter sp.
SEQUENCE: 69
aataagggcg tttggcggat gccttggcac tgagaggcga tgaaggacgt ggcaggctgc 60
gaaaagcttc ggggagttgc cagcacactt tgatccgaag atatccgaat ggggaaaccc 120
catccatcag gatgatcgtc gactgaatcc ataggtcgac gaggcgaacc cagggaactg 180
aaacatctca gtacctggag gaaaggacat caacagagac tccgctagta gtggcgagcg 240
aacgcggact aggccagtgc ctcagctgta agaaccggaa cactctggaa agggtggcca 300
tagcgggtga tagccccgta cgggtagaaa gcagttgagg actcgagtag ggcgggacac 360
gtgaaatcct gtctgaacac ggggggatca ccctccaagc ctaagtactc ctcagtgacc 420
gatagtgaac aagtaccgtg agggaaaggt gaaaagcacc ccgacaaggg gagtgaaaca 480
gacctgaaac cgaacgccta caaacagtcg gaggccgcaa ggctaacggc gtaccttttg 540
tataatgggt cagcgactta ctctgtgcag caagcttaag ccgataggtg taggcgcagc 600
gaaagcgagt ctgaataggg cgcttagttg cacggagtag acccgaaacc gggtgatcta 660
gtcatgggca ggttgaaggt gcggtaacgc gcactggagg accgaaccgg ttaccgttgc 720
aaaggtatcg gatgacctgt gattaggggt gaaaggccaa ccaaactcgg aaatagctgg 780
ttctccgcga aaactattta ggtagtgcgt cgcgtgaata ccatcggggg tagagcactg 840
gatgggctag gggatccaa agtcttacca aacctaacca aactccgaat accgatgagt 900
aatgcgcggc agacagacgg cgggtgctaa ggtccgtcgt cgagagggaa acagcccaga 960
ccgccagcta aggtccctaa gtcatggcta agtgggaaag gatgtgggaa ttccataaca 1020
accaggaggt tggcttagaa gcagccatcc tttaaagaaa gcgtaatagc tcactggtct 1080
aatcaagaaa tcctgcgccg aagatgtacc ggggctcaag ccatgcaccg aagctgcgga 1140
ctcgaaagag tggtagcgga gcgttccgta agcctgcgaa gggagacccg tgagggctcc 1200
tggaggtatc ggaagtgaga atgctgacat aagtagcgat aaaaagcgtg agagacgctt 1260
tcgccgtaag tccaagggtt cctgcgcaag gtcaatccgc gcagggttag ccggccccta 1320
agtcgagggc gacagccgta gacgatggga accacgtgaa tattcgtggg cctgctggtg 1380
gtgacggatc cgaaaagtgg cccgagctcg ttggcgaatg ctcgggcggc ccaagggttc 1440
caggaaatag ccccagcgta tagaccgtac cctaaaccga cacaggtgga ctggtagagt 1500
ataccaaggc gcttgaggga accatgttga aggaactagg caatttaccc ccgtaacttc 1560
gggataaggg ggcctctgtc cgtctggaca gaggggcaca gactaggggg tggcgactgt 1620
ttaccaaaaa cacagggctc tgctaagccg tgaggcgaag tatagggtct gacgcctgcc 1680
cggtgccgga aggttaagag gagaggtgca agccttgaat tgaagccccg gtaaacggcg 1740
gccgtaacta taacggtcct aaggtagcga aattccttgt cgggtaagtt ccgacctgca 1800
cgaatggcgt aacgacttcc ccgctgtctc caacatgggc tcggcgaaat tgaattcccc 1860
gtgaagatgc ggggtacccg cagttagacg gaaagacccc gtgcaccttt actacaactt 1920
tgcagtggca ttagagaatg gatgtgtagg ataggcggga gcctttgaag ccggggcgct 1980
agctctggtg gaggcaacct tgaaataccg cccttttgtt ctttgatgtc taaccgaggt 2040
ctgtcatcca gatccgggac cctgcatggt gggtagtttg actggggcgg tcgcctccca 2100
aagagtaacg gaggcgcgcg atggtgggct caggccggtc ggaaatcggc tgctgagtgc 2160
aatggcacaa gcccgcctga ctgcgagact gacaagtcga gcagggacga aagtcggcca 2220
tagtgatccg gtggttccgc gtgagtgggc catcgctcaa cggataaaag gtacgccggg 2280
gataacaggc tgataccacc caagcgtcca cagcgacggt ggtgtttggc acctcgatgt 2340
cgactcatca catcctgggg ctggagcagg tcccaagggt tcggctgttc gccgattaaa 2400
gtggtacgtg agttgggttc aaaacgtcgt gagacagttt ggtccctatc tgctgtgggt 2460
gttcgagact tgagaggagc cgtccttagt acgagaggac cgggatggac ttacctctgg 2520
tgtaccggtt gtgacgccag tcgcagcgcc gggtagctat gtagtgaagg gataaacgct 2580
gaaagcatct aagcgtgaaa cccgcctcaa aactaggtct cgctgagagt cgtggtagac 2640
caccacgttg ataggccgca tgtgcaagtg cagtgatgca ttgagcttag cggtactaat 2700
agctcgatcg gcttgattt 2719

SEQ ID NO: 70 moltype = DNA length = 2819
FEATURE Location/Qualifiers
source 1..2819
mol_type = genomic DNA

```
                         note = Nostoc NIES-3756
                         organism = Nostoc sp.
SEQUENCE: 70
tcaagctaat aagggctaat ggtggatacc taggcacaca gaggcgaaga aggacgtggt  60
taccgacgaa atactccggg gagttggaag caaacattga gccggaggtg tccgaatggg  120
gcaaccctaa atacagcctg ttgaatatat agacaggtat gagccaaccc agcgaactga  180
aacatcttag tagctggagg aaaagaaatc aaaagagatt ccccaagtag tggtgagcga  240
aaggggaaga gcctaaacca gagggtttac cttctggggt agtgggacag cgatatcgaa  300
tccagcgatt agacgaagca gctaaatact gcaccagaga aagtgaaagt cttgtagtcg  360
aaaattcaag gatagtagct gaatcccgag tagcatgggg cacgaggaat cccatgtgaa  420
tcagcgagga ccatctcgta aggctaaata ctactgtgtg accgatagtg aaccagtacc  480
gcgagggaaa ggtgaaaaga accccgcaag gggagtgaaa tagaacatga aaccattagc  540
ttacaagcag tgggagtccg attaaacgga tgaccgcgtg cctgttgaag aatgagccgg  600
cgacttatag gcactggtag gttaagacga gaatgtcgga gccaaaggga aaccgagtct  660
gaaaagggcg ataatcagtg tttatagacc cgaaccctgg tgatctaacc atggccagga  720
tgaagcttgg gtaacaccaa gtggaggtcc gaaccgaccg atgttgaaaa atcggcggat  780
gagttgtggt taggggtgaa atgccaatcg aaccaggagc tagctggttc tccccgaaat  840
gtgttgaggc gcagcggtaa tgattatatc taggggggtaa agcactgttt cggtgcgggc  900
tgggagaccg gtaccaaatc gagacaaact cagaatacct agagcacaca ttgccagtga  960
gacggtgggg gataagcttc atcgtcaaga gggaaacagc ccagaccacc agctaaggtc  1020
cccaaatcat cactaagtga taaaggaggt gagattgcat agacaactag gaggtttgcc  1080
tagaagcagc caccettgaa agagtgcgta atagctcact agtcaagcga tcttgcgccg  1140
aaaatgaacg gggctaagtg atgtaccgaa gctgtgggat tactaataat aatcggtagg  1200
ggagcgttcc gtagtaggta gaagcagtag cggcgagcag ctgtggacga gacggaagtg  1260
agaatgtcgg cttgagtagc gcaaacattg gtgagaatcc aatgccccga aaccctaagg  1320
gttccagagc caggttcgtc cactctgggt tagtcgggac ctaaggcgag gccgaaaggc  1380
gtagtcgatg gacacagggt caacaatccc tgactagtat acgggagcat tattagggac  1440
gcatgaaaga tagccatacc ctgattggtt tgggaggagt ttacgaactc cgcgtggtga  1500
aggatagtgt caagaaaagc tagtaatgtg atgaacgtat gttacccgta cccgaaaccg  1560
acacaggtag ggaggttgag aataccaagg ggcgcgagat aactctctct aaggaactcg  1620
gcaaaatggc cccgtaactt cggaagaagg ggtgcccacg agagtgggtc gcagtgaaga  1680
gatccaggcg actgtttacc aaaaacacag gtctccgcaa actcgtaaga ggaagtatgg  1740
gggctgacgc ctgcccagtg ccggaaggtt aaggaagttg gtcagccgaa aggtaaagct  1800
gacgaccgaa gccccggtga acggcggccg taactataac ggtcctaagg tagcgaaatt  1860
ccttgtcggg taagttccga cccgcacgaa aggcgtaacg atctggatgg tgtctcagag  1920
agagactcgg cgaaatagga atgtctgtga agatacggac tgcctgcacc tggacagaaa  1980
gaccctatga agctttactg tagcctggaa ttgtgtccgg gcttcgcttg cgcaggatag  2040
gtgggaagcg atgaagcagt ccttgtgggg actgtggagc taacggtgag ataccactct  2100
ggcgaagcta ggattctaac ttatttccgt tatccggaaa aaggacagtt tcaggtgggc  2160
agtttgactg gggcggtcgc ctcctaaaag gtaacggagg cgcgcaaagg ttccctcagc  2220
acgcttggaa accgtgcggc gagtgtaaag gcataaaggg agcttgactg caagaccgac  2280
aagtcgagca ggtacgaaag taggccttag tgatccgacg gcgcagagtg gaatggccgt  2340
cgctcaacgg ataaaagtta ctctagggat aacaggctga tctcccccaa gagtccacat  2400
cgacggggag gtttggcacc tcgatgtcgg ctcatcgcaa cctggggcgg aagtacgtcc  2460
caagggttgg gctgttcgcc cattaaagcg gtacgtgagc tgggttcaga acgtcgtgag  2520
acagttcggt ccatatccgg tgcaggcgta agagcattga gaggagcctt ccttagtacg  2580
agaggaccgg gaaggacgca ccgctggtgt accagttatt gtaccaacag taaacgctgg  2640
gtagccaagt gcggagcgga taaccgctga aagcatctaa gtgggaagcc cacctcaaga  2700
tgagtgctct cactacataa gtaggtaagg tcacgggcag aacacccgtt tataggctct  2760
aagtggaagt gcagtaatgt atgtagctga ggagtcctaa cagaccgagg gcttgacct   2819

SEQ ID NO: 71            moltype = DNA  length = 107
FEATURE                  Location/Qualifiers
source                   1..107
                         mol_type = genomic DNA
                         note = Unknown organism
                         organism = unidentified
SEQUENCE: 71
tggcggccat agcggtgtgg aaccacccga tcccttcccg aactcggaag tgaaacgcac  60
cagcgccgat ggtagtgtgc atccgcatgc gagagtaggt caccgcc                107

SEQ ID NO: 72            moltype = DNA  length = 109
FEATURE                  Location/Qualifiers
source                   1..109
                         mol_type = genomic DNA
                         note = Unknown organism
                         organism = unidentified
SEQUENCE: 72
ggtggctcta gcgagaggtg tacacccgat cccattccga actcggacgt gaaaactctc  60
agcgccgatg gtactgtgtc tcaaggcacg ggagagtagg tcgctgccg              109

SEQ ID NO: 73            moltype = DNA  length = 110
FEATURE                  Location/Qualifiers
source                   1..110
                         mol_type = genomic DNA
                         note = Unknown organism
                         organism = unidentified
SEQUENCE: 73
tggtggctat gccgggggtt ccccacctga tcccattccg aactcagtcg ttaagtcccc  60
```

```
cagggccaat ggtacttcgt ctcaaggcgc gggagagtag gtcgccgcca           110

SEQ ID NO: 74          moltype = DNA  length = 1486
FEATURE                Location/Qualifiers
source                 1..1486
                       mol_type = genomic DNA
                       note = Trichormus (Nostoc)
                       organism = Trichormus sp.
SEQUENCE: 74
acggagagtt tgatcctggc tcaggatgaa cgctggcggt atgcttaaca catgcaagtc  60
gaacggaatc cttagggatt tagtggcgga cgggtgagta acgcgtgaga atctggcttc  120
aggtctggga caacagttgg aaacgactgc taataccgga tgtgccgaga ggtgaaaggc  180
ttgctgcctg aagatgagct tgcgtctgat tagctagttg gtggggtaag agcctaccaa  240
ggcgacgatc agtagctggt ctgagaggat gatcagccac actgggactg agacacggcc  300
cagactccta cgggaggcag cagtggggaa ttttccgcaa tgggcgaaag cctgacggag  360
caataccgcg tgagggagga aggctcttgg gttgtaaacc tcttttctca gggaagaaaa  420
aaatgacggt acctgaggaa taagcatcgg ctaactccgt gccagcagcc gcggtaatac  480
ggaggatgca agcgttatcc ggaatgattg ggcgtaaagg gtccgcaggt ggctgtgtaa  540
gtctgctgtt aaagagtcat gctcaacatg atcaaggcag tggaaactac atagctagag  600
tgcgttcggg gcagagggaa ttcctggtgt agcggtgaaa tgcgtagata tcaggaagaa  660
caccggtggc gaaagcgctc tgctaggctg caactgacac tgagggacga aagctagggg  720
agcgaatggg attagatacc ccagtagtcc tagccgtaaa cgatggatac taggcgtggc  780
ttgtatcgac ccgagccgtg ccgtagctaa cgcgttaagt atcccgcctg gggagtacgc  840
acgcaagtgt gaaactcaaa ggaattgacg gggcccgca caagcggtgg agtatgtggt  900
ttaattcgat gcaacgcgaa gaaccttacc aagacttgac atgtcgcgaa ttttcttgaa  960
agagaagagt gccttcggga gcgcgaacac aggtggtgca tggctgtcgt cagctcgtgt  1020
cgtgagatgt tgggttaagt cccgcaacga gcgcaaccct cgtttctagt tgccagcaat  1080
aagatgggaa ctctagagag actgccggtg acaaaccgga ggaaggtggg gatgacgtca  1140
agtcagcatg ccccttacgt cttgggctac acacgtacta caatgctacg gacaaagggc  1200
agctacacag cgatgtgatg caaatctcat aaaccgtagc tcagttcaga tcgaaggctg  1260
caactcgcct tcgtgaagga ggaatcgcta gtaattgcag gtcagcatac tgcagtgaat  1320
tcgttcccgg gccttgtaca caccgcccgt cacaccatgg aagtcggtca cgcccgaagt  1380
cattacccca accgagagga gggggatgcc taaggtagga ctggtgactg ggtgaagtc  1440
gtaacaaggt agccgtaccg gaaggtgtgg ctggatcacc tccttt           1486

SEQ ID NO: 75          moltype = DNA  length = 1458
FEATURE                Location/Qualifiers
source                 1..1458
                       mol_type = genomic DNA
                       note = Brevundimonas (alpha)
                       organism = Brevundimonas sp.
SEQUENCE: 75
ctgagagttt gatcctggct cagagcgaac gctggcggca ggcctaacac atgcaagtcg  60
aacgaacctt tcggggttag tggcggacgg gtgagtaaca cgtgggaacg tgcctttagg  120
ttcggaataa ctcagggaaa cttgtgctaa taccgaatgt gcccttcggg ggaaagattt  180
atcgccttta gagcggcccg cgtctgatta gctagttggt tgaggtaatg gctcaccaag  240
gcgacgatca gtagctggtc tgagaggatg atcagccaca ttgggactga gacacggccc  300
aaactcctac gggaggcagc agtggggaat cttgcgcaat gggcgaaagc ctgacgcagc  360
catgccgcgt gaatgatgaa ggtcttagga ttgtaaaatt ctttcaccgg ggacgataat  420
gacggtaccc ggagaagaag ccccggctaa cttcgtgcca gcagccgcgg taatacgaag  480
ggggctagcg ttgctcggaa ttactgggcg taaagggagc gtaggcggac atttaagtca  540
ggggtgaaat cccggggctc aacctcggaa ttgcctttga tactgggtgt cttgagtatg  600
agagaggtgt gtggaactcc gagtgtagag gtgaaattcg tagatattcg gaagaacacc  660
agtggcgaag gcgacacact ggctcattac tgacgctgag gctcgaaagc gtggggagca  720
aacaggatta gataccctgg tagtccacgc cgtaaacgat gattgctagt tgtcgggatg  780
catgcatttc ggtgacgcag ctaacgcatt aagcaatccg cctggggagt acggtcgcaa  840
gattaaaact caaaggaatt gacgggggcc cgcacaagcg gtggagcatg tggtttaatt  900
cgaagcaacg cgcagaacct taccaccttt tgacatgccc ggaccgccag agagatctgg  960
ctttcccttc ggggactggg acacaggtgc tgcatggctg tcgtcagctc gtgtcgtgag  1020
atgttgggtt aagtcccgca acgagcgcaa ccctcgccat tagttgccat cattcagttg  1080
ggaactctaa tgggactgcc ggtgctaagc cggaggaagg tggggatgac gtcaagtcct  1140
catggccctt acagggtggg ctacacacgt gctacaatgg cgactacaga gggttaatcc  1200
ttaaaagtcg tctcagttcg gattgtcctc tgcaactcga gggcatgaag ttggaatcgc  1260
tagtaatcgc ggatcagcat gccgcggtga atacgttccc gggccttgta cacaccgccc  1320
gtcacaccat gggagttggt tctacccgaa ggcgctgcgc tgaccgcaag gaggcaggcg  1380
accacggtag ggtcagcgac tggggtgaag tcgtaacaag gtagccgtag gggaacctgc  1440
ggctggatca cctccttt                                          1458

SEQ ID NO: 76          moltype = DNA  length = 821
FEATURE                Location/Qualifiers
source                 1..821
                       mol_type = genomic DNA
                       note = Bacillus (Firmicutes)
                       organism = Bacillus sp.
SEQUENCE: 76
tcggagagtt tgatcctggc tcaggacgaa cgctggcggc gtgcctaata catgcaagtc  60
gagcgaatcg acgggagctt gctccctgag attagcggcg gacgggtgag taacacgtgg  120
gcaacctgcc tataagactg ggataacttc gggaaaccgg agctaatacc ggatacgttc  180
ttttctcgca tgagagaaga tggaaagacg gtttacgctg tcacttatag atggcccgc  240
```

```
ggcgcattag ctagttggtg aggtaatggc tcaccaaggc gacgatgcgt agccgacctg  300
agagggtgat cggccacact gggactgaga cacggcccag actcctacgg gaggcagcag  360
tagggaatct tccgcaatgg acgaaagtct gacggagcaa cgccgcgtga acgaagaagg  420
ccttcgggtc gtaaagttct gttgttaggg aagaacaagt accagagtaa ctgctggtac  480
cttgacggta cctaaccaga aagccacggc taactacgtg ccagcagccg cggtaatacg  540
taggtggcaa gcgttgtccg gaattattgg gcgtaaagcg cgcgcaggtg gttccttaag  600
tctgatgtga aagcccacgg ctcaaccgtg gagggtcatt ggaaactggg gaacttgagt  660
gcagaagagg aaagtggaat tccaagtgta gcggtgaaat gcgtagagat ttggaggaac  720
accagtggcg aaggcgactt tctggtctgt aactgacact gaggcgcgaa agcgtgggga  780
gcaaacagga ttagataccc tggtagtcca cgccgtaaac g                      821

SEQ ID NO: 77           moltype = DNA  length = 2929
FEATURE                 Location/Qualifiers
source                  1..2929
                        mol_type = genomic DNA
                        organism = Brevibacillus
SEQUENCE: 77
ttaagttaga aagggcgcac ggtggatgcc ttggcactag gagccgatga aggacgggac  60
taacaccgat atgcttcggg gagctgtaag taagctttga tccggagatt tccgaatggg  120
gaaacccact gttcgtaatg gaacagtatc tttacctgaa tacatagggt actgaaggca  180
gacccgggga actgaaacat ctaagtaccc ggaggaagag aaagcaaacg cgatttcctg  240
agtagcggcg agcgaaacgg aattagccca aaccaagagg cttgcctctt ggggttgtag  300
gacactcaac atggagttac aaaggaacgg ggtaaatgaa gtgatctgga aaggtccgtc  360
gaagaaggta aaaaccctgt agttgaaact tcgttccctc ctgagtggat cctgagtacg  420
gcgggacacg agaaatcccg tcggaagcag ggaggaccat ctcccaaggc taaatactcc  480
ctagtgaccg atagtgaacc agtaccgtga gggaaaggtg aaaagcaccc cggaagggga  540
gtgaaataga tcctgaaacc gtgtgcctac aagtagtcaa agcccgttaa tgggtaatgg  600
cgtgcctttt gtagaatgaa ccggcgagtt acgatttcat gcgaggttaa gttgataaga  660
cggagccgca gcgaaagcga gtctgaatag ggcgaatgag tatgaggtcg tagacccgaa  720
accaggtgat ctacccatgt ccagggtgaa gttcaggtaa cactgaatgg aggcccgaac  780
ccacgcacgt tgaaaagtgc ggggatgagg tgtgggtagc ggagaaattc caatcgaacc  840
tggagatagc tggttctctc cgaaatagct ttagggctag cctcaagatg agagtattgg  900
aggtagagca ctgattggac taggggcccc caacgggtta ccgaattcag tcaaactccg  960
aatgccaaat acttattctt gggagtcaga ctgcgagtga taagatccgt agtcgaaagg  1020
gaaacagccc agaccaccag ctaaggtccc aaagtatacg ttaagtggaa aaggatgtgg  1080
agttgcttag acaaccagga tgttggctta gaagcagcca ccatttaaag agtgcgtaat  1140
agctcactgg tcgagtgact ccgcgccgaa aatgtaccgg ggctaaacgt atcaccgaag  1200
ctgtggattg acaccattag gtgtcgatgg taggagagcg ttctaagggc gttgaagtca  1260
gaccggaagg actggtggag cgcttagaag tgagaatgcc ggtatgagta gcgaaagaag  1320
ggtgagaatc ccttccaccg aatgcctaag gtttcctgag gaaggctcgt ccgctcaggg  1380
ttagtcggga cctaagccga ggccgaaagg cgtaggcgat ggacaacagg ttgatattcc  1440
tgtaccacct atacatcgtt tgaacgatgg ggggacgcag aaggataggg taagcgcgct  1500
gttggatatg cgcgtccaag cagttaggcc ggaaacgagg caaatcccgt ttccattaag  1560
gcggagctgt gatggcgagg gaaatatagt accgaagttc ctgattccac gctgccaaga  1620
aaagcctcta gtgagatgta aggtgcccgt accgcaaacc gacacaggta ggcgaggaga  1680
gaatcctaag gtgtgcgaga gaactctcgt taaggaactc ggcaaaatga ccccgtaact  1740
tcgggagaag ggtgcttttt tagggtgaat agcccagaaa agccgcagtg aataggccca  1800
ggcgactgtt tagcaaaaac acaggtctct gcgaagccgc aaggcgaagt ataggggctg  1860
acacctgccc ggtgctggaa ggttaagggg agaggttagc gcaagcgaag ctttgaaccg  1920
aagccccagt aaacggcggc cgtaactata acggtcctaa ggtagcgaaa ttccttgtcg  1980
ggtaagttcc gacccgcacg aaaggtgtaa cgatctgggc actgtctcaa cgagagactc  2040
ggtgaaatta tagtacctgt gaagatgcag gttacccgcg acaggacgga aagaccccgt  2100
ggagctttac tgcagcctga tattgaattt tggtacagct tgtacaggat aggtaggagc  2160
ctgagaagcc ggagcgctag cttcggtgga ggcgttggtg ggatactacc ctggctgtat  2220
tgaaattcta acccgcgccc cttatcgggg tgggagacag tgtcaggtgg gcagtttgac  2280
tggggcggtc gcctcctaaa gagtaacgga ggcgcccaaa ggttccctca gaatggttgg  2340
aaatcattcg tagagtgtaa aggcacaagg gagcttgact gcgagaccta caagtcgagc  2400
agggacgaaa gtcgggctta gtgatccggt ggttccgcat ggaagggcca tcgctcaacg  2460
gataaaagct accccgggga taacaggctt atctccccca agagtccaca tcgacgggga  2520
ggtttggcac ctcgatgtcg gctcatcgca tcctggggct gtagtcggtc ccaagggttg  2580
ggctgttcgc ccattaaagc ggtacgcgag ctgggttcag aacgtcgtga gacagttcgg  2640
tccctatccg tcgcgggcgc aggaaatttg agaggagctg tccttagtac gagaggaccg  2700
ggatggacgc accgctggtg taccagttgt cttgccaaag gcatagctgg gtagctacgt  2760
gcggacggga taagtgctga aagcatctaa gcatgaagcc cccctcaaga tgagatttcc  2820
catggcgcaa gctagtaaga tccctgaaag atgatcaggt tgataggtca gaggtggaag  2880
cgtggcgaca tgtggagctg actgatacta atagatcgag gacttaacc             2929

SEQ ID NO: 78           moltype = DNA  length = 2821
FEATURE                 Location/Qualifiers
source                  1..2821
                        mol_type = genomic DNA
                        organism = Anabaena cylindrica
SEQUENCE: 78
tcaagctaat aagggctaat ggtggatacc taggcacaca gaggcgaaga aggacgtggt  60
taccgacgaa atgctccggg gagttggaag caaactatga gccggagata tccgaatggg  120
gcaaccctaa atacagcctg ttgaatatat agacaggtat gagccaaccc agcgaattga  180
aacatcttag tagctggagg aagagaaatc aatagagatt ccctaagtag tggtgagcga  240
aaggggaaga gcctaaacca aagagtttac tttttggggt agtgggacag cgagaacgaa  300
tcacggagac tagacgaaac agctaaatac tgtaccagag aaggtgaaag tcctgtagtc  360
```

```
gaaagtcaaa ggatagtagc tgaatcccga gtagcatggg gcacgagaaa tcccatgtga  420
atcagcgagg accatctcgt aaggctaaat actactgtgt gaccgatagt gaaccagtac  480
cgcgagggaa aggtgaaaag aaccccggaa ggggagtgaa atagaacatg aaaccattag  540
cttacaagca gtgggagtcc gattaaacgg atgaccgcgt gcctgttgaa gaatgagccg  600
gcgacttata ggcactggta ggttaaagcg agaatgctgg agccaaaggg aaaccgagtc  660
tgaagagggc gataatcagt gtttatagac ccgaaccctg gtgatctaac catggccagg  720
atgaagcttg ggtaacacca agtggaggtc cgaaccgacc gatgttgaaa aatcggcgga  780
tgagctgtgg ttaggggtga aatgccaatc gaaccaggag ctagctggtt ctccccgaaa  840
tgtgtttagg cgcagcggta atgattatat ctgggggggta aagcactgtt tcggtgcggg  900
ctgggagacc ggtaccaaat cgagacaaac tctgaatacc cagagcacac attgccagtg  960
agacagtggg ggataagctt cattgtcaag agggaaacag cccagaccac cagctaaggt  1020
ccccaaatca tcgctaagtg ataaaggagg tgagagtgca cagacaacta ggaggtttgc  1080
ctagaagcag ccacccttga aagagtgcgt aatagctcac tagtcaagcg ctctcgcgcc  1140
gaaaatgaac ggggctaagc gatgtaccga agctgtggga ttactaataa taatcggtag  1200
gggagcgttc cgtcataggt agaagcagta gcggcaagca gctgtggacg aaacggaagt  1260
gagaatgtcg gcttgagtag cgcaaatgta tgtgagaatc atacaccccg aaaccctaag  1320
ggttccagag ccaggttcgt ccactctgga ttagtcggga cctaaggcga ggccgaacgg  1380
cgtagtcgat ggacaaagtg tcaatagtca cttactgttc tgtgggagca tagataggga  1440
cgcatgaaag atagccacac cctaattggt ttgggagggg tttacgaact ccgagtgggg  1500
aaggatagtg ccaagaaaag ctatgtatgt gatgaaagca gaatacccgt acccgaaacc  1560
gacacaggta gggaggttga gaataccaag gggcgcgaga taactctctc taaggaactc  1620
ggcaaaatgg ccccgtaact tcggaagaag gggtgcccac tgtataagtg ggtcgcagtg  1680
aagagatcca ggcgactgtt taccaaaaac acaggtctcc gcaaactcgt aagaggacgt  1740
atgggggctg acgcctgccc agtgccggaa ggttaaggaa gtcggtcagc gaaagtgaag  1800
ctggcgaccg aagccccggt gaacggcggc cgtaactata acggtcctaa ggtagcgaaa  1860
ttccttgtcg ggtaagttcc gacccgcacg aaaggcgtaa cgatctggat ggtgtctcag  1920
agagagactc ggcgaaatag gaatgtctgt gaagatacgg actgcctgca cctggacaga  1980
aagaccctat gaagctttac tgtagcctgg aattgtgttc gggcttcgct tgcgcaggat  2040
aggtgggagg cgtggagata ttccttgtgg ggaatatgga gccaacggtg agataccact  2100
ctggcgaagc tagaattcta acccatctcc gtgagccgga gagggaacag tttcaggtgg  2160
gcagtttgac tggggcggtc gcctcctaaa aagtaacgga ggcgcgcaaa ggttccctca  2220
gcacgcttgg aaaccgtgcg acgagtgtaa aggcataaag ggagcttgac tgcaagaccg  2280
acaagtcgag caggtacgaa agtaggcctt agtgatccga cggcgcagca tggaatggcc  2340
gtcgctcaac ggataaaagt tactctaggg ataacaggct gatctccccc aagagtccac  2400
atcgacgggg aggtttggca cctcgatgtc ggctcatcgc aacctggggc ggaagtacgt  2460
cccaagggtt gggctgttcg cccattaaag cggtacgtga gctgggttca gaacgtcgtg  2520
agacagttcg gtccatatcc ggtgcaggcg taagagcatt gagaggagcc ttccttagta  2580
cgagaggacc gggaaggacg caccgctggt gtaccagtta tcgtaccaac ggtaaacgct  2640
gggtagccaa gtgcggagcg gataaccgct gaaagcatct aagtgggaag cccacctcaa  2700
gatgagtgct ctcactacat aagtaggtaa ggtcacctgt agaacacagg ttcttaggcg  2760
gtaggtggaa gtgcagtaat gtatgcagcc gagccgtgct aatagaccga gggcttgacc  2820
t                                                                  2821
```

```
SEQ ID NO: 79          moltype = DNA  length = 2777
FEATURE                Location/Qualifiers
source                 1..2777
                       mol_type = genomic DNA
                       note = Brevundimonas (alpha)
                       organism = Brevundimonas sp.
SEQUENCE: 79
caaacgttga agggcttctg acggatgcct tggcgtagag aggcgatgaa ggacgtggca  60
agctgcgata agaaccgggg aggcgctagc accctttgat ccggttattt ccgaatgggg  120
aaacccacct ttacagtctt ccaactctgc atcttcgggt gcggcgattg gcggattgtt  180
gaaaggtata atgagctgaa tacataggca tcattaagcg aaccggggga actgaaacat  240
ctcagtaccc ggaggaaagg acatcaaccg agactcccgt agtagtggcg agcgaaccgg  300
gaccaggcca gtgcttctgt gacataaagg cgaacgacct ggaaaggtcg gccatagcgg  360
gtgacagccc cgtagccgtc aaacagcaga agactcgagt agggcgggac acgtgaaatc  420
ctgtctgaac atggggggac caccctccaa gcctaagtac tcctctacga ccgatagtga  480
acaagtaccg tgagggaaag gtgaaaagca ccccgacaag gggagtgaaa cagatcctga  540
aatcggaagc ctacaagcag tcggagccgc caagcgcggt gacggcgtac cttttgtata  600
atgggtcagc gacttcatgt gtcgagcaag cttaagccgt taggtgtagg cgcagcgaaa  660
gcgagtctga atagggcgct aagttcgacg tatgacgacc cgaaaccagg tgatctatcc  720
atgagcagga tgaaggttgg gtaacaccaa ctggaggtcc gaaccggtga ctgttgaaaa  780
agcctcggat gacttgtgga taggggtgaa aggccaatca aacctggaca tagctggttc  840
tccgcgaaat ctatttaggt agagcgtccg acgaattcct tgggggtag agcactggat  900
ggttgcgggc tgcgcgagcg gtaccaatac taaccaaact ccgaataccc aagagaacta  960
tcgggcagac acacggcggg tgctaacgtc cgtcgtgaaa agggaaacaa ccctaaccat  1020
catctaaggc cccaagtca cggctaagtg ggaaacgatg tgggattgct ttgacaatca  1080
ggaggttggc ttagaagcag ccatcettta aagaaagcgt aacagctcac tgatcaagcg  1140
atcctgcgcg gaaaatgtaa cggggctcaa gccgtgcgcc gaagatatgg gtttgcagtt  1200
tactgcaagc ggtagcggag cgttccgtaa gccagtgaag gtcaggcgtg agcctggctg  1260
gaggtatcgg aagtgagaat gctgacatga gtaacgatag gagtgtgaga gacactcccg  1320
ccgaaagacc aagggttcct gcgtaaagct aatctgcgca gggttagtcg gcccctaagg  1380
cgaggctgaa aagcgtagtc gatgggaagc aggtaaatat tcctgcacca gctggaagtg  1440
acggatggca taactcgtac gcacttattg gattgtgcgt gcgggggcgt tgtccctgga  1500
aataactcca gcagagaccg tacccgaaac cgacacaggt ggtcaggtag agcataccaa  1560
ggcgtttgag agaactatgc tgaaggaact cggcaaattg cacgcgtaac ttcggaataa  1620
gcgtgactca ccctgcgcaa gcaggactga gtggcacaag ccaggggggta gcgactgttt  1680
agcaaaaaca cagggctctg cgaagcagca atgcgacgta tagggtctga cgcctgcccg  1740
```

```
gtgcctgaag gttaaaggga gatgtgaaag cgtcgaactg aagcccaggt aaacggcggc  1800
cgtaactata acggtcctaa ggtagcgaaa ttccttgtcg ggtaagttcc gacctgcacg  1860
aatggcgtaa cgacttcccc actgtctcca gcataggctc agtgaaattg aattccccgt  1920
gaagatgcgg ggttcccgcg gtcagacgga aagaccctat gaacctttac tatagcttcg  1980
ccttggcgtt agcgaccgta tgtgtaggat aggtgggaga ctatgaagcc ggggcgccag  2040
ctctggtgga gtcatccttg aaataccacc cttactgtcg ttgacgtcta accgagggcc  2100
gttatccggt cccgggacat ggcgtggtgg gtagtttgac tggggcggtc gcctcccaaa  2160
gtgtaacgga ggcgcgcgat ggtgagctca gagcggtcgg aaatcgctcg tcgagtgcaa  2220
tggcataagc tcgcctgact gcgagactga caagtcgagc agagacgaaa gtcggccata  2280
gtgatccggt ggtcccgcgt ggaagggcca tcgctcaacg gataaaaggt actctaggga  2340
taacaggctg attttgccca agagtccata tcgacggcaa agtttggcac ctcgatgtcg  2400
gctcatcaca tcctggggct ggagcaggtc ccaagggtat ggctgttcgc catttaaagt  2460
ggtacgtgag ctgggttcag aacgtcgtga gacagtttgg tccctatctg ccgtgggtgt  2520
tcgaagcttg agaggatctg tccctagtac gagaggaccg ggatggacat acctctggtg  2580
gacctgtcat ggcgccagct gtgcagcagg gtagctaagt atggaataga taaccgctga  2640
aagcatctaa gcgggaaact aacctcaaaa caaggcttcg ctgaggatcg tggaagacta  2700
ccacgttgat aggccaggtg tggaagcgcg gcgacgcgtg aagcttactg gtactaataa  2760
tccgatcggt ttgatcg                                                 2777

SEQ ID NO: 80           moltype = DNA  length = 111
FEATURE                 Location/Qualifiers
source                  1..111
                        mol_type = genomic DNA
                        note = Unknown organism
                        organism = unidentified
SEQUENCE: 80
tggtggcgat agcgaagagg tcacacccgt tcccattccg aacacggcag ttaagctctt  60
cagcgccgat ggtagttggg ggtttccccc tgtgagagta ggacgtcgcc a           111

SEQ ID NO: 81           moltype = DNA  length = 111
FEATURE                 Location/Qualifiers
source                  1..111
                        mol_type = genomic DNA
                        note = Unknown organism
                        organism = unidentified
SEQUENCE: 81
tggtggcgat agcgaagagg tcacacccgt tcccattccg aacacggcag ttaagctctt  60
cagcgccgat ggtagttggg ggtttccccc tgtgagagta ggacgccgcc a           111

SEQ ID NO: 82           moltype = DNA  length = 108
FEATURE                 Location/Qualifiers
source                  1..108
                        mol_type = genomic DNA
                        note = Unknown organism
                        organism = unidentified
SEQUENCE: 82
ggtggctatg tcggaggttc cccacccgat cccattccga actcggtcgt taagccctcc  60
agagccaatg gtacttcgtc tcaaggcgcg ggagagtagg tcgccgcc              108

SEQ ID NO: 83           moltype = DNA  length = 1483
FEATURE                 Location/Qualifiers
source                  1..1483
                        mol_type = genomic DNA
                        note = Shinella (alpha proteobacteria)
                        organism = Shinella sp.
SEQUENCE: 83
ctgagagttt gatcctggct cagaacgaac gctggcggca ggcttaacac atgcaagtcg  60
aacgcactct tcggagtgag tggcagacgg gtgagtaaca cgtgggaatc tacctgatgg  120
tacggaataa cacagggaaa cttgtgctaa taccgtatgt gcccctaggg ggaaagattt  180
atcgccatca gatgagcccg cgtcggatta gctagttggt ggggtaatgg cctaccaagg  240
cgacgatccg tagctggtct gagaggatga tcagccacac tgggactgag acacggccca  300
gactcctacg ggaggcagca gtggggaata ttggacaatg ggcgcaagcc tgatccagcc  360
atgccgcgtg agtgatgaag gccctagggt tgtaaagctc tttcaccggt gaagataatg  420
acggtaaccg gagaagaagc cccggctaac ttcgtgccag cagccgcggt aatacgaagg  480
gggctagcgt tgttcggaat tactgggcgt aaagcgcacg taggcgggta tttaagtcag  540
gggtgaaatc ccggagctca actccggaac tgcctttgat actgggtacc tagagtatgg  600
aagaggtaag tggaattccg agtgtagagg tgaaattcgt agatattcgg aggaacacca  660
gtggcgaagg cggcttactg gtccattact gacgctgagg tgcgaaagcg tggggagcaa  720
acaggattag ataccctggt agtccacgcc gtaaacgatg aatgttagcc gtcggcatgc  780
atgcatgtcg gtggcgcagc taacgcatta aacattccgc ctggggagta cggtcgcaag  840
attaaaactc aaaggaattg acgggggccc gcacaagcgg tggagcatgt ggtttaattc  900
gaagcaacgc gcagaacctt accagccctt gacatgtcgg tcgcggatta cagagatgtt  960
ttccttcagt taggctggac cgaacacagg tgctgcatgg ctgtcgtcag ctcgtgtcgt  1020
gagatgttgg gttaagtccc gcaacgagcg caaccctcgc ccttagttgc cagcattcag  1080
ttgggcactc taaggggact gccggtgata agccgagagg aaggtgggga tgacgtcaag  1140
tcctcatggc ccttacgggc tgggctacac acgtgctaca atggtggtga cagtgggcag  1200
cgagacagcg atgtcgagct aatctccaaa agccatctca gttcggattg cactctgcaa  1260
ctcgagtgca tgaagttgga atcgctagta atcgcggatc agcatgccgc ggtgaatacg  1320
ttcccgggcc ttgtacacac cgcccgtcac accatgggag ttggttttac ccgaaggcac  1380
```

```
tgcgctaacc gcaaggggc aggtgaccac ggtagggtca gcgactgggg tgaagtcgta  1440
acaaggtagc cgtaggggaa cctgcggctg gatcacctcc ttt                   1483

SEQ ID NO: 84          moltype = DNA  length = 1486
FEATURE                Location/Qualifiers
source                 1..1486
                       mol_type = genomic DNA
                       note = Nostoc NIES-3756
                       organism = Nostoc sp.
SEQUENCE: 84
acggagagtt tgatcctggc tcaggatgaa cgctggcggt atgcttaaca catgcaagtc  60
gaacggtctc ttcggagata gtggcggacg ggtgagtaac gcgtgagaat ctggctctag  120
gtcggggaca acagttggaa acgactgcta ataccggatg tgccgaaagg tgaaagattt  180
attgcctaga gatgagctcg cgtctgatta gctagttggt gtggtaagag cgcaccaagg  240
cgacgatcag tagctggtct gagaggatga tcagccacac tgggactgag acacggccca  300
gactcctacg ggaggcagca gtggggaatt ttccgcaatg ggcgaaagcc tgacggagca  360
ataccgcgtg agggaggaag gctcttgggt tgtaaacctc ttttctcagg gaataaaaaa  420
atgaaggtac ctgaggaata agcatcggct aactccgtgc cagcagccgc ggtaatacgg  480
aggatgcaag cgttatccgg aatgattggg cgtaaagggt ccgcaggtgg cagtgtaagt  540
ctgctgtcaa agaatgaggc ttaacctcat caaggcagtg gaaactacac agctagagta  600
cggtcggggt agaaggaatt cctggtgtag cggtgaaatg cgtagagatc aggaagaaca  660
ccggtggcga aagcgttctg ctagacctgt actgacactg agggacgaaa gctaggggag  720
cgaatgggat tagataccc agtagtccta gccgtaaacg atggatacta ggcgtggctt  780
gtatcgaccc gagccgtgcc ggagccaacg cgttaagtat cccgcctggg gagtacgcac  840
gcaagtgtga aactcaaagg aattgacggg ggcccgcaca agcggtggag tatgtggttt  900
aattcgatgc aacgcgaaga accttaccaa gacttgacat gtcgcgaatc ctcttgaaag  960
agaggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgtct tgggctacac acgtactaca atgctacgga cagagggcag  1200
caagctagcg atagcaagca aatcccgtaa accgtagctc agttcagatc gcaggctgca  1260
actcgcctgc gtgaaggagg aatcgctagt aattgcaggt cagcatactg cagtgaattc  1320
gttcccgggc cttgtacaca ccgcccgtca caccatggaa gctggcaacg cccgaagtca  1380
ttactccaac ttttcggagg ggaggatgcc taaggcagtg ctggtgactg gggtgaagtc  1440
gtaacaaggt agccgtaccg gaaggtgtgg ctggatcacc tccttt                1486

SEQ ID NO: 85          moltype = DNA  length = 1558
FEATURE                Location/Qualifiers
source                 1..1558
                       mol_type = genomic DNA
                       note = Opitutus sp. GAS368 Verrucomicrobia
                       organism = Opitutus sp.
SEQUENCE: 85
ttcggagagt ttgatcctgg ctcagaatga acgctggcgg cgtggttaag acatgcaagt  60
cgaacggttt ttcaggtgta gcaatacact tgaaaagcag tggcgaacgg gtgcgtaaca  120
cgtgaacaat ctacctttta gtgtggaata gctcggcgaa agccggatta ataccgcatg  180
tggttgctgc tcgcatgagt ggcatactaa agtcagggac cgcaaggcct gacgctatta  240
gaggagttcg cggcctatca gctagttggc gaggtaacgg ctcaccaagg ctaagacggg  300
tagctgatct gagaggatga tcagccacac tggaactgag acacggtcca gacacctacg  360
ggtggcagca gtttcgaatc attcacaatg ggcgaaagcc tgatggtgcg acgccgcgtg  420
agggatgaag gtcttcggat tgtaaacctc tgtcaccggg gaagaaacgc ttcaagttaa  480
cagcttgaag cctgacttaa cccggagagg aagcagtggc taactctgtg ccagcagccg  540
cggtaataca gagactgcaa gcgttattcg gattcactgg gcgtaaaggg tgcgcaggcg  600
gttgggtgtg tcagatgtga aatcccgagg cttaacctcg gaactgcgtc tgaaactact  660
cgactagagt actggagagg gtaacggaat tcacggtgta gcagtgaaat gcgtagatat  720
cgtgaggaac accagaggcg aaggcggtta cctggacagt tactgacgct caggcacgaa  780
agcatgggga gcaaaaggga ttagataccc ctgtagtcca tgccctaaac ggtgcacact  840
aggtcttggc ggattcgacc ccaccagggc ccaagctaac gcgttaagtg tgccgcctga  900
ggactacggt cgcaagacta aaactcaaag gaattgacgg gggcccgcac aagcggtgga  960
gcatgtggct caattcgatg caacgcgaag aaccttacca ggccttgaca tgcactagac  1020
cgactctgaa aggagtcttc ccttcggggc tggtgcacag gtgctgcatg gctgtcgtca  1080
gctcgtgtcg tgagatgttg cgttaagtcg cgcaacgagc gcaacccctg tccttagttg  1140
ccatcaggta aagctgggca ctctagggag acaaaccctc tctgagggtg ggaaggtggg  1200
gatgacgtca agtcaggatg gcccttacgg cctgggctgc acacgtgcta caatgctcgg  1260
tacagaggga cgcaataccg cgaggtggag caaatcctaa aaaccgagcc cagttcagat  1320
tgcagtctgc aactcgactg catgaagccg gaatcgctag taatggcgta tcagctacga  1380
cgccgtgaat acgttcccgg gccttgtaca caccgcccgt cacgtcatga aagccggttt  1440
tgcccgaagt gcgtttgcca accagcaatg gaggcgacgc cctaaggtga ggctggtaat  1500
tgggacgaag tcgtaacaag gtagccgtag gggaacctgc ggctggatca cctccttt   1558

SEQ ID NO: 86          moltype = DNA  length = 1501
FEATURE                Location/Qualifiers
source                 1..1501
                       mol_type = genomic DNA
                       note = Runella sp. NBRC 15147 (Bacteroides)
                       organism = Runella sp.
SEQUENCE: 86
atggagagtt tgatcctggc tcaggatgaa cgctagcggc aggcctaata catgcaaggc  60
gaaggggcag caatgtcact gtcgtacggg tgcgtaacgc gtatgcaacc tacctatcac  120
```

```
cggggatag cctttggaaa cagggattaa taccgcataa tactataggg tagcattatt  180
ttatagttaa agatttattg gtgatagatg ggcatgcgtc tgattagtta gttggcaggg  240
taacggccta ccaagacgat gatcagtagg gggcgtcaga gcgtggtccc ccacactggc  300
actgagatac gggccagact cctacgggag gcagcagtag ggaatattgg gcaatggatg  360
caagtctgac ccagccatgc cgcgtgcagg aagaaggtcc tctggattgt aaactgcttt  420
tgtcggggaa gaataggtct cttgcgaggg attgtgacgg tacccgatga ataagccacg  480
gctaactacg tgccagcagc cgcggtaata cgtaggtggc aagcgttgtc cggatttatt  540
gggtttaaag ggtgcgtagg tggtttgata agtcagtggt gaaagccggt tgctcaacaa  600
tcgagttgcc attgatactg tcggacttga gagaagtgga ggttcatgga atggatggtg  660
tagcggtgaa atgcatagat atcatccaga acgtcgattg cgaaggcagt gggctgtact  720
ttttctgaca ctgaggcacg aaagcgtggg gatcaaacag gattagatac cctggtagtc  780
cacgctgtaa acgatgcgaa ctagctttcg ggtttaagat tcgggggcta agggaaaccg  840
ataagttcgc cacctgggga gtacgccggc aacggtgaaa ctcaaaggaa ttgacggggg  900
tccgcacaag cggtggagca tgtggtttaa ttcgatgata cgcgaggaac cttacctggg  960
ctaaatcaca tttgaattac tcagagatga gtaagctgtt aaaagcagat gtgaaggtgc  1020
tgcatggctg tcgtcagctc gtgccgtgag gtgttgggtt aagtcccgca acgagcgcaa  1080
cccctgggaa tagttgctaa cacataatgg tgaggactct atttcaactg cctgcgcaag  1140
cagagaggaa ggggggggacg acgtcaagtc atcatggccc ttacgtccag ggctacacac  1200
gtgctacaat ggcgtgtaca gagtgttgcg aggcagcgat gccaagccaa tcactaaaag  1260
cacgtcacag ttcggattgc aggctgcaac tcgcctgtat gaagctggaa tcgctagtaa  1320
tcgcgcatca gcaatggcgc ggtgaatacg ttcccgggcc ttgtacacac cgcccgtcaa  1380
gccatggaag tcggggagac ctaaagcgga agattaaaga cttcgttagg gtaaatctgg  1440
taactggggc taagtcgtaa caaggtagcc gtaccggaag gtgtggctgg aacacctcct  1500
t                                                                 1501

SEQ ID NO: 87          moltype = DNA  length = 2786
FEATURE                Location/Qualifiers
source                 1..2786
                       mol_type = genomic DNA
                       note = Shinella (alpha)
                       organism = Shinella sp.
SEQUENCE: 87
tcgtaagggc aattggtgga tgccttggca tgcacaggcg atgaaggacg tgatacgctg  60
cgataagccg tggggagctg cgaatgagct ttgatccatg gatttccgaa tggggaaacc  120
caccttaaat gcttggaaaa tccaaactga cagcgatgtc ggcttgggtt tccaagcatt  180
gtgataaggt atcttattct gaatacatag gggtaagaag cgaacgcagg gaactgaaac  240
atctaagtac ctgcaggaaa ggacatcaac cgagactccg caagtagtgg cgagcgaacg  300
cggaccaggc cagtggcaat gctgaataaa gtggaacgga atggaaagtc cggcctcagc  360
gggtgatagc cccgtacacg tagaacaggc attgtccttg agtaaggcgg gacacgtgaa  420
atcctgtctg aacatgggga gaccactctc caagcctaag tactcgtgca tgaccgatag  480
cgaacaagta ccgtgaggga aaggtgaaaa gcaccccgac aaggggagtg aaatagaacc  540
tgaaaccggt tgcctacaag cagtcggagg ccgcaaggct gacggcgtac cttttgtata  600
atgggtcaac gacttagtgt aactagcaag cttaagccga taggtgtagg cgcagcgaaa  660
gcgagtctga atagggcgtt tagttagttg cattagaccc gaaaccgagt gatctagcca  720
tgagcaggct gaaggttggg taacaccaac tggagggccg aacccgcatc tgttgcaata  780
gattgggatg acttgtggct aggggtgaaa ggccaatcaa actcggagat agctggttct  840
ccgcgaaatc tatttaggta gagcgtcgag cgaatacccc ggggggtaga gcactggatg  900
ggctatgggg actcaccgtc ttactgatcc taaccaaact ccgaataccc gggagtacta  960
ctcggcagac acacggcggg tgctaacgtc cgtcgtgaaa agggcaacaa ccctgacctc  1020
cagctaaggt ccccaagtca tggctaagtg ggaaaggatg tgaggatccc aaaacaacca  1080
ggatgttggc ttagaagcag ccatcattta aagaaagcgt aacagctcac tggtctaaat  1140
aagggtcttt gcgccgaaaa tgtaacgggg ctaaagccat gcaccgaagc tgaggattgg  1200
acgcaagtcc agtggtagcg gagcgttccg taagcctgtg aagggagacc cgtgagggct  1260
cctggaggta tcggaagtgc gaatgttgac atgagtaacg ataaagaggg tgagagaccc  1320
tctcgccgaa agaccaaggg ttcctgctta aagttaatct gagcagggtt agccggcccc  1380
taaggcgagg cggaaacgcg tagtcgatgg gaaccacgtt aatattcgtg ggcctggtgg  1440
tagtgacgga ttgcgtaact tgttcagact tattggattg tctgggcggg gaagcggttc  1500
caggaaatag ctccaccgta tagaccgtac ccgaaaccga cacaggtggt caggtagagt  1560
ataccaaggc gcttgagaga actctgctga aggaactcgg caaattgcac gcgtaacttc  1620
ggaagaagcg tgaccccaag gtacgcaagt attttggggt ggcacagacc agggggtagc  1680
gactgtttat caaaaacaca gggctctgcg aagtcgcaag acgacgtata gggtctgacg  1740
cctgcccggt gctggaaggt taagaggaga ggtgcaagct ttgaatcgaa gccccagtaa  1800
acggcggccg taactataac ggtcctaagg tagcgaaatt ccttgtcggg taagttccga  1860
cctgcacgaa tggcgtaacg acttccccgc tgtctccagc atagactcag tgaaattgaa  1920
ttccccgtga agatgcgggg ttcctgcggt tagacggaaa gaccccgtgc acctttacta  1980
tagctttaca ctggcattcg tgtcggcatg tgtaggatag gtggtaggct ttgaagcggg  2040
gacgccagtt ctcgtggagc catccttgaa ataccaccct tatcgtcatg gatgtctaac  2100
cgcggcccgt catccgggtc cgggacagtg tatggtgggt agtttgactg gggcggtcgc  2160
ctccgaaaga gtaacggagg cgcgcgatgg tgggctcaga ccggtcggaa atcggtcgtc  2220
gagtgcaatg gcataagccc gcctgactgc gagactgaca agtcgagcag agacgaaagt  2280
cggtcatagt gatccggtgg tcccgcgtgg aagggccatc gctcaacgga taaaaggtac  2340
gccggggata acaggctgat gacccccaag agtccatatc gacggggttg tttggcacct  2400
cgatgtcggc tcatcgcatc ctggggctgg agcaggtccc aagggtttgg ctgttcgcca  2460
attaaagcgg tacgtgagct gggttcagaa cgtcgtgaga cagttcggtc cctatctgcc  2520
gtgggtgtag gaatattgac aggatctgtc cctagtacga gaggaccggg atggacatat  2580
ctctggtgga cctgttgtcg tgccaacggc atagcagggt agctatatat ggaatggata  2640
accgctgaag gcatctaagc gggaaaccaa cctgaaaacg agtattccct tgagagccgt  2700
ggaagacgac cacgttgata ggccgggtgt ggaagtgcag caatgcatga agcttaccgg  2760
tactaatagc tcgattggct tgatcg                                      2786
```

```
SEQ ID NO: 88          moltype = DNA  length = 2716
FEATURE                Location/Qualifiers
source                 1..2716
                       mol_type = genomic DNA
                       note = Polymorphum gilvum SL003B-26A1 (Alphaproteobacteria)
                       organism = Polymorphum gilvum
SEQUENCE: 88
cttaagggca ttcggtggat gccttggcgt cgagaggcga tgaaggacgt ggtacgctgc  60
gataagctac ggggagctgc gaacaagctt tgatccgtag atttccgaat ggggaaaccc  120
ggcccgcaag ggtcatcccg caagggaagc gaacccgggg aagtgaaaca tctcagtacc  180
cggaggaaag gacatcaaca gagactccgc tagtagtggc gagcgaacgc ggaccaggcc  240
agtggcctat gcaatcaaac cggaactgtc tggaaaggca ggcctcagcg ggtgacagcc  300
ccgtacgggt aacggctgca taggtcctcg agtaaggcgg gacacgtgaa atcctgtctg  360
aacatggggg gaccaccctc caagcctaag tactcctcga cgaccgatag cgaacaagta  420
ccgtgaggga aaggtgaaaa gcaccccgac gaggggagtg aaacagttcc tgaaaccgga  480
tgcctacaaa cagtcggagc ctgcaagggt gacggcgtac cttttgtata atgggtcagc  540
gacttaattt aacgagcaag cttaagccga taggtgtagg cgcagcgaaa gcgagtccga  600
atagggcgtc aagttcgttg gattagaccc gaaaccgggt gatctagcca tgagcaggct  660
gaaggcaagg taacacttgc tggagggccg aaccgttgaa tgttgcaaaa ttctcggatg  720
acttgtggtt aggggtgaaa ggccaatcaa actcggtaat agctggttct ccgcgaaatc  780
tatttaggta gagcgtcgga cgaatactcc agggggtaga gcactggatg ggctaggggt  840
ccccacagga ttaccaaacc taaccaaact ccgaatacct ggaagtacta tccggcagac  900
acacggcggg tgctaacgtc cgtcgtgaag agggaaacaa ccctgaccgc cagctaaggc  960
ccccaaatcg tggctaagtg tgaaaggatg tgagaatccc aaaacaacca ggatgttggc  1020
ttagaagcag ccatcattta aagaaagcgt aacagctcac tggtctagat aagggttctt  1080
gcgccgacaa tgtatcgggg ctcaagccac gtgccgaagc tgcgggtgca tcgcaagatg  1140
cgcggtagcg gagcgttccg taagcctgtg aagcggtacc cgtgaggggc cgtggaggta  1200
tcggaagtga gaatgctgac atgagtaacg gaaaggggtg tgagagacac ccccgccgaa  1260
agtccaaggg ttcctgcgta aagctaatct gcgcagggtc agccggcccc taagacgagg  1320
ctgaaaagcg tagtcgatgg gaaccaggtg aatattcctg ggcctgtgga tggtgacgaa  1380
cgccgtaagt tgtcgaccct tactggattg ggtcggctgc gaaggagttc caggaaatag  1440
cctccacgta tagaccgtac ccgaaaccga ctctggtgga ctggtagagc atacctaggc  1500
gcttgagaga acgatgctga aggaactcgg caatttgcct ccgtaacttc gggataagga  1560
ggcctcctcc gcgggcaacc gtgggggagg ggcacaaaac agggggtggc gactgtttat  1620
caaaaacaca gggctctgcg aagccgtaag gcgacgtata gggtctgacg cctgcccggt  1680
gccggaaggt taagaggaga ggtgcaagct ttgaatcgaa gccccggtaa acggcggccg  1740
taactataac ggtcctaagg tagcgaaatt ccttgtcggg taagttccga cctgcacgaa  1800
tggcgtaacg acttccccgc tgtctccagc atagactcag tgaaattgaa ttccccgtga  1860
agatgcgggg ttcctgcggt tagacggaaa gaccccgtga acctttactg caactttgca  1920
ctggtatccg tgtcgtcatg tgtaggatag gtggtaggct atgaagccgg ggcgccagct  1980
ctggtggagc catccttgaa ataccaccct tgaagtcatg aatatctaac tgcggcgtgt  2040
tatccacgcc caggacagtg catggtgggt agtttgactg gggcggtcgc ctcccaaaga  2100
gtaacggagg cgcgcgaagg tgggctcaga gcggtcggaa atcgctcgtt gagtgcaatg  2160
gcataagcct gcctgactgc gagactgaca agtcgagcag agtcgaaaga cggccatagt  2220
gatccggtgg tcccacgtgg acgggccatc gctcaacgga taaaaggtac tccggggata  2280
acaggctgat gatgcccaag agtccatatc gacggcatcg tttggcacct cgatgtcgac  2340
tcatcacatc ctggggctgg agcaggtccc aagggttcgg ctgttcgccg attaaagtgg  2400
tacgtgagtt gggttcagaa cgtcgtgaga cagtttggtc cctatctgcc gtgggtgtag  2460
gagacttgag aggatctgcc cttagtacga gaggaccggg gtggacgtac ctctggtgga  2520
cctgttgtgg cgccagccgc atagcagggt agctaagtac ggtcgggata accgctgaaa  2580
gcatctaagc gggaaaccca cctcaaaact aggtctccct tgagagccgt ggtagacgac  2640
cacgtcgata ggccgggtgt ggaagcgtgg cgacacgtga agcttaccgg tactaatagc  2700
tcgatcggct tgatca                                                2716

SEQ ID NO: 89          moltype = DNA  length = 2821
FEATURE                Location/Qualifiers
source                 1..2821
                       mol_type = genomic DNA
                       note = Nostoc sp. NIES-3756
                       organism = Nostoc sp.
SEQUENCE: 89
tcaagctaat aagggctaat ggtggatacc taggcacaca gaggcgaaga aggacgtggt  60
taccgacgaa atactccggg gagttggaag caaacattga gccggaggtg tccgaatggg  120
gcaaccctaa atacagcctg ttgaatatat agacaggtat gagccaaccc agcgaactga  180
aacatcttag tagctggagg aaaagaaatc aaaagagatt ccccaagtag tggtgagcga  240
aaggggaaga gcctaaacca gagggtttac cttctggggt tgtgggacag cgatatcgaa  300
tccagcgatt agacgaagca gctaaatact gcaccagaga aagtgaaagt cttgtagtcg  360
aaaattcaag gatagtagct gaatcccgag tagcatggag cacgaggaat tccatgtgaa  420
tcagcgagga ccatctcgta aggctaaata ctactgtgtg accgatagtg aaccagtacc  480
gcgagggaaa ggtgaaaaga accccgcaag gggagtgaaa tagaacatga aaccattagc  540
ttacaagcag tgggagtccg attaaacgga tgaccgcgtg cctgttgaag aatgagccgg  600
cgacttatag gcactggtag gttaagacga aaatgtcgga gccaaaggga aaccgagtct  660
gaaaagggcg gtaatcagtg tttatagacc cgaaccctgg tgatctaacc atggccagga  720
tgaagcttgg gtaacaccaa gtggaggtcc gaaccgaccg atgttgaaaa atcggcggat  780
gagttgtggt taggggtgaa atgccaatcg aaccaggagc tagctggttc tccccgaaat  840
gtgttgaggc gcagcggtaa tgattatatc tagggggtaa agcactgttt cggtgcgggc  900
tgggagaccg gtaccaaatc gagacaaact cagaatacct agagcacaca ttgccagtga  960
gacggtgggg gataagcttc atcgtcaaga gggaaacagc ccagaccacc agctaaggtc  1020
```

```
cccaaatcat cactaagtga taaaggaggt gagattgcat agacaactag gaggtttgcc  1080
tagaagcagc cacccttgaa agagtgcgta atagctcact agtcaagcga tcttgcgccg  1140
aaaatgaacg gggctaagtg atgtaccgaa gctgtgggat taactaaaca ttaatcggta  1200
ggggagcgtt ccgtagtagg tagaagcagt agcggcgagc agctgtggac gagacggaag  1260
tgagaatgtc ggcttgagta gcgcaaacat tggtgagaat ccaatgcccc gaaaccctaa  1320
gggttccaga gccaggttcg tccactctgg gttagtcggg acctaaggcg aggccgaaag  1380
gcgtagtcga tggacacagg gtcaacaatc cctgactagt atacgggagc attattaggg  1440
acgcatgaaa gatagccata ccctgattgg tttgggagga gtttacgaac tccgcgtggt  1500
gaaggatagt gtcaagaaaa gctagtaatg tgatgaacgt atgttacccg tacccgaaac  1560
cgacacaggt agggaggttg agaataccaa ggggcgcgag ataactctct ctaaggaact  1620
cggcaaaatg gccccgtaac ttcggaagaa ggggtgccca cgagagtggg tcgcagtgaa  1680
gagatccagg cgactgttta ccaaaaacac aggtctccgc aaactcgtaa gaggaagtat  1740
gggggctgac gcctgcccag tgccggaagg ttaaggaagt tggtcagccg taaggtaaag  1800
ctgacgaccg aagccccggt gaacggcggc cgtaactata acggtcctaa ggtagcgaaa  1860
ttccttgtcg ggtaagttcc gacccgcacg aaaggcgtaa cgatctggat ggtgtctcag  1920
agagagactc ggcgaaatag gaatgtctgt gaagatacgg actgcctgca cctggacaga  1980
aagaccctat gaagctttac tgtagcctgg aattgtgtcc gggcttcgct tgcgcaggat  2040
aggtgggaag cgatgaagca gtccttgtgg ggactgtgga gctaacggtg agataccact  2100
ctggcgaagc taggattcta acttatttcc gtgatccgga aaaaggacag tttcaggtgg  2160
gcagtttgac tggggcggtc gcctcctaaa aggtaacgga ggcgcgcaaa ggttccctca  2220
gcacgcttgg aaaccgtgcg gcgagtgtaa aggcataaag ggagcttgac tgcaagaccg  2280
acaagtcgag caggtacgaa agtaggcctt agtgatccga cggcgcagag tggaatggcc  2340
gtcgctcaac ggataaaagt tactctaggg ataacaggct gatctccccc aagagtccac  2400
atcgacgggg aggtttggca cctcgatgtc ggctcatcgc aacctggggc ggaagtacgt  2460
cccaagggtt gggctgttcg cccattaaag cggtacgtga gctgggttca gaacgtcgtg  2520
agacagttcg gtccatatcc ggtgcaggcg taagagcatt gagaggagcc ttccttagta  2580
cgagaggacc gggaaggacg caccgctggt gtaccagtta ttgtaccaac agtaaacgct  2640
gggtagccaa gtgcggagcg gataaccgct gaaagcatct aagtgggaag cccacctcaa  2700
gatgagtgct ctcactacat aagtaggtaa ggtcacctga agaacacagg tttataggct  2760
ctaagtggaa gtgcagtaat gtatgtagct gaggagtcct aacagaccga gggcttgacc  2820
t                                                                 2821

SEQ ID NO: 90          moltype = DNA  length = 2895
FEATURE                Location/Qualifiers
source                 1..2895
                       mol_type = genomic DNA
                       note = Opitutus sp. GAS368
                       organism = Opitutus sp.
SEQUENCE: 90
ccagttacag cagatgatgg atgccttggc gtcatcaggc gatgaagggc gcagcaagct  60
gcgataagct tcggggagcg gcatacacgc tttgatccgg agatgcccga atggggaaac  120
ccggcaccgg taattcggtg tcacttcgag atgaatacat agtctcgata gagcaacacg  180
cggagaagtg aaacatctca gtatccgcag gaaaataaag agaatcgatt ccgtcagtag  240
tggcgagcga acgcggaaca gcccaaacca ccgggattca tcctggtggg gttgtaggac  300
cacgatatgg aaagcttaga ttaggaaaac cgtctggaaa gtcgggccaa agagggtgat  360
agccccgtat tcgaaaatcg aagcagacct agtggtatcc tgagtagcac gggacacgtg  420
aaaccccgtg tgaatccatg ccgaccacgg cataaggcta aatactcgat gacgaccgac  480
agtgaactag taccgcgagg gaaaggtgaa aagcacccct gttaggggag tgaaatagta  540
actgaaatca tctgctaaca agtcagtcgg agccccttg  tggggtgacg gcctgccttt  600
tgtataatga gtctgcgagt tattgtcggt agcaagccta agccgctcag cggcgcaggc  660
gcagcgaaag cgagtccgaa tagggcgctt agttgtcggc aatagacccg aaggggaggt  720
gatctaacca tggccaggat gaaacttcgg taacacgaag tggaggtccg aaccggtcaa  780
tcttgagaaa ttgtcggatg agctgtggtt aggagcgaaa gactaatcaa accccctgat  840
agctggttct ttccgaaata tatttgggta tagcctcggg cgctgatttg cggaggtaga  900
gcactaaata agctagggcc cctaccgggg tactgaactt aattaaactc cgaataccgc  960
agagtgaagc ccgggagtca gactgtgggg gataaccttc atagtcaaaa ggagaataat  1020
ccaaaccatc agttaaggtc ccaaaatacg gctcagtgta aaaggatgtg attttgctta  1080
gacaatgggg atgttggctt agaggcagcc atcatttaaa cagtgcgtaa cagctgaccc  1140
atcgagcgaa attgcgccga aaatgatcgg gacttaagcc gtataccgaa gctatggctg  1200
ccatcgcaag atggcggggt aggaaagcgt tccaaatgca gcgaagtgga agggtcaccg  1260
accatggagc gtttggaagt gagaatgcag acataagtaa cgataaagat ggttaaaatc  1320
catctcgcct caattccaag gattcctggg gaaggttcgt cctcccaggg ttagtcggga  1380
gctaagacga ggccgtaagg agtagtcgat gcacagctgg ttcaatattc cagcaccacc  1440
ttattagagt tcgatgccaa ggagtgacgg agaaagttaa cacgagcggg gcgctgattt  1500
ccgttcaagt ccgtaggtta tccggggata aaataccgga tctatctgaa agacgatgaa  1560
gagctgaggc tacggccgag gcgattcgtg tgatactcgg cttccaggaa aagcttcgtg  1620
gctatttgat agggtgcccg taccgtaaac cgacacaggt ggaatagatg agtattctaa  1680
ggcgcgtggg ttaaatctct ctaaggaact cggcaaactg accccgtatg ttagctataa  1740
ggggtgcctc gcaagaggcc acagataaga gtgtcaaccg actgtttagc aaaaacacag  1800
ctctctgcta agtcgcaaga cgacgtatag ggagtgactt gtgaccaatg cggaaaggtg  1860
aaagcctggg gtgcaagctc cgggtctaag cccccgtgaa tgtcggccgt aactataacg  1920
gtcctaaggt agcgaaattc cttgtcgggt aagttccgac ccgcacgaat caagtaacga  1980
gttgacaact gtctcggaga gaggcccagt gaaattgtag tggcggtgaa gatgccgcct  2040
acccgcagca ggacggaaag accctatgca cctttactgt aagctgttat tgtcgcttga  2100
tttttaatac gtagcatagc tgggagactg cgaagcctgc cttcaggggc gggccgagtc  2160
gaaatatgaa ataccagttt ttaattgtta ggcgtctaac ctcgtcccgt catccgggcg  2220
tgggacagtg atagcaggtc agtttttctg gggcggaatc ctcccaaaga gtaacggagg  2280
attacgaagg ttccctcagc ccggtcggta atcgggctat agagcgcatg agtataaggg  2340
agctttactg tgagaccaac aagtcgagca gttgcgaaag caggttcaag tgatccggtg  2400
```

```
gttgaatgtg gaatcgccat cgctcatagg acaaaaggta cgctagggat aacaggctga  2460
tcgcgcccaa gcgttcacag cgacggcgcg gtttggcacc tcgatgtcgg ctcatcacat  2520
cctggggctg gagaaggtcc caagggtccg gctgttcgcc ggttaaagtg gtacgcgagc  2580
tgggttcaga acgtcgtgag acagttcggt cctctatccg ctgtgggcgt ttgtgatttg  2640
aggggttcat tctctagtac gagaggaccg agaatgacgc acctctggtg ttccggttgt  2700
cacgtcagtg gcagcgccgg gtagctatgt gcggaagaga taagcgctga aagcatctaa  2760
gcgccaagct cctcccaaga taagatcaca atccgtcgca agacggtgca aggtccgggt  2820
agaccacccg gttgatagga cagaagtgca agcgtagtaa tacgttcagc ttactgttac  2880
taatgacctt gccgg                                                  2895

SEQ ID NO: 91           moltype = DNA  length = 2485
FEATURE                 Location/Qualifiers
source                  1..2485
                        mol_type = genomic DNA
                        organism = Runella slithyformis
SEQUENCE: 91
aattgaatga cttgggaaag tcagccgcag aaggtgagag ccctgtaaat gtaaagattg  60
ttaacgtagc agtatcctga gtaggtgggg acaggaggaa tcccctctga attcggcggc  120
accatccgcc aaggctaaat acgactgaga gaccgatagt gaacgagtac cgtgagggaa  180
aggtgaaaag taccgggagt accggggtga aatagaacct gaaaccatgc gcttacaagc  240
gggcggagcc cttaggggtg acgccgtgcc ttttgcataa tgagcctacg agttgttctt  300
accagcgagg ttaagcattt aagatgcgca gccgaagcga aagcgagtct gaacagggcg  360
cttagttggt gagagcagac gcgaaacttg gtgatctacc cgtggtcagg ttgaagtgtg  420
ggtaacactg catggaggac cgaaccagta aacgttgaaa agtttttgga tgaactgcgg  480
gtaggggtga aaggccaatc aaactgagaa atagctcgta ctccccgaaa tgtttttagg  540
aacagcgttg tggagagtca ttgtcaggta gagctaccga taggatgcgg gggagtcaaa  600
tcctaccaaa ttctgacgaa ctccgaatgg gcattgatat acacagcagt gagggccggg  660
gtgctaaggt cacggtccga gaggggaaca acccagagca accgctaagg tccctaagta  720
tatactaagt tgaacaaagg aagtccgact gccgagacag ccaggatgtt agcttggaag  780
cagctataca tttaaagagt gcgtaacagc tcactggtcg agcggggcgg gcgtcgataa  840
taaacgggca tcaagtatat caccgaagcg atgcgatagt aatatcggta ggggagcatt  900
ctgtttgcag cgaagctgtg gcgtgagcca tggtggagcg gatagaaaag caaatgtagg  960
cataagtaac gacaatgtat gtgagaacca tacacaccgt aaagctaagg attcctcagc  1020
tatgtcaatc aactgagggt tagtcggggc ctaaggggaa ggcgaaagcc gcacctgacg  1080
gacagcaggt taatattcct gcacctgatg caagtgtgaa gcgcacgggg taatggagga  1140
tgtacgaagt gacggaagtc ttcgttgagc agagtctacg gacgaagcga acatctgaaa  1200
cggcctccaa gaaaaaccgc tgaaacatca gcttgcatga gcccgtaccg taaaccgaca  1260
caggtagctg ggtagaatat accaaggtgc tcaagtgaat cacggttaag gaactcggca  1320
aattagtcct gtaacttcgg gaaaagggac actcgagtaa aattgagtcg cagagaaatg  1380
gcccaggcga ctgtttaaca aaaacacagg gcaacgcaaa gtggagacac gacgtatgtt  1440
gcctgacacc tgcccggtgc cggaaggtta agaggggaag tcatcgcaag agaagctttg  1500
aatcgaagcc ccggtaaacg gcggccgtaa ctataacggt cctaaggtag cgaaattcct  1560
tgtcgggtaa gttccgacct gcacgaatgg tgtaacgatc tgggcactgt ctcaaccgtg  1620
agcttggtga aattgtagta gcggtgaaga tgccgcttac ccgtcacggg acggaaagac  1680
cccgtgcacc tttactacaa ctttgcgttg aacatgggat atgaatgtgt aggataggtg  1740
ggaggctgtg aaccgggttc gtcaggattc ggggagccaa cgttgaaata ccaccctttt  1800
gtattctgtg ttctaattca ttactgaaga ccgcgcatgg tgggtagttt gactggggtg  1860
gtcgcctcca aaagagtaac ggaggcttcc aaaggtcggc tcagcacgct tggtaaccgt  1920
gcggggagtg caaaagcaca agccggcttg actgtgagac cgacgggtcg atcaggtggg  1980
aaaccagggt ttagtgatcc ggtggttgcg catgggtgtg ccatcgctca aaggataaaa  2040
ggtacgccgg ggataacagg ctgatcatcc ccaagagctc acatcgacgg gatggtttgg  2100
cacctcgatg tcggctcgtc acatcctggg gctggagaag gtcccaaggg ttcggctgtt  2160
cgccgattaa agtggcacgc gagctgggtt cagaacgtcg tgagacagtt cggtccctat  2220
ctgtgatggg cgtaggaaat ttgacggggg ctgaccttag tacgagagga ccgggttgga  2280
ctcaccgctg gtgaatcggt tgtaacgcca gttgcacggc cgagtagcta cgtgggcaac  2340
ggataagcgc tgaaagcatc taagtgcgaa accggcctga agatgagatt tccaaacaag  2400
ggacgttata gacgatgacg ttgataggct gcaggtgtaa aggtggtgac atcaaagccg  2460
agcagtacta attgcccaat cgctt                                       2485

SEQ ID NO: 92           moltype = DNA  length = 1905
FEATURE                 Location/Qualifiers
source                  1..1905
                        mol_type = genomic DNA
                        note = Betaproteobacteria bacterium UKL13-2E
                        organism = Betaproteobacteria sp.
SEQUENCE: 92
cccagaccac cagctaaggt ccccaagcat ggttaagtgg aaaacgaagt gggaaggcat  60
agacagtcag gaagttggct tagaagcagc catcctttaa agaaagcgta atagctcact  120
gatcgagtcg tcctgcgcgg aagatgtaac ggggctaaac catgcaccga agctgtggat  180
ttgtacgcaa gtacagatgg taggagagcg ttctgtaggc ctgtgaaggt gtggtgtgaa  240
ccatgctgga ggtatcagaa gtgcgaatgc tgacatgagt agcgataaag ggagtgaaaa  300
gctccctcgc cgaaagcccg aggtttcctg cgcaacgttc atcggcgcag ggtgagtcgg  360
cccctaagga gagggcgaaa gccgtatctg atgggaaact ggttaatatt ccagtaccgt  420
tatccaatgc gatgtgggga cggagaaggt taggcaagcc gggtgttgga cgtcccggtt  480
gaagcgtgta ggcgtggtct ctaggcaaat ccggagatct tagctgaggc gtgataacga  540
ggtctcattg agactgaagt tgctgatacc aagcttccag gaaaagccac taagcttcag  600
ttggataaga ccgtaccgca aaccgacaca ggtgggcagg atgaaaattc taaggcgctt  660
gagagaactc aggagaagga actcggcaaa ttgacaccgt aacttcggaa gaaggtgtgc  720
cctggtaggt tgtagcgatt tactcgcgaa ggccgatagg gttgcagaga atcggtggct  780
```

```
gcgactgttt aacaaaaaca cagcactctg ctaagacgac gagtcgacgt atagggtgtg  840
acgcctgccc ggtgccggaa ggttaaatga tggggtgcaa gctcttgatt gaagccccgg  900
taaacggcgg ccgtaactat aacggtccta aggtagcgaa attccttgtc gggtaagttc  960
cgacccgcac gaatggcgta acgatggcca cactgtctcc tcctgagact cagcgaagtt  1020
gaaatgtttg tgaagatgca atctccccgc ggctagacgg aaagacccca tgcaccttta  1080
ctgtagcttt acattggact gtgacacggc ctgtgtagga tagctgggag cctatgaagt  1140
ggggacgcta gttctcatgg aggcgacgtt gaaataccag cctggtagtg ttgcggttct  1200
aacctggccc cctgatcggg ggtggggacc gtgtatggta ggcagtttga ctggggcggt  1260
ctcctcccaa agagtaacgg aggagtgcga aggtaaccta ggtacggtcg gacatcgtac  1320
tgatagtgca atggcataag gttgcttgac tgcgagactg acaagtcgag caggtgcgaa  1380
agcaggtcat agtgatccgg tggttctgaa tggaagggcc atcgctcaac ggataaaagg  1440
tacgctgggg ataacaggct gattcctccc aagagttcat atcgacgggg gagtttggca  1500
cctcgatgtc ggctcatcac atcctggggc tgtagccggt cccaagggta tggctgttcg  1560
ccatttaaag tggtacgtga gctgggttca aaacgtcgtg agacagtttg gtccctatct  1620
gccgtgggcg ttggaaattt gacgggggct gctcctagta cgagaggacc ggagtggacg  1680
taccgctggt gtacctgttg tttcgccaga agcatcgcag ggtagctaag tacggaagag  1740
ataaccgctg aaagcatcta agcgggaaac ttgcctgaag ataagatttc ccgggggttt  1800
aaccccccttg aagggtcgtt cgagaccagg acgttgatag gcaccatgtg gaagcgcagt  1860
aatgcgttaa gctaaggtgt actaattgcc cgtaaggctt gactc                  1905

SEQ ID NO: 93          moltype = DNA  length = 976
FEATURE                Location/Qualifiers
source                 1..976
                       mol_type = genomic DNA
                       note = Taylorella asinigenitalis strain MCE3
                        (Betaproteobacteria)
                       organism = Taylorella asinigenitalis
SEQUENCE: 93
tcaagtgact aagtgcatga ggtggatgcc ttggcgatgt caggcgatga aagacgcgat  60
agcctgcgat aagcttcggg gagctggcaa ataagctttg atccgaaggt ttctgaatgg  120
ggaaacccac ccgcgagggt acctgctgct gaatacatag gtggcaagga gctaacccgg  180
tgaactgaaa catctcagta gccggaggaa tagaaatcaa ccgagattcc cagagtagtg  240
gcgagcgaaa tgggaacagc ctgtaacttt tagcatttgt gttagcagaa tggtctggaa  300
aggccaacga tagtgggtga tagtcccgta tgcgaaaaca cgagtgtgga actagggtta  360
cgacaagtag ggcgggacac gtgaaatcct gtctgaagat ggggggacca tcctccaagg  420
ctaaatactc gacatcgacc gatagtgaac cagtaccgtg agggaaaggc gaaaagaacc  480
ccgggagggg agtgaaatag atcctgaaac cgcatgcata caaacagtcg gagccctgct  540
taatgagtct ttactctatt ttttatttat aaatcataga gttatgaggg ctaattgagc  600
agggtgacgg cgtacctttt gtataatggg tcagcgactt acgttgtgtt gcgagcttaa  660
ccgaataggg aaggcgtagc gaaagcgagt ctgataaggg cgttgagtag cacggcgtag  720
acccgaaacc ggatgatcta tccatggcca ggatgaaggt tgggtaacac cagctggagg  780
tccgaaccca ctaacgttga aaagttaggg gatgagctgt ggataggggt gaaaggctaa  840
acaaatccgg aaatagctgg ttctctccga aaactattta ggtagtgcct caagtatcac  900
cttcgggggt agagcactgt tttggctagg gggtcgttta gatctaccaa accaaggcaa  960
actgcgaata ccgaag                                                  976

SEQ ID NO: 94          moltype = DNA  length = 110
FEATURE                Location/Qualifiers
source                 1..110
                       mol_type = genomic DNA
                       note = Unknown organism
                       organism = unidentified
SEQUENCE: 94
tggtggttat ggcggggtgg ccgcacccgt tcccattccg aacacggccg tgaaacgccc  60
cagcgccaat ggtacttcgt cttaagacgc gggagagtag gtcgctgcca             110

SEQ ID NO: 95          moltype = DNA  length = 111
FEATURE                Location/Qualifiers
source                 1..111
                       mol_type = genomic DNA
                       note = Unknown organism
                       organism = unidentified
SEQUENCE: 95
tggtgaccat ataccggggg ttccacccgt tcccatcccg aacacggccg ttaagccccg  60
cgtagccaat ggtagtagga cgttaggtcc cgcgagagta ggtcgttgcc a           111

SEQ ID NO: 96          moltype = DNA  length = 110
FEATURE                Location/Qualifiers
source                 1..110
                       mol_type = genomic DNA
                       note = Unknown organism
                       organism = unidentified
SEQUENCE: 96
tggtggctat ggcgaggggg ctggacccga tcccattccg aactcggccg tcaaaaccct  60
cagcgccgat ggtacttcgt ctcaagacgc gggagagtag gtcgctgcca             110

SEQ ID NO: 97          moltype = DNA  length = 109
FEATURE                Location/Qualifiers
source                 1..109
```

```
                        mol_type = genomic DNA
                        note = Unknown organism
                        organism = unidentified
SEQUENCE: 97
tggcgaccat agcgcgttgg ccccacccct tcccatcccg aacaggaccg tgaaacgacg  60
ttgcgccgat gatagtgcgg tcttacccgt gcgaaagtag gtcatcgcc             109

SEQ ID NO: 98           moltype = DNA  length = 1484
FEATURE                 Location/Qualifiers
source                  1..1484
                        mol_type = genomic DNA
                        note = Oligotropha carboxidovorans (Alphaproteobacteria)
                        organism = Oligotropha carboxidovorans
SEQUENCE: 98
cttgagagtt tgatcctggc tcagagcgaa cgctggcggc aggcttaaca catgcaagtc  60
gagcgccgta gcaatacgga gcggcagacg ggtgagtaac gcgtgggaac gtaccttttg  120
gttcggaaca acacagggaa acttgtgcta ataccgaata agcccttacg ggaaagatt  180
tatcgccgaa agatcggccc gcgtctgatt agcttgttgg tgaggtaacg gctcaccaag  240
gcgacgatca gtagctggtc tgagaggatg atcagccaca ttgggactga gacacggccc  300
aaactcctac gggaggcagc agtggggaat attggacaat gggcgcaagc ctgatccagc  360
catgccgcgt gagtgatgaa ggccctaggg ttgtaaagct cttttgtgcg ggaagataat  420
gacggtaccg caagaataag ccccggctaa cttcgtgcca gcagccgcgg taatacgaag  480
ggggctagcg ttgctcggaa tcactgggcg taaagggtgc gtaggcgggt ctttaagtca  540
gaggtgaaag cctggagctc aactccagaa ctgcctttga tactgaggat ctcgagttcg  600
ggagaggtga gtggaactgc gagtgtagag gtgaaattcg tagatattcg caagaacacc  660
agtggcgaag gcggctcact ggcccgatac tgacgctgag gcacgaaagc gtggggagca  720
aacaggatta gataccctgg tagtccacgc cctaaacgat gcgaactgga cgttgggagc  780
aacttggctc tcagtgtcga agctaacgcg ttaagttcgc cgcctgggga gtacggtcgc  840
aagactgaaa ctcaaaggaa ttgacggggg cccgcacaag cggtggagta tgtggtttaa  900
ttcgatgcaa cgcgaagaac cttaccaaga cttgacatgt cgcgaacttt tctgaaagga  960
agaggtgcct tcgggagcgc gaacacaggt ggtgcatggc tgtcgtcagc tcgtgtcgtg  1020
agatgttggg ttaagtcccg caacgagcgc aaccccgtc cttagttgct accatttagt  1080
tgagcactct aaggagactg ccggtgataa gccgcgagga aggtggggat gacgtcaagt  1140
cctcatggcc cttacgggct gggctacaca cgtgctacaa tggcggtgac aatgggatgc  1200
aaaggcgcga gccctagcaa atctcaaaaa gccgtctcag ttcggattgg actctgcaac  1260
tcgagtccat gaagttggaa tcgctagtaa tcgtggatca gcatgccacg gtgaatacgt  1320
tcccgggcct tgtacacacc gcccgtcaca ccatgggagt tggttttacc tgaagacggt  1380
gcgctaaccc gcaagggagg cagccggcca cggtagggtc agcgactggg gtgaagtcgt  1440
aacaaggtag ccgtagggga acctgcggct ggatcacctc cttt                  1484

SEQ ID NO: 99           moltype = DNA  length = 1486
FEATURE                 Location/Qualifiers
source                  1..1486
                        mol_type = genomic DNA
                        note = Nostoc sp. MS1
                        organism = Nostoc sp.
SEQUENCE: 99
acggagagtt tgatcctggc tcaggatgaa cgctggcggt atgcttaaca catgcaagtc  60
gaacggtctc ttcggagata gtggcggacg ggtgagtaac gcgtgagaat ctggctctag  120
gtcggggaca acagttggaa acgactgcta ataccggatg tgccgaaagg tgaaagatta  180
attgcctaga gatgagctcg cgtctgatta gctagttggt gtggtaagag cgcaccaagg  240
cgacgatcag tagctggtct gagaggatga tcagccacac tgggactgag acacggccca  300
gactcctacg ggaggcagca gtggggaatt ttccgcaatg ggcgaaagcc tgacggagca  360
ataccgcgtg agggaggaag gctcttgggt tgtaaacctc ttttctcagg gaataaaaaa  420
atgaaggtac ctgaggaata agcatcggct aactccgtgc cagcagccgc ggtaatacgg  480
aggatgcaag cgttatccgg aatgattggg cgtaaagggt ccgcaggtgg caatgtaagt  540
ctgctgtcaa agaatgaggc ttaacctcat caaggcagtg gaaactacgt agctagagta  600
cggtcggggt agaaggaatt cctggtgtag cggtgaaatg cgtagagatc aggaagaaca  660
ccggtggcga aagcgttctg ctagacctgt actgacactg agggacgaaa gctaggggag  720
cgaatgggat tagatacccc agtagtccta gccgtaaacg atggatacta ggcgtggctt  780
gtatcgaccc gagccgtgcc ggagccaacg cgttaagtat cccgcctggg gagtacgcac  840
gcaagtgtga aactcaaagg aattgacggg ggcccgcaca agcggtggag tatgtggttt  900
aattcgatgc aacgcgaaga accttaccaa gacttgacat gtcgcgaact tttctgaaag  960
gaagaggtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgtct tgggctacac acgtactaca atgctacgga cagagggcag  1200
caagctagcg atagcaagca aatcccgtaa accgtagctc agttcagatc gcaggctgca  1260
actcgcctgc gtgaaggagg aatcgctagt aattgcaggt cagcatactg cagtgaattc  1320
gttcccgggc cttgtacaca ccgcccgtca caccatggaa gctggcaacg cccgaagtca  1380
ttactccaac ttttcggagg ggaggatgcc taaggcagtg ctggtgactg gggtgaagtc  1440
gtaacaaggt agccgtaccg gaaggtgtgg ctggatcacc tccttt                1486

SEQ ID NO: 100          moltype = DNA  length = 484
FEATURE                 Location/Qualifiers
source                  1..484
                        mol_type = genomic DNA
                        note = Uncultured bacterium clone mus-a55 (gamma
                         proteobacteria)
```

```
                         organism = unidentified
SEQUENCE: 100
gtcgtcagct cgtgtcgtga gatgttgggt taagtcccgc aacgagcgca acccttgtcc  60
ttagttgcca gcacgtaatg gtgggaactc taaggagact gccggtgaca aaccggagga  120
aggtggggat gacgtcaagt catcatggcc cttacggcca gggctacaca cgtactacaa  180
tggtagggac agagggtcgc gaagccgcga ggtggagcca atcccagaaa ccctatccca  240
gtccggatcg cagtctgcaa ctcgactgcg tgaagtcgga atcgctagta atcgcggatc  300
agcaatgccg cggtgaatac gttcccgggc cttgtacaca ccgcccgtca caccatggga  360
gtgggttgct ccagaagcag gtagtctaac cgcaaggggg acgcttgcca cggagtggtt  420
catgactggg gtgaagtcgt aacaaggtag ccgtatcgga aggtgcggct ggatcacctc  480
cttt                                                               484

SEQ ID NO: 101           moltype = DNA  length = 2870
FEATURE                  Location/Qualifiers
source                   1..2870
                         mol_type = genomic DNA
                         note = Tahibacter sp. W38
                         organism = Tahibacter sp.
SEQUENCE: 101
tcaagcgact aagcgcatac ggtggatgcc ttggcggtca gaggcgatga aggacgtggc  60
agcctgcgaa aagcactggt gagtcggcag cagacattga cccagtgatg tccgaatggg  120
gaaacccacc cgcaagggta tcccgacctg aatctatagg gtcgggaagc gaaccgaggg  180
aactgaaata tctcattacc tcgaggaaaa gaaatcaacc gagattcccc aagtagtgac  240
gagcgaacgg ggaacagccc ataagcacgg tatgttctag cggaacggtc ctggaaaggc  300
cggccataga aggtgatagc ccggtacgtt aaagggcata ccgcgtgaaa ttgagtaagg  360
cggggcacgt gaaaccctgt ctgaacatgg ggggaccatc ctccaaggct aaatactcct  420
gaccgaccga tagcgaacca gtaccgtgag ggaaaggcga aaagaaccgc ggtgagcgga  480
gtgaaataga acctgaaacc gtatgcgtac aagcagtgga agcccgcaag ggtgactgcg  540
taccttttgt ataatgggtc agcgacttac agtttgtggc gagcttaacc gtctagggta  600
ggcgaaggga aaccgagtct gaatagggcg catagtcgca ggctgtagac ccgaaaccgg  660
gtgatctagc catgcccagg gtgaaggtcc ggtaacacgg actggaggcc cgaacccact  720
cctgttgcaa aagtagggga tgaggtgtgg ctaggagtga aaagctaatc gaacccggag  780
atagctggtt ctcctcgaaa gctatttagg tagcgcctcg cgtatcactg ttgggggtag  840
agcactgtta tggctagcgg gacatcgcgt cttagcaacc catggcaaac tccgaatacc  900
aacacgtgtc agcgcgggag acacacggcg ggtgctaacg tccgtcgtga aaagggaaac  960
aacccagacc cgcagctaag gtccccaaat catcgctcag tggaaaacga tgtgggaagg  1020
ctaaaacagc caggaggttg gcttagaagc agccacccttt taaagaaagc gtaatagctc  1080
actggtcgag tcggcctgcg cggaagattt aacggggcta agcgatgtac cgaagctcgg  1140
ggtttactcg caagagtaag cggtagagga gcgttccgta ggcctgtgaa ggtgagtcgt  1200
aaggcttgct ggaggtatcg gaagtgcgaa tgctgacatg agtaacgata aggggggtga  1260
aaagcctccc cgccgaaagc ccaaggtttc ctcgcgcaac gttcatcggc gcagggtgag  1320
tcggtcccta aggcgaggct gaaaggcgta gtcgatggga agctggttaa tattccagca  1380
cctcgcataa ctgcgatggg gtgacggaga agggtaggtg taccgggcgt tggttgtccc  1440
ggggaaagga ggtaggcgtt gggagtaggc aaatccgctt ccatttacgc cgagcaccga  1500
gacgagctcc tagagcgaag tcactgatcc cacgcttcca ggaaaaacct ctaagcttca  1560
ggttatgcag accgtaccgt aatccgacac tggtaggcag ggtgagaatc ccaaggcgct  1620
tgagagaact cgggtgaagg aactaggcaa catagcaccg taacttcggg agaaggtgcg  1680
cccagaactg tggccacgtg cgtggctgag cagttttggg ccgcagtgac caggccgctg  1740
cgactgttta tcaaaaacac agcactctgc aaactcgtaa gaggacgtat agggtgtgac  1800
acctgcccgg tgctggaagg ttaattgatg gggtcagccg caaggcgaag ctcttgatcg  1860
aagccccagt aaacggcggc cgtaactata acggtcctaa ggtagcgaaa ttccttgtcg  1920
ggtaagttcc gacctgcacg aatggtgtaa cgacagcggc gctgtctcca cccgagactc  1980
agtgaaattg aaatcgctgt gaagatgcag cgttcccgcg gcaagacgga aagaccccgt  2040
gaacctttac tatagcttta cactgaacgt tgagttcgtc tgtgtaggat aggtgggagg  2100
ctttgaagtg tcggcgctag ccggcatgga gccaacgttg aaataccacc ctgatgtgct  2160
tgacgttcta acctaggccc gtaatccggg tcggggaccg tgtatggtgg gtagtttgac  2220
tggggcggtc tcctcccaaa gagtaacgga ggagctcgaa ggtacgctca gcgcggtcgg  2280
acatcgcgca ctgtgtgcaa aggcataagc gtgcttgact gcgagatcga cggatcaagc  2340
aggtacgaaa gtaggactta gtgatccggt ggttctgtat ggaagggcca tcgctcaacg  2400
gataaaaggt actccgggga taacaggctg ataccgccca agagttcata tcgacggcgg  2460
tgtttggcac ctcgatgtcg gctcatcaca tcctggggct gtagtcggtc ccaagggtat  2520
ggctgttcgc catttaaagt ggtacgcgag ctgggttcag aacgtcgtga gacagttcgg  2580
tccctatctg tcgtgggcgt tagagatttg agaggggctg ctcctagtac gagaggaccg  2640
gagtggacga acccctggtg ttccggttgt cacgccagtg gcactgccgg gtagctacgt  2700
tcggaagcga taaccgctga aagcatctaa gcgggaagcg cgcctcaaga tgagatctct  2760
cgggactcaa gtcccctaaa ggccccatgt agactacgtg gttgataggt cgggtgtgta  2820
tcgcagtaat gccgagctaa ccgatactaa tgagccgtgc ggcttgatca            2870

SEQ ID NO: 102           moltype = DNA  length = 2806
FEATURE                  Location/Qualifiers
source                   1..2806
                         mol_type = genomic DNA
                         note = Oligotropha carboxidovorans strain OM4
                         organism = Oligotropha carboxidovorans
SEQUENCE: 102
cttaagggtg ttcggtggat gccttggcgc tgagaggcga tgaaggacgt gctacgctgc  60
gataagccgt gaggagctgc gaaggagctt tgattcacgg atttccgaat ggggaaaccc  120
accttcgata gccgaaactc taagttcaca acgacgcaag tcggtgtgga tttggatttt  180
cggttatcaa gtgaaggtat gagacttctg aatacatagg aggtttcaag cgaacccagg  240
```

```
gaactgaaac atctaagtac ctggaggaaa ggacatcaac cgagactccg ctagtagtgg  300
cgagcgaacg cggaccaggc cagtcataaa tgtgagacaa ccagaacctg tcaggaaagc  360
agggcctcag agggtgatag ccccgtatgg gtaatgcgaa catttatgct cgagtaaggc  420
gggacacgtg aaatcctgtc tgaacatggg gggaccaccc tccaagccta agtactcctc  480
agcgaccgat agtgaaccag taccgtgagg gaaaggtgaa aagcaccccg acgaggggag  540
tgaaatagac ctgaaaccgg acacctacaa acagacggag ctcaagatac gttctgagtg  600
acgtcgtacc ttttgtatta tggccagcg acttaattta acgagcaagc ttaaaccgat  660
aggtgtaggc gtagcgaaag cgagtcttaa tagggcgcca agttcgttgt attagacccg  720
aaacctagtg atctagccat gagcaggttg aaggtgaggt aacactcact ggaggaccga  780
acgggtgtct gttgaaaaag actccgatga cttgtggtta ggggtgaaag gccaatcaaa  840
ctgggaaata gctggttctc cgcgaaagat atttaggtat cgcctcggat gaatgcctca  900
gggggtagag cactggatgg gctaggggga ctcaccgtct taccaaaccc aaccaaactc  960
cgaatacctg agagcaatat ccgggagtca cacggcgggt gctaacgtcc gtcgtggaga  1020
gggaaacaac ccggacctac agctaaggcc cctaattcgt ggctaagtgg gaaaggatgt  1080
ggaaatccca aaacaaccag gaggttggct tagaagcagc catcctttaa agaaagcgta  1140
acagctcact ggtctaaata agggtttctg cgccgaagat gtaacggggc tcaagccacg  1200
agccgaagct taggatgcat acgcaagtat gcgtggtagc ggagcgttct gtaagcctgc  1260
gaagggtgac ccgtgagggc gcctggaggt atcagaagtg cgaatgctgg catgagtaac  1320
gacaaacact gtgaaagaca gtgtcgccga aagtccaagg gttcctgcgt aaagttaatc  1380
ttcgcagggt tagccggtcc ctaaggcgag gccgaaaggc gtagtcgatg ggaatcacgt  1440
gaatattcgt gagccagtgg atggtgacga atcccgtatg ttgttcgacc ttattggatt  1500
ggtcgggcct cgaaggggtt ccaggaaata gcctccacat tagaccgtac ccgaaaccga  1560
cacaggtgga ctggtagagt ataccaaggc gcttgagaga actatgttga aggaactcgg  1620
caatttacct ccgtaacttc ggaataagga ggacctctgc tcgcgcaagc ggtcaggggt  1680
ggcacagacc agggggtggc aactgtttag caaaaacaca gggctctgcg aaatcgcaag  1740
atgacgtata gggtctgacg cctgcccggt gccggaaggt taaaaggaga ggtgcaagcc  1800
ttgaattgaa gccccggtaa acggcggccg taactataac ggtcctaagg tagcgaaatt  1860
ccttgtcggg taagttccga cctgcacgaa tggcgtaatg acttccccgc tgtctccaac  1920
atagactcag tgaaattgaa ttccccgtga agatgcgggg ttcctgcggt cagacggaaa  1980
gaccccgtgc acctttactg tagctttgcg ctggtattcg tgactgtttg tgtagaatag  2040
gtggtagact ttgaagctgt ggcgccagcc atggtggagt cgcaatgtga aataccaccc  2100
taatggttat gggtatctaa ccgcgctccg ttatccggag ccgggacagc gcatggtggg  2160
cagtttgact ggggcggtcg cctcccaaag agtaacggag gcgtgcgaag gtaggctcag  2220
aacggtcgga aatcgttcgt cgagtataat ggcataagcc tgcctgactg cgagaccaac  2280
aagtcgagca gagacgaaag tcggtcatag tgatccggtg gtcccgtgtg gatgggccat  2340
cgctcaacgg ataaaaggta cgccggggat aacaggctga tgacgcccaa gagtccatat  2400
cgacggcgtc gtttggcacc tcgatgtcgg ctcatcacat cctggggctg gagaaggtcc  2460
caagggttcg gctgttcgcc gattaaagtg gtacgtgagc tgggttcaga acgtcgtgag  2520
acagttcggt ccctatctgc cgtgggtgta ggaatattga gaggatttgc ccctagtacg  2580
agaggaccgg ggtgaacgta cctctggtgg agctgttgtc gcgccagcgg cagtgcagca  2640
tagctatgta cggacgggat aaccgctgaa ggcatctaag cgggaaaccc acctcaaaac  2700
gagtattccc ttgagaaccg tggaagacga ccacgttgat aggccgggtg tggaagcgca  2760
gcaatgcgtg cagcttaccg gtactaatcg ttcgattggc ttgatt                 2806
```

```
SEQ ID NO: 103          moltype = DNA  length = 2819
FEATURE                 Location/Qualifiers
source                  1..2819
                        mol_type = genomic DNA
                        note = Nostoc sp. NIES-3756
                        organism = Nostoc sp.
SEQUENCE: 103
tcaagctaat aagggctaat ggtggatacc taggcacaca gaggcgaaga aggacgtggt  60
taccgacgaa atactccggg gagttggaag caaacattga gccggaggtg tccgaatggg  120
gcaaccctaa atacagcctg ttgaatatat agacaggtat gagccaaccc agcgaactga  180
aacatcttag tagctggagg aaaagaaatc aaaagagatt ccccaagtag tggtgagcga  240
aaggggaaga gcctaaacca gagggtttac cttctggggt agtgggacag cgatatcgaa  300
tccagcgatt agacgaagca gctaaatact gcaccagaga aagtgaaagt cttgtagtcg  360
aaaattcaag gatagtagct gaatcccgag tagcatgggg cacgaggaat cccatgtgaa  420
tcagcgagga ccatctcgta aggctaaata ctactgtgtg accgatagtg aaccagtacc  480
gcgagggaaa ggtgaaaaga accccgcaag gggagtgaaa tagaacatga aaccattagc  540
ttacaagcag tgggagtccg attaaacgga tgaccgcgtg cctgttgaag aatgagccgg  600
cgacttatag gcactggtag gttaagacga gaatgtcgga gccaaaggga aaccgagtct  660
gaaaagggcg ataatcagtg tttatagacc cgaaccctgg tgatctaacc atggccagga  720
tgaagcttgg gtaacaccaa gtggaggtcc gaaccgaccg atgttgaaaa atcggcggat  780
gagttgtggt taggggtgaa atgccaatcg aaccaggagc tagctggttc tccccgaaat  840
gtgttgaggc gcagcggtaa tgattatatc taggggggtaa agcactgttt cggtgcgggc  900
tgggagaccg gtaccaaatc gagacaaact cagaatacct agagcacaca ttgccagtga  960
gacggtgggg gataagcttc atcgtcaaga gggaaacagc ccagaccacc agctaaggtc  1020
cccaaatcat cactaagtga taaaggaggt gagattgcat agacaactag gaggtttgcc  1080
tagaagcagc caccccttgaa agagtgcgta atagctcact agtcaagcga tcttgcgccg  1140
aaaatgaacg gggctaagtg atgtaccgaa gctgtgggat tactaataat aatcggtagg  1200
ggagcgttcc gtagtaggta gaagcagtag cggcgagcag ctgtggacga gacggaagtg  1260
agaatgtcgg cttgagtagc gcaaacattg gtgagaatcc aatgccccga aaccctaagg  1320
gttccagagc caggttcgtc cactctgggt tagtcgggac ctaaggcgag gccgaaaggc  1380
gtagtcgatg gacacagggt caacaatccc tgactagtat acgggagcat tattagggac  1440
gcatgaaaga tagccatacc ctgattggtt tgggaggagt ttacgaactc cgcgtggtga  1500
aggatagtgt caagaaaagc tagtaatgtg atgaacgtat gttacccgta cccgaaaccg  1560
acacaggtag ggaggttgag aataccaagg ggcgcgagat aactctctct aaggaactcg  1620
gcaaaatggc cccgtaactt cggaagaagg ggtgcccacg agagtgggtc gcagtgaaga  1680
```

```
gatccaggcg actgtttacc aaaaacacag gtctccgcaa actcgtaaga ggaagtatgg  1740
gggctgacgc ctgcccagtg ccggaaggtt aaggaagttg gtcagccgaa aggtaaagct  1800
gacgaccgaa gccccggtga acggcggccg taactataac ggtcctaagg tagcgaaatt  1860
ccttgtcggg taagttccga cccgcacgaa aggcgtaacg atctggatgg tgtctcagag  1920
agagactcgg cgaaatagga atgtctgtga agatacggac tgcctgcacc tggacagaaa  1980
gaccctatga agctttactg tagcctggaa ttgtgtccgg gcttcgcttg cgcaggatag  2040
gtgggaagcg atgaagcagt ccttgtgggg actgtggagc taacggtgag ataccactct  2100
ggcgaagcta ggattctaac ttatttccgt tatccggaaa aaggacagtt tcaggtgggc  2160
agtttgactg gggcggtcgc ctcctaaaag gtaacggagg cgcgcaaagg ttccctcagc  2220
acgcttggaa accgtgcggc gagtgtaaag gcataaaggg agcttgactg caagaccgac  2280
aagtcgagca ggtacgaaag taggccttag tgatccgacg gcgcagagtg gaatggccgt  2340
cgctcaacgg ataaaagtta ctctagggat aacaggctga tctcccccaa gagtccacat  2400
cgacggggag gtttggcacc tcgatgtcgg ctcatcgcaa cctggggcgg aagtacgtcc  2460
caagggttgg gctgttcgcc cattaaagcg gtacgtgagc tgggttcaga acgtcgtgag  2520
acagttcggt ccatatccgg tgcaggcgta agagcattga gaggagcctt ccttagtacg  2580
agaggaccgg gaaggacgca ccgctggtgt accagttatt gtaccaacag taaacgctgg  2640
gtagccaagt gcggagcgga taaccgctga aagcatctaa gtgggaagcc cacctcaaga  2700
tgagtgctct cactacataa gtaggtaagg tcacgggcag aacacccgtt tataggctct  2760
aagtggaagt gcagtaatgt atgtagctga ggagtcctaa cagaccgagg gcttgacct   2819

SEQ ID NO: 104          moltype = DNA  length = 107
FEATURE                 Location/Qualifiers
source                  1..107
                        mol_type = genomic DNA
                        note = Unknown organism
                        organism = unidentified
SEQUENCE: 104
tggcggccat agcggtgtgg aaccacccga tcccttcccg aactcggaag tgaaacgcac  60
cagcgccgat ggtagtgtgc atccgcatgc gagagtaggt caccgcc                107

SEQ ID NO: 105          moltype = DNA  length = 109
FEATURE                 Location/Qualifiers
source                  1..109
                        mol_type = genomic DNA
                        note = Unknown organism
                        organism = unidentified
SEQUENCE: 105
ggtggttcta gcgaggagcc tcaacccgat cccattccga actcggccgt taaactcctc  60
agcgccaatg gtactatggc tcaagccctg ggagagtagg tcgctgcca              109

SEQ ID NO: 106          moltype = DNA  length = 1485
FEATURE                 Location/Qualifiers
source                  1..1485
                        mol_type = genomic DNA
                        note = Uncultured alpha proteobacterium clone B07-10D
                        organism = unidentified
SEQUENCE: 106
ctgagagttt gatcctggct cagaacgaac gctggcggca ggcttaacac atgcaagtcg  60
aacgcatcct tcgggatgag tggcagacgg gtgagtaaca cgtgggaacc tacccaaagg  120
tacggaataa cacagggaaa cttgtgctaa taccgtatgt gcccttcggg ggaaagattt  180
atcgcctttg gatgggcccg cgtcggatta gctagttggt ggggtaatgg cctaccaagg  240
cgacgatccg tagctggtct gagaggatga tcagccacac tgggactgag acacggccca  300
gactcctacg ggaggcagca gtggggaata ttggacaatg ggcgcaagcc tgatccagcc  360
atgccgcgtg agtgatgaag gccttagggt tgtaaagctc tttcagctgg gaagataatg  420
acggtaccag cagaagaagc cccggctaac ttcgtgccag cagccgcggt aatacgaagg  480
gggctagcgt tgttcggaat cactgggcgt aaagcgcacg taggcggatc gataagtcag  540
gggtgaaatc ccgaggctca acctcggaac tgcctttgat actgtcgacc ttgagtccgg  600
gagaggtgag tggaactccg agtgtagagg tgaaattcgt agatattcgg aagaacacca  660
gtggcgaagg cgactcgctg gacaagtatt gacgctgagg tgcgaaagcg tggggagcaa  720
acaggattag ataccctggt agtccacgcc gtaaacgatg ataactagct gtccgggttc  780
atggaacttg ggtggcgcag ctaacgcatt aagttatccg cctggggagt acggtcgcaa  840
gattaaaact caaaggaatt gacgggggcc tgcacaagcg gtggagcatg tggtttaatt  900
cgaagcaacg cgcagaacct taccagctct tgacatggca ggacggtttc cggagacgga  960
ctccttcact tcggtgacct gcacacaggt gctgcatggc tgtcgtcagc tcgtgtcgtg  1020
agatgttggg ttaagtcccg caacgagcgc aaccctcgtc tccagttgcc atcgggtaat  1080
gccgggcact ttggagaaac tgccggtgac aagccggagg aaggtgggga tgacgtcaag  1140
tcctcatggc ccttacgggc tgggctacac acgtgctaca atggcggtga cagtgggacg  1200
cgaacccgcg agggtgagca aatctccaaa agccgtctca gttcggattg cactctgcaa  1260
ctcgagtgca tgaagtcgga atcgctagta atcgtagatc agcatgctac ggtgaatacg  1320
ttcccgggcc ttgtacacac cgcccgtcac accatgggag ttggctttac ccgaaggcgc  1380
tgtgctaacc cgcaagggag gcaggcgacc acggtagggt cagcgactgg ggtgaagtcg  1440
taacaaggta gccgtagggg aacctgcggc tggatcacct ccttt                  1485

SEQ ID NO: 107          moltype = DNA  length = 1525
FEATURE                 Location/Qualifiers
source                  1..1525
                        mol_type = genomic DNA
                        note = Polaromonas sp. Pch-PE (Betaproteobacteria)
                        organism = Polaromonas sp.
```

```
SEQUENCE: 107
tatagagttt gatcctggct cagattgaac gctggcggca tgccttacac atgcaagtcg  60
aacggtagag tagcaatact cgagagtggc gaacgggtga gtaatatatc ggaacgtgcc  120
caatcgtggg ggataacgta gagaaattta cgctaatacc gcatacgatc taaggatgaa  180
agcgggggat cgcaagacct cgcgcgattg gagcggctga tatcagatta ggttgttggt  240
gaggtaaaag ctcaccaagc cgacgatctg tagctggttt gagagaacga ccagccacac  300
tgggactgag acacggccca gactcctacg ggaggcagca gtggggaatt ttggacaatg  360
ggcgaaagcc tgatccagca atgccgcgtg caggaagaag gccttcgggt tgtaaactgc  420
ttttgtacgg aacgaaacgg ctctttctaa taaagagggc taatgacggt accgtaagaa  480
taagcaccgg ctaactacgt gccagcagcc gcggtaatac gtagggtgcg agcgttaatc  540
ggaattactg ggcgtaaagc gtgcgcaggc ggttatataa gacagttgtg aaatccccgg  600
gctcaacctg ggaattgcat ctgtgactgt atagctagag tacggtagag gggatggaa  660
ttccgcgtgt agcagtgaaa tgcgtagata tgcggaggaa caccgatggc gaaggcaatc  720
ccctggacct gtactgacgc tcatgcacga aagcgtgggg agcaaacagg attagatacc  780
ctggtagtcc acgccctaaa cgatgtcaac tggttgttgg gtgcattagt actcagtaac  840
gaagctaacg cgtgaagttg accgcctggg gagtacggcc gcaaggttga aactcaaagg  900
aattgacggg gacccgcaca agcggtggat gatgtggttt aattcgatgc aacgcgaaaa  960
accttaccta cctttgacat gtacggaatt cgccagagat ggcttagtgc tcgaaagaga  1020
accgtaacac aggtgctgca tggctgtcgt cagctcgtgt cgtgagatgt tgggttaagt  1080
cccgcaacga gcgcaaccct tgtcattagt tgctacattt agttgggcac tctaatgaga  1140
ctgccggtga caaaccggag gaaggtgggg atgacgtcaa gtcctcatgg cccttatagg  1200
tagggctaca cacgtcatac aatggctggt acagagggtt gccaacccgc gaggggggagc  1260
taatcccata aaaccagtcg tagtccggat cgtagtctgc aactcgacta cgtgaagtcg  1320
gaatcgctag taatcgcgga tcagaatgtc gcggtgaata cgttcccggg tcttgtacac  1380
accgcccgtc acaccatggg agcgggttct gccagaagta gttagcctaa ccgcaaggag  1440
ggcgattacc acggcagggt tcgtgactgg ggtgaagtcg taacaaggta gccgtatcgg  1500
aaggtgcggc tggatcacct ccttt                                        1525

SEQ ID NO: 108         moltype = DNA  length = 1486
FEATURE                Location/Qualifiers
source                 1..1486
                       mol_type = genomic DNA
                       note = Nostoc sp. MS1
                       organism = Nostoc sp.
SEQUENCE: 108
acggagagtt tgatcctggc tcaggatgaa cgctggcggt atgcttaaca catgcaagtc  60
gaacggtctc ttcggagata gtggcggacg ggtgagtaac gcgtgagaat ctggcttcag  120
gtcggggaca acagttggaa acgactgcta ataccggatg tgccgagagg taaaagattt  180
attgcctgaa gatgagctcg cgtctgatta gctagttggt gtggtaagag cgcaccaagg  240
cgacgatcag tagctggtct gagaggatga tcagccacac tgggactgag acacggccca  300
gactcctacg ggaggcagca gtggggaatt ttccgcaatg ggcgaaagcc tgacggagca  360
ataccgcgtg agggaggaag gctcttgggt tgtaaacctc ttttctcagg gaataaaaaa  420
atgaaggtac ctgaggaata agcatcggct aactccgtgc cagcagccgc ggtaatacgg  480
aggatgcaag cgttatccgg aatgattggg cgtaaagggt ccgcaggtgg caatgtgtgt  540
ctgctgtcaa agaatgaggc ttaacctcat caaggcagtg gaaactacat agctagagta  600
cggtcggggt agaaggaatt cctggtgtag cggtgaaatg cgtagagatc aggaagaaca  660
ccggtggcga aagcgttctg ctagacctgt actgacactg agggacgaaa gctaggggag  720
cgaatgggat tagataccc agtagtccta gccgtaaacg atggatacta ggcgtggctt  780
gtatcgaccc gagccgtgcc ggagccaacg cgttaagtat cccgcctggg gagtacgcac  840
gcaagtgtga aactcaaagg aattgacggg ggcccgcaca agcggtggag tatgtggttt  900
aattcgatgc aacgcgaaga accttaccaa gacttgacat gtcgcgaatc ttcctgaaag  960
ggaagagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgtct tgggctacac acgtactaca atgctacgga cagagggcag  1200
ctaaacagcg atgttaagca aatcccgtaa accgtagctc agttcagatc gcaggctgca  1260
actcgcctgc gtgaaggagg aatcgctagt aattgcaggt cagcatactg cagtgaattc  1320
gttcccgggc cttgtacaca ccgcccgtca caccatggaa gctggcaacg cccgaagtca  1380
ttactccaac ttttcggaga ggaggatgcc taaggcagtg ctggtgactg gggtgaagtc  1440
gtaacaaggt agccgtaccg gaaggtgtgg ctggatcacc tccttt                1486

SEQ ID NO: 109         moltype = DNA  length = 1528
FEATURE                Location/Qualifiers
source                 1..1528
                       mol_type = genomic DNA
                       note = Uncultured Chitinophaga sp. clone 4.6h39
                        (Bacteroides)
                       organism = unidentified
SEQUENCE: 109
atggagagtt tgatcctggc tcaggatgaa cgctagcggc aggcttaata catgcaagtc  60
gagggggatc agttgggtag caatactcgg ctgtgagacc ggcaaacggg tgcggaacac  120
gtacgcaacc ttcccaaaac tggggaatag ccctccgaaa ggaggattaa taccccgtaa  180
cataatgaag tggcatcact ttattattat agctccggcg gttttggatg ggcgtgcgcc  240
tgattaggta gttggcgggg taacggccca ccaagcctac gatcagtaac tggtgtgaga  300
gcacgaccag tcacacgggc actgagacac gggcccgact cctacgggag gcagcagtaa  360
ggaatattgg tcaatggacg aaagtctgaa ccagccatgc cgcgtgaagg atgaaggccc  420
tctgggttgt aaacttcttt tataggggac gaaaaaaggg cattcttgct cacttgacgg  480
taccctagga ataagcaccg gctaactccg tgccagcagc cgcggtaata cggagggtgc  540
aagcgttatc cggattcact gggtttaaag ggtgcgtagg tgggtctgta agtcagtggt  600
```

```
gaaatctccg agcttaactc ggaaactgcc attgatacta taggtcttga atatcctgga  660
ggtgagcgga atatgtcatg tagcggtgaa atgcttagat atgacataga acaccaattg  720
cgaaggcagc tcgctacggg attattgaca ctgaggcacg aaagcgtggg gatcaaacag  780
gattagatac cctggtagtc cacgccctaa acgatggata ctcgacatca gcgatacact  840
gttggtgtct gagcgaaagc attaagtatc ccacctggga agtacgaccg caaggttgaa  900
actcaaagga attgacgggg gtccgcacaa gcggtggagc atgtggttta attcgatgat  960
acgcgaggaa ccttacctgg gctagaatgc tgggagaata tgggtgaaag ctcatagtgt  1020
agcaatacac tgccagtaag gtgctgcatg gctgtcgtca gctcgtgccg tgaggtgttg  1080
ggttaagtcc cgcaacgagc gcaacccccta tcactagttg ccatcaggta atgctgggaa  1140
ctctagtgaa actgccgccg taaggcgtga ggaaggaggg gatgatgtca agtcatcatg  1200
gcctttatgc ccagggctac acacgtgcta caatggcgag tacaaagggc agctacctgg  1260
taacaggatg ctaatctcaa aaaactcgtc tcagttcgga ttggggtctg caactcgacc  1320
ccatgaagct ggaatcgcta gtaatcgtat atcagcaatg atacggtgaa tacgttcccg  1380
gaccttgtac acaccgcccg tcaagccatg gaagctgggt gtacctaaag tcgataaccg  1440
caaggagtcg cctagggtaa aactagtaac tggggctaag tcgtaacaag gtagccgtat  1500
cggaaggtgc ggctggaata cctccttt                                    1528

SEQ ID NO: 110          moltype = DNA  length = 672
FEATURE                 Location/Qualifiers
source                  1..672
                        mol_type = genomic DNA
                        note = Erythrobacter sp. BLCC-B19 (Alphaproteobacteria)
                        organism = Erythrobacter sp.
SEQUENCE: 110
cttgagagtt tgatcctggc tcagaacgaa cgctggcggc atgcctaaca catgcaagtc  60
gaacgagacc ttcgggtcta gtggcgcacg ggtgcgtaac gcgtgggaac ctgcctttag  120
gttcggaata actcagagaa atttgagcta ataccggata atgtcttcgg accaaagatt  180
tatcgccttt agatgggccc gcgttggatt agctagttgg tggggtaaag gcctaccaag  240
gcgacgatcc atagctggtc tgagaggatg atcagccaca ctgggactga gacacggccc  300
agactcctac gggaggcagc agtggggaat attggacaat gggcgaaagc ctgatccagc  360
aatgccgcgt gagtgatgaa ggccttaggg ttgtaaagct cttttacccg agatgataat  420
gacagtatcg ggagaataag ctccggctaa ctccgtgcca gcagccgcgg taatacggag  480
ggagctagcg ttgttcggaa ttactgggcg taaagcgcac gtaggcggct ttttaagtca  540
ggggtgaaat cccggggctc aaccccggaa ctgcccttga aactgggaag ctagaatctt  600
ggagaggcga gtggaattcc gagtgtagag gtgaaattcg tagatattcg gaagaacacc  660
agtggcgaag gc                                                     672

SEQ ID NO: 111          moltype = DNA  length = 476
FEATURE                 Location/Qualifiers
source                  1..476
                        mol_type = genomic DNA
                        note = Porphyrobacter sp. YT40 (Alphaproteobacteria)
                        organism = Porphyrobacter sp.
SEQUENCE: 111
tcagctcgtg tcgtgagatg ttgggttaag tcccgcaacg agcgcaaccc tcgtccttag  60
ttgccatcat ttagttgggc actttaagga aactgccggt gataagccgg aggaaggtgg  120
ggatgacgtc aagtcctcat ggcccttaca ggctgggcta cacacgtgct acaatggcat  180
ctacagtggg cagctattcc gcaaggatgc gctaatctcc aaaagatgtc tcagttcgga  240
ttgtcctctg caactcgagg gcatgaaggc ggaatcgcta gtaatcgcgg atcagcatgc  300
cgcggtgaat acgttcccag gccttgtaca caccgcccgt cacaccatgg gagttggatt  360
cacccgaagg cagtgcgcta accgcaagga ggcagctgac cacggtgggt tcagcgactg  420
gggtgaagtc gtaacaaggt agccgtaggg gaacctgcgg ctggatcacc tccttt     476

SEQ ID NO: 112          moltype = DNA  length = 2877
FEATURE                 Location/Qualifiers
source                  1..2877
                        mol_type = genomic DNA
                        note = Polaromonas sp. Pch-P
                        organism = Polaromonas sp.
SEQUENCE: 112
tcaagtgaat aagagcacat ggtggatgcc ttggcaatga taggcgacga aagacgtgat  60
agcctgcgat aagcttcggg gagctggcaa attagctttg atccggagat ttctgaatgg  120
ggaaacccac ccttaggggt atcgctcact gaatacatag gtgtgcgaag cgaaccgggt  180
gaactgaaac atctcagtag ctcgaggaaa atacatcaac cgagattccg aaagtagtgg  240
cgagcgaaat cggagaagcc tgttagtgat agcaagactc ttagcagaac agcctggaaa  300
ggttggccat agcgggtgat agccccgtat gtaaaaagag acttgtggta ctgagctaac  360
gacaagtagg gcgggacacg agaaatcctg tctgaatatg gggggaccat cctccaaggc  420
taaatactca tcattgaccg atagtgaact agtaccgtga gggaaaggcg aaaagaaccc  480
cgggagggga gtgaaataga tcctgaaacc gtgtgcttac aaaaagtagg agcctcgtaa  540
ggggtgactg cgtacctttt gtataatggg tcagcgactt acattcagtg gcaaggttaa  600
ccgaataggg tagccgtaga gaaatcgagt ccgaataggg cgatcagtcg ctgggtgtag  660
acccgaaacc aagtgagcta tccatggcca ggatgaaggt gcggtaacac gcactggagg  720
tccgaaccga ctagtgttgc aaaactagcg gatgagctgt ggataggggt gaaaggctaa  780
acaaacttgg aaatagctgg ttctctccga aaactattta ggtagtgcct caagtattac  840
catcgggggt agagcactgt tttggctagg gggtcatggc gacttaccaa accaatgcaa  900
actccgaata ccgatgagta cagcttggga gacagagcac cgggtgctaa cgtccggact  960
caagagggaa acaacccaga ccgccagcta aggtccctaa aattggctaa gtgggaaacg  1020
aagtgggaag gctataacag tcaggatgtt ggcttagaag cagccatcat ttaaagaaag  1080
cgtaatagct cactgatcga gtcgtcctgc gcggaagatg taacggggct aagccagtta  1140
```

```
ccgaagctgc ggatttgcaa tttattgcaa gtggtaggag agcgttctgt aagcctgtga  1200
aggtggtggt gtaaaccctg ctggaggtat cagaagtgcg aatgctgaca tgagtagcgt  1260
taaagggggt gaaaagcccc ctcgccgtaa gcgcaaggtt ttctacgcaa cgttcatcgg  1320
cgtagagtga gtcggcccct aaggcgaggc agagatgcgt agctgatggg aaacaggtca  1380
atattcctgt accgatgtgt agtgcgatgt ggggacggag aaggttaact cagccaactg  1440
ttggatatgt tggttcaagc ctgtagtcgt gcctggtagg taaatccgcc gggcttagat  1500
gaggggtgat aacgagtctg cttgcagacg aagtgagtga taccctgctt ccaggaaaag  1560
ccactaagct tcagctacac acgaccgtac cgcaaaccga cactggtgcg cgagatgagt  1620
attctaaggc gcttgagaga actcaggaga aggaactcgg caaattgaca ccgtaacttc  1680
ggaagaaggt gtgcctttag taggtgaacc atttacttgg ggagcccaat gaggctgcaa  1740
aaaatcggtg gctgcaactg tttattaaaa acacagcact ctgctaagac gaaagtcgac  1800
gtatagggtg tgacgcctgc ccggtgctgg aagattaaat gatggggtgc aagctcttga  1860
ttgaagtccc agtaaacggc ggccgtaact ataacggtcc taaggtagcg aaattccttg  1920
tcgggtaagt tccgacctgc acgaatggcg taatgatggc cacactgtct cctcctgaga  1980
ctcagcgaag ttgaaatgtt tgtgatgatg caatctcccc gcggaaagac ggaaagaccc  2040
catgaacctt tactgtagct ttgtattgga ctttgaacag atctgtgtag gataggtggg  2100
aggctttgaa gtgtggtcgc tagatcgcat ggagccaacg ttgaaatacc accctggtgt  2160
gtttgaggtt ctaacctagg tccattatct ggatcgggga cagtgcatgg taggcagttt  2220
gactggggcg gtctcctccc aaagtgtaac ggaggagttc gaaggtacgc taggtacggt  2280
cggacatcgt gctaatagtg caatggcata agcgtgctta actgcgagac tgacaagtcg  2340
agcagatgcg aaagcaggac atagtgatcc ggtggttctg tatggaaggg ccatcgctca  2400
acggataaaa ggtactctgg ggataacagg ctgataccgc ccaagagttc atatcgacgg  2460
cggtgtttgg cacctcgatg tcggctcatc tcatcctggg gctgtagccg gtcccaaggg  2520
tatggctgtt cgccatttaa agaggtacgt gagctgggtt taaaacgtcg tgagacagtt  2580
tggtccctat cttccgtggg cgctgcagat ttgaggaagc ctgctcctag tacgagagga  2640
ccggagtgga cgaacctctg gtgtatcggt tgtcacgcca gtggcattgc cgagtagcta  2700
agttcggaag agataaccgc tgaaagcatc taagcgggaa actcgtttca agattagatc  2760
tgccggggcc ttgagccccc taaagagtcg ttcaagacca ggacgttgat aggtcaggtg  2820
tggaagcgca gtaatgcgtt aagctaactg atactaattg ctcgtgcggc ttgaccc     2877

SEQ ID NO: 113          moltype = DNA  length = 2719
FEATURE                 Location/Qualifiers
source                  1..2719
                        mol_type = genomic DNA
                        note = Enhydrobacter sp. isolate
                        organism = Enhydrobacter sp.
SEQUENCE: 113
aataagggcg tttggcggat gccttggcac tgagaggcga tgaaggacgt ggcaggctgc  60
gataagcttc ggggagttgc cagcacactt tgatccgaag atttccgaat ggggaaaccc  120
catccatcag gatgatcgtc gactgaatcc ataggtcgac gaagcgaacc cagggaactg  180
aaacatctca gtacctggag gaaaggacat caacagagac tccgctagta gtggcgagcg  240
aacgcggact aggccagtgc ttcgattgta agaaccggaa cactctggaa agagtggcca  300
tagcgggtga tagccccgta cggtagaaa gcagtcggag actcgagtag ggcgggacac  360
gtgaaatcct gtctgaacat gggggatca ccctccaagc ctaagtactc ctcagtgacc  420
gatagtgaac gagtaccgtg agggaaaggt gaaaagcacc ccgacaaggg gagtgaaaca  480
gacctgaaac cgaacgccta caaacagtcg gaggccgcaa ggctaacggc gtacctttg  540
tataatgggt cagcgactta ctctgtgcag caagcttaag ccgataggtg taggcgcagc  600
gaaagcgagt ctgaataggg cgcttagttg cacggagtag acccgaaacc gggtgatcta  660
gtcatgggca ggttgaaggt gcggtaacac gcactggagg accgaaccgg ttaccgttgc  720
aaaggtatcg gatgacctgt gattaggggt gaaaggccaa ccaaactcgg aaatagctgg  780
ttctccgcga aaactattta ggtagtgcgt cgtgtgatta ccgccggggg tagagcactg  840
gatgggctag gggatccaa agtcttacca aacctaacca aactccgaat accggcgagt  900
acagcgcggc agacagacgg cgggtgctaa ggtccgtcgt cgagagggaa acagcccaga  960
ccgccagcta aggtccctaa gtcatggcta agtgggaaag gatgtgggaa ttccataaca  1020
accaggaggt tggcttagaa gcagccatcc tttaaagaaa gcgtaatagc tcactggtct  1080
aatcaagaaa tcctgcgccg aagatgtacc ggggctcaag ccatgcaccg aagctgcgga  1140
ctcgaaagag tggtagcgga gcgttccgta agcctgcgaa gggagacccg tgagggctcc  1200
tggaggtatc ggaagtgaga atgctgacat aagtagcgat aaaaagcgtg agagacgctt  1260
tcgccgtaag tccaagggtt cctgcgcaag gtcaatccgc gcagggttag ccggccccta  1320
agtcgagggc gacagccgta gacgatggga accacgtcaa tattcgtggg cctgctggtg  1380
gtgacggatc cgaaaagtgg cccgagctcg ttggcgaatg ctcgggcggc ccaagggttc  1440
caggaaatag ccccagcgta tagaccgtac cctaaaccga cacaggtgga ctggtagagt  1500
ataccaaggc gcttgaggga accatgttga aggaactagg caatttaccc ccgtaacttc  1560
gggataaggg ggcctctgac ggtctcgtca gaggggcaca gactaggggg tggcgactgt  1620
ttaccaaaaa cacagggctc tgctaagccg tgaggcgaag tatagggtct gacgcctgcc  1680
cggtgccgga aggttaagag gagaggtgca agccttgaat tgaagccccg gtaaacggcg  1740
gccgtaacta taacggtcct aaggtagcga aattccttgt cgggtaagtt ccgacctgca  1800
cgaatggcgt aacgacttcc ccgctgtctc caacatgggc tcggcgaaat tgaattcccc  1860
gtgaagatgc ggggtacccg cagttagacg gaaagacccc gtgcaccttt actacaactt  1920
tgcagtggca ttagagaatg gatgtgtagg ataggcggga gcctttgaag cctgggcgct  1980
agctcgggtg gaggcaccct tgaaataccg cccttttgtt ctttgatgtc taaccgaggt  2040
ctgtcatcca gatccgggac cctgcatggt gggtagtttg actggggcgg tcgcctccca  2100
aagagtaacg gaggcgcgcg aaggtgggct cagagcggtc ggaaatcgct cgttgagtgc  2160
aatggcataa gcctgcctga ctgcgagact gacaagtcga gcagagtcga aagacggcca  2220
tagtgatccg gtggtcccac gtggacgggc catcgctcaa cggataaaag gtactccggg  2280
gataacaggc tgatgatgcc caagagtcca tatcgacggc atcgtttggc acctcgatgt  2340
cgactcatca catcctgggg ctggagcagg tcccaagggt tcggctgttc gccgattaaa  2400
gtggtacgtg agttgggttc aaaacgtcgt gagacagttt ggtccctatc tgctgtgggt  2460
gttcgagact tgagaggagc cgtccttagt acgagaggac cgggatggac ttacctctgg  2520
```

```
tgtaccggtt gtgacgccag tcgcagcgcc gggtagctat gtagtgaagg gataaacgct  2580
gaaagcatct aagcgtgaaa cccgcctcaa aactaggtct cgctgagagt cgtggtagac  2640
caccacgttg ataggccgca tgtgcaagtg cagcgatgca ttcagcttag cggtactaat  2700
agctcgatcg gcttgattt                                              2719

SEQ ID NO: 114          moltype = DNA  length = 2716
FEATURE                 Location/Qualifiers
source                  1..2716
                        mol_type = genomic DNA
                        note = Polymorphum gilvum SL003B-26A1 (Alphaproteobacteria)
                        organism = Polymorphum gilvum
SEQUENCE: 114
cttaagggca ttcggtggat gccttggcgt cgagaggcga tgaaggacgt ggtacgctgc  60
gataagctac ggggagctgc gaacaagctt tgatccgtag atttccgaat ggggaaaccc  120
ggcccgcaag ggtcatcccg caagggaagc gaacccgggg aagtgaaaca tctcagtacc  180
cggaggaaag gacatcaaca gagactccgc tagtagtggc gagcgaacgc ggaccaggcc  240
agtggcctat gcaatcaaac cggaactgtc tggaaaggca ggcctcagcg ggtgacagcc  300
ccgtacgggt aacggctgca taggtcctcg agtaaggcgg gacacgtgaa atcctgtctg  360
aacatggggg gaccaccctc caagcctaag tactcctcga cgaccgatag cgaacaagta  420
ccgtgaggga aaggtgaaaa gcaccccgac gaggggagtg aaacagttcc tgaaaccgga  480
tgcctacaaa cagtcggagc ccgcaagggt gacggcgtac cttttgtata atgggtcagc  540
gacttaattt aacgagcaag cttaagccga taggtgtagg cgcagcgaaa gcgagtccga  600
atagggcgtc aagttcgttg gattagaccc gaaaccgggt gatctagcca tgagcaggct  660
gaaggcaagg taacacttgc tggagggccg aaccgttgaa tgttgcaaaa ttctcggatg  720
acttgtggct aggggtgaaa ggccaatcaa actcggtaat agctggttct ccgcgaaatc  780
tatttaggta gagcgtcgga cgaatactcc aggggtaga gcactggatg ggctaggggt  840
ccccacagga ttaccaaacc taaccaaact ccgaataccT ggaagtacta tccggcagac  900
acacggcggg tgctaacgtc cgtcgtgaag agggaaacaa ccctgaccgc cagctaaggc  960
ccccaaatcg tggctaagtg tgaaaggatg tgagaatccc aaaacaacca ggatgttggc  1020
ttagaagcag ccatcattta aagaaagcgt aacagctcac tggtctagat aagggttctt  1080
gcgccgacaa tgtatcgggg ctcaagccac gtgccgaagc tgcgggtgca tcgcaagatg  1140
cgcggtagcg gagcgttccg taagcctgtg aagcggtacc cgtgaggggc cgtggaggta  1200
tcggaagtga gaatgctgac atgagtaacg gaaaggggtg tgagagacac ccccgccgaa  1260
agtccaaggg ttcctgcgta aagctaatct gcgcagggtc agccggcccc taagacgagg  1320
ctgaaaagcg tagtcgatgg gaaccaggtg aatattcctg ggcctgtgga tggtgacgaa  1380
cgccgtaagt tgtcgaccct tactggattg ggtcggccgc gaaggagttc caggaaatag  1440
cctccacgta tagaccgtac ccgaaaccga ctctggtgga ctggtagagc atacctaggc  1500
gcttgagaga acgatgctga aggaactcgg caatttgcct ccgtaacttc gggataagga  1560
ggcctcctcc gcgggcaacc gtgggggagg ggcacaaaac agggggtggc gactgtttat  1620
caaaaacaca gggctctgcg aagccgtaag gcgacgtata gggtctgacg cctgcccggt  1680
gccggaaggt taagaggaga ggtgcaagct ttgaatcgaa gcccggtaa acggcggccg  1740
taactataac ggtcctaagg tagcgaaatt ccttgtcggg taagttccga cctgcacgaa  1800
tggcgtaacg acttccccgc tgtctccagc atcgactcag tgaaattgaa ttccccgtga  1860
agatgcgggg ttcctgcggt tagacggaaa gaccccgtga acctttactg caactttgca  1920
ctggtatccg tgtcgtcatg tgtaggatag gtggtaggct atgaagccgg agcgccagct  1980
ctggtggagc catccttgaa ataccaccct tgaagtcatg aatatctaac tgcggcgtgt  2040
catccacgcc caggacagtg catggtgggt agtttgactg gggcggtcgc ctcccaaaga  2100
gtaacggagg cgcgcgaagg tgggctcaga gcggtcggaa atcgctcgtt gagtgcaatg  2160
gcataagcct gcctgactgc gagactgaca agtcgagcag agtcgaaaga cggccatagt  2220
gatccggtgg tcccacgtgg acgggccatc gctcaacgga taaaaggtac tccggggata  2280
acaggctgat gatgcccaag agtccatatc gacggcatcg tttggcacct cgatgtcgac  2340
tcatcacatc ctggggctgg agcaggtccc aagggttcgg ctgttcgccg attaaagtgg  2400
tacgtgagtt gggttcagaa cgtcgtgaga cagtttggtc cctatctgcc gtgggtgtag  2460
gagacttgag aggatctgcc cttagtacga gaggaccggg gtggacgtac ctctggtgga  2520
cctgttgtgg cgccagccgc atagcagggt agctaagtac ggacgggata accgctgaaa  2580
gcatctaagc gggaaaccca cctcaaaacg aggtctccct tgagagccgt ggaagacgac  2640
cacgttgata ggccgggtgt ggaagcgtgg cgacacgtga agcttaccgg tactaatagc  2700
tcgatcggct tgatca                                                 2716

SEQ ID NO: 115          moltype = DNA  length = 2767
FEATURE                 Location/Qualifiers
source                  1..2767
                        mol_type = genomic DNA
                        note = Porphyrobacter sp. LM 6
                        organism = Porphyrobacter sp.
SEQUENCE: 115
gtaagagcat ttggtggatg ccttggcatg tacaggcgaa gaaggacgtg gcacgctgcg  60
ataagcgtcg gggagttgtg agcaaacttt gatccggcga tttccgaatg gggaaaccca  120
ccttcaccat ttcttccagt ctgctttcgg gcaggccggg cgaggtggat aaggtatcac  180
cgagctgaat atataggctt ggtgaagcga acccggggaa ctgaaacatc tcagtacccg  240
gaggaaaaga catcaacaga gattcccgta gtagtggcga gcgaaccggg accaggccag  300
tgccttcatt tcaactagca gaacactctg gaaagtgtga ccatagcggg tgacagtccc  360
gtatgcgaaa gtgatgatga aggactagag tagggcggga cacgtgaaat cctgtctgaa  420
catgggggga ccaccctcca agcctaaata ctcgtacatg accgatagcg aacacagtac  480
cgtgagggaa aggtgaaaag caccccgatt aggggagtga aacagtacct gaaaccggat  540
gcttacaagc agttggagcc ccatagggggg tgacagcgta cctcttgcat aatgggtcag  600
tgacttaatc tagcatgcga gcttaagccg ttaggtgtag gcgaagcgaa agcgagtctg  660
aatagggcga ctgagtatgt tggattagac ccgaaacccg gcgatctagg catgagcaga  720
ttgaaggtgc ggtaacacgc actggaggat cgaaccgttg catgttgaaa aatgctcgga  780
```

```
tgacttgtgt ttaggggtga aaggccaatc aagccgggaa atagctggtt ctccgcgaaa  840
tctattgagg tagagcgtca gatgtatgcc gatgggggta gagcactgga tgggctaggg  900
ctgcgcgagc ggtaccaaac ctaaccaaac tccgaatacc atcgagtctt gtctggcaga  960
cagacggcgg gtgctaaggt ccgtcgtcaa aagggaaaca gccctaacct acagctaagg  1020
tccccaagtc atatctaagt gggaaagcat gtgggaatcc caaaacaacc aggaggttgg  1080
cttagaagca gccatccttt aaagaaagcg taacagctca ctggtctaaa taagggttcc  1140
tgcggcgaag atgtaacggg gctaaagata tgcaccgaag cttagggttg cagtttactg  1200
cagcggtagc ggagcgttcc gtaagcgagt gaaggagaag ggtaaccgac tctggacgta  1260
tcggaagtgc gaatgctgac atgagtagcg actaacaggg tgagataccc tgtcgccgaa  1320
agaccaaggg ttcctacgca atgctaatca gcgtagggtg agccggcccc taagacgagc  1380
ccgaaggggg tagtcgatgg gaaccacgtt aatattcgtg ggcctggtgg tgtgtgacgg  1440
atctcgtaaa ttgttcgacc ttattggatt ggtcgggcag tgaagaggtt ccaggaaata  1500
gccccaccgt atagaccgta cccgaaaccg acacaggtgg tcaggtagag tataccaagg  1560
cgcttgagag aagtatcctg aaggaactcg gcaaattgcc tccgtacctt cggaagaagg  1620
aggccccatc ttaaggcaac ttttggtggg gggcacaggc cagggggtag cgactgttta  1680
tcaaaaacac aggactctgc taagtcggct tcaagacgac gtatagggtc tgacgcctgc  1740
ccggtgctgg aaggttaaga ggaggagtgc aagctccgaa ttgaagcccc agtaaacggc  1800
ggccgtaact ataacggtcc taaggtagcg aaattccttg tcgggtaagt tccgacctgc  1860
acgaatggcg taacgacttc cccactgtct ccaggatatg ctcagcgaaa ttgaattctc  1920
cgtgaagatg cggagtaccc gcggttagac ggaaagaccc cgtgcacctt tactgcagct  1980
tcagagtggt attaggaaag agttgtgtag cataggtggg aggctttgaa gtgtcggcgc  2040
cagctgacat ggagccatag gtgaaatacc accctgctgt tttctgatat ctaacctcgc  2100
accgttatcc ggtgtaggga ccctctgtgg cgggtagttt gactggggcg gtcgcctcct  2160
aaagagtaac ggaggcgcgc gatggtaggc tcaggacggt tggaaaccgt ctgttagagt  2220
gcaatggcat aagcctgcct gactgcgaga ctgacgagtc gagcagagac gaaagtcggt  2280
catagtgatc cggtggtccc tcgtggaagg gccatcgctc aacggataaa aggtacgccg  2340
gggataacag gctgatgatt cccaagagct catatcgacg gaatcgtttg gcacctcgat  2400
gtcggctcat cacatcctgg ggctggagca ggtcccaagg gtttggctgt tcgccaatta  2460
aagtggtacg tgagctgggt tcagaacgtc gcgagacagt ttggtcccta tctgccgtgg  2520
gcgtcgatac ttgaaaggag ttgcccctag tacgagagga ccggggtgaa cgtacctctg  2580
gtgtacctgt cattctgcca agagtgccgc agggtagcta tgtacggacg ggataaccgc  2640
tgaaagcatc taagcgggaa gcctcccttg agattaggta tctttgaacc gtgatagacc  2700
atcacgttga taggccgggt gtggaagtgc agtaatgtat ggagctaacc ggtcctaata  2760
gttcata                                                            2767

SEQ ID NO: 116          moltype = DNA  length = 2824
FEATURE                 Location/Qualifiers
source                  1..2824
                        mol_type = genomic DNA
                        note = Nostoc sp. MS1E
                        organism = Nostoc sp.
SEQUENCE: 116
tcaagctaat aagggctaat ggtggatacc taggcacaca gaggcgaaga aggacgtggt  60
taccgacgaa atactccggg gagttggaag caaacattga gccggaggtg tccgaatggg  120
gcaaccctag atacagcctg ttgaatatat agacaggtat gagccaaccc agcgaactga  180
aacatcttag tagctggagg aaaagaaatc aattgagatt ccccaagtag tggtgagcga  240
aaggggaaga gcctaaacca gagggtttac cttctggggt tgtgggacag caatatcgaa  300
tccagcgatt agacgaagca gctaaatact gcaccagaga aagtgaaagt cttgtagtcg  360
aaaattcaag gatagtagct gaatcccgag tagcatggag cacgaggaat tccatgtgaa  420
tcagcgagga ccatctcgta aggctaaata ctactgtgtg accgatagtg aaccagtacc  480
gcgagggaaa ggtgaaaaga accccgcaag gggagtgaaa tagaacatga aaccattagc  540
ttacaagcag tgggagtccg attaaacgga tgaccgcgtg cctgttgaag aatgagccgg  600
cgacttatag gcactggtag gttaagacga gaatgtcgca gccaaaggga aaccgagtct  660
gaaaagggcg ataatcagtg tttatagacc cgaaccctgg tgatctaacc atggccagga  720
tgaagcttgg gtaacaccaa gtggaggtcc gaaccgaccg atgttgaaaa atcggcggat  780
gagttgtggt tagggtgaa atgccaatcg aaccaggagc tagctggttc tccccgaaat  840
gtgttgaggc gcagcggtaa tgaatatagt cggggggtaa agcactgttt cggtgcgggc  900
tgggagaccg gtaccaaatc gagacaaact cagaataccc gatgtacaca ttgccagtga  960
gacggtgggg gataagcttc atcgtcaaga gggaaacagc ccagaccacc agctaaggtc  1020
cccaaatcat cgctaagtga taaaggaggt gagactgcat agacaactag gaggtttgcc  1080
tagaagcagc cacccttgaa agagtgcgta atagctcact agtcaagcgg tcttgcgccg  1140
aaaatgaacg gggctaagcg atgtaccgaa gctgtgggat taactaaaca ttaatcggta  1200
ggggagcgtt ccgtagtagg tagaagcagt agcggcaagc agctgtggac gagacggaag  1260
tgagaatgtc ggcttgagta gcgcaaacat tggtgagaat ccaatgcccc gaaaccctaa  1320
gggttccaga gccaggttcg tccactctgg gttagtcggg acctaaggcg aggctgaaaa  1380
gcgtagtcga tggacacagg gtcaacaatc cctgactagt atacgggagc attattaggg  1440
acgcatgaaa gatagccata ccctgattgg tttgggagga gtttacgaac tccgcgtggt  1500
gaaggatagt gtcaagaaaa gctagtaatg tgatgaacgt atgttacccg tacccgaaac  1560
cgacacaggt agggaggttg agaataccaa ggggcgcgag ataactctct ctaaggaact  1620
cggcaaaatg gccccgtaac ttcggaagaa ggggtgccca cctcagacgt gggtcgcagt  1680
gaagagatcc aggcgactgt ttaccaaaaa cacaggtctc cgcaaactcg taagaggaag  1740
tatgggggct gacgcctgcc cagtgccgga aggttaagga agttggtcag tggtaacatg  1800
aagctgacga ccgaagcccc ggtgaacggc ggccgtaact ataacggtcc taaggtagcg  1860
aaattccttg tcgggtaagt tccgacccgc acgaaaggcg taacgatctg gatggtgtct  1920
cagagagaga ctcggcgaaa taggaatgtc tgtgaagata cggactgcct gcacctggac  1980
agaaagaccc tatgaagctt tactgtagcc tggaattgtg tccgggcttc gcttgcgcag  2040
gataggtggg aagcgatgaa gcagtccttg tggggactgt ggagctaacg gtgagatacc  2100
actctggcga agctaggatt ctaacttgtt tccatgatct ggaaaaagga cagtttcagg  2160
tgggcagttt gactggggcg gtcgcctcct aaaaggtaac ggaggcgcgc aaaggttccc  2220
```

```
tcagcacgct tggaaaccgt gcggcgagtg taaaggcata aagggagctt gactgcaaga  2280
gtgaccactc gagcaggtac gaaagtaggc cttagtgatc cgacggcgca gagtggaatg  2340
gccgtcgctc aacggataaa agttactcta gggataacag gctgatctcc cccaagagtc  2400
cacatcgacg gggaggtttg gcacctcgat gtcggctcat cgcaacctgg ggcggaagta  2460
cgtcccaagg gttgggctgt tcgcccatta aagcggtacg tgagctgggt tcagaacgtc  2520
gtgagacagt tcggtccata tccggtgcag gcgtaagagc attgagagga gccttcctta  2580
gtacgagagg accgggaagg acgcaccgct ggtgtaccag ttattgtacc cgcagtagac  2640
gctgggtagc catgtgcgga gcggataacc gctgaaagca tctaagtggg aagcccacct  2700
caagatgagt gctctcacta cataagtagg taaggtcacc tgaagaacac aggtttatag  2760
gctctaagtg gaagtgcagt aatgtatgta gctgaggagt cctaacagac cgagggcttg  2820
acct                                                               2824

SEQ ID NO: 117         moltype = DNA  length = 2872
FEATURE                Location/Qualifiers
source                 1..2872
                       mol_type = genomic DNA
                       note = Ferruginibacter lapsinanis strain KACC 15035
                        Bacteroides
                       organism = Ferruginibacter lapsinanis
SEQUENCE: 117
aaagcaatta agggcgtatg gtggatgcct tgggtctgag aggcgatgaa ggacgtggta  60
agctgcgata agcttcgggg agctgcacac aagcgttata tccgaagatt tccgaatggg  120
acaacctaat acattgaaga tgtattactc gaaagagagc caacctcctg aactgaaaca  180
tctaagtagg gagaggaaaa gaaaacaata gtgattccct gagtagtggc gagcgaaacg  240
ggaatagccc aaaccttggt ggcgtgctgc caaggggttg taggactgca tttagaaact  300
gatatcaaac tgaaccttct ggaaagttgg gccatagcgg gtgatagccc cgtaagtaca  360
aattatcagg gacgagcagt atcctgagta aggcgggacc ggagaaatcc tgcctgaatc  420
tgccggcacc atccggtaag gctaaatact cctcagacac cgatagtgaa ccagtaccgt  480
aagggaaagg tgaaaagcac cctaaataag ggagtgaaat agtacctgaa accgtacgcc  540
tacaagcggt cggagccagc aatggtgacg gcgtgccttt tgcataatga gcctacgagt  600
tactcctcac tggcgaggtt aagctcttta gtagcggagc cgtagcgaaa gcaagtccaa  660
atagggcgat tagtcagtgg gggtagacgc gaaactttgt gatctatcca tgggcaggtt  720
gaaggtgtgg taacacacac tggaggaccg aacccatgag cgttgaaaag ctctgggatg  780
acctgtggat aggggtgaaa ggccaatcaa actgagagat agctcgttct ccccgaaatg  840
tttttaggaa cagcctcgga ttatagacgt ttactagagg tagagctact gattgggcta  900
gggggcttca ccgcctacca aaccctgaca aactccgaat gctagtaaat atctccggga  960
gtgaggctgc gggcgataag gtccgtggcc gagagggaaa taacccagat tagcaactaa  1020
ggtccctaat acatggttaa gttgatcaaa cgaggtggga tttctataac agccaggatg  1080
ttggcttgga agcagccatt catttaaaga gtgcgtaaca gctcactggt cgagagatcc  1140
tgcacggaaa ataatcgggc atcaaaccat gaaccgaagt tctaaacagt actttagaag  1200
tacttgtggt aggggagcat tgaaatctgc tgcgaaggtg tgtggcgacg catgctggag  1260
cgatttcaaa agaaaatgta ggcataagta acgataattg aagtgaaaaa cttcaacgcc  1320
gtaaacccaa ggtttcctga tcaatgttaa tcagatcagg gttagtcggg tccttaggca  1380
aacccgaaag gggtagctga tggcaagttg gttaatattc caacacctgc tttagattcg  1440
atggggtgac ggggtagtga aagatccgcg ttcttacgga atagaacgtt aaagggtgta  1500
gttataggtt gtgtaggcaa atccgcacga cttggcgaac ctgatagtac agcaaagctt  1560
cggccgcgct gatagtgatc ctaatcaaac ctccgagaaa aacctctaag ttatgtttaa  1620
agcagcccgt accgcaaacc gacacaggtg ggtgggatga atattctaag gcgctcgggt  1680
gagccgtgga gaaggaacta ggcaaattga cgctgtaact tcgggataaa gcgtaccgtc  1740
ttcggacggt ctcagtaaaa tggttcaacc aactgtttag caaaaacaca gggccctgca  1800
aaatcgaaag atgacgtata gagcctgata cctgcccggt gctggaaggt taaggaagga  1860
tgttcggcgc aagccaaagc ttctgactga agccccagta aacggcggcc gtaactataa  1920
cggtcctaag gtagcgaaat tccttgtcgg gtaagttccg acctgcacga atggtctaat  1980
gagttgaaca ctgtctcctc cacgagcccg gtgaaattgt agtatcggtg aagatgccgg  2040
ttacccgtca cgggacggaa agaccccatg aaccttcact acaactttgc attgattttg  2100
aatttttgat gtgtaggata gttgggagac tttgaagtgg tgtcgctagg catcatggag  2160
tcgtcgttga aataccaacc tttaaacatt tagaatctaa tccctaacgg gaaacagtgc  2220
atggtgggta gtttgactgg ggtggtcgcc tcctaaaatg taacggaggc ttgcaaaggt  2280
tccctcagta cggttggtaa tcgtacatag agcgtattag tataagggag cttgactgtg  2340
aggcatacaa gccgagcagg gacgaaagtc ggctaaagtg atccggcggt tctgtatgga  2400
agggccgtcg ctcaaaggat aaaaggtact ctggggataa caggctgatc tcccccaaga  2460
gctcatatcg acggggaggt ttggcacctc gatgtcggtt cgtcacatcc tggggctgga  2520
gaaggtccca agggttcggc tgttcgccga ttaaagtggc acgtgaactg ggttcagaac  2580
gtcgcaagac agttcggtcc ctatctgtga tgggcgctag taaattgaaa ggacatgacc  2640
ttagtacgag aggaccgggt cgtacgtacc gctggtgtat ctgttgtgcc gccaggtgca  2700
atgcagagta gctatgtacg gacaggataa acgctgaaag catctaagcg tgaaaccttc  2760
cttaagatga gtttactttt aagggtcgtc aaagactatg acgttgatag gctacaggta  2820
taagggtggt aacatcgaag ccgagtagta ctaattgccc gtaagcttta tt          2872

SEQ ID NO: 118         moltype = DNA  length = 110
FEATURE                Location/Qualifiers
source                 1..110
                       mol_type = genomic DNA
                       note = Unknown organism
                       organism = unidentified
SEQUENCE: 118
tggtggccat agcgtctgtg acccacccga tcccatctcg aactcggccg tgaaaccaga  60
cagcgccgat ggtactaacg ctcaagcgtt ggaagagtag gtcgtcgcca             110
```

```
SEQ ID NO: 119         moltype = DNA  length = 109
FEATURE                Location/Qualifiers
source                 1..109
                       mol_type = genomic DNA
                       note = Unknown organism
                       organism = unidentified
SEQUENCE: 119
ggtggctcta gcgagaggtg tacacccgat cccattccga actcggacgt gaaaactctc  60
agcgccaatg gtactgtgtc tcaaggcacg ggagagtagg tcgctgccg             109

SEQ ID NO: 120         moltype = DNA  length = 106
FEATURE                Location/Qualifiers
source                 1..106
                       mol_type = genomic DNA
                       note = Unknown organism
                       organism = unidentified
SEQUENCE: 120
gatgaccata gcaagttggt accactcctt cccatcccga acaggacagt gaaacgactt  60
agcgccgatg atagtgcgga ttcccgtgtg aaagtaggac atcgtc                106

SEQ ID NO: 121         moltype = DNA  length = 110
FEATURE                Location/Qualifiers
source                 1..110
                       mol_type = genomic DNA
                       note = Unknown organism
                       organism = unidentified
SEQUENCE: 121
tggtggcgat ggcgaggggg ctggacccga tcccattccg aactcggccg tcaaaaccct  60
cagcgccgat ggtacttcgt ctcaagacgc gggagagtag gtcgctgcca            110

SEQ ID NO: 122         moltype = DNA  length = 1505
FEATURE                Location/Qualifiers
source                 1..1505
                       mol_type = genomic DNA
                       note = Uncultured bacterium clone SH201206-6E(Nostoc)
                       organism = unidentified
SEQUENCE: 122
tgtagagttt gatcctggct cagattgaac gctggcggaa tgctttacac atgcaagtcg  60
aacggcagca cgggggcaac cctggtggcg agtggcgaac gggtgagtaa tacatcggaa  120
cgtgcccagt cgtgggggat aacgtagcga aagctacgct aataccgcat acgatctacg  180
gatgaaagcg ggggatcgca agacctcgcg cgattggagc ggccgatggc agattaggta  240
gttggtgggg taaaggccta ccaagcctgc gatctgtagc tggtctgaga ggacgaccag  300
ccacactggg actgagacac ggcccagact cctacgggag gcagcagtgg ggaattttcc  360
gcaatgggcg aaagcctgac ggagcaatac cgcgtgaggg aggaaggctc ttgggttgta  420
aacctctttt ctcagggaat aagaaagtga aggtacctga ggaataagca tcggctaact  480
ccgtgccagc agccgcggta atacggagga tgcaagcgtt atccggaatg attgggcgta  540
aagcgtccgc aggtggcgat gtaagtctgc tgttaaagag caaagcttaa ctttgtaaaa  600
gcagtggaaa ctacatagct agagtacgtt cggggcagag ggaattcctg gtgtagcggt  660
gaaatgcgta gagatcagga agaacaccgg tggcgaaggc gctctgctag gccgtaactg  720
acactgaggg acgaaagcta ggggagcgaa tgggattaga taccccagta gtcctagccg  780
taaacgatgg atactaggcg ttgcgagtat cgaccctcgc agtgccggag ccaacgcgtt  840
aagtatcccg cctggggagt acgcacgcaa gtgtgaaact caaaggaatt gacgggggcc  900
cgcacaagcg gtggagtatg tggtttaatt cgatgcaacg cgaagaacct taccaagact  960
tgacatgtcg cgaatcctct tgaaagggag gagtgcctta gggagcgcga acacaggtgg  1020
tgcatggctg tcgtcagctc gtgtcgtgag atgttgggtt aagtcccgca acgagcgcaa  1080
cccttgtcat tagttgctac gaaagggcac tctaatgaga ctgccggtga caaaccggag  1140
gaaggtgggg atgacgtcaa gtcctcatgg cccttatagg tggggctaca cacgtcatac  1200
aatggctggt acagagggtt gccaacccgc gagggggagc taatcccaca aaaccagtcg  1260
tagtccggat cgcagtctgc aactcgactg cgtgaagtcg gaatcgctag taatcgcgga  1320
tcagaatgtc gcggtgaata cgttcccggg tcttgtacac accgcccgtc acaccatggg  1380
agcgggttct gccagaagta gttagcctaa ccgcaaggag ggcgattacc acggcagggt  1440
tcgtgactgg ggtgaagtcg taacaaggta gccgtatcgg aaggtgcggc tggatcacct  1500
ccttt                                                              1505

SEQ ID NO: 123         moltype = DNA  length = 483
FEATURE                Location/Qualifiers
source                 1..483
                       mol_type = genomic DNA
                       note = Nostoc sp. HK-01
                       organism = Nostoc sp.
SEQUENCE: 123
gtcgtcagct cgtgtcgtga gatgttgggt taagtcccgc aacgagcgca accctcgttt  60
ttagttgcca gcattaagtt gggcactcta gagagactgc cggtgacaaa ccggaggaag  120
gtggggatga cgtcaagtca gcatgcccct tacgtcttgg gctacacacg tactacaatg  180
ctacgaacag agggcagcaa gctagcgata gcaagcaaat cccggaaatc gtagctcagt  240
tcagatcgaa gcttgcaact cagcttcgtg aaggaggaat cgctagtaat tgcaggtcag  300
catactgcag tgaattcgtt cccgggcctt gtacacaccg cccgtcacac catggaagct  360
ggcaacgccc gaagtcatta ccccaacttt taggagaggg ggatgcctaa ggcagtgctg  420
gtgactgggg tgaagtcgta acaaggtagc cgtaccggaa ggtgtggctg gatcacctcc  480
```

```
ttt                                                                483

SEQ ID NO: 124          moltype = DNA  length = 2874
FEATURE                 Location/Qualifiers
source                  1..2874
                        mol_type = genomic DNA
                        note = Ramlibacter tataouinensis strain DMF-7
                         (Betaproteobacteria)
                        organism = Ramlibacter tataouinensis
SEQUENCE: 124
tcaagtgact aagagcatgt ggtggatgcc ttggcgatga taggcgacga aggacgtgat  60
agcctgcgat aagcctcggg gagctggcaa ataagctttg aaccggggat ttccgaatgg  120
ggaaacccac ctttataggt atcgcacgat aaattcatag tcgtgcgagg cgaaccgggt  180
gaactgaaac atctcagtag ctcgaggaaa agacatcaac cgagattccg aaagtagtgg  240
cgagcgaaat cggagaagcc tgctggtaat agcacaagac ttagcggaac ggcttggaaa  300
ggccggctac agagggtgat agccccgtac gcgaaaagac ctgtgtggta ctaagccagc  360
gacaagtagg gcgggacacg tgtaatcctg tctgaacatg gggggaccat cctccaaggc  420
taaatactca tcatcgaccg atagtgaact agtaccgtga gggaaaggcg aaaagaaccc  480
cgggagggga gtgaaataga tcctgaaacc gcatgcttac aaaaagtcgg agcccgcaag  540
ggtgacggcg tacctttttgt ataatgggtc agcgacttac attcagtggc aaggttaacc  600
gaatagggta gccgtagaga aatcgagtcc gaatagggcg ttcagtcgct gggtgtagac  660
ccgaaaccaa gtgatctatc catggccagg atgaaggtgc cgtaacaggt actggaggtc  720
cgaaccgact agtgttgcaa aactagcgga tgagctgtgg ataggggtga aaggctaaac  780
aaacttggaa atagctggtt ctctccgaaa actatttagg tagtgcctca agtattaccg  840
tcgggggtag agcactgttt aggctagggg gtcatggcga cttaccaaac ctatgcaaac  900
tccgaatacc gacgagtaca gcttgggaga cagagcaccg ggtgctaacg tccggactca  960
agagggaaac aacccagacc gccagctaag gtccctaaaa ttggctaagt gggaaacgaa  1020
gtgggaaggc taaaacagtc aggatgttgg cttagaagca gccatcattt aaagaaagcg  1080
taatagctca ctgatcgagt cgtcctgcgc ggaagatgta acggggctaa gccagttacc  1140
gaagctgcgg atttgcacgc aagtgcaagt ggtaggagag cgttccgtaa gcctgtgaag  1200
gtggcttgta aaggctgctg gaggtatcgg aagtgcgaat gctgacatga gtagcgttaa  1260
agcgggtgaa aagcccgctc gccgtaagcg caaggttttc tacgcaacgt tcatcggcgt  1320
agagtgagtc ggcccctaag gcgaggcaga gatgcgtagc tgatgggaaa caggtcaata  1380
ttcctgtacc gatgtgcagt gcgatgtggg gacggagaag gttagctcag ccgggtgttg  1440
gatgtcccgg ttcaagcctg tagccgtgcc tggtaggtaa atccgccagg cttaggtgag  1500
gggtgataac gaggaagctt gcttccgaag tgagtgatac cctgcttcca ggaaaagcca  1560
ctaagcttca gctgcacacg accgtaccgc aaaccgacac tggtgcgcga gatgagtatt  1620
ctaaggcgct tgagagaact cgggagaagg aactcggcaa attgacaccg taacttcgga  1680
agaaggtgtg cctttagtag gtgaagtccc tgcggatgga gcccaatgag gttgcaaaaa  1740
atcggtggct gcgactgttt aataaaaaca cagcactctg caaacacgaa agtggacgta  1800
tagggtgtga cgcctgcccg gtgctggaag attaagtgat ggggtgcaag ctcttgatcg  1860
aagtcccagt aaacggcggc cgtaactata acggtcctaa ggtagcgaaa ttccttgtcg  1920
ggtaagttcc gacctgcacg aatggcgtaa cgatggccac actgtctcct cccgagactc  1980
agcgaagttg aaatgtttgt gatgatgcaa tctccccgcg gaaagacgga aagaccccat  2040
gaacctttac tgtagctttg tattggactt tgaacagatc tgtgtaggat aggtgggagg  2100
ctttgaagtg cggtcgctag atcgcatgga gccaacgttg aaataccacc ctggtgtgtt  2160
tgaggttcta acctaggccc gttatccggg ctggggacag tgcatggtag gcagtttgac  2220
tggggcggtc tcctcccaaa gcgtaacgga ggagttcgaa ggtacgctag ttacggtcgg  2280
acatcgtgac gatagtgcaa tggcataagc gtgcttaact gcgagactga caagtcgagc  2340
agatgcgaaa gcaggacata gtgatccggt ggttctgtat ggaagggcca tcgctcaacg  2400
gataaaaggt actctgggga taacaggctg ataccgccca agagttcata tcgacggcgg  2460
tgtttggcac ctcgatgtcg gctcatctca tcctggggct gtagccggtc ccaagggtat  2520
ggctgttcgc catttaaaga ggtacgtgag ctgggtttaa aacgtcgtga gacagtttgg  2580
tccctatctt ccgtgggcgc tgcagagttg aggaagcctg ctcctagtac gagaggaccg  2640
gagtggacgc acctctggtg taccggttgt cacgccagtg gcattgccgg gtagctatgt  2700
gcggaagaga taaccgctga aagcatctaa gcgggaaact cgttccaaga tgagctctgc  2760
cggggccttg agccccctga agagtcgttc aagaccagga cgttgatagg tcgggtgtgg  2820
aagcgcagta atgcgttaag ctaaccgata ctaattgctc gtgcggcttg accc        2874

SEQ ID NO: 125          moltype = DNA  length = 2821
FEATURE                 Location/Qualifiers
source                  1..2821
                        mol_type = genomic DNA
                        note = Nostoc sp. HK-01E
                        organism = Nostoc sp.
SEQUENCE: 125
tcaagcgaat aagagctaat ggtggatacc taggcacaca gaggcgaaga aggacgtggt  60
taccgacgaa aagctccggg gagttggaag caaactatga gccggagata tccgaatggg  120
gaaaccctat gtactacctg ttgaatatat agacaggaaa gagccaaccc agcgaactga  180
aacatcttag tagctggagg aagagaaatc aaaagagatt ccctcagtag tggtgagcga  240
aaggggaaga gcctaaacca gttggtttac tgactggggt tgtgggacag cgatatcgaa  300
tctagaggct agacgaagca gctaagtact gcaccagaga aagtgaaagt cttgtagtcg  360
aaagtcaaag gatagtagct gaatcccgag tagcatgggg cacgaggaat cccatgtgaa  420
tcagcgagga ccatctcgta aggctaaata ctactgtgtg accgatagtg aaccagtacc  480
gcgagggaaa ggtgaaaaga accccggaag gggagtgaaa tagaacatga aaccatgagc  540
ttacaagcag tgggagtccg attaaacgga tgaccgcgtg cctgttgaag aatgagccgg  600
cgacttatag gcactggtag gttaaagcga gaatgctgga gccaaaggga aaccgagtct  660
gaaaagggcg ataatcagtg tttatagacc cgaaccctgg tgatctaacc atggccagga  720
tgaagcttgg gtaacaccaa gtggaggtcc gcaccgaccg atgttgaaaa atcggcggat  780
```

```
gagctgtggt taggggtgaa atgccaatcg aaccaggagc tagctggttc tccccgaaat  840
gtgttgaggc gcagcggtaa cgattaaatc tggggggtaa agcactgttt cggtgcgggc  900
tgggagaccg gtaccaaatc gagacaaact cagaataccc agagaacacg ttgccagtga  960
gacggtgggg gataagcttc atcgtcaaga gggaaacagc ccagaccacc agctaaggtc  1020
cccaaatcat cactaagtga taaaggaggt gagattgcat agacaactag gaggtttgcc  1080
tagaagcagc cacccttgaa agagtgcgta atagctcact agtcaagcga tcttgcgccg  1140
aaaatgaacg gggctaagtg atgtaccgaa gctgtgggat taataaacat taatcggtag  1200
gggagcgttc cgtagtagga agaagcaata gcggtaagca gttgtggacg aaacggaagt  1260
gagaatgtcg gcttgagtag cgcaaacatt ggtgagaatc caatgccccg aaaccctaag  1320
ggttccagag ccaggttcgt ccgctctggg tgagtcgggt cctaaggcga ggtcgaacgg  1380
cgtagtcgat ggacacaggg tgaagattcc ctgactatga tatgggagca taactaggga  1440
cgcataaaaa atagccatac cctgattggt ttgggagacg gttacgaccg tcgcatggtg  1500
aaagatagtg ccaagaaaag ctagggatgt gatgaacata tcgtacccgt acccgaaacc  1560
gacacaggta gggaggttga gtaaactaag gggcgcgaga taactctctc taaggaactc  1620
ggcaaaatgg ccccgtaact tcggaagaag gggtgcccac gagagtgggt cgcagtgaag  1680
agatccaggc gactgtttac caaaaacaca ggtctccgca aactcgaaag aggaagtatg  1740
ggggctgacg cctgcccagt gccggaaggt taaggaagtt ggtcagtggc aacatgaagc  1800
tgacgaccga agccccggtg aacggcggcc gtaactataa cggtcctaag gtagcgaaat  1860
tccttgtcgg gtaagttccg acccgcacga aaggcgtaac gatctggatg gtgtctcaga  1920
gagagactcg gcgaaatagg aatgtctgtg aagatacgga ctgcctgcac ctggacagaa  1980
agaccctatg aagctttact gtagcctgga atggtgtccg ggcttcgctt gcgcaggata  2040
ggtgggaagc gatgagatat tccttgtggg gaatatggag ctaacggtga gataccactc  2100
tggcgaagct aggattctaa ctcatctccg tgatccggag agaggacagt ttcaggtggg  2160
cagtttgact ggggcggtcg cctcctaaaa ggtaacggag gcgcgcaaag gttccctcag  2220
cacgcttgga aaccgtgcgg cgagtgtaaa ggcataaagg gagcttgact gcaagaccga  2280
caagtcgagc aggtacgaaa gtaggcctta gtgatccgac ggcgcagagt ggaatggccg  2340
tcgctcaacg gataaaagtt actctaggga taacaggctg atctccccca agagtccaca  2400
tcgacgggga ggtttggcac ctcgatgtcg gctcatcgca acctggggcg gaagtacgtc  2460
ccaagggttg ggctgttcgc ccattaaagc ggtacgtgag ctgggttcag aacgtcgtga  2520
gacagttcgg tccatatccg gtgcaggcgt tagaacattg agaggagtcc tccttagtac  2580
gagaggaccg ggaggaacgc accgctggtg taccagttat tgtaccaaca gtagacgctg  2640
ggtagccaag tgcggagtgg ataaccgctg aaagcatcta agtgggaagc ccaccttaag  2700
atgagtgttc tcatcacttg aagtgagtaa ggtcacctgt agaacacagg ttcttaggcg  2760
gtaggtggaa gtgcagtaat gtatgtagcc gagccgtgct aacagaccga gggcttgacc  2820
t                                                                 2821
```

```
SEQ ID NO: 126          moltype = DNA  length = 106
FEATURE                 Location/Qualifiers
source                  1..106
                        mol_type = genomic DNA
                        note = Unknown organism
                        organism = unidentified
SEQUENCE: 126
gatgaccata gcgaggtggt cccactcctt cccatcccga acaggacagt gaaacgcctc  60
tgcgccgatg atagtgcgga ttcccgtgtg aaagtaggac atcgtc                106
```

```
SEQ ID NO: 127          moltype = DNA  length = 1487
FEATURE                 Location/Qualifiers
source                  1..1487
                        mol_type = other DNA
                        note = Nostoc consensus sequence
                        organism = Synthetic construct
SEQUENCE: 127
acggagagtt tgatcctggc tcaggatgaa cgctggcggt atgcttaaca catgcaagtc  60
gaacggtgtc ttcggacata gtggcggacg ggtgagtaac gcgtgagaat ctngcttcag  120
gtctgggaca accactggaa acggtggcta ataccggatg tgccgnaagg tgaaaggntt  180
nctgcctnaa gatgagctcg cgtctgatta gctagtnggt ggggtaanag nctaccnagg  240
cgacgatcag tagctggtct gagagganga tcagccacac tgggactgag acacggccca  300
gactcctacg ggaggcagca gtggggaatt ttccgcaatg ggcgaaagcc tgacggagca  360
ataccgcgtg agggaggaag gctcttgggt tgtaaacctc ttttctcagg gaagaacaca  420
atgacggtac ctgaggaata agcatcggct aactccgtgc cagcagccgc ggtaatacgg  480
aggatgcaag cgttatccgg aatgattggg cgtaaagcgt ccgcaggtgg cnntgtaagt  540
ctgctgttaa agagtntagc tcaactnnat aaaggcagtg gaaactacan agctagagtn  600
cgttcggggc agagggaatt cctggtgtag cggtgaaatg cgtagagatc aggaagaaca  660
ccggtggcga aggcgctctg ctaggccgna actgacactg agggacgaaa gctaggggag  720
cgaatgggat tagatacccc agtagtccta gccgtaaacg atggatacta ggcgtggctt  780
gtatcgaccc gagccgtgcc gtagctaacg cgttaagtat cccgcctggg gagtacgcnc  840
gcaanngtga aactcaaagg aattgacggg ggcccgcaca agcggtggag tatgtggttt  900
aattcgatgc aacgcgaaga accttaccaa ggcttgacat gtcgcgaatc ctnctgaaag  960
gngggagtgc cttcgggagc gcgaacacag gtggtgcatg gctgtcgtca gctcgtgtcg  1020
tgagatgttg ggttaagtcc cgcaacgagc gcaaccctcg tttttagttg ccagcattaa  1080
gttgggcact ctagagagac tgccggtgac aaaccggagg aaggtgggga tgacgtcaag  1140
tcagcatgcc ccttacgcct tgggctacac acgtactaca atgctncgga cagagggcag  1200
caagcnagcg anngcaagcn aatcccntaa accgnngctc agttcagatc gcaggctgca  1260
actcgcctnc gtgaaggagg aatcgctagt aattgcaggt cagcatactg cagtgaattc  1320
gttcccgggc cttgtacaca ccgcccgtca caccatggaa gctggnaacg cccgaagtca  1380
ttactccaac ctttcgggga ggaggatgcc taaggcaggn ctggtgactg gggtgaagtc  1440
gtaacaaggt agccgtaccg gaaggtgtgg ctggatcacc tcctttn               1487
```